United States Patent [19]

Okada et al.

[11] Patent Number: 5,664,243
[45] Date of Patent: Sep. 2, 1997

[54] CAMERA

[75] Inventors: Takashi Okada; Shigeto Ohmori; Hideki Nagata; Tsutomu Honda; Kiyoshi Seigenji, all of Sakai; Toshihiro Hamamura, Osaka; Tougo Teramoto, Wakayama; Takashi Kato, Sakai; Hiroaki Kubo, Settsu, all of Japan

[73] Assignee: Minolta Co., Ltd., Japan

[21] Appl. No.: 659,690

[22] Filed: Jun. 6, 1996

[30] Foreign Application Priority Data

| Jun. 8, 1995 | [JP] | Japan | 7-142049 |
| Jun. 14, 1995 | [JP] | Japan | 7-147398 |
| Jun. 14, 1995 | [JP] | Japan | 7-147399 |
| Jun. 19, 1995 | [JP] | Japan | 7-151875 |
| Jun. 19, 1995 | [JP] | Japan | 7-151876 |
| Jul. 4, 1995 | [JP] | Japan | 7-168607 |
| Jul. 27, 1995 | [JP] | Japan | 7-191841 |
| Jul. 28, 1995 | [JP] | Japan | 7-192711 |
| Jul. 28, 1995 | [JP] | Japan | 7-192780 |
| Jul. 28, 1995 | [JP] | Japan | 7-193356 |
| Jul. 31, 1995 | [JP] | Japan | 7-194378 |
| Jul. 31, 1995 | [JP] | Japan | 7-194885 |
| Jul. 31, 1995 | [JP] | Japan | 7-194889 |
| Aug. 10, 1995 | [JP] | Japan | 7-204713 |

[51] Int. Cl.⁶ .................. G03B 7/00; G03B 13/02; H04N 5/232
[52] U.S. Cl. .................. 396/246; 396/257; 396/374; 396/429; 348/64; 348/296; 348/333; 348/340; 348/363
[58] Field of Search .................. 396/250, 246, 396/259, 260, 257, 287, 296, 374, 429; 348/296, 297, 333, 334, 64, 340, 363

[56] References Cited

U.S. PATENT DOCUMENTS

| 4,855,837 | 8/1989 | Tanimoto . |
| 5,459,511 | 10/1995 | Uehara et al. ............. 396/363 X |
| 5,486,893 | 1/1996 | Takagi ............. 396/374 X |
| 5,557,358 | 9/1996 | Mukai et al. ............. 396/333 X |
| 5,587,766 | 12/1996 | Kawamura et al. ............. 396/257 |
| 5,589,880 | 12/1996 | Tsukui ............. 348/296 X |

FOREIGN PATENT DOCUMENTS

S63-284527 11/1988 Japan .
H3-271730 12/1991 Japan .

OTHER PUBLICATIONS

"Nikon Digital Still Camera E2", *Photographic Industries*, Dec., 1994, vol. 52, No. 12, pp. 13–15.

"Zenza-Bronica Camphoto VX3000", *Photographic Industries*, Jun., 1994, vol. 52, No. 6, pp. 12–15.

*Primary Examiner*—W. B. Perkey
*Attorney, Agent, or Firm*—Burns, Doane, Swecker & Mathis

[57] ABSTRACT

A camera divides a light beam having passed through a taking lens unit into two light beams. One light beam forms an image on a silver salt film. Another light beam forms an image on a CCD. A light path for said another light beam is provided with an aperture diaphragm. The taking lens unit has an aperture diaphragm. Said two aperture diaphragms are correlatively controlled by a controller incorporated in the camera.

22 Claims, 176 Drawing Sheets

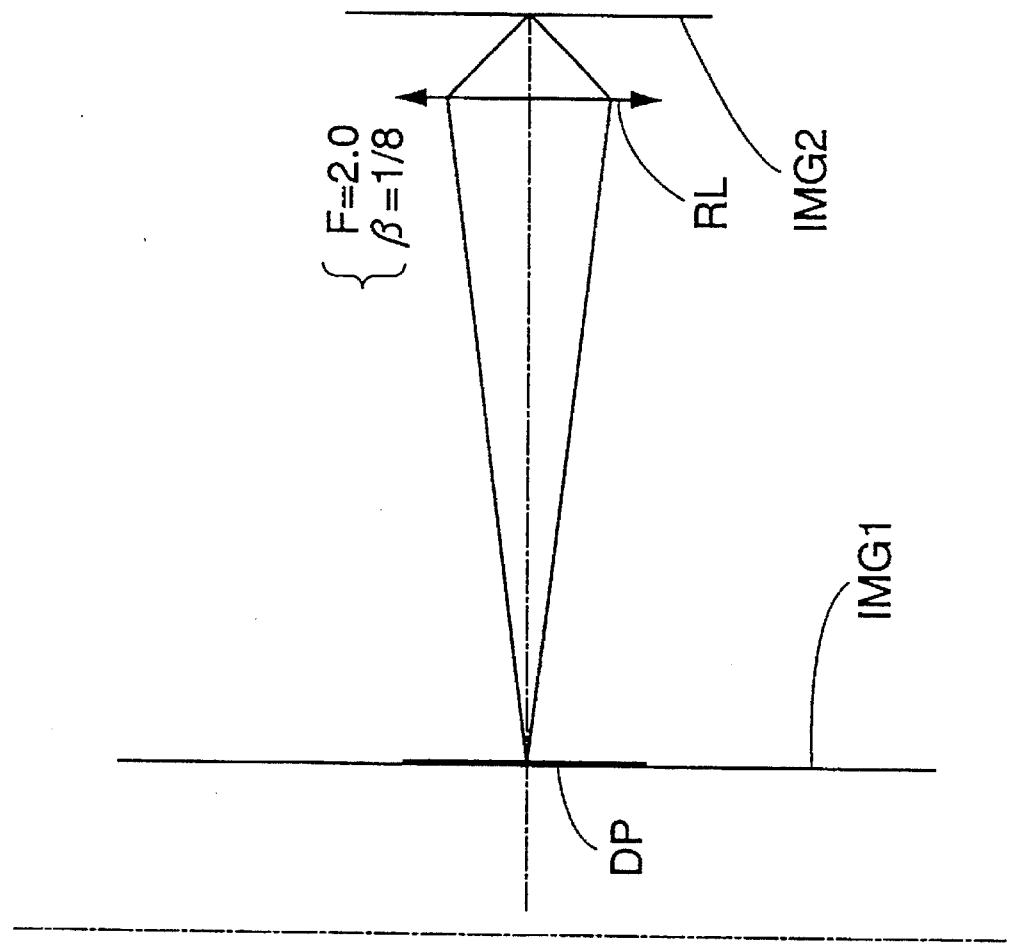
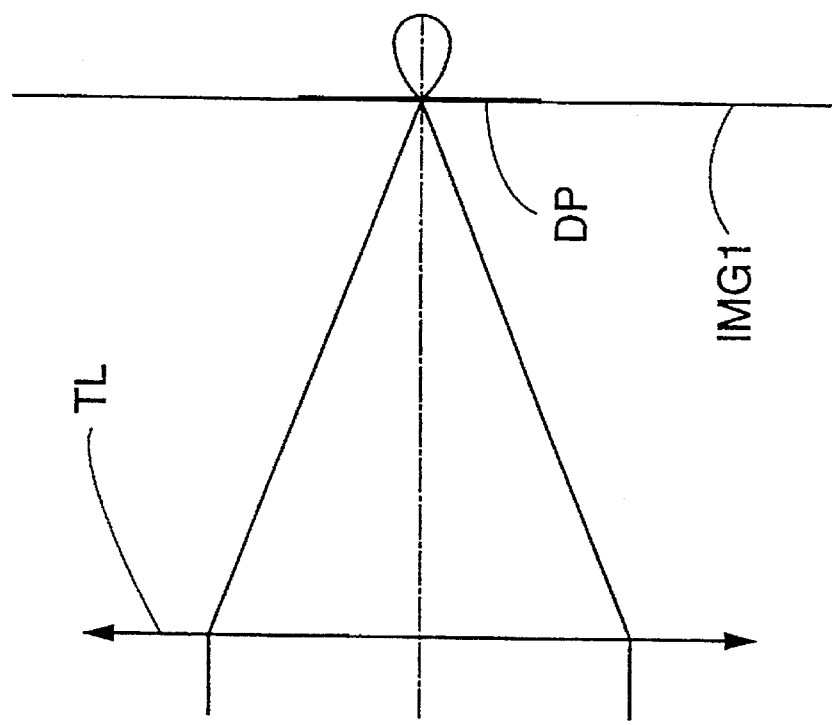
FIG. 55

CAMERA

BACKGROUND OF THE INVENTION

1. Field of the Invention

The present invention relates to a camera in which an incident optical beam is divided for use in both photographing and observation of an image.

2Description of the Prior Art

As a conventional example, an article in the June, 1994 issue of the "Photographic Industries" magazine, pages 12 to 15, describes a camera which is capable of changing the path of an incident light beam for the purpose of photographing and observing an image at the same time. According to the article, the camera uses one of the divided light beam for taking a photograph on a silver salt or a silver halide film, and the other for picking up an image on a CCD (Charge Coupled Device). The CCD reportedly is of a ½-inch type.

An attempt to simultaneously take a photograph on a silver salt film and pick up an image on an image pickup device is subject to a problem as described below. Generally, an image pickup device having a considerably small image area is used for this purpose, since an image pickup device having a wide image area is expensive. As seen from a comparison shown in FIG. 15, even the image area of a comparatively large image pickup device of a 1-inch type, for example, is substantially smaller than a image area on a film. Accordingly, in order to adjust the spread of an incident light beam to the image area, it is necessary to use a reduction optical system such as a relay optical system. Considering an image pickup device of a ¼- to ½-inch type is generally used, the relay optical system needs to have a magnification of $\frac{1}{10}$ to $\frac{1}{4}$. However, it is often impossible to use a relay optical system capable of supplying sufficient light, since there is only limited space for extra components inside a camera body.

As a consequence of the above limitations, the following problem arises. As shown in FIG. 14, if a relay optical system of a magnification $\beta=\frac{1}{4}$ and of an open aperture value F=1.4 (represented also by a) is used, a light beam incident from a taking lens TL enters the relay optical system RL without diffusing on a primary image plane IMG1. Accordingly, of the light beam incident from the taking lens TL, only a portion corresponding to $a/\beta=5.6$, that is, F=5.6 is used as a light beam which passes through the relay optical system RL to form a secondary image IMG2, while the remaining light beam (indicated with hatching in the drawing) passing outside the light beam corresponding to F=5.6 does not enter the image pickup device. As a result, if the aperture is adjusted to be wider than F=5.6 by use of a taking lens of an open aperture value less than F=5.6, the amount of light incident on a silver salt film does change accordingly, while the amount of light incident on the image pickup device remains the same. This leads to that, although the exposure of a silver salt film can be adjusted by adjustment of aperture, the exposure of a image pickup device cannot be adjusted in the same manner; a different adjustment needs to be devised.

Moreover, if the aperture of the taking lens is adjusted to be narrower than F=5.6 when simultaneous taking of a photograph on a silver salt film is attempted during exclusively performed picking up of an image on an image pickup device, the amount of light incident on the image pickup device is also affected, disturbing proper picking up of an image.

As another conventional example, Japanese Laid-Open Patent No. S63-284527 discloses a camera which takes a photograph on a silver salt film and picks up an image on an image pickup device, and in which an image thus taken by the image pickup device can be reproduced and observed through a viewfinder. In a camera of this type, it is possible to preview an image frame taken on a silver salt film by displaying a stationary image in an electronic viewfinder.

As still another conventional example, a camera is well known which stops down the aperture of a taking lens without taking a photograph on a silver salt film so that picture effects (such as a depth-of-field effect) achieved by stopping down the aperture can be previewed through an optical viewfinder, that is, a single-lens reflex camera with a so-called preview mechanism.

Although a preview mechanism adopted conventionally in a single-lens reflex camera allows previewing of picture effects, an image provided by such a preview mechanism is dark, because the image is observed with the aperture stopped down. Therefore, the conventional preview mechanism is defective because it does not offer a clear image when the aperture is extremely stopped down. Moreover, if a camera is provided with a mechanism for detecting focus by use of a light beam incident through a taking lens, it is impossible to detect focus during previewing, because a light beam to be used for focus detection is obstructed when the aperture is extremely stopped down.

Further, since a conventional preview mechanism does not allow observation of a stationary image, it is difficult to preview an image photographed on a silver salt film, and it is impossible to observe picture effects (such as a shaken-image effect) achieved by a change in shutter speed.

On the other hand, although the camera according to Japanese Laid-Open Patent No. S63-284527 allows previewing of an image frame, it does not allow previewing of picture effects achieved by changes in aperture or shutter speed.

SUMMARY OF THE INVENTION

An object of the present invention is to provide a camera construction suitable for commercial production of a camera capable of dividing an incident light beam for use in both photographing and observation of an image.

Another object of the present invention is to provide a construction that offers adequate exposure both in taking of a photograph and in picking up of an image in a camera capable of dividing an incident light beam for use both in taking a photograph on a silver salt film and in picking up an image on an image pickup device.

Still another object of the present invention is to provide a construction that allows previewing of picture effects achieved by changes in aperture or shutter speed in a camera capable of dividing an incident light beam for use in both photographing and observation of an image.

A further object of the present invention is to provide a construction in which an image is not darkened during previewing of picture effects achieved by changes in aperture or shutter speed in a camera capable of dividing an incident light beam for use in both photographing and observation of an image.

A still further object of the present invention is to provide a construction in which focus detection or the like is not hindered by the previewing of picture effects achieved by changes in aperture or shutter speed in a camera capable of dividing an incident light beam for use in both photographing and observation of an image.

To achieve the objects described above, according to a construction of the present invention, a camera, which performs a first imaging by means of a silver salt film and a second image pickup by means of a image pickup device by dividing a light beam incident through an imaging optical system including a first aperture diaphragm, is provided with another imaging optical system having a second aperture diaphragm in a light path of one of the thus divided light beam, said first and second aperture diaphragms being controlled correlatively.

According to another construction of the present invention, a camera, which performs both imaging by means of a photosensitive recording medium and imaging by means of an image pickup device by dividing a light beam incident through an imaging optical system including a first aperture diaphragm, and in which an image taken by the image pickup device can be observed through an electronic viewfinder, is provided with a setting device for setting aperture value of the first aperture diaphragm. A second aperture diaphragm is provided in a path of a light beam traveling to said image pickup device. During imaging on said photosensitive recording medium, said first aperture diaphragm is activated according to a setting by said setting device, while, during the time when imaging on said photosensitive recording medium is not performed, said second aperture diaphragm is activated according to a setting by said setting device, so that imaging on said image pickup device is performed, said electronic viewfinder displaying the thus taken image.

BRIEF DESCRIPTION OF THE DRAWINGS

This and other objects and features of this invention will become clear from the following description, taken in conjunction with the preferred embodiments with reference to the accompanied drawings in which:

FIG. 55 is an explanatory diagram showing the outline of the fifth embodiment;

FIG. 111 shows an example of the silver salt film shooting dedicated grip; FIG. 112 shows an example of the dual-purpose grip;

FIG. 113 shows another example of the dual-purpose grip;

FIGS. 114 to 116 show still other examples of the dual-purpose grip;

FIG. 117 shows an example of the accessory attachment portion;

FIG. 118 shows the state of an image taking apparatus of the sixteenth embodiment in use as a camera for silver salt film shooting;

FIG. 119 shows the state of an image taking apparatus of the sixteenth embodiment in use as a camera for moving-picture video shooting;

FIG. 120 shows the state of an image taking apparatus of the sixteenth embodiment with the EVF accessory unfolded;

FIG. 159 is a diagram showing the portion around the mirror box of the optical system of the twenty-ninth embodiment;

FIG. 160 is a diagram showing how a shadow of the AF mirror 4 appears;

FIG. 161 is a diagram showing how far the half-mirror can be moved within the mirror box;

FIG. 162 is a construction diagram of the portion around the mirror box of the optical system of the thirtieth embodiment of the present invention;

FIG. 163 is a construction diagram of the portion around the mirror box of the optical system of the thirty-first embodiment of the present invention as viewed from the direction perpendicular both to the first light beam and to the second light beam;

FIG. 164 is a construction diagram of the portion around the mirror box of the optical system of the thirty-first embodiment as viewed from the optical axis direction of the second light beam;

FIG. 165 is a construction diagram of the portion around the mirror box of the optical system of the thirty-second embodiment of the present invention as viewed from the direction perpendicular both to the first light beam and to the second light beam;

FIG. 166 is a construction diagram of the portion around the mirror box of the optical system of the thirty-second embodiment as viewed from the optical axis direction of the second light beam;

FIG. 167 is an outline construction diagram showing the optical system of a conventional single lens reflex camera;

FIG. 168 is a diagram for the explanation of arrangement of the photometry device in the camera of FIG. 167;

FIGS. 169 to 172 are diagrams showing how a shadow of the AF mirror appears in the camera of FIG. 167;

FIG. 173 is a cross-sectional view, along the optical axis, of the principal portion of an image taking apparatus of the thirty-third embodiment of the present invention;

Figure 173:
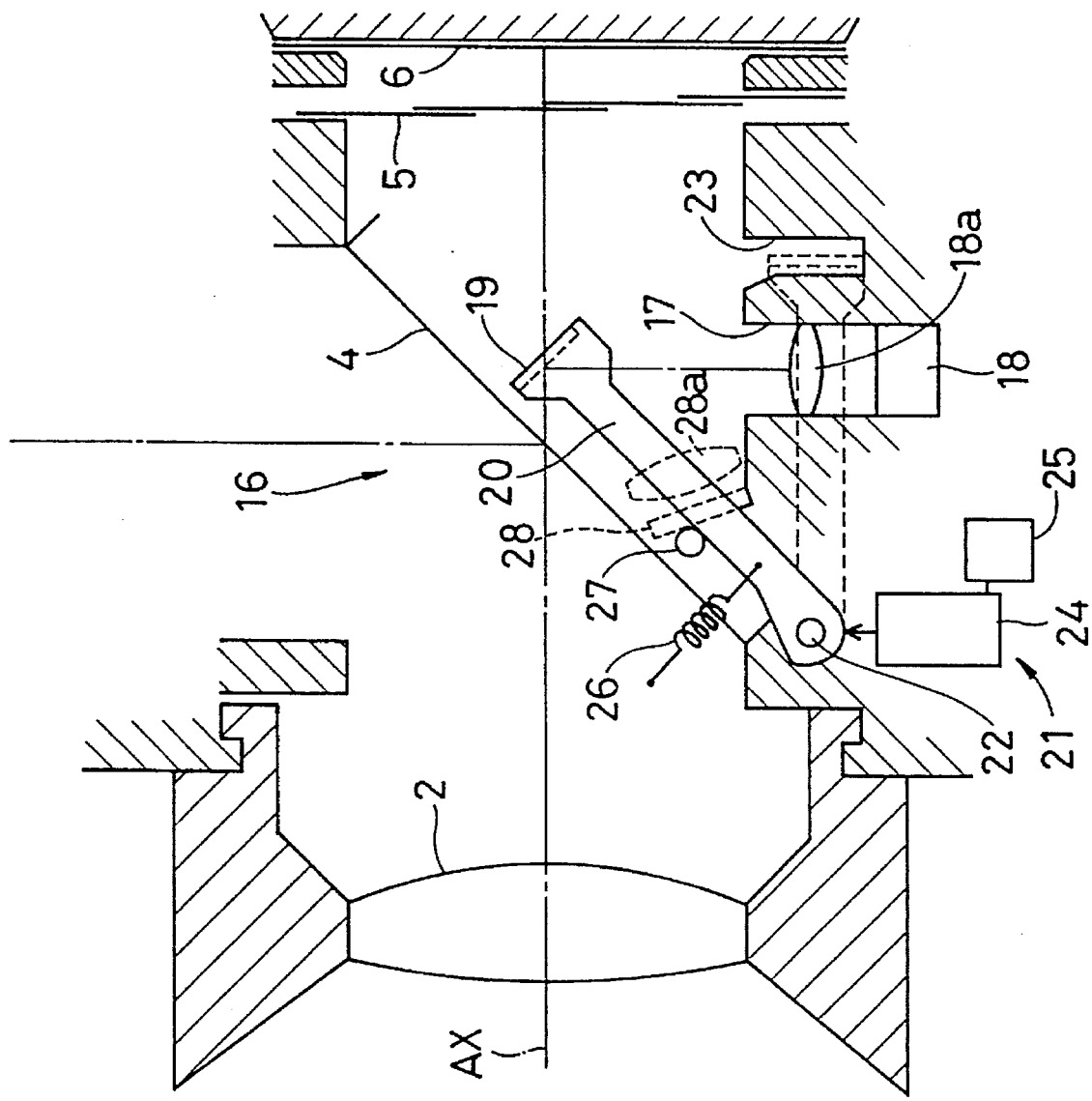
Figure 174:
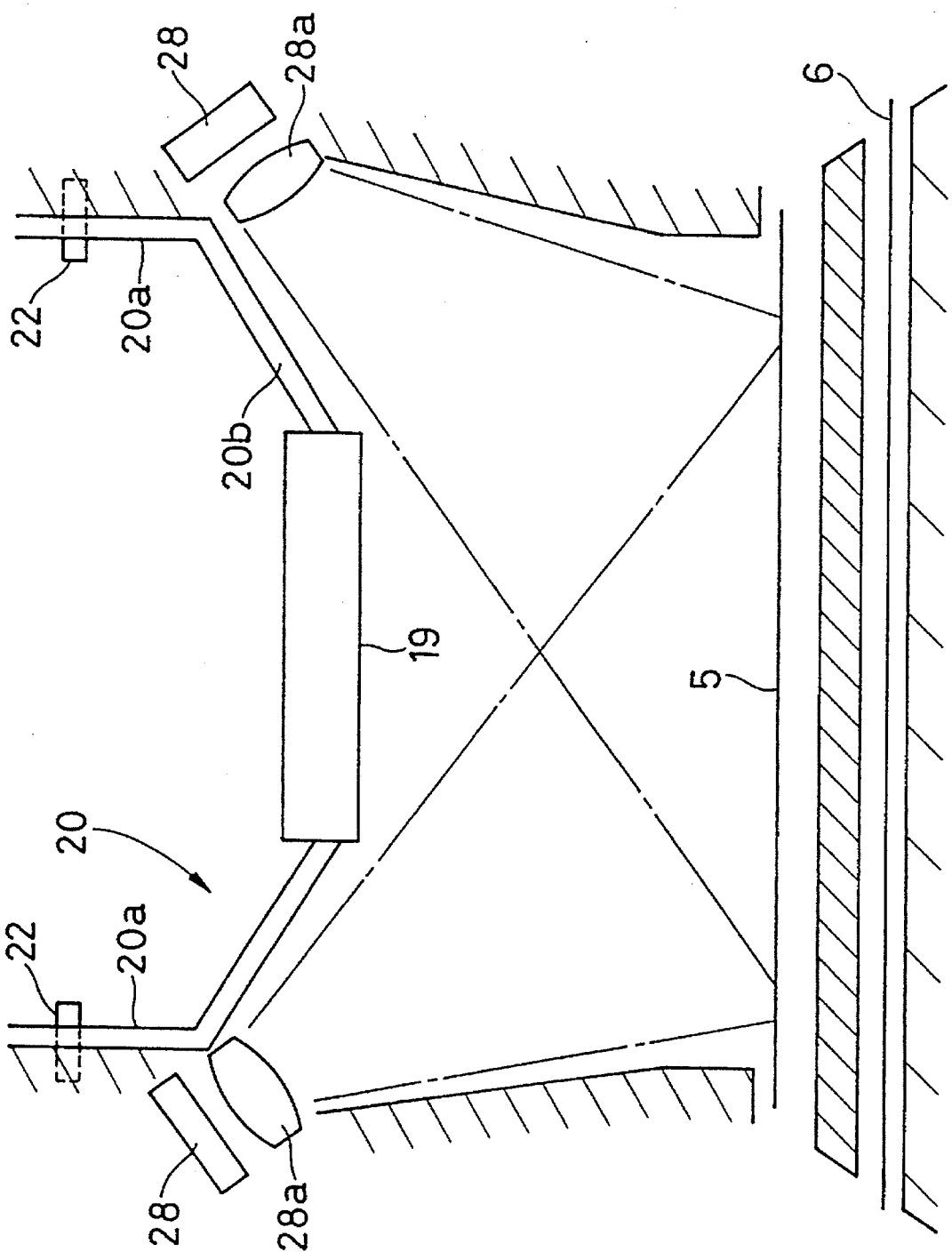
Figure 175:
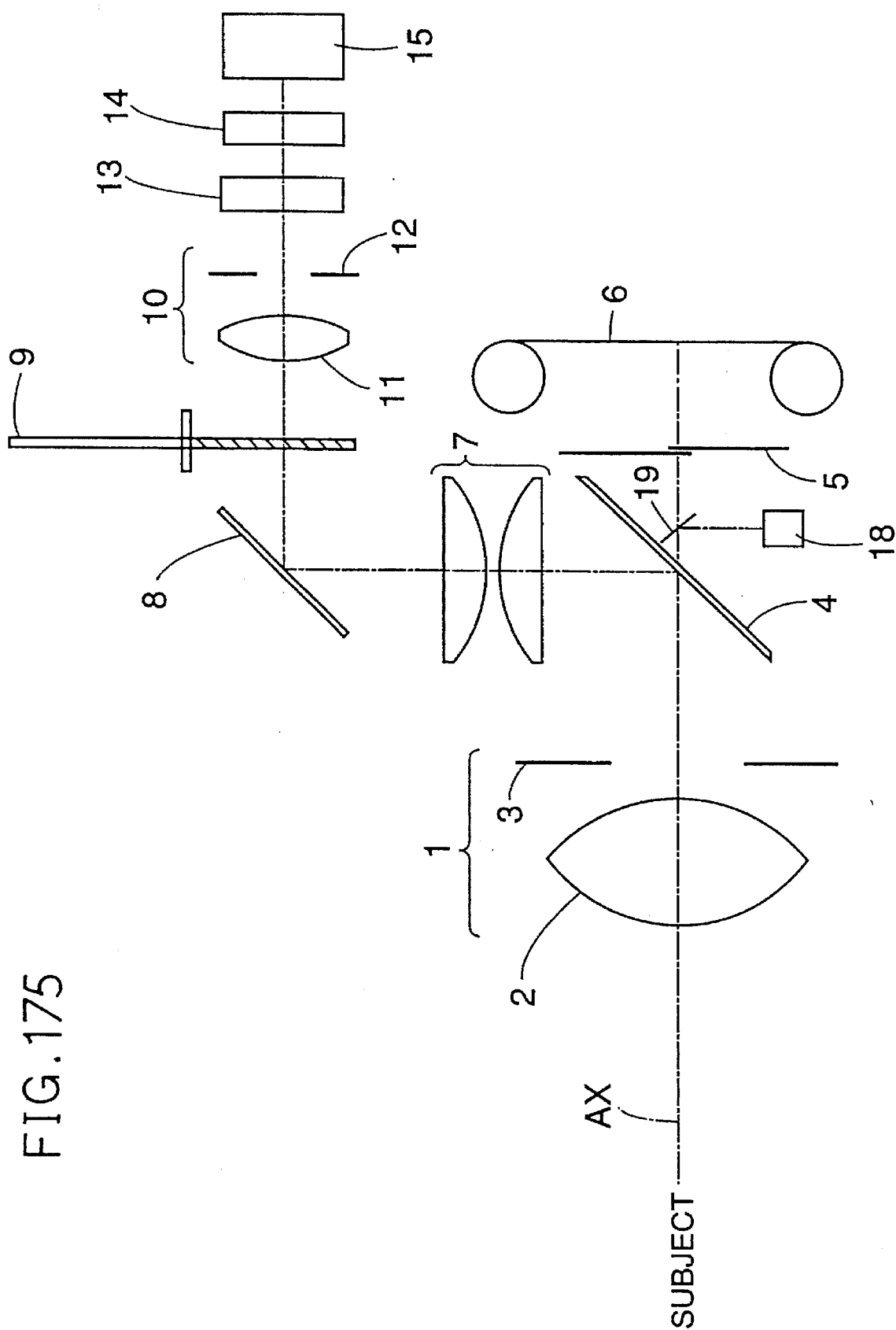
Figure 176:
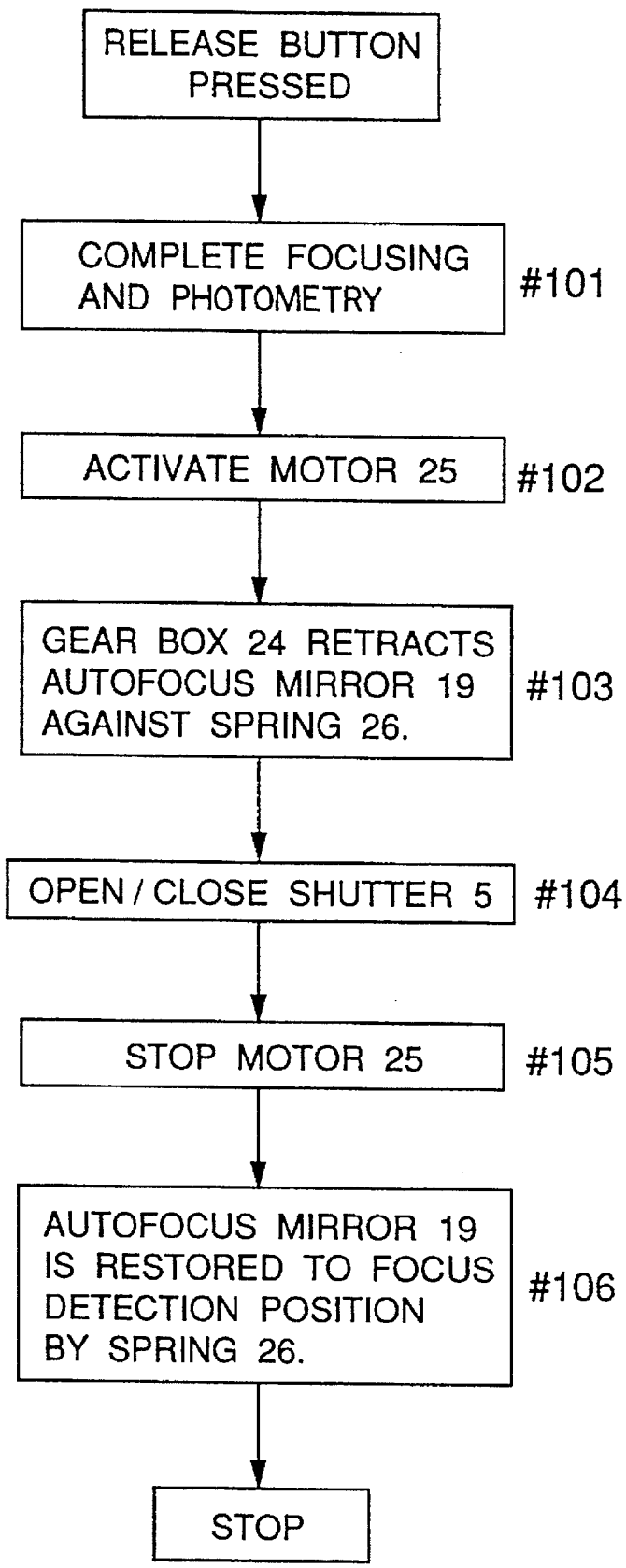
Figure 177:
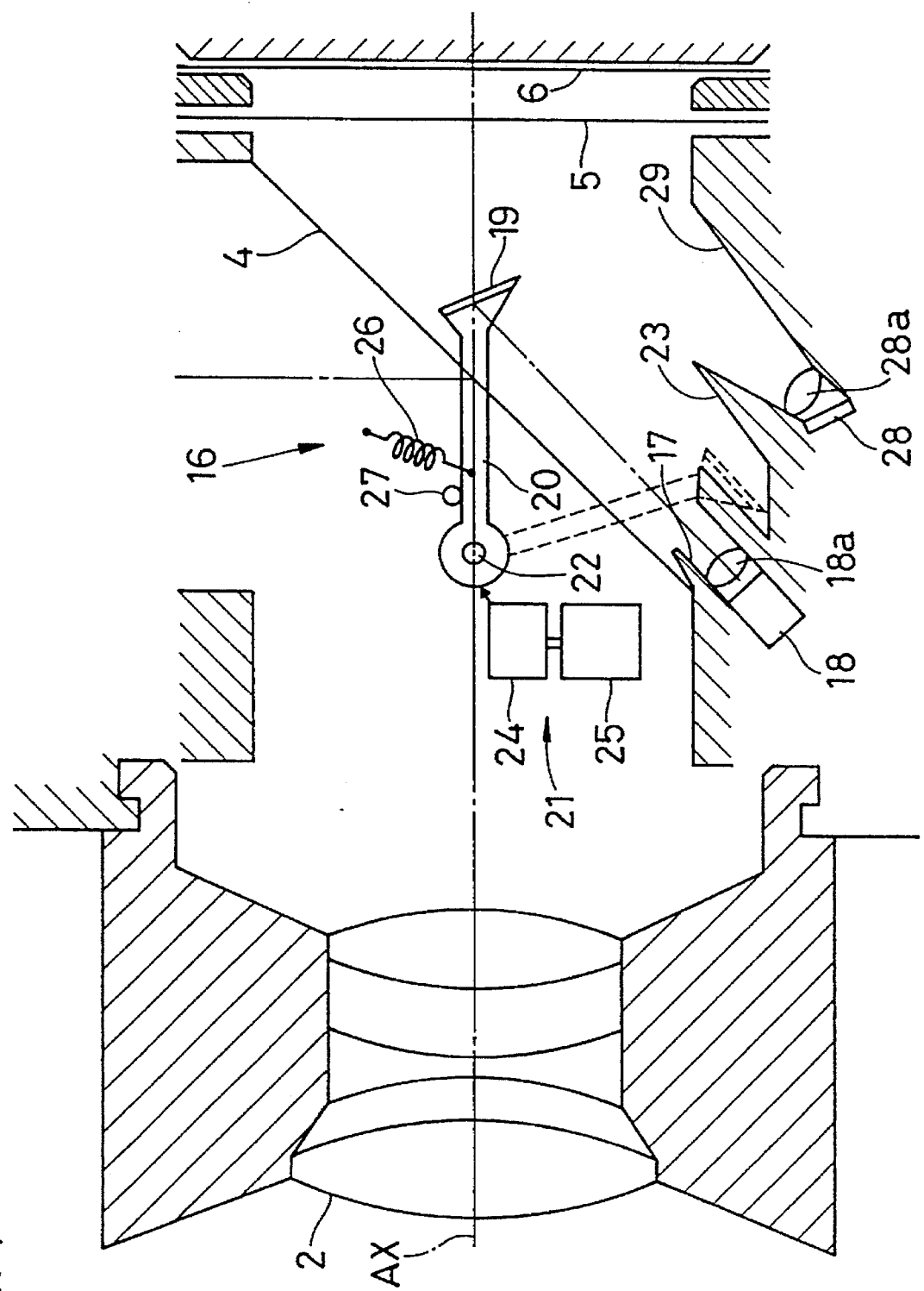
Figure 178:
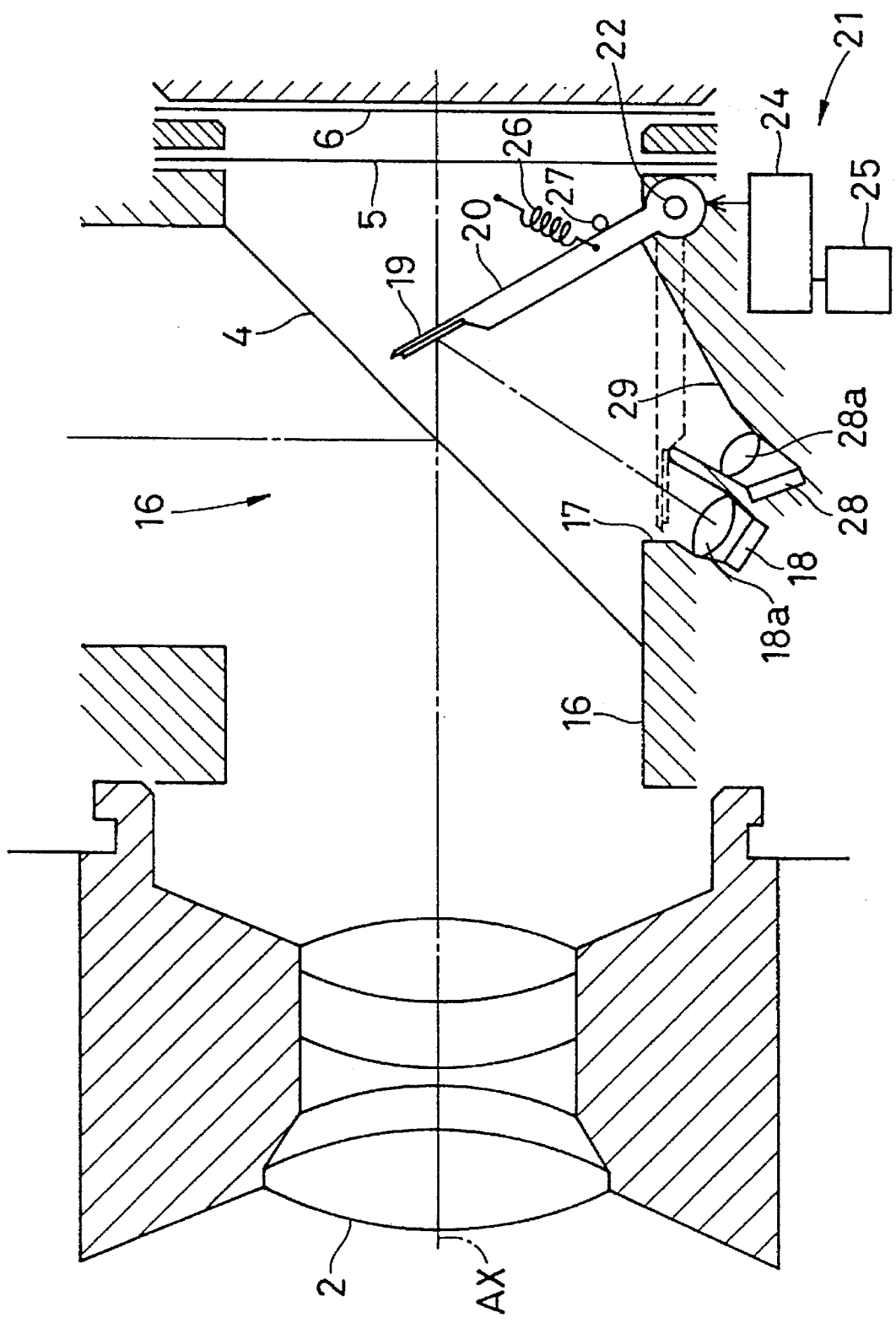
Figure 179:
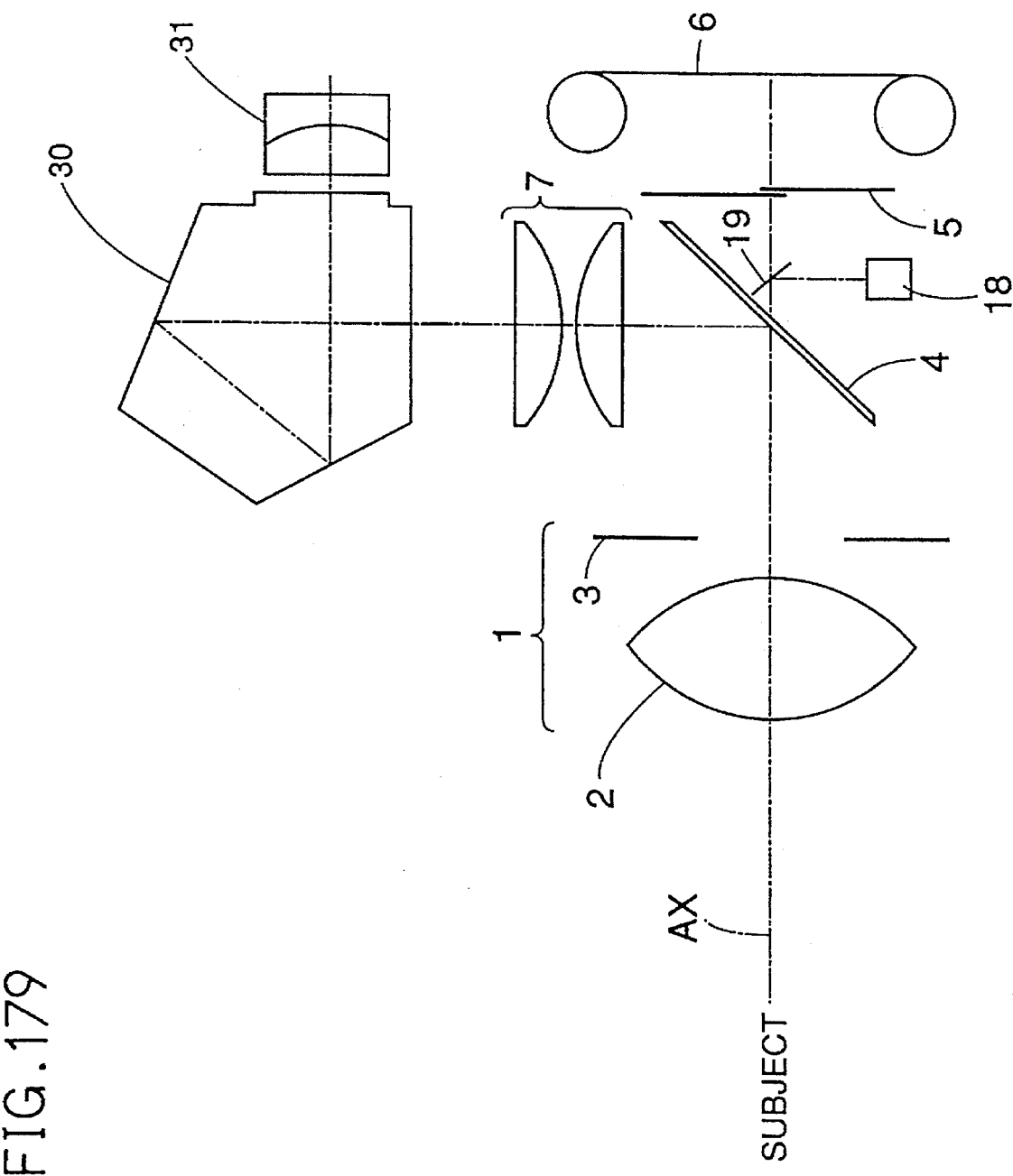
Figure 180:
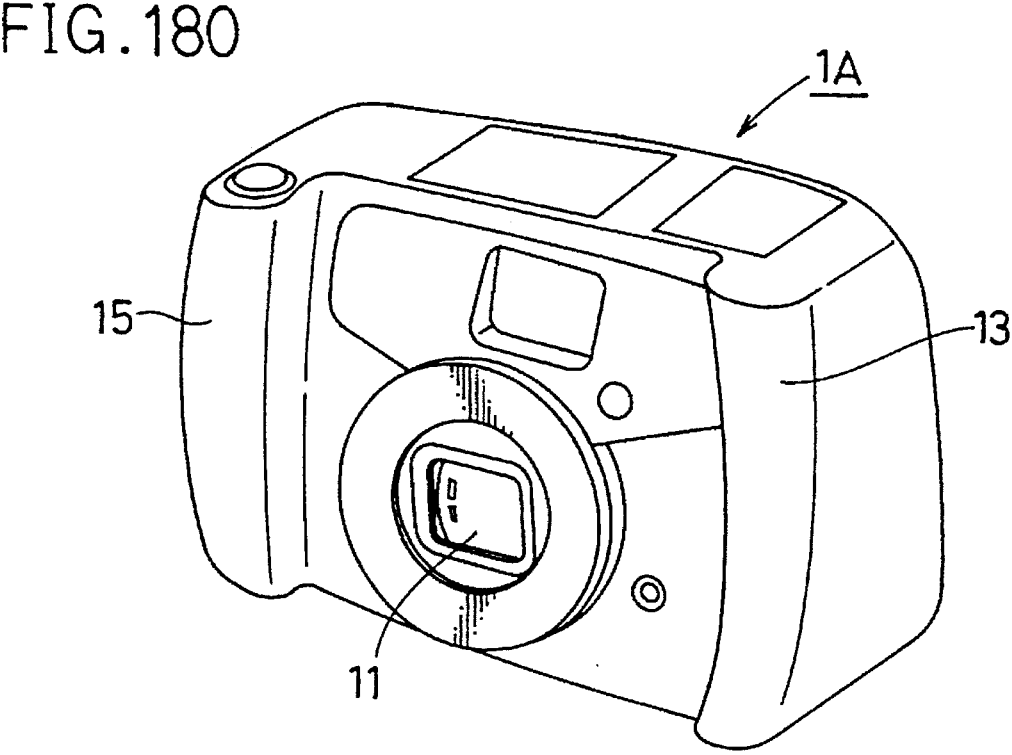
Figure 181:
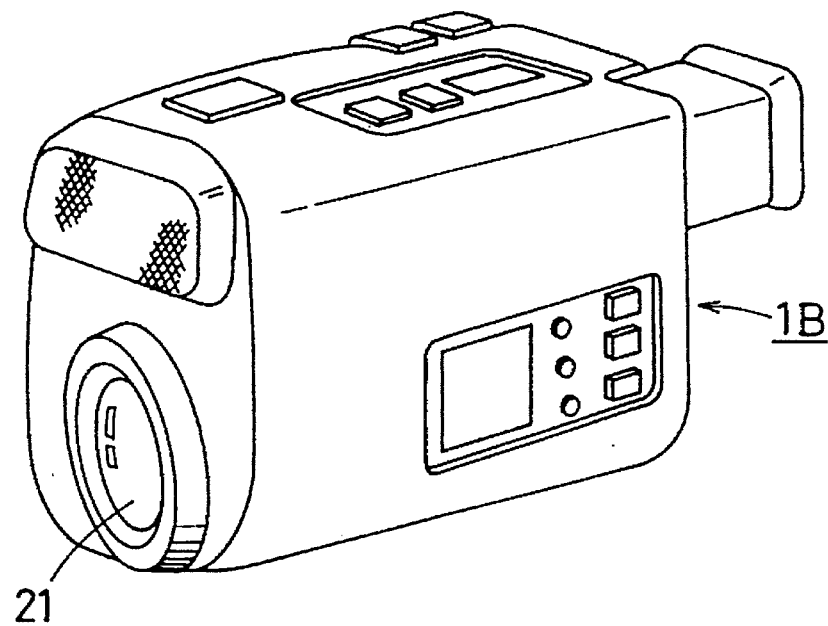
Figure 182:
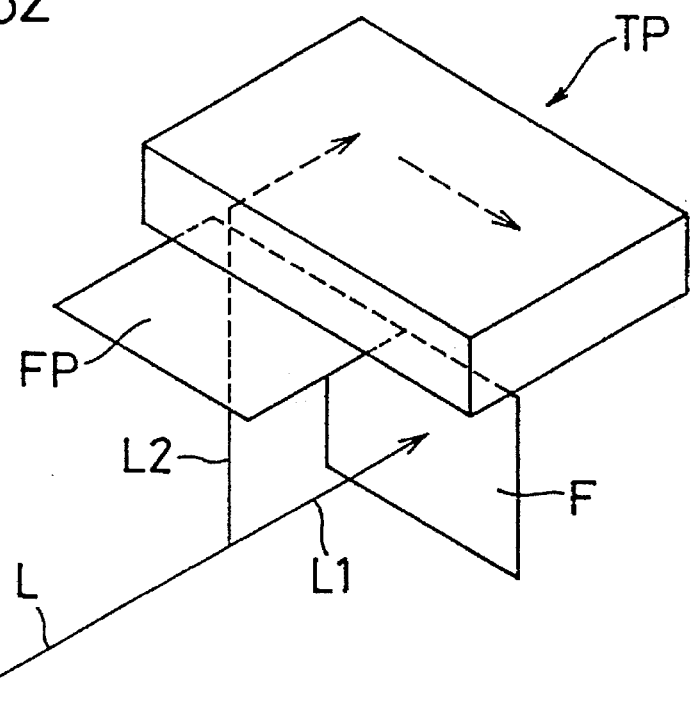
Figure 183:
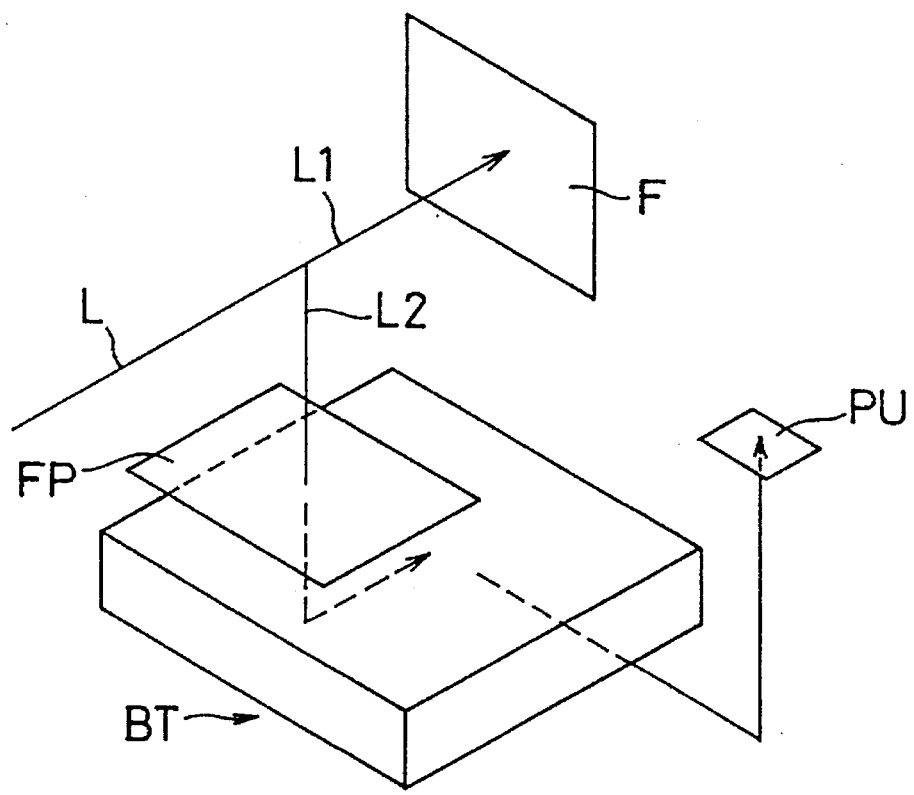
Figure 184:
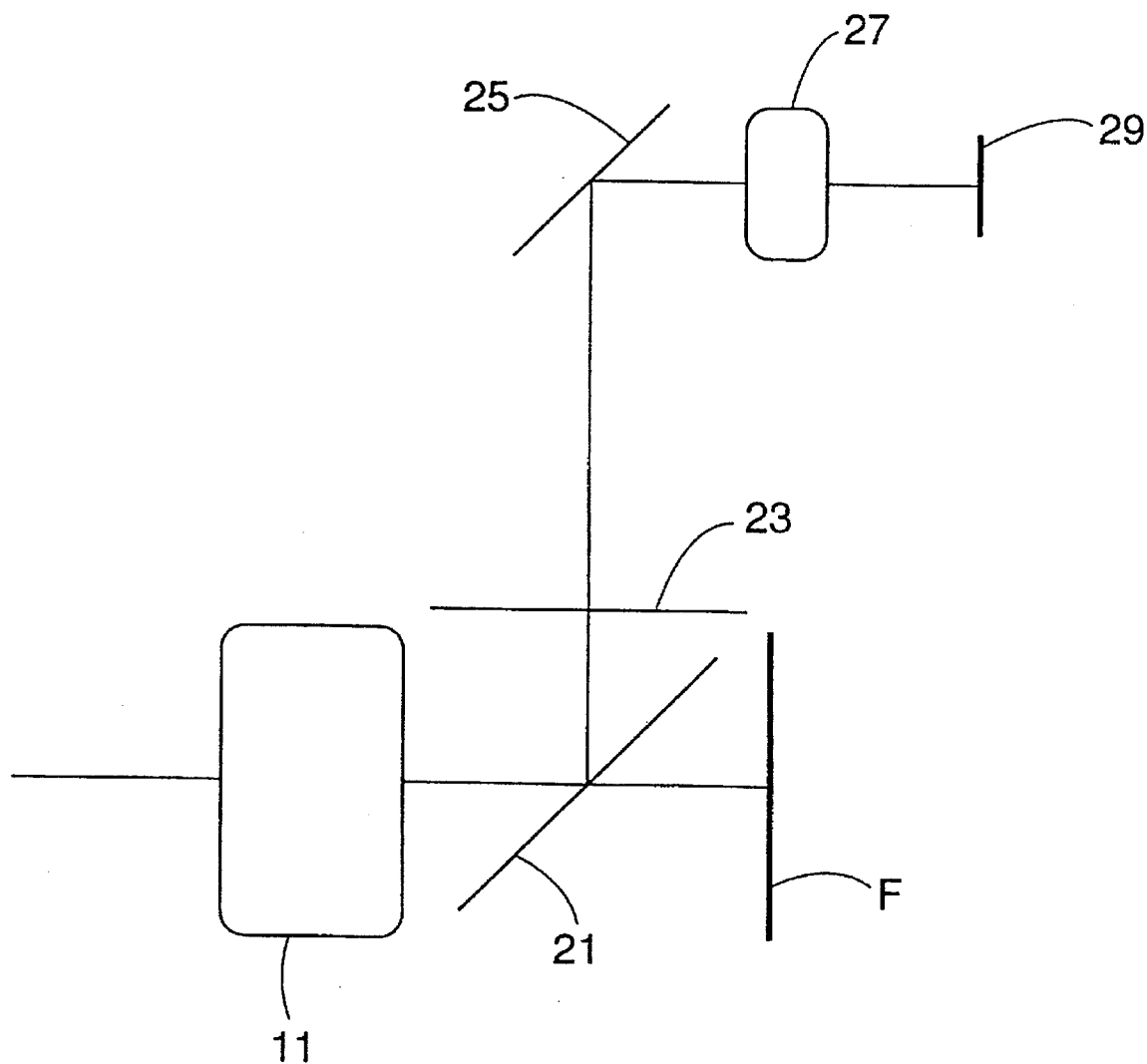
Figure 185:
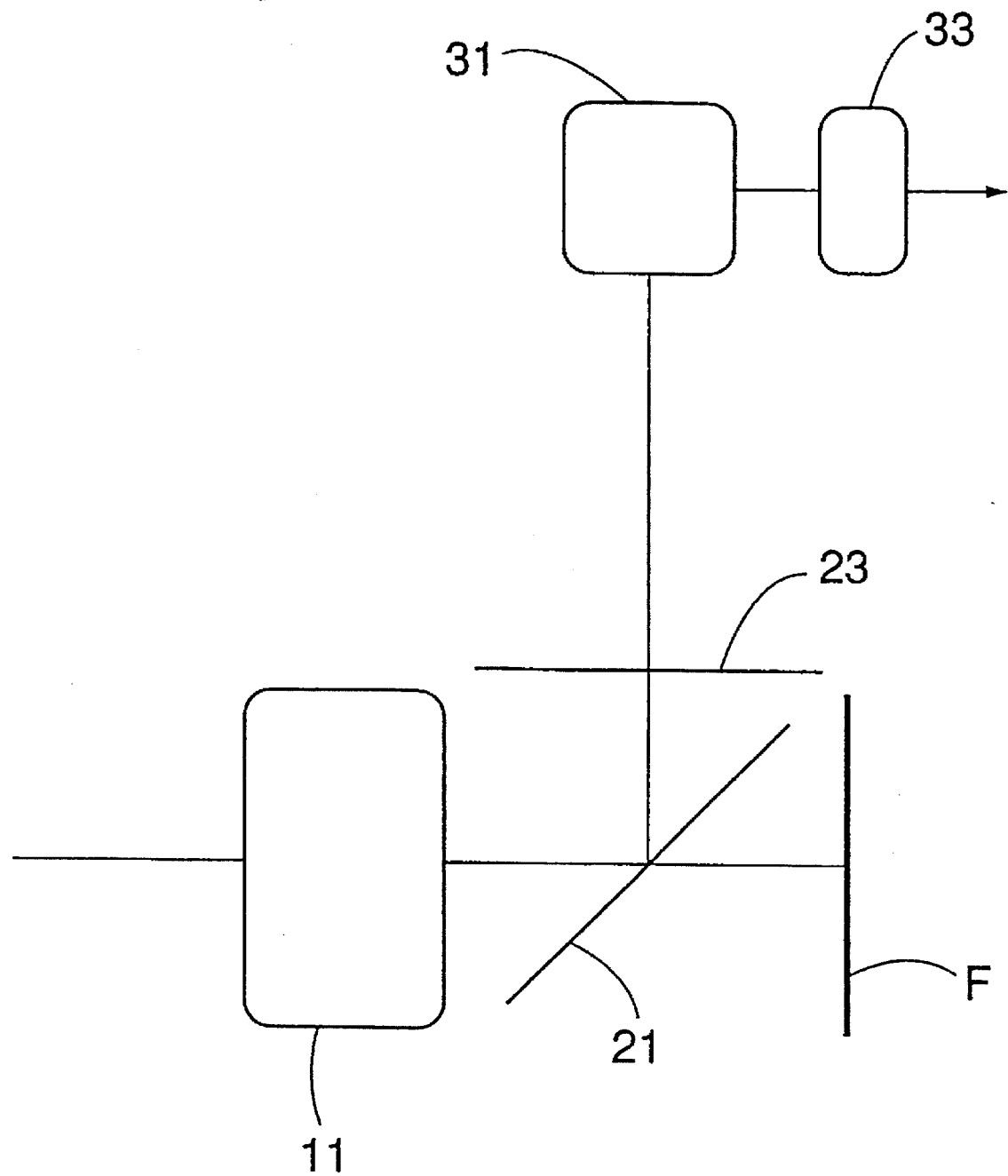
Figure 193:
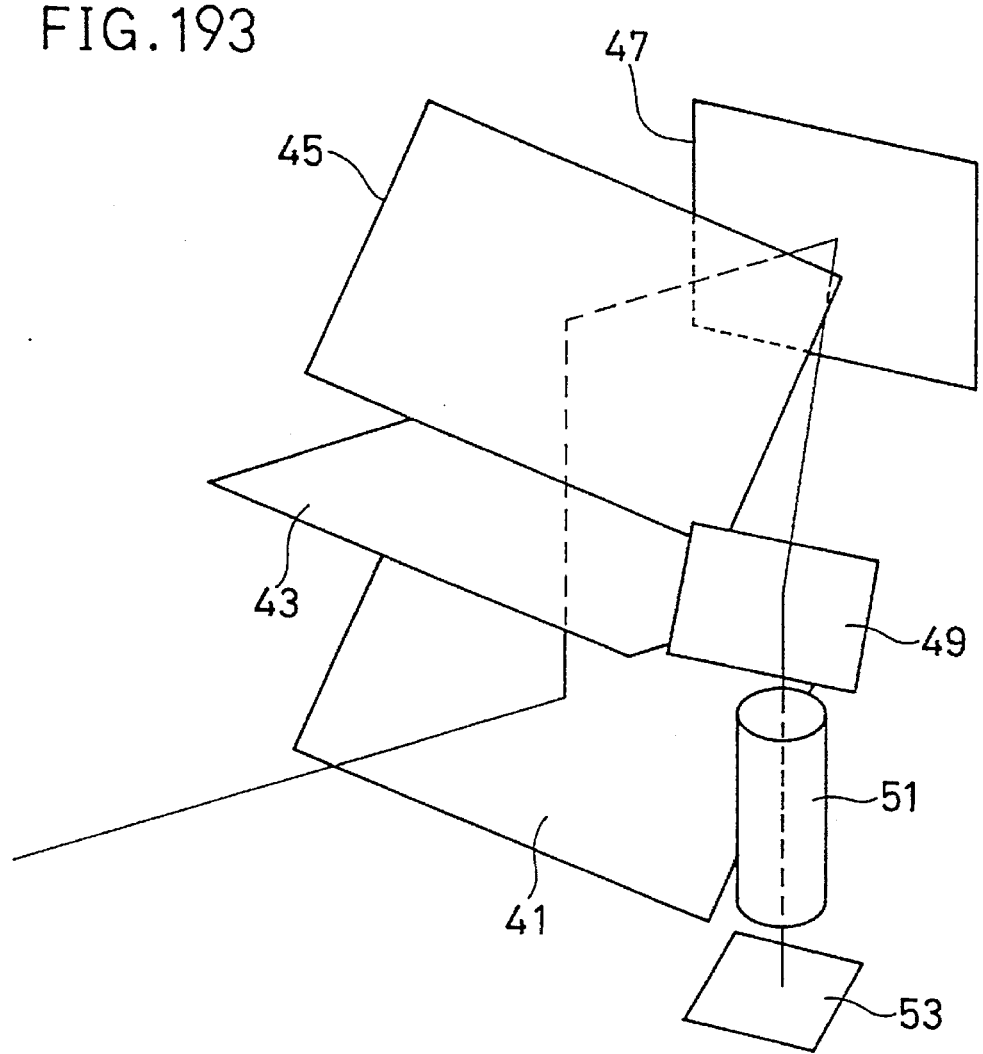
Figure 194:
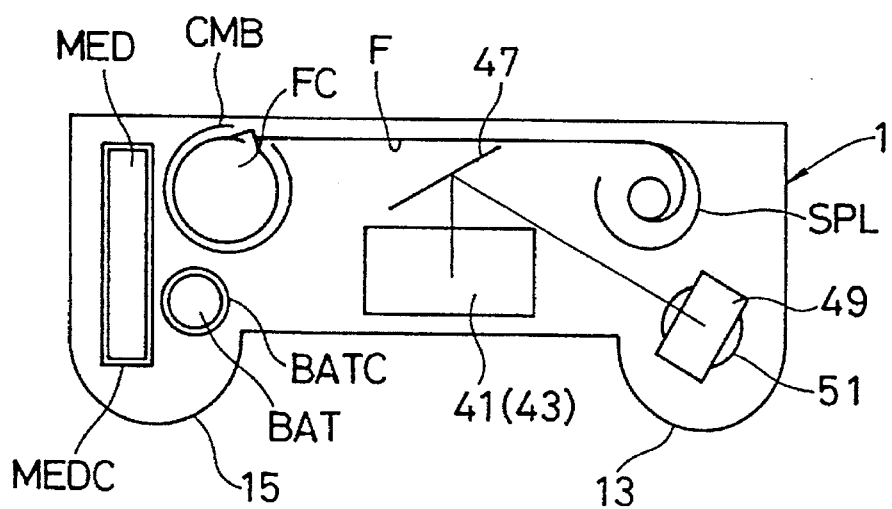
Figure 195:
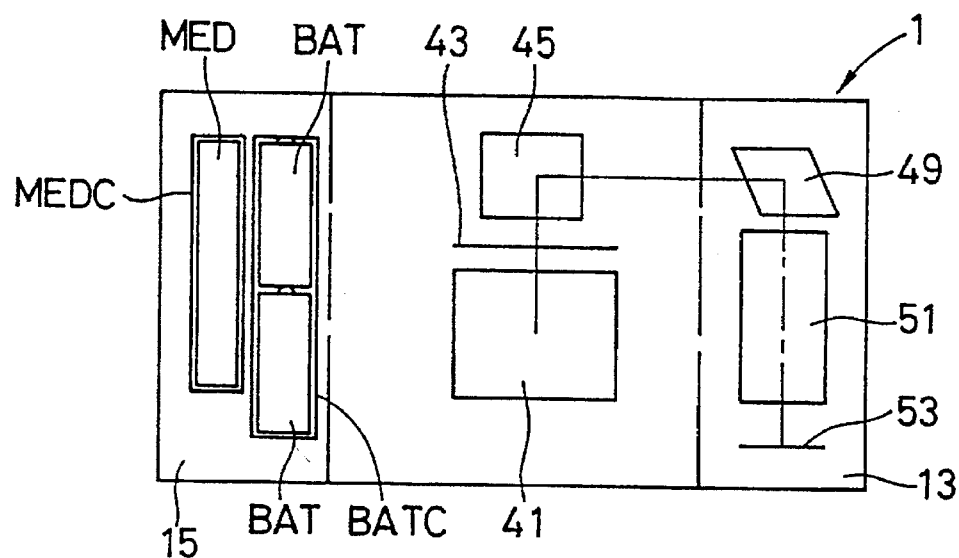
Figure 196:
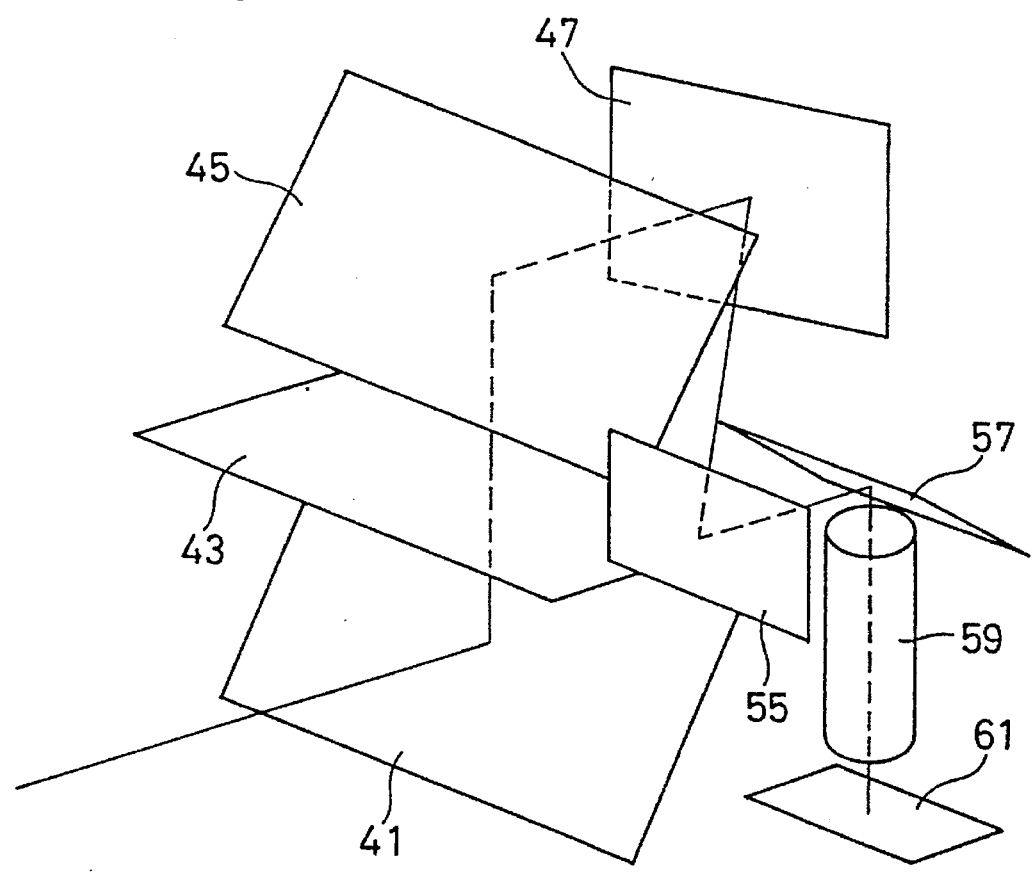
Figure 197:
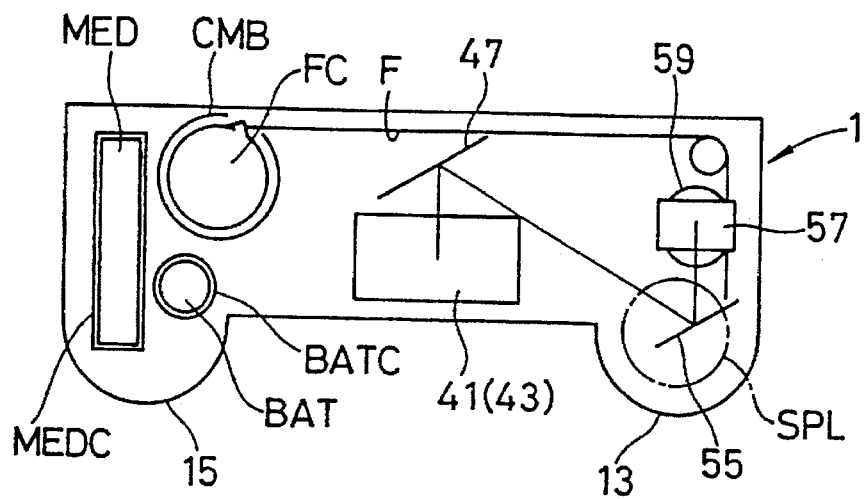
Figure 198:
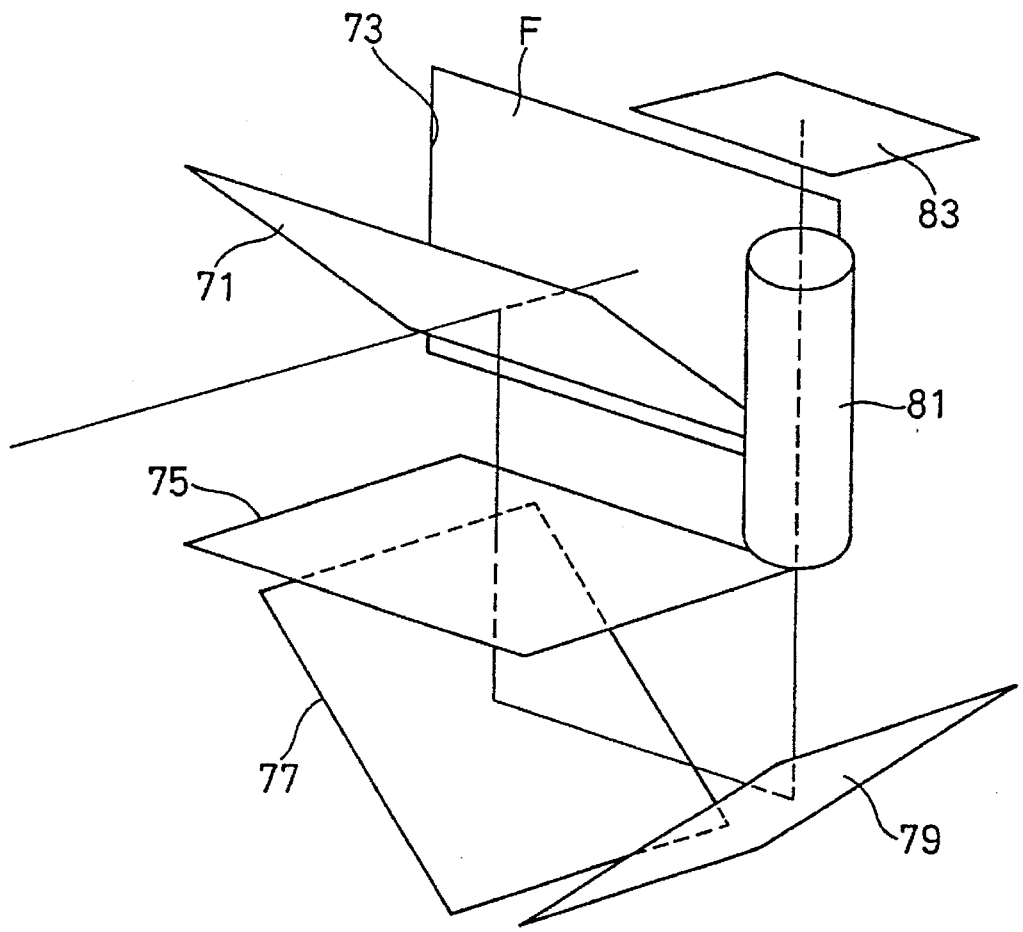
Figure 199:
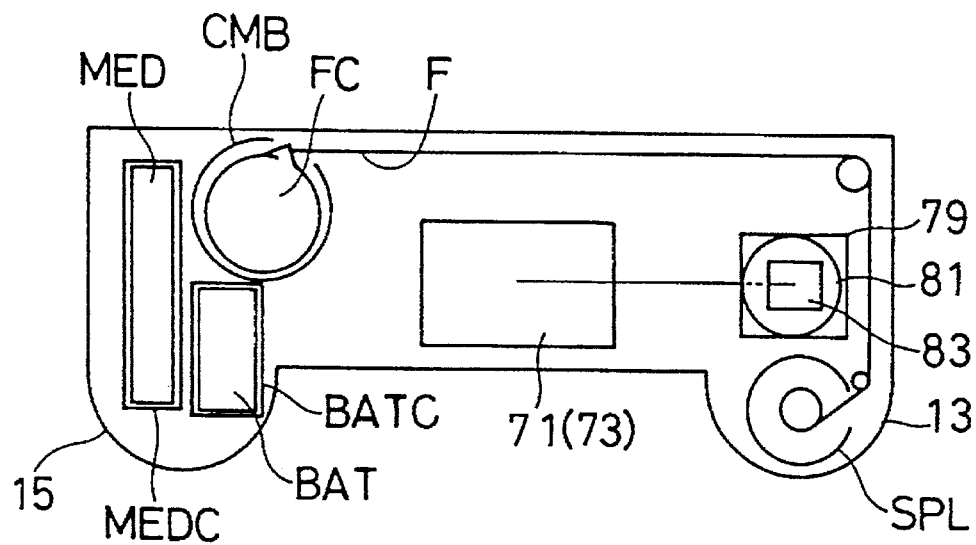
Figure 200:
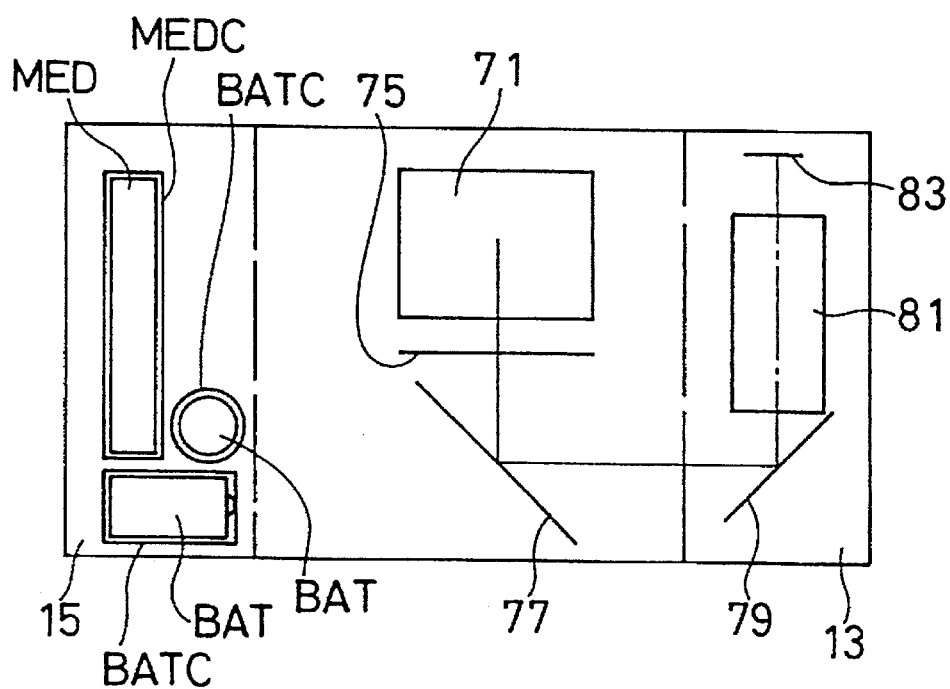
Figure 201:
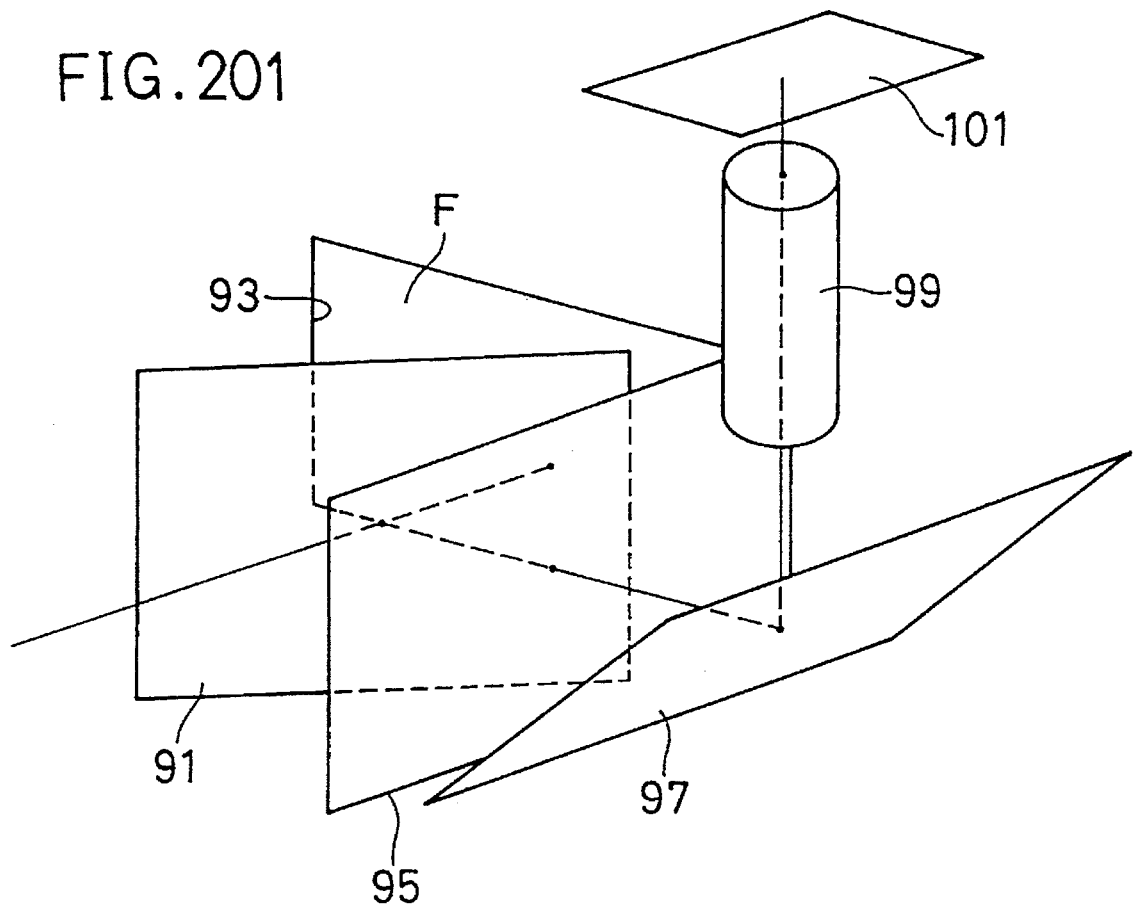
Figure 202:
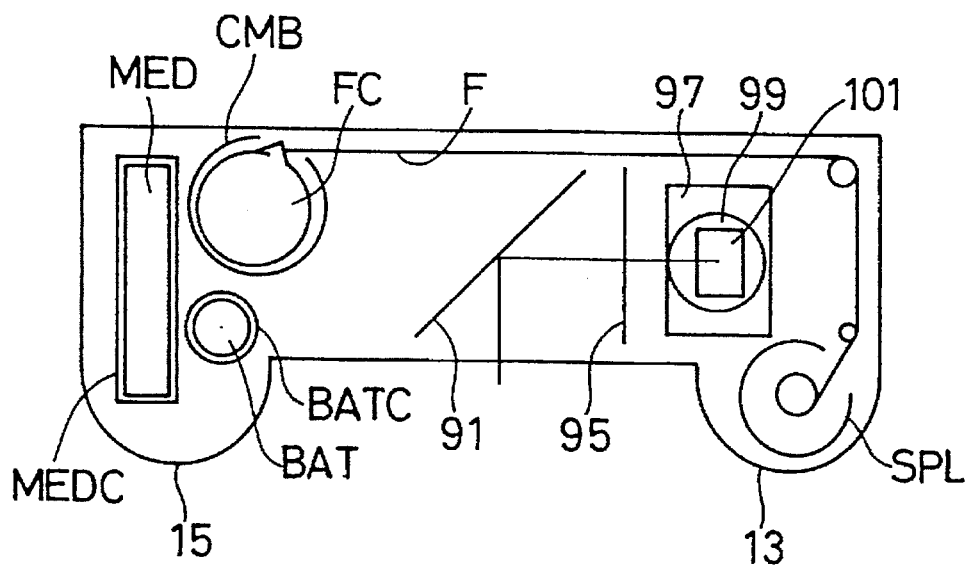
Figure 203:
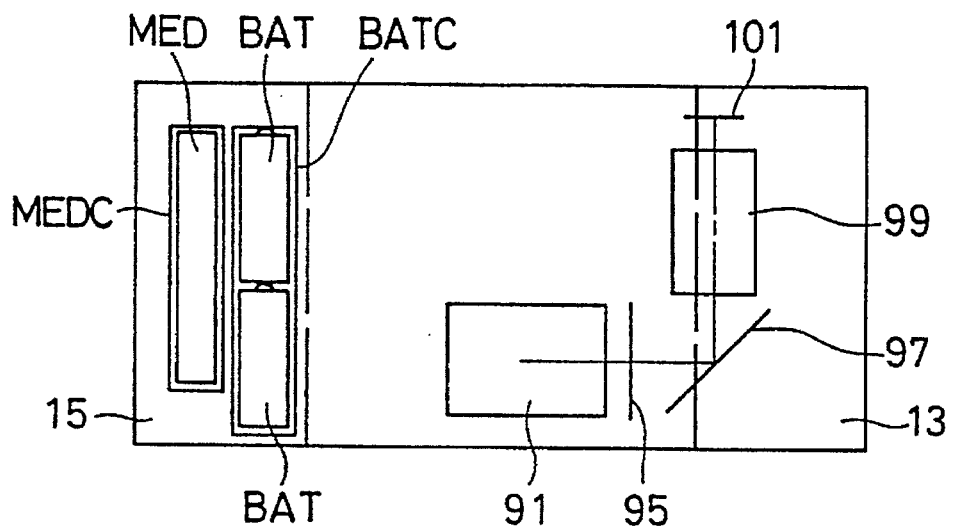
Figure 204:
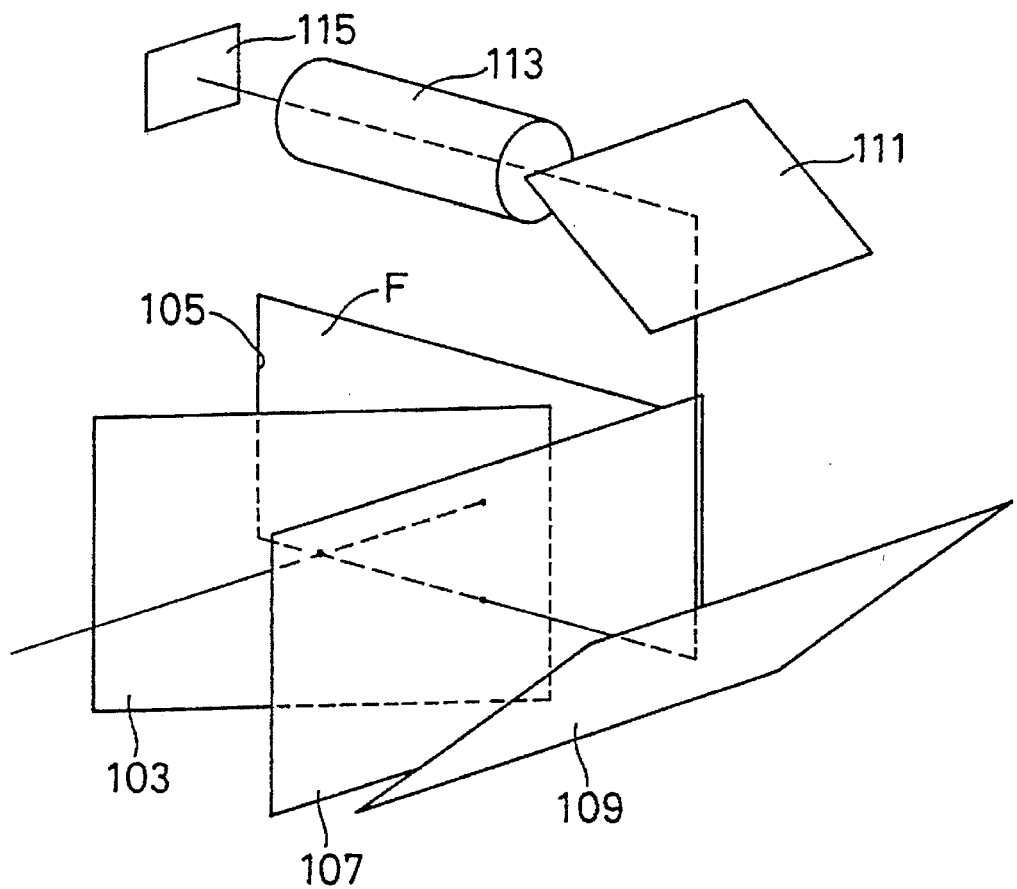
Figure 205:
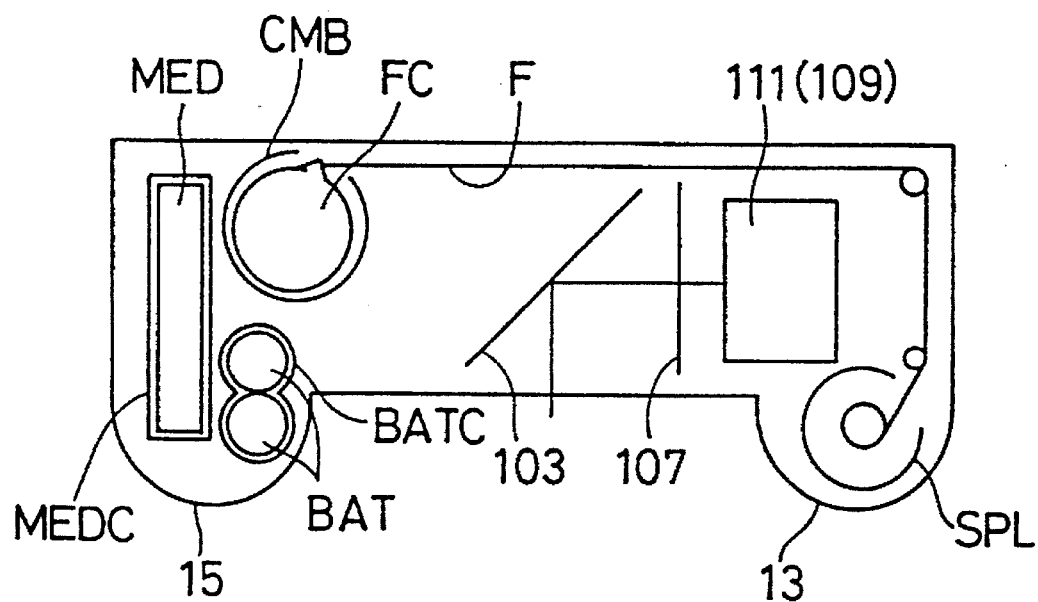
Figure 206:
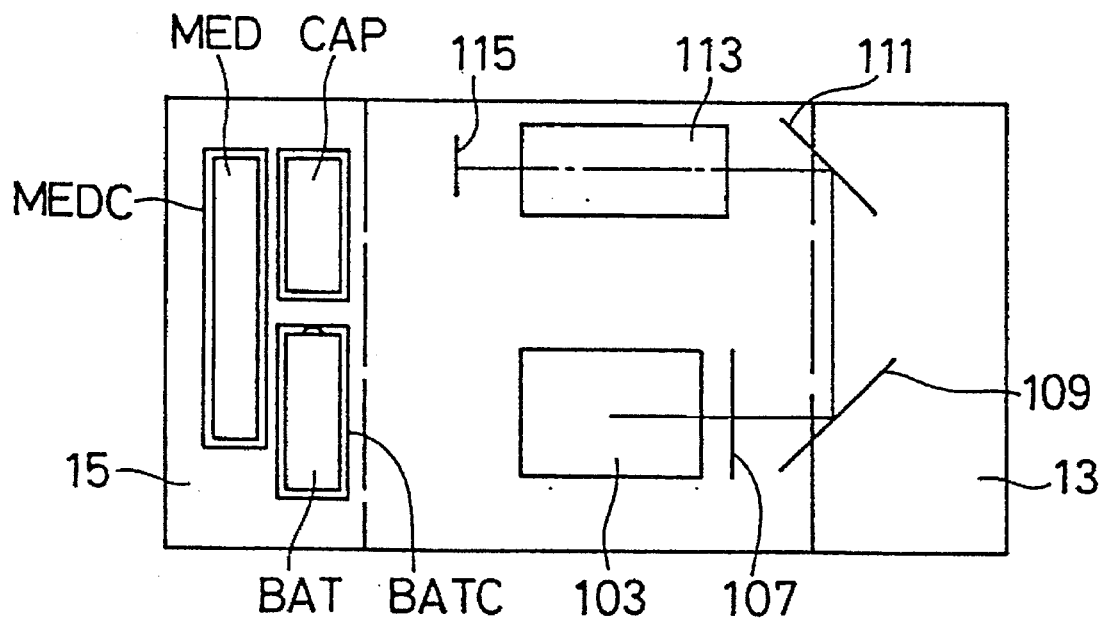
Figure 207:
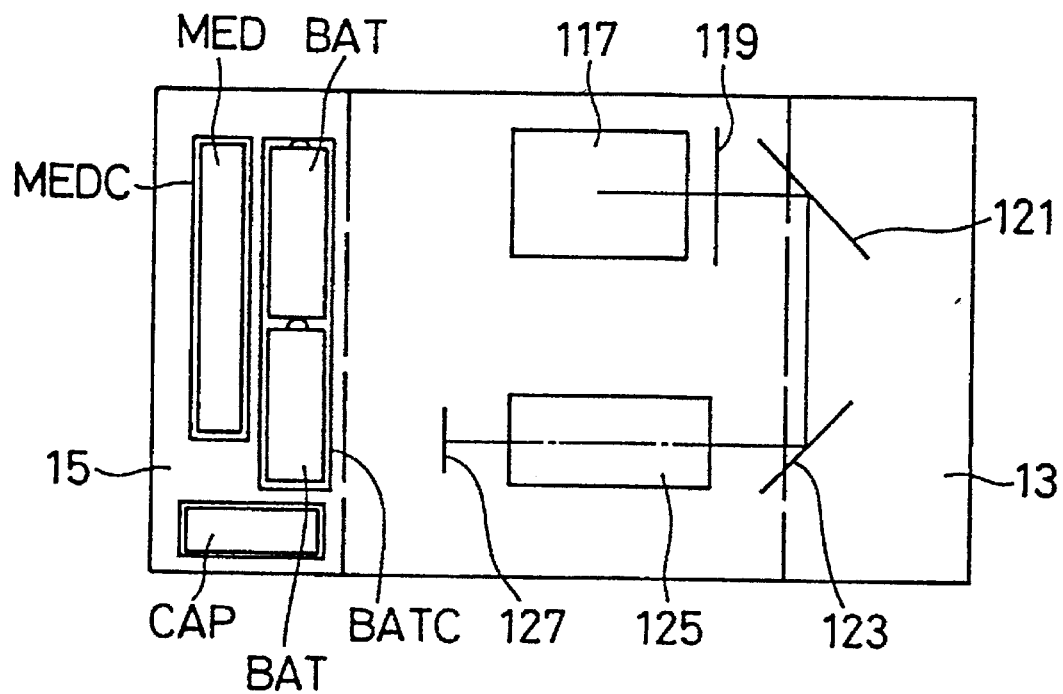
Figure 208:
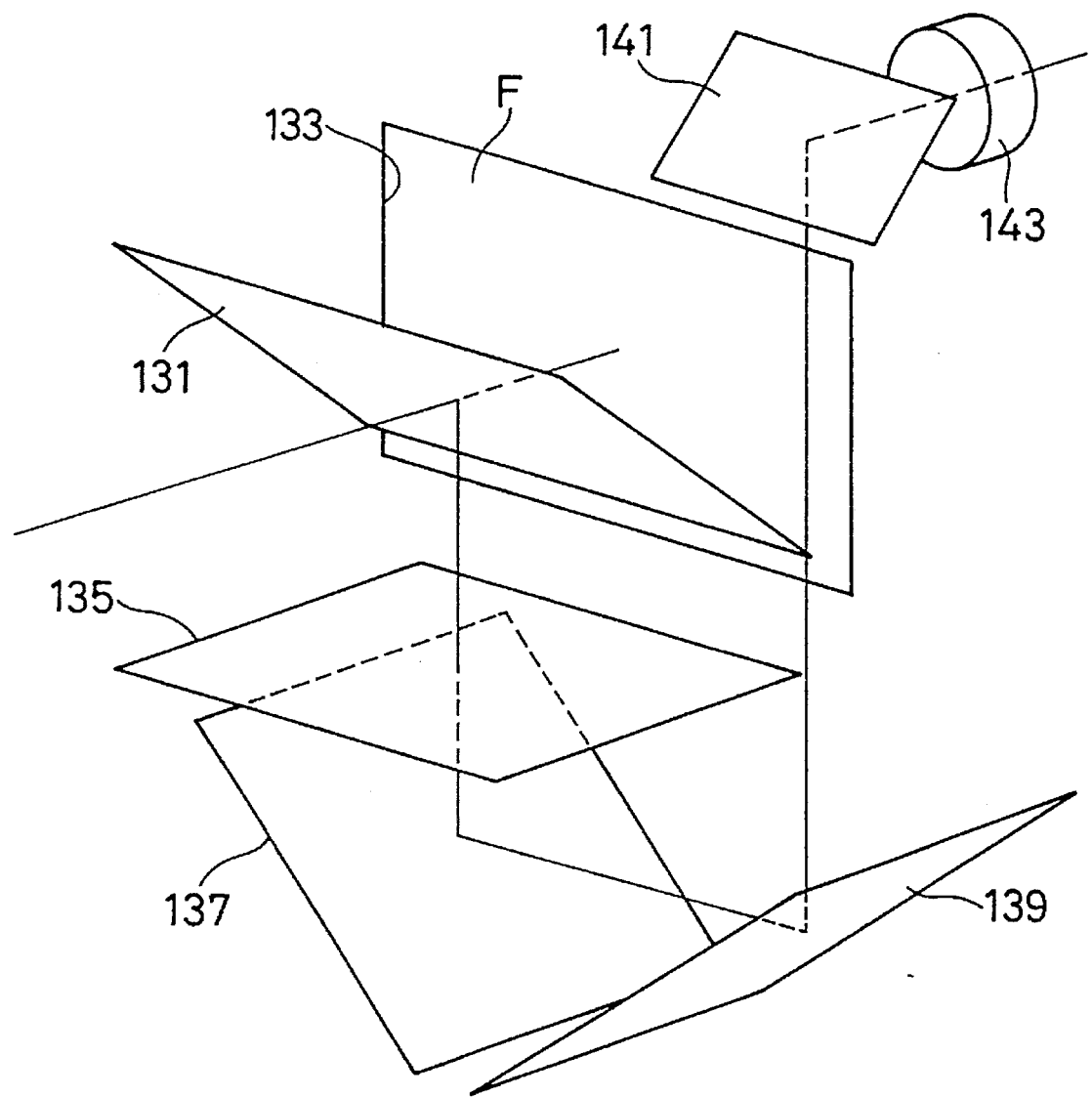
Figure 209:
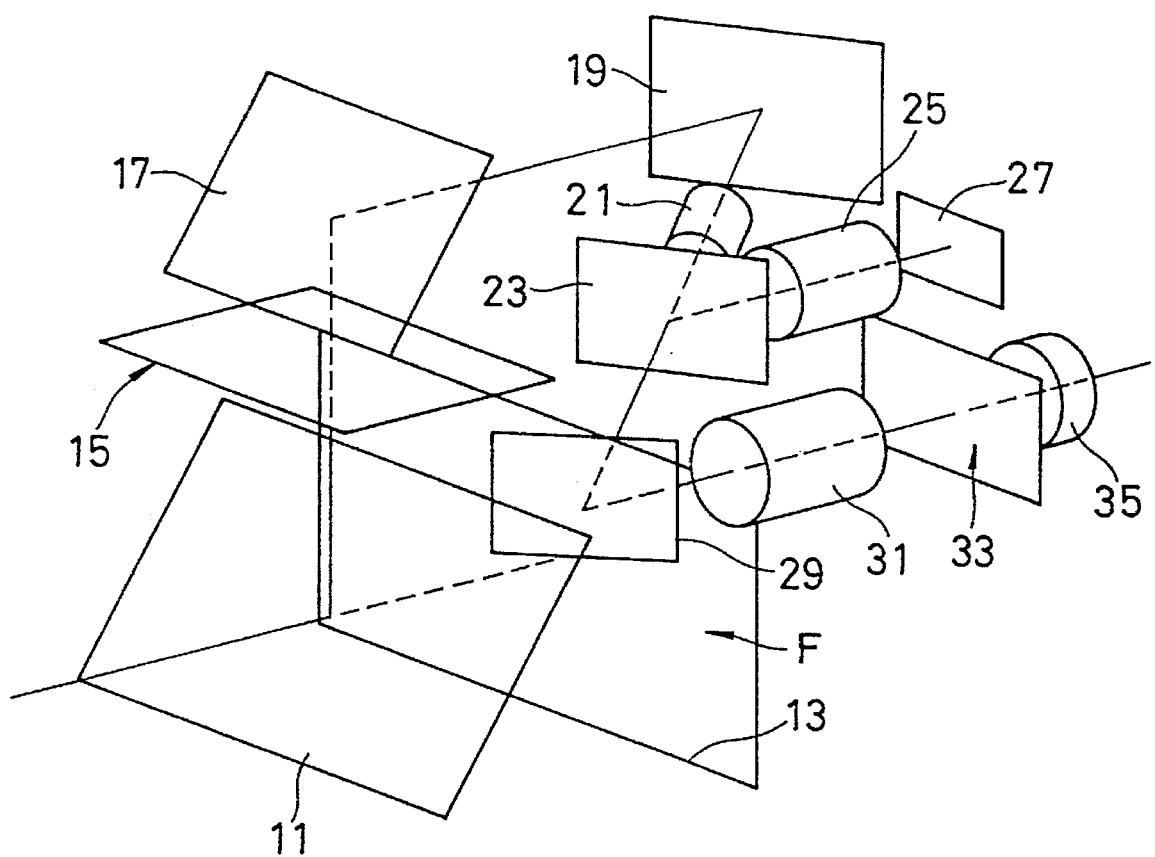
Figure 210:
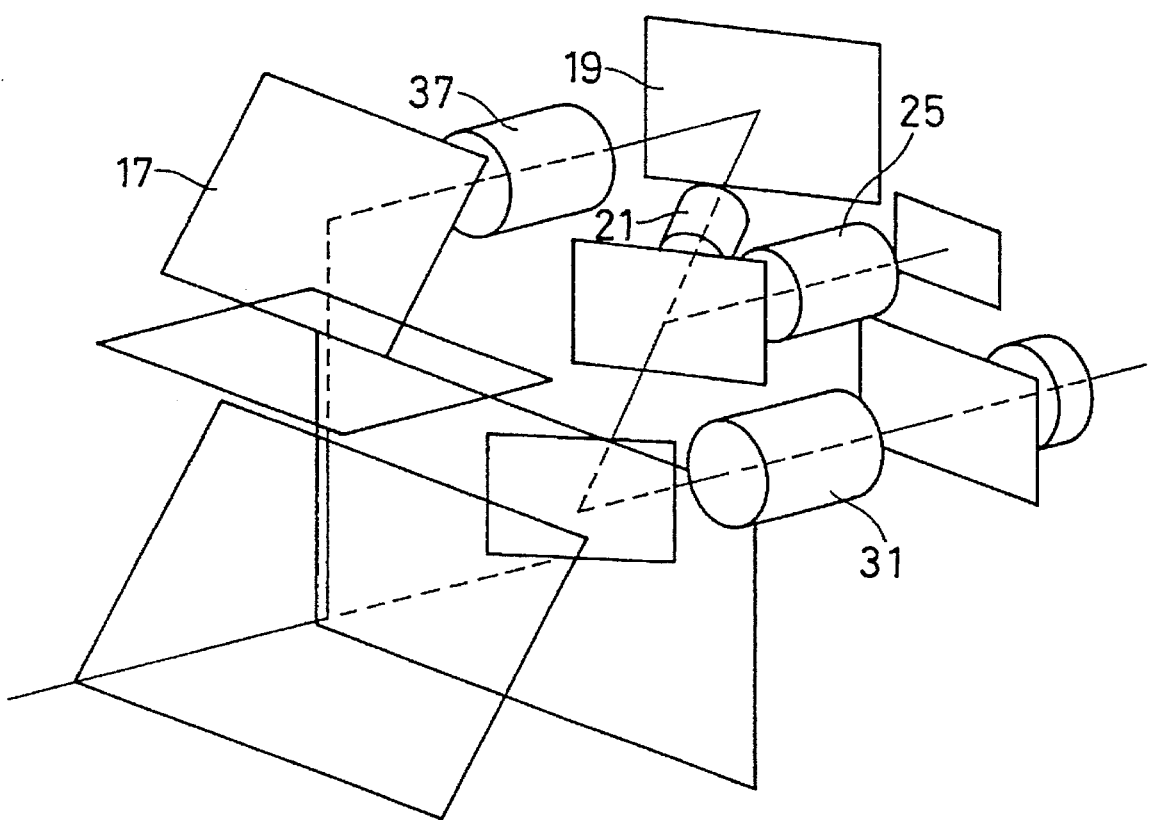
Figure 211:
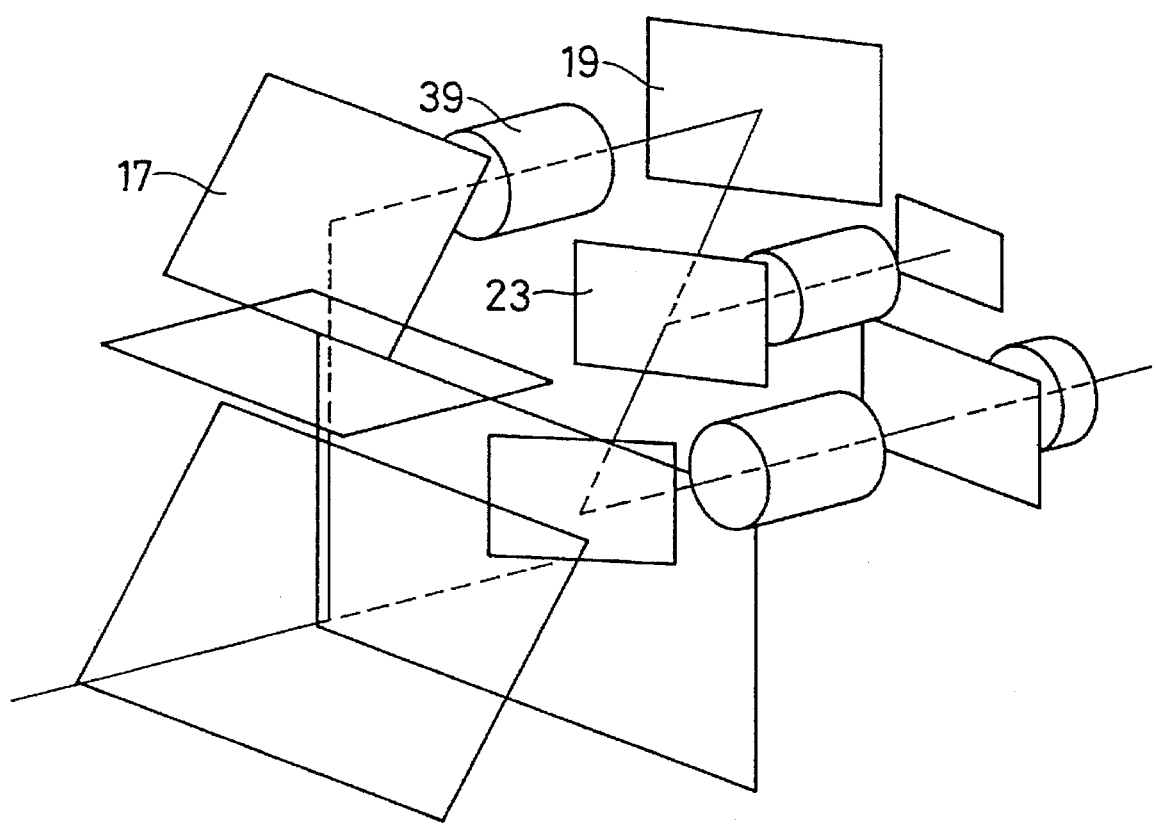
Figure 212:
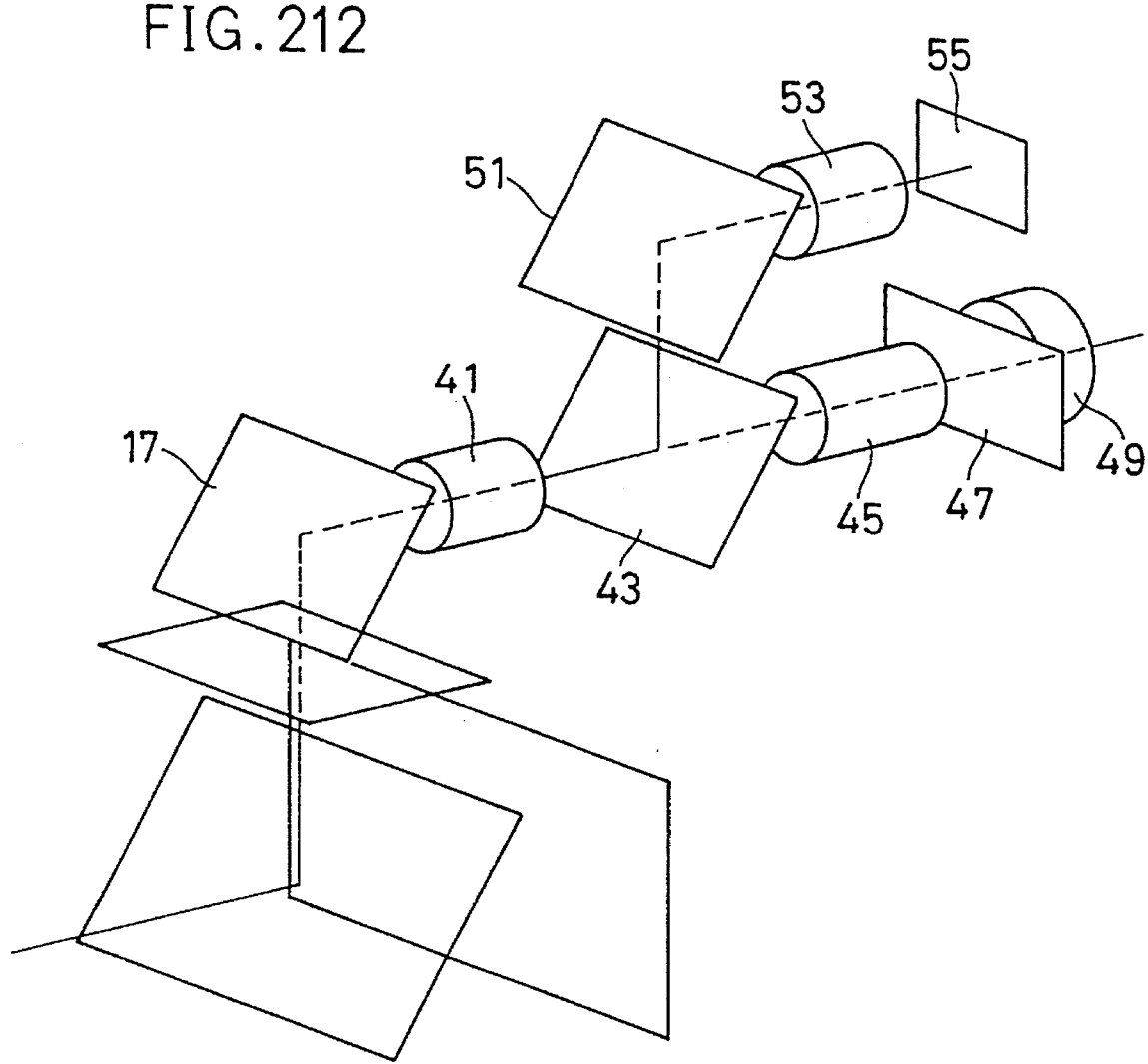
Figure 213:
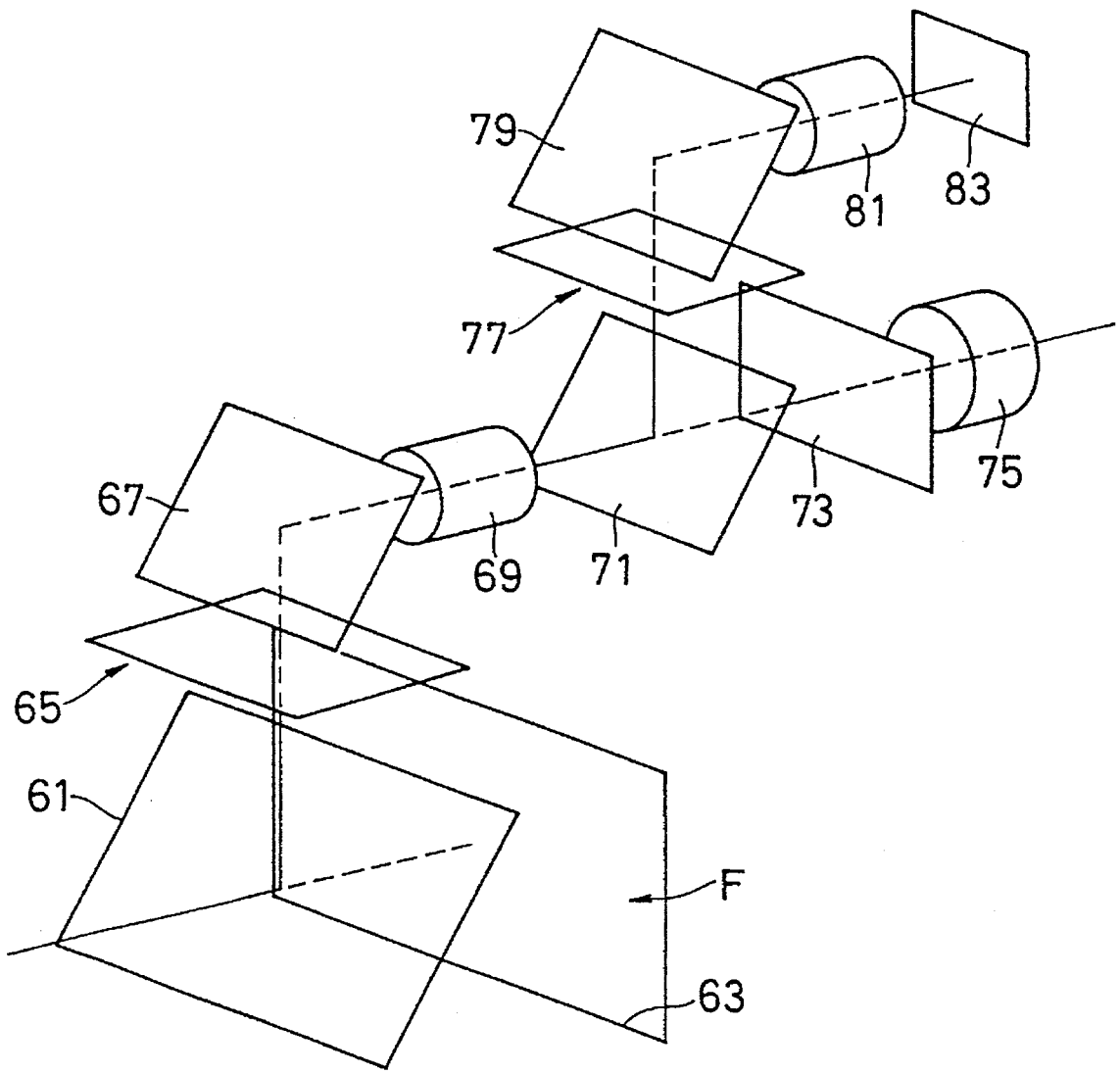
Figure 214:
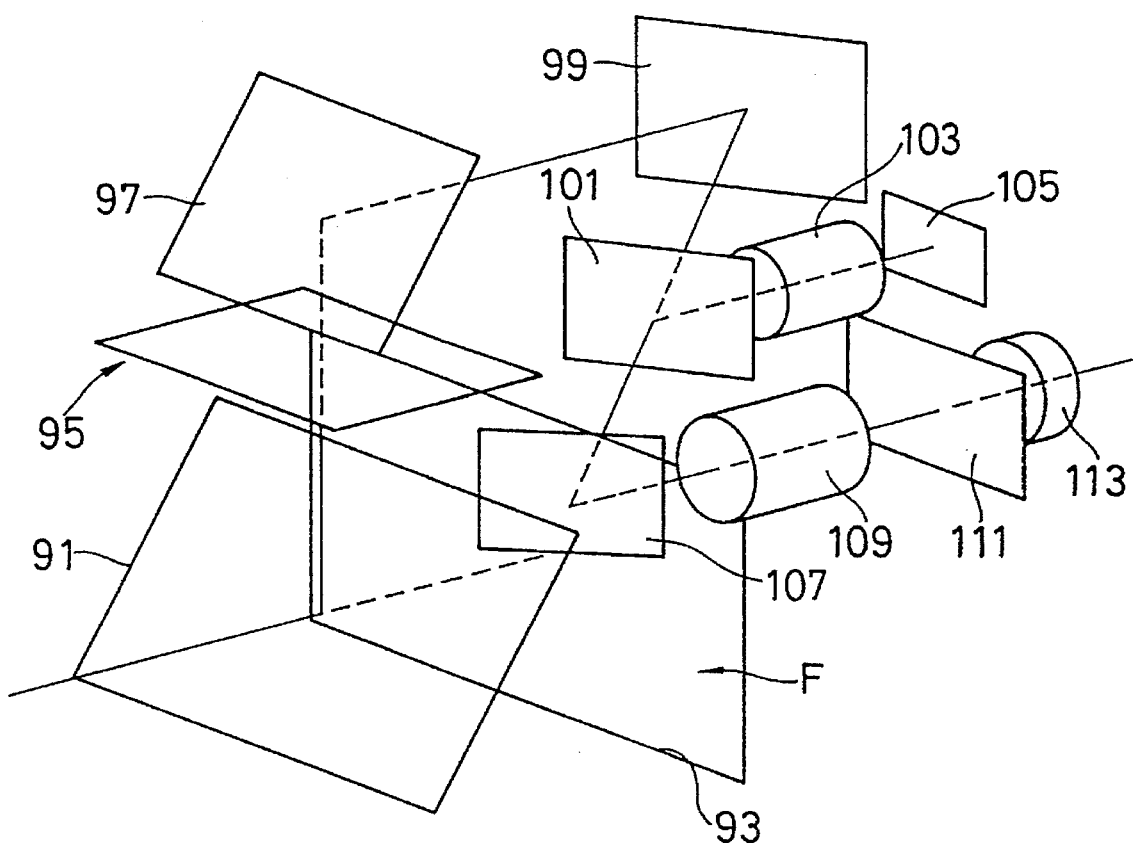
Figure 215:
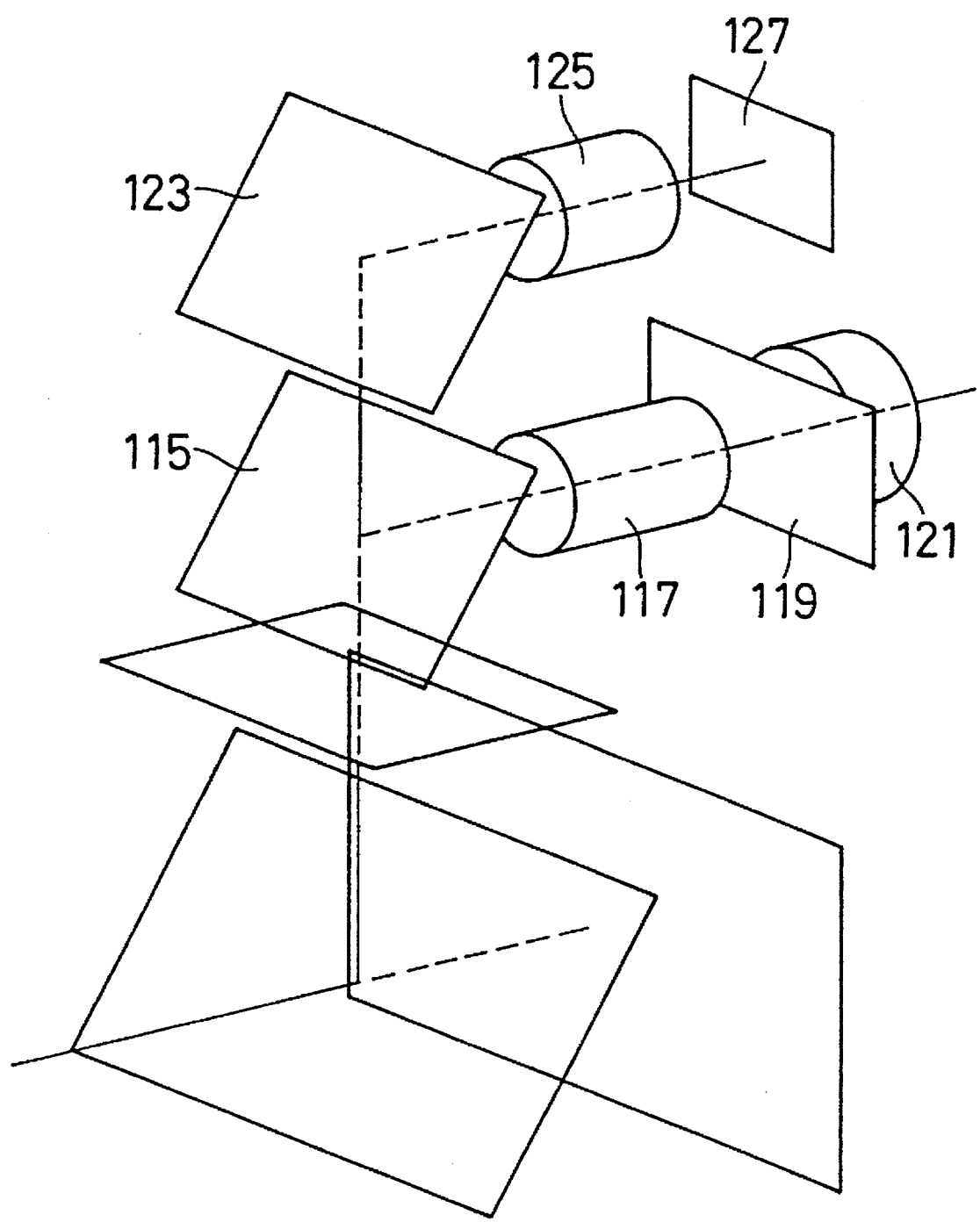
Figure 216:
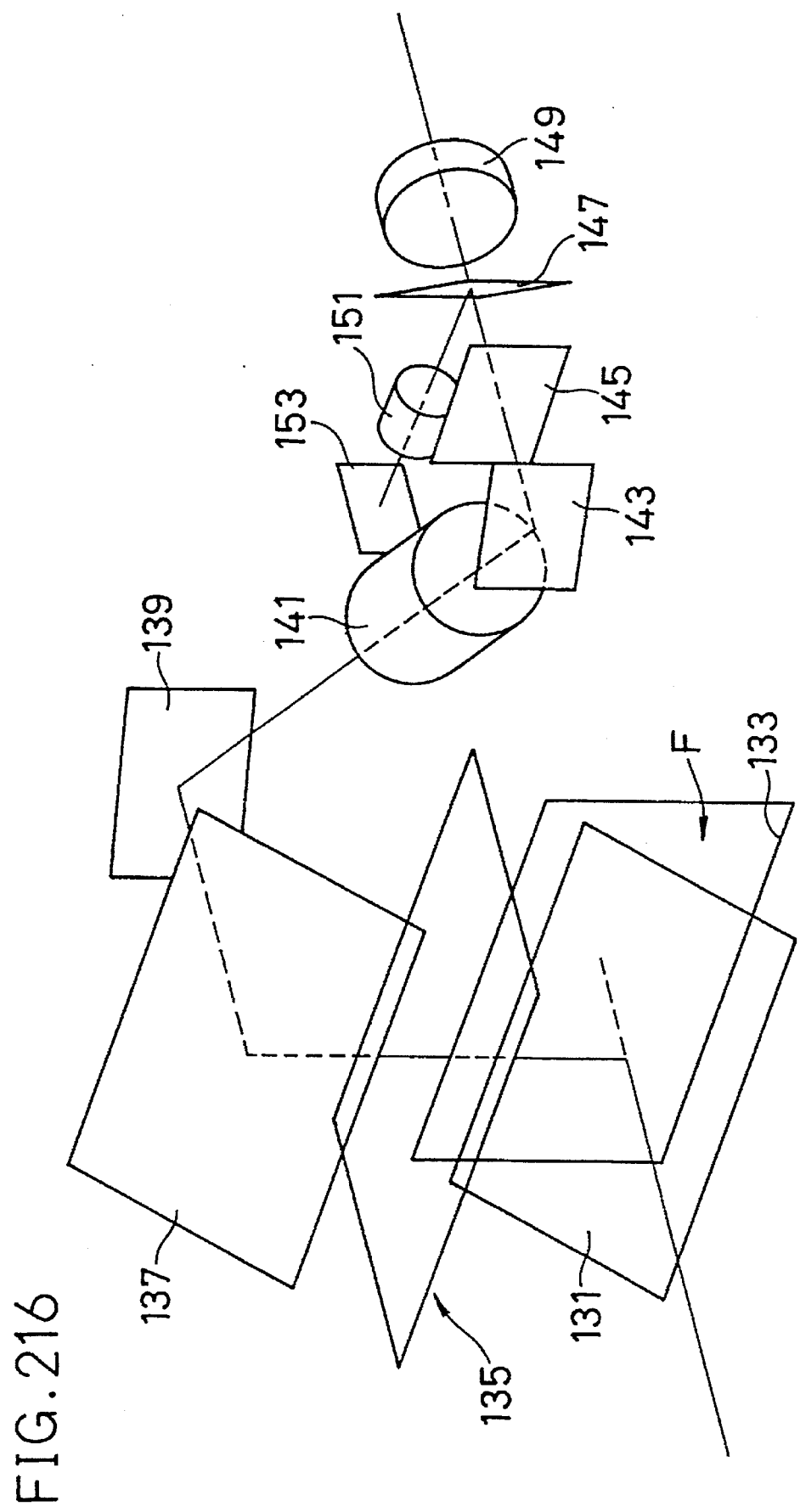
Figure 217:
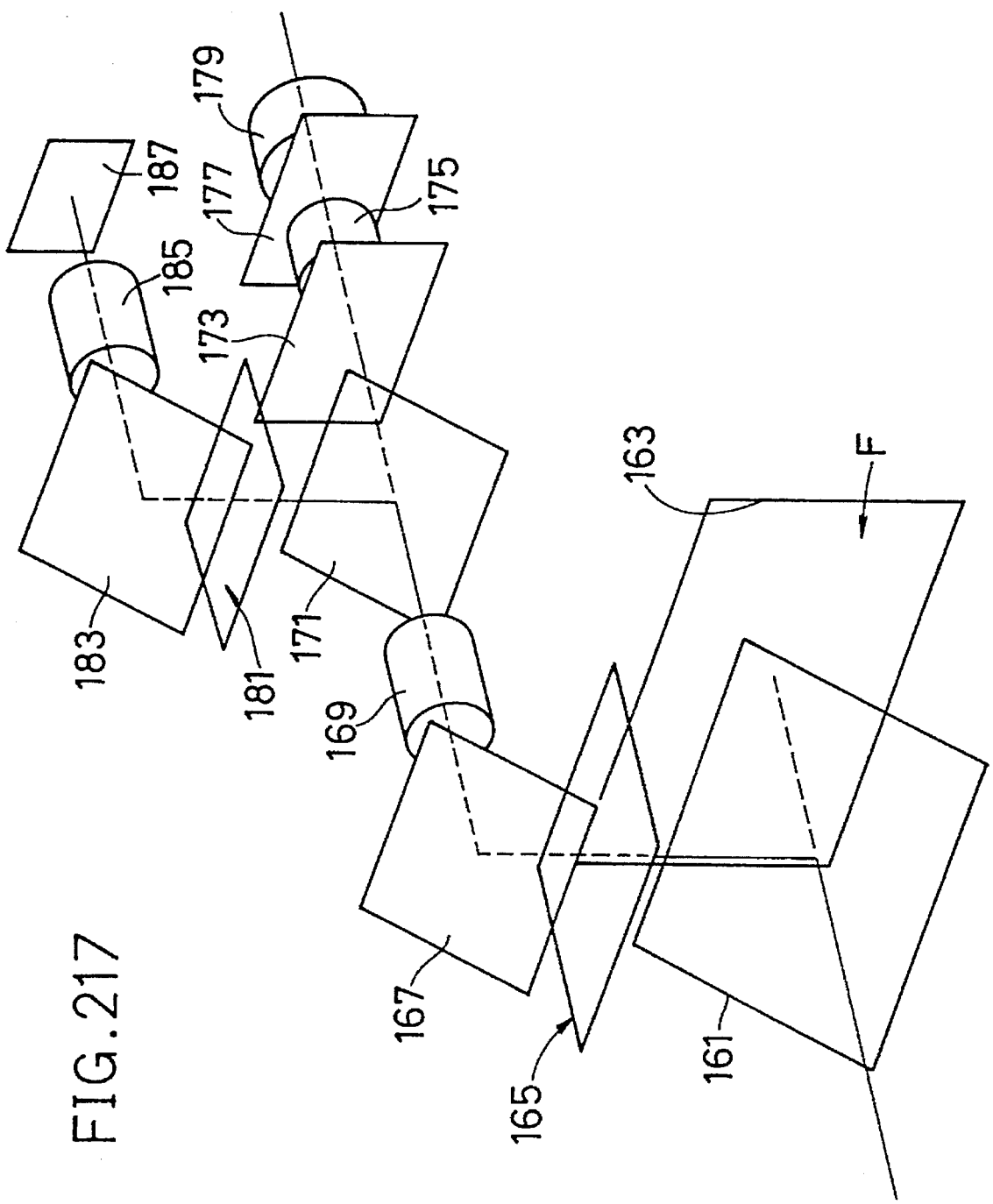
Figure 218:
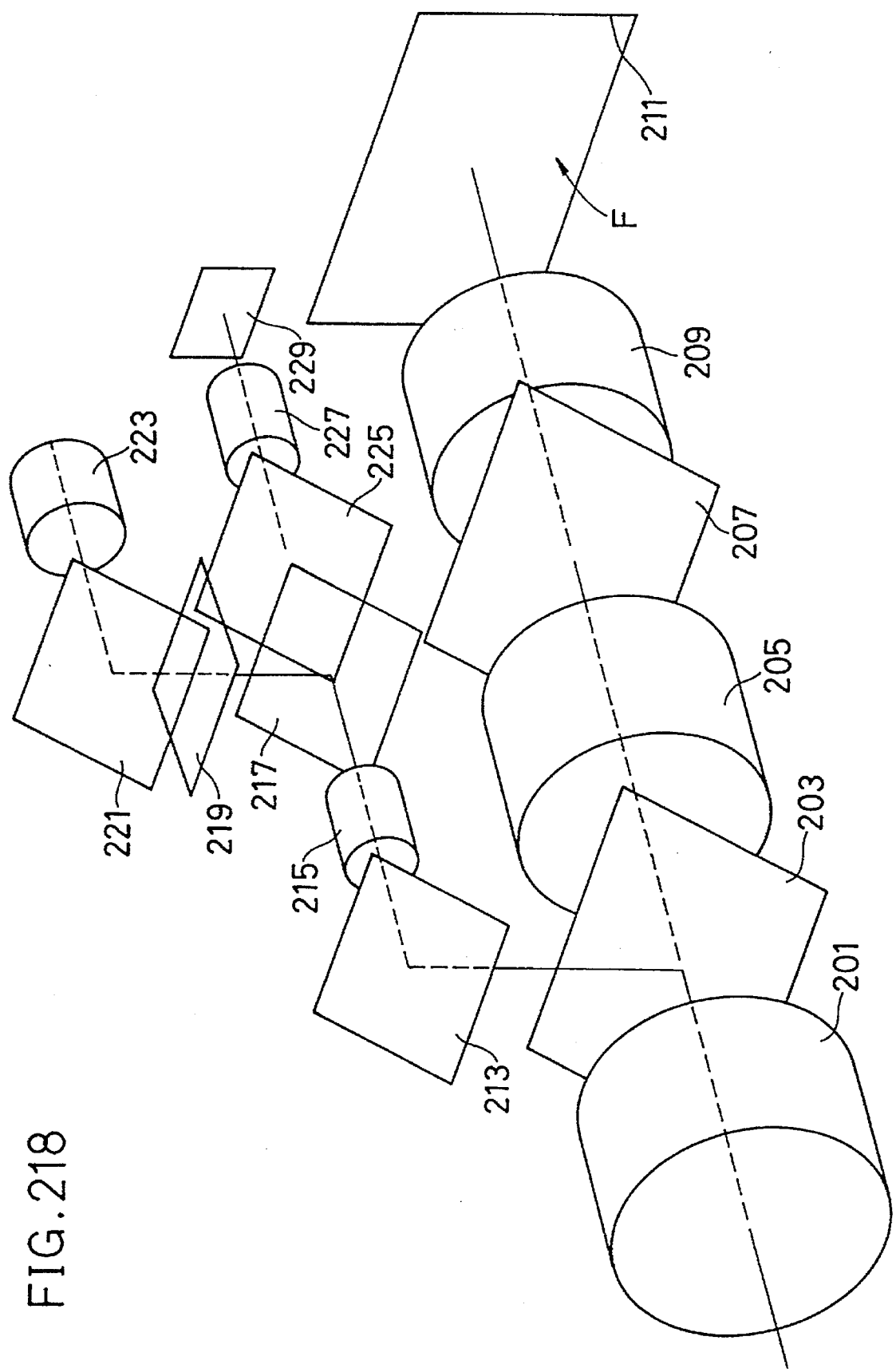
Figure 219:
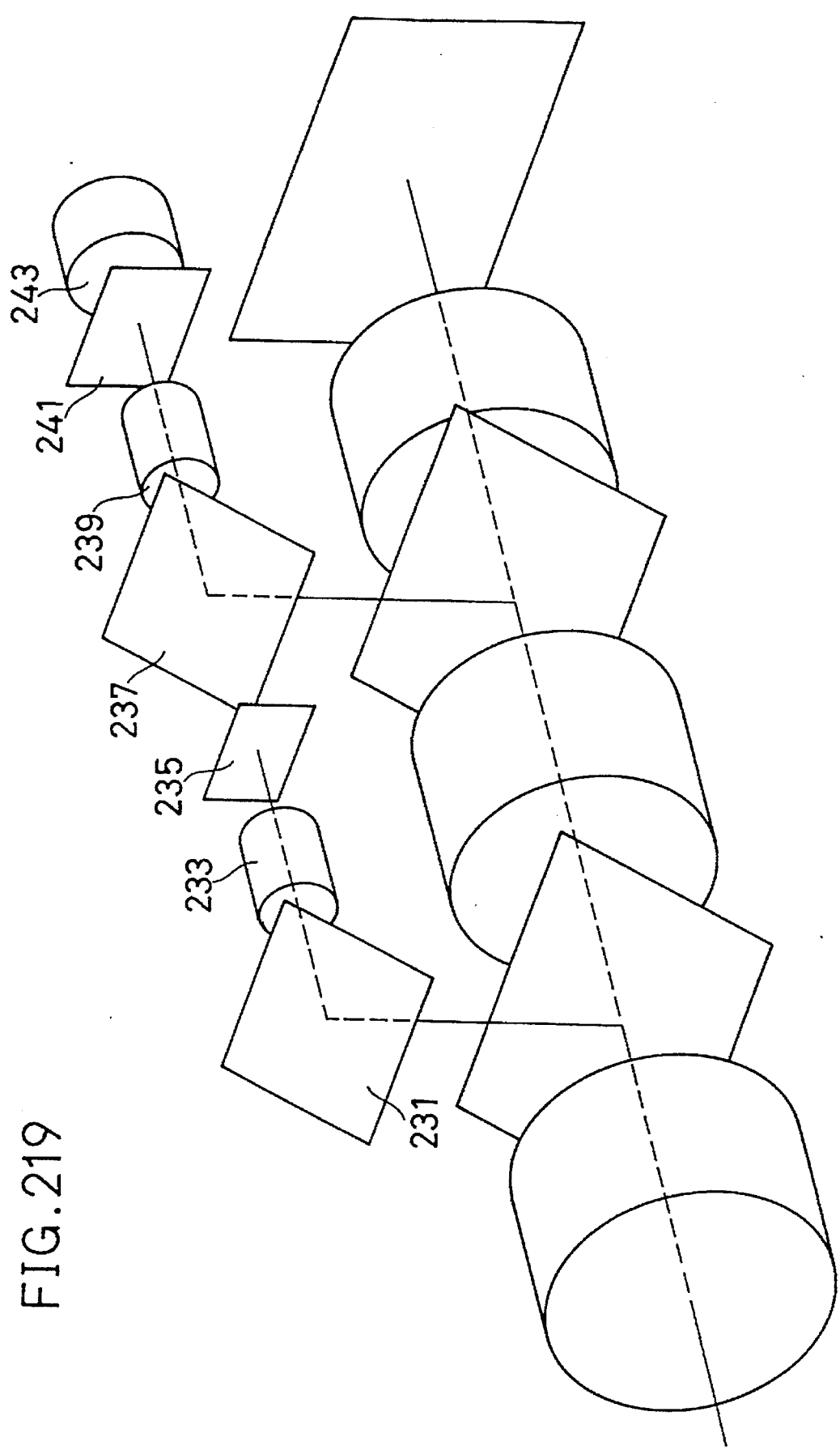
Figure 220:
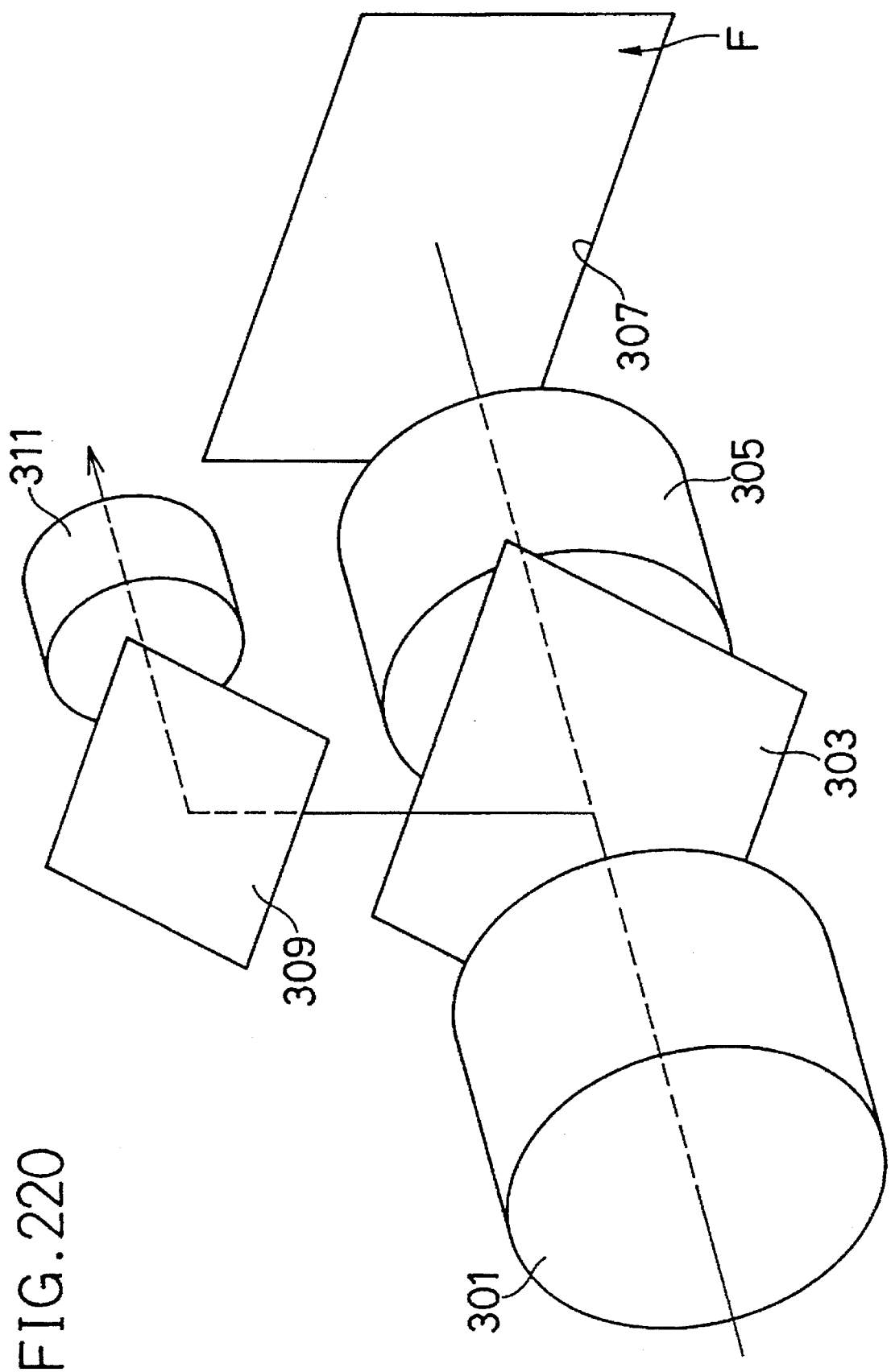

FIG. 174 is a plan view of FIG. 173;

FIG. 175 is an outline diagram of the optical system of an image taking apparatus of the thirty-third embodiment;

FIG. 176 is a flow chart showing the operation of an image taking apparatus of the thirty-third embodiment;

FIG. 177 is a cross-sectional view, along the optical axis, of the principal portion of an image taking apparatus of the thirty-fourth embodiment of the present invention;

FIG. 178 is a cross-sectional view, along the optical axis, of the principal portion of an image taking apparatus of the thirty-fifth embodiment of the present invention;

FIG. 179 is an outline construction diagram of the optical system of a still camera, in which the subject image of the second light beam having passed through the condenser lens is reversed by a pentaprism and enlarged by an eyepiece;

FIGS. 180 and 181 are external views of a camera of the thirty-sixth to forty-ninth embodiments of the present invention;

FIGS. 182 and 183 are outline diagrams of examples of construction for the thirty-sixth to forty-ninth embodiments;

FIGS. 184 and 185 are outline diagrams of other examples of construction for the thirty-sixth to forty-ninth embodiments;

FIGS. 186, 187, 188, 189, 190, 191 and 192 are outline diagrams of still other examples of construction for the thirty-sixth to forty-ninth embodiments;

FIGS. 193 to 195 are diagrams showing the internal construction of a thirty-sixth embodiment;

FIGS. 196 and 197 are diagrams showing the internal construction of a thirty-seventh embodiment;

FIGS. 198 to 200 are diagrams showing the internal construction of a thirty-eighth embodiment;

FIGS. 201 to 203 are diagrams showing the internal construction of a thirty-ninth embodiment;

FIGS. 204 to 206 are diagrams showing the internal construction of a fortieth embodiment;

FIG. 207 is a diagram showing the internal construction of a forty-first embodiment;

FIG. 208 is a diagram showing the internal construction of a forty-second embodiment;

FIG. 209 is a diagram showing the internal construction of a forty-third embodiment;

FIGS. 210 to 212 are diagrams showing modified versions of the construction shown in FIG. 209;

FIG. 213 is a diagram showing the internal construction of a forty-fourth embodiment;

FIG. 214 is a diagram showing the internal construction of a forty-fifth embodiment;

FIG. 215 is a diagram showing the internal construction of a modified version of the forty-fifth embodiment;

FIG. 216 is a diagram showing the internal construction of a forty-sixth embodiment;

FIG. 217 is a diagram showing the internal construction of a forth-seventh embodiment;

FIG. 218 is a diagram showing the internal construction of a forty-eighth embodiment;

FIG. 219 is a diagram showing the internal construction of a modified version of the arrangement shown in FIG. 218; and FIG. 220 is a diagram showing the internal construction of a forty-ninth embodiment.

DESCRIPTION OF THE PREFERRED EMBODIMENTS

With reference to the drawings, an embodiment of the present invention will be described below. This embodiment is a camera which not only takes a photograph on a silver salt or a silver halide film (hereinafter referred to simply as a film) as a photosensitive recording medium, but also allows observation of an image taken by an image pickup device through an electronic viewfinder and, in addition, stores a thus taken image as a still or moving picture on a medium such as a magnetic tape. Instead of a magnetic tape, a variety of media such as a magnetic disk or a magneto-optical disk can be used. It is to be noted that the film used in this embodiment has an electronic recording medium or a magnetic recording layer on a film cartridge or on the surface of the film itself (the recording medium may be separate from the film), so that a camera can record shooting information electronically or magnetically onto said recording medium. Although the following description assumes that information is recorded electronically on the film cartridge, the same description is applicable when information is recorded magnetically on the surface of a film. FIGS. 1 to 4 are external views of a camera embodying the present invention, seen from its front, top, rear, and bottom sides, respectively. Prior to a description of principal portions of the present invention, operation and display members arranged on the external surfaces of the camera will be described first.

Figure 1:
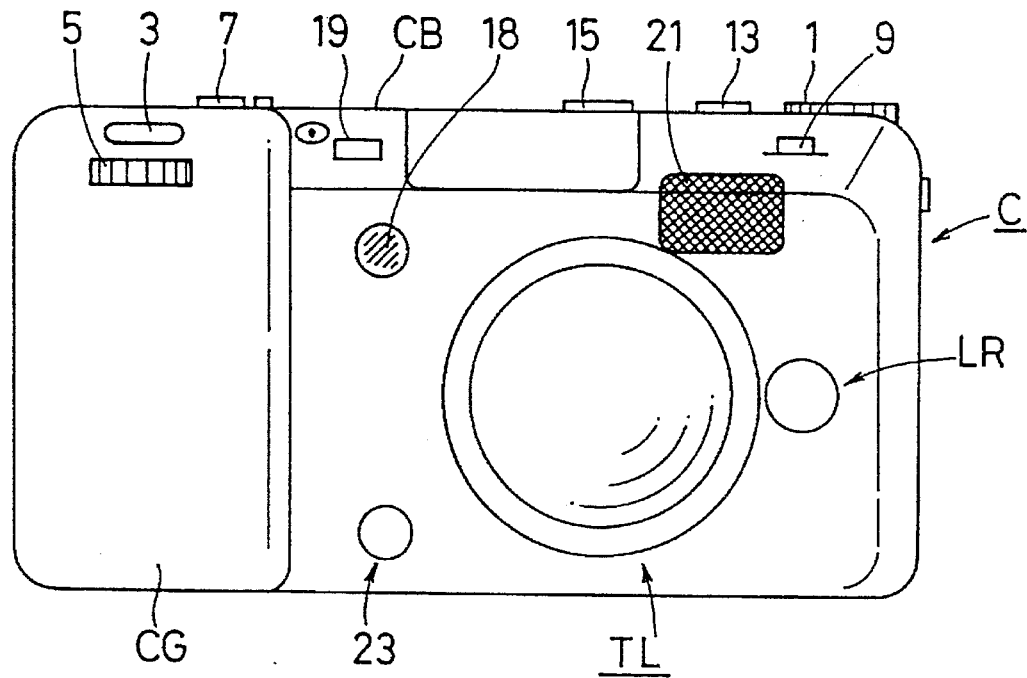
FIG. 1 is a front view of a camera embodying the present invention.
Figure 2:
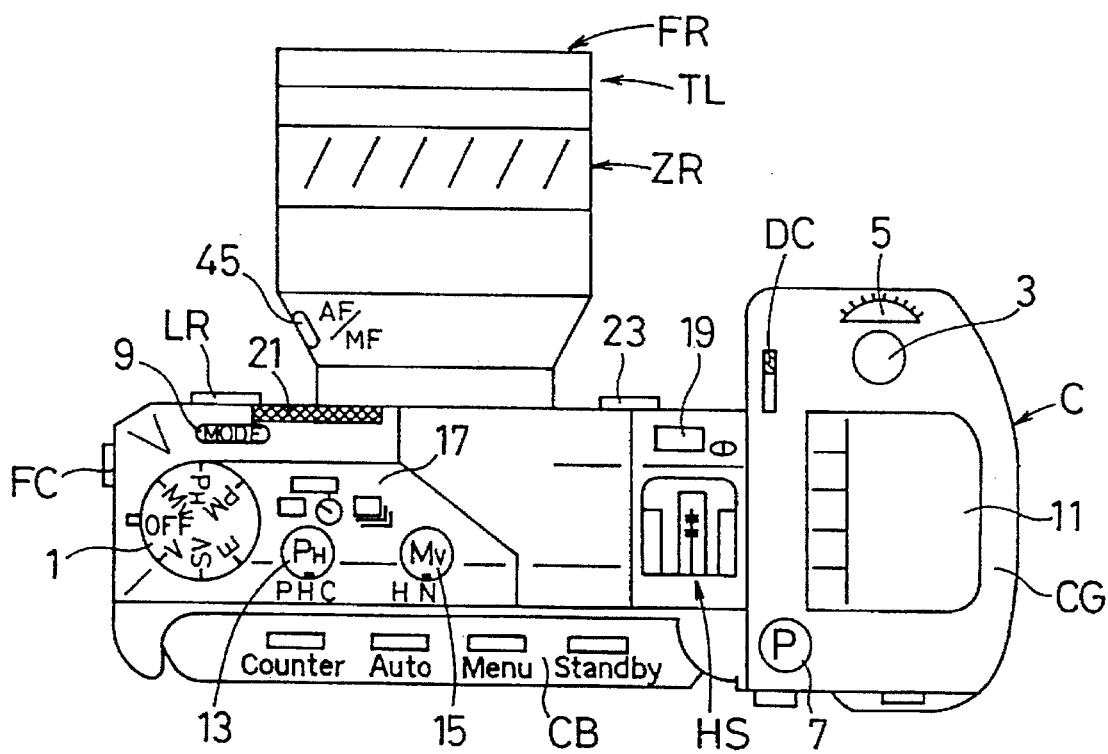
FIG. 2 is a top view of a camera embodying the present invention.
Figure 5:
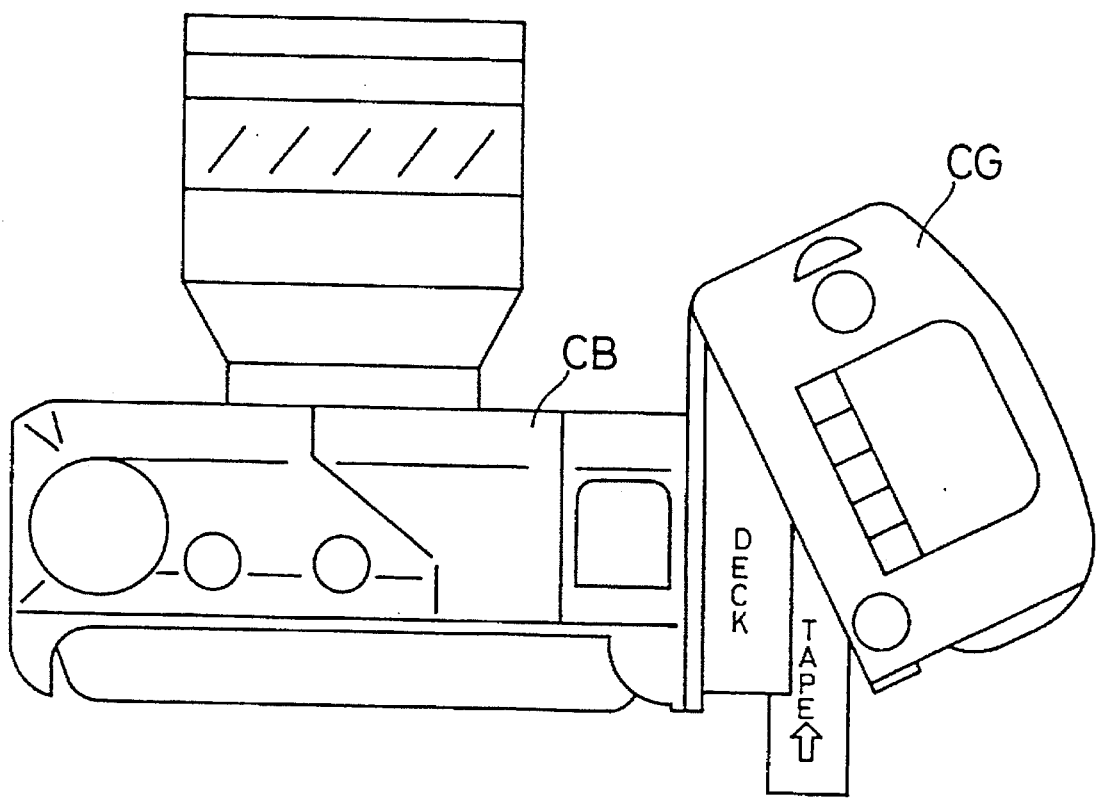
FIGS. 5 and 6 are top and rear views of a camera of the present invention with its grip portion opened.
Figure 6:
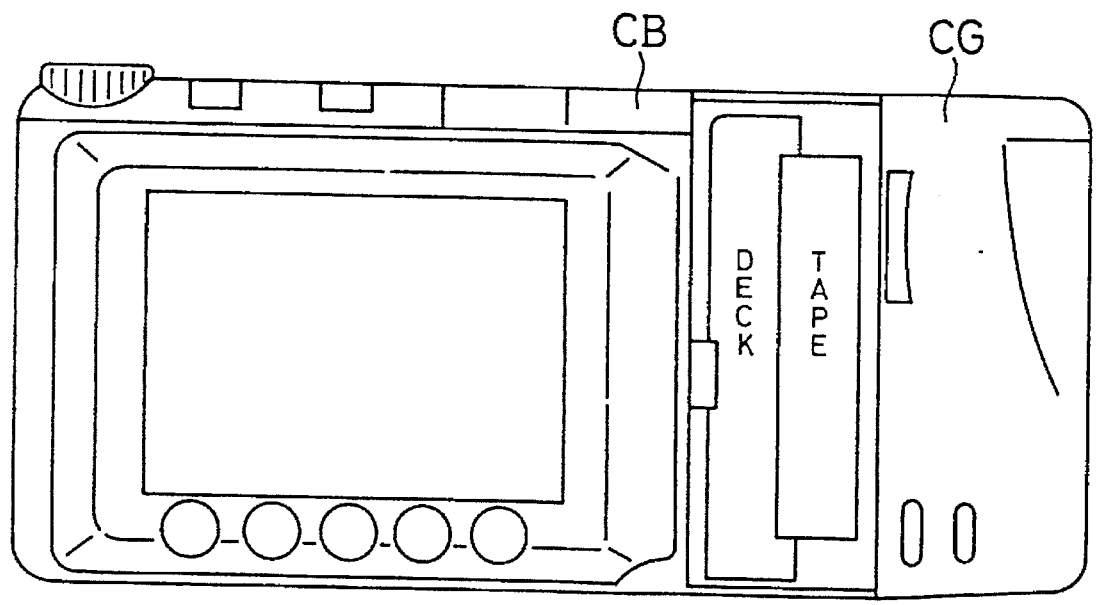

As seen from FIGS. 1 to 4, the camera C body has a body portion CB and a grip portion CG. A taking lens TL is removably mounted on the front surface of the body portion CB. The taking lens TL is unlocked at the press of a lens replacement button LR which is provided on the front surface of the camera. An accessory shoe HS for removably mounting a flash is provided on the top surface of the camera body CB. As shown in FIG. 2, a knob FC for replacing a film cartridge is provided at the left end of the body portion CB. A lid of a film cartridge compartment (not shown in the figure) is opened by operation of the knob FC. Further, a deck lid knob DC is provided on the top surface of the grip portion CG. A lid of a deck portion for loading a medius comprising a magnetic tape is opened by operation of the deck lid knob DC. That is, as shown in FIGS. 5 and 6, when the grip portion CG is rotated about its front end edge line counter-clockwise seen from above, an opening appears between the grip portion CG and the body portion CB, the deck portion coming out therefrom, so that a medium (a magnetic tape) can be removed backward and unloaded.

As to the external construction of this embodiment, a detailed description is given below. As shown in FIG. 2, an operation mode dial 1 for turning on and off the main power of the camera and for selecting an operation mode is provided at the left end of the top surface of the body portion CB. The operation mode dial is provided with and switchable among the following positions: a power-off position OFF for turning the main power off, a simultaneous shooting mode position PM for simultaneously shooting a moving-picture video and taking a photograph on a film, a film shooting mode position PH for exclusively taking a photograph on a film, a moving-picture video shooting mode position MV for exclusively shooting a moving-picture video, a video picture playback mode position V for playing back a stored video picture, a still-picture video shooting mode position SV for shooting a still-picture video, and an edit mode position E for editing shooting information electronically recorded on a film cartridge.

A shutter release button 3 is provided toward the front of the top surface of the grip portion CG. A photograph is taken at the press of the shutter release button 3.

An exposure mode dial 5 is rotatably provided at the front of the shutter release button 3. A program button 7 is provided at the rear of the grip portion CG. By singly operating the program button 7, the exposure mode can be set to a program mode (P mode), and by rotating the exposure mode dial 5 with the program button 7 held down, the exposure mode can be switched among an aperture priority mode (A mode), a shutter-speed priority mode (S mode), and a manual mode (M mode). It is to be noted that some of the exposure modes may not be selectable depending on the operation mode described above. Details will be given later. In addition, by rotating the dial 5 in each exposure mode, the aperture value (AV) and the shutter speed (TV) can be controlled.

A mode button 9 is provided at the front of the operation mode dial 1. By rotating the exposure mode dial 5 with the mode button 9 held down, a shooting scene can be selected for film shooting and still-picture video shooting. The following five shooting scenes are preprogrammed into a camera of this embodiment: portrait, landscape, close-up, sports, and night scenes. In a portrait scene, the aperture is controlled to be comparatively open so that shooting is performed with a shallow depth of field. In a landscape scene, the aperture is controlled to be stopped down so that a landscape ranging widely from near to far distances can be shot clearly. In a close-up scene, the aperture is stopped down so that a deep depth of field can be obtained, and controls are performed with regard to hand-shakes. In a sports scene, the shutter speed is controlled to be high so that a subject in motion can be shot clearly. In a night scene, a slow shutter speed is selected, and the flash is Controlled to flash.

A first screen change dial 13 for changing the aspect ratio (length-to-width ratio) of a film screen is provided in the vicinity of the operation mode dial 1. By operating the dial 13, the aspect ratio at which images photographed on a film are later to be printed is recorded on the recording medium on the film cartridge. More specifically, by setting the dial 13 to the position C, printing at a normal aspect ratio of approximately 2:3 is specified. By setting the dial 13 to the position H, printing at a high-vision ratio of approximately 9:16 is specified. By setting the dial 13 to the position P, printing at a panorama ratio of approximately 1:3 is specified.

In addition, a second screen change dial 15 for changing the aspect ratio of a moving-picture video shooting screen is provided next to the first screen change dial 13. By setting the dial 15 to the position N, video shooting is performed in a screen of the normal aspect ratio, while, by setting the dial 15 to the position H, video shooting is performed in a screen of the high-vision ratio.

A release mode selection button 17 is provided at the front of the first screen change dial 13. During film shooting or still-picture video shooting, the press of the button 17 changes the release mode sequentially among single shooting (one image frame is shot every time the shutter release button is pressed), continuous shooting (a series of image frames are successively shot while the shutter release button is held pressed), and self-timer shooting. In self-timer shooting, a self-timer lamp 18, which comprises an LED and which is provided on the front surface of the body portion CB, blinks during a delay time.

A red-eye reduction button 19 is provided toward the front of the body portion CB near the grip portion CG. During film shooting or still-picture video shooting with flashing, the press of the button 19 causes an emission of a preparatory light prior to flashing for the purpose of reducing red-eye.

As shown in FIG. 1, a stereophonic microphone 21 for recording sound during a moving-picture video shooting is provided in the upper part of the front surface of the body portion CB.

A dual-purpose button 23 is provided at the bottom of the body portion CB. In modes for shooting a moving-picture video, that is, in the simultaneous shooting mode and in the moving-picture video shooting mode, the press of the button 23 starts a fade-out. In modes for shooting a still picture, that is, in the film shooting mode and the still-picture video shooting mode, the press of the button 23 activates so-called preview operations (operations in which an image is reproduced in an electronic viewfinder in the same conditions as in actual shooting so that picture effects can be previewed).

Figure 3:
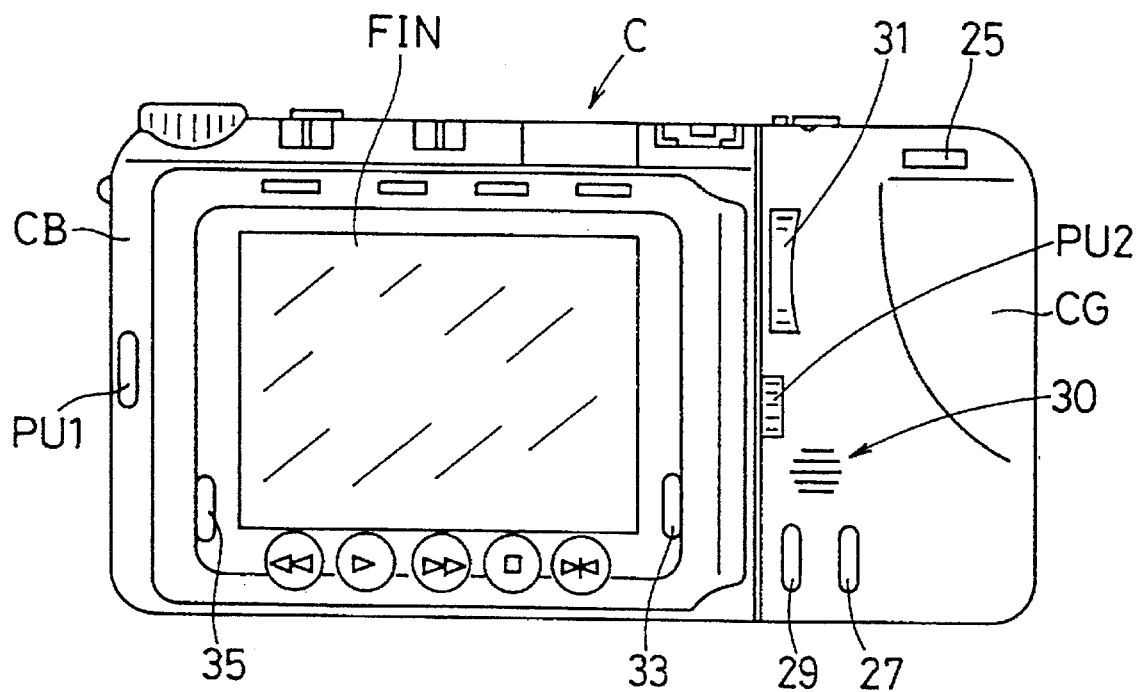
FIG. 3 is a rear view of a camera embodying the present invention.
Figure 7:
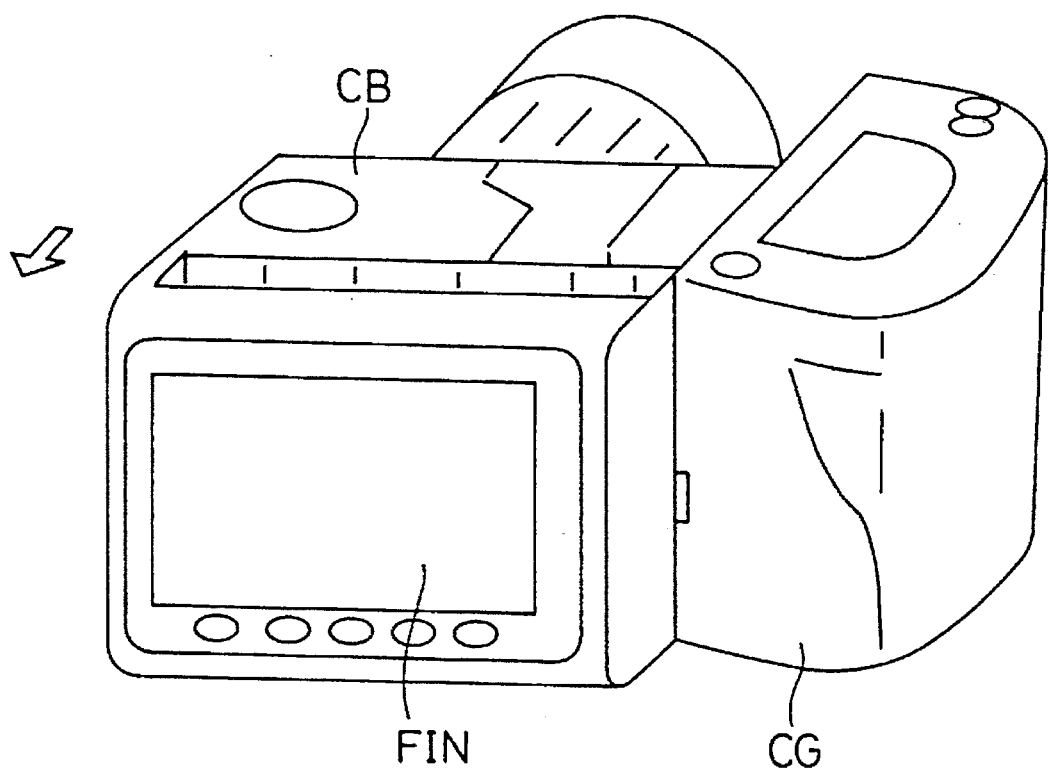
FIG. 7 is a perspective view of a camera of the present invention with its electronic viewfinder drawn out.
Figure 8:
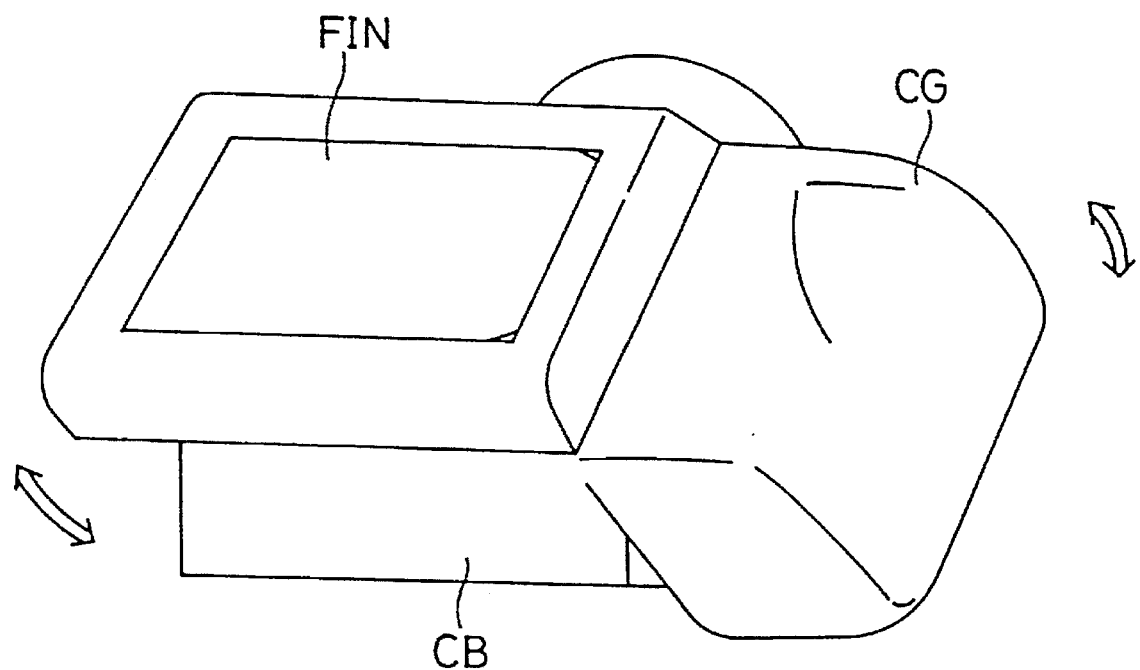
FIG. 8 is a perspective view of a camera of the present invention with its electronic viewfinder swung out.
Figure 9:
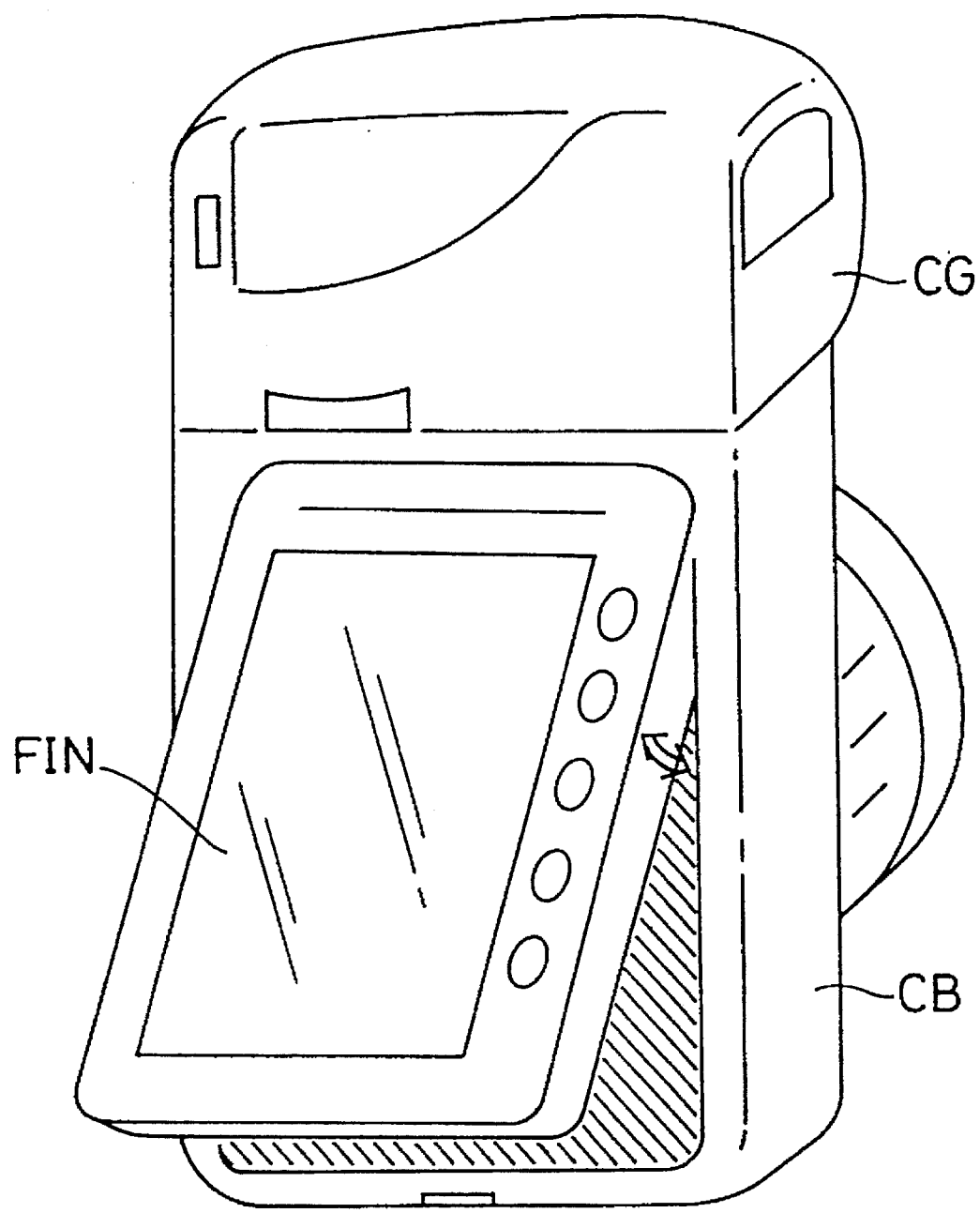
FIG. 9 is a perspective view of a camera of the present invention with its viewfinder rotated about its one edge.

As shown in FIG. 3, an electronic viewfinder FIN comprising a color liquid crystal display is provided on the rear surface of the body portion CB. The electronic viewfinder FIN can be popped up in two ways by means of pop-up button PU1 and PU2 provided in the body portion CB and in the grip portion CG respectively. As shown in FIG. 7, the electronic viewfinder FIN is mounted to be resiliently movable in a backward direction and to be resiliently rotatable about an axis along its top edge line together with the grip portion CG as shown in FIG. 8. Accordingly, when the button PU2 is operated and engagement is broken thereby, the electronic viewfinder FIN first slides backwards as shown in FIG. 7, and then swings as shown in FIG. 8. In this state, it is easy to shoot at a waist level. On the other hand, the electronic viewfinder FIN is mounted to be resiliently rotatable about an axis near its border with the grip portion CG as shown in FIG. 9. Accordingly, when the button PU1 is operated, the electronic viewfinder FIN swings in a lateral direction. In this state, it is easy to shoot at a waist level with the camera held longitudinally.

An in-finder display switching control 33 is provided on one side of the bottom of the electronic viewfinder FIN. By operating the in-finder display switching control 33, messages displayed in the viewfinder FIN can be turned on and off. A video/volume switching control 35 is provided on the other side of the bottom of the electronic viewfinder FIN. By operating the video/volume switching control, sound volume can be controlled in the video playback mode, and picture qualities, such as brightness or hue, of the electronic viewfinder FIN can be controlled in the film or video shooting modes.

Control members for controlling rewinding and fast forwarding of a magnetic tape loaded in the deck portion are provided along the bottom edge of the electronic viewfinder.

A recording button 25 is provided in the upper part of the grip portion CG. The press of the recording button 25 starts and stops moving-picture video shooting in modes for shooting a moving-picture video, that is, in the simultaneous shooting mode or in the moving-picture video shooting mode. When the recording button 25 and the dual-purpose button 23 are pressed simultaneously in modes for shooting a still picture, that is, in the still-picture video shooting mode or in the film shooting mode, an image taken with the aperture open is displayed in the electronic viewfinder FIN. Moreover, if the M mode is additionally selected in the still-picture video shooting mode and the film shooting mode, the aperture value AV can be controlled by rotating the exposure mode dial 5 with the recording button 25 held pressed.

A hand-shake prevention button 27 is provided on the lower part of the grip portion CG. By pressing the hand-shake prevention button 27 in modes for shooting a moving-picture video, that is, in the simultaneous shooting mode or in the moving-picture video shooting mode, a hand-shake prevention function can be turned on and off. By rotating the exposure mode dial 5 with the hand-shake prevention button 27 being pressed in modes for shooting a still picture, that is, in the still-picture video shooting mode or in the film shooting mode, the amount of exposure compensation can be controlled.

A forced flashing button 29 and a speaker 30 are provided in the vicinity of the hand-shake prevention button 27. When the forced flashing button 29 is pressed in modes for shooting a still picture, that is, in the still-picture video shooting mode or in the film shooting mode, forced flashing is instructed, so that the flash is activated independently of the brightness of a subject whenever shooting is performed. When the forced flashing button 29 is not pressed in above-mentioned modes, the flash is activated automatically at a low level of the brightness of the subject.

The speaker 30 reproduces sound in the video playback mode.

A zoom Operation member 31 for changing the focal length of the taking lens TL is provided in the upper part of the grip portion CG. The zoom operation member 31 comprises a seesaw-type switch and, by pressing the upper and lower ends thereof, the focal length is controlled to be longer for telephoto shots and shorter for wide shots, respectively.

Figure 4:
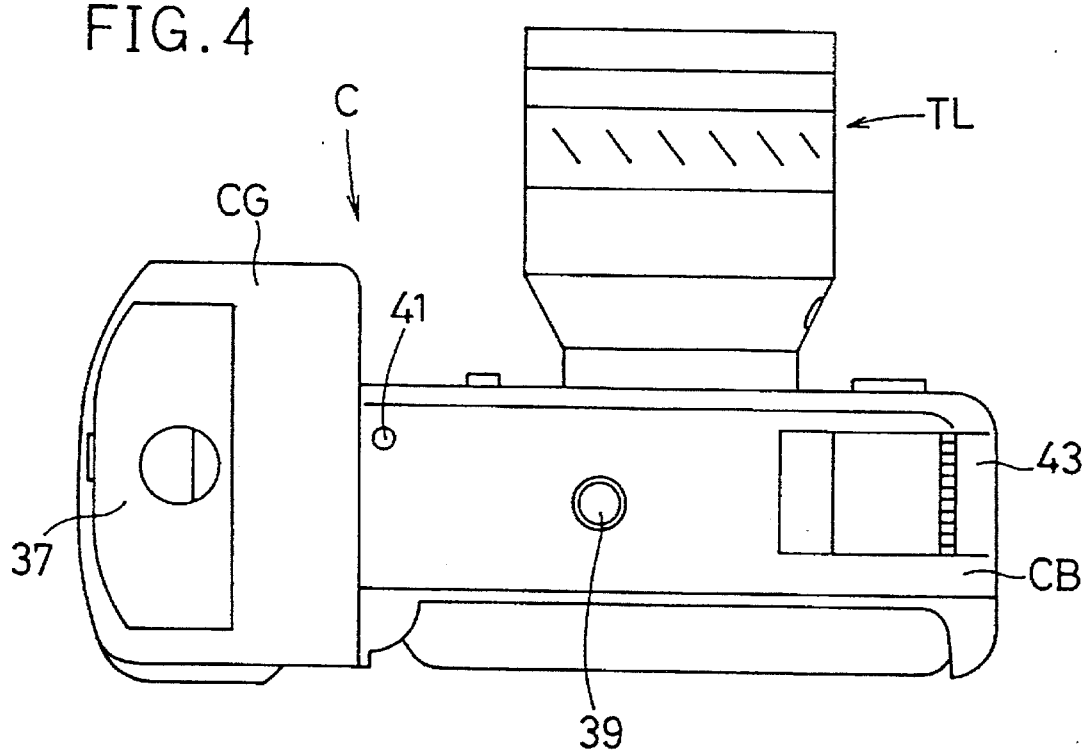
FIG. 4 is a bottom view of a camera embodying the present invention.

As shown in FIG. 4, a lid 37 of a battery compartment and a threaded hole 39 for fixing a tripod are provided on the bottom surface of the camera. A halfway rewinding button 41 for rewinding a film at a midpoint of a film roll, and an external output port 43 for sending and receiving data to and from a peripheral apparatus are also provided on the bottom surface of the camera.

Figure 10:
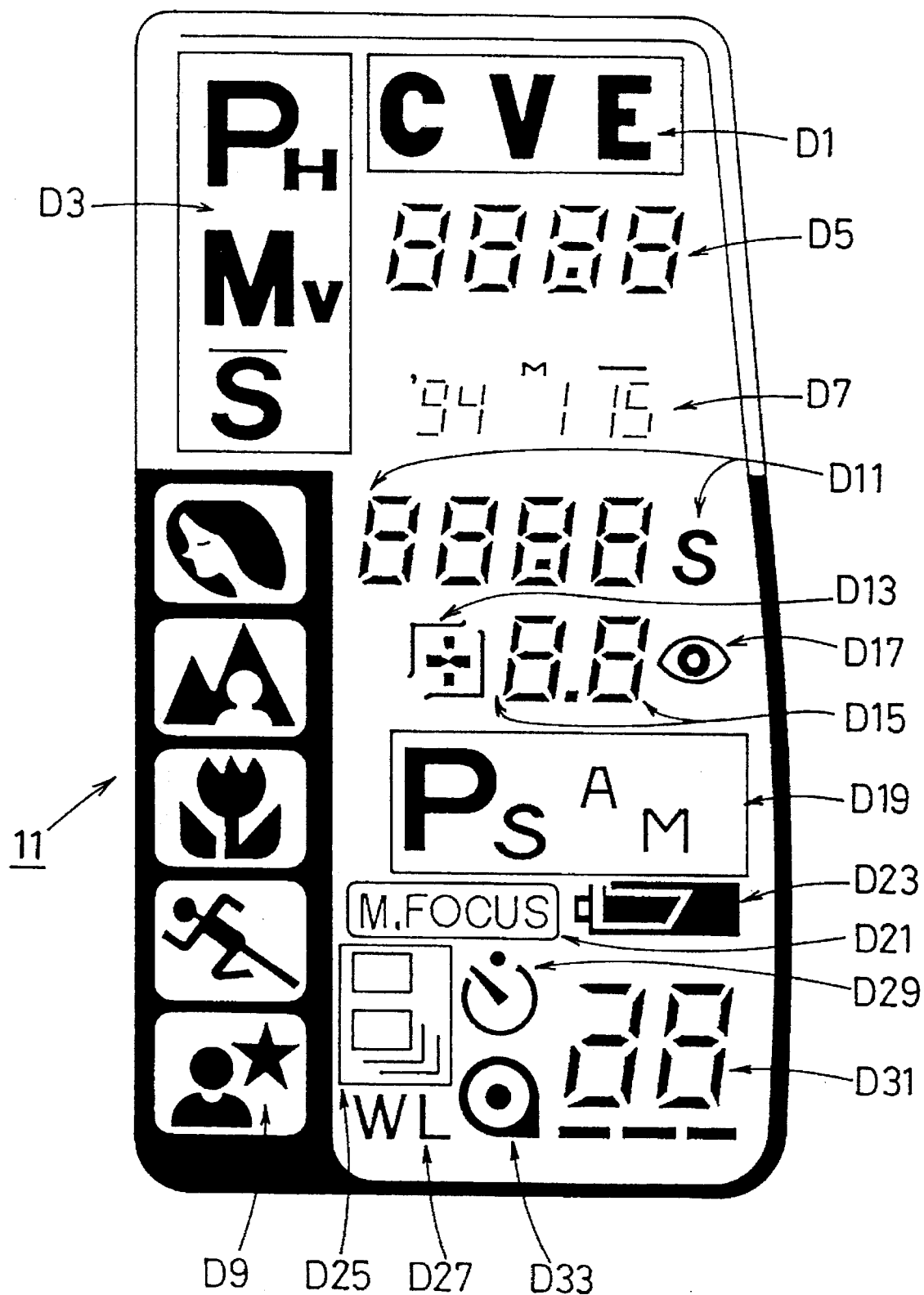
FIG. 10 is a diagram showing patterns displayed on the liquid crystal display.

As shown in FIG. 2, a liquid crystal display 11 is provided between the shutter release button 3 and the program button 7 on the top surface of the grip portion CG of the camera C. The liquid crystal display 11 displays various modes and parameters set by operations as described above. The details of the pattern displayed thereupon are shown in FIG. 10. In the upper part of the display is located an operation mode indicator D1 comprising a segment C for indicating whatever shooting mode available in the camera, a segment V for indicating the video playback mode, and a segment E for indicating the edit mode. To the left of the operation mode indicator D1 is located a camera operation mode indicator D3 for indicating the shooting mode, comprising a segment PH for indicating the film shooting mode, a segment MV for indicating the moving-picture video shooting mode, a segment SV for indicating the still-picture video shooting mode. It is to be noted that one character V is shared between the still-picture video shooting mode segment SV and the moving-picture video shooting mode segment MV.

Below the operation mode indicator D1 is located a tape counter D5 for indicating the running state of a magnetic tape loaded in the deck portion, and further below is a date indicator D7.

At the left end of the lower part of the liquid crystal display 11 is located a shooting scene indicator D9, comprising icon indicators for portrait, landscape, close-up, sports, and night scenes.

To the right of the shooting scene indicator D9 are located, from top, a shutter speed indicator D11, an exposure compensation indicator D13, a common indicator D15 for indicating an aperture value and an exposure compensation value, a red-eye reduction mode indicator D17, an exposure mode indicator D19 comprising four indicators P, S, A and M, a manual focus indication portion D21, a battery capacity indicator D23, a winding mode indication portion D25, a wireless flash indication portion D27, a self-timer mode indicator D29, a film counter D31, and a film load indicator D33.

Figure 11:
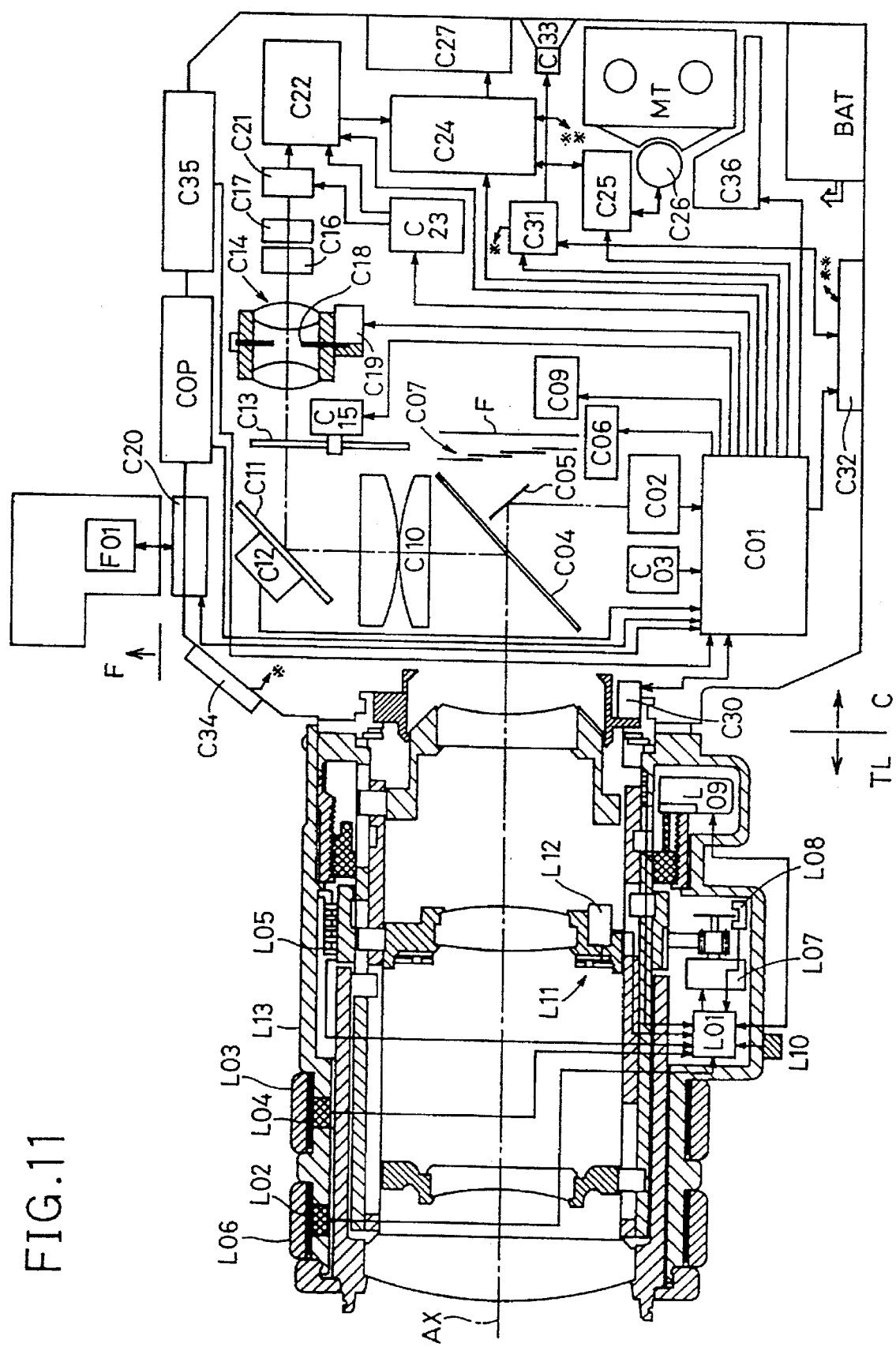
FIG. 11 is a diagram globally showing the internal construction of a camera of the present invention.

As shown in FIG. 2, the taking lens TL mounted on the camera is equipped with a focus ring FR for electronically varying a focusing condition freely, a zoom ring ZR for electronically changing a focal length freely, and a switching button 45 for switching between automatic and manual focus. Next, with reference to FIGS. 11 and 13, the internal construction of a camera of this embodiment will be described below. FIG. 11 generally shows the internal construction of the camera, which comprises three units: a camera body C, a taking lens TL, and a flash F. The camera body C is controlled by a camera microcomputer C01. The taking lens is controlled by a lens microcomputer L01. The flash is controlled by a flash controller F01 including a microcomputer. These microcomputers exchanges data between themselves by way of camera-lens contacts C30 and camera-flash contacts C20, and each microcomputer performs control of the respective unit according to instructions from the camera microcomputer.

The taking lens TL is equipped with a focusing motor L09 for adjusting the focus condition of an optical system, a zoom motor L07 for changing the focal length, an aperture diaphragm L11, and an aperture diaphragm motor L12 for controlling the aperture diaphragm L11.

The camera body C is equipped with a main mirror C04 comprising a semi-transparent mirror, through which a portion of a imaging light beam AX incident from the taking lens TL passes, and by which another portion of that light beam is reflected in an upward direction. The main mirror C04 is mounted at an angle of 45 degrees with respect to the imaging light beam AX. An auxiliary mirror C05 is movably mounted to be retractable from a light path at the rear of the main mirror C04. By the auxiliary mirror C05, the light beam having passed through the main mirror C04 is reflected in a downward direction. The light beam reflected by the auxiliary mirror C05 travels downward inside the camera, and enters a focus detection device C02, by which a focusing condition of the taking lens is detected. A result of the detection by the focus detection device C02 is transferred to the camera microcomputer C01. Information needed for achieving in-focus is transferred to the lens microcomputer L01 through camera-lens contacts C30 from the microcomputer C01. The lens microcomputer L01 controls the focusing motor L09 according to the transferred information in order to obtain in-focus.

A shutter C07 is provided at the rear of the auxiliary mirror C05, and a film F loaded in the camera body C is located at the rear of the shutter C07. When shooting is performed on the film F, the auxiliary mirror C05 is retracted out of the imaging light path, the shutter C07 is opened and closed by a shutter driving device C06, and thereafter, the film is advanced one frame forward by a film advancing device C09.

The light beam reflected by the main mirror C04 travels upward inside the camera to form a primary image (aerial image).

A condenser lens C10 is provided above the main mirror C04, and a partially semi-transparent mirror C11 is provided above the condenser lens C10. The light beam having passed through the mirror C11 enters a brightness detecting device C12. The detecting device C12 is provided on the rear side of the mirror C11 to perform a photometry of the light beam. A result of the photometry is transferred to the camera microcomputer C01 for use in controlling the shutter driving device C06, and the camera microcomputer C01 further transfers the result to the lens microcomputer L01, which then controls the aperture diaphragm motor L12 to drive the aperture diaphragm L11.

The light beam reflected by the mirror C11 travels backward inside the camera, and passes through an ND filter C13. The ND filter C13, which is provided for the purpose of controlling the amount of light passing therethrough without changing a color balance, has different densities at different positions along its surface direction. By changing the position of the ND filter C13 by means of a filter controlling device C15 including a motor, the amount of passing light is controlled.

The light beam having passed through the ND filter C13 enters a relay optical system C14 provided at the rear of the ND filter C13. A relay aperture diaphragm C18 is provided inside the relay optical system C14, and is controlled by a relay aperture diaphragm controller C19.

The relay optical system C14 reduces the primary image, that is, the aerial image formed in the vicinity of the condenser lens C10 according to the size (imaging area) of the image pickup device, so that a secondary image is formed, through an optical low-pass filter C16 and an infrared light cut filter C17, on the imaging surface of the image pickup device C21.

An image on the image pickup device is sequentially read out by pulses from a driving pulse generator C23, and processed by an image processor C22 and a video processor C24. As a result, the image is displayed in an electronic viewfinder C27 (FIN), and is simultaneously recorded, through a recording/playback converter C25, on a magnetic tape MT by a magnetic head C26, according to the selected operation mode. The magnetic tape MT is controlled by a magnetic tape driver C36. The image 5 processed by the video processor C24 is transferred to an external device through the external output port C32 (43), when necessary.

The image recorded on the magnetic tape MT is reproduced in the electronic viewfinder C27 (FIN) through the magnetic head C26, the recording/playback converter C25 and an image processor C22, when necessary.

Sound taken by a stereophonic microphone C34 (21), which is provided on the front surface of the camera body C, are processed by a sound processor C31, transferred through the recording/playback converter C25, and recorded on the magnetic tape MT together with an image by the magnetic head C26. The sound is transferred to an external device through the external output port C 32 (43), when necessary.

The sound recorded on the magnetic tape MT is reproduced from the speaker C33 (30) with the help of the magnetic head C26, the recording/playback converter C25, and the sound processor C31. As to the processing of shooting, recording, playback mentioned above, a detailed description will be given later, with reference to FIG. 12.

It is to be noted that, in FIG. 11, COP represents an aggregation of the operation members described based on FIGS. 1 and 4, and C35 represents the liquid crystal display 11 described based on FIG. 10. COP transfers information to the camera microcomputer C01, and the liquid crystal display 11 performs display based on information from the camera microcomputer C01. C03 detects camera shakes and transfers detection results to the camera microcomputer C01. BAT represents a battery for driving the camera body C and the taking lens.

The construction of the taking lens will be described below. The taking lens is equipped with a focus ring L06 (FR), a focusing encoder L02, a zoom ring (ZR) L03, a zoom encoder L04, a focal length detector L05, and a switching button L10 (45) which are mounted on a fixing member L13. The focus ring L06 is operated manually. When the focus ring L06 is operated while the switching button L10 is set to the manual focus position, the direction and amount of the operation are detected by the focusing encoder L02, and the detection results are transferred to the lens microcomputer L01, which then drives the focusing motor L09.

The zoom ring L03 is also operated manually. The amount and the direction of operation thereof are detected by the zoom encoder L04, and the detection results are transferred to the lens microcomputer L01, which then drives the zoom motor L07. It is to be noted that it is also possible to change the focal length according to a shooting scene as described above by an instruction from the camera microcomputer C01. In this case, zooming is controlled according to a currently specified focal length detected by the focal length detector L05, and to a driving amount of the zoom motor L07 detected by a zoom monitor L08.

Figure 12:
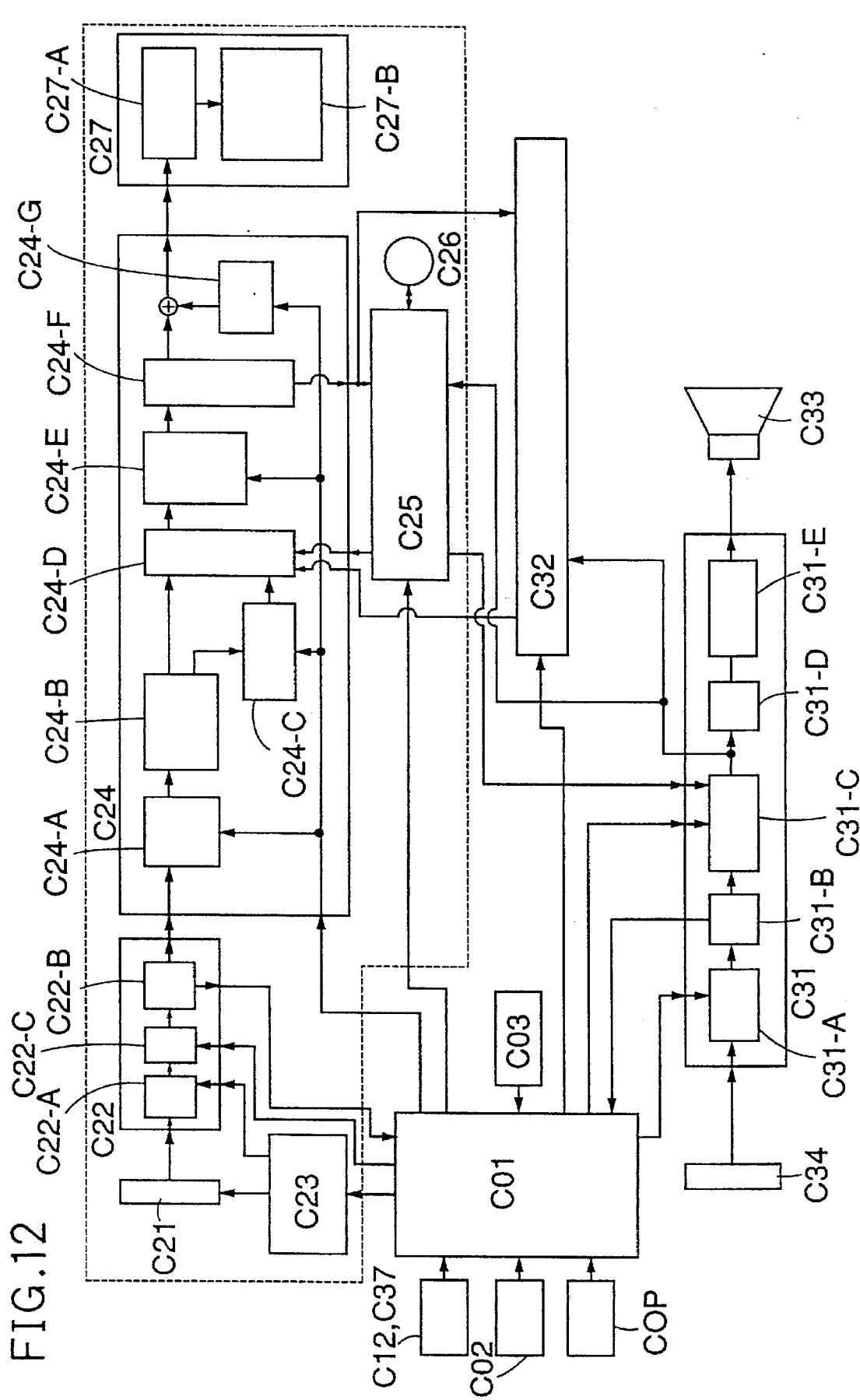
FIG. 12 is an aperture diagram schematically showing the internal construction of a camera of the present invention.
Figure 13:
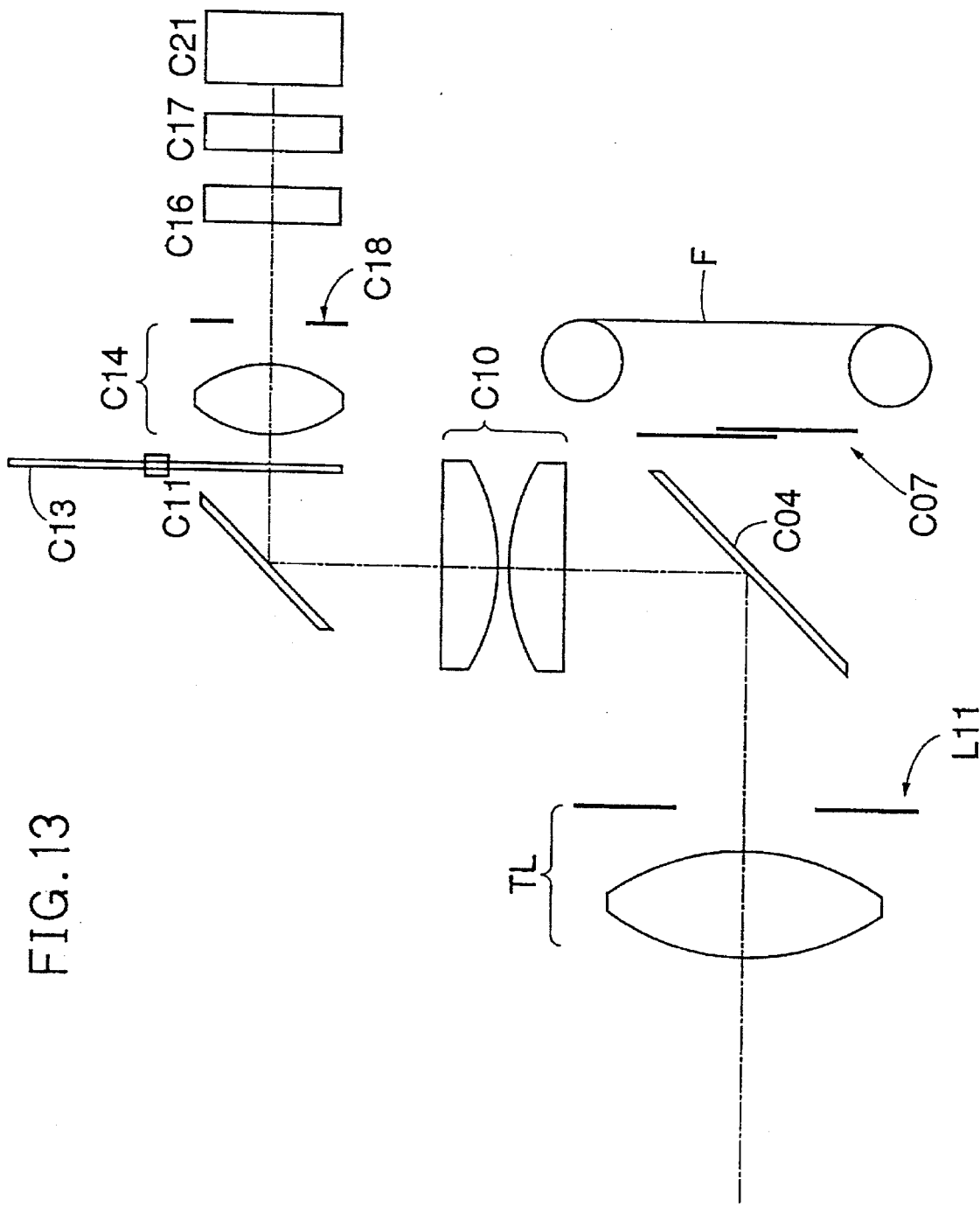
FIG. 13 is an aperture diagram showing the optical system construction of a camera of the present invention.

FIG. 13 is a simplified drawing showing exclusively optical system components of the above described construction. Next, a detailed description as to processing of shooting, recording and playback will be given below, with reference to FIG. 12. In FIG. 12, the portion enclosed with broken lines is a portion for processing an image (a video signal shooting unit), which is controlled by instructions from the camera microcomputer C01. An image on the image pickup device C21 is sequentially read out by pulses from the driving pulse generator C23. The image signal thus read out is subjected to analog processing such as sub-sampling (C22-A) based on the pulses from the driving pulse generator C23, that is, in synchronization with reading out in the image processor C22. The image signal is then amplified by a voltage controlled amplifier C22-C, and converted into a digital signal by an A/D converter C22-B. The digital-converted video signal is then subjected to a γ (Gamma) conversion in a γ converter C24-A in the video processor C24, divided into a luminance signal (Y) and a chrominance signal (C) by a Y/C divider C24-B, subjected to white balance adjustment in a WB circuit C24-C, and stored temporarily in a memory C24-D.

In response to an instruction from the camera microcomputer C01, the video signal temporarily stored in the memory C24-D undergoes image processing in an operation controller C24-E, and then stored in another memory C24-F. In response to an instruction from the camera microcomputer C01, image data comprising characters or other to be added to the video signal is superimposed on the video signal in a superimposing processor C24-G. The video signal is then transferred to the electronic viewfinder C27. The electronic viewfinder C27 converts the received video signal into a signal for driving a liquid crystal display by means of a converter C27-A, and drives the display C27-B.

On the other hand, the video signal stored in the memory C24-F is transferred to the recording/playback converter C25, converted thereby into a format suitable for recording, and recorded on the magnetic tape MT by the magnetic head C26. The signal from the memory C24-F above is also transferred to the external output port C32.

In FIG. 12, C31 represents a sound processor. Sound collected by the stereophonic microphone C34 is amplified by the voltage controlled amplifier C31-A, converted into a digital signal by an A/D converter C31-B, subjected to digital processing such as compression in a processing circuit C31-C, and then converted into a signal suitable for recording by the recording/playback converter C25. Thereafter, the audio signal is recorded on the loaded magnetic tape MT together with the video signal mentioned above by the magnetic head C26.

The video and sound recorded on the magnetic tape MT are read out by the magnetic head 26, and are divided and converted into video and audio signals in original data formats as those before recording by the recording/playback converter C25. The video data is then transferred to the memory C24-D, and, after the same processing as those performed when the image was taken, the image is displayed in the electronic viewfinder C27. On the other hand, the sound data is transferred to the processing circuit C31-C in the sound processor C31, and, after conversion into an analog signal by a D/A converter C31-D and amplification by an output amplifier C31-E, the sound is reproduced from the speaker C33.

Figure 14:
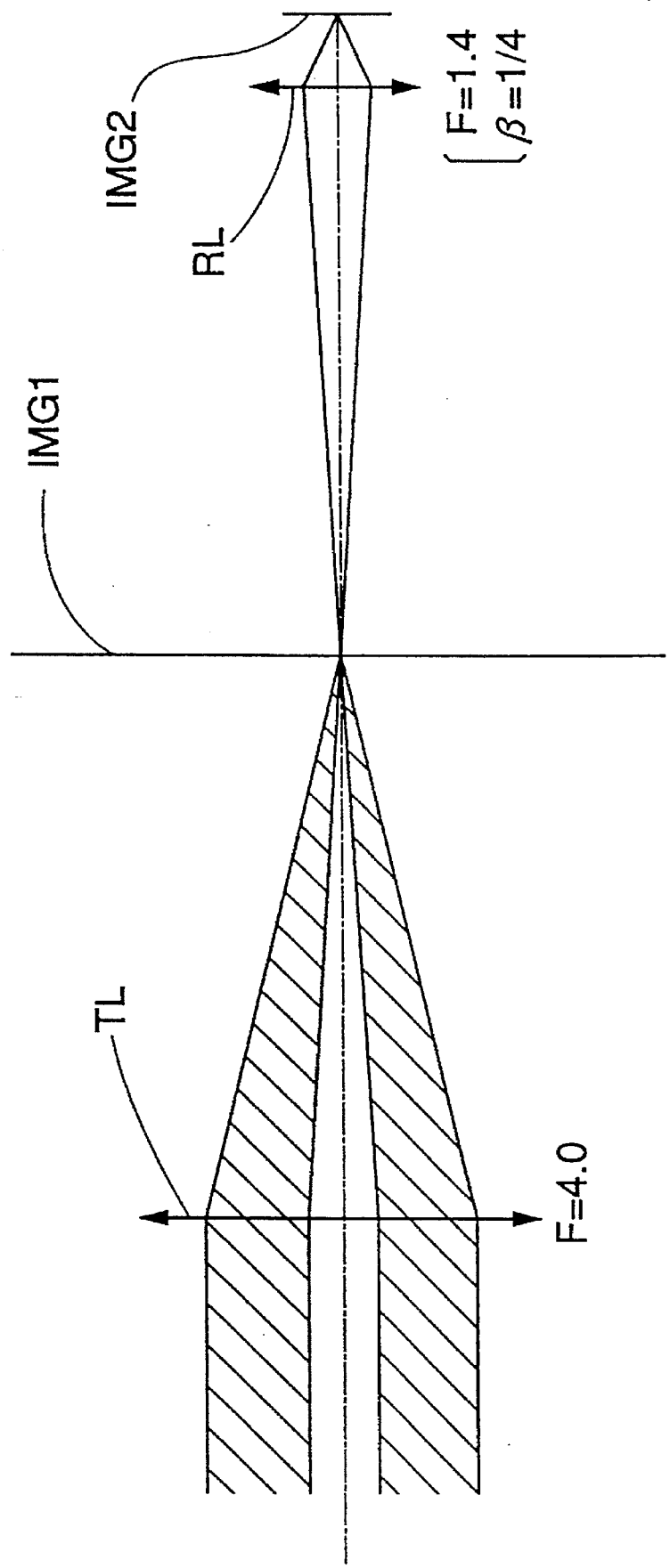
FIG. 14 is a diagram showing a light path in a camera of the present invention.
Figure 15:
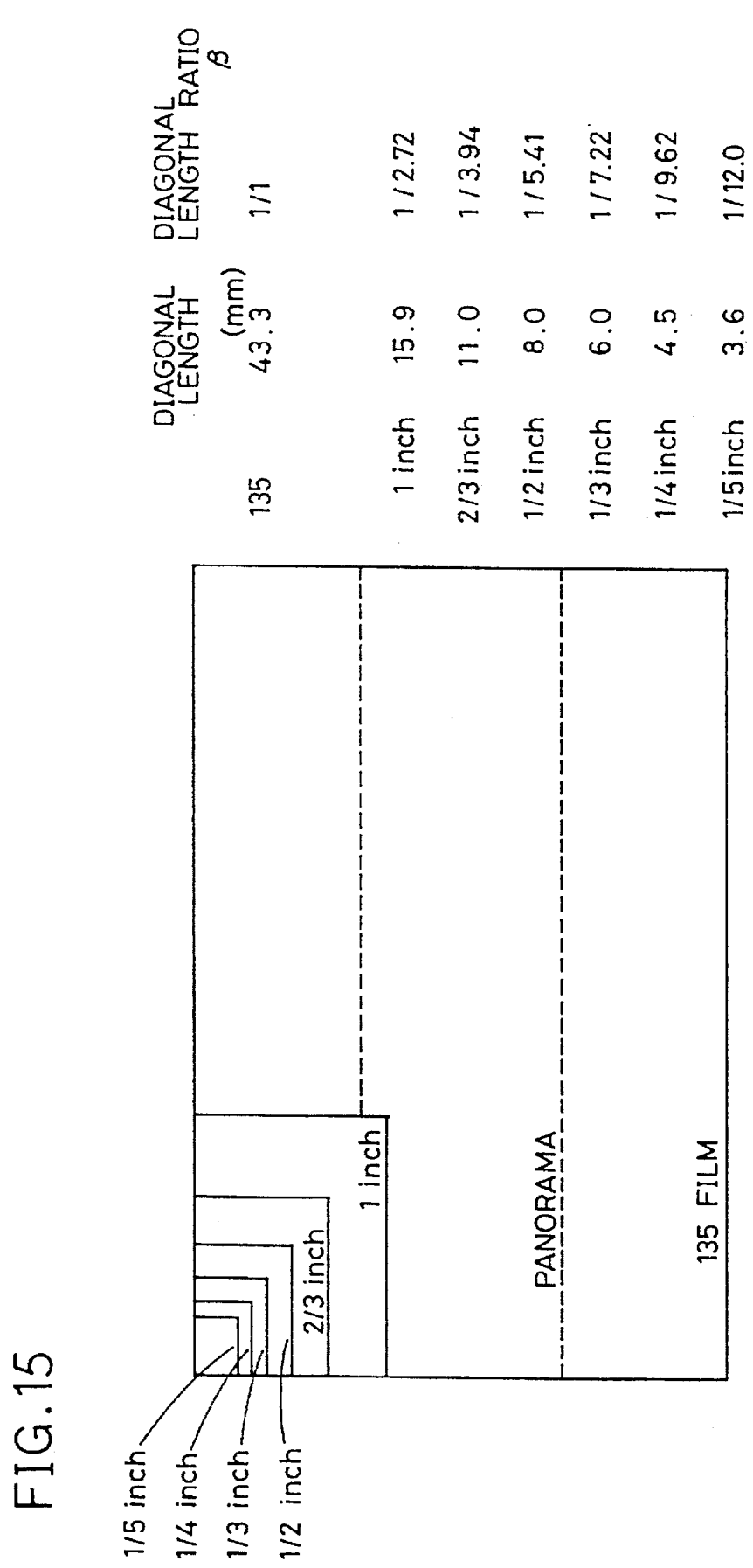
FIG. 15 is a diagram showing screen sizes specifically.
Figure 16:
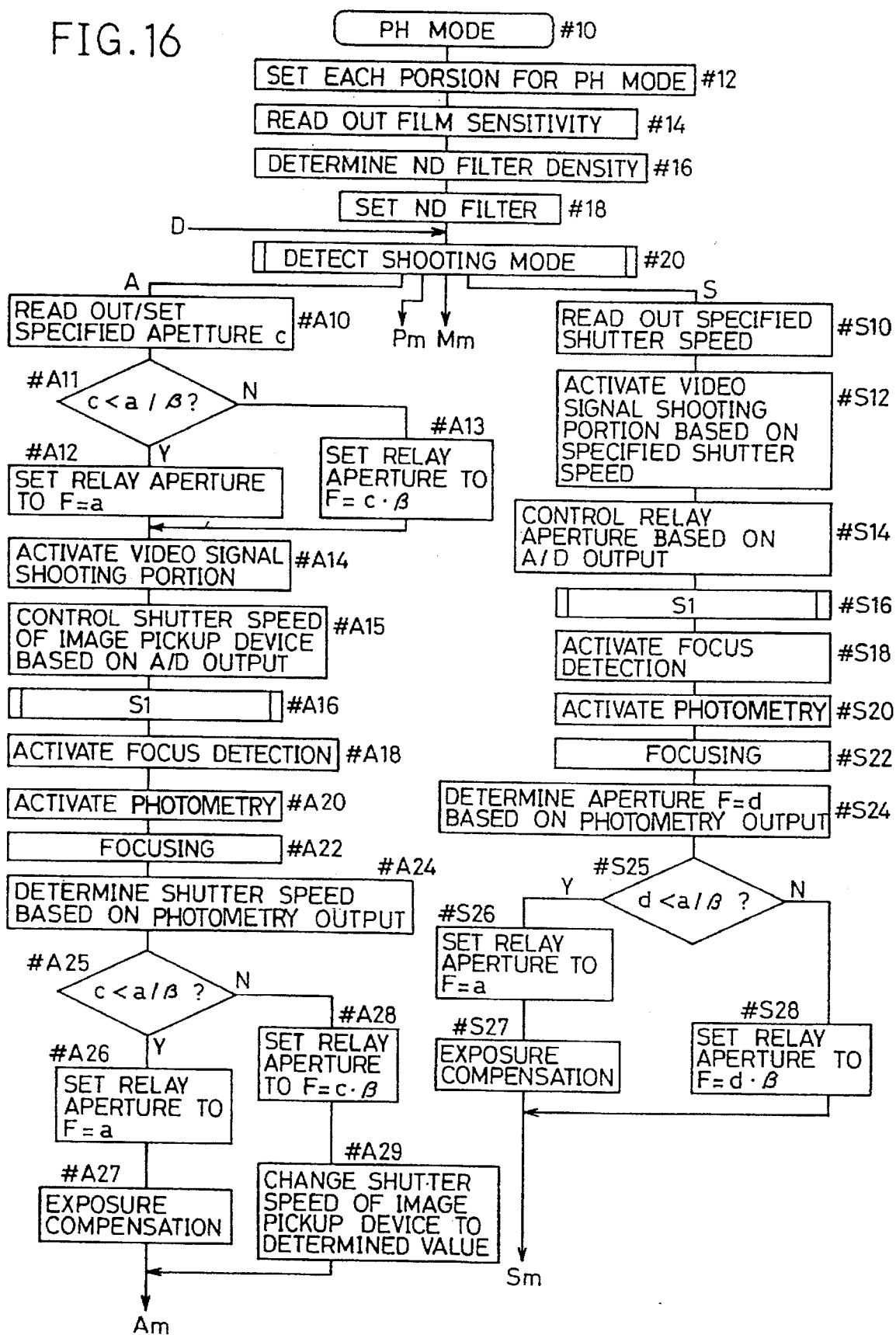
FIGS. 16 to 19 are flow charts showing the operation of a camera of the present invention in its film shooting mode.
Figure 17:
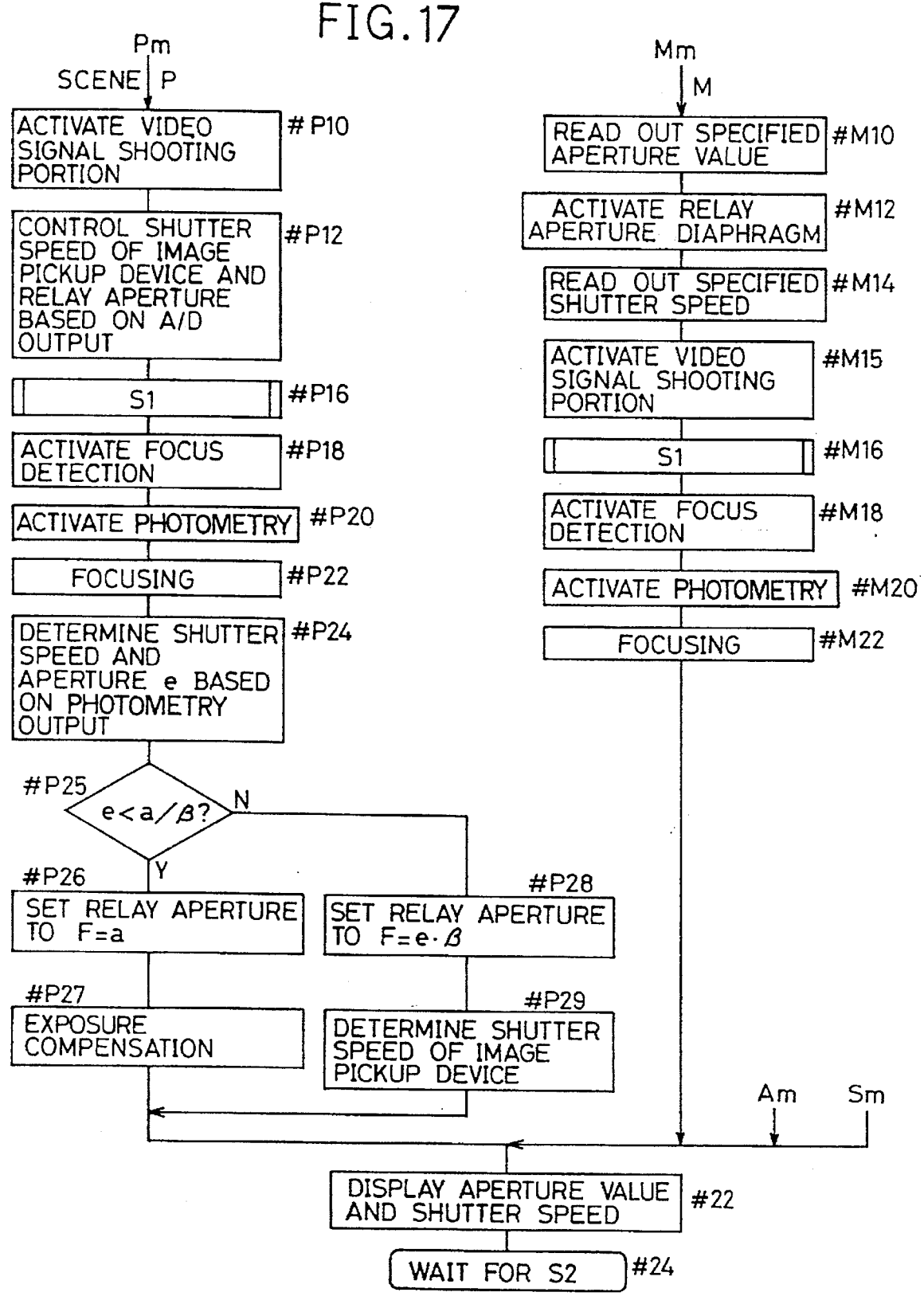

Next, with reference to FIG. 14, a description will be given below as to the control of the above-mentioned relay aperture diaphragm C18. In this embodiment, the relay optical system C14 has a magnification of $\beta=\frac{1}{4}$, and an open aperture value of F=1.4 (represented also by a). Under these conditions, as shown in FIG. 14, a light beam from the taking lens TL enters the relay optical system RL without diffusing on a primary image plane IMG1. Accordingly, of the light beam incident from the taking lens TL, only a portion corresponding to a/β=5.6, that is, F=5.6 is used as a light beam which passes through the relay optical system RL to form a secondary image IMG2, while the remaining light beam (indicated with hatching in the drawing) passing outside the light beam corresponding to F=5.6 does not enter the image pickup device. As a result, if the aperture is adjusted to be wider than F=5.6 by use of a taking lens of an open aperture value less than F=5.6, the amount of light incident on the film F accordingly changes, without affecting the imaging on the image pickup device C21. In addition, by stopping down the relay aperture diaphragm C18, it is possible to widen the range within which the aperture diaphragm L11 can be freely controlled. For example, when the relay aperture diaphragm C18 is stopped down to F=2.0 (also referred to as b), it is possible to control the amount of light incident on the film F without affecting imaging on the image pickup device C21, if the aperture diaphragm L11 of the taking lens is controlled within the range between $b/\beta=8.0$, that is, the open aperture value and F=8.0.

<Film Shooting Mode>

Next, with reference to FIGS. 16 to 19, the operation of this embodiment in its film shooting mode will be described below. In order to take a picture on a film, the mode dial 1 shown in FIG. 2 is set to the position PH first (#10). The camera microcomputer C01 then sets each operation portion of the camera to a state suitable for film shooting, that is, to a state in which an operation portion, when operated, executes only a function assigned to film shooting out of a plurality of functions it may have for different modes (#12). As to the shooting scene (such as a portrait scene) and the exposure mode (such as an aperture priority mode), the stored settings which were specified when the film shooting mode was previously selected are automatically selected. The camera microcomputer CO1 reads out the sensitivity of the film loaded in the camera (#14), and determines the density of the ND filter C13 based on the sensitivity difference between the image pickup device C21 and the film (#16), controlling the filter driving device C15 based on the determined density to set the ND filter (#18). Meanwhile, the aperture diaphragm L11 of the taking lens remains in the open-aperture state.

The exposure mode is then detected (#20), and operation proceeds according to the detected mode.

If the exposure mode is set to A mode, the specified aperture value is read out (#A10). Assume that the specified aperture value of the aperture diaphragm L11 is c. A comparison between the values c and $a/\beta$ (hereinafter, a represents the open aperture value of the relay aperture diaphragm C18, and $\beta$ represents a magnification of the relay optical system) is performed (#A11). If c is smaller, that is, if the specified aperture value of the aperture diaphragm L11 of the taking lens is within the range in which a change in the aperture value does not affects the amount of light incident on the image pickup device C21, the aperture value of the relay aperture diaphragm C18 is set to the open aperture value a (#A12). In contrast, if c is not smaller, that is, if the specified aperture value of the aperture diaphragm L11 of the taking lens is within the range in which a change in the aperture value affects the imaging on the image pickup device C21, the aperture value of the relay aperture diaphragm C18 is set to a value $c \cdot \beta$, that is, a value corresponding to the aperture value of the aperture diaphragm L11 of the taking lens (#A13).

In this embodiment, where $a=1.4$ and $\beta=\frac{1}{4}$, when the aperture of the aperture diaphragm L11 of the taking lens is wider then F=5.6, the aperture value of the relay aperture diaphragm C18 is set to the open aperture value F=1.4, and, when the aperture of the aperture diaphragm L11 of the taking lens is F=5.6 or narrower, for example, F=8, the aperture value of the relay aperture diaphragm C18 is set to $F=8\times(\frac{1}{4})$, that is, F=2.

Next, the video signal shooting unit, shown enclosed with broken lines in FIG. 12, is activated (#A14). As shown in FIG. 11, the light beam incident through the taking lens TL travels via the main mirror C04, the mirror C11, the ND filter C13, the relay optical system C14, the optical low-pass filter C16, and the infrared light cut filter C17, and enters the image pickup device C21 to be taken as an image thereby. After imaging, the image signal, after being processed in the image processor C22 and the video processor C23 shown in FIG. 12, is displayed as a picture in the electronic viewfinder C27 (FIN).

During this processing, the camera microcomputer C01 controls the driving pulse generator C23 based on the output from the A/D converter C22-B in the image processor C22, that is, based on the output from the image pickup device C21, in order to set the shutter speed (electric charge accumulation time) of the image pickup device C21 (#A15). Thereafter, the camera microcomputer C01 waits for the operator to press the shutter release button 3 (#A16).

If the exposure mode is set to S mode, the specified shutter speed is read out first. When the video signal shooting unit is activated (#S12), the light beam incident through the taking lens TL passes through the main mirror C04, the mirror C11, the ND filter C13, the relay optical system C14, the optical low-pass filter C16, and the infrared light cut filter C17, and enters the image pickup device C21 to be taken as an image thereby. After imaging, the image signal, after being processed in the image processor C22 and the video processor C23 shown in FIG. 12, is displayed as a picture in the electronic viewfinder C27 (FIN). During this processing, the camera microcomputer C01 controls the driving pulse Generator C23 in order to control the shutter speed (electric charge accumulation time) of the image pick up device. Moreover, the aperture of the relay aperture diaphragm is controlled based on the output from the A/D converter C22-B in the image processor C22, that is, based on the output from the image pickup device C21 (#S14). Thereafter, the camera microcomputer C01 waits for the operator to press the shutter release button 3 (#S16).

If the exposure mode is set to P mode, or if a shooting scene is set, the video signal shooting unit is activated (#P10) first. Then, the aperture of the relay aperture diaphragm C18 and the shutter speed (electric charge accumulation time) of the image pickup device C21 are controlled according to a predetermined program chart based on the output from the A/D converter C22-B in the image processor C22, that is, based on the output from the image pickup device C21 (#P12). Thereafter, the camera microcomputer C01 waits for the operator to press the shutter release button 3 (#P16).

If the exposure mode is set to M mode, both the aperture of the relay aperture diaphragm C18 and the shutter speed (electric charge accumulation time) of the image pickup device C21 are set to the values read out as specified values, and the video signal shooting unit is activated with the specified shutter speed (#M10 to M15). Thereafter, the camera microcomputer C01 waits for the operator to press the shutter release button 3 (#M16).

Later, when the operator presses down the shutter release button 3 half the way in (#S16, #A16, #P16 and #M16) (hereinafter referred to as the state S1), the focus detection device C02 and the brightness detection device C12 shown in FIG. 11 are activated (#S18 to 20, #A18 to 20, #P18 to 20, and #M18 to 20). The focus detection device C02 detects the focusing condition of the taking lens TL, and transfers a detection result to the camera microcomputer C01. Based on the detection result, the camera microcomputer C01 transfers a driving instruction to the lens microcomputer L01, when necessary. The lens microcomputer L01 performs a calculation with adding conditions particular to the taking lens TL to the driving instruction, and, based on the operation result, drives the focus motor L09 (#S22, #A22, #P22 and #M22).

Meanwhile, the brightness detection device C12 detects the brightness of the subject, and transfers a detection result to the camera microcomputer C01. If the exposure mode is set to A mode, a shutter speed for film shooting is determined based on the brightness detection result and the specified aperture value (#A24). Here, a comparison between the values c and a/β (c represents the specified aperture value of the aperture diaphragm L11) is performed again (#A25). If c is smaller, that is, if the specified aperture value of the aperture diaphragm L11 of the taking lens is within the range in which a change in the aperture value does not affect the imaging on the image pickup device C21, the aperture value of the relay aperture diaphragm C18 is set to the open aperture value (F=a) (#A26), and an exposure compensation is performed (#A27). The exposure compensation performed here is to correct the difference between the specified aperture value c and the value a/β. For example, if the specified aperture value c is F=2.8, then a/β is 5.6, and accordingly, there is a difference 2 Ev. In other words, if the shutter speed of the image pickup device C21 is adjusted to the shutter speed for film shooting, the amount of light is 2 Ev short, even when the aperture of the relay aperture diaphragm is set to the open aperture value. Therefore, the shutter speed of the image pickup device C01 is slowed accordingly, that is, the electric charge accumulation time is increased, or the density of the ND filter C13 is reduced, or the amplification factor of the video signal shooting unit is increased. In contrast, if c is not smaller than a/β in #A25, that is, if the specified aperture value of the aperture diaphragm L11 of the taking lens is within the range in which a change in the aperture value affects the imaging on the image pickup device C21, the aperture value of the relay aperture diaphragm C18 is set to a value c·β, that is, a value corresponding to the aperture value of the aperture diaphragm L11 of the taking lens (#A28), and the shutter speed of the image pickup device C21 is set to a value determined in #A24 (#A29). For example, if the specified aperture value is F=8, the aperture value of the relay aperture diaphragm is set to F=8×(¼)=2.

If the exposure mode is set to S mode, the shutter speed for film shooting is set as the specified shutter speed, and the shutter speed (electric charge accumulation time) of the image pickup device C21 is set to a value equivalent to the specified shutter speed. The aperture value d of the taking lens is determined based on the shutter speed and the detection result of the brightness detection device C12 (#S24), and a comparison between the values of a/β and d (#S25). If d is smaller, the aperture value of the relay aperture diaphragm C18 is set to the open aperture value a, and an exposure compensation is performed (#S26 and #S27). The exposure compensation performed here is to correct the difference between the specified aperture value c and the value a/β. For example, if the specified aperture value d is F=2.8, then a/β is 5.6, and accordingly, there is a difference 2 Ev. Thus, the amount of light is 2 Ev short, even if the aperture of the relay aperture diaphragm is set to the open aperture value. Therefore, the density of the ND filter C13 is reduced, or the amplification factor of the video signal shooting unit is increased. In contrast, if d is not smaller than a/β in #S25, the aperture value of the relay aperture diaphragm C18 is set to a value F=d·β, that is, a value corresponding to the aperture value of the aperture diaphragm L11 of the taking lens (#S28).

If the exposure mode is set to P mode, or if a shooting scene is selected, the aperture value e of the aperture diaphragm L11 of the taking lens and the shutter speed are determined according to a predetermined program chart based on the detection result of the brightness detection device C12 (#P24). Here, a comparison between the aperture value e of the aperture diaphragm L11 of the taking lens and the value a/β (#P25). If e is smaller, the aperture value of the relay aperture diaphragm C18 is set to the open aperture value a, and an exposure compensation is performed (#P26 to #P27). In order to obtain proper exposure at the open aperture value a of the relay aperture diaphragm C18, the exposure compensation here shifts the shutter speed (electric charge accumulation time) of the image pickup device C21, or changes the density of the ND filter C13, or changes the amplification factor of the video signal imaging unit. In contrast, if e is not smaller than a/β in #P25, the aperture value of the relay aperture diaphragm C18 is set to e·β (#P28), and the shutter speed of the image pickup device C21 is set to a value corresponding thereto (#P29).

If the exposure mode is set to M mode, the same control as is performed prior to step #M15 is performed based on the specified shutter speed and aperture value.

As a result of the above described operation, when the operator presses down the shutter release button 3 half the way in, that is, when the operator performs shooting preparation operation, taken images are successively (in the state of a moving picture) displayed in the electronic viewfinder FIN, that is, images are previewed (moving-picture preview).

Simultaneously, the determined aperture value and shutter speed are indicated in the electronic viewfinder (#22). It is to be noted that an aperture value indicated here is not the aperture value of the relay aperture diaphragm C18, but the aperture value of the aperture diaphragm L11 of the taking lens.

Figure 18:
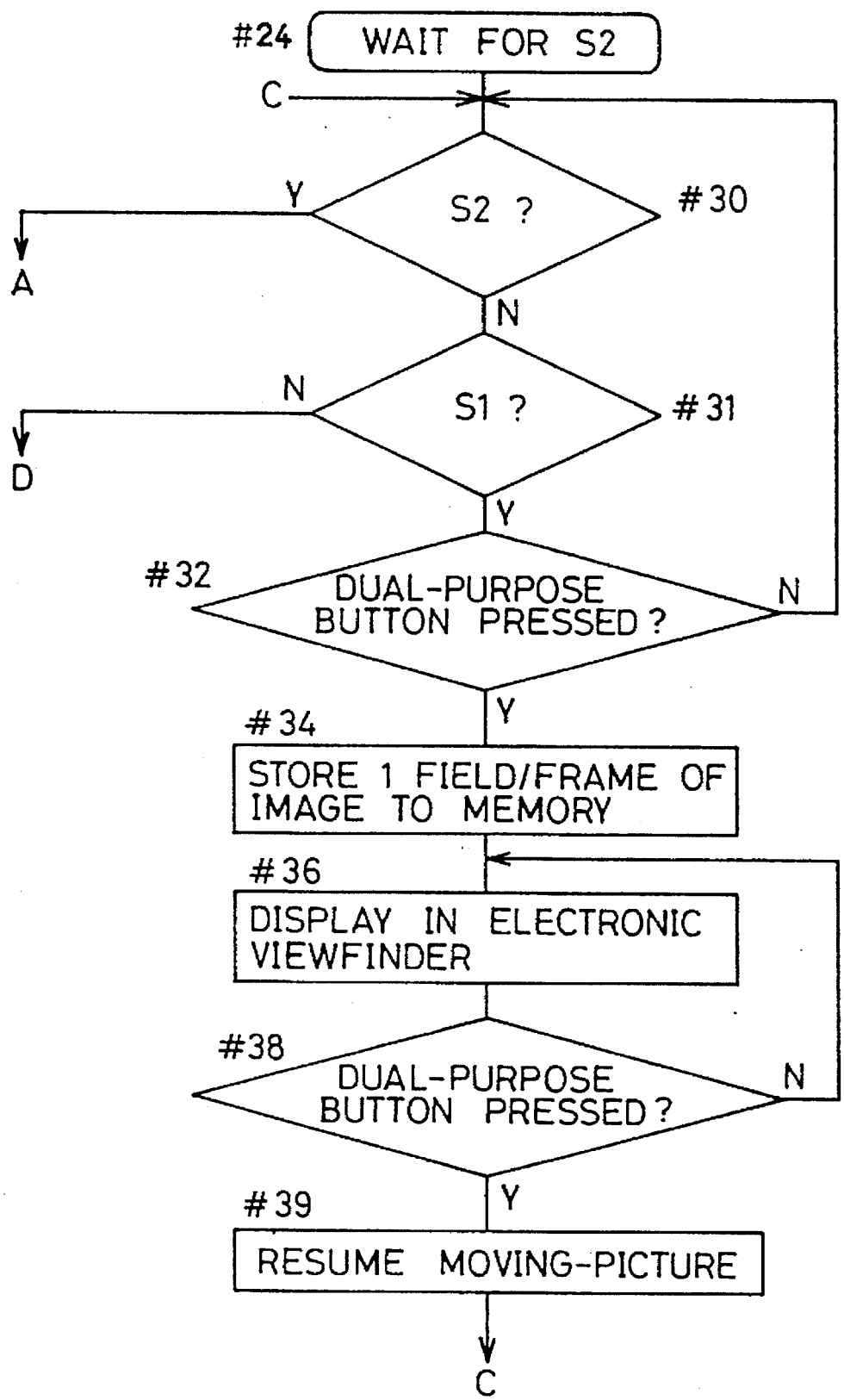

Thereafter, the camera waits for the operator either to press the shutter release button 3 further in (hereinafter referred to as the state S2), or to cancel the operation (that is, to cancel the state S1 by releasing the shutter release button 3) (#24; #30 and #31 in FIG. 18).

If the operator wishes to preview a picture as a still picture here, the operator operates the dual-purpose button 23 (#32). Thus, the camera microcomputer C01 operates so that one field, or one frame, of a picture at the instant when the dual-purpose button is pressed is retained in the memory C24-D shown in FIG. 12 (#34). The retained picture is displayed still in the electronic viewfinder FIN (C27) (still-picture preview) (#36). When the dual-purpose button 23 is operated again here, the retaining of the picture on the memory C24-D is canceled, and images are reproduced as a moving picture thereafter (#38 and #39). The process then returns to #30.

If the operator wishes to observe a picture taken with a flash, the operator installs a flash F onto the accessory shoe HS, and turns on the power of the flash. When the dual-purpose button 23 is operated here as in step #30, the camera microcomputer sets the electric charge accumulation time of the image pickup device C21 to a shutter speed (1/60 seconds, for example) suitable for flash shooting, and starts flashing synchronously with the start of electric charge accumulation. Then, the brightness detection device C12 is instructed to perform photometry and, when proper exposure is obtained, the flash controller F01 is instructed to stop flashing. A picture taken at this moment is retained in the memory C24-D, in step #32, and the picture is displayed still in the electronic viewfinder FIN (C27), in step #34.

Figure 19:
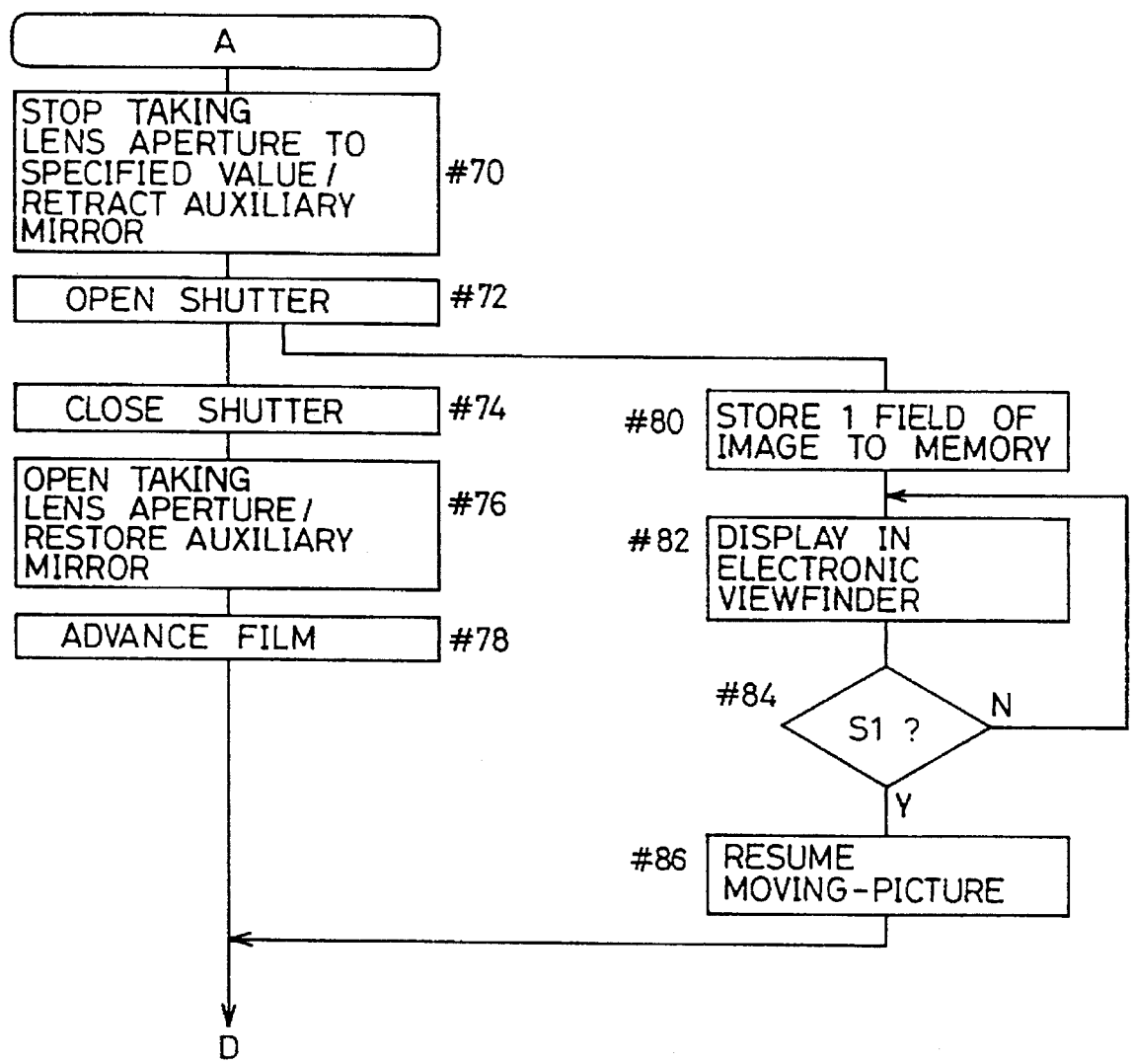

Next, when the operator presses the shutter release button 3 all the way in, that is, when the state S2 is established, the process proceeds to operations shown in FIG. 19. The camera microcomputer C01, detecting this state of the release button 3, stops down the aperture of the aperture diaphragm L11 of the taking lens to the specified value, and retracts the auxiliary mirror C05 out of the imaging light path (#70). In response to a signal indicating the completion of the above two operations, the camera microcomputer C01 instructs the shutter driving device C06 to open the shutter C07 at the specified speed. Thus, the shutter C07 is opened so that the film F is exposed to light (#72). After closing the shutter C07, the camera microcomputer C01 opens the aperture of the taking lens, reinstates the auxiliary mirror (#76), and then instructs the film advancing device C09 to advance the film one frame so that the film is advanced one frame (#78). The process then returns to step #20. In the case of shooting with a flash, during the above described operation, the flash controller F01 starts flashing of the flash F by an instruction given when the shutter C07 has been completely opened, and it stops flashing on receiving a signal indicating that proper exposure has been obtained.

The camera microcomputer C01 then operates so that one field, or one frame, of a picture is retained in the memory C24-D shown in FIG. 12 synchronously with the opening of the shutter C07 (#80). The picture retained in the memory C24-D is displayed as a still picture in the electronic viewfinder C27 (FIN) (#82). Thus, it is possible to observe through the electronic viewfinder FIN a picture which is substantially the same as a picture taken on a film. Simultaneously, the picture is transferred to the recording/playback converter C25 so that the picture is recorded on the magnetic tape MT. Accordingly, a picture which is recorded several frames earlier can be observed by playing it back from the magnetic tape.

A still picture displayed in the electronic viewfinder is kept displayed until the state S1 is established again (that is, until the release button 3 is pressed half the way in) (#84). As soon as the state S1 is established again, the camera restarts displaying a moving picture. The process then returns to step #20. While a still picture is being displayed, the video signal shooting unit remains inactive.

<Moving-Picture Video Shooting Mode>

Figure 20:
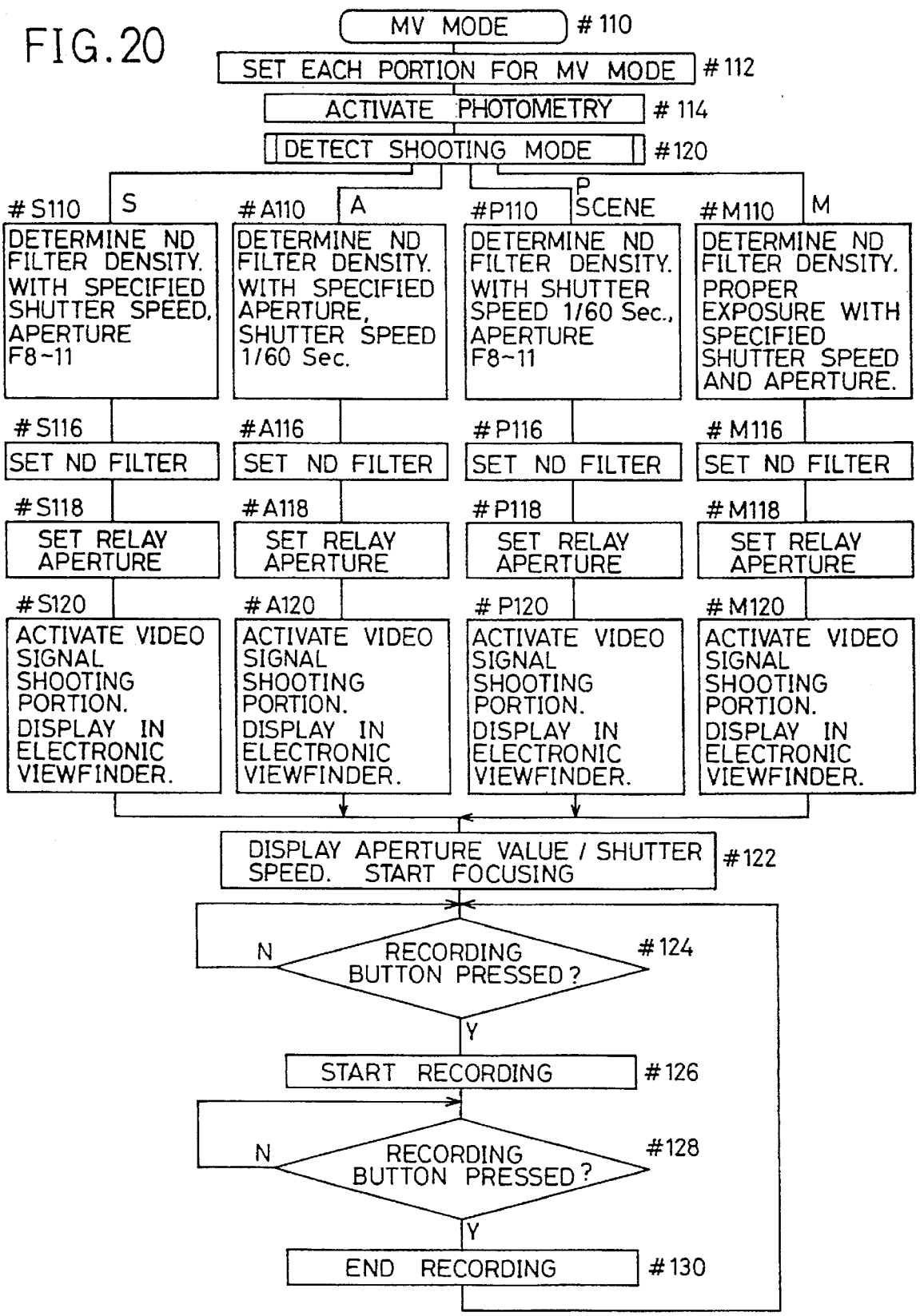
FIG. 20 is a flow chart showing the operation of a camera of the present invention in its moving-picture video shooting mode.

Next, with reference to FIG. 20, the operation of this embodiment in its moving-picture video shooting mode will be described below. In order to shoot a moving-picture video, the mode dial 1 shown in FIG. 2 is set to the position MV first (#110). The camera microcomputer C01 then sets each operation portion of the camera to a state suitable for moving-picture shooting (#112). As to the shooting scene (such as a portrait scene) and the exposure mode (such as an aperture priority mode), the stored settings which were specified when the moving-picture video shooting mode was previously selected are automatically selected.

Next, brightness metering (photometry) is performed by the brightness detection device C12, with the aperture of the aperture diaphragm L11 of the taking lens TL kept open (#114). Then, the specified exposure mode is detected (#120), and the density of the ND filter is determined according to the exposure mode. More specifically, if the exposure mode is set to A mode, the density Of the ND filter is so determined that the calculated shutter speed will be 1/60 seconds (#A110) on condition that the density is converted into an equivalent aperture value of the taking lens in calculation. If the calculated density exceeds the controllable range, the shutter speed is shifted so that the density will fall within the controllable range.

If the exposure mode is set to S mode, the density of the ND filter C13 is so determined that the aperture of the aperture diaphragm L11 of the taking lens TL will be within the range F=8 to F=11, if calculation is performed on the basis of the specified shutter speed (#S110). If the calculated value exceeds the controllable range, the aperture value is shifted so that the density will fall within the controllable range.

If the exposure mode is set to P mode, or if a shooting scene is selected, the density of the ND filter C13 is so determined that the aperture of the aperture diaphragm L11 of the taking lens TL will be within the range F=8 to F=11 on condition that calculation is performed based on the specified shutter speed (#P110). If the calculated value exceeds the controllable range, both the aperture value and the shutter speed are shifted so that the density will fall within the controllable range.

If the exposure mode is set to M mode, the density of the ND filter is so determined that proper exposure is obtained at the specified shutter speed and with the specified aperture value (#M110).

Then, the filter controller C15 controls the ND filter in order to obtain the density determined in each mode (#S116, #A116, #P116 and #M116), and the relay aperture diaphragm is stopped down according to the value specified or calculated in each mode (#S118, #A118, #P118, #M118). Simultaneously, the video signal shooting unit is activated, and the image pickup device C21 converts the light beam that has passed through the taking lens and through the relay optical system C14 into an electric signal. The thus converted electric signal is converted into a video signal by the circuits described in connection with FIG. 12, and the signal is then displayed as a picture in the electronic viewfinder FIN (#S120, #A120, #P120 and #M120).

Meanwhile, the camera microcomputer C01 sets the shooting control values based on the output from the A/D converter C22-B in the video signal shooting unit C22 shown in FIG. 12 (that is, based on the output from the image pickup device C21). More specifically, in order to achieve proper shooting, the shutter speed (electric charge accumulation time) of the image pickup device C21 is controlled in A mode, the aperture value of the relay aperture diaphragm C18 is controlled in S mode, and a combination of the shutter speed (electric charge accumulation time) of the image pickup device C21 and the aperture value of the relay aperture diaphragm C18 is controlled according to a predetermined program chart in P mode. If a control value for proper shooting exceeds the permissible range, the gain of the amplifier C22-C is so controlled that proper shooting will be achieved.

In case the brightness of the subject substantially changes (for example, more than 4 Ev), the density of the ND filter is controlled accordingly Simultaneously, the determined aperture value and shutter speed are indicated in the electronic viewfinder (#122). It is to be noted that an aperture value indicated here is not the aperture value of the relay aperture diaphragm C18, but that of the aperture diaphragm L11 of the taking lens. The camera microcomputer C01 then waits for the operator to press the recording button 25 (#124).

When the recording button 25 is operated, the camera microcomputer C01 controls the recording/playback converter C25, the magnetic head C26, and the magnetic tape driver C36 in order to record video and audio signals on the magnetic tape MT (#126). If the recording button 25 is operated again during recording, the recording is stopped (#128 to #130).

It is to be noted that it is possible to perform shooting on a film by pressing the shutter release button 3 anytime except during recording, though a detailed description will not be given in this respect.

<Simultaneous Shooting Mode>

Figure 21:
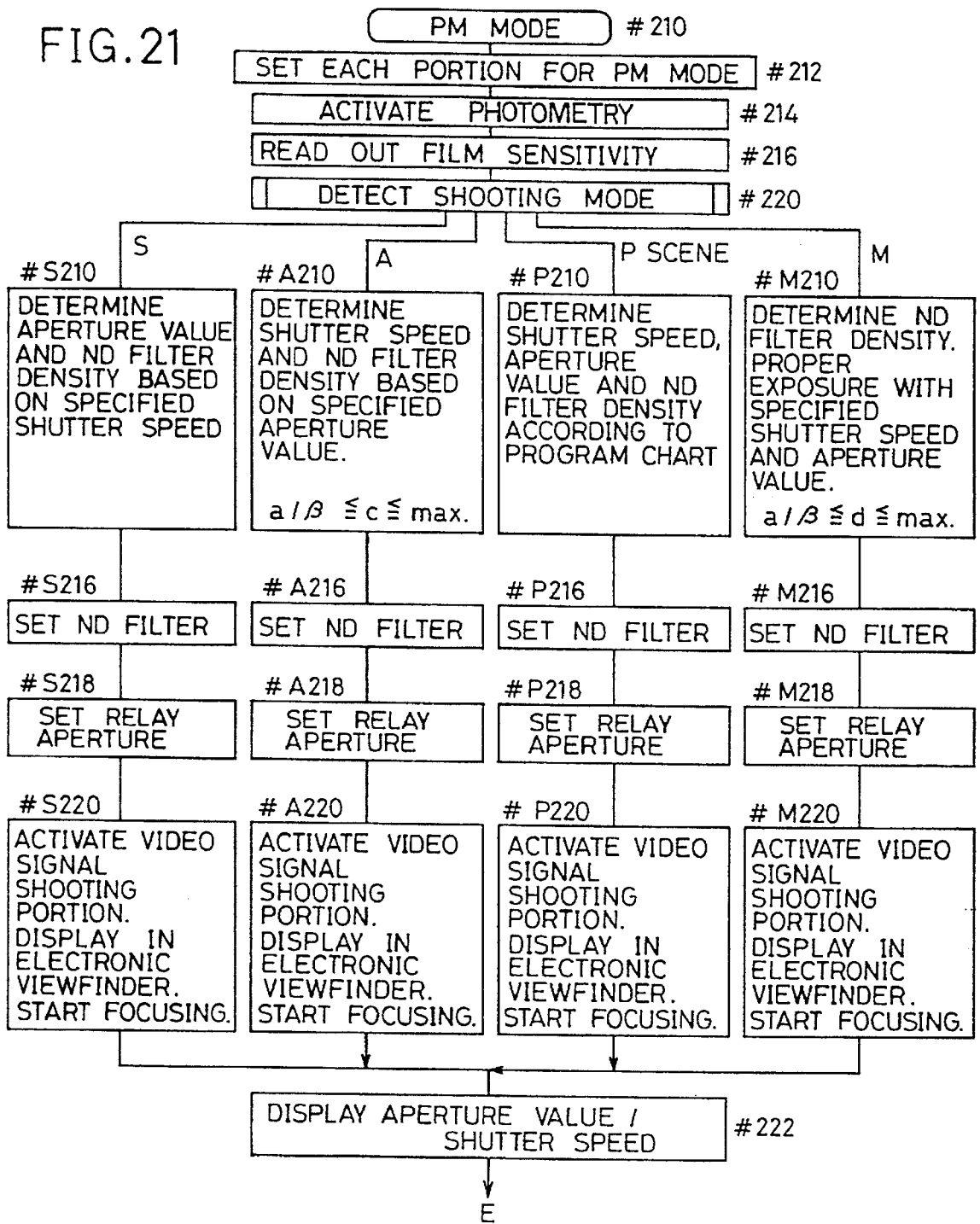
FIGS. 21 to 23 are flow charts showing the operation of a camera of the present invention in its simultaneous shooting mode.

Next, with reference to FIGS. 21 to 23, the operation of this embodiment in its simultaneous shooting mode will be described below. In order to perform simultaneous shooting, the mode dial 1 shown in FIG. 2 is switched to the position PM first (#210). The camera microcomputer C01 then sets each operation portion of the camera to a state suitable for simultaneous shooting (#212). As to the shooting scene (such as a portrait scene) and the exposure mode (such as an aperture priority mode), the stored settings which were specified when the simultaneous shooting mode was previously selected are automatically selected.

Next, photometry is performed by the brightness detection device C12, with the aperture of the aperture diaphragm L11 of the taking lens TL kept open (#214), and the sensitivity of the film loaded in the camera is detected (#216). Then, the specified exposure mode is detected (#220), and the density of the ND filter is determined according to the exposure mode. More specifically, if the exposure mode is set to A mode, the density of the ND filter and the shutter speed are determined based on the specified aperture value of the taking lens and the sensitivity of the film (#A210). Here, the aperture value c of the taking lens can be set to a value within the range from the maximum aperture value (the aperture value when the aperture is completely stopped down) to $a/\beta$ (a represents the open aperture value of the relay aperture diaphragm C18, and $\beta$ represents the magnification of the relay optical system). In other words, the aperture value c cannot be set to a value wider than $a/\beta$. This is because, even if the aperture is opened wider than the above range, such a setting is not reflected by the image pickup device C21.

If the exposure mode is set to S mode, the density of the ND filter and the aperture value are determined based on the specified shutter speed and the film sensitivity (#S210).

If the exposure mode is set to P mode, or if a shooting scene is selected, the shutter speed, the aperture value, and the density of the ND filter are determined according to a program chart similar or analogous (in this case, the difference is 1 Ev at maximum) to the program chart for the film shooting mode (#P210).

If the exposure mode is set to M mode, the density of the ND filter is so determined that proper exposure will be obtained at the specified shutter speed and with the specified aperture value (#M210). However, just as in A mode, the aperture value d of the taking lens can be set to a value within the range from the maximum aperture value (the aperture value when the aperture is completely stopped down) to $a/\beta$ (a represents the open aperture value of the relay aperture diaphragm C18, and $\beta$ represents the magnification of the relay optical system). In other words, the aperture value d cannot be set to a value wider than $a/\beta$.

Then, the filter controller C15 controls the ND filter in order to obtain the density determined in each mode (#S216, #A216, #P216 and #M216), and the relay aperture diaphragm is stopped down according to the value specified or calculated in each mode (#S218, #A218, #P218, #M218). It is to be noted that, if the exposure mode is set to A mode, the aperture value of the relay aperture diaphragm is determined as $c\cdot\beta$ (c represents the specified aperture value of the taking lens, and $\beta$ represents the magnification of the relay optical system).

Simultaneously, the video signal shooting unit is activated, and the image pickup device C21 converts the light beam that has passed through the taking lens TL and the relay optical system C14 into an electric signal. The thus converted electric signal is converted into a video signal in the video signal shooting unit, and the signal is then displayed as a picture in the electronic viewfinder FIN (#S220, #A220, #P220 and #M220). Simultaneously, focusing is started.

Meanwhile, the camera microcomputer C01 sets the shooting control values based on the output from the A/D converter C22-B in the video signal shooting unit C22 shown in FIG. 12 (that is, based on the output from the image pickup device C21). More specifically, in order to achieve proper shooting, the shutter speed (electric charge accumulation time) of the image pickup device C21 is controlled in A mode, the aperture value of the relay aperture diaphragm C18 is controlled in S mode, and a combination of the shutter speed (electric charge accumulation time) of the image pickup device C21 and the aperture value of the relay aperture diaphragm C18 is controlled according to a predetermined program chart in P mode. If a control value for proper shooting exceeds the permissible range, the gain of the amplifier C22-C is so controlled that proper shooting will be achieved.

In case the brightness of the subject largely changes (for example, more than 4 Ev), the density of the ND filter is controlled accordingly.

Simultaneously, the determined aperture value and shutter speed are indicated in the electronic viewfinder (#222). It is to be noted that the aperture value indicated here is not the aperture value of the relay aperture diaphragm C18, but a value converted to a corresponding aperture value of the aperture diaphragm L11 of the taking lens. The camera microcomputer C01 then waits for the operator to press the recording button 25 (#224).

When the recording button 25 is operated, the camera microcomputer C01 controls the recording/playback converter C25, the magnetic head C26, and the magnetic tape driver C36 in order to record video and audio signals on the magnetic tape (#226). If the recording button 25 is operated again during recording, the recording is stopped (#240 to #242).

In the above described moving picture video shooting mode, it is possible to perform film shooting only when recording is not performed, in other words, either recording or film shooting can be performed at a time. In this mode, in contrast, it is possible to perform both simultaneously. More specifically, when the operator presses the shutter release button half the way in after starting recording (after #226), that is, when the state S1 is established (#225), brightness detection and focus detection are performed again, so that the shutter speed and the aperture value are determined (#227).

Figure 23:
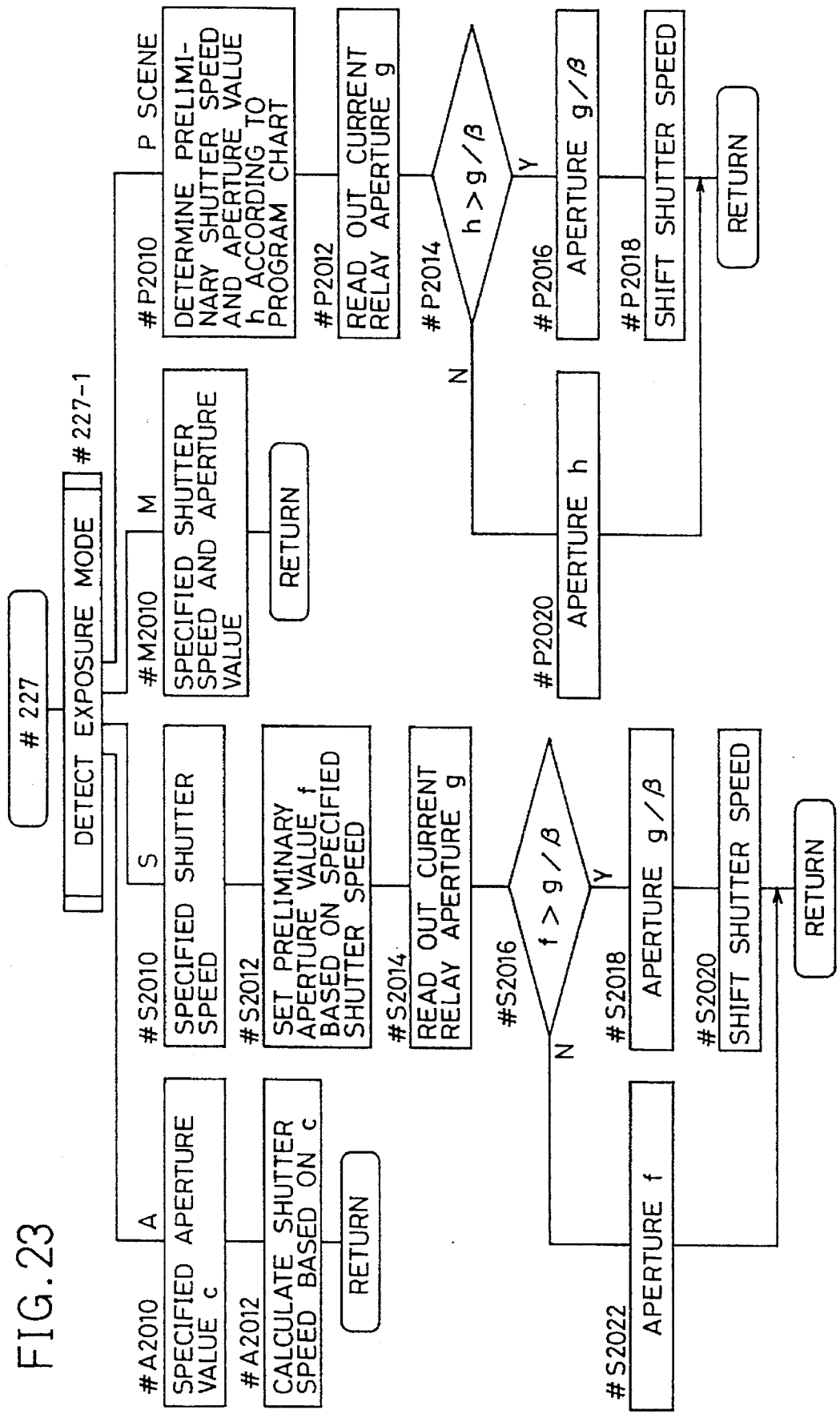

With reference to FIG. 23, a description is given below as to how the shutter speed and the aperture value are determined in step #227 above.

First, the current exposure mode is detected (#227-1). If the exposure mode is set to A mode, the previously specified aperture value c is used (#2010). Then, the shutter speed is determined based on the aperture value c (#2012), and the process returns to the main operation stream.

If the aperture mode is set to S mode, the shutter speed is preliminarily set to the specified value (#S2010), and the aperture value is set to a preliminary value f which is determined based on the shutter speed (#S2012). Next, the currently specified aperture value g of the relay aperture diaphragm is read out (#S2014), and a comparison is performed between the values f and g/β (#S2016). If f is greater, the aperture value of the aperture diaphragm L11 is changed to the value g/β that corresponds to the current aperture value of the relay aperture diaphragm (#S2018), because, if the aperture value of the aperture diaphragm L11 is set to f, imaging on the image pickup device is affected. Then, the shutter speed is shifted according to the aperture value g/β (#S2020), and the process returns to the main operation stream.

If f is not greater than g/β, the preliminary value f is determined as the specified value (#S2022), since, in this case, imaging on the image pickup device is not affected. The process then returns to the main operation stream.

If the aperture mode is set to P mode, the shutter speed and the aperture value h are set to preliminary values according to the program chart (#P2010). Then the currently specified aperture value g of the relay aperture diaphragm is read out (#P2012), and a comparison is performed between the values h and g/β (#P2014). If h is greater, the aperture value of the aperture diaphragm L11 is changed to the value g/β that corresponds to the current aperture value of the relay aperture diaphragm (#P2016), because, if the aperture value of the aperture diaphragm L11 is set to h, imaging on the image pickup device is affected. Then, the shutter speed is shifted according to the aperture value g/β (#P2018), and the process returns to the main operation stream. If h is not greater than g/β, the preliminary value h is determined as the specified value (#P2020), since, in this case, imaging on the image pickup device is not affected. The process then returns to the main operation stream. If the exposure mode is set to M mode, the specified aperture value and the specified shutter speed are adopted, and the process returns to the main operation stream (#M2010).

Figure 22:
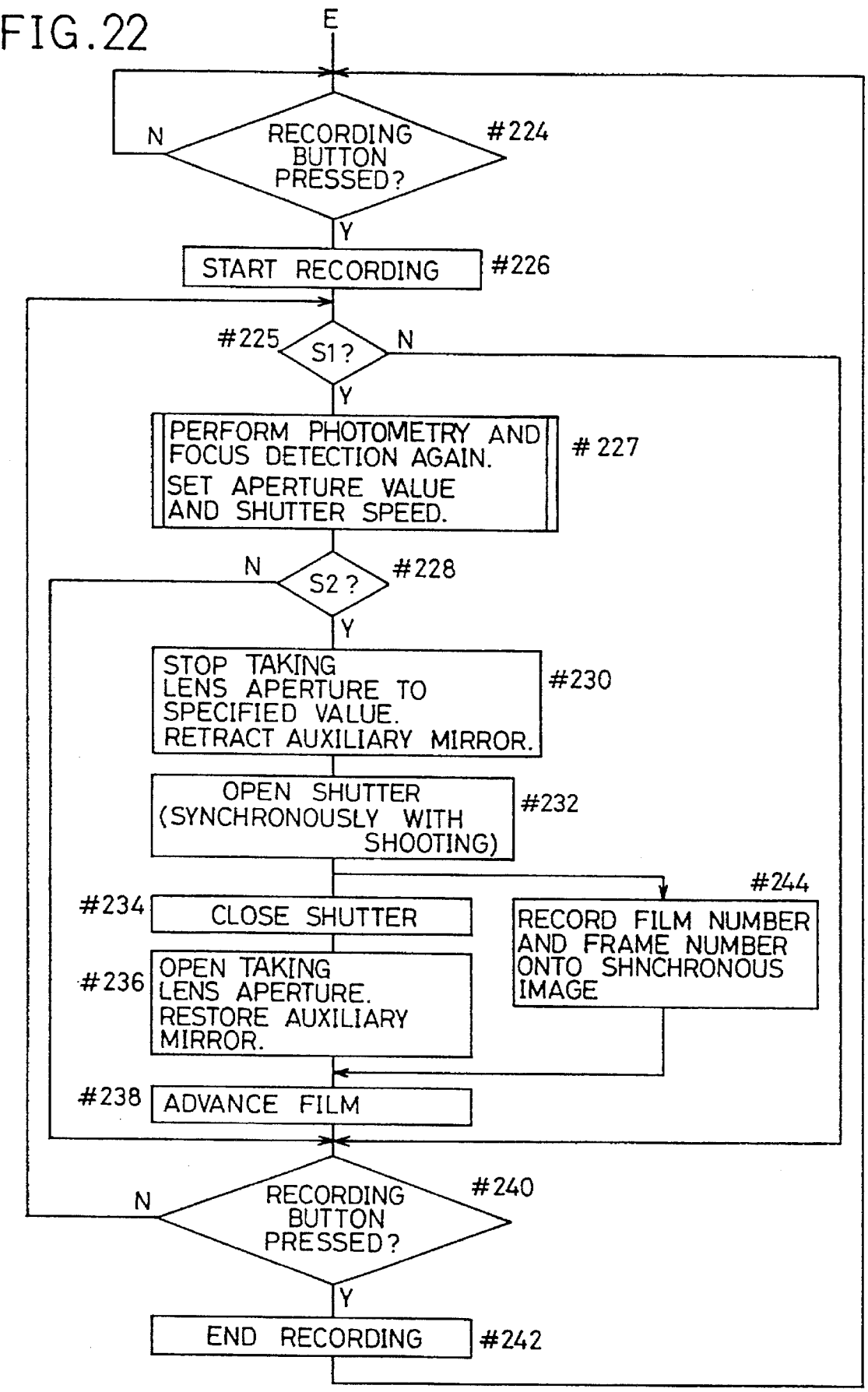

Next, when the operator presses the shutter release button 3 all the way in, that is, when the state S2 is established (#228) as shown in FIG. 22, the camera microcomputer C01, detecting this state, stops down the aperture of the aperture diaphragm of the taking lens according to the specified aperture value, and retracts the auxiliary mirror C05 out of the imaging light path (#230). In response to a signal indicating the completion of the above two operations, the camera microcomputer C01 instructs the shutter driving device C06 to open the shutter C07 at the specified speed. This instruction is issued synchronously with imaging by the image pickup device (#232). Thus, the shutter C07 is opened so that the film F is exposed to light.

After closing the shutter C07 (#234), the camera microcomputer C01 opens the aperture of the taking lens, reinstates the auxiliary mirror (#236), and then instructs the film advancing device C09 to advance the film one frame so that the film is advanced one frame (#238). In the case of shooting with a flash, during the above described operation, the flash controller F01 starts flashing of the flash F in response to an instruction given when the shutter C07 has been completely opened, and it stops flashing on receiving a signal indicating that proper exposure has been obtained.

On the other hand, the camera microcomputer C01 adds a film number representing the film currently loaded in the camera and a frame number representing the position of the frame on the film to the video signal corresponding one field of the image shot synchronously with the opening of the shutter C07, and records the resultant signal on the magnetic tape MT (#244). Thus, a picture taken on a film can be previewed before developing the film.

It is to be noted that, in this mode, it is possible to perform shooting on a film by pressing the shutter release button 3 anytime except during recording, though a detailed description will not be given in this respect.

Hereinafter, a second embodiment of the present invention will be described. In this embodiment, although the magnification of the relay optical system and the open aperture value of the relay aperture diaphragm are different from those of the first embodiment, the internal construction of the camera is the same as that of the first embodiment shown in FIGS. 11 to 13.

Figure 24:
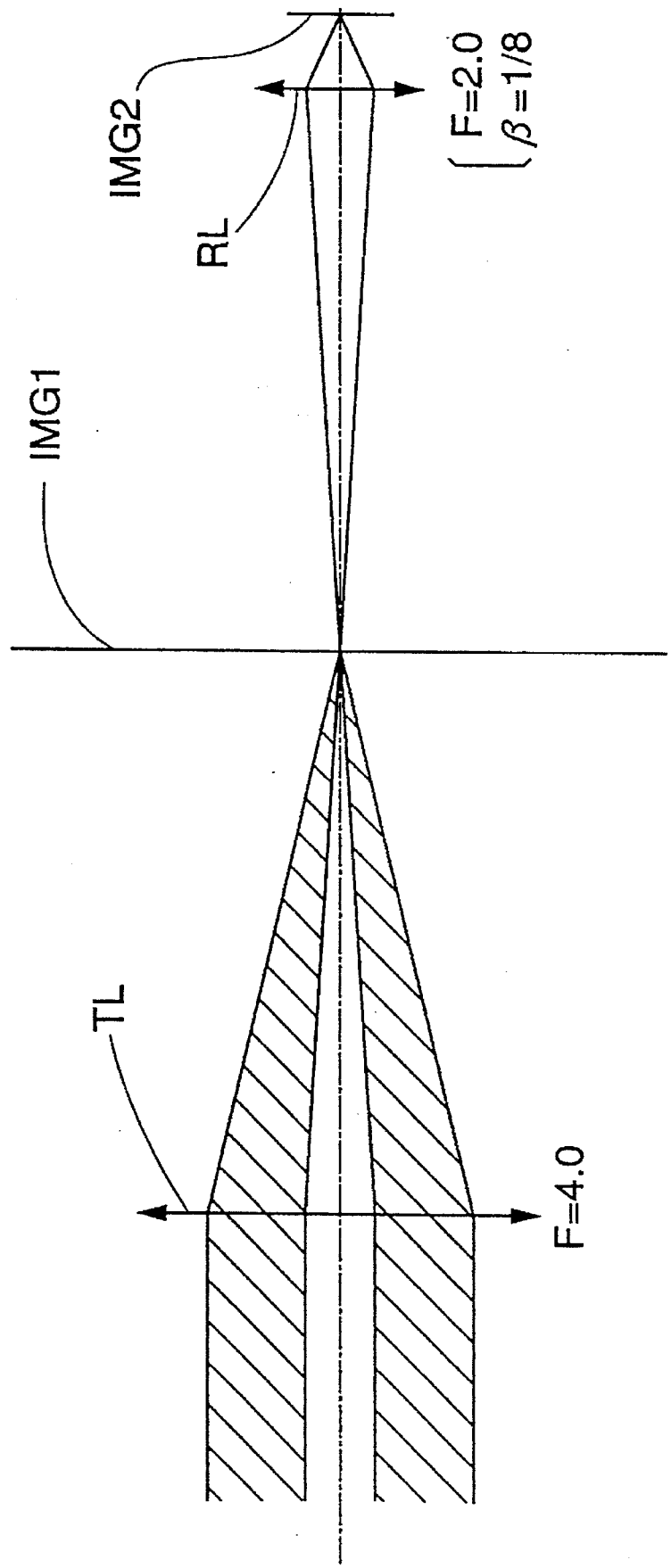
FIG. 24 is a diagram showing a light path in a camera of the second embodiment of the present invention.

As shown in FIG. 24, this embodiment uses a relay optical system of a magnification β=⅛, a relay aperture diaphragm of an open aperture value F=2.0 (also referred to as a), and a taking lens of an open aperture value F=4.0, among which the taking lens is the same as that used in the first embodiment. As shown in the figure, a light beam from the taking lens TL enters the relay optical system RL without diffusing on the primary image plane IMG1. Accordingly, of the light beam incident from the taking lens TL, only a portion corresponding to a/β=16.0, that is, F=16.0 is used as a light beam which passes through the relay optical system RL to form a secondary image IMG2, while the remaining light beam (indicated with hatching in the drawing) passing outside the light beam corresponding to F=16.0 does not enter the image pickup device. As a result, if the aperture is adjusted to be wider than F=16.0, the amount of light incident on the film F accordingly changes, without affecting the imaging on the image pickup device C21. If the aperture is stopped down (darkened) to more than the aperture value F=16.0, the aperture diaphragm L11 of the taking lens TL functions equivalently to the relay aperture diaphragm C18.

Accordingly, by controlling the aperture diaphragm L11 of the taking lens in the range from F=4 to F=16, the amount of light incident on the film can be controlled without affecting the amount of light incident on the image pickup device C21. Moreover, since only a light beam smaller than the aperture F=16 enters the image pickup device independently of the aperture value of the taking lens, a picture thus taken will have a deep depth of field, as if taken by pan-focusing.

<Film Shooting Mode>

Figure 25:
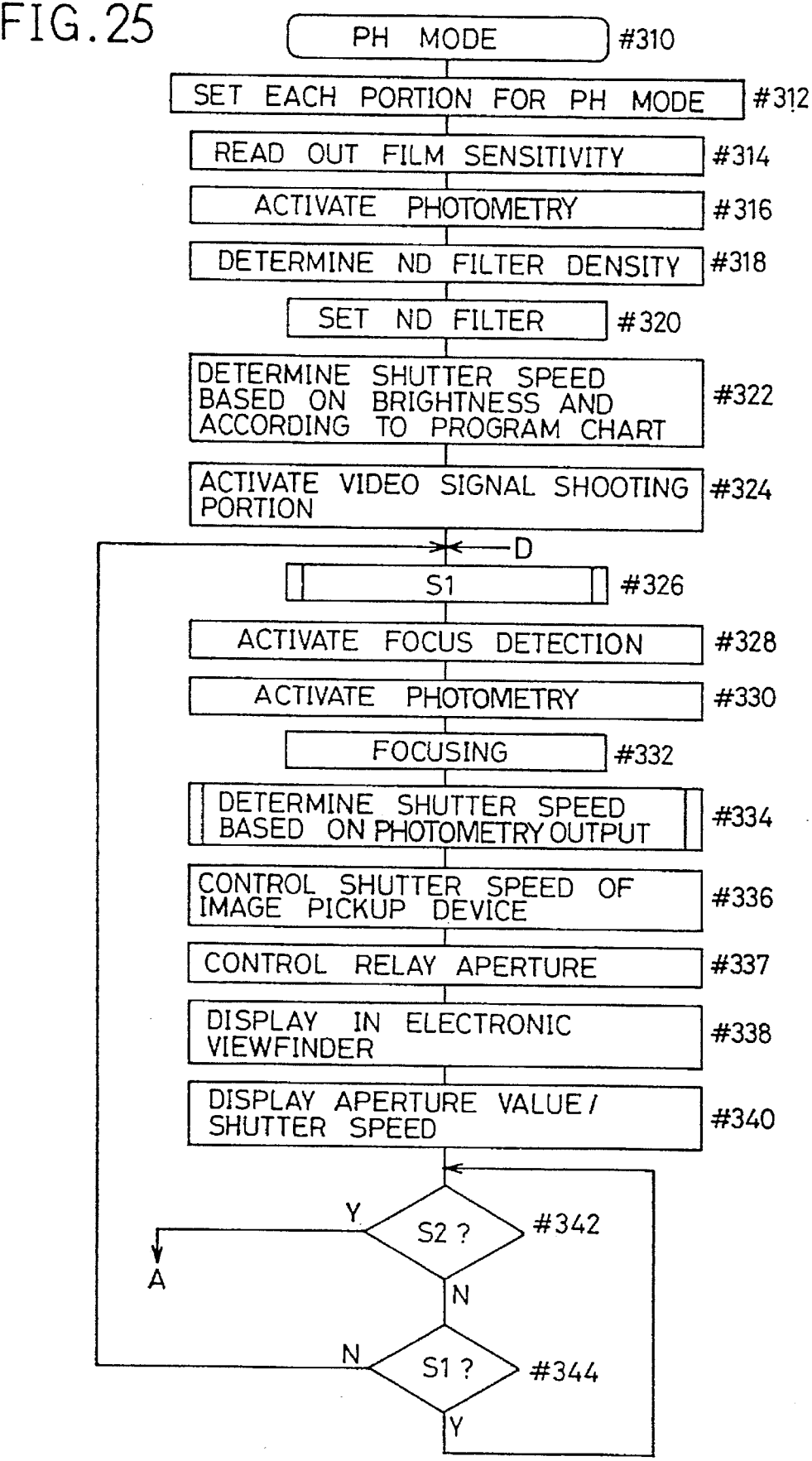
FIGS. 25 to 27 are flow charts showing the operation of a camera of the second embodiment in its film shooting mode.
Figure 26:
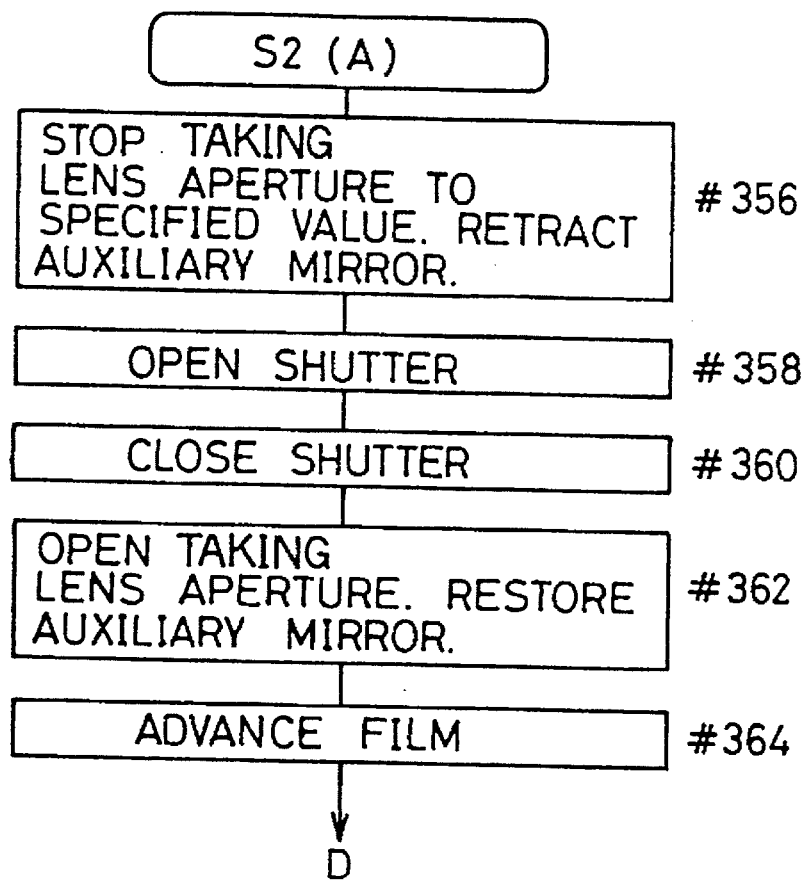
Figure 27:
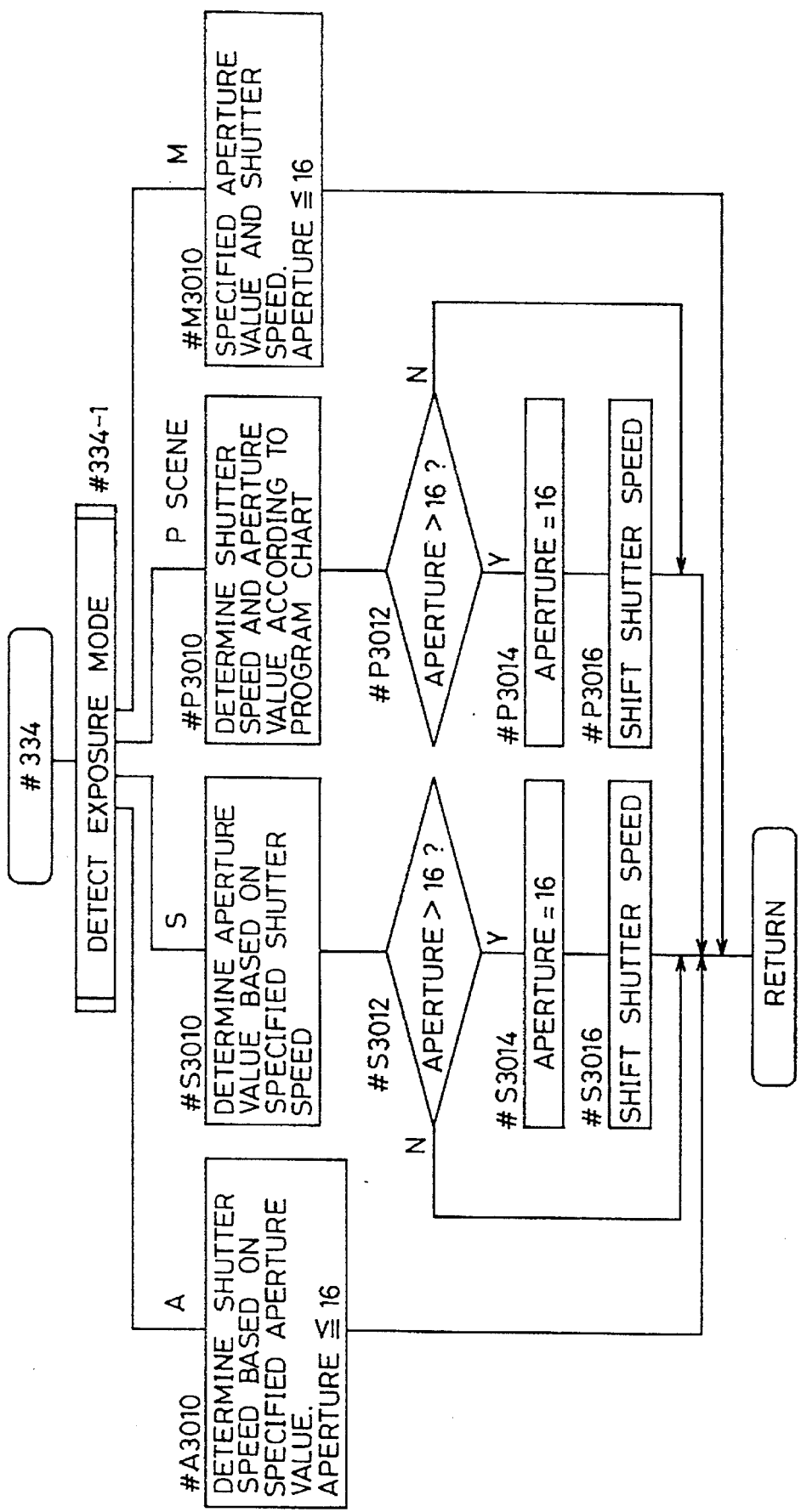

With reference to FIGS. 25 to 27, the operation of this embodiment in its film shooting mode will be described below. In order to take a picture on a film, the mode dial 1 shown in FIG. 2 is set to the position PH first (#310). The camera microcomputer C01 then sets each operation portion of the camera to a state suitable for film shooting, that is, to a state in which an operation portion, when operated, executes only a function assigned to film shooting out of a plurality of functions it may have for different modes (#312). As to the shooting scene (such as a portrait scene) and the exposure mode (such as an aperture priority mode), the stored settings which were specified when the film shooting mode was previously selected are automatically selected. The camera microcomputer C01 reads out the sensitivity of the film loaded in the camera (#314), starts photometry by the brightness detection device (#316), and determines the density of the ND filter C13 based on the sensitivity difference between the film and the image pickup device C21 (#318). The camera microcomputer then drives the filter driving device C15 according to the determined density in order to set the ND filter (#320).

Next, the shutter speed (electric charge accumulation time) is determined according to the detected brightness and the program chart predetermined for film shooting independently of the selected exposure mode (#322), and the video signal shooting unit (#324) is activated. The light beam incident through the taking lens TL travels via the main mirror C04, the mirror C11, the ND filter C13, the relay optical system C14, the optical low-pass filter C16, and the infrared light cut filter C17, and enters the image pickup device C21 to be taken as an image thereby. After imaging, the image signal, after being processed in the image processor C22 and the video processor C23 shown in FIG. 12, displays a picture in the electronic viewfinder C27 (FIN). The aperture value of the relay aperture diaphragm is determined based on the output from the A/D converter C22-B in the image processor C22, that is, based on the output from the image pickup device C21. Here, if the aperture value is out of the controllable range because of insufficient brightness, the shutter speed of the image pickup device may be shifted by approximately 1 Ev. Meanwhile, the aperture diaphragm L11 of the taking lens remains in the open-aperture state.

Thereafter, the camera waits for the operator to operate the shutter release button 3 (#326).

Later, when the operator presses the shutter release button 3 half the way in, that is, when the state S1 is established, the focus detection device C02 and the brightness detection device C12 shown in FIG. 11 are activated (#328 to #330). The focus detection device C02 detects the focusing condition of the taking lens TL, and transfers a detection result to the camera microcomputer C01. Based on the detection result, the microcomputer C01 transfers an driving instruction signal to the lens microcomputer L01, when necessary. The lens microcomputer L01 performs an operation so as to add conditions particular to the taking lens TL to the driving instruction, and, based on the operation result, drives the focus motor L09 (#332).

Further, the shutter speed is determined based on the result of the photometry by the brightness detection device C12 (#334).

With reference to FIG. 27, a detailed description will be given below as to the step #334. In FIG. 27, the exposure mode is detected first (#334-1). When the exposure mode is A mode, the shutter speed is determined according to a manually specified aperture value (#A3010), and the process returns to the main operation stream. It is to be noted that, in this embodiment, the aperture value cannot be set to a value greater (narrower) than F=16 in A mode.

If the exposure mode is set to S mode, the aperture value is calculated based on the specified shutter speed (#S3010), and a comparison is performed between the calculated aperture value and the value F=16 (#S3012). If the aperture value is greater than F=16, that is, a value representing an aperture narrower than F=16, the aperture value is changed to F=16 (#S3014), because the aperture value of the aperture diaphragm L11 of the taking lens affects imaging on the image pickup device C21 in such a case. The shutter speed is also shifted accordingly (#S3016). The process then returns to the main operation stream. If the aperture value is not greater than F=16, the process returns to the main operation stream without performing any special processing, since the aperture value of the aperture diaphragm L11 of the taking lens does not affect imaging on the image pickup device C21 in such a case.

If the exposure mode is set to P mode, the shutter speed and the aperture value is Calculated according to the program chart (#P3010), and a comparison is performed between the calculated aperture value and the value F=16 (#P3012). If the aperture value is greater tan F=16, that is, a value representing an aperture narrower than F=16, the aperture value is changed to F=16 (#P3014), because the aperture value of the aperture diaphragm L11 of the taking lens affects imaging on the image pickup device C21 in such a case. The shutter speed is also shifted accordingly (#P3016). The process then returns to the main operation stream. If the aperture value is not greater than F=16, the process returns to the main operation stream without performing any special processing, since the aperture value of the aperture diaphragm L11 of the taking lens does not affect imaging on the image pickup device C21 in such a case.

If the exposure mode is set to M mode, the shutter speed and the aperture value are set to the specified values, and the process returns to the main operation stream (#M3010). It is to be noted that, just as in A mode, the aperture value cannot be set to a value greater (narrower) than F=16 in M mode.

As shown in FIG. 25, the image pickup device C21 is controlled according to the electric charge accumulation time adapted to the above shutter speed (#336), and the relay aperture diaphragm C18 is controlled according to an output from the image pickup device C21 (#337). Then, the taken image is displayed in the electronic viewfinder (#338). Simultaneously, the determined aperture value and shutter speed are indicated in the electronic viewfinder (#340). It is to be noted that an aperture value indicated here is not the aperture value of the relay aperture diaphragm C18, but that of the aperture diaphragm L11 of the taking lens.

Thereafter, the camera waits for the operator either to press the Shutter release button 3 further in, that is, to establish the state S2, or to cancel the operation (#342 and #344).

Next, when the operator presses the shutter release button 3 all the way in, that is, when the state S2 is established, the camera microcomputer C01, detecting this state, stops down the aperture of the aperture diaphragm L11 of the taking lens according to the specified aperture value as shown in FIG. 26, and retracts the auxiliary mirror C05 out of the imaging light path (#356). In response to a signal indicating the completion of the above two operations, the camera microcomputer C01 instructs the shutter driving device C06 to open the shutter C07 at the specified speed. Thus, the shutter C07 is opened so that the film F is exposed to light (#358). After closing the shutter C07, the camera microcomputer C01 opens the aperture of the taking lens, reinstates the auxiliary mirror (#360 to #362), and then instructs the film advancing device C09 to advance the film one frame so that the film is advanced one frame (#364). In the case of shooting with a flash, during the above described operation, the flash controller F01 starts flashing of the flash F in response to an instruction given when the shutter C07 has been completely opened, and it stops flashing in response to a signal indicating that proper exposure has been obtained. When the shooting is completed, the process returns to step #326.

<Moving Picture Video Shooting Mode>

Figure 28:
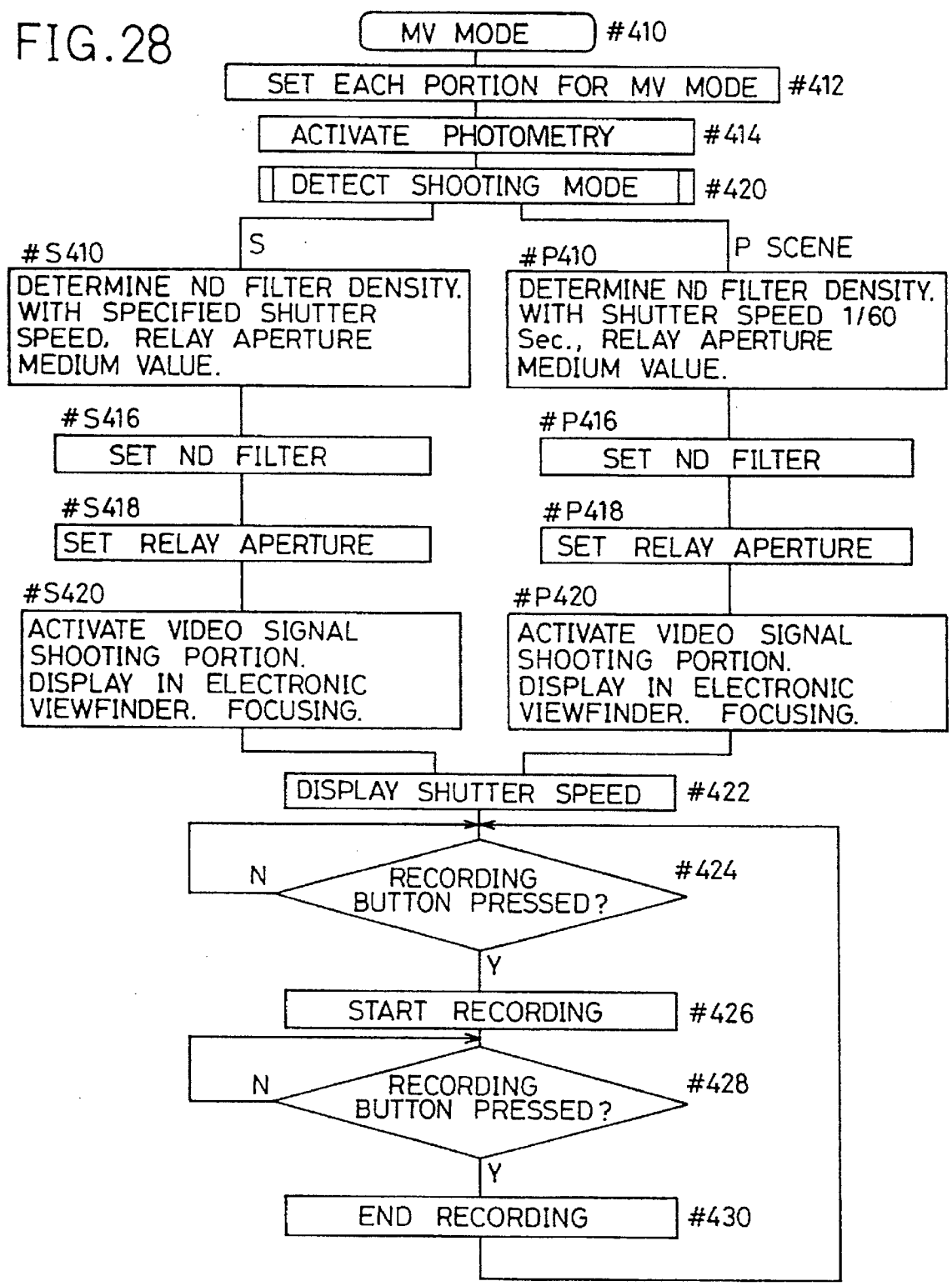
FIG. 28 is a flow chart showing the operation of a camera of the second embodiment in its moving-picture video shooting mode.

Next, with reference to FIG. 28, the operation of this embodiment in its moving-picture video shooting mode will be described below. In order to shoot a moving-picture video, the mode dial 1 shown in FIG. 2 is set to the position MV first (#410). The camera microcomputer C01 then sets each operation portion of the camera to a state suitable for moving-picture shooting (#412). As to the shooting scene (such as a portrait scene) and the exposure mode (such as an aperture priority mode), the stored settings which were specified when the moving-picture video shooting mode was previously selected are automatically selected. However, the exposure mode can be set to either P or S mode here, and, if M or A mode is selected, the mode is forcibly set to P mode. Alternatively, the operation may be aborted with a warning indication if M or A mode is selected.

Next, brightness metering (photometry) is performed by the brightness detection device C12, with the aperture of the aperture diaphragm L11 of the taking lens TL kept open (#414). Then, the specified exposure mode is detected (#420), and the density of the ND filter is determined according to the exposure mode. More specifically, if the exposure mode is set to S mode, the density of the ND filter is so determined that the aperture value of the relay aperture diaphragm will be a mid-point value of the controllable range on condition that calculation is performed based on the electric charge accumulation time of the image pickup device C21 corresponding to the specified shutter speed (#A410). If the calculated density exceeds the controllable range, the aperture value is shifted by calculation so that the density will fall within the controllable range.

If the exposure mode is set to P mode, or if a shooting scene is selected, the density of the ND filter is so determined that the aperture value of the relay aperture diaphragm will be a mid-point value of the controllable range on the condition that calculation is performed based on the electric charge accumulation time of the image pickup device C21 corresponding to the shutter speed of 1/60 seconds (#P410). If the calculated density exceeds the controllable range, both the aperture value and the shutter speed are shifted so that the density will fall within the controllable range.

Then, the filter controller C15 controls the ND filter in order to obtain the density determined in each mode, and the relay aperture diaphragm is stopped down according to the value specified in each mode (#S416 to #S418, and #P416 to #P418). Simultaneously, the video signal shooting unit is activated, and the image pickup device C21 converts the light beam that has passed through the taking lens TL and the relay optical system C14 into an electric signal. The thus converted electric signal is converted into a video signal by the circuits described in connection with FIG. 12, and the signal is then displayed as a picture in the electronic viewfinder FIN. Simultaneously, focusing is started (#S420 and #P420).

Meanwhile, the camera microcomputer C01 sets the shooting control values based on the output from the A/D converter C22-B in the image processor C22 shown in FIG. 12 (that is, based on the output from the image pickup device C21). More specifically, in order to achieve proper shooting, the aperture value of the relay aperture diaphragm C18 is controlled in S mode, and a combination of the shutter speed (electric charge accumulation time) of the image pickup device C21 and the aperture value of the relay aperture diaphragm C18 is controlled according to a predetermined program chart in P mode.

In case the brightness of the subject substantially changes (for example, more than 4 Ev), the density of the ND filter is controlled accordingly.

Simultaneously, the determined aperture value and shutter speed are indicated in the electronic viewfinder (#424). Thereafter, the camera waits for the operator to operate the recording button 25 (#424).

When the recording button 25 is operated, the camera microcomputer C01 controls the recording/playback converter C25, the magnetic head C26, and the magnetic tape driver C36 in order to record video and audio signals on the magnetic tape MT (#426). If the recording button 25 is operated again during recording, the recording is stopped (#428 to #430).

It is to be noted that it is possible to perform shooting on a film by pressing the shutter release button 3 anytime except during recording, though a detailed description will not be given in this respect.

<Simultaneous Shooting Mode>

Figure 29:
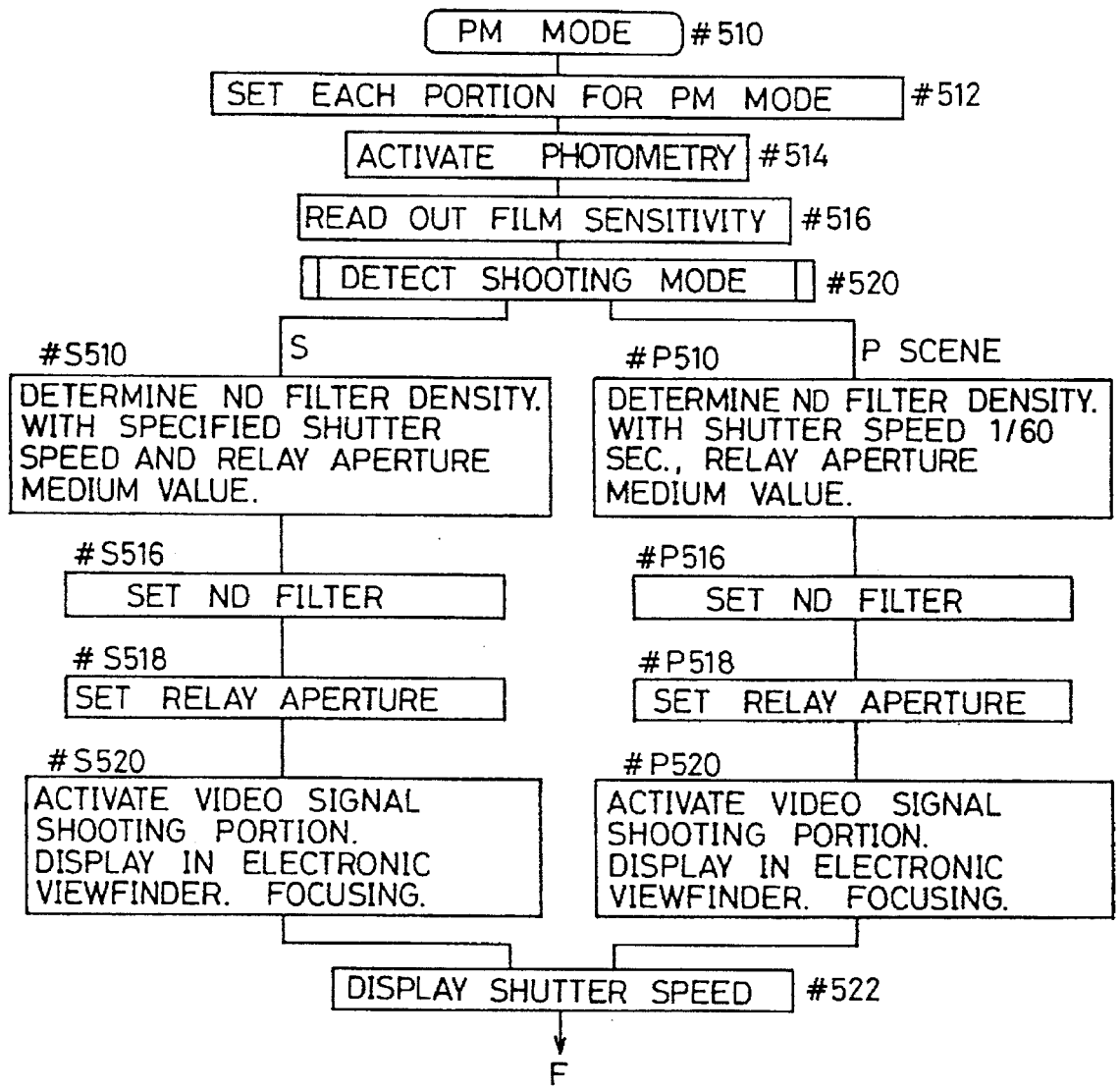
FIGS. 29 to 31 are flow charts showing the operation of a camera of the second embodiment in its simultaneous shooting mode.

Next, with reference to FIGS. 29 to 31, the operation of this embodiment in its simultaneous shooting mode will be described below. In order to perform simultaneous shooting, the mode dial 1 shown in FIG. 2 is set to the position PM first (#510). The camera microcomputer C01 then sets each operation portion of the camera to a state suitable for simultaneous shooting (#512). As to the shooting scene (such as a portrait scene) and the exposure mode (such as an aperture priority mode), the stored settings which were specified when the simultaneous shooting mode was previously selected are automatically selected. However, the exposure mode can be set to either P or S mode here, and, if M or A mode is selected, the mode is forcibly set to P mode. Alternatively, the operation may be aborted with a warning indication if M or A mode is selected.

Next, photometry is performed by the brightness detection device C12, with the aperture of the aperture diaphragm L11 of the taking lens TL kept open (#514). Then, the specified exposure mode is detected (#520), and the density of the ND filter is determined according to the exposure mode. More specifically, if the exposure mode is set to S mode, the density of the ND filter is so determined that the aperture value of the relay aperture diaphragm will be a mid-point value of the controllable range on condition that calculation is performed based on the electric charge accumulation time of the image pickup device C21 corresponding to the specified shutter speed (#S510). If the calculated density exceeds the controllable range, the aperture value is shifted by calculation so that the density will fall within the controllable range.

If the exposure mode is set to P mode, or if a shooting scene is selected, the density of the ND filter is so determined that the aperture value of the relay aperture diaphragm will be a mid-point value of the controllable range on condition that calculation is performed based on the electric charge accumulation time of the image pickup device C21 corresponding to the shutter speed of 1/60 seconds (#P510). If the calculated density exceeds the controllable range, both the aperture value and the shutter speed are shifted by calculation so that the density will fall within the controllable range.

Then, the filter controller C15 controls the ND filter in order to obtain the density determined in each mode, and the relay aperture diaphragm is stopped down according to the value specified in each mode (#S516 to #S518, and #P516 to #P518). Simultaneously, the video signal shooting unit is activated, and the image pickup device C21 converts the light beam that has passed through the taking lens TL and through the relay optical system C14 into an electric signal. The thus converted electric signal is converted into a video signal by the circuits described in connection with FIG. 12, and the signal is then displayed as a picture in the electronic viewfinder FIN. Simultaneously, focusing is started (#S520 and #P520).

Meanwhile, the camera microcomputer C01 sets the shooting control values based on the output from the A/D converter C22-B in the image processor C22 shown in FIG. 12 (that is, based on the output from the image pickup device C21). More specifically, in order to achieve proper shooting, the aperture value of the relay aperture diaphragm C18 is controlled in S mode, and a combination of the shutter speed (electric charge accumulation time) of the image pickup device C21 and the aperture value of the relay aperture diaphragm C18 is controlled according to a predetermined program chart in P mode.

In case the brightness of the subject substantially changes (for example, more than 4 Ev), the density of the ND filter is controlled accordingly.

Simultaneously, the determined aperture value and shutter speed are indicated in the electronic viewfinder (#522). Thereafter, the camera waits for the operator to operate the recording button 25 (#524).

When the recording button 25 is operated, the camera microcomputer C01 controls the recording/playback converter C25, the magnetic head C26, and the magnetic tape driver C36 in order to record video and audio signals on the magnetic tape MT (#526). If the recording button 25 is operated again during recording, the recording is stopped (#540 to #542).

In the above moving picture video shooting mode, it is possible to perform film shooting only when recording is not performed, in other words, either recording or film shooting can be performed at a time. In this mode, in contrast, it is possible to perform both simultaneously. More specifically, when the operator presses the shutter release button half the way in after starting recording (after #526), that is, when the state S1 is established (#525), brightness detection and focus detection are performed again, so that the shutter speed and the aperture value are determined (#527).

Figure 31:
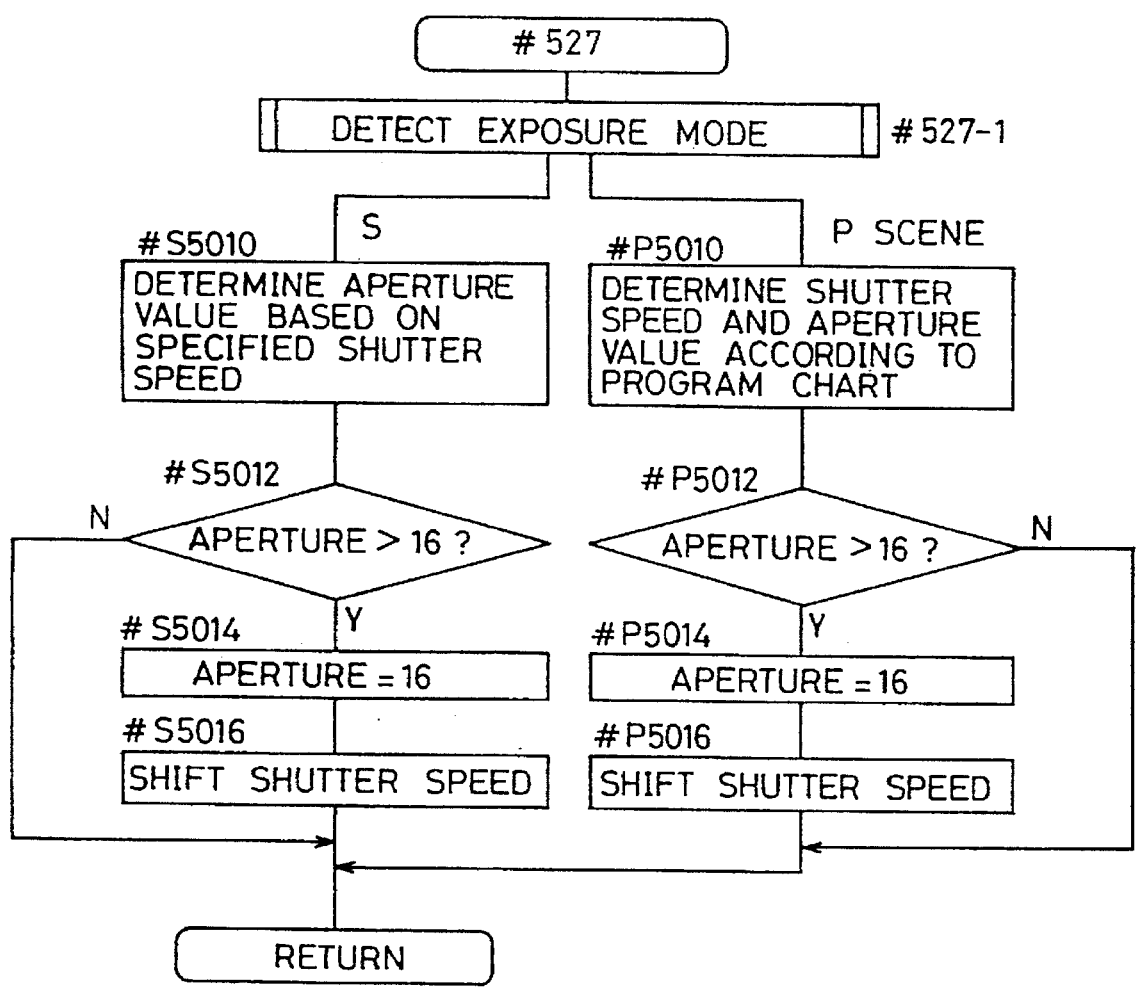

With reference to FIG. 31, a detailed description will be given below as to the step #527. In FIG. 31, the exposure mode is detected first (#527-1).

If the exposure mode is set to S mode, the aperture value is calculated based on the specified shutter speed (#S5010), and a comparison is performed between the calculated aperture value and the value F=16 (#S5012). If the aperture value is greater than F=16, that is, a value representing an aperture narrower than F=16, the aperture value is changed to F=16 (#S5014), because the aperture value of the aperture diaphragm L11 of the taking lens affects imaging on the image pickup device C21 in such a case. The shutter speed is also shifted accordingly. The process then returns to the main operation stream (#S5016). If the aperture value is not greater than F=16, the process returns to the main operation stream without performing any special processing, since the aperture value of the aperture diaphragm L11 of the taking lens does not affect imaging on the image pickup device C21 in such a case.

If the exposure mode is set to P mode, the shutter speed and the aperture value is calculated according to the program chart (#P5010), and a comparison is performed between the calculated aperture value and the value F=16 (#P5012). If the aperture value is greater than F=16, that is, a value representing an aperture narrower than F=16, the aperture value is changed to F=16 (#P5014), because the aperture value of the aperture diaphragm L11 of the taking lens affects imaging on the image pickup device C21 in such a case. The shutter speed is also shifted accordingly. The process then returns to the main operation stream (#P5016). If the aperture value is not greater than F=16, the process returns to the main operation stream without performing any special processing, since the aperture value of the aperture diaphragm L11 of the taking lens does not affect imaging on the image pickup device C21 in such a case.

Figure 30:
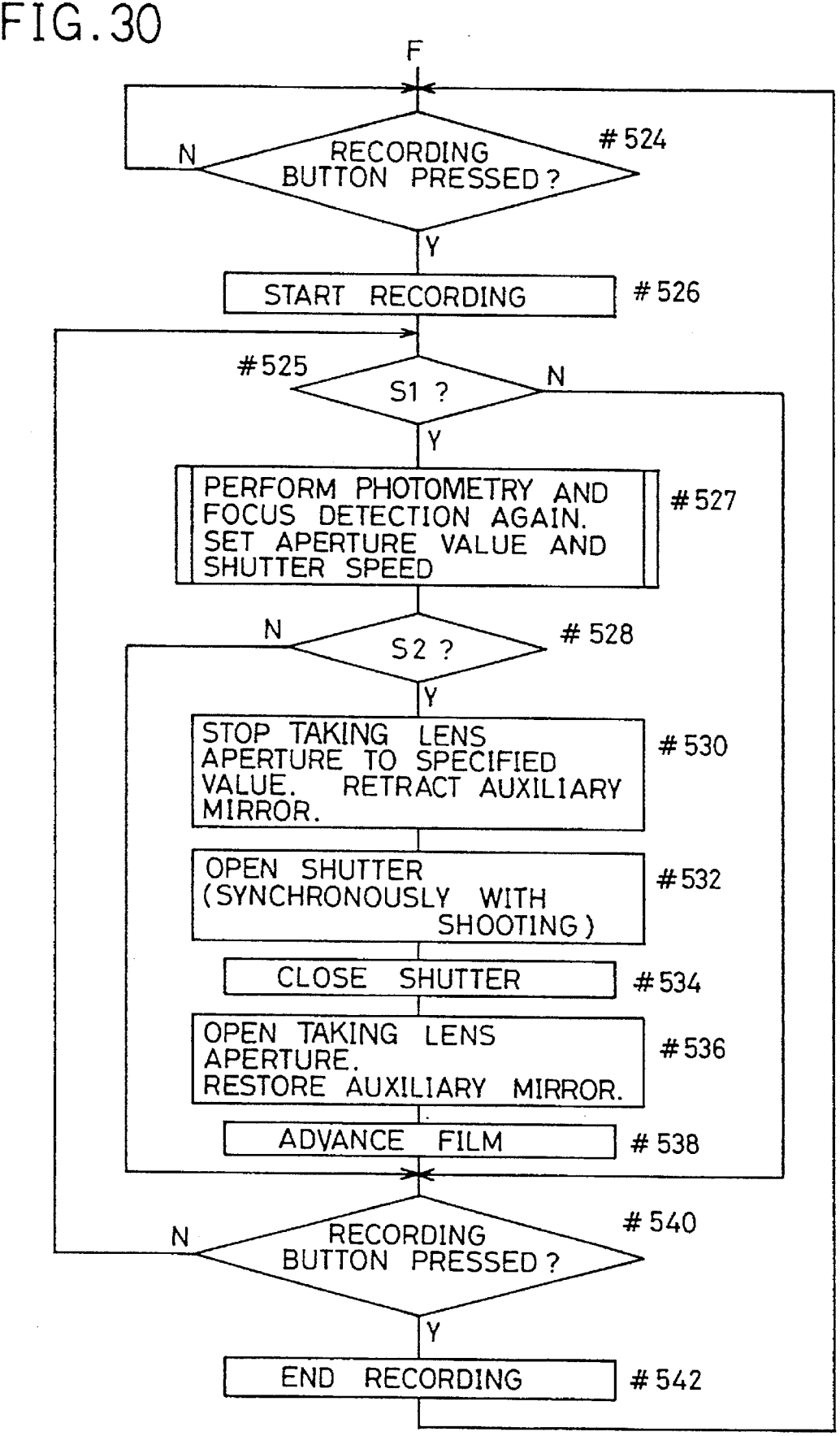

Returning to the flow shown in FIG. 30, the camera waits for the operator either to press the shutter release button 3 further in, that is, to establish the state S2, or to cancel the operation (#525 and #528).

Next, when the operator presses the shutter release button 3 all the way in #528, the camera microcomputer C01, detecting this state, stops down the aperture of the aperture diaphragm L11 of the taking lens according to the specified aperture value, and retracts the auxiliary mirror C05 out of the imaging light path (#530). In response to a signal indicating the completion of the above two operations, the camera microcomputer C01 instructs the shutter driving device C06 to open the shutter C07 at the specified speed. This instruction is issued synchronously with imaging by the image pickup device (#532). Thus, the shutter C07 is opened so that the film F is exposed to light. After closing the shutter C07 (#534), the camera microcomputer C01 opens the aperture diaphragm of the taking lens, reinstates the auxiliary mirror (#536), and then instructs the film advancing device C09 to advance the film one frame so that the film is advanced one frame (#538). In the case of shooting with a flash, during the above described operation, the flash controller F01 starts flashing of the flash F in response to an instruction given when the shutter C07 has been completely opened, and it stops flashing in response to a signal indicating that proper exposure has been obtained.

In every mode of the above described embodiments, when the operation mode dial is set to the position OFF, the relay aperture diaphragm completely closes the light path in order to shut off a light beam incident on the image pickup device. Thus, it is possible to prevent burning of the image pickup device due to a light beam incoming through the taking lens while the camera is not in use.

In a construction according to the first and the second embodiments of the present invention, a first and a second aperture diaphragms for a film and an image pickup device, respectively, are controlled correlatively. Consequently, the operator will not encounter an inconvenient situation where adjustment of incident light for one of the film and the image pickup device cannot be performed when adjustment of incident light for the both is intended, or where adjustment of incident light for one of the film and the image pickup device affects incident light for the other of the film and the image pickup device when adjustment of incident light for the one of the film and the image pickup device is intended.

When the imaging optical system has an open aperture value a and a magnification $\beta$, the aperture value of the first aperture diaphragm does not affect the amount of light incident through the imaging optical system and the second aperture diaphragm on the image pickup device as long as the first aperture diaphragm is controlled within the range from the open aperture value to $a/\beta$. Accordingly, within that range, the second aperture diaphragm is controlled independently of the first aperture diaphragm. As a result, the light beam incident on the film (photosensitive recording medium) and the light beam incident on the image pickup device are controlled independently of each other.

Further, when the second aperture diaphragm is controlled with the aperture value b, the first aperture diaphragm is controlled within a limited range from the open aperture value to $b/\beta$. In this case, since the aperture value of the first aperture diaphragm does not affect the amount of light incident on the image pickup device, it is possible to perform adjustment of shooting on a silver salt film without affecting imaging by the image pickup device.

In addition, since the second aperture diaphragm is so constructed that it can shut off a light beam incident on the image pickup device by closing the light path, it is possible to prevent burning of the image pickup device.

Hereinafter, a third embodiment of the present invention will be described. Since the construction shown in FIGS. 1 to 13 is common to the first, the second, and the third embodiment, a description with regard to the construction will be omitted. First, with reference to FIG. 32, a description will be given below as to the control of the above described relay aperture diaphragm C18.

Figure 32:
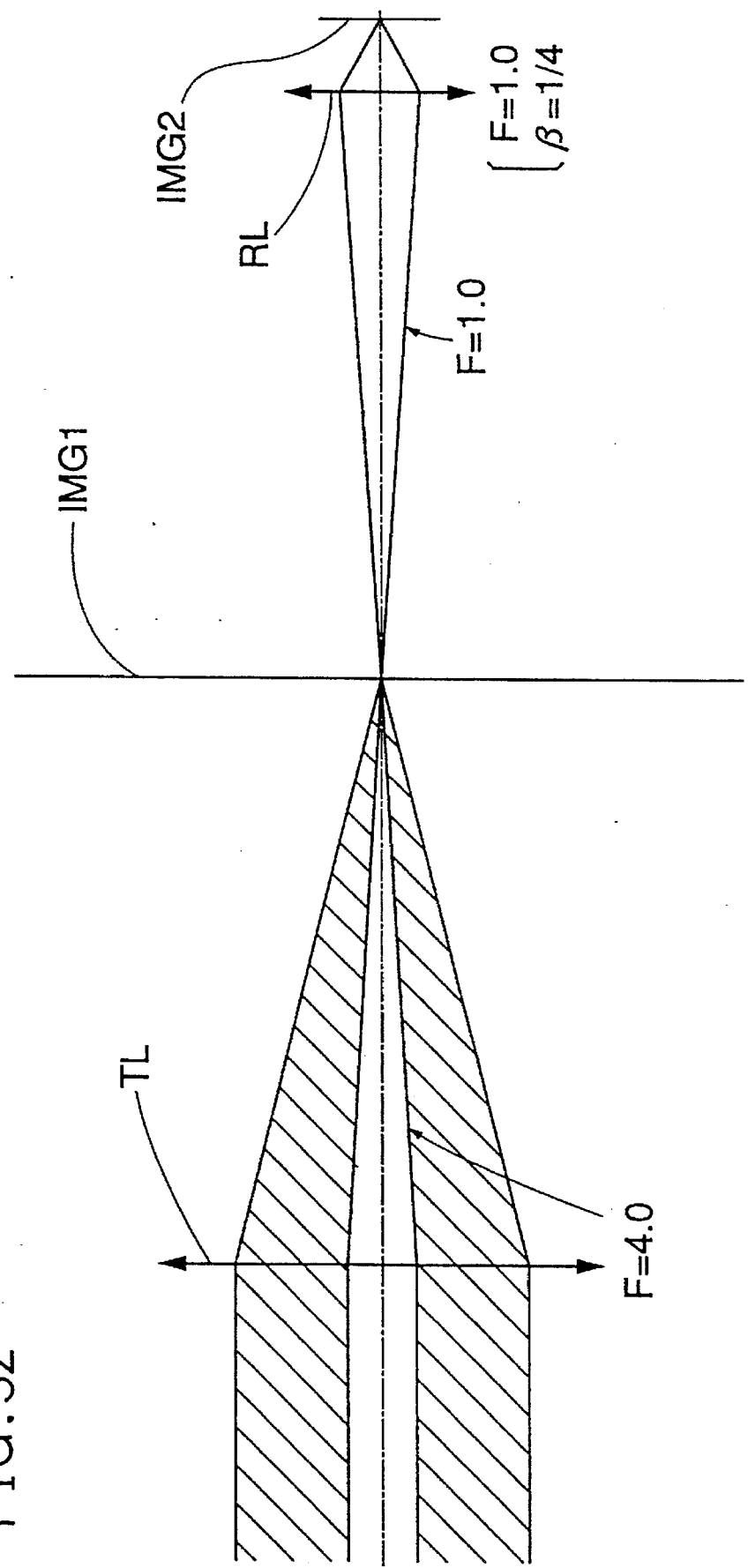
FIG. 32 is a diagram showing a light path of the third embodiment of the present invention.

In this embodiment, the relay optical system C14 has a magnification $\beta=\frac{1}{4}$, an open aperture value F=1.0 (also referred to as a). As shown in FIG. 32, a light beam incident from the taking lens TL enters the relay optical system RL via the primary image plane IMG1. Accordingly, of the light beam incident from the taking lens TL, only a portion corresponding to a/β=4.0, that is, F=4.0 is used as a light beam which passes through the relay optical system RL to form a secondary image IMG2, while the remaining light beam (indicated with hatching in the drawing) passing outside the light beam corresponding to F=4.0 does not enter the image pickup device. As a result, if the aperture is adjusted to be wider than F=4.0 by use of a taking lens of an open aperture value less than F=4.0, the amount of light incident on the film F accordingly changes, without affecting the imaging on the image pickup device C21. If the aperture is stopped down (darkened) to more than the aperture value F=4.0, the aperture diaphragm L11 of the taking lens TL functions equivalently to the relay aperture diaphragm C18. In the following description, a taking lens of an open aperture value F=4.0 is used. Therefore, the number of the stop-down steps of the relay aperture diaphragm is the same as that of the aperture diaphragm of the taking lens, and the both functions equivalently.

Table 1 below shows the relationship between the aperture of the relay aperture diaphragm and the aperture of the aperture diaphragm of the taking lens. When the magnification of the relay optical system is β=¼, the aperture value of the relay aperture diaphragms is set to a value smaller by 4 Ev than the specified aperture value of the aperture diaphragms of the taking lens.

TABLE 1

| | | | | | | Unit: F |
|---|---|---|---|---|---|---|
| Aperture of taking lens | 4 | 5.6 | 8 | 11 | 16 | 22 |
| Aperture of relay aperture diaphragm | 1.0 | 1.4 | 2.0 | 2.8 | 4.0 | 5.6 |

Figure 33:
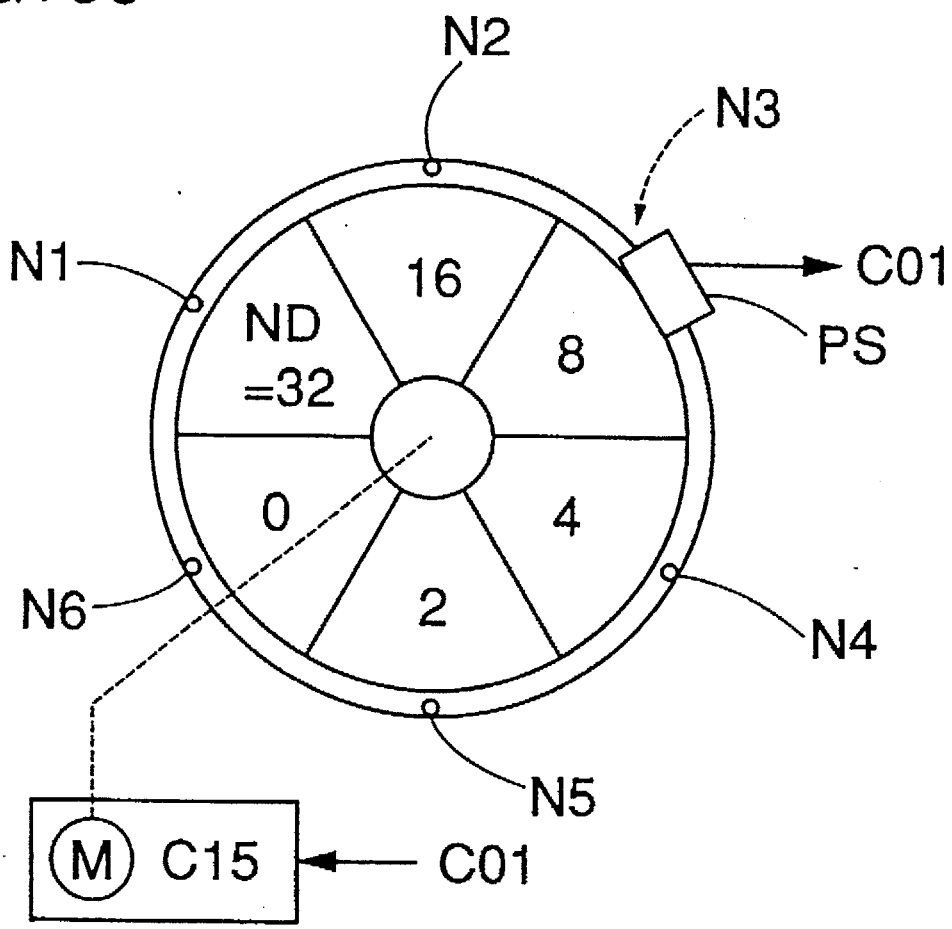
FIG. 33 is a diagram showing the control of the ND filter of the third embodiment.
Figure 34:
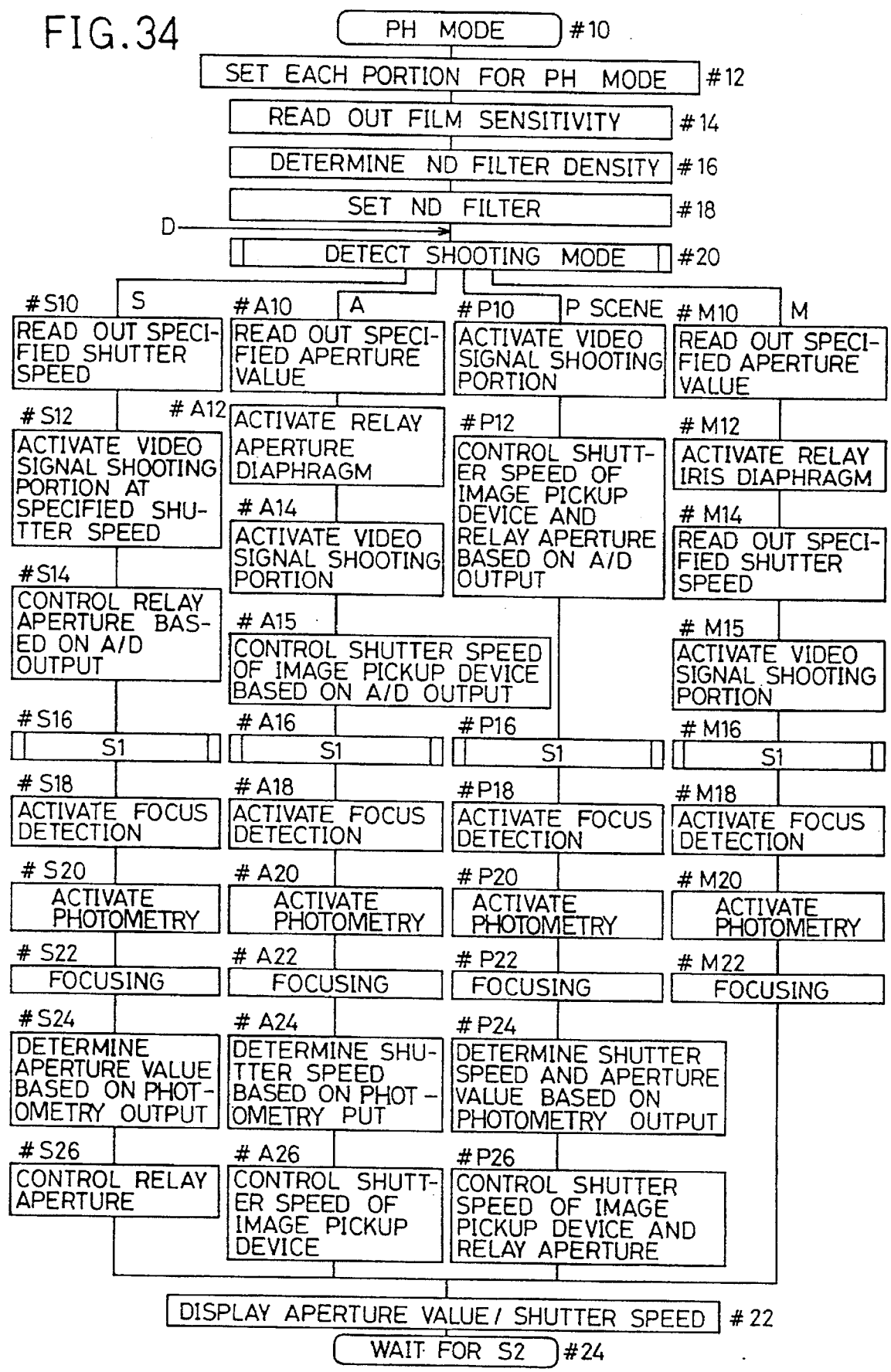
FIGS. 34 to 37 are flow charts showing the operation of the third embodiment in its film shooting mode.

With reference to FIG. 33, the control of the ND filter C13 is described below. As shown in FIG. 33, the ND filter is disc-shaped, and it has different densities, that is, different light transmittances in different areas along its perimeter. A density of the ND filter is represented by an exposure coefficient. More specifically, areas of ND=32 (exposure multiple 32), 16 (exposure multiple 16), 8 (exposure multiple 8), 4 (exposure multiple 4), 2 (exposure multiple 2), and 0 (exposure multiple 1, that is, transparent) are arranged along the perimeter.

The ND filter C13 is rotated by the motor of the filter controller C15, so that areas of different densities are selectively placed in the light path of the relay optical system C14. Notches N1 to N6 are formed in the filter frame, at positions adjacent to respective density areas, and a position sensor PS is provided for the purpose of detecting the notches. The position sensor PS shown in the figure includes a photointerrupter comprising a phototransmitter and a photoreceiver. Accordingly, when a notch is positioned between the phototransmitter and the photoreceiver, the light beam emitted by the phototransmitter reaches the photoreceiver, and the photoreceiver yields an output. Thus, it is possible to detect whether or not the ND filter is positioned at a specific position.

The density of the ND filter C13 is determined based on Table 2 below. Table 2 shows densities as determined when the magnification of the relay optical system C14 is β=¼ and the sensitivity of the image pickup device is equivalent to ISO 200.

TABLE 2

| | | | | | Unit: F |
|---|---|---|---|---|---|
| Film Sensitivity (ISO) | 50 | 100 | 200 | 400 | 800 |
| ND Filter Exposure Factor | 4 | 8 | 16 | 32 | 64 |

<Film Shooting Mode>

Next, with reference to FIGS. 34 to 37, the operation of this embodiment in its film shooting mode will be described below. In order to take a picture on a film, the mode dial 1 shown in FIG. 2 is set to the position PH first (#10). The camera microcomputer C01 then sets each operation portion of the camera to a state suitable for film shooting, that is, to a state in which an operation portion, when operated, executes only a function assigned to film shooting out of a plurality of functions it may have for different modes (#12). As to the shooting scene (such as a portrait scene) and the exposure mode (such as an aperture priority mode), the stored settings which were specified when the film shooting mode was previously selected are automatically selected. The camera microcomputer C01 reads out the sensitivity of the film loaded in the camera (#14), and determines the density of the ND filter C13 based on the sensitivity difference between the image pickup device C21 and the film (#16). It is to be noted here that, if the sensitivity of the image pickup device is equivalent to ISO 200 and an a film of ISO 100 is loaded, a density corresponding to the exposure multiple 8 is required in the ND filter, since the magnification of the relay optical system is β=¼ as described above. Then, the filter controller C15 is driven to control the ND filter according to the determined density (#18).

Next, the specified exposure mode is detected (#20), and operations are performed according to the detected mode.

If the exposure mode is set to A mode, the specified aperture value is read out (#A10), and, as shown in Table 1 above, the aperture of the relay aperture diaphragm C18 is stopped down to a value that is smaller by 4 Ev than the read out value, to which the aperture diaphragm L11 of the taking lens TL is set. For example, if the specified aperture value of the aperture diaphragm L11 of the taking lens is F=8, the aperture of the relay aperture diaphragm is set to F=2 (#A14).

Next, the video signal shooting unit, shown enclosed with broken lines in FIG. 12, is activated (#A14). As shown in FIG. 11, the light beam incident through the taking lens TL travels via the main mirror C04, the mirror C11, the ND filter C13, the relay optical system C14, the optical low-pass filter C16, and the infrared light cut filter C17, and enters the image pickup device C21 to be taken as an image thereby. After imaging, the image signal, after being processed in the image processor C22 and the video processor C23 shown in FIG. 12, is displayed as a picture in the electronic viewfinder C27 (FIN).

During this processing, the camera microcomputer C01 controls the driving pulse generator C23 based on the output of the A/D converter C22-B in the image processor C22, that is, based on the output from the image pickup device C21, in order to set the shutter speed (electric charge accumulation time) of the image pickup device C21 (#A15). Thereafter, the camera microcomputer C01 waits for an operator to press the shutter release button 3 (#A16).

If the exposure mode is set to S mode, the specified shutter speed is read out first. When the video signal shooting unit is activated (#S12), the light beam incident through the taking lens TL travels via the main mirror C04, the mirror C11, the ND filter C13, the relay optical system C14, the optical low-pass filter C16, and the infrared light cut filter C17, and enters the image pickup device C21 to be taken as an image thereby. After imaging, the video signal, after being processed in the image processor C22 and the video processor C23 shown in FIG. 12, is displayed as a picture in the electronic viewfinder C27 (FIN). During this processing, the camera microcomputer C01 controls, according to the specified shutter speed, the driving pulse generator C23 in order to control the shutter speed (electric charge accumulation time) of the image pick up device. Moreover, the aperture of the relay aperture diaphragm C18 is controlled based on the output from the A/D converter C22-B in the image processor C22, that is, based on the output from the image pickup device C21 (S14). Thereafter, the camera microcomputer C01 waits for the operator to press the shutter release button 3 (#S16).

If the exposure mode is set to P mode, or if a shooting scene is selected, the video signal shooting unit is activated (#P10) first. Then, the aperture of the relay aperture diaphragm C18 and the shutter speed (electric charge accumulation time) of the image pickup device C21 are controlled according to a predetermined program chart based on the output from the A/D converter C22-B in the image processor C22, that is, based on the output from the image pickup device C21 (#P12). Thereafter, the camera microcomputer C01 waits for the operator to press the shutter release button 3 (#P16).

If the exposure mode is set to M mode, both the aperture of the relay aperture diaphragm C18 and the shutter speed (electric charge accumulation time) of the image pickup device C21 are set to the values read out as specified values, and the video signal shooting unit is activated (#M10 to M15). Thereafter, the camera microcomputer C01 waits for the operator to press the shutter release button 3 (#M16).

Later, when the operator presses the shutter release button 3 half the way in (#S16, #A16, #P16 and #M16) (hereinafter referred to as the state S1), the focus detection device C02 and the brightness detection device C12 shown in FIG. 11 are activated (#S18 to 20, #A18 to 20, #P18 to 20, and #M18 to 20). The focus detection device C02 detects the focusing condition of the taking lens TL, and transfers a detection result to the camera microcomputer C01. Based on the detection result, the camera microcomputer C01 transfers a driving instruction to the lens microcomputer L01, when necessary. The lens microcomputer L01 performs a calculation with adding conditions particular to the taking lens TL to the driving instruction, and, based on the operation result, drives the focus motor L09 (#S22, #A22, #P22 and #M22).

Meanwhile, the brightness detection device C12 detects the brightness of the subject, and transfers a detection result to the camera microcomputer C01. If the exposure mode is set to A mode, a shutter speed for film shooting is determined based on the brightness detection result and the specified aperture value (#A24), and the shutter speed (electric charge accumulation time) of the image pickup device C21 is set to a value equivalent to the determined shutter speed (#A26).

If the exposure mode is set to S mode, the shutter speed for film shooting is selected as the specified shutter speed, and the shutter speed (electric charge accumulation time) of the image pickup device C21 is set to a value equivalent to the specified shutter speed. The aperture value of the taking lens is calculated based on the shutter speed and the detection result of the brightness detection device (#S24), the aperture of the relay aperture diaphragm C18 is stopped down to a value that is smaller by 4 Ev than the calculated aperture value of the taking lens (#S26).

If the exposure mode is set to P mode, or if a shooting scene is selected, the aperture of the relay aperture diaphragm C18 and the shutter speed (electric charge accumulation time) of the image pickup device are controlled according to a predetermined program chart based on the detection result of the brightness detection device C12 (#P24 to #P26).

If the exposure mode is set to M mode, the same control as is performed prior to step #M15 is performed based on the specified shutter speed and aperture value.

As a result of the above described operation, when the operator presses the shutter release button 3 half the way in, that is, when the operator performs shooting preparation operation, images resulting from shooting with the aperture value and shutter speed specified for film shooting and without stopping of the aperture diaphragm L11 of the taking lens TL are successively (in the state of a moving picture) displayed in the electronic viewfinder FIN, that is, images are previewed (moving-picture preview).

Simultaneously, the determined aperture value and shutter speed are indicated in the electronic viewfinder (#22). It is to be noted that an aperture value indicated here is not the aperture value of the relay aperture diaphragm C18, but a value converted to an aperture value of the aperture diaphragm L11 of the taking lens.

Thereafter, the camera microcomputer C01 waits for the operator either to press the shutter release button 3 further in (hereinafter referred to as the state S2), or to cancel the operation (that is, to cancel the state S1 by releasing the shutter release button 3) (#24; #30 and #31 in FIG. 35).

Figure 35:
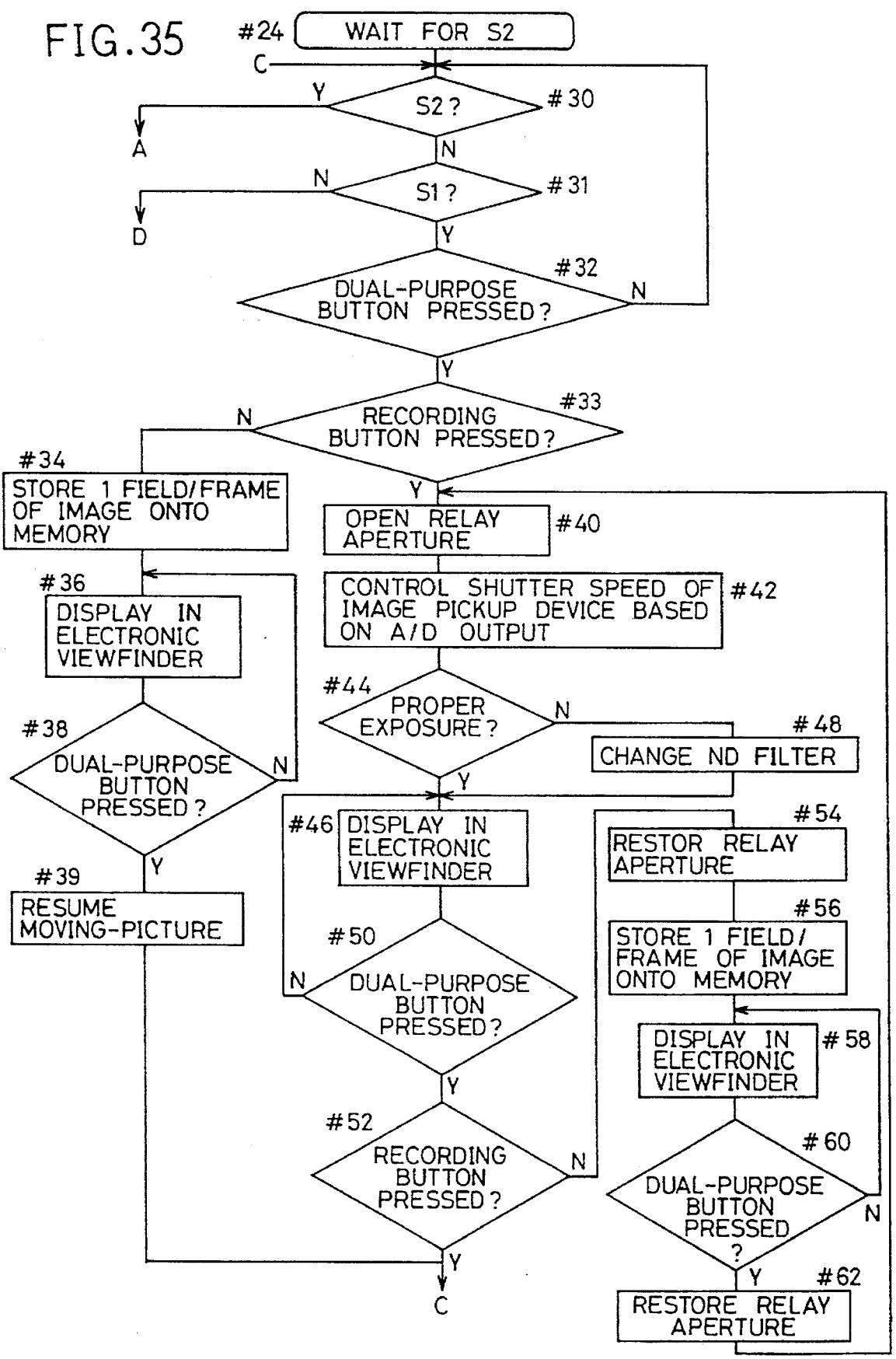

If the operator wishes to preview a picture as a still picture here, the operator operates the dual-purpose button 23 singly (#32) as shown in FIG. 35. Thus, the camera microcomputer C01 operates so that one field, or one frame, of a picture at the instant when the dual-purpose button is pressed is retained in the memory C24-D shown in FIG. 12 (#34). The retained picture is displayed still in the electronic viewfinder FIN (C27) (still-picture preview) (#36). When the dual-purpose button 23 is operated again here, the retaining of the picture on the memory C24-D is canceled, and images are reproduced as a moving picture thereafter (#38 and #39). The process then returns to #30.

If the operator wishes to observe a picture taken with a flash, the operator installs a flash F onto the accessory shoe HS, and turns on the power of the flash. When the dual-purpose button 23 is operated here as in step #32, the camera microcomputer sets the electric charge accumulation time of the image pickup device C21 to a shutter speed suitable for flash shooting (1/60 seconds, for example), and starts flashing synchronously with the start of electric charge accumulation. Then, the brightness detection device C12 is instructed to perform photometry, and, when proper exposure is obtained, the flash controller F01 is instructed to stop flashing. A picture taken at this moment is retained in the memory C24-D, in step #32, and the picture is displayed still in the electronic viewfinder FIN (C27), in step #34.

If the operator wishes to observe a picture in the electronic viewfinder with the aperture open as in the case where focusing is performed manually, the operator operates the recording button 25 and the dual-purpose button 23 simultaneously (#32 and #33). In response to this operation, the camera microcomputer C01 opens the relay aperture diaphragm (#40). Then, shooting is performed by use of a light beam incident under this condition. The camera microcomputer C01 controls the driving pulse generator C23 based on the output from the A/D converter C22-B in the image processor C22, that is, based on the output from the image pickup device C21, in order to set the shutter speed (electric charge accumulation time) of the image pickup device C21 (#42). Thus, it is possible to observe a picture with the aperture of the taking lens open (#46).

If the shutter speed determined in step #42 exceeds the controllable range, the density of the ND filter C13 is changed (#48).

When the dual-purpose button 23 is operated singly with the aperture open (#50), the camera microcomputer C01 lets each camera portion to return to the original state for a moving picture (#54), and then operates so that one field, or one frame of the picture will be retained in the memory C24-D shown in FIG. 12 at the instant when the original state is established (#56). The picture retained in the memory C24-D is displayed as a still picture in the electronic viewfinder C27 (FIN) (#58). Thus, it is possible to preview effects of the aperture, effects of the shutter speed, the picture composition, and others through the electronic viewfinder FIN. When the dual-purpose button 23 is pressed again (#60), the camera returns to the open-aperture state (#62).

When the dual-purpose button 23 is pressed again with the recording button 25 held pressed (#50 to #52), the camera returns to the moving-picture state. On detecting this simultaneous operation, the camera microcomputer C01 resets each camera portion to the original state for a moving picture, and then waits the operator to perform operation for establishing the S2 state, or to cancel the operation (#30 and #31).

Figure 36:
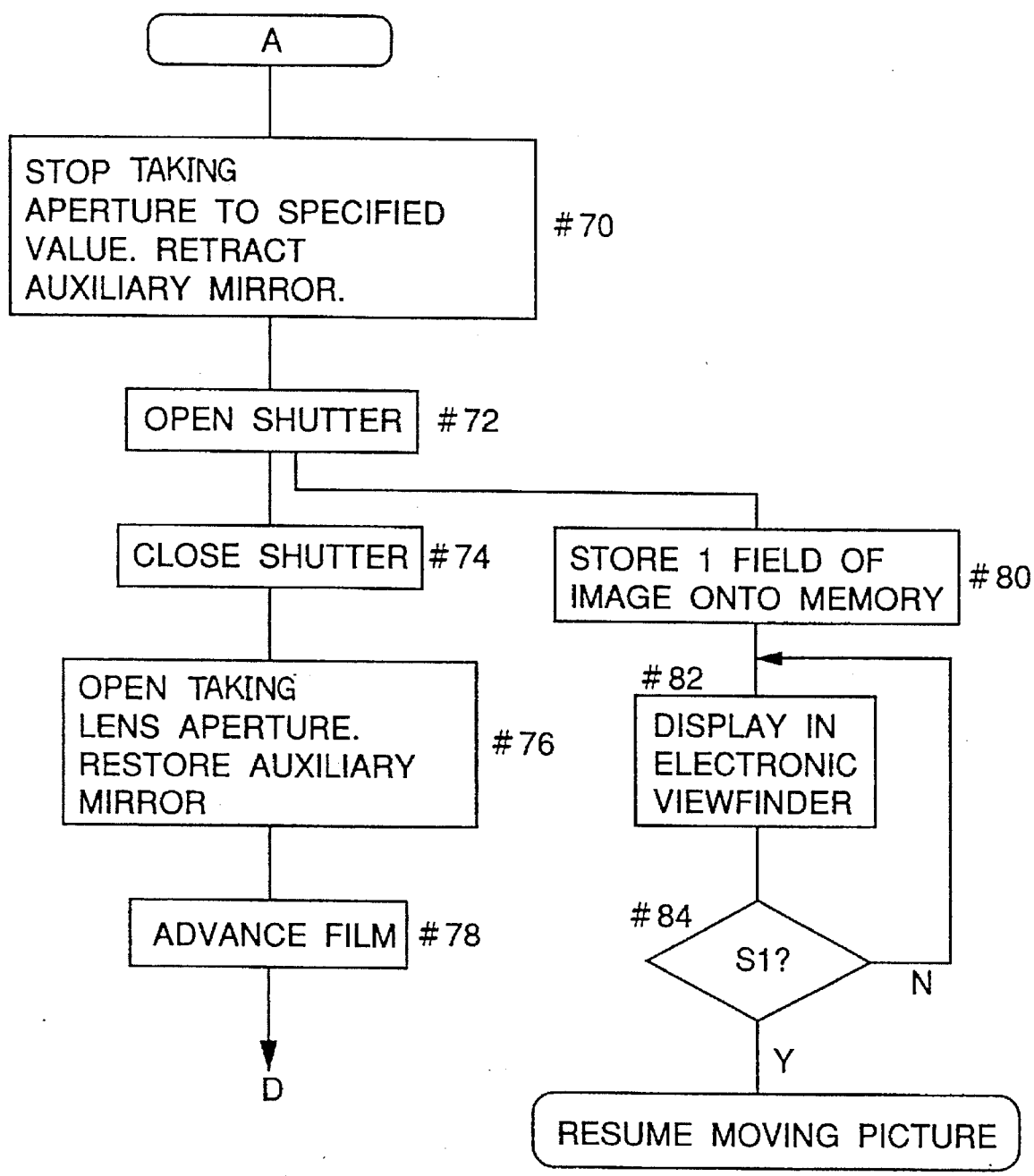

Next, when the operator presses the shutter release button 3 all the way in, that is, when the state S2 is established, the process proceeds to operations shown in FIG. 36. The camera microcomputer C01, detecting this state, stops down the aperture of the aperture diaphragm L11 of the taking lens according to the specified aperture value, and retracts the auxiliary mirror C05 out of the imaging light path (#70). In response to a signal indicating the completion of the above two operations, the camera microcomputer C01 instructs the shutter driving device C06 to open the shutter C07 at the specified speed. Thus, the shutter C07 is opened so that the film F is exposed to light (#72). After closing the shutter C07, the camera microcomputer C01 opens the aperture of the taking lens, reinstates the auxiliary mirror (#76), and then instructs the film advancing device C09 to advance the film one frame so that the film is advanced one frame (#78). In the case of shooting with a flash, during the above described operation, the flash controller F01 starts flashing of the flash F in response to an instruction given when the shutter C07 has been completely opened, and it stops flashing in response to a signal indicating that proper exposure has been obtained.

The camera microcomputer C01 then operates so that one field, or one frame, of a picture is retained in the memory C24-D shown in FIG. 12 synchronously with the opening of the shutter C07 (#80). The picture retained in the memory C24-D is displayed as a still picture in the electronic viewfinder C27 (FIN) (#82). Thus, it is possible to observe through the electronic viewfinder FIN a picture which is substantially the same as a picture taken on a film. Simultaneously, the picture is transferred to the recording/playback converter C25 so that the picture is recorded on the magnetic tape MT. Accordingly, a picture which is recorded several frames earlier can be observed by playing it back from the magnetic tape.

A still picture displayed in the electronic viewfinder is kept displayed until the state S1 is established again (that is, until the release button 3 is pressed half the way in) (#84).

While a still picture is being displayed, the video signal shooting unit remains inactive.

<Moving-Picture Video Shooting Mode>

Figure 37:
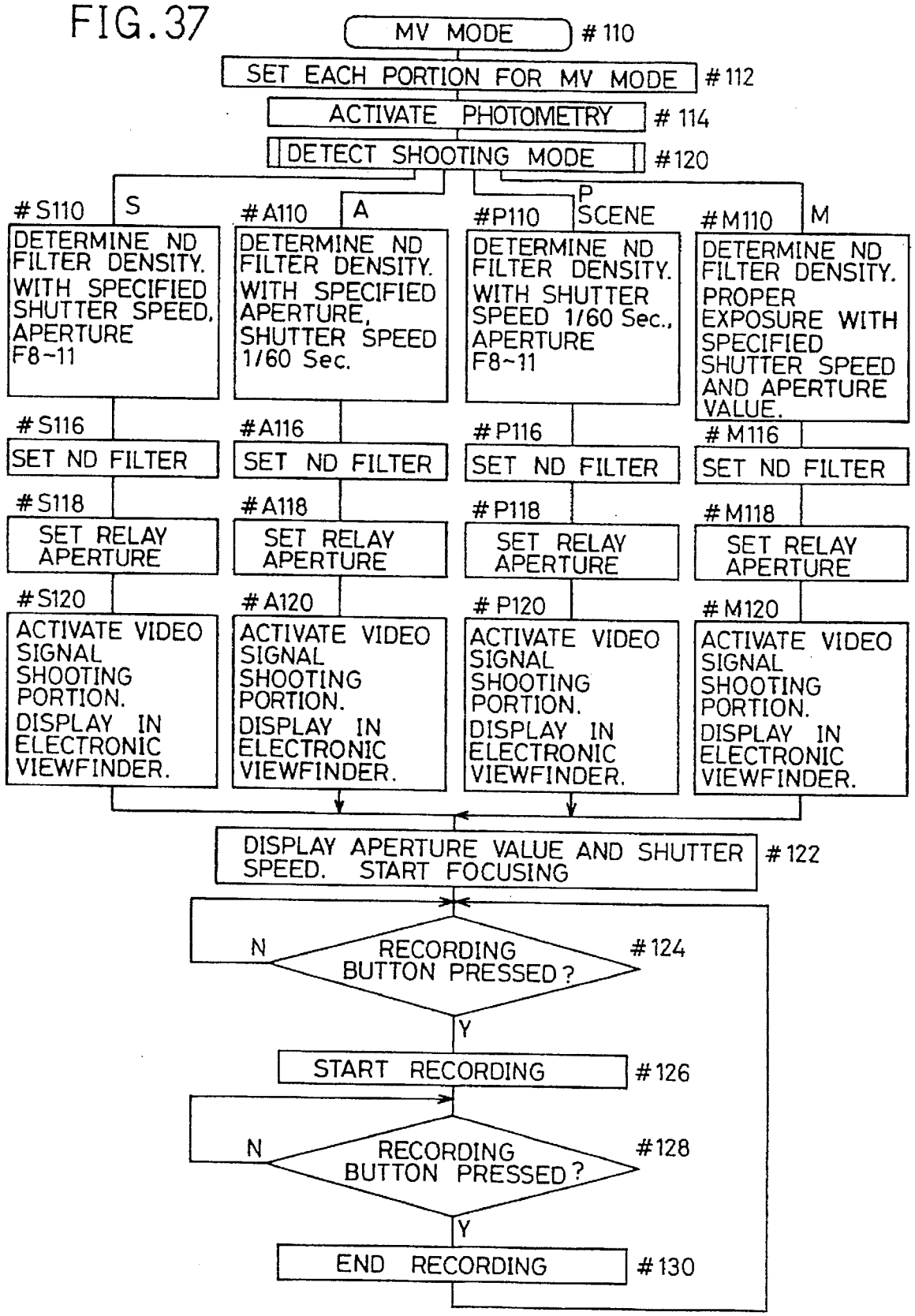

Next, with reference to FIG. 37, the operation of this embodiment in its moving-picture video shooting mode will be described below. In order to shoot a moving-picture video, the mode dial 1 shown in FIG. 2 is set to the position MV first (#110). The camera microcomputer C01 then sets each operation portion of the camera to a state suitable for moving-picture shooting (#112). As to the shooting scene (such as a portrait scene) and the exposure mode (such as an aperture priority mode), the stored settings which were specified when the moving-picture video shooting mode was previously selected are automatically selected.

Next, photometry is performed by the brightness detection device C12, with the aperture of the aperture diaphragm L11 of the taking lens TL kept open (#114). Then, the specified exposure mode is detected (#120), and the density of the ND filter is determined according to the exposure mode. More specifically, if the exposure mode is set to A mode, the density of the ND filter is so determined that the shutter speed will be 1/60 seconds on condition that the density of the ND filter is converted to an aperture value of the taking lens in calculation (#A110). If the calculated density exceeds the controllable range, the shutter speed is shifted by calculation so that the density falls within the controllable range.

If the exposure mode is set to S mode, the density of the ND filter is so determined that the aperture value of the aperture diaphragm L11 of the taking lens TL will be in the range from F=8 to F=11 on condition that calculation is performed based on the specified shutter speed (#S110). If the calculated density exceeds the controllable range, the aperture value is shifted by calculation so that the density will fall within the controllable range.

If the exposure mode is set to P mode, or if a shooting scene is selected, the density of the ND filter is so determined that the aperture value of the aperture diaphragm L11 of the taking lens TL will be in the range from F=8 to F=11 on condition that calculation is performed based on a shutter speed of 1/60 seconds (#P110). If the calculated density exceeds the controllable range, both the aperture value and the shutter speed are shifted by calculation so that the density will fall within the controllable range.

If the exposure mode is set to M mode, the density of the ND filter is so determined that proper exposure is obtained at the specified shutter speed and with the specified aperture value (#M110).

Then, the filter controller C15 controls the ND filter in order to obtain the density determined in each mode (#S116, #A116, #P116 and #M116), and the relay aperture diaphragm is stopped down according to the value specified in each mode (#S118, #A118, #P118 and #M118). Simultaneously, the video signal shooting unit is activated, and the image pickup device C21 converts the light beam that has passed through the taking lens TL and through the relay optical system C14 into an electric signal. The thus converted electric signal is converted into a video signal by the circuits described in connection with FIG. 12, and the signal is then displayed as a picture in the electronic viewfinder FIN (#S120, #A120, #P120 and #M120).

Meanwhile, the camera microcomputer C01 sets the shooting control values based on the output from the A/D converter C22-B in the image processor C22 shown in FIG. 12 (that is, based on the output from the image pickup device C21). More specifically, in order to achieve proper shooting, the shutter speed (electric charge accumulation time) of the image pickup device C21 is controlled in A mode, the aperture value of the relay aperture diaphragm C18 is controlled in S mode, and a combination of the shutter speed (electric charge accumulation time) of the image pickup device C21 and the aperture value of the relay aperture diaphragm C18 is controlled according to a predetermined program chart in P mode. If a control value for proper shooting exceeds the permissible range, the gain of the amplifier C22-C is so controlled that proper shooting will be achieved.

In case the brightness of the subject substantially changes (for example, more than 4 Ev), the density of the ND filter is controlled accordingly.

Simultaneously, the determined aperture value and shutter speed are indicated in the electronic viewfinder (#122), and focusing is started. It is to be noted that the aperture value indicated here is not the aperture value of the relay aperture diaphragm C18, but a value converted to a corresponding aperture value of the aperture diaphragm L11 of the taking lens. The camera microcomputer C01 then waits for the operator to press the recording button 25 (#124).

When the recording button 25 is operated, the camera microcomputer C01 controls the recording/playback converter C25, the magnetic head C26, and the magnetic tape driver C36 in order to record video and audio signals on the magnetic tape MT (#126). If the recording button 25 is operated again during recording, the recording is stopped (#128 to #130).

It is to be noted that it is possible to perform shooting on a film by pressing the shutter release button 3 anytime except during recording, though a detailed description will not be given in this respect.

<Simultaneous Shooting Mode>

Figure 38:
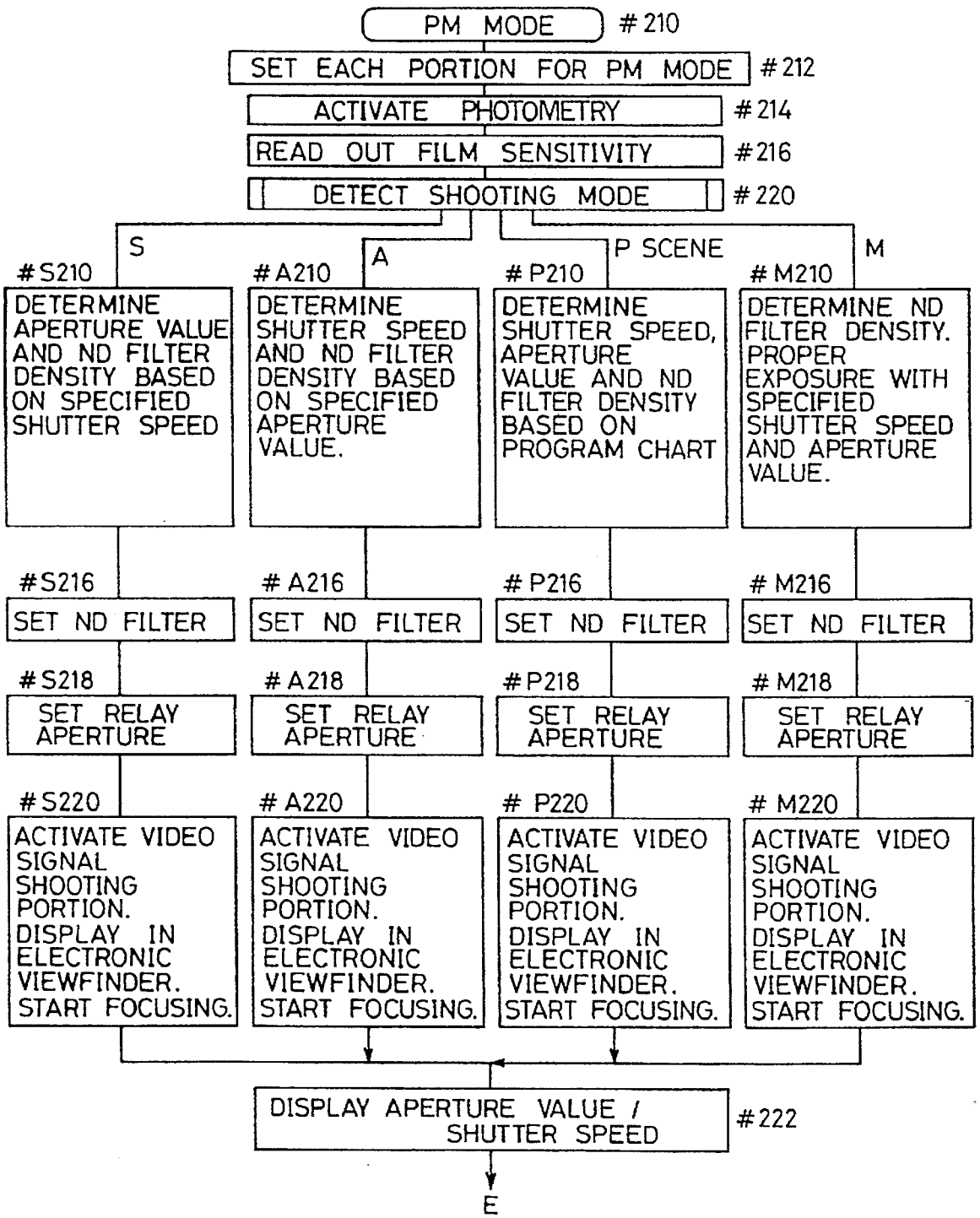
FIGS. 38 and 39 are flow charts showing the operation of the third embodiment in its simultaneous shooting mode.
Figure 39:
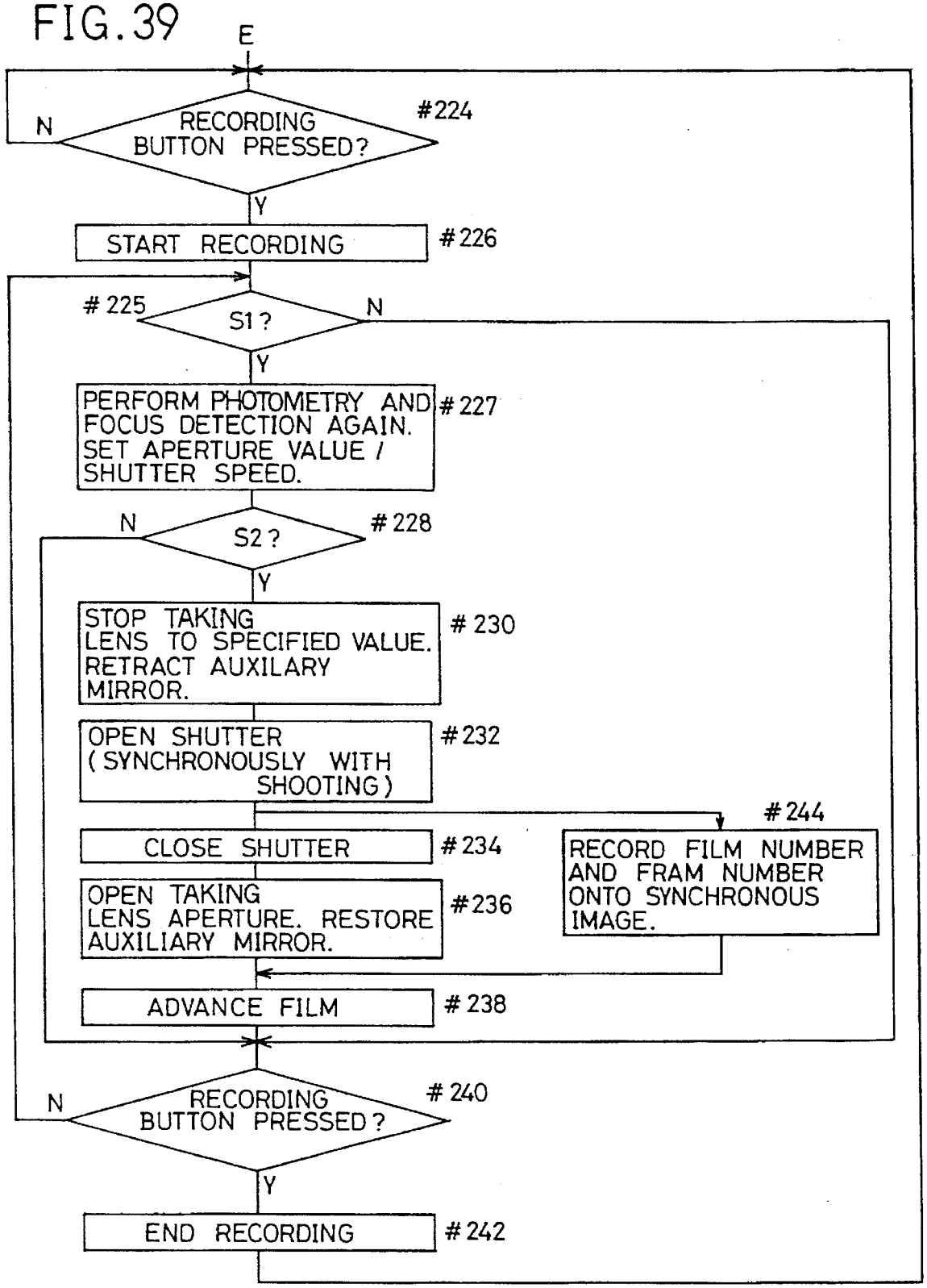

Next, with reference to FIGS. 38 to 39, the operation of this embodiment in its simultaneous shooting mode will be described below. In order to perform simultaneous shooting, the mode dial 1 shown in FIG. 2 is set to the position PM first (#210). The camera microcomputer C01 then sets each operation portion of the camera to a state suitable for simultaneous shooting (#212). As to the shooting scene (such as a portrait scene) and the exposure mode (such as an aperture priority mode), the stored settings which were specified when the simultaneous shooting mode was previously selected are automatically selected.

Next, photometry is performed by the brightness detection device C12, with the aperture of the aperture diaphragm L11 of the taking lens TL kept open (#214), and the sensitivity of the film loaded in the camera is detected (#216). Then, the specified exposure mode is detected (#220), and the density of the ND filter is determined according to the exposure mode. More specifically, if the exposure mode is set to A mode, the density of the ND filter and the shutter speed are determined based on the specified aperture value of the taking lens and the sensitivity of the film (#A210).

If the exposure mode is set to S mode, the density of the ND filter and the aperture value are determined based on the specified shutter speed and the film sensitivity (#S210). If the exposure mode is set to P mode, or if a shooting scene is selected, the shutter speed, the aperture value, and the density of the ND filter are determined according to a program chart similar or analogous (in this case, the difference is 1 Ev at maximum) to a program chart for the film shooting mode (#P210).

If the exposure mode is set to M mode, the density of the ND filter is so determined that proper exposure will be obtained at the specified shutter speed and with the specified aperture value (#M210).

Then, the filter controller C15 controls the ND filter in order to obtain the density determined in each mode (#S216, #A216, #P216 and #M216), and the relay aperture diaphragm is stopped down according to the value specified or calculated in each mode (#S218, #A218, #P218, #M218). Simultaneously, the video signal shooting unit is activated, and the image pickup device C21 converts the light beam that has passed through the taking lens and the relay optical system C14 into an electric signal. The thus converted electric signal is converted into a video signal by the circuits in the video signal shooting unit, and the signal is then displayed as a picture in the electronic viewfinder FIN (#S220, #A220, #P220 and #M220). Simultaneously, focusing is started.

Meanwhile, the camera microcomputer C01 sets the shooting control values based on the output from the A/D converter C22-B in the image processor C22 shown in FIG. 12 (that is, based on the output from the image pickup device C21). More specifically, in order to achieve proper shooting, the shutter speed (electric charge accumulation time) of the image pickup device C21 is controlled in A mode, the aperture value of the relay aperture diaphragm C18 is controlled in S mode, and a combination of the shutter speed (electric charge accumulation time) of the image pickup device C21 and the aperture value of the relay aperture diaphragm C18 is controlled according to a predetermined program chart in P mode. If a control value for proper shooting exceeds the permissible range, the gain of the amplifier C22-C is so controlled that proper shooting will be achieved.

In case the brightness of the subject largely changes (for example, more than 4 Ev), the density of the ND filter is controlled accordingly.

Simultaneously, the determined aperture value and shutter speed are indicated in the electronic viewfinder (#222). It is to be noted that the aperture value indicated here is not the aperture value of the relay aperture diaphragm C18, but a value converted to a corresponding aperture value of the aperture diaphragm L11 of the taking lens. The camera then waits for the operator to press the recording button 25 (#224).

When the recording button 25 is operated, the camera microcomputer C01 controls the recording/playback converter C25, the magnetic head C26, and the magnetic tape driver C36 in order to record video and audio signals on the magnetic tape MT (#226). If the recording button 25 is operated again during recording, the recording is stopped (#240 to #242).

In the above described moving picture video shooting mode, it is possible to perform film shooting only when recording is not performed, in other words, either recording or film shooting can be performed at a time. In this mode, in contrast, it is possible to perform both simultaneously. More specifically, when the operator presses the shutter release button half the way in after starting recording (after #226), that is, when the state S1 is established (#225), brightness detection and focus detection are performed again, so that the shutter speed and the aperture value are determined (#227). When the operator presses the shutter release button 3 all the way in, that is, when the state S2 is established (#228), the camera microcomputer CO1, detecting this state, stops down the aperture of the aperture diaphragm of the taking lens according to the specified aperture value, and retracts the auxiliary mirror C05 out of the imaging light path (#230). In response to a signal indicating the completion of the above two operations, the camera microcomputer C01 instructs the shutter driving device C06 to open the shutter C07 at the specified speed. This instruction is issued synchronously with imaging by the image pickup device (#232). Thus, the shutter C07 is opened so that the film F is exposed to light.

After closing the shutter C07 (#234), the camera microcomputer C01 opens the aperture of the taking lens, reinstates the auxiliary mirror (#236), and then instructs the film advancing device C09 to advance the film one frame so that the film is advanced one frame (#238). In the case of shooting with a flash, during the above described operation, the flash controller F01 starts flashing of the flash F in response to an instruction given when the shutter C07 has been completely opened, and it stops flashing on receiving a signal indicating that proper exposure has been obtained.

On the other hand, the camera microcomputer C01 adds a film number representing the film currently loaded in the camera and a frame number representing the position of the frame on the film to the video signal corresponding one field of the image shot synchronously with the opening of the shutter C07, and records the resultant signal on the magnetic tape MT (#244). Thus, a picture taken on a film can be previewed before developing the film.

It is to be noted that, in this mode, it is possible to perform shooting on a film by pressing the shutter release button 3 anytime except during recording, though a detailed description will not be given in this respect.

Hereinafter, a fourth embodiment of the present invention will be described. In the third embodiment described above, the aperture value is so determined that the whole light beam that has passed through the aperture diaphragm of the taking lens will pass through the relay optical system. However, in the fourth embodiment described below, the aperture value is so determined that a portion of the light beam that has passed through the aperture diaphragm of the taking lens will not pass through the relay optical system. The construction of the camera is the same as that of the third embodiment shown in FIGS. 11 to 13, and FIG. 33 in the other respects.

Figure 40:
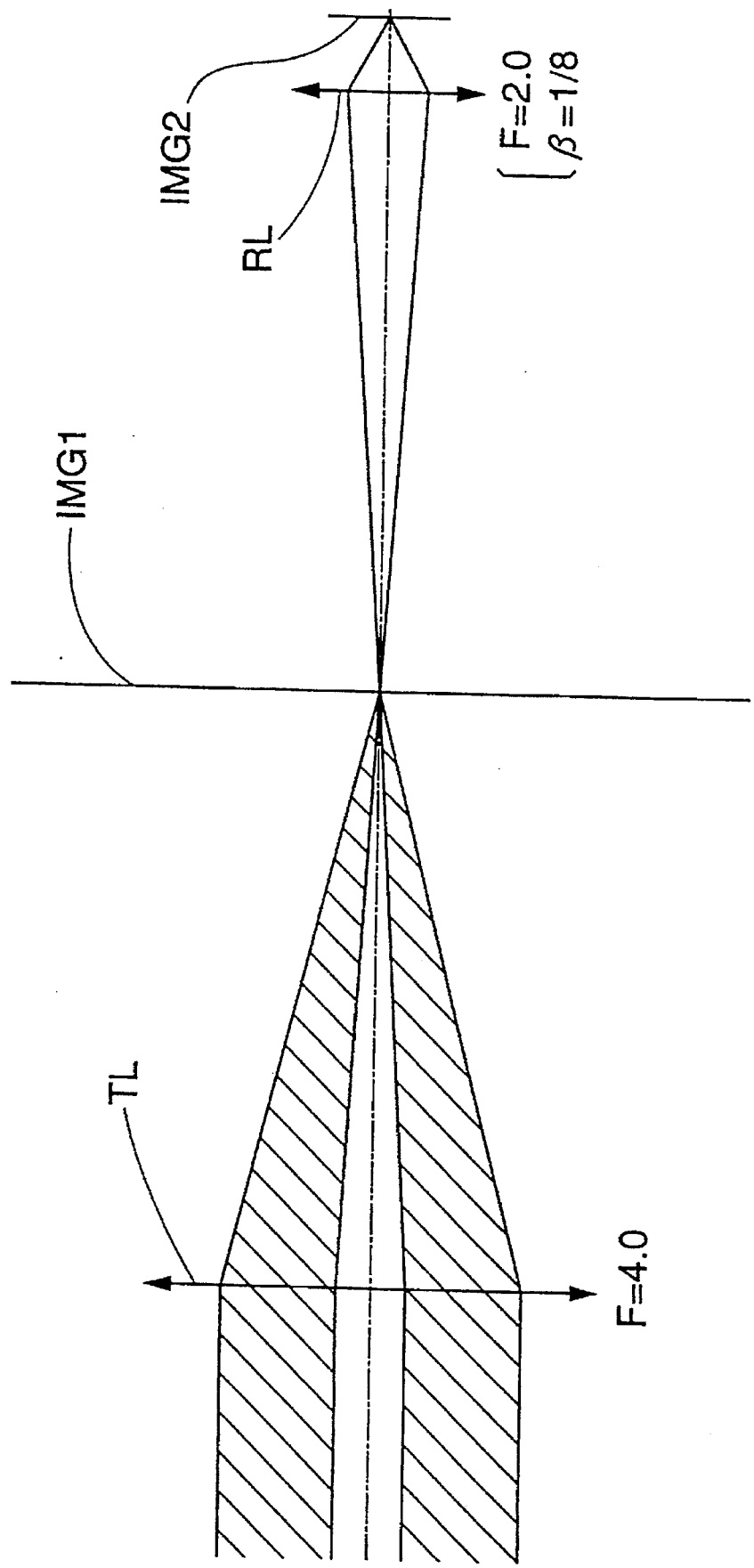
FIG. 40 is a diagram showing a light path of the fourth embodiment of the present invention.

As shown in FIG. 40, this embodiment uses a relay optical system of a magnification $\beta=\frac{1}{8}$, a relay aperture diaphragm of an open aperture value F=2.0 (also referred to as a), and a taking lens of an open aperture value F=4.0, among which the taking lens is the same as that used in the first embodiment. As shown in the figure, a light beam incident from the taking lens TL enters the relay optical system RL via the primary image plane IMG1. Accordingly, of the light beam incident from the taking lens TL, only a portion corresponding to $a/\beta=16.0$, that is, F=16.0 is used as a light beam which passes through the relay optical system RL to form a secondary image IMG2, while the remaining light beam (indicated with hatching in the drawing) passing outside the light beam corresponding to F=16.0 does not enter the image pickup device. As a result, if the aperture is adjusted to be wider than F=16.0, the amount of light incident on the film F accordingly changes, without affecting the imaging on the image pickup device C21. If the aperture is stopped down (darkened) to more than the aperture value F=16.0, the aperture diaphragm L11 of the taking lens TL functions equivalently to the relay aperture diaphragm C18.

Accordingly, by controlling the aperture diaphragm L11 of the taking lens in the range from F=4 to F=16, the amount of light incident on the film can be controlled without affecting the amount of light incident on the image pickup device C21. Moreover, since only a light beam smaller than the aperture F=16 enters the image pickup device independently of the aperture value of the taking lens, a picture thus taken will have a deep depth of field, as if taken by pan-focusing.

<Film Shooting Mode>

Figure 41:
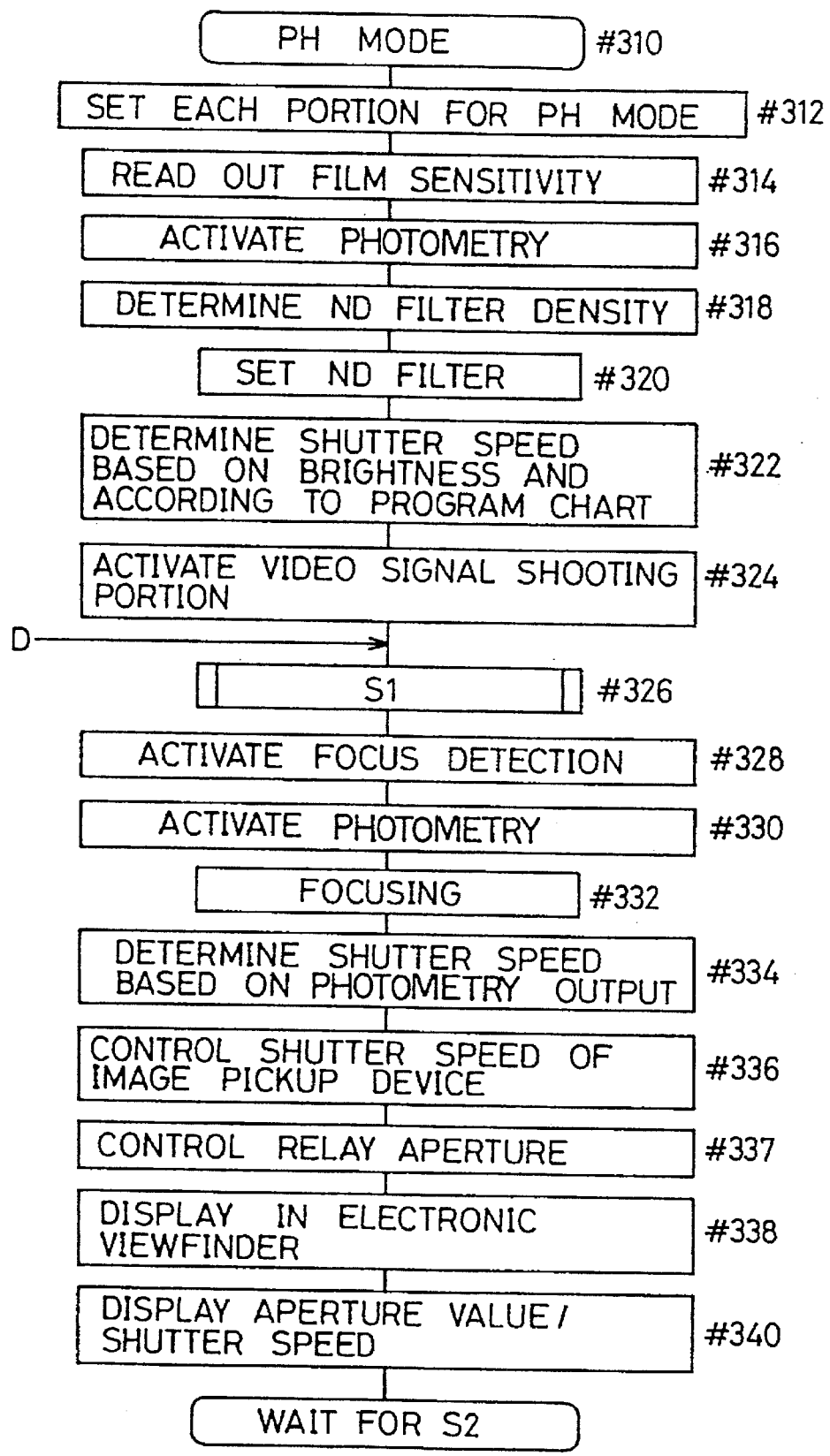
FIGS. 41 to 43 are flow charts showing the operation of the fourth embodiment in its film shooting mode.
Figure 42:
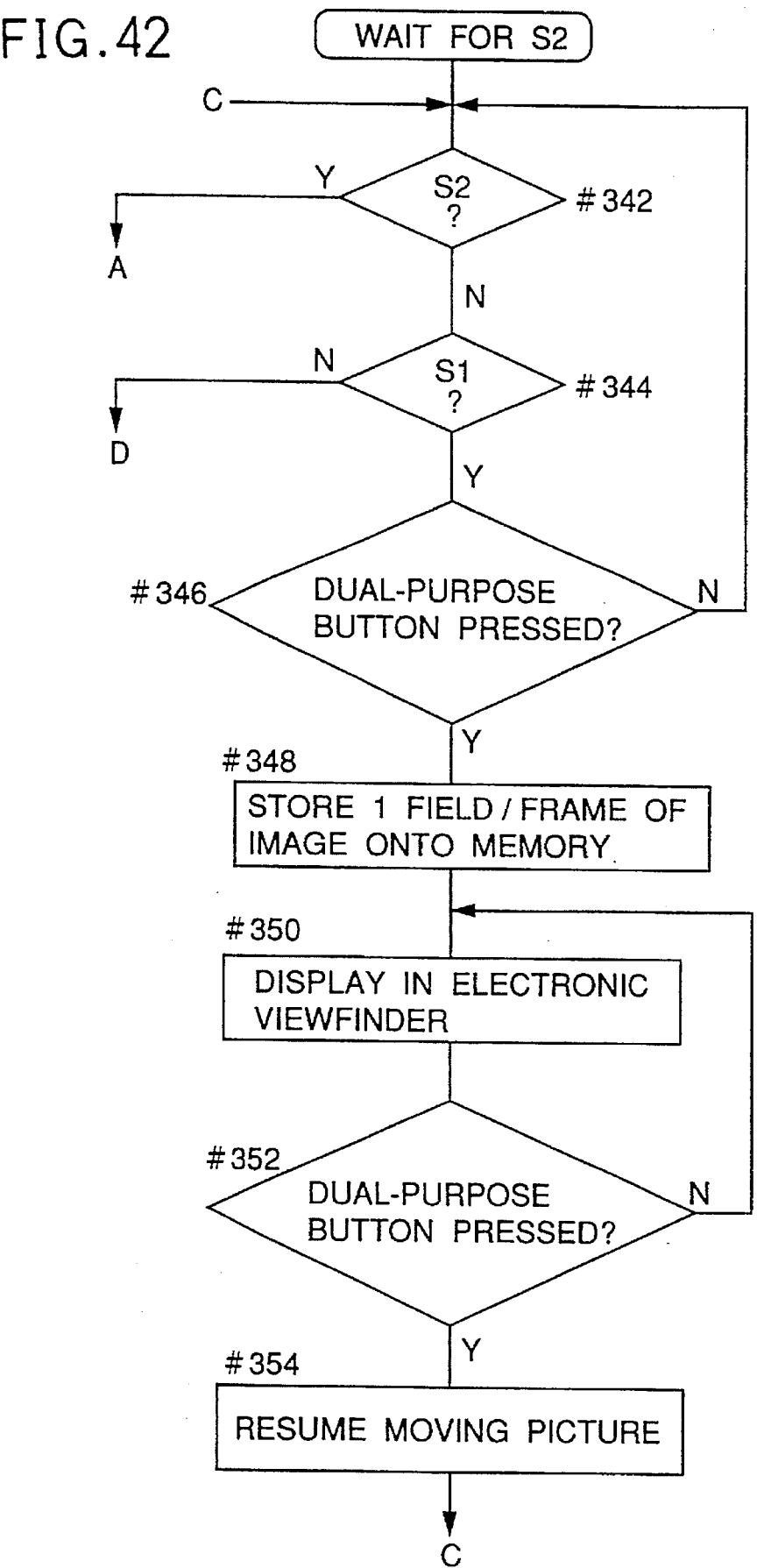
Figure 43:
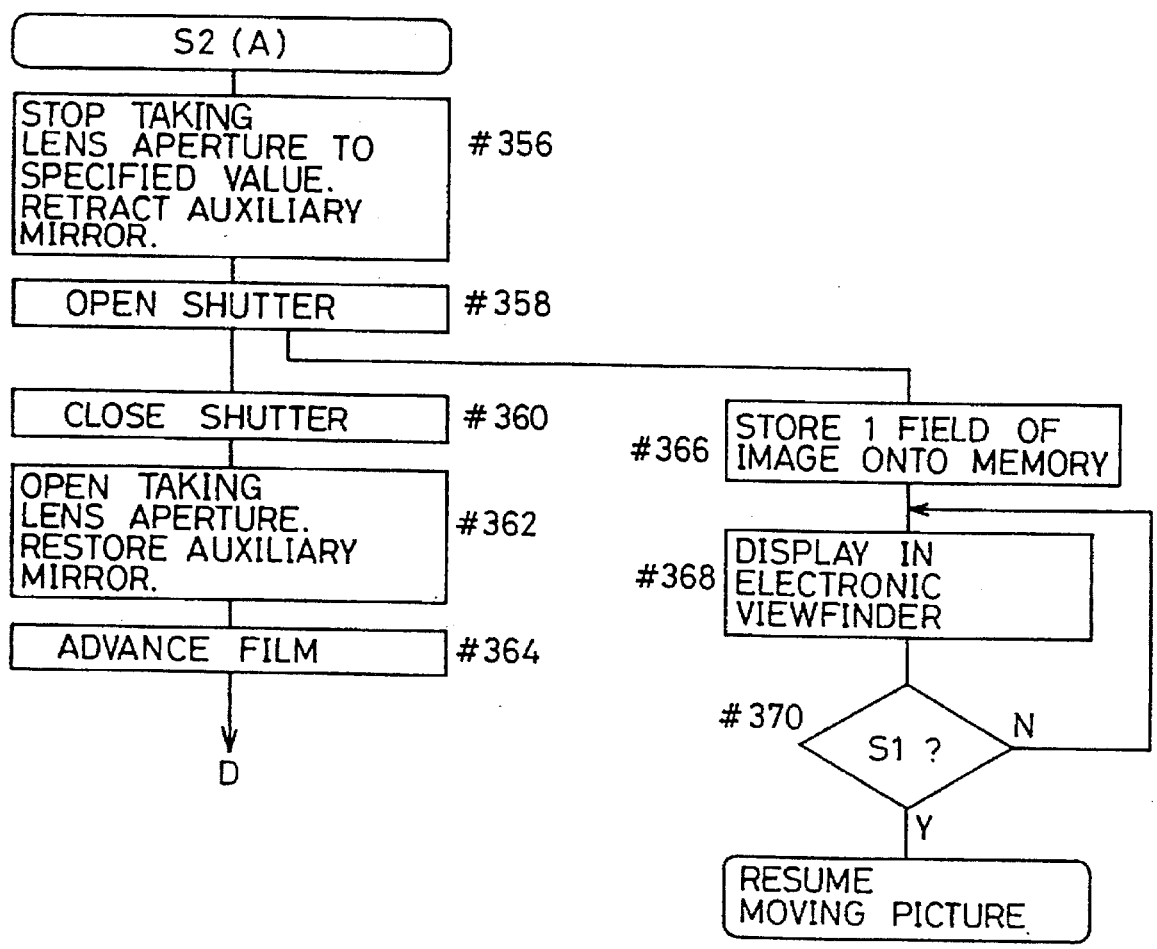

With reference to FIGS. 41 to 43, the operation of this embodiment in its film shooting mode will be described below. In order to take a picture on a film, the mode dial 1 shown in FIG. 2 is set to the position PH first (#310). The camera microcomputer C01 then sets each operation portion of the camera to a state suitable for film shooting, that is, to a state in which an operation portion, when operated, executes only a function assigned to film shooting out of a plurality of functions it may have for different modes (#312). As to the shooting scene (such as a portrait scene) and the exposure mode (such as an aperture priority mode), the stored settings which were specified when the film shooting mode was previously selected are automatically selected. The camera microcomputer C01 reads out the sensitivity of the film loaded in the camera (#314), starts photometry by the brightness detection device (#316), and determines the density of the ND filter C13 based on the sensitivity difference between the film and the image pickup device C21 (#318). The camera microcomputer then drives the filter driving device C15 according to the determined density in order to set the ND filter (#320).

Next, the shutter speed (electric charge accumulation time) is determined according to the detected brightness and the program chart predetermined for film shooting independently of the selected exposure mode (#322), and the video signal shooting unit is activated (#324). The light beam incident through the taking lens TL travels via the main mirror C04, the mirror C11, the ND filter C13, the relay optical system C14, the optical low-pass filter C16, and the infrared light cut filter C17, and enters the image pickup device C21 to be taken as an image thereby. After imaging, the video signal, after being processed in the image processor C22 and the video processor C23 shown in FIG. 12, is displayed as a picture in the electronic viewfinder C27 (FIN). The aperture value of the relay aperture diaphragm is determined based on the output from the A/D converter C22-B in the image processor C22, that is, based on the output from the image pickup device C21. Here, if the aperture value is out of the controllable range because of insufficient brightness, the shutter speed (electric charge accumulation time) may be shifted by approximately 1 Ev. Meanwhile, the aperture diaphragm of the taking lens is kept open.

The camera microcomputer C01 then waits for the operator to operate the shutter release button 3 (#326).

Later, when the operator presses the shutter release button 3 half the way in, that is, when the state S1 is established, the focus detection device C02 and the brightness detection device C12 shown in FIG. 11 are activated (#328 to #330). The focus detection device C02 detects the focusing condition of the taking lens TL, and transfers a detection result to the camera microcomputer C01. Based on the detection result, the microcomputer C01 transfers an driving instruction signal to the lens microcomputer L01, when necessary. The lens microcomputer L01 performs an operation with adding conditions particular to the taking lens TL to the driving instruction, and, based on the operation result, drives the focus motor L09 (#332).

Further, the shutter speed is determined based on the result of the detection by the brightness detection device C12 (#334). The image pickup device C21 is controlled according to the electric charge accumulation time adapted to the above shutter speed (#336), and the relay aperture diaphragm C18 is controlled according to an output from the image pickup device C21 (#337). Then, the taken image is displayed in the electronic viewfinder (#338).

Simultaneously, the determined aperture value and shutter speed are indicated in the electronic viewfinder (#340). It is to be noted that an aperture value indicated here is not the aperture value of the relay aperture diaphragm C18, but that of the aperture diaphragm L11 of the taking lens.

Thereafter, the camera waits for the operator either to press the shutter release button 3 further in, that is, to establish the state S2, or to cancel the operation (#342 and #344 in FIG. 42).

If the operator wishes to preview a picture as a still picture here, the operator operates the dual-purpose button 23 singly (#346) as shown in FIG. 42. Thus, the camera microcomputer C01 operates so that one field, or one frame, of a picture at the instant when the dual-purpose button is pressed is retained in the memory C24-D shown in FIG. 12 (#348). The retained picture is displayed still in the electronic viewfinder FIN (C27) (still-picture preview) (#350). When the dual-purpose button 23 is operated again here, the retaining of the picture on the memory C24-D is canceled, and images are reproduced as a moving picture thereafter (#352 and #354). The camera then waits for the operator to establish the state S2 again, or to cancel the state S1.

If the operator wishes to observe a picture taken with a flash, the operator installs a flash F onto the accessory shoe HS, and turns on the power of the flash. When the dual-purpose button 23 is operated here, the camera microcomputer sets the electric charge accumulation time of the image pickup device C21 to a shutter speed suitable for flash shooting (1/60 seconds, for example), and starts flashing synchronously with the start of electric charge accumulation. Then, the brightness detection device C12 is instructed to perform photometry, and, when proper exposure is obtained, the flash controller F01 is instructed to stop flashing. A picture taken at this moment is retained in the memory C24-D, in step #32, and the picture is displayed still in the electronic viewfinder FIN (C27).

Next, when the operator presses the shutter release button 3 all the way in, that is, when the state S2 is established, as shown in FIG. 43, the camera microcomputer C01, detecting this state, stops down the aperture of the aperture diaphragm L11 of the taking lens according to the specified aperture value, and retracts the auxiliary mirror C05 out of the imaging light path as shown in FIG. 43 (#356). In response to a signal indicating the completion of the above two operations, the camera microcomputer C01 instructs the shutter driving device C06 to open the shutter C07 at the specified speed. Thus, the shutter C07 is opened so that the film F is exposed to light (#358). After closing the shutter C07, the camera microcomputer C01 opens the aperture diaphragm of the taking lens, reinstates the auxiliary mirror (#360 to #362), and then instructs the film advancing device C09 to advance the film one frame so that the film is advanced one frame (#364). In the case of shooting with a flash, during the above described operation, the flash controller F01 starts flashing of the flash F in response to an instruction given when the shutter C07 has been completely opened, and it stops flashing in response to a signal indicating that proper exposure has been obtained.

The camera microcomputer C01 then operates so that one field, or one frame, of a picture is retained in the memory C24-D shown in FIG. 12 synchronously with the opening of the shutter C07 (#366). The picture retained in the memory C24-D is displayed as a still picture in the electronic viewfinder C27 (FIN) (#368). Thus, it is possible to observe through the electronic viewfinder FIN a picture which is substantially the same as a picture taken on a film. Simultaneously, the picture is transferred to the recording/playback converter C25 so that the picture is recorded on the magnetic tape MT. Accordingly, a picture which is recorded several frames earlier can be observed by playback it from the magnetic tape.

A still picture displayed in the electronic viewfinder is kept displayed until the state S1 is established again (that is, until the release button 3 is pressed half the way in) (#370).

While a still picture is being displayed, the video signal shooting unit remains inactive.

<Moving Picture Video Shooting Mode>

Figure 44:
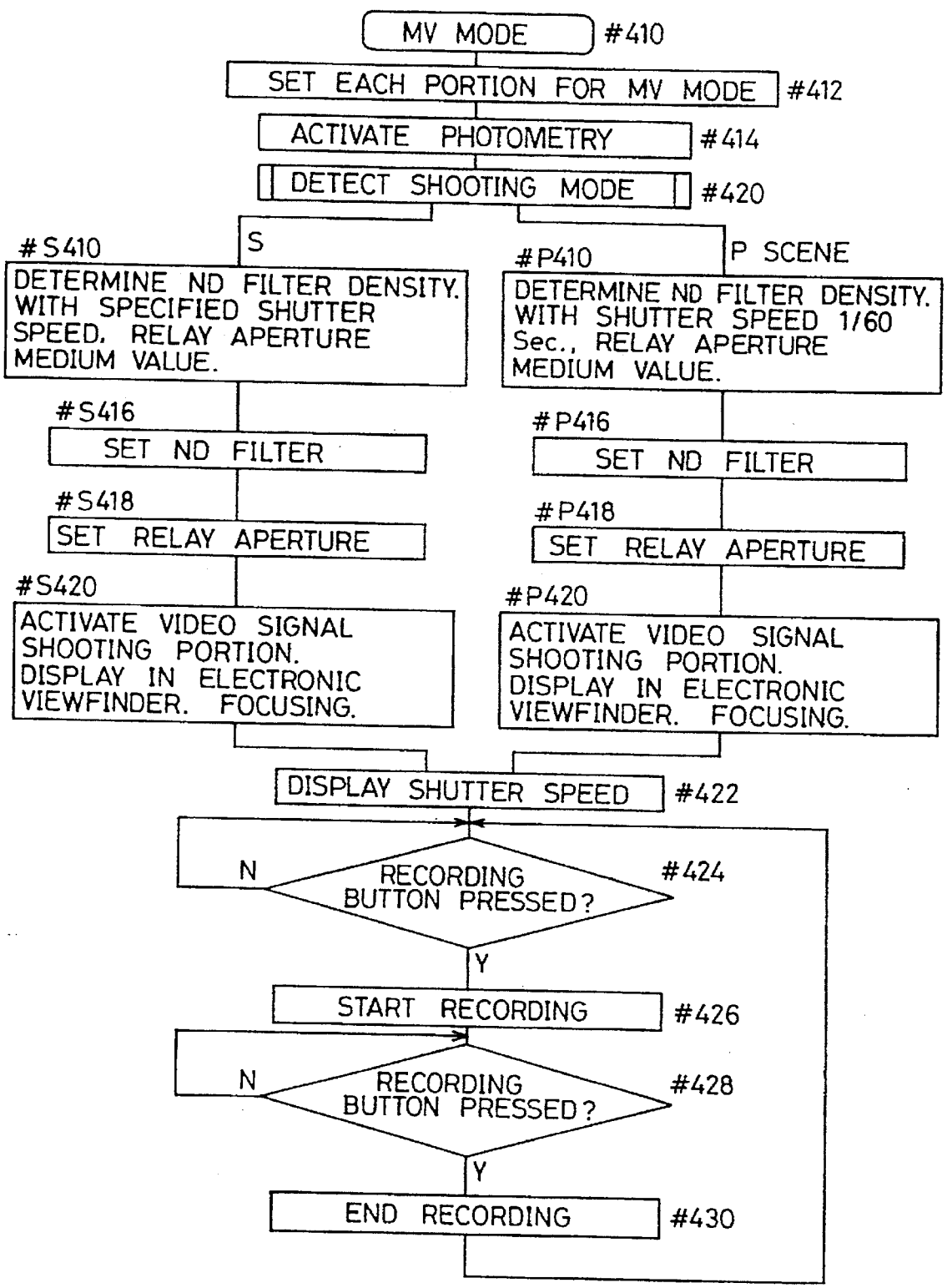
FIG. 44 is a flow chart showing the operation of the fourth embodiment in its moving-picture video shooting mode.

Next, with reference to FIG. 44, the operation of this embodiment in its moving-picture video shooting mode will be described below. In order to shoot a moving-picture video, the mode dial 1 shown in FIG. 2 is set to the position MV first (#410). The camera microcomputer C01 then sets each operation portion of the camera to a state suitable for moving-picture shooting (#412). As to the shooting scene (such as a portrait scene) and the exposure mode (such as an aperture priority mode), the stored settings which were specified when the moving-picture video shooting mode was previously selected are automatically selected. However, the exposure mode can be set to either P or S mode here, and, if M or A mode is selected, the mode is forcibly set to P mode. Alternatively, the operation may be aborted with a warning indication if M or A mode is selected.

Next, photometry is performed by the brightness detection device C12, with the aperture of the aperture diaphragm L11 of the taking lens TL kept open (#414). Then, the specified exposure mode is detected (#420), and the density of the ND filter is determined according to the exposure mode. More specifically, if the exposure mode is set to S mode, the density of the ND filter is so determined that the aperture value of the relay aperture diaphragm will be a mid-point value of the controllable range on condition that calculation is performed based on the specified shutter speed (#A410). If the calculated density exceeds the controllable range, the aperture value is shifted by calculation so that the density will fall within the controllable range.

If the exposure mode is set to P mode, or if a shooting scene is selected, the density of the ND filter is so determined that the aperture value of the relay aperture diaphragm will be a mid-point value of the controllable range on the condition that calculation is performed based on a shutter speed of 1/60 seconds (#P410). If the calculated density exceeds the controllable range, both the aperture value and the shutter speed are shifted by calculation so that the density will fall within the controllable range.

Then, the filter controller C15 controls the ND filter in order to obtain the density determined in each mode, and the relay aperture diaphragm is stopped down according to the value specified in each mode (#S416 to #S418, and #P416 to #P418). Simultaneously, the video signal shooting unit is activated, and the image pickup device C21 converts the light beam that has passed through the taking lens TL and the relay optical system C14 into an electric signal. The thus converted electric signal is converted into a video signal by the circuits described in connection with FIG. 12, and the signal is then displayed as a picture in the electronic viewfinder FIN (#S420 and #P420). Simultaneously, focusing is started.

Meanwhile, the camera microcomputer C01 sets the shooting control values based on the output from the A/D converter C22-B in the image processor C22 shown in FIG. 12 (that is, based on the output from the image pickup device C21). More specifically, in order to achieve proper shooting, the aperture value of the relay aperture diaphragm C18 is controlled in S mode, and a combination of the shutter speed (electric charge accumulation time) of the image pickup device C21 and the aperture value of the relay aperture diaphragm C18 is controlled according to a predetermined program chart in P mode.

In case the brightness of the subject largely changes (for example, more than 4 Ev), the density of the ND filter is controlled accordingly.

Simultaneously, the determined aperture value and shutter speed are indicated in the electronic viewfinder (#422). Thereafter, the camera microcomputer C01 waits for the operator to operate the recording button 25 (#424).

When the recording button 25 is operated, the camera microcomputer C01 controls the recording/playback converter C25, the magnetic head C26, and the magnetic tape driver C36 in order to record video and audio signals on the magnetic tape MT (#426). If the recording button 25 is operated again during recording, the recording is stopped (#428 to #430).

It is to be noted that it is possible to perform shooting on a film by pressing the shutter release button 3 anytime except during recording, though a detailed description will not be given in this respect.

<Simultaneous Shooting Mode>

Figure 45:
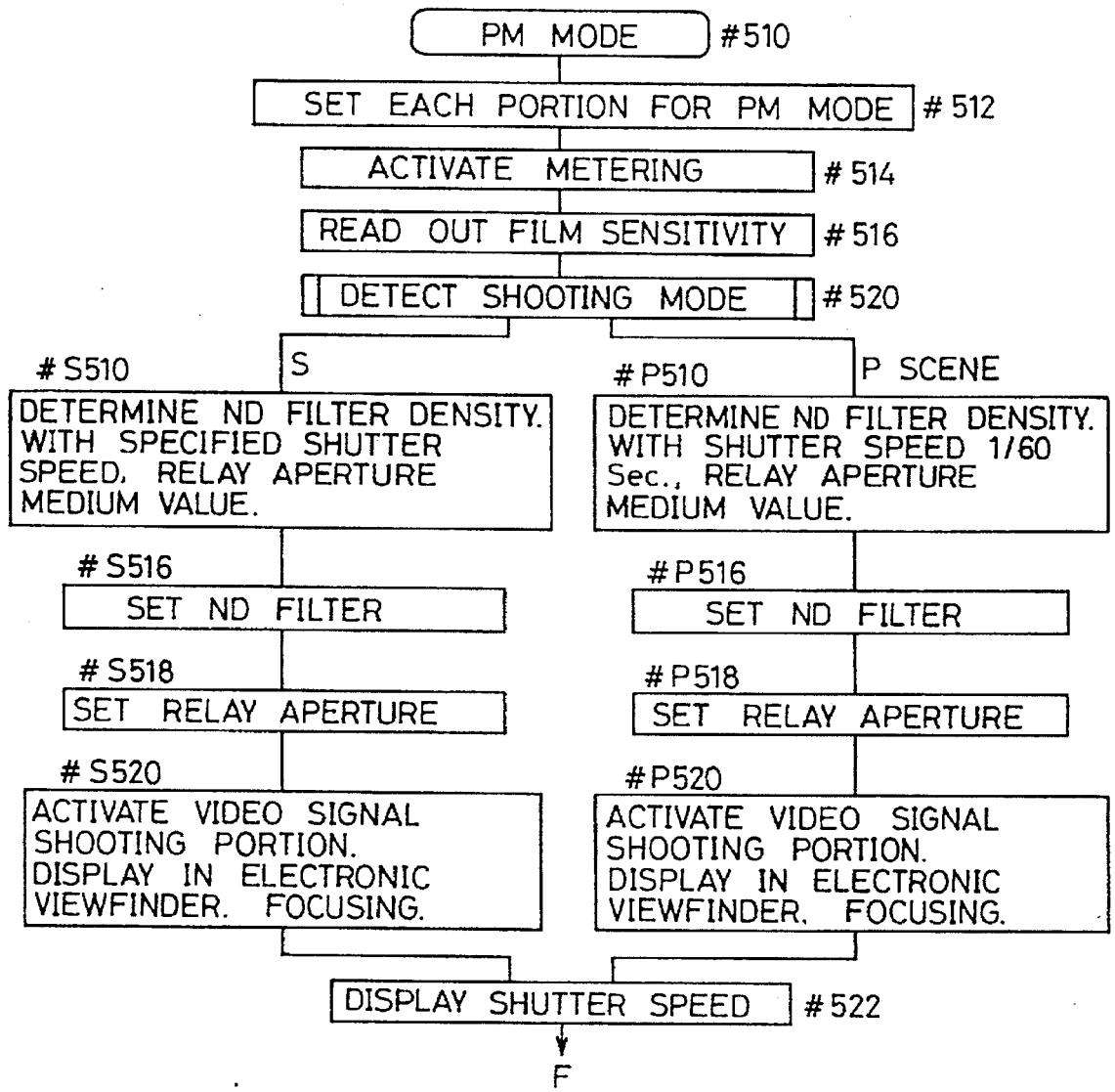
FIGS. 45 and 46 are flow charts showing the operation of the fourth embodiment in its simultaneous shooting mode.
Figure 46:
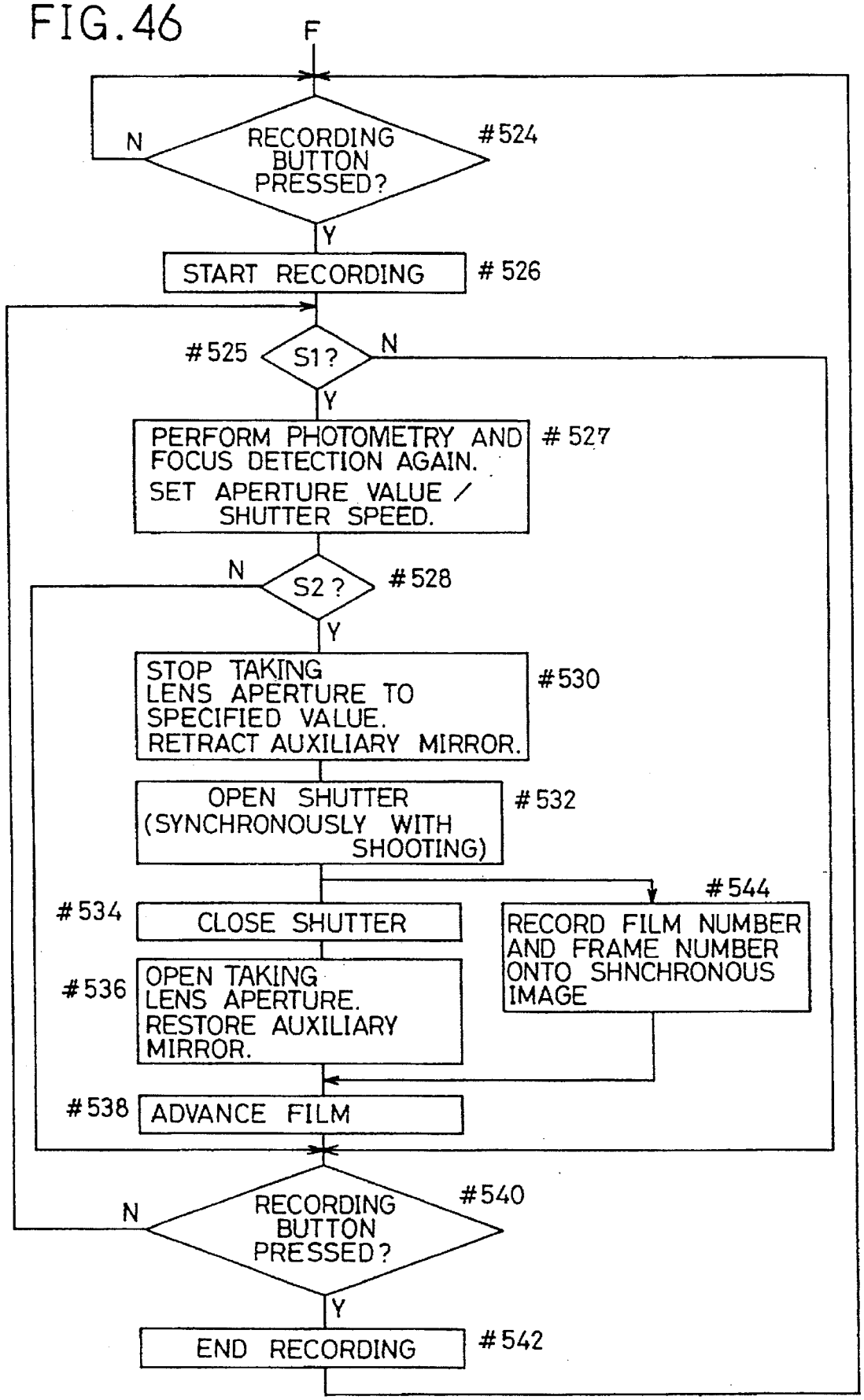

Next, with reference to FIGS. 45 to 46, the operation of this embodiment in its simultaneous shooting mode will be described below. In order to perform simultaneous shooting, the mode dial 1 shown in FIG. 2 is set to the position PM first (#510). The camera microcomputer C01 then sets each operation portion of the camera to a state suitable for simultaneous shooting (#512). As to the shooting scene (such as a portrait scene) and the exposure mode (such as an aperture priority mode), the stored settings which were specified when the simultaneous shooting mode was previously selected are automatically selected. However, the exposure mode can be set to either P or S mode here, and, if M or A mode is selected, the mode is forcibly set to P mode. Alternatively, the operation may be aborted with a warning indication if M or A mode is selected.

Next, photometry is performed by the brightness detection device C12, with the aperture of the aperture diaphragm L11 of the taking lens TL kept open (#514). Then, the specified exposure mode is detected (#520), and the density of the ND filter is determined according to the exposure mode. More specifically, if the exposure mode is set to S mode, the density of the ND filter is so determined that the aperture value of the relay aperture diaphragm will be a mid-point value of the controllable range on condition that calculation is performed based on the specified shutter speed (#S510). If the calculated density exceeds the controllable range, the aperture value is shifted by calculation so that the density will fall within the controllable range.

If the exposure mode is set to P mode, or if a shooting scene is selected, the density of the ND filter is so determined that the aperture value of the relay aperture diaphragm will be a mid-point value of the controllable range on condition that calculation is performed based on a shutter speed of 1/60 seconds (#P510). If the calculated density exceeds the controllable range, both the aperture value and the shutter speed are shifted by calculation so that the density will fall within the controllable range.

Then, the filter controller C15 controls the ND filter in order to obtain the density determined in each mode, and the relay aperture diaphragm is stopped down according to the value specified in each mode (#S516 to #S518, and #P516 to #P518). Simultaneously, the video signal shooting unit is activated, and the image pickup device C21 converts the light beam that has passed through the taking lens TL and the relay optical system C14 into an electric signal. The thus converted electric signal is converted into a video signal by the circuits described in connection with FIG. 12, and the signal is then displayed as a picture in the electronic viewfinder FIN (#S520 and #P520). Simultaneously, focusing is started.

Meanwhile, the camera microcomputer C01 sets the shooting control values based on the output from the A/D converter C22-B in the image processor C22 shown in FIG. 12 (that is, based on the output from the image pickup device C21). More specifically, in order to achieve proper shooting, the aperture value of the relay aperture diaphragm C18 is controlled in S mode, and a combination of the shutter speed (electric charge accumulation time) of the image pickup device C21 and the aperture value of the relay aperture diaphragm C18 is controlled according to a predetermined program chart in P mode.

in case the brightness of the subject largely changes (for example, more than 4 Ev), the density of the ND filter is controlled accordingly.

Simultaneously, the determined aperture value and shutter speed are indicated in the electronic viewfinder (#522). Thereafter, the camera waits for the operator to operate the recording button 25 (#524).

When the recording button 25 is operated, the camera microcomputer C01 controls the recording/playback converter C25, the magnetic head C26, and the magnetic tape driver C36 in order to record video and audio signals on the magnetic tape MT (#526). If the recording button 25 is operated again during recording, the recording is stopped (#540 to #542).

In the above moving picture video shooting mode, it is possible to perform film shooting only when recording is not performed, in other words, either recording or film shooting can be performed at a time. In this mode, in contrast, it is possible to perform both simultaneously. More specifically, when the operator presses the shutter release button half the way in after starting recording (after #526), that is, when the state S1 is established (#525), brightness detection and focus detection are performed again, so that the shutter speed and the aperture value are determined (#527). When the operator presses the shutter release button 3 all the way in (#528), the camera microcomputer C01, detecting this state, stops down the aperture of the aperture diaphragm L11 of the taking lens according to the specified aperture value, and retracts the auxiliary mirror C05 out of the imaging light path (#530). In response to a signal indicating the completion of the above two operations, the camera microcomputer C01 instructs the shutter driving device C06 to open the shutter C07 at the specified speed. This instruction is issued synchronously with imaging by the image pickup device (#532). Thus, the shutter C07 is opened so that the film F is exposed to light. After closing the shutter C07 (#534), the camera microcomputer C01 opens the aperture of the taking lens, reinstates the auxiliary mirror (#536), and then instructs the film advancing device C09 to advance the film one frame so that the film is advanced one frame (#538). In the case of shooting with a flash, during the above described operation, the flash controller F01 starts flashing of the flash F in response to an instruction given when the shutter C07 has been completely opened, and it stops flashing in response to a signal indicating that proper exposure has been obtained.

On the other hand, the camera microcomputer C01 adds a film number representing the film currently loaded in the camera and a frame number representing the position of the frame on the film to the video signal corresponding one field of the image shot synchronously with the opening of the shutter C07, and records the resultant signal on the magnetic tape MT (#544). Thus, a picture taken on the film can be previewed before developing the film.

In a construction according to the third and the fourth embodiments of the present invention, by operating the second aperture diaphragm provided in the light path of the light beam for imaging on the image pickup device, it is possible to preview through the electronic viewfinder a picture having the same picture effects (aperture effects) as a picture recorded on a photosensitive recording medium.

Meanwhile, since the first aperture diaphragm is not Stopped down, focus detection is not affected. Moreover, although the amount of light incident on the image pickup device varies as the aperture is stopped down, it is possible to control that amount by controlling the electric charge accumulation time (electronic shutter speed) of the image pickup device.

Further, since one field, or one frame, of an image taken by the image pickup device is displayed still in the electronic viewfinder, it is possible to preview picture effects in a still picture.

In addition, by controlling the electric charge accumulation time (electronic shutter speed) of the image pickup device, it is possible to preview through the electronic viewfinder a picture having the same picture effects (shutter speed effects) as a picture recorded on a photosensitive recording medium. This is especially effective when picture effects are to be previewed in a still picture. Moreover, although the output from the image pickup device varies as the electric charge accumulation time changes, it is possible to control that output by operating the second aperture diaphragm.

Further, since the density of a filter whose density is variable is controlled, a sensitivity difference between a photosensitive recording media and an image pickup device is compensated for, and the aperture diaphragm is stopped down to an aperture equivalent to an aperture for recording on a photosensitive recording medium. As a result, it is possible to preview proper picture effects.

Hereinafter, a fifth embodiment of the present invention will be described. The external views of this embodiment are the same as are shown in FIGS. 1 to 10. The internal construction of this embodiment is similar to but partially different from that shown in FIGS. 11 to 13. The different portions will be described first, with reference to FIGS. 47 to 51, and 56.

Figure 47:
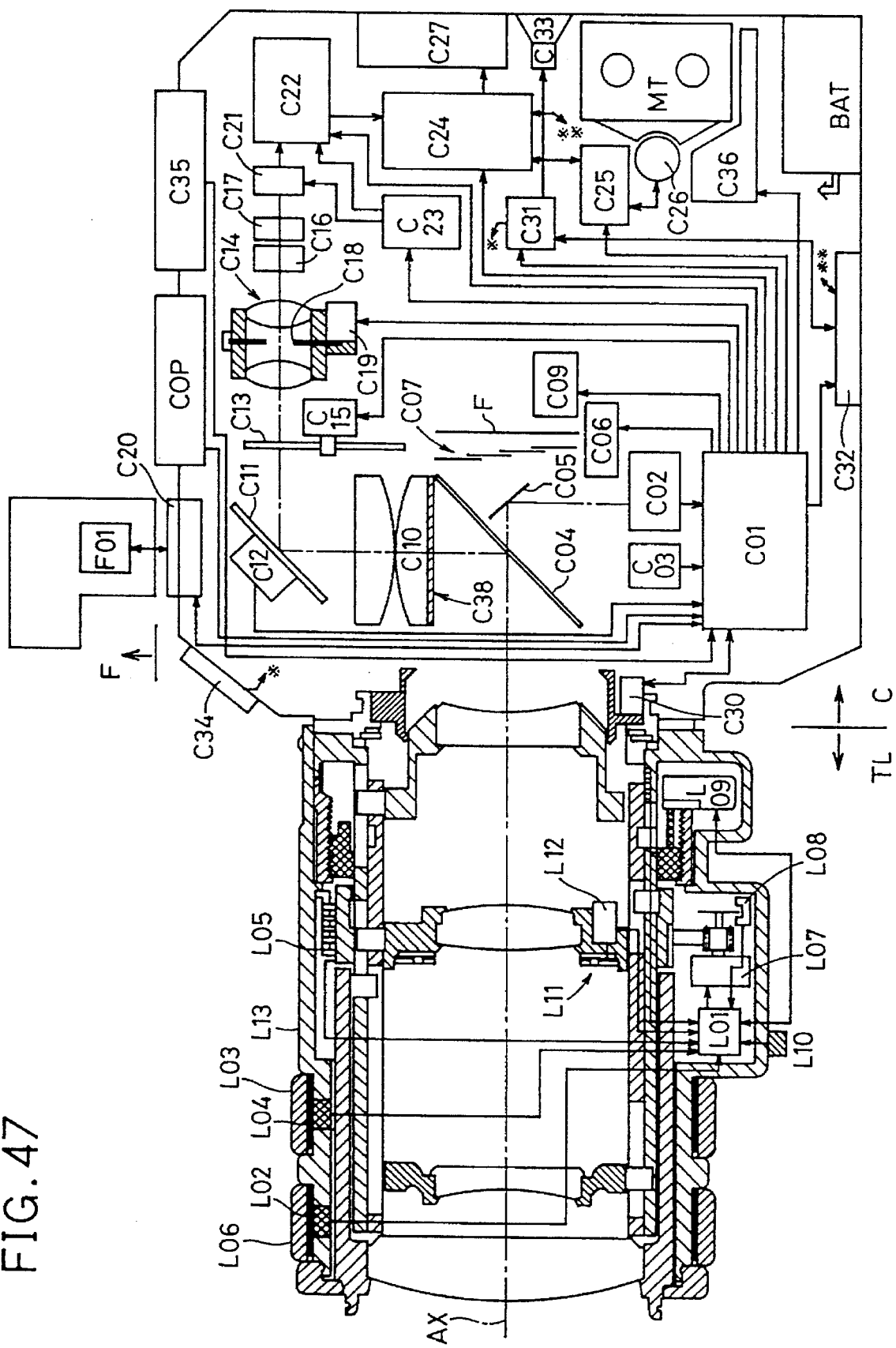
FIG. 47 is a diagram generally showing the internal construction of the fifth embodiment of the present invention.

As shown in FIG. 47, a focus plate C38 is provided at a position where the taking lens forms a primary image. The focus plate C38 comprises a member having a predetermined light diffusivity.

Figure 54:
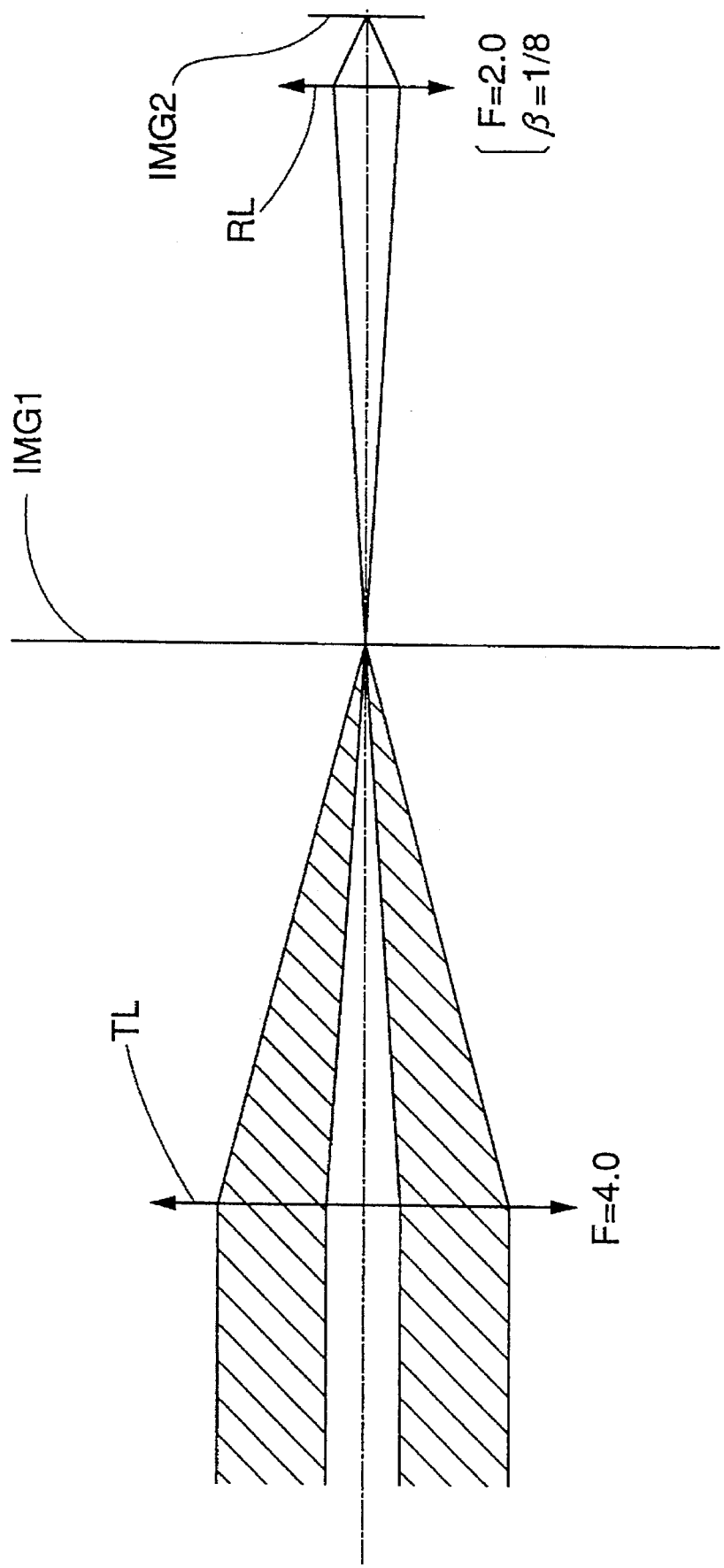
FIG. 54 is a diagram showing a light path in a conventional camera.

As set forth above, an image pickup device having a considerably small image area is generally used, and it is often impossible to use a relay optical system capable of supplying sufficient light As a consequence of the above limitations, the following problem arises. Assume a relay optical system of a magnification $\beta=\frac{1}{8}$ and of an open aperture value F=2.0 (represented also by a) is used, as shown in FIG. 54. A light beam incident from a taking lens TL enters the relay optical system RL without diffusing on a primary image plane IMG1. Accordingly, of the light beam incident from the taking lens TL, only a portion corresponding to $a/\beta=16.0$, that is, F=16.0 is used as a light beam which passes through the relay optical system RL to form a secondary image IMG2. Even if a taking lens of an open aperture value F=4.0, for example, is used, the remaining light beam (indicated with hatching in the drawing) passing outside the light beam corresponding to F=16.0 is wasted (not imaged, that is, not used as a viewfinder picture).

Under this condition, it requires skill to confirm the in-focus state (so-called crest of focus) by the naked eye when a taken secondary image is reproduced in the electronic viewfinder. This problem may be solved either by using a relay optical system having a smaller aperture value a (using a brighter optical system), or by increasing the magnification $\beta$ (reducing the reduction factor), but both are inadvisable, because the relay optical system will be expensive and bulky in the former case, and because an image pickup device having a large imaging area will be expensive in the latter case.

The focus plate C38 is adopted in view of the above situation.

Figure 51:
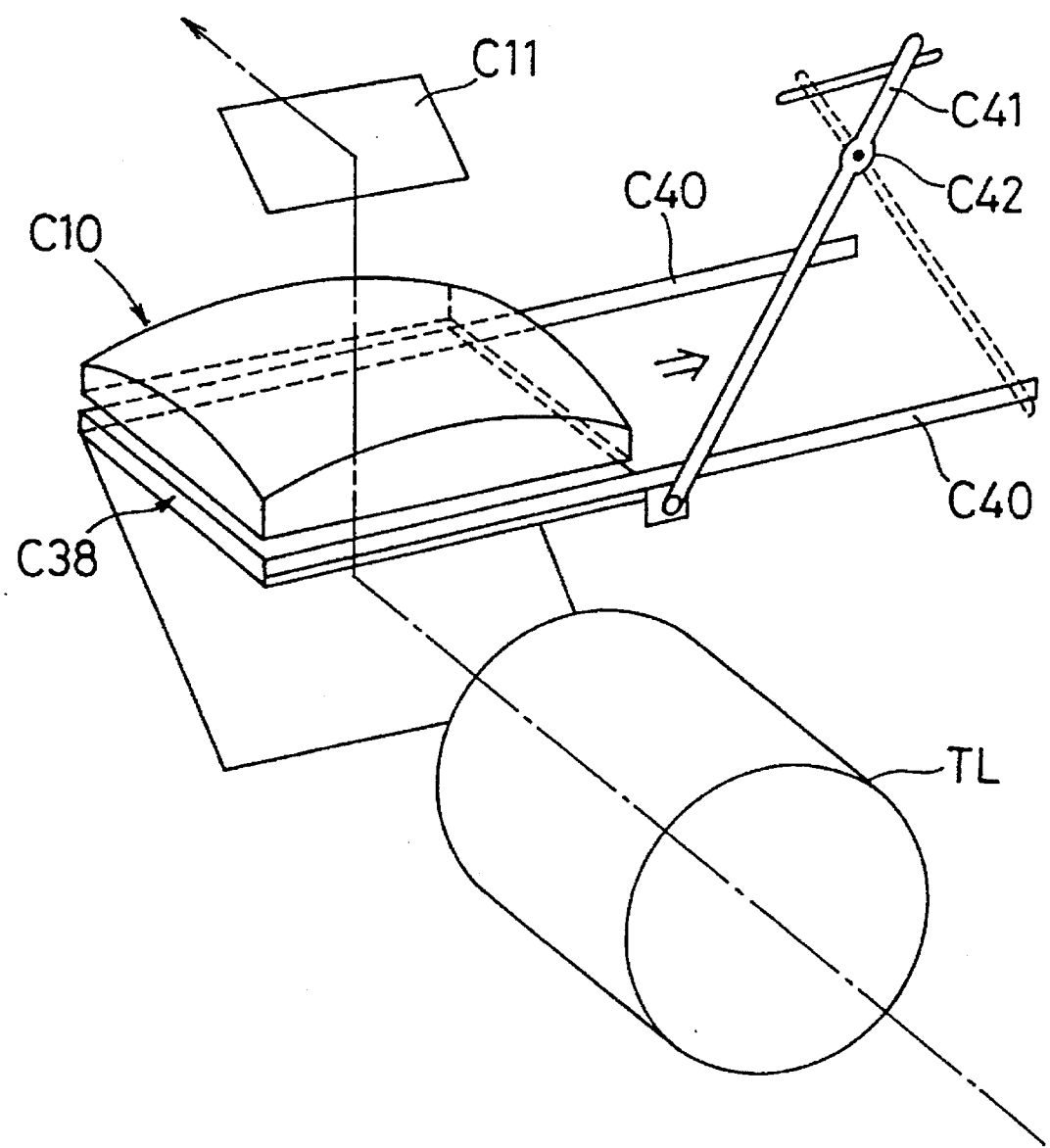
FIG. 51 is a detail view of the focus plate of the fifth embodiment.

Next, with reference to FIG. 51, details of the focus plate C38 shown in FIG. 47 will be described below. The focus plate C38 is guided at its front and rear edges by guide rails C40 to be laterally slidable below the condenser lens C10. The focus plate C38 is engaged with a switching lever C41 which is rotatable about an axis C42. When the operation mode is set to the film shooting mode PH, the switching lever C41 is rotated clockwise so that the focus plate C38 is positioned below the condenser lens C10. When the operation mode is set to a mode other than the film shooting mode PH, the switching lever C41 is rotated counter-clockwise so that the focus plate C38 is retracted from below the condenser lens C10.

Figure 56:
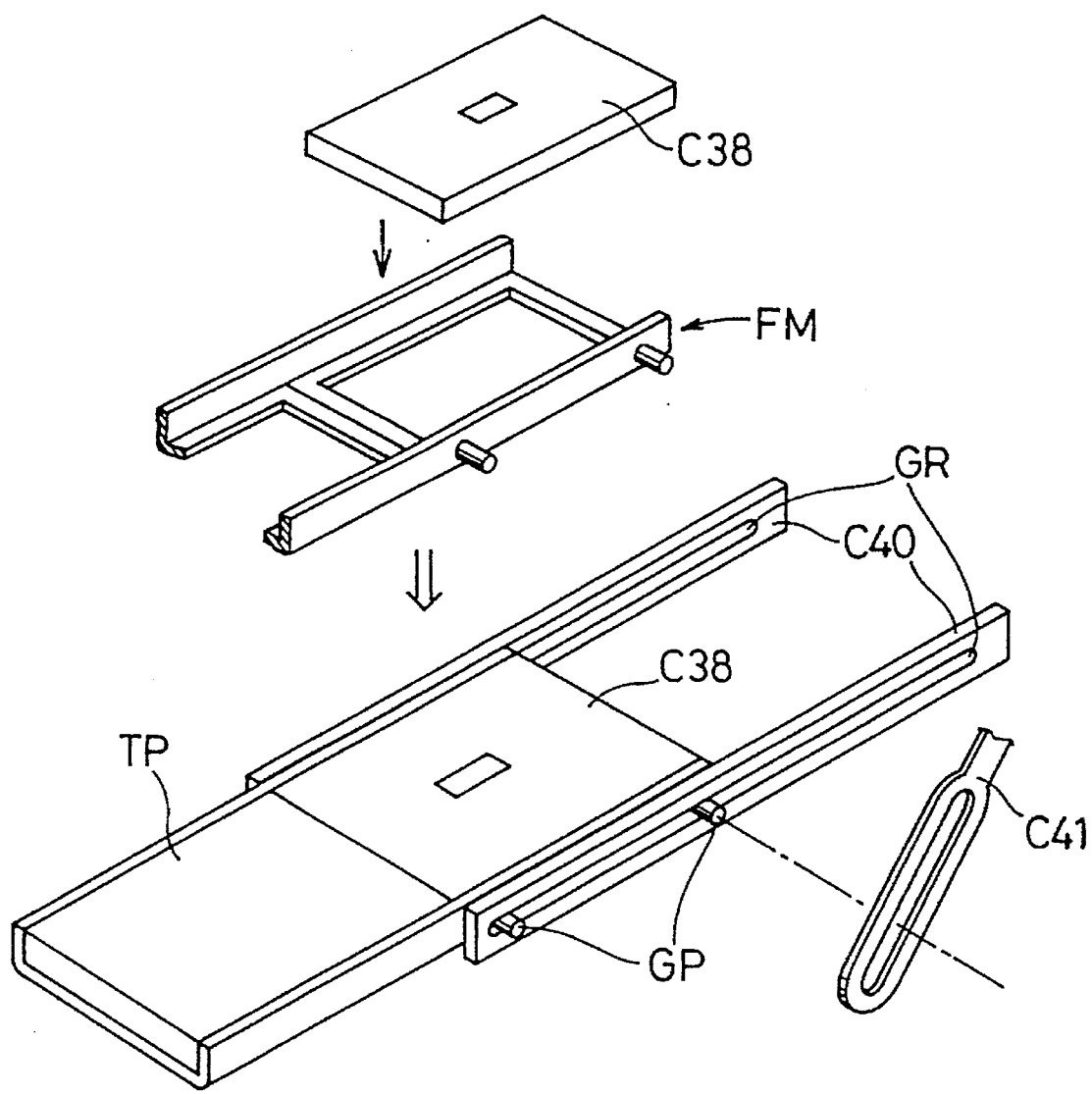
FIG. 56 is a diagram showing the construction of a diffusion plate.

A more specific construction for sliding the focus plate C38 is shown in FIG. 56. As shown in the upper part of the figure, the focus plate C38 is fitted into and glued onto a frame member FM which has an opening in its bottom surface. As shown in the lower part of the figure, the focus plate C38 is slidable along guide grooves GR as a result of engagement of guide pins GP protruding from the frame member with the guide grooves GR formed on a pair of the guide rails C40 fixed to the camera. The switching lever C41 has a long groove formed along its length direction, and one of the guide pin GP is engaged with the long groove thereof. Thus, when the switching lever C41 is rotated, the guide pin GP engaged with the long groove is driven, and the focus plate C38 is slid.

It is to be noted that, in this embodiment, a transparent plate TP is provided together with the focus plate C38. When the focus plate C38 is retracted from below the condenser lens C10, the transparent plate TP is positioned below the condenser lens C10. The transparent plate TP is formed with the same material having the same thickness as the focus plate C38, but it has no light diffusivity. The transparent plate TP is provided in order to prevent a slight deviation of the imaging position on the image pickup device due to a change in the substantial light path length as a result of retraction of the focus plate C38. In other words, by providing the transparent plate TP, it is possible to change only the light diffusivity without changing other conditions.

It is to be noted that the focus plate C38 may have roughly processed surfaces. However, in order to form a clearer image, a focus plate with predetermined, regular projections and depressions formed on the surfaces is preferable to one with irregular surfaces.

Figure 49:
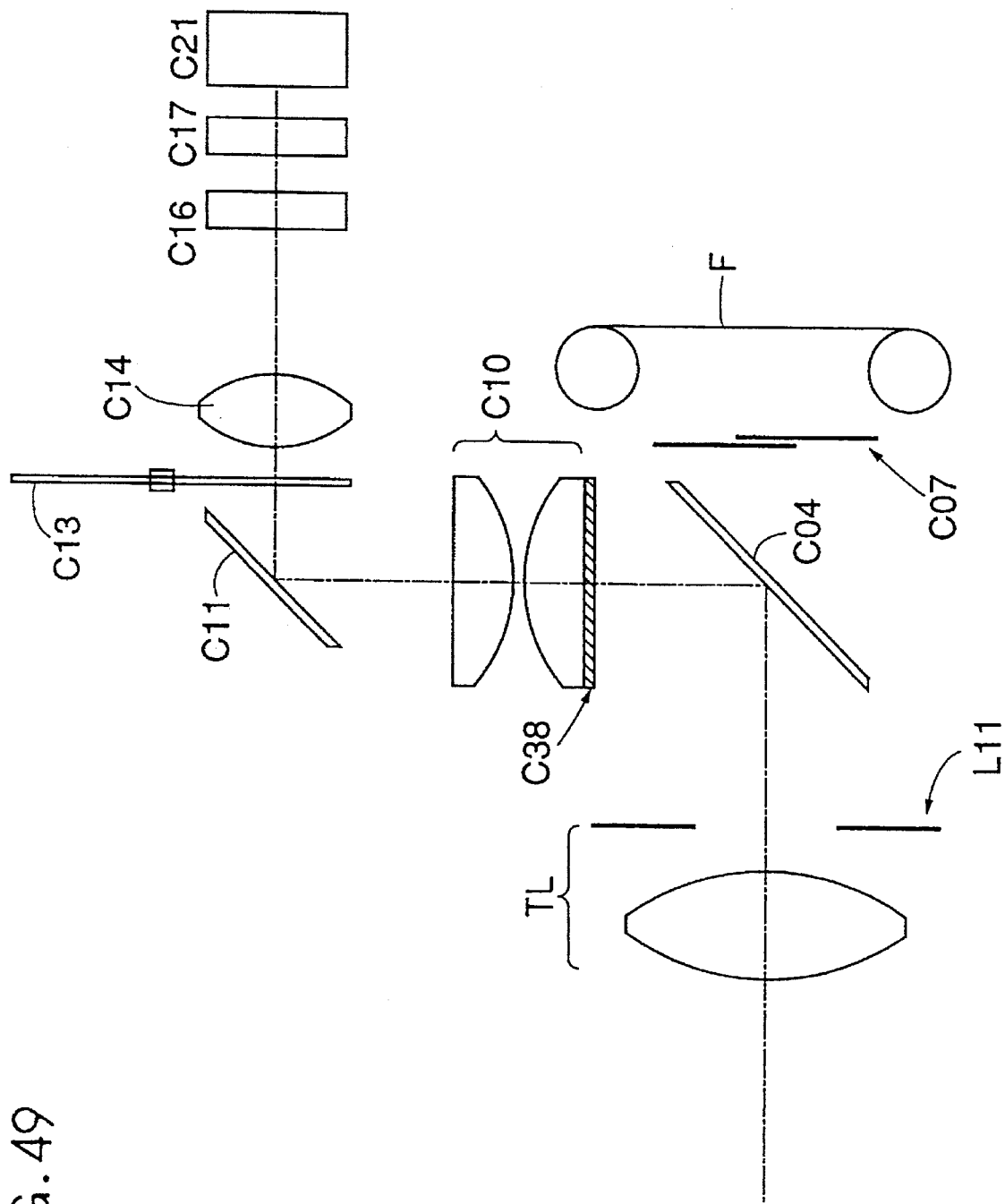
FIGS. 49 and 50 diagrams showing the optical system of the fifth embodiment.
Figure 50:
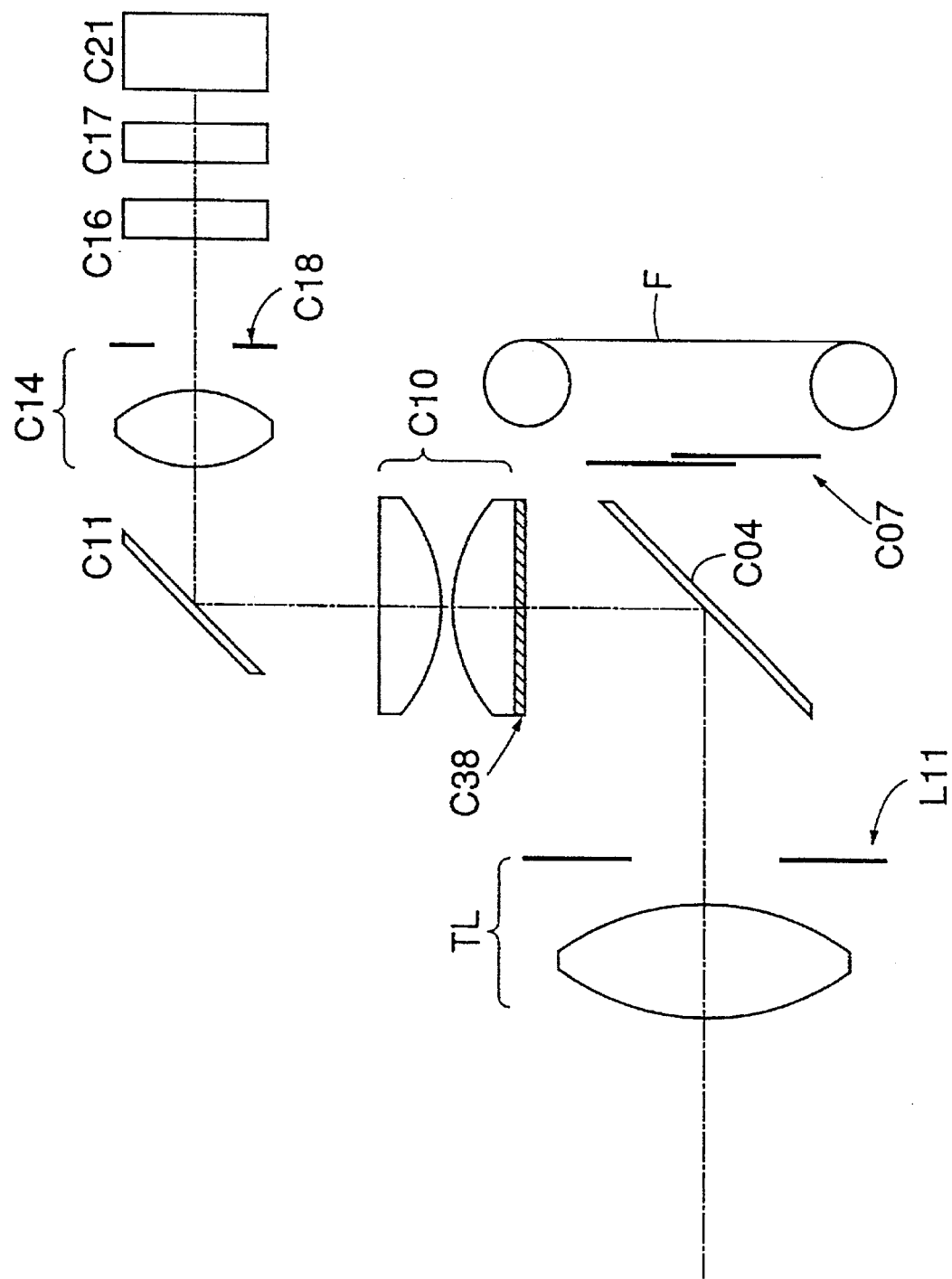

FIGS. 49 and 50 are simplified drawings showing exclusively optical system components of the construction shown in FIG. 47. In FIG. 49, an ND filter C13 is provided upstream from the relay optical system C18, but a relay aperture diaphragm is not provided. In FIG. 50, a relay aperture diaphragm C18 is provided, but an ND filter is not provided. These figures therefore show that an ND filter and a relay aperture diaphragms are equivalent in that both control the amount of light incident on the image pickup device C21. However, both are provided in this embodiment.

Figure 48:
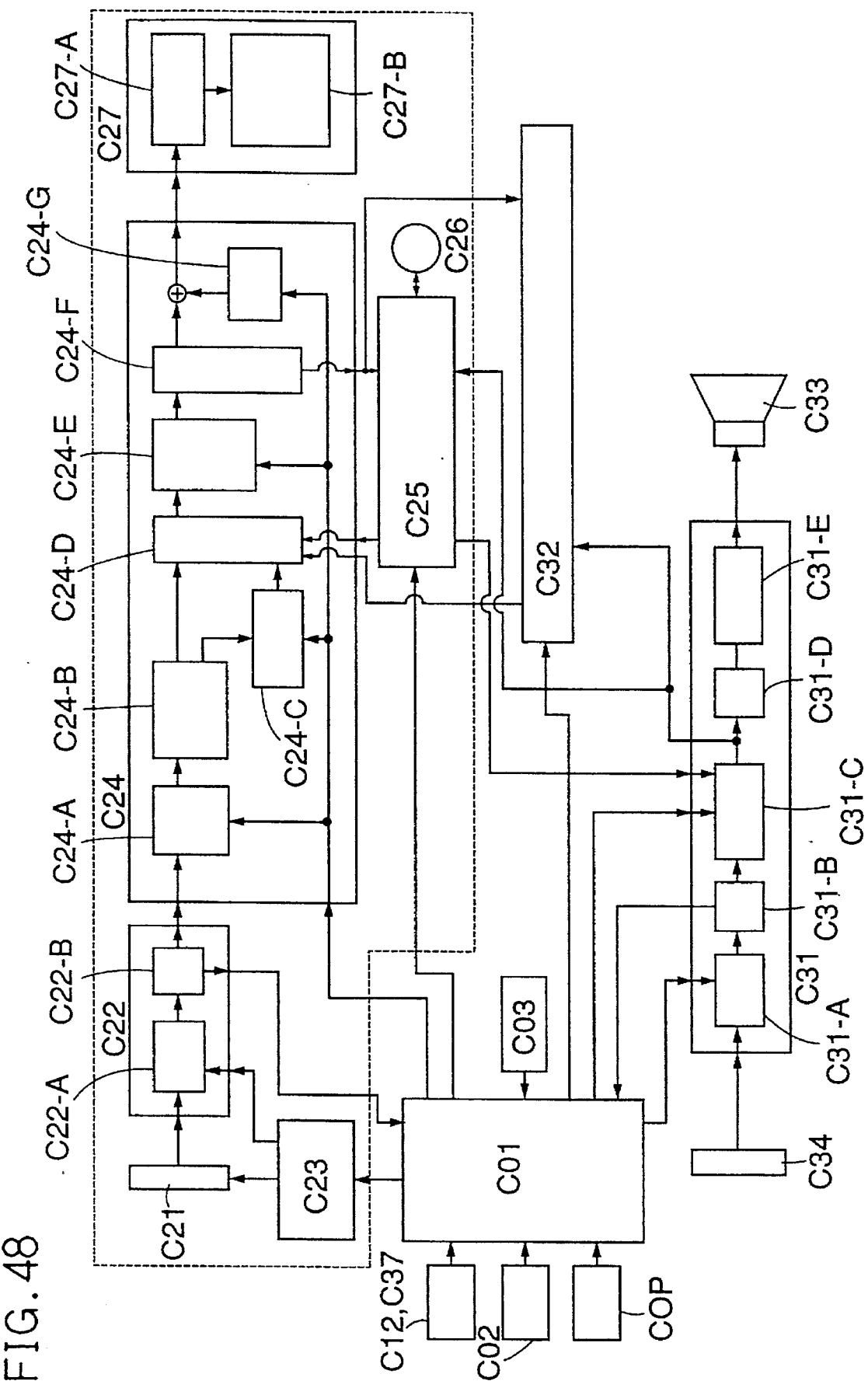
FIG. 48 is a circuit diagram schematically showing the internal construction of the fifth embodiment.

On the other hand, as shown in FIG. 48, the image processor C22 comprises a sub-sampling portion C22-A and an A/D converter C22-B. The output from the A/D converter C22-B is fed to a γ converter C24-A in the video processor C24.

<Film Shooting Mode>

Next, the operation of this embodiment in its film shooting mode will be described below. In order to take a picture on a film, the mode dial 1 shown in FIG. 2 is set to the position PH first. Then, this operation is mechanically or electrically transmitted to the switching lever C41, and the switching lever C41 is rotated clockwise so that the focus plate C38 is positioned below the condenser lens C10. Meanwhile, the camera microcomputer C01 sets each operation portion of the camera to a state suitable for film shooting. As to the shooting scene (such as a portrait scene) and the exposure mode (such as an aperture priority mode), the stored settings which were specified when the film shooting mode was previously selected are automatically selected. The camera microcomputer C01 then reads out the sensitivity of the film loaded in the camera, and determines a combination of the aperture value of the relay aperture diaphragm C18 and the density of the ND filter C13 based on the sensitivity difference between the image pickup device C21 and the film. Simultaneously, the portion enclosed with broken lines in FIG. 48, that is, the portion related to image processing is activated.

As shown in FIG. 47, the light beam incident through the taking lens TL travels via the main mirror C04, the mirror C11, the ND filter C13, the relay optical system C14, the optical low-pass filter C16, and the infrared light cut filter C17, and enters the image pickup device C21 to be taken as an image thereby. After imaging, the image signal, after being processed in the image processor C22 and the video processor C23 shown in FIG. 48, is displayed as a picture in the electronic viewfinder C27 (FIN).

Here, if the exposure mode is set to A mode, the aperture of the aperture diaphragm L11 of the taking lens TL is stopped down to the specified aperture value. Meanwhile, the camera microcomputer C01 controls the driving pulse generator C23 based on the output from the A/D converter C22-B in the image processor C22, that is, based on the output from the image pickup device C21, in order to set the shutter speed (electric charge accumulation time) of the image pickup device.

If the exposure mode is set to S mode, the camera microcomputer C01 controls the driving pulse generator C23 based on the specified shutter speed in order to set the shutter speed (electric charge accumulation time) of the image pickup device. Based on the output at this time from the A/D converter C22-B in the image processor C22, that is, based on the output from the image pickup device C21, the camera microcomputer C01 instructs the lens microcomputer L01 to control the aperture diaphragm L11 of the taking lens TL.

If the exposure mode is set to P mode, or if a shooting scene is selected, operations for either A mode or S mode described above are performed. If the exposure mode is set to M mode, both the aperture of the aperture diaphragm L11 of the taking lens and the shutter speed (electric charge accumulation time) of the image pickup device are set to the specified values.

Later, when the operator presses the shutter release button 3 half the way in, the focus detection device C02 and the brightness detection device C12 shown in FIG. 47 are activated. The focus detection device C02 detects the focusing condition of the taking lens TL, and transfers a detection result to the camera microcomputer C01. Based on the detection result, the microcomputer C01 transfers an driving instruction signal to the lens microcomputer L01, when necessary. The lens microcomputer L01 performs a calculation with adding conditions particular to the taking lens TL to the driving instruction, and, based on the operation result, drives the focus motor L09.

Meanwhile, the brightness detection device C12 detects the brightness of the subject, and transfers a detection result to the camera microcomputer C01. If the exposure mode is set to A mode, a shutter speed for film shooting is determined based on the brightness detection result and the specified aperture value, and the shutter speed (electric charge accumulation time) of the image pickup device C21 is set to a value equivalent to the determined shutter speed.

If the exposure mode is set to S mode, the shutter speed for film shooting is selected as the specified shutter speed, and the shutter speed (electric charge accumulation time) of the image pickup device C21 is set to a value equivalent to the specified shutter speed. The aperture value of the taking lens is calculated based on the shutter speed and the detection result of the brightness detection device, and the camera microcomputer C01 instructs the lens microcomputer L01 to control the aperture diaphragm L11.

If the exposure mode is set to P mode, or if a shooting scene is selected, operations for either A mode or S mode described above are performed. If the exposure mode is set to M mode, both a combination of the aperture value of the relay aperture diaphragm C18 and the density of the ND filter C13, and the shutter speed (electric charge accumulation time) of the image pickup device C21 are adapted to the specified value.

As a result of the above described operation, when the operator presses the shutter release button 3 half the way in, that is, when the operator performs shooting preparation operation, taken images taken at the aperture value and the shutter speed specified and controlled for film shooting are successively (in the state of a moving picture) displayed in the electronic viewfinder FIN, that is, images are previewed (moving-picture preview).

If the operator wishes to preview a picture as a still picture here, the operator operates the dual-purpose button 23 singly during the moving-picture preview. Then, the camera microcomputer C01 operates so that one field, or one frame, of a picture at the instant when the dual-purpose button is pressed is retained in the memory C24-D shown in FIG. 48. The retained picture is displayed still in the electronic viewfinder FIN (C27) (still-picture preview) (#36). When the dual-purpose button 23 is operated again here, the retaining of the picture on the memory C24-D is canceled, and images are reproduced as a moving picture thereafter.

If the operator wishes to observe a picture taken with a flash, the operator installs a flash F onto the accessory shoe HS, and turns on the power of the flash. When the dual-purpose button 23 is operated here, the camera microcomputer sets the electric charge accumulation time of the image pickup device C21 to a shutter speed suitable for flash shooting (1/60 seconds, for example), and starts flashing synchronously with the start of electric charge accumulation. Then, the brightness detection device C12 is instructed to perform photometry, and, when proper exposure is obtained, the flash controller F01 is instructed to stop flashing. A picture taken at this moment is retained in the memory C24-D, and the picture is displayed still in the electronic viewfinder FIN (C27).

If the operator wishes to observe a picture in the electronic viewfinder with the aperture open as in the case where focusing is performed manually, the operator operates the recording button 25 and the dual-purpose button 23 simultaneously. In response to this operation, the camera microcomputer C01 instructs the lens microcomputer L01 to open the relay aperture diaphragm. Then, shooting is performed by use of a light beam incident under this condition. The camera microcomputer C01 controls the driving pulse generator C23 based on the output from the A/D converter C22-B in the image processor C22, that is, based on the output from the image pickup device C21, in order to set the shutter speed (electric charge accumulation time) of the image pickup device C21. Thus, it is possible to observe a picture with the aperture diaphragm L11 of the taking lens TL open. Here, in case the relay aperture diaphragm is stopped down, the shutter speed (electric charge accumulation time) can be determined after the relay aperture diaphragm is opened. By this operation, the electric charge accumulation time is shortened, and accordingly, changes in a picture during the time lapse for electric charge accumulation is reduced. Thus, it is possible to obtain a clearer picture in the electronic viewfinder, and therefore, it is possible to perform focusing more easily.

When the dual-purpose button 23 is operated singly with the aperture open, the camera microcomputer C01 lets each camera portion to return to the original state for a moving picture, and then operates so that one field, or one frame of the picture will be retained in the memory C24-D shown in FIG. 48 at the instant when the original state is established. The picture retained in the memory C24-D is displayed as a still picture in the electronic viewfinder C27 (FIN). Thus, it is possible to preview effects of the aperture, effects of the shutter speed, the picture composition, and others through the electronic viewfinder FIN. Here, if the dual-purpose button 23 is pressed again, the camera returns to the open aperture state.

When the dual-purpose button 23 is pressed again with the recording button 25 held pressed, the camera returns to the moving-picture state. On detecting this simultaneous operation, the camera microcomputer C01 resets each camera portion to the original state for a moving picture.

When the operator presses the shutter release button 3 all the way in, the camera microcomputer C01 retracts the auxiliary mirror C05 out of the imaging light path. In response to a signal indicating the completion of retraction, the camera microcomputer C01 instructs the shutter driving device C06 to open the shutter C07 at the specified speed. Thus, the shutter C07 is opened so that the film F is exposed to light. After closing the shutter C07, the camera microcomputer C01 instructs the film advancing device C09 to advance the film one frame so that the film is advanced one frame. In the case of shooting with a flash, during the above described operation, the flash controller F01 starts flashing of the flash F in response to an instruction given when the shutter C07 has been completely opened, and it stops flashing in response to a signal indicating that proper exposure has been obtained.

The camera microcomputer C01 then operates so that one field, or one frame, of a picture is retained in the memory C24-D shown in FIG. 12 Synchronously with the opening of the shutter C07. The picture retained in the memory C24-D is displayed as a still picture in the electronic viewfinder C27 (FIN). Thus, it is possible to observe through the electronic viewfinder FIN a picture which is substantially the same as a picture taken on a film. Simultaneously, the picture is transferred to the recording/playback converter C25 so that the picture is recorded on the magnetic tape MT. Accordingly, a picture which is recorded several frames earlier can be observed by playing it back from the magnetic tape.

<Moving Picture Video Shooting Mode>

Next, the operation of this embodiment in its moving-picture video shooting mode will be described below. In order to shoot a moving-picture video, the mode dial 1 shown in FIG. 2 is set to the position MV first. Interlocking with the above operation, the switching lever C41 is rotated counter-clockwise so that the focus plate C38 is retracted from below the condenser lens C10. Meanwhile, the camera microcomputer C01 sets each operation portion of the camera to a state suitable for moving-picture video shooting. As to the shooting scene (such as a portrait scene) and the exposure mode (such as an aperture priority mode), the stored settings which were specified when the moving-picture video shooting mode was previously selected are automatically selected.

It is to be noted that, as shown in FIG. 54, if settings are made assuming the use of a relay optical system of a magnification $\beta=\frac{1}{8}$ and an aperture value F=2.0, picture effects achieved by aperture control (such as depth-of-field effects) can be obtained only in the range corresponding to an aperture value F=16 or above. Therefore, even if A or M mode is selected for the purpose of achieving picture effects by controlling the aperture, substantial effects will not be obtained. For this reason, operations performed in A or M mode are the same as in P mode. Meanwhile, the aperture diaphragm L11 of the taking lens TL is kept open.

On the other hand, the image pickup device C21 converts the light beam that has passed through the taking lens TL and the relay optical system C14 into an electric signal. The thus converted electric signal is converted into a video signal by the circuits shown in FIG. 48, and the signal is then displayed as a picture in the electronic viewfinder FIN.

Here, if the exposure mode is set to P mode, the camera microcomputer C01 determines a proper combination of the aperture value of the relay aperture diaphragm C18 and the density of the ND filter C13 based on the output from the A/D converter C22-B in the image processor C22 shown in FIG. 48 (that is, based on the output from the image pickup device C21), and sets the shutter speed (electric charge accumulation time) of the image pickup device C21 to $\frac{1}{60}$ seconds. If the exposure mode is set to S mode, the camera microcomputer C01 controls the driving pulse generator C23 based on the specified shutter speed in order to control the shutter speed (electric charge accumulation time) of the image pickup device C21, and controls a combination of the aperture of the relay aperture diaphragm C18 and the density of the ND filter C13 based on the output from the A/D converter C22-B in the image processor C22. If a shooting scene is selected, operations as performed in either P or S mode as described above are performed.

When the operator operates the recording button 25, the camera microcomputer C01 controls the recording/playback converter C25 and the magnetic tape driver C36 in order to start recording of video and audio signals on the magnetic tape MT. When the operator operates the recording button 25 again, the camera microcomputer C01 controls the recording/playback converter C25 and the magnetic tape driver C36 in order to stop recording of video and audio signals on the magnetic tape MT.

<Simultaneous Shooting Mode>

Next, the operation of this embodiment in its simultaneous shooting mode will be described below. In order to perform simultaneous shooting, the mode dial 1 shown in FIG. 2 is set to the position PM first. Then, as a result of the above operation, the switching lever C41 is rotated counterclockwise so that the focus plate C38 is retracted from below the condenser lens C10. Meanwhile, the camera microcomputer C01 sets each operation portion of the camera to a state suitable for simultaneous shooting. As to the shooting scene (such as a portrait scene) and the exposure mode (such as an aperture priority mode), the stored settings which were specified when the simultaneous shooting mode was previously selected are automatically selected.

As in the moving-picture video shooting mode above, picture effects achieved by aperture control (such as depth-of-field effects) can be obtained only in the range corresponding to an aperture value F=16 or above. Therefore, also in this mode, operations performed in A or M mode are the same as in P mode. Meanwhile, the aperture diaphragm L11 of the taking lens TL is kept open.

On the other hand, the image pickup device C21 converts the light beam that has passed through the taking lens TL and through the relay optical system C14 into an electric signal. The thus converted electric signal is converted into a video signal by the circuits shown in FIG. 48, and the signal is then displayed as a picture in the electronic viewfinder FIN.

Here, if the exposure mode is set to P mode, the camera microcomputer C01 determines a proper combination of the aperture value of the relay aperture diaphragm C18 and the density of the ND filter C13 based on the output from the A/D converter C22-B in the image processor C22 shown in FIG. 48 (that is, based on the output from the image pickup device C21), and sets the shutter speed (electric charge accumulation time) of the image pickup device C21 to correspond to the shutter speed of 1/60 seconds. If the exposure mode is set to S mode, the camera microcomputer C01 controls the driving pulse generator C23 based on the specified shutter speed in order to control the shutter speed (electric charge accumulation time) of the image pickup device C21, and controls a combination of the aperture of the relay aperture diaphragm C18 and the density of the ND filter C13 based on the output from the A/D converter (C22-B) in the image processor C22. If a shooting scene is selected, operations as performed in either P or S mode as described above are performed.

When the operator operates the recording button 25, the camera microcomputer C01 controls the recording/playback converter C25 and the magnetic tape driver C36 in order to start recording of video and audio signals on the magnetic tape MT. When the operator operates the recording button 25 again, the camera microcomputer C01 controls the recording/playback converter C25 and the magnetic tape driver C36 in order to stop recording of video and audio signals on the magnetic tape MT.

When the operator operates the shutter release button 3 during recording, the camera microcomputer C01 sets the shutter speed to a proper value based on the output from the brightness detection device C12, and sets the aperture of the aperture diaphragm L11 of the taking lens TL to a value in the range from an open aperture value to F=16. The camera microcomputer then retracts the auxiliary mirror C05 out of the imaging light path, and stops down the aperture diaphragm L11. In response to a signal indicating the completion of retraction of the auxiliary mirror C05 and of stopping down of the aperture diaphragm, the camera microcomputer C01 instructs the shutter driving device C06 to open the shutter C07 at the specified speed. Thus, the shutter C07 is opened so that the film F is exposed to light. After closing the shutter C07, the camera microcomputer C01 instructs the film advancing device C09 to advance the film one frame so that the film is advanced one frame. In the case of shooting with a flash, during the above described operation, the flash controller F01 starts flashing of the flash F in response to an instruction given when the shutter C07 has been completely opened, and it stops flashing in response to a signal indicating that proper exposure has been obtained.

Figure 52:
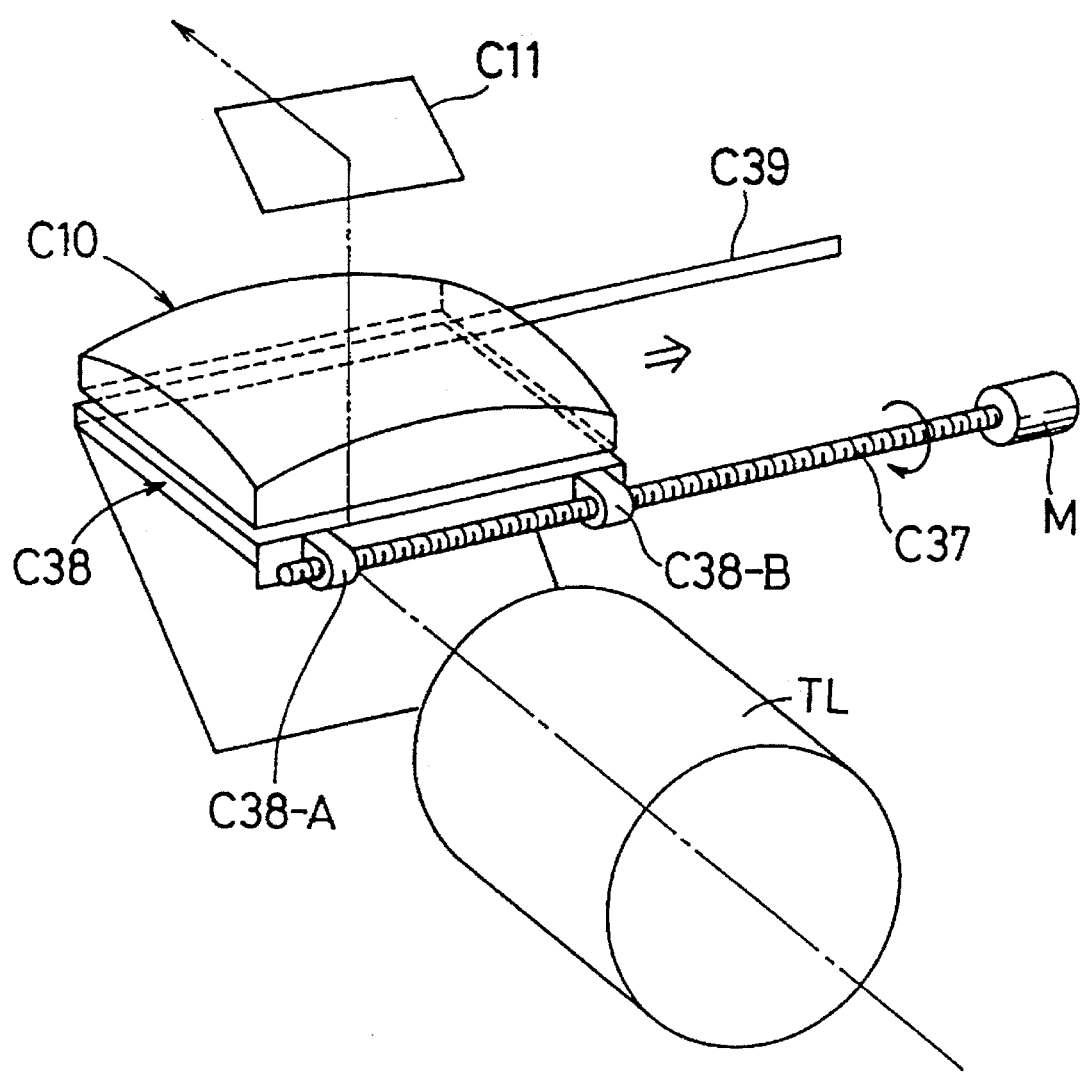
FIGS. 52 and 53 are detail views of modified examples of the diffusion plate of the fifth embodiment.
Figure 53:
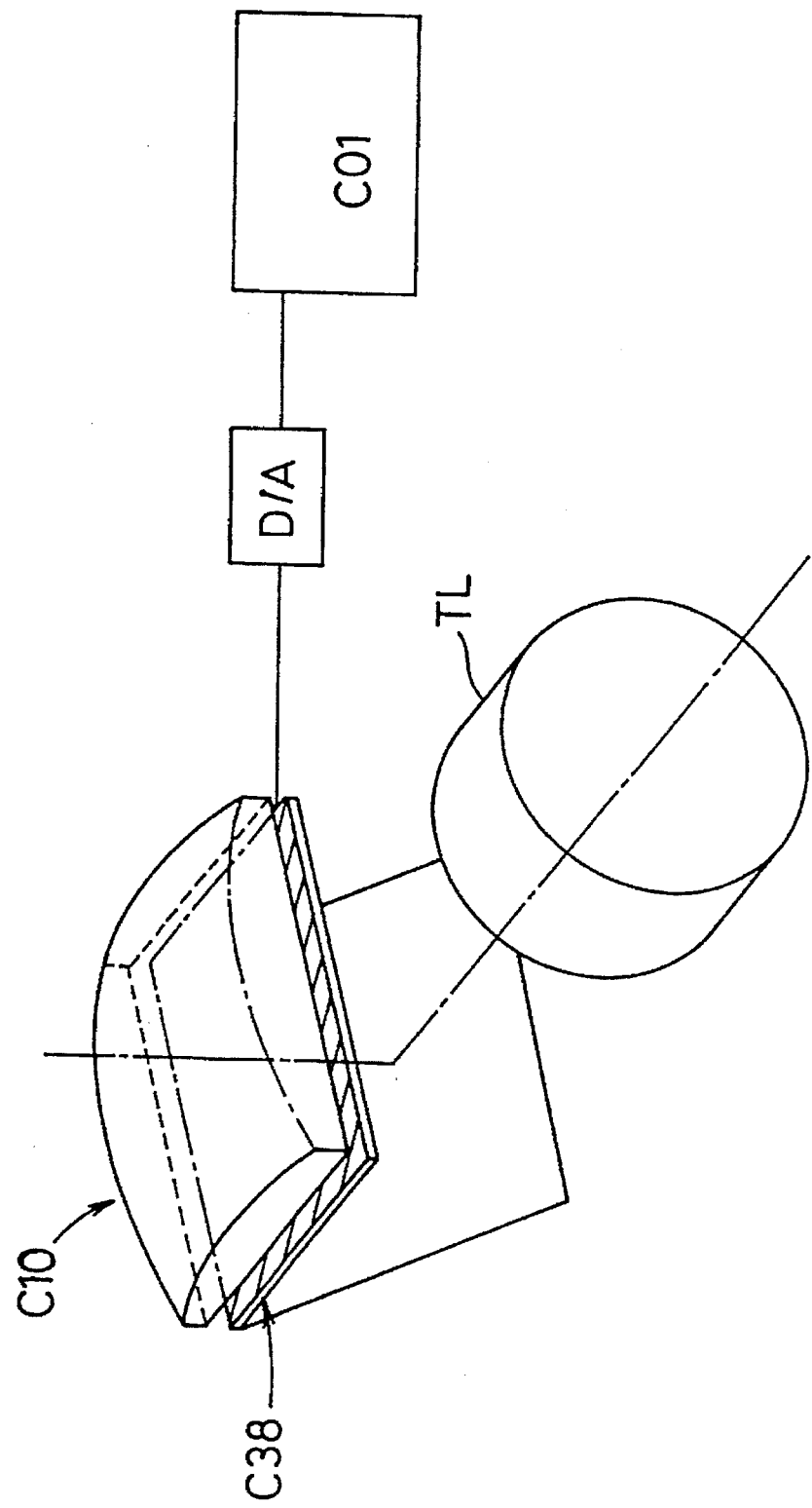

FIGS. 52 and 53 show modified examples of the diffusion plate (focus plate C38) of this embodiment. In FIG. 52, as in the previous example, the focus plate C38 is so constructed as to be movable between a position below the condenser lens C10 and a position away from below the condenser lens C10. However, this modified example differs from the previous example in that movement of the focus plate C38 is driven by a motor M.

More specifically, the focus plate C38 has, on its front edge, two projections C38-A and C38-B for thread engagement, and each projection has an internal thread formed therethrough. A driving axle C37 is thread-engaged with these engagement projections. The driving axle C37 is so constructed that it is rotated by the motor M. On the other hand, the rear edge of the focus plate C38 is engaged with a laterally extending guide groove C39 formed in the camera.

In this construction, if the operation mode dial 1 is set to the film shooting mode PH, the motor M rotates in a predetermined direction, the engagement projections C38-A and C38-B are driven according to the lead of the driving axle C37, and the focus plate is moved along the driving axle C37 and the guide groove C39 until it is positioned below the condenser lens C10.

If the operation mode dial 1 is set to the moving-picture video shooting mode MV, the still-picture video shooting mode. SV, or the simultaneous shooting mode PM, the motor M rotates in a reverse direction, the engagement projections C38-A and C38-B are driven according to the lead of the driving axle C37, and the focus plate is moved along the driving axle C37 and the guide groove C39 until it is retracted from below the condenser lens C10.

Although not illustrated, it is preferable also in this modified example, as in the construction (shown in FIG. 56) of the fifth embodiment above, to provide a transparent plate together with the focus plate C38 so that the transparent plate is positioned below the condenser lens C10 when the focus plate C38 is retracted. The transparent plate and the focus plate C38 may be formed from one raw material plate by roughly surface-processing the half. Alternatively, as in the fifth embodiment, they may be formed separately and glued to one frame member.

In FIG. 53, in contrast, the focus plate C38 is unmovably fixed. Although the focus plate C38 is not retractable from a light path, it can change its diffusivity. More specifically, the focus plate C38 comprises a member whose diffusivity changes according to the voltage applied thereto, such as PN (polymer network) liquid crystal (or, high-polymeric-diffusive liquid crystal), and it is controlled by the camera microcomputer C01 through a D/A converter.

In this construction, if the operation mode dial 1 is set to film shooting mode PH, a predetermined voltage is applied to the focus plate C38 in response to an instruction from the camera microcomputer C01, so that the diffusivity of the focus plate C38 is increased.

If the operation mode dial 1 is set to the moving-picture video shooting mode MV, the still-picture video shooting mode SV, or the simultaneous shooting mode PM, the voltage applied to the focus plate C38 is removed, so that the focus plate C38 loses diffusivity.

In a construction as shown in FIG. 53, it is possible to change the diffusivity in multiple steps or continuously.

Therefore, it can be used for special shooting in moving-picture or still-picture video shooting.

For example, it is possible to achieve soft focusing by shooting under the influence of diffusivity. Moreover, in the moving-picture shooting mode, it is possible to achieve special fade-out and fade-in effects by changing the diffusivity gradually. Further, it is possible to achieve partial soft focusing effects by forming the diffusion plate with a plurality of members (for example, by forming the center portion and peripheral portion of the screen with different liquid crystals).

In the above embodiments, the amount of light of the light beam incident on the image pickup device is determined based on a combination of the density of the ND filter and the aperture value of the relay aperture diaphragm. However, it is also possible to provide either an ND filter or a relay aperture diaphragm so that the amount of light is controlled singly by one of them, as shown in FIGS. 49 and 50.

In a construction according to the fifth embodiment of the present invention, where a diffused image is taken by the image pickup device, a light beam is not wasted even if shooting is performed through a dark optical system having a high reduction factor, and it is easy to observe the focusing condition and the depth of field when a picture is viewed on a finder. Further, when a taken picture is electrically recorded, it is possible to record a bright and clear picture by reducing the light diffusivity of the diffusion plate, or by retracting the diffusion plate from the light path of the taking lens. In other words, since a picture which is formed on the diffusion plate and taken by the image pickup device is diffused, a light beam is not wasted even if shooting is performed through a dark optical system having a high reduction factor, and it is easy to observe the focusing condition and the depth of field when a picture is viewed on a finder. More specifically, as shown in the left-hand part of FIG. 55, the primary image IMG1 formed by the taking lens TL is diffused on the diffusion plate DP. Then, as shown in the right-hand part of FIG. 55, the thus diffused light beam is led by the relay optical system RL to form a secondary image IMG2. In other words, the light beam from the taking lens does not travel straight to directly enter the relay optical system as is the case with an aerial image, but the light beam is first diffused before forming the whole image. Accordingly, it does not occur that the outer portion of the light beam does not at all enter the relay optical system.

Further, when a taken picture is electrically recorded, it is possible to record a bright and clear picture by reducing the light diffusivity of the diffusion plate, or by retracting the diffusion plate from the light path of the taking lens.

Figure 57:
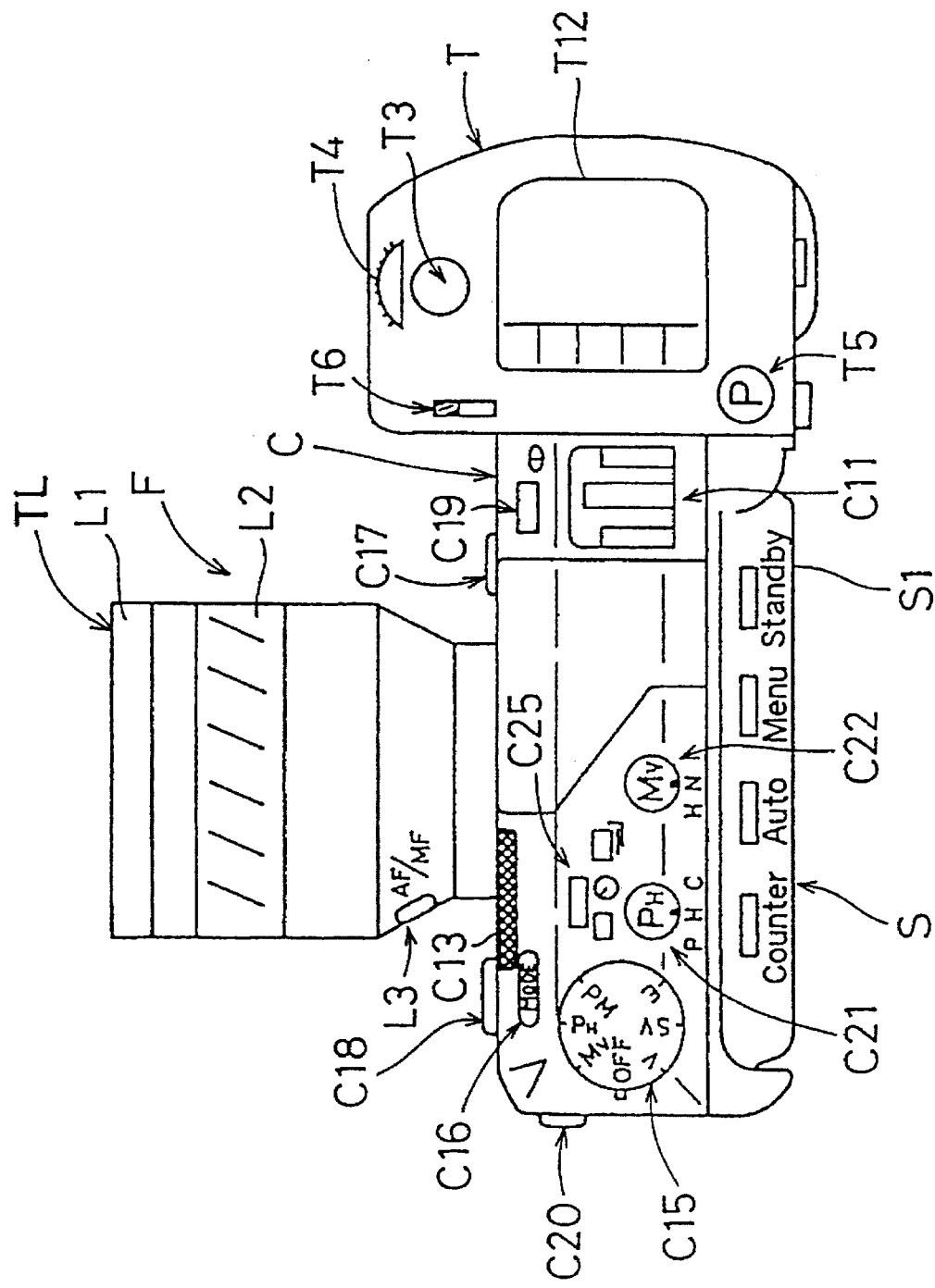
FIG. 57 is a top view of a camera of the sixth embodiment.
Figure 58:
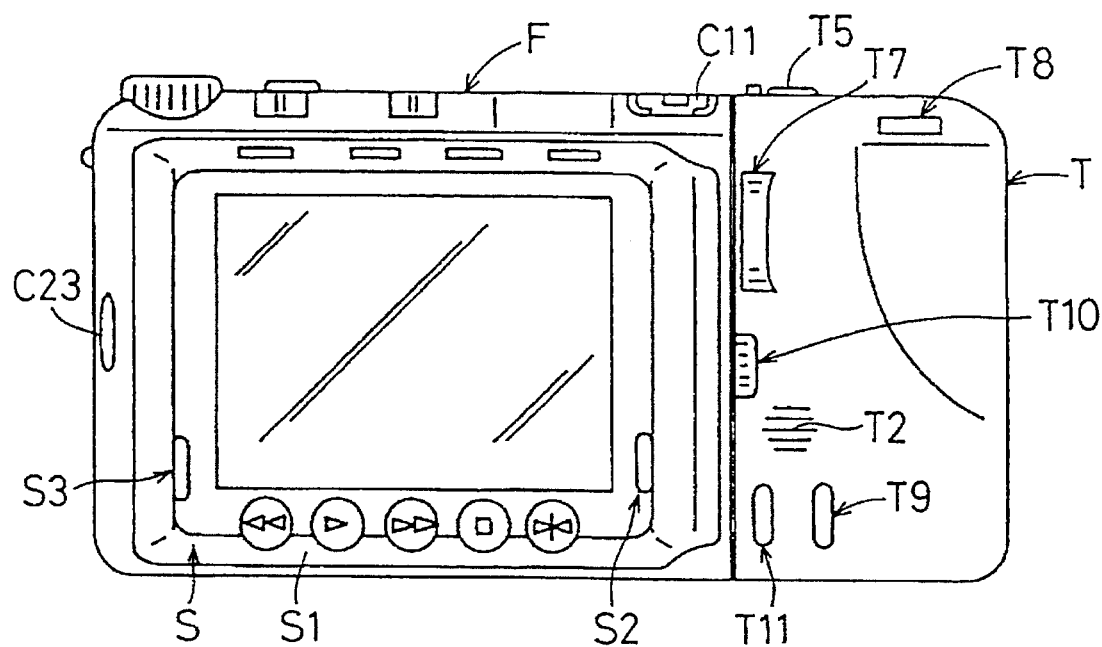
FIG. 58 is a rear view of a camera of the sixth embodiment.
Figure 59:
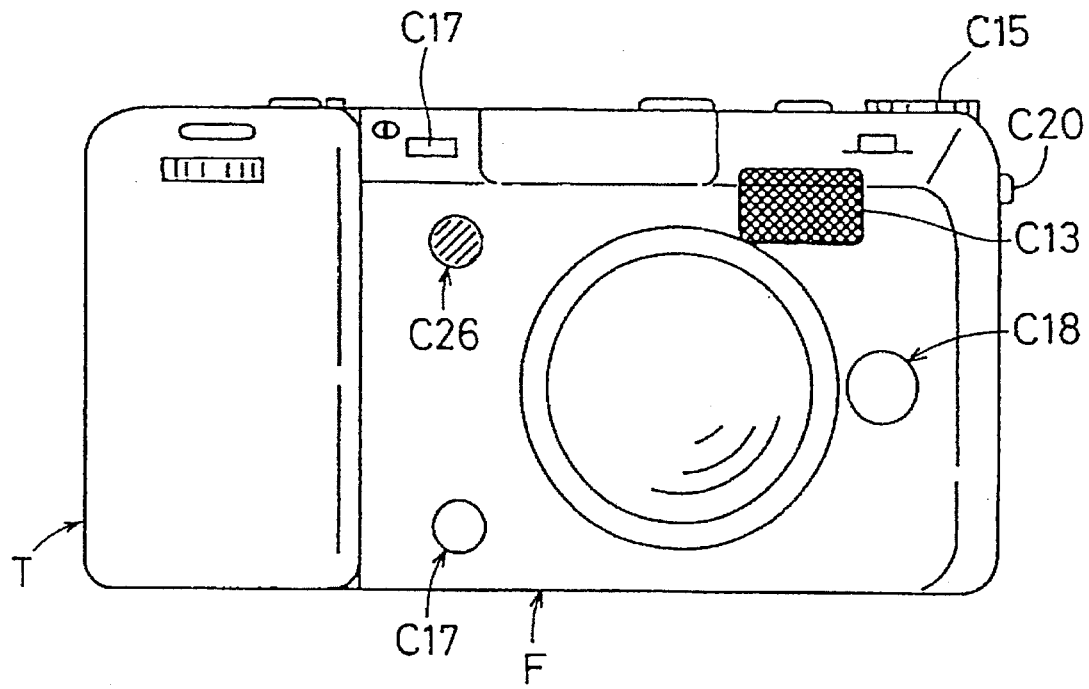
FIG. 59 is a front view of a camera of the sixth embodiment.
Figure 60:
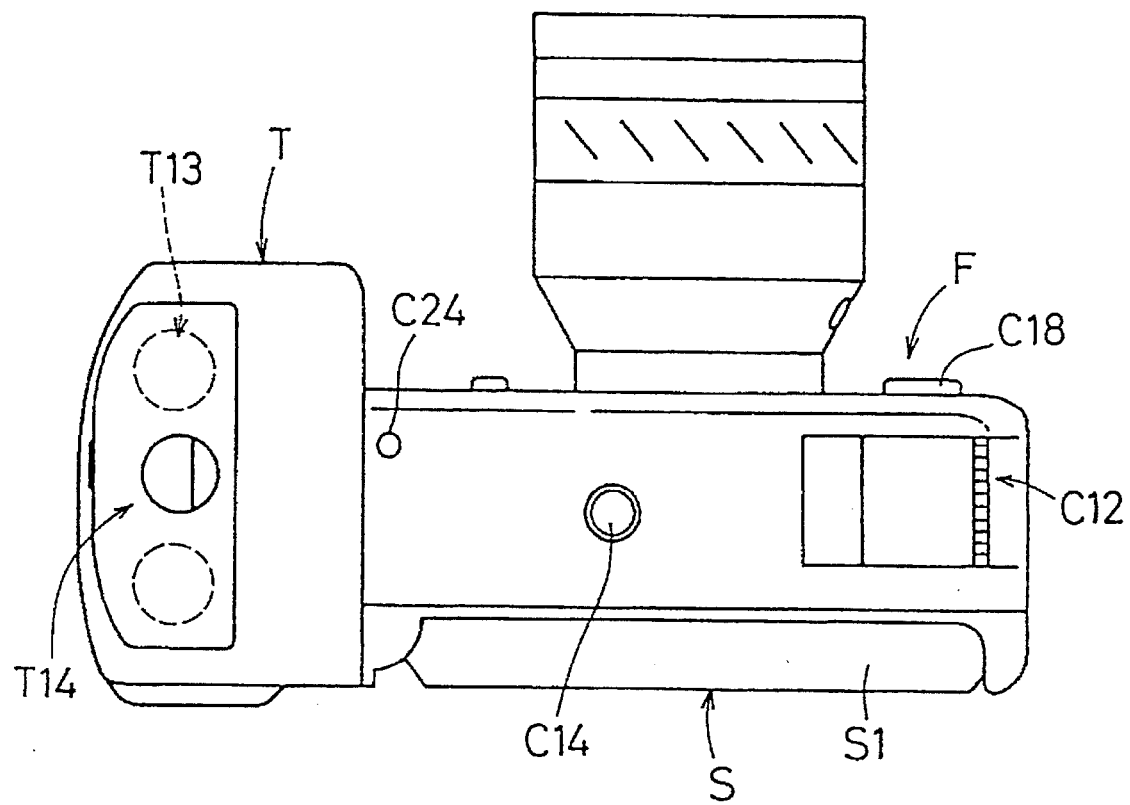
FIG. 60 is a bottom view of a camera of the sixth embodiment.

FIGS. 57 to 60 are external views of a sixth embodiment of the present invention: FIG. 57 is a top view, FIG. 58 is a back view, FIG. 59 is a front view, and FIG. 60 is a bottom view. The image taking apparatus shown in these figures comprises a first block F, a second block S, and a third block T.

The first block comprises a camera body C and a main lens TL which composes a main optical system. The main lens TL is removably mounted on a mount on the front surface of the camera body C. The second block S, which is provided with an EVF portion S1 as an electronic display device, is arranged to the rear of the first block F in the direction of the optical axis AX of the main lens, and is supported to be rotatable with respect to the first block F as described later. The third block T, which is externally so shaped as to function as a grip, is supported to be rotatable in concert with the second block S with respect to the first block F.

Figure 61:
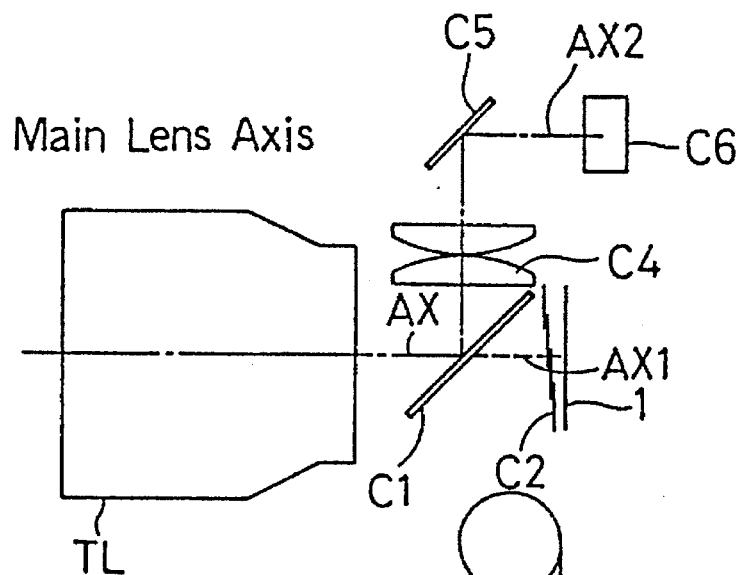
FIG. 61 is a schematic diagram of the construction of the optical system of the sixth embodiment.
Figure 61:
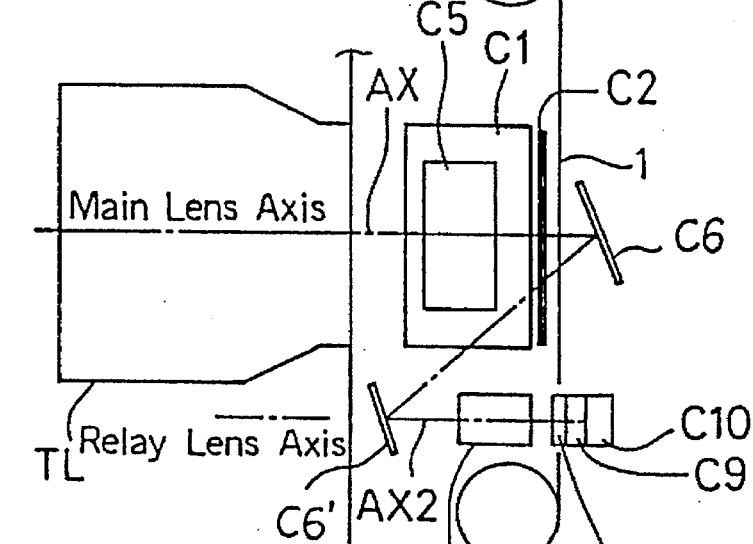
Figure 61:

FIG. 61 is a schematic diagram of the construction of the optical system. In the figure, (A) is a cross-sectional view sectioned along the optical axis AX of the main lens TL, (B) is a top view, and (C) is a side view as seen from the foreground side of the main lens TL in (A). As shown in FIG. 61, the light beam coming from a subject passes through the main lens TL, whereby the amount of light is controlled by a main aperture diaphragm (not shown) built into the main lens TL. The light beam is then divided by a pellicle mirror C1 serving as a light divider into a first light path AX1 and a second light path AX2.

The first light path AX1, which has the same optical axis as the main lens TL even after having passed through the pellicle mirror C1, passes through a shutter C2 arranged in its path, and reaches a silver salt film 1 loaded in a film compartment C3. In other words, along the first light path AX1 are arranged components composing a first imaging portion, also referred to as the silver salt film imaging system, such as the shutter C2, the film compartment C3, and others. In the first block F, as is obvious from (B) of FIG. 61, the film compartment C3 is arranged in a direction perpendicular to the optical axis AX of the main lens TL, so that the film compartment C3 forms a T-shaped formation with respect to the optical axis AX of the main lens TL.

The second light path AX2 is separated from the first light path AX1 and refracted upward in a direction substantially perpendicular to the first light path AX1 by the pellicle mirror C1. The second light path AX2 then passes through a condenser lens C4, is reflected in a Z-shape path by two reflecting mirror C5 and C6, passes along a path deviated upward and in a foreground direction from the first light path AX1 in (B) of FIG. 61 though a relay optical system C7, an optical low-pass filter C8, an infrared cut filter C9, and reaches a CCD (Charge Coupled Device) image sensor C10 serving as an image pickup device.

As described above, a second imaging portion, also referred to as the electronic imaging system, comprising a CCD image sensor C10 and others, is arranged along the second light path AX2. As a result, the film compartment is so arranged that it forms a T-shaped formation with respect to the optical axis AX of the main lens TL, and the relay optical system C7 is arranged in a position away from the film compartment C3 to protrude backward. This construction of the first block makes available effective room to the rear of the film compartment, so that the second block S can be arranged in that room. Thus, it is possible to make an effective use of room, and to downsize the body.

As shown in FIGS. 57 to 60, in order to extend the shooting range, a plurality of wide-angle, telescopic, zoom and other lenses each having different focal lengths and exchangeably constructed are available as the main lens TL. In the figures, a zoom lens is mounted as the main lens TL.

The main lens TL will be described below. L1 represents a focus ring for controlling focusing, and L2 represents a zoom ring for controlling zooming. Both are operated by the hand of an operator. Rotation of the focus ring L1 activates power focussing, and rotation of the zoom ring activates power zooming. L3 represents an AF/MF switching button for switching between automatic and manual focus.

Next, a brief description will be given below as to the construction of the camera body C. A camera microcomputer (not shown) serving as an operation controller exchanges data with the main lens TL and, if required, with a controller of an flash-and-light that is connected through an accessory shoe C11. When the AF/MF switching button L3 is set to the automatic focus position, a focus condition with regard to the subject is detected based on the light passing through the main lens TL and the pellicle mirror C1, and focus information is processed by the camera microcomputer. The camera microcomputer then sends the information to the lens microcomputer, which controls focusing.

Opening and closing of the shutter C2 is controlled by the camera microcomputer based on information on the operator's operation, brightness detection, and others. The light having passed through the shutter C2 while it is open is sensed by the photosensitive surface of the silver salt film 1, and a latent image is formed thereupon. The silver salt film 1 loaded in the film compartment C3 can be advanced and rewound by the motor built into the camera body C.

On the other hand, the amount of the light passing along the second light path AX2 from the subject is controlled by the aperture control function of the relay optical system C7, and the light is then led to the CCD image sensor C10. The CCD image sensor converts the light from the subject into an electric signal in response to driving pulses generated by the camera microcomputer. The resultant electric signal is subjected to analog processing such as sub-sampling and to A/D conversion, and is then sent to an image processor (not shown).

The image processor performs γ conversion, white-balance conversion, luminance/chrominance (Y/C) signal divide. The image signal having undergone these conversions is encoded into a recording format together with a sound signal and other signals from the camera microcomputer, and sent to a head built into a deck T1 (see FIG. 69) serving as a recording medium driving portion. The image signal is also sent to the EVF portion S1 and an external output port C12.

The signal sent to the head is recorded on a videocassette tape 2 (see FIG. 69) loaded with a magnetic tape 2 serving as a recording medium. The information recorded on the magnetic tape 2 is read out by the head, decoded, and then reproduced as image, sound, and other signals. Although a magnetic tape and a tape deck are shown in the figure as the recording medium and the deck T1 respectively, the recording medium may be another tape recording medium, a disk recording medium such as a magneto-optical disk, or a solid-state memory (RAM), and the deck T1 may be another device corresponding the recording medium used.

Sound is picked up by a stereophonic microphone C13 arranged at an appropriate position on the front of the camera body C, converted into an electric signal, and then sent to a speaker T2 provided in the third block, the external output port C12, and other portions. C14 represents a hole for a tripod.

The image taking apparatus is also provided with a function for detecting and correcting hand shake. This function detects hand shake of the whole camera including the main lens TL, and sends a detection signal to the camera microcomputer. As for the electronic imaging system, hand shake is corrected by controlling the readout area of the CCD image sensor C10 based on the same detection signal.

Next, the construction of the operation portion will be described. C15 represents an operation mode selecting switch serving also as a main switch. By operation of the switch C15, one of the following six modes is selected: OFF, PM, PH, MV, V, SV, and E.

More specifically, the switch C15 is set to OFF to turn off the whole apparatus, to PM to activate simultaneous shooting mode for simultaneously shooting a moving picture and a silver salt film picture, to PH to activate silver salt film shooting mode for shooting a silver salt film picture, to MV to activate video shooting mode for shooting a moving picture, to V to activate video playback mode for playing back recorded video, to SV to activate still video shooting mode for shooting a still picture and to E to activate edit mode for editing information recorded in a shooting information recording portion on the silver salt film 1.

T3 represents a release button used in silver salt film shooting. T4 represents a dial for mode selection, which also serves for varying values of AV and TV in silver salt film mode and video shooting mode. When rotated with the mode button C16, which will be described later, held down, the mode selection dial T4 selects a picture scene. When rotated with the program button T5, which will be described later, held down, the mode selection dial T4 selects among A (aperture priority) mode, S (shutter speed priority) mode, and M (manual) mode.

T6 represents a deck opening button for taking out a videocassette tape 2 used as a magnetic tape. By operation of this button T6, the third block serving also as a grip is opened so that a videocassette tape 2 can be loaded and unloaded. C17 represents a fade button for starting fade-out in video shooting mode (MV) and simultaneous shooting mode (PM), and for triggering still-picture preview in silver salt film shooting mode (PH) and still video shooting mode (SV).

C18 represents a lens exchange button for removing the main lens TL from the camera body C. C19 represents a red-eye reduction button for reducing red-eye when a flash is used in silver salt film shooting mode (PH) and still video shooting mode (SV). The mode button C16 is operated when the mode selection dial T4 is rotated for the purpose of selecting a picture scene such as portrait, sports, and others in simultaneous mode (PM), silver salt shooting mode (PH), video shooting mode (MV), and still video shooting mode (SV).

C20 represents a film cartridge exchange button for loading and unloading a film cartridge. C21 represents a switch for selecting the aspect ratio of a frame in silver salt film shooting mode. C22 represents a switch of selecting a frame for a moving picture. The program button T5, when operated singly, sets a program mode as a shooting mode. The program button T5 is also operated when the mode selection dial T4 is rotated for the purpose of selecting among A (aperture priority) mode, S (shutter speed priority) mode, and M (manual) mode in simultaneous shooting mode (PM), the silver salt film shooting mode (PH), video shooting mode (MV), still video shooting mode (SV).

T7 represents a zoom button for controlling the focal length of the main lens just as the zoom ring of the main lens TL. T8 represents a recording ON/OFF button for controlling starting and stopping of recording on the videocassette tape in simultaneous shooting mode (PM) and video shooting mode (MV). When the fade button C17 is pressed with this button T8 held down in silver salt film shooting mode and still video shooting mode, a picture taken with the aperture completely open can be displayed in the EVF portion. When the mode selection dial (T4) is rotated with this button T8 held down in manual value(M) mode, aperture value AV is varied.

T9 represents a button for turning ON/OFF the hand shake correction function in simultaneous shooting mode (PM) and video shooting mode (MV). When the mode selection dial T4 is rotated with this button T9 held down in silver salt shooting mode (PH) and still video shooting mode (SV), exposure compensation is performed. T10 represents a first pop-up button for popping up liquid crystal display unit. C23 represents a second pop-up button for popping up liquid crystal display unit.

T11 represents a button for forcibly firing a flash in silver salt film shooting mode (PH) and still video shooting mode (SV). S2 represents a button for turning ON/OFF message indication in the EVF portion S1. S3 represents a button for controlling sound volume in V mode, and for controlling qualities (such as brightness and hue) of a picture in the EVF portion S1.

C24 represents a automatic rewind button. This button C24 allows a mid-roll rewinding. C25 represents a button for selecting among one-shot, continuous, and self-timer shooting in silver salt film shooting mode (PH) and still video shooting mode (SV).

The EVF portion S1 comprises a finder portion including a liquid crystal display finder and a converter portion for converting an image signal from the image processor (not shown) into a signal for driving the display, and serves for displaying an image. Instead of a liquid crystal display, a CRT can be used as the finder portion of the EVF portion S1.

T12 is a operation indication portion for indicating various information on the current status of the camera, such as camera operation mode, tape footage, date, shutter speed, exposure compensation mark, red-eye reduction, aperture and exposure compensation values, shooting mode, battery level, self-timer mark, film counter, film cartridge mark, wireless flash, winding mode, shooting scene, manual focus, and others. C26 represents a lamp lit when the self-timer or the red-eye reduction is activated.

Figure 62:
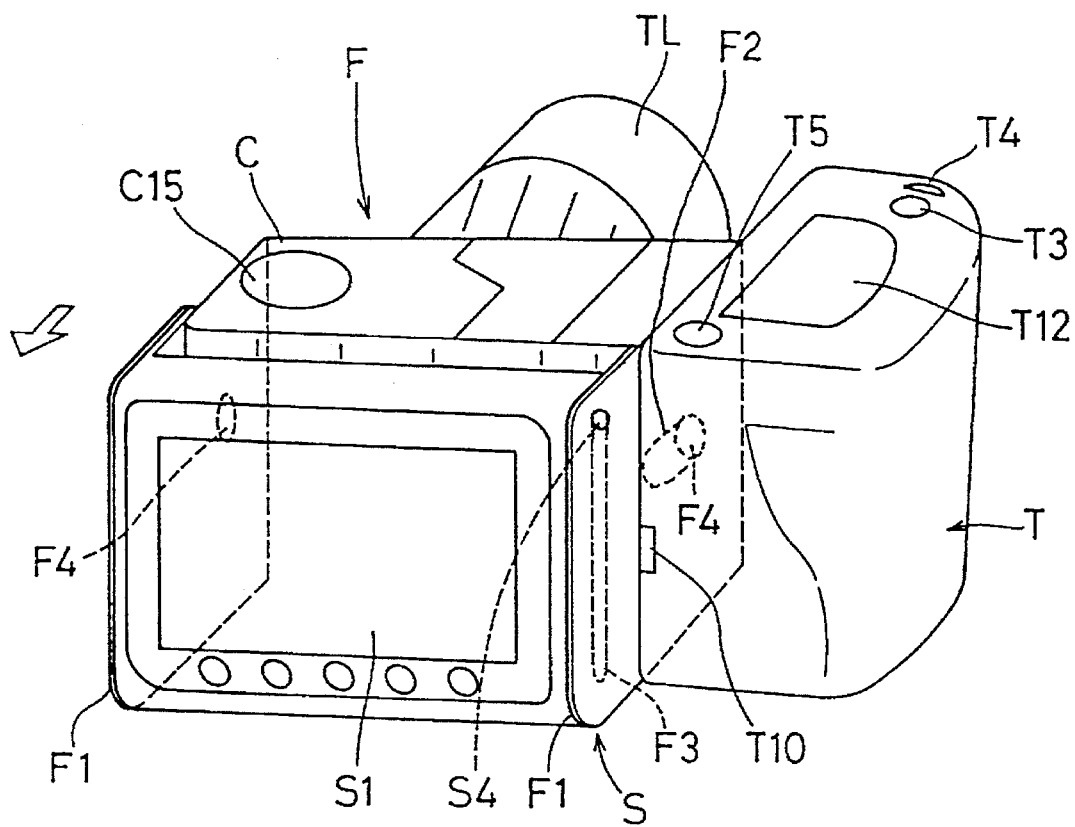
FIGS. 62 and 63 are perspective and side views of a camera of the sixth embodiment with the second block drawn out from the first block.
Figure 63:
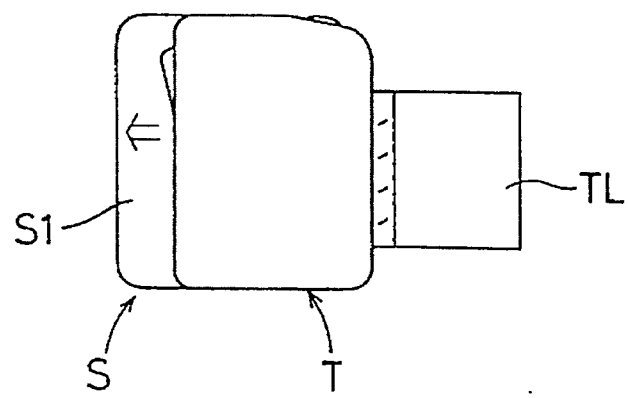

FIGS. 62 and 63 show the state of the apparatus in which the second block S is drawn out from the first block F. On both sides of the first block F are provided axles F4. Of a pair of support plates F1, the support plate F1 which is shown on the left hand of the figure is supported by the axle F4 and a horizontal groove (not shown in the figure) to be slidable and rotatable with respect to the first block F. On the other hand, the support plate F1 which is shown on the right hand of the figure is supported by the third block T to be only slidable in the longitudinal direction. This support plate F1 is slidable with respect to the third block T, and rotatable together with the third block T. Between these support plates F1, the second block S is supported to be vertically slidable (see FIG. 67).

It is to be noted that each support plate F1 has a guide groove F3 formed vertically on its inner surface, so that the second block S is supported by the both support plates F1 through these guide grooves F3 to be vertically slidable. On both sides of the second block S are provided slide pins S4, each of which is engaged with the guide groove F3 to be slidable and rotatable.

The third block T, which functions also as a grip, is rotatable about the axles F4 within a predetermined range of angles. The third block T is normally locked onto the first block F. However, the locking is released at the sliding end of the support plates F1. The support plates F1, which are loaded with a resilient force by a spring, is normally locked. Operation of the button 10 releases the locking of the support plates F1, so that the support plates F1 and the second block S are slid. Then, at the sliding end of the support plate F1, the locking of the third block T is released, and the third block T, the support plates F1 and the second block S are rotated about the axles F4 by the same spring (that loads the support plates F1 with a resilient force). F2 represents a groove which serves as a clearance for the sliding movement of the support plate F1, and which also guides the rotation of the third block T.

As described above, the support plates F1 are slidable with respect to the first block F and the third block T, and rotatable with respect to the first block F. In addition, the second block, which is supported by the support plates F1, is engaged with the slide plates F1 to be slidable vertically and rotatable with respect to the support plates F1. As a result, it is possible to position the second block S, in which the EVF portion S1 is incorporated, in a variety of positions with respect to the first block F. On the other hand, since the third block T is attached to be rotatable within a predetermined range of angles with respect to the first block F, it is possible to position the third block T, which serves also as a grip, in a desired position.

Figure 64:
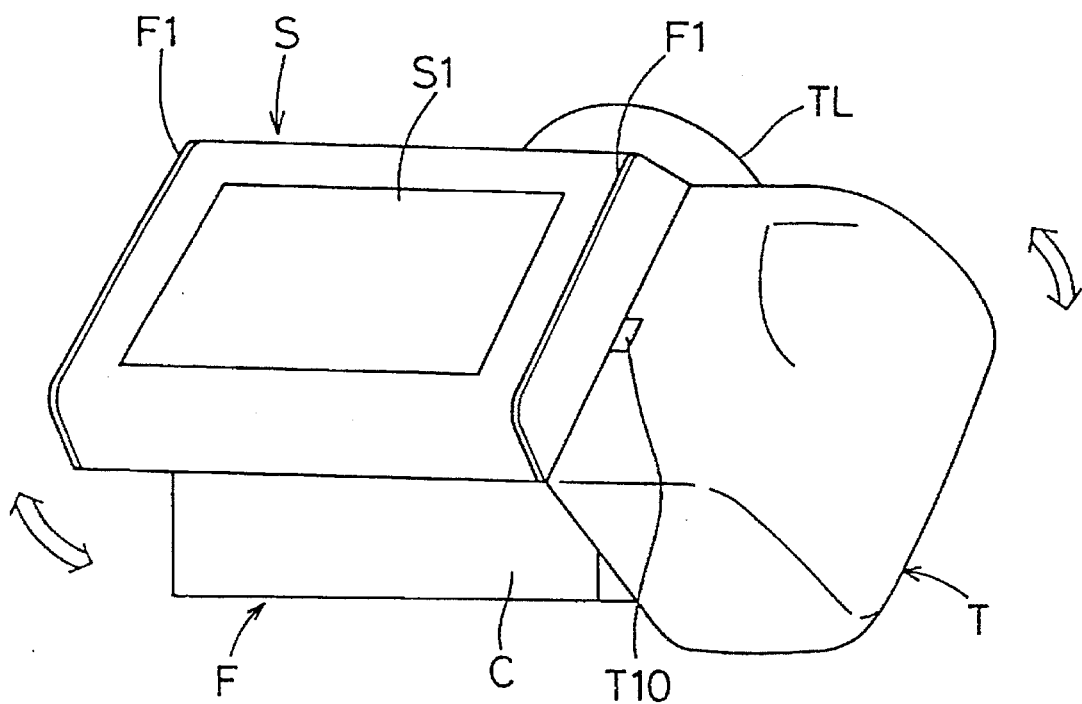
FIGS. 64 and 65 are perspective and side views of a camera of the sixth embodiment with the second and third blocks swung out.
Figure 65:
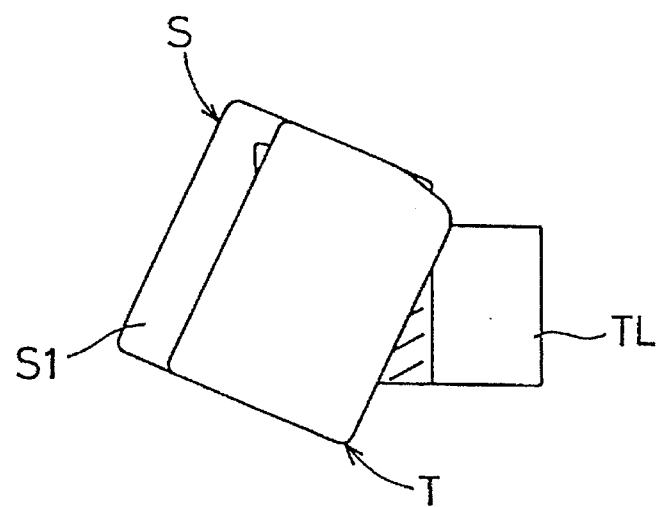

As a result, since the second block S keeps a predetermined distance from the first block F as shown in FIGS. 64 and 65, the second block S can be rotated without interference with the first block F when the second block S together with the third block T, that is, the EVF portion S1 together with the grip is rotated about the rotation axles F4, that is, around the camera body C of the first block F. By changing the angle of the EVF portion S1 by rotating the second block S as described above, it is possible to handle shooting not only at eye level but also at waist level.

Figure 66:
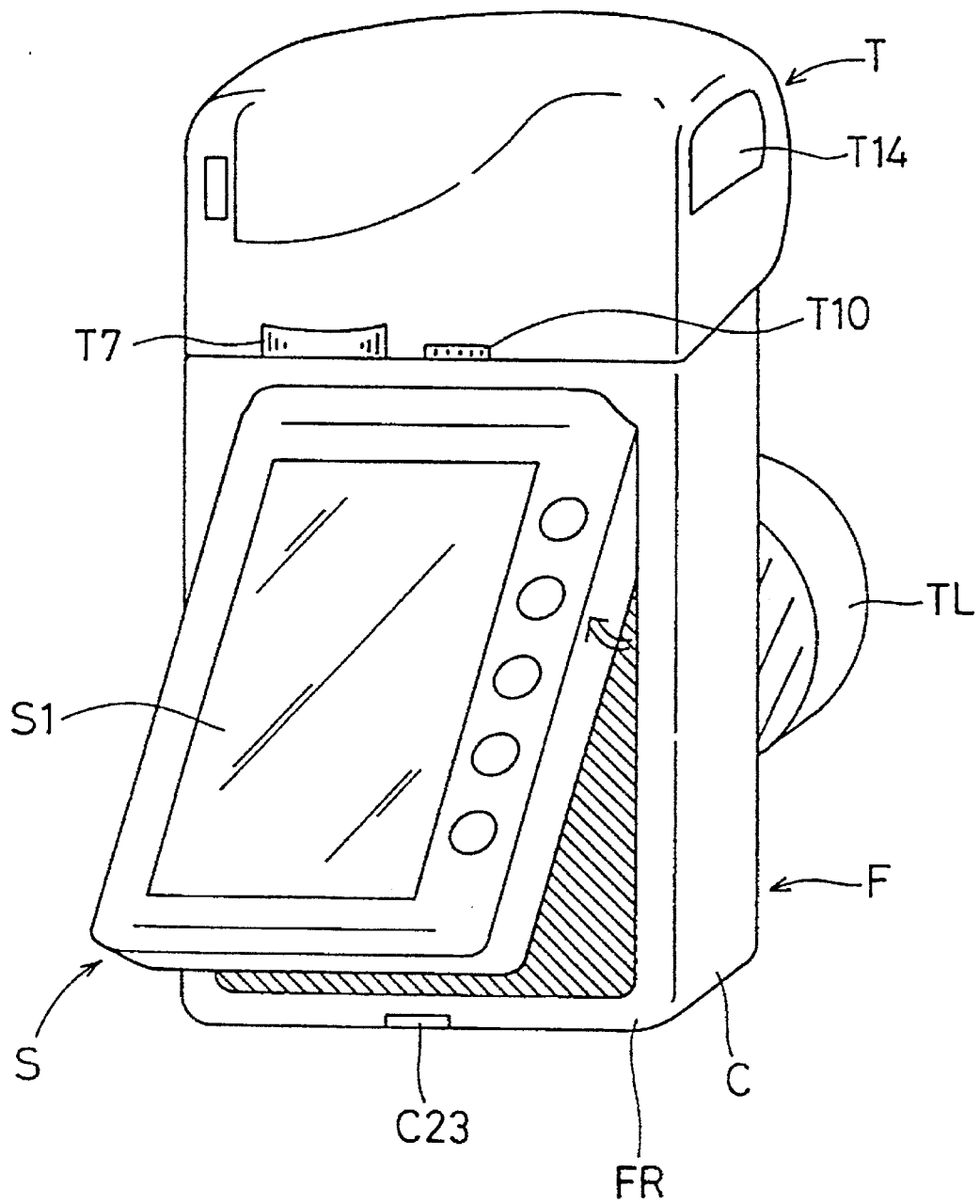
FIG. 66 is a perspective view of a camera of the sixth embodiment with its liquid crystal display unit popped out.

Moreover, one of its longitudinal ends of the EVF portion S1 is rotatably supported around a vertical axis provided on a frame FR of the second block, and the other end constitutes a free end. The free end is locked when folded down onto the frame FR of the second block S. Accordingly, as shown in FIG. 66, by operating the second pop-up button C23, the liquid crystal display portion comprising the EVF portion S1 is raised vertically, which is convenient for shooting in the vertical position at waist level in salt film shooting mode (PH) and still video shooting mode (SV).

Figure 67:
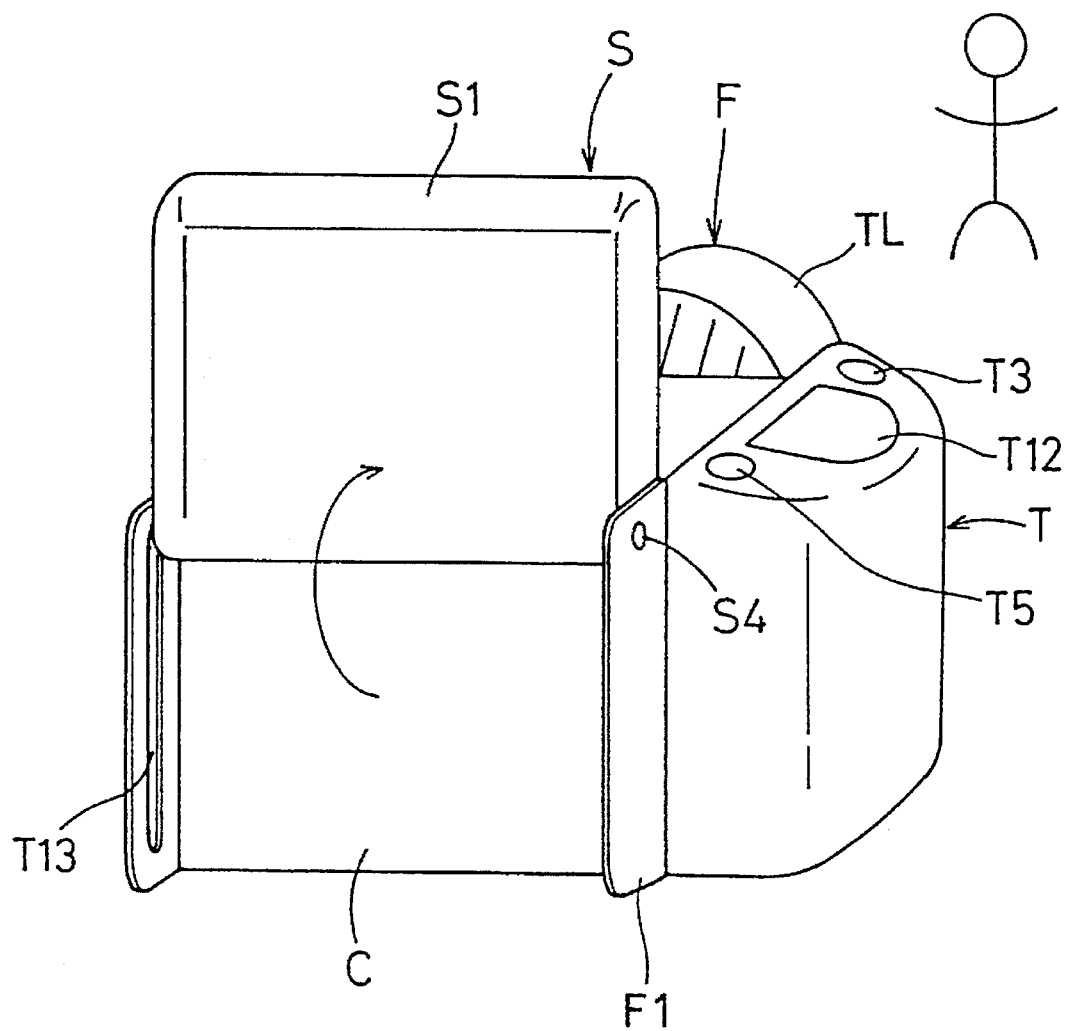
FIG. 67 is a perspective view of a camera of the sixth embodiment in the state for face-to-face shooting.
Figure 68:
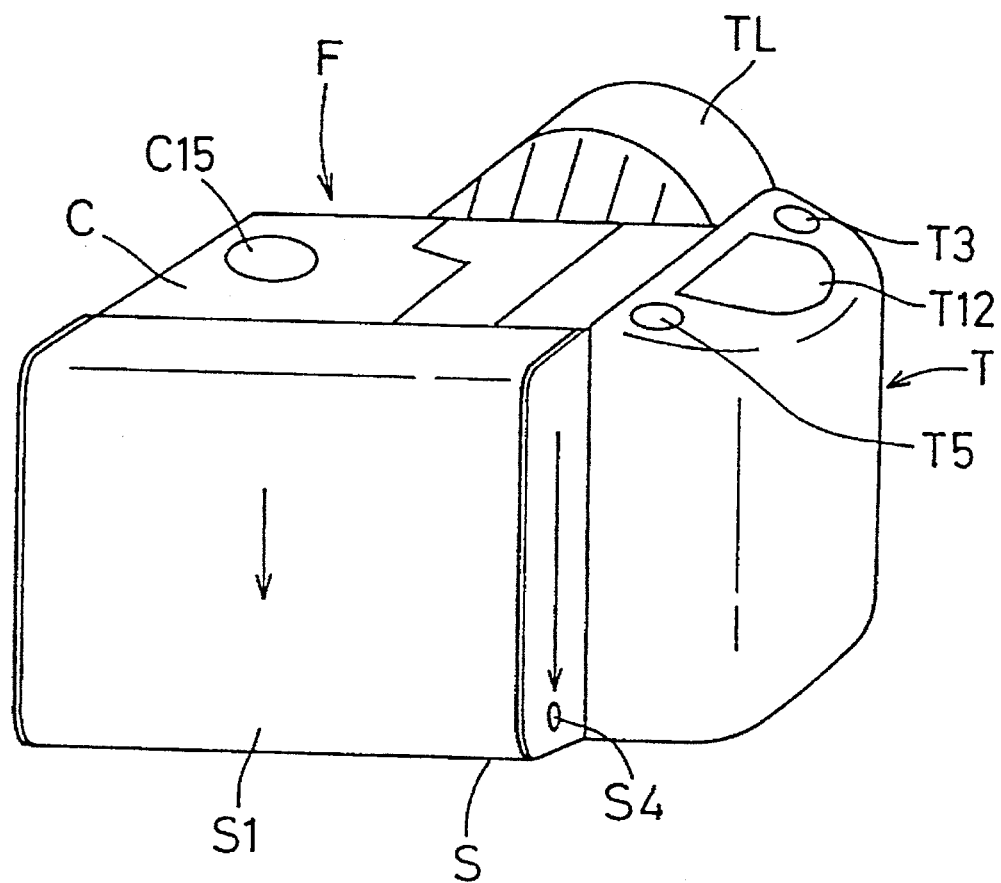
FIG. 68 is a perspective view of a camera of the sixth embodiment with the liquid crystal display unit in the resting position.

Further, in this apparatus, by rotating the second block S around the slide pins F4 180 degrees at the top end of the vertical guide grooves F3 as shown in FIG. 67, it is possible to view the EVF portion S1 from the position of the subject standing in front of the main lens TL. Even in the case where the subject is the very operator, the operator can shoot not only a silver salt film picture or a still video picture using the self-timer button C25, but also a moving picture visually viewing the picture in the field of view of the main lens TL.

Further, from the state shown in FIG. 67, by moving down the second block S along the vertical guide grooves F3 so that it rests on the back of the first block F, the liquid crystal display screen of the EVF portion S1 is covered by the first block F. In this state, it is possible to protect the liquid crystal display screen from dust or direct interference from the outside.

Figure 69:
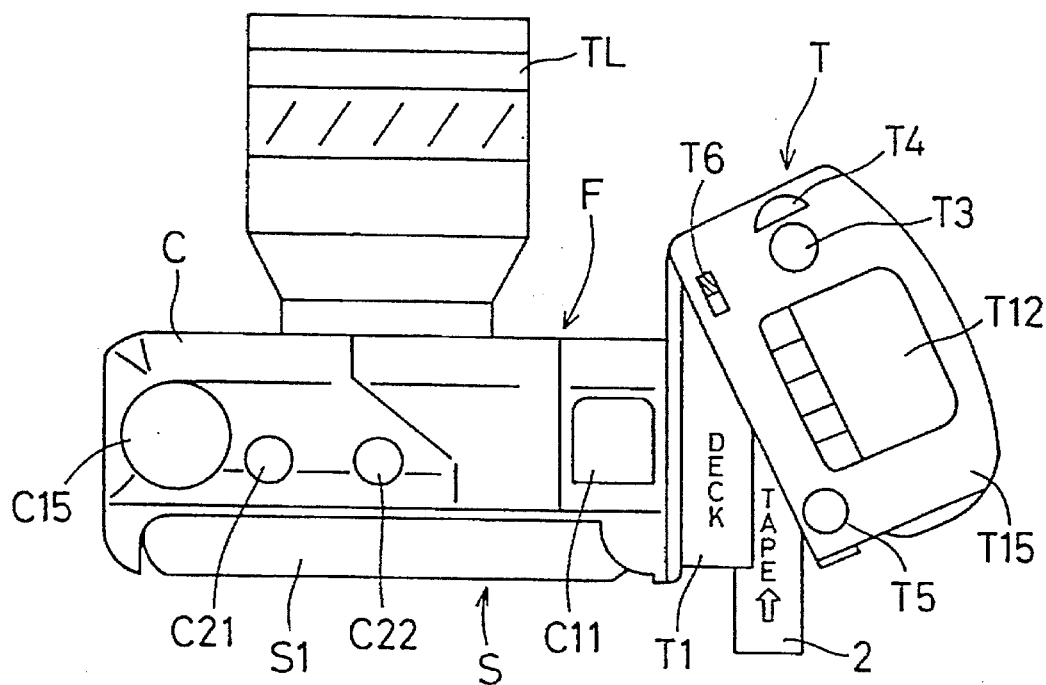
FIGS. 69 and 70 are top and rear views of a camera of the sixth embodiment with its third block opened.
Figure 70:
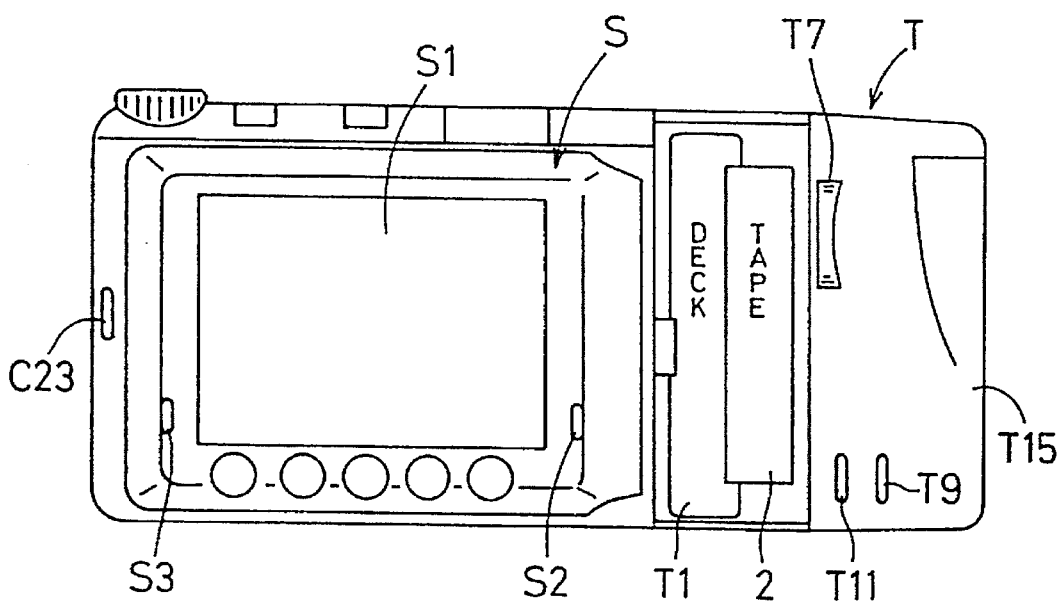

FIGS. 69 and 70 show a state where the third block T is opened. Specifically, in the third block T serving also as a grip are provided a battery compartment T13 in which a battery for supplying power to the camera body C and the main lens TL is removably accommodated, the tape deck T1 serving as a recording medium driving portion for the second imaging portion, and a compartment for accommodating a videocassette tape to be loaded in the tape deck T1. T14 represents a lid of the battery compartment T13.

The outside T15 of the third block is formed into a shape of a grip. The third block is locked when closed, and is unlocked and opened by operation of the deck opening button T6 when a videocassette tape 2 is loaded or unloaded. This construction makes it possible to reduce the size of the first block F, and to protect the tape deck T1 and the videocassette tape 2 loaded therein from vibration or shocks, because the third block T is constantly gripped by the operator during shooting.

Figure 71:
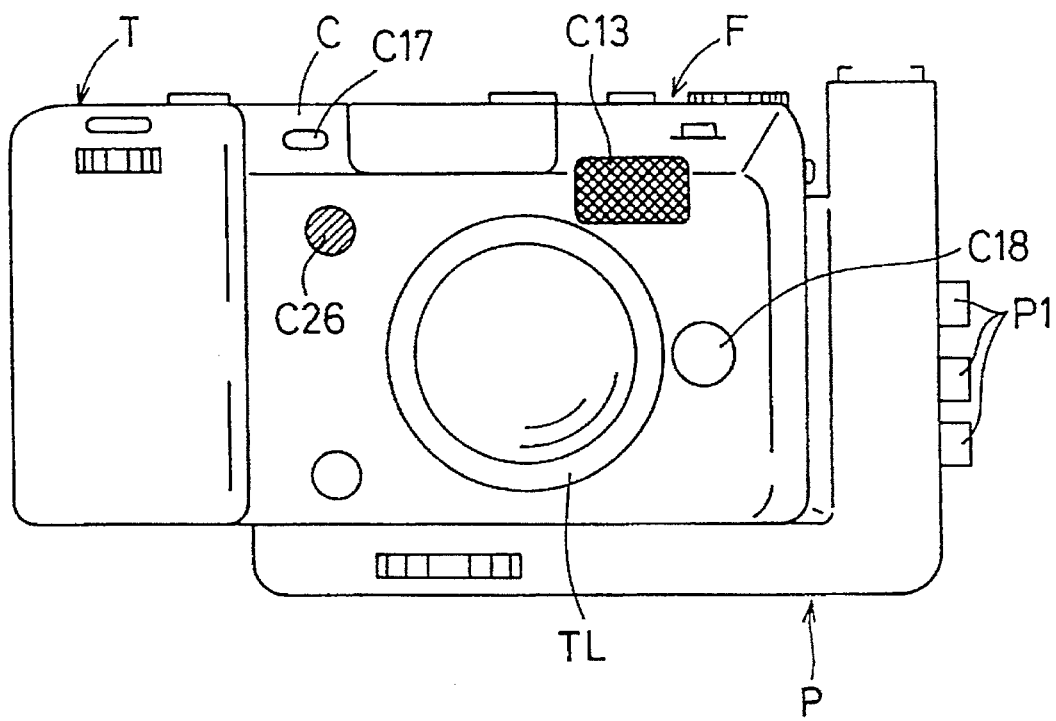
FIGS. 71 and 72 are front and side views of a camera of the sixth embodiment with an expansion unit mounted.
Figure 72:
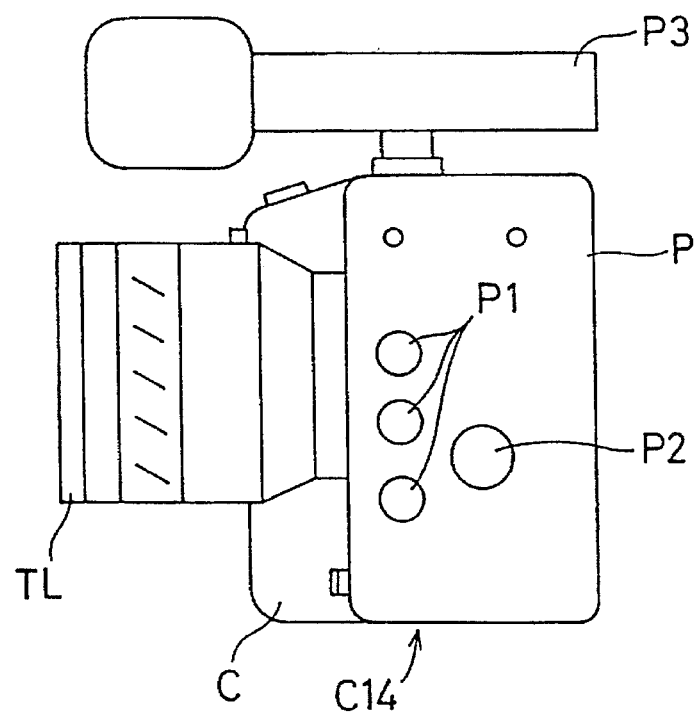

As shown in FIGS. 71 and 72, it is possible to mount an expansion pack P for moving picture shooting onto this apparatus. This expansion pack P can be removably mounted onto the bottom of the first block by use of the tripod hole C14, and, when mounted, its connections are connected with the external output port C12 to offer functional enhancements to the moving picture shooting capabilities.

Moreover, if the expansion pack P is formed into an L shape, it additionally serves as a grip in the vertical position. In FIGS. 71 and 72, P1 represents audio/video input/output terminals, P2 represents an S terminal, and P3 represents a microphone which is constructed separately.

Figure 73:
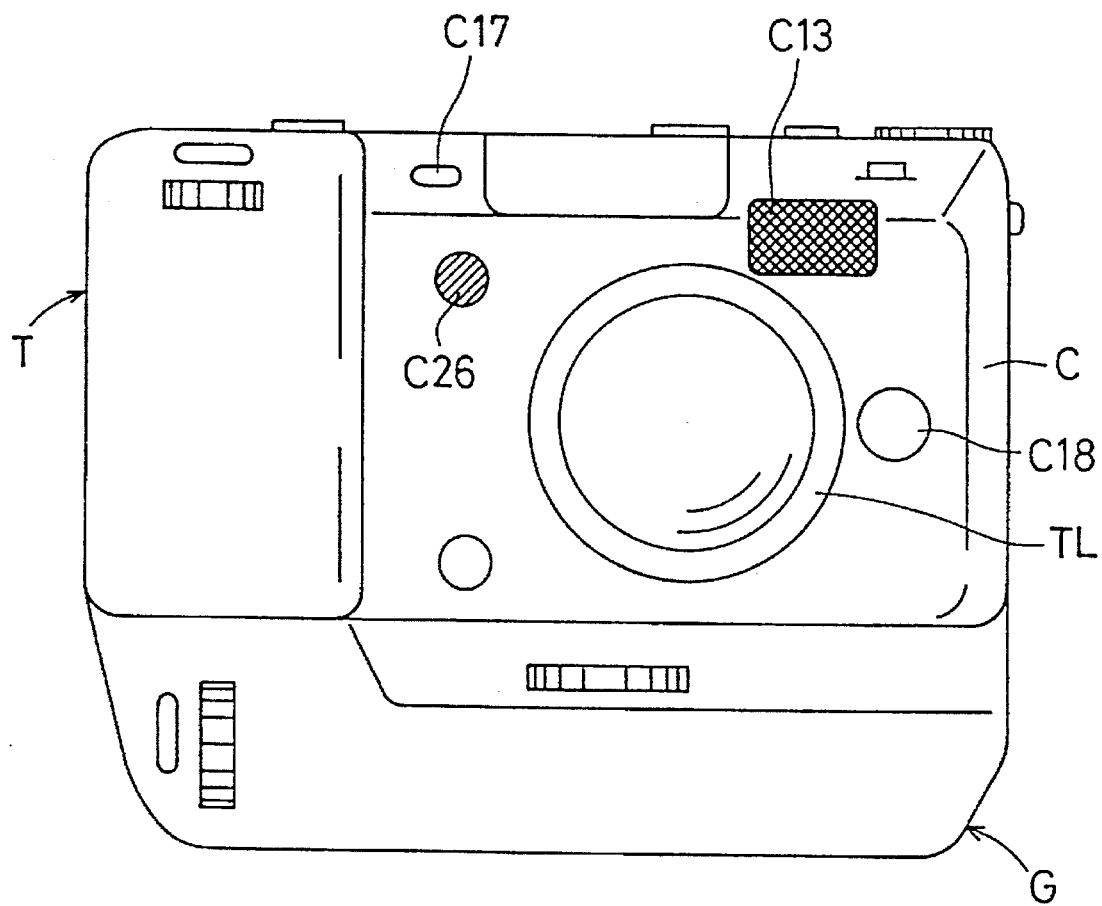
FIG. 73 is a front view of a camera of the sixth embodiment with a vertical-position grip mounted.
Figure 74:
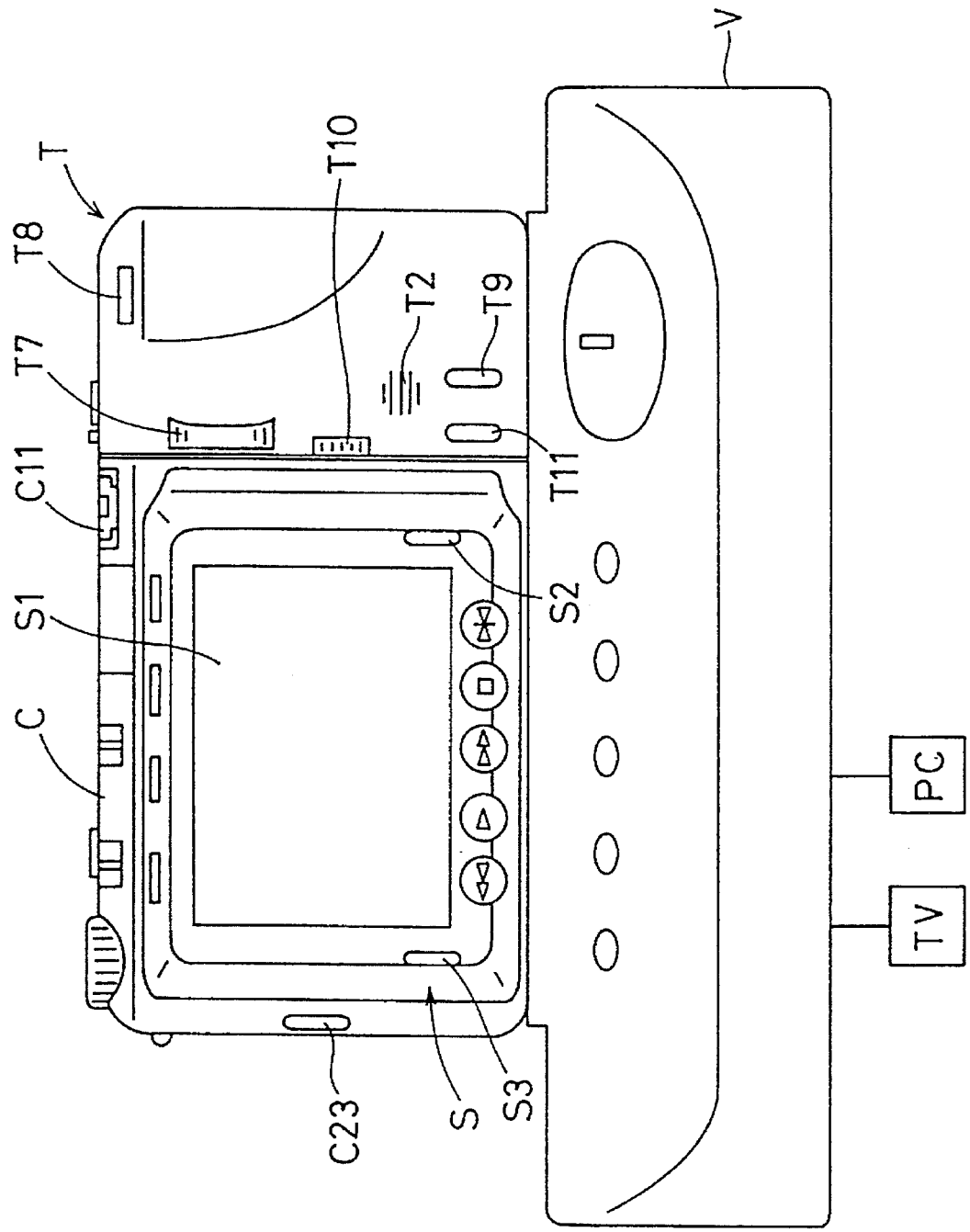
FIG. 74 is a front view of a camera of the sixth embodiment mounted on a station instrument.

Further, it is possible to obtain more convenience by mounting a vertical-position grip G, as shown in FIG. 73, provided as a separate component onto this apparatus, and to view recorded moving and still pictures on an external video output device as such as a television set TV or a personal computer PC by connecting this apparatus therewith through a station device V as shown in FIG. 74.

As described above, according to the sixth embodiment of the present invention, an image taking apparatus comprises a first block including a main optical system, a first imaging portion, and a second imaging portion, a second block including an electric display device, and a third block functioning also as a grip. In combining these three blocks, the second block is arranged to the rear of the first block in the direction of the first block's optical axis, and the second block is supported to be rotatable with respect to the first block. As a result, when a silver salt shooting system is employed as the first imaging portion and an electronic shooting system is employed as the second imaging portion, it is possible to perform both still picture shooting on a silver salt film and moving picture shooting with one camera, and these two types of shooting can be performed with the same optical system (main optical system), that is, with the same shooting angle and composition.

Moreover, since a battery for supplying power to the driving system of the apparatus and a recording medium driving portion for the second imaging portion are arranged in the third block serving also as a grip, it is possible to reduce the size of the first block, and, since the third block is constantly gripped during shooting, it is possible to effectively protect the recording medium driving portion and a recording medium loaded therein from vibration and shocks.

Further, since the third block is supported to be rotatable with respect to the first block, it is possible to change the shooting angle without changing grip positions. If the third block is constructed to be rotatable together with the second block, since the electronic display device can rotate accordingly, it is possible to change the shooting angle freely. If the main optical system of the first block is so constructed that its lens is exchangeable among a plurality of lenses, it is possible to extend the shooting range.

Moreover, in the first block, since the film compartment is deployed perpendicular to the optical axis of the main optical system so that the film compartment and the main optical system forms a T-shaped formation, the relay optical system is arranged away from the film compartment, protruding backward. This makes available effective room to the rear of the film compartment. By arranging the second block, that is, the electric display device in that room, it is possible to make an effective use of room, and consequently, to downsize the body.

Hereinafter, a seventh embodiment of the present invention will be described with reference to the drawings.

An image taking apparatus of this embodiment functions both as a still camera and as a video camera, and is provided with a silver salt film shooting apparatus for imaging a subject image coming in through an optical system on a film, an electronic imaging apparatus for converting the subject image coming in through the optical system into a video signal to record the signal on a recording medium, and a electric display device for displaying images outputted from the electronic imaging means together with other information.

Figure 75:
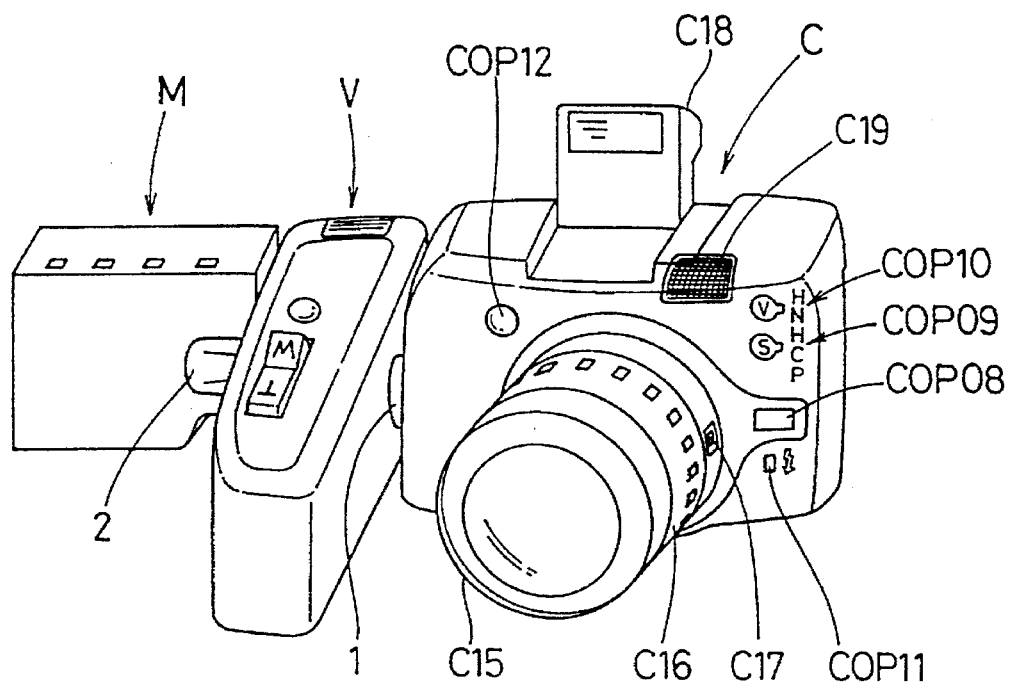
FIG. 75 is a perspective front view of an image taking apparatus of the seventh embodiment of the present invention.
Figure 76:
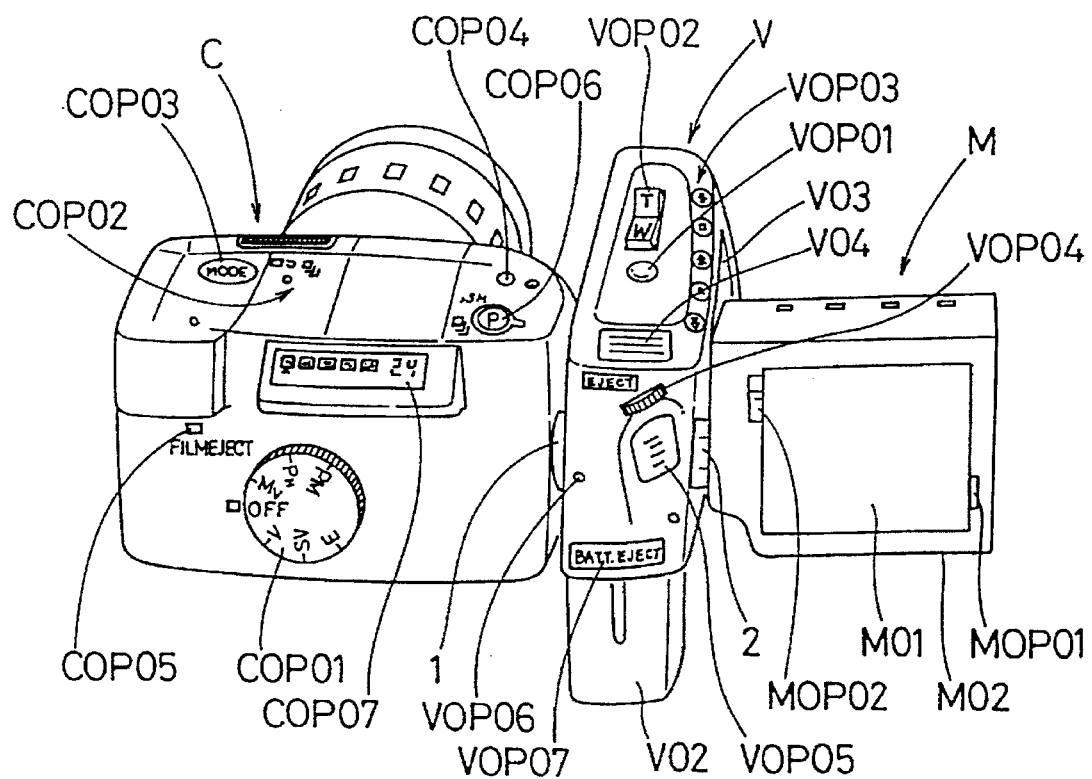
FIG. 76 is a perspective rear view of an image taking apparatus of the seventh embodiment.
Figure 77:
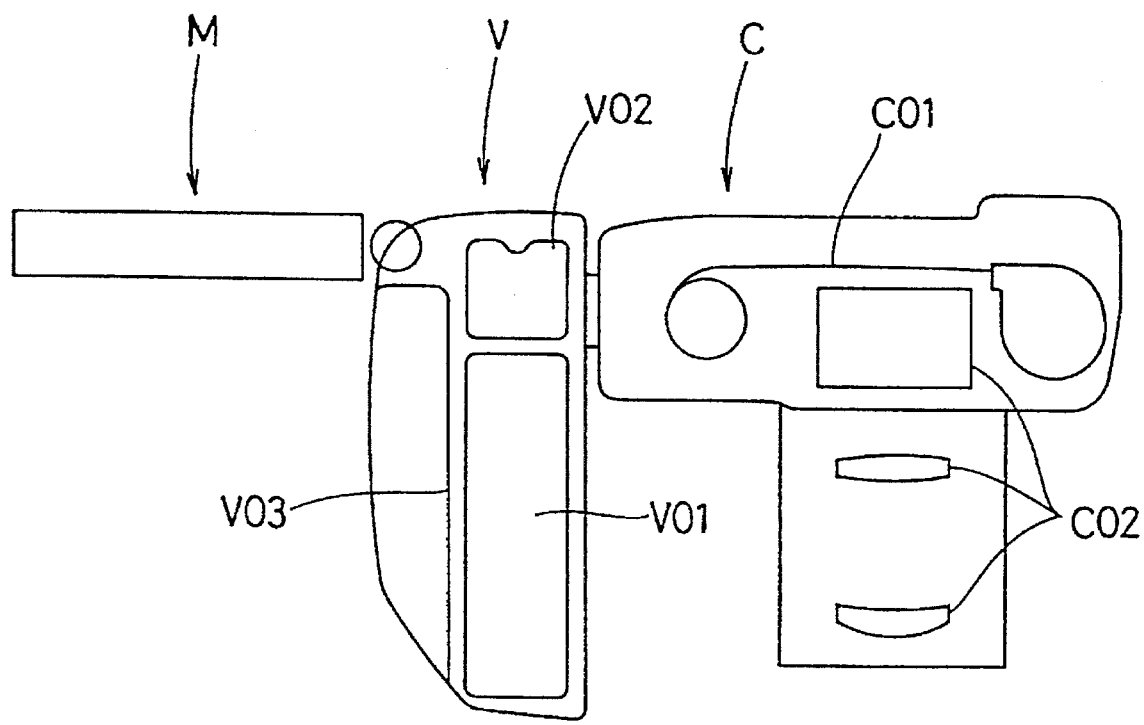
FIG. 77 is a perspective diagram showing the internal construction of an image taking apparatus of the seventh embodiment.
Figure 78:
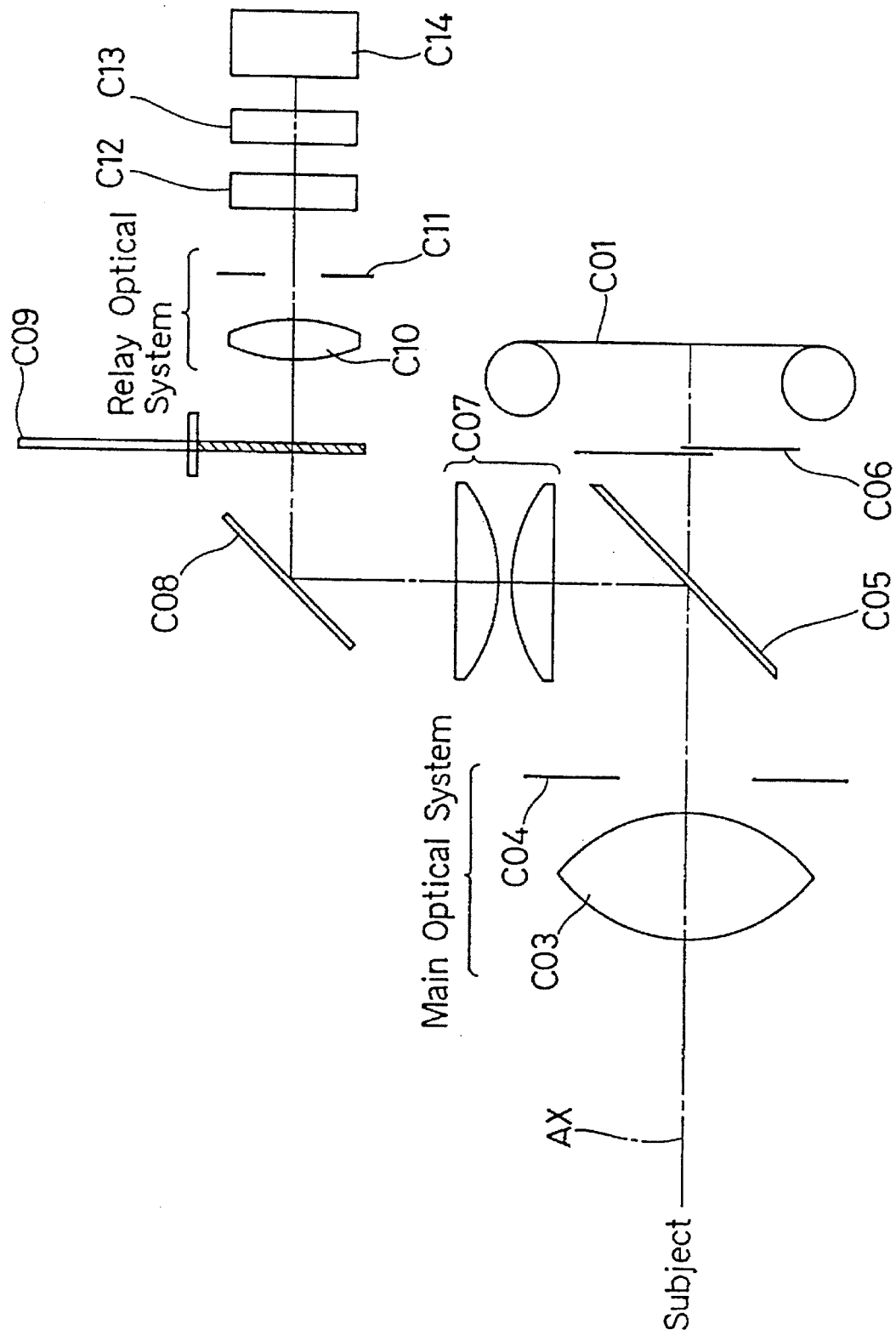
FIG. 78 is an outline diagram of the optical system of an image taking apparatus of the seventh embodiment.
Figure 79:
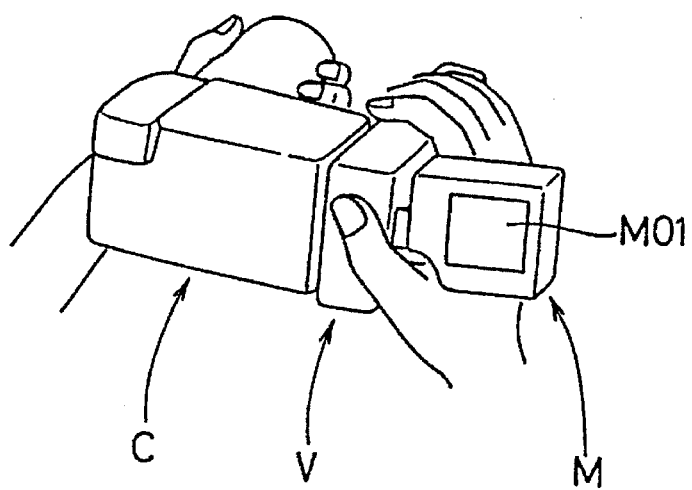
FIG. 79 is a perspective view showing the state of an image taking apparatus of the seventh embodiment in use.
Figure 79:
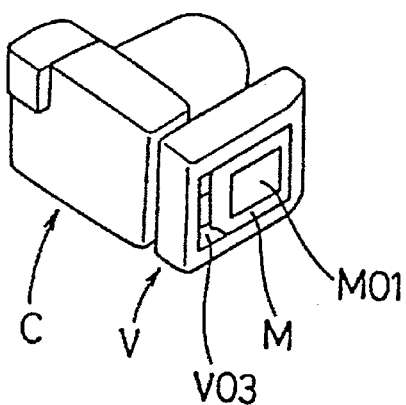
Figure 79:
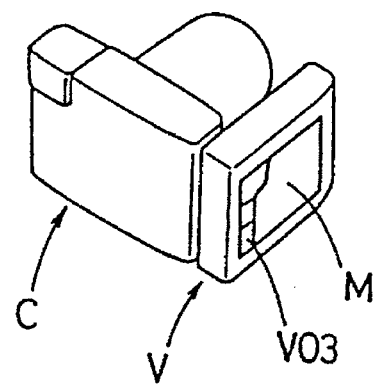

FIG. 75 is a perspective front view of the image taking apparatus of the seventh embodiment, FIG. 76 is a perspective rear view of the image taking apparatus, FIG. 77 is a perspective diagram showing the internal construction of the image taking apparatus, FIG. 78 is an outline diagram of the optical system of the image taking apparatus, and FIG. 79 is a perspective view showing the image taking apparatus in use.

As shown in FIGS. 75 and 76, the image taking apparatus has a camera body C, a VCR portion V linked onto one side of the camera body C through a rotary joint 1, a monitor portion M linked movably onto the side of the VCR portion V opposite to the camera body C through a rotary joint 2.

To simplify cross-reference between drawings and descriptions, a reference symbol used in the drawings begins with C if it represents a component of the camera body C, with V if it represents a component of the VCR portion V, and with M if it represents a component of the monitor portion M.

The VCR portion V is linked by the rotary joint 1 to be rotatable 90 degrees in a horizontal plane with respect to the camera body, and to be rotatable 270 degrees about a horizontally extending axis. The monitor portion M is linked by the rotary joint 2 to be rotatable 90 degrees in a horizontal plane with respect to the VCR portion, and to be rotatable about a horizontally extending axis. The rotary joints 1 and 2 offer appropriate friction when rotated so that the VCR portion V and the monitor portion M can be fixed at a desired position and angle. The camera body C and the VCR portion V are electrically connected by wirings penetrating the inside of the rotary joint 1, and the VCR portion V and the monitor portion M are electrically connected by wirings penetrating the inside the rotary joint 2.

Next, the internal construction of the image taking apparatus will be described. In FIG. 77, C01 represents a film for silver salt film shooting, C02 represents an optical system, V01 represents a deck portion which is provided with mechanisms and control circuits belonging to the VCR portion V and to which a videocassette tape is removably loaded as a recording medium, V02 represents a battery, and V03 represents a cavity for accommodating the monitor portion M.

Next, the optical system C02 will be described. As shown in FIG. 78, the light coming from the subject enters a main optical system, passes through a main lens C03, is subjected to light amount control by a main lens aperture diaphragm C04, passes through a pellicle mirror C05 serving as a light divider and a shutter C06, and reaches a film C01. This is the first light path. The light separated from the first light path in the pellicle mirror C05 passes through a condenser lens C07, a reflection mirror C08 and an ND filter C09, and reaches a relay optical system. This is the second light path. Ax represents an optical axis directed from the subject to the main lens C03.

The light having passed along the second light path and having reached the relay lens C10 is subjected to light amount control by a relay aperture diaphragm C11, passes through an optical low-pass filter C12, an infrared cut filter C13, and reaches a CCD image sensor C14 serving as a light/electricity converter, by which the light is converted into a video signal. Although the CCD image sensor C14 is shown as a single-plate type, a multiple-plate type can be used instead. The first light path is for shooting a still picture on a sliver salt film, whereas the second light path is for shooting a moving picture on a video recording medium. The video signal outputted from the CCD image sensor C14 is converted into a recording signal, and is then recorded on the videocassette tape loaded in the deck portion V01.

Next, the external construction of the camera body C will be described. In FIG. 75, C15 represents a lens barrel, C16 represents a zoom ring for controlling zoom, C17 represents an AF/MF switching button for switching between automatic and manual focus, C18 represents a flash, and C19 represents a stereophonic microphone.

Next, the operation portion of the camera body C will be described. In FIG. 76, COP01 represent a mode selection switch serving also as a main switch, and COP02 represents a button for selecting from among self-timer, continuous, and one-shot shooting in silver salt film shooting mode and still video shooting mode.

COP03 represents a shooting mode selection button. This button is operated in combination with the later described mode selection dial VOP04 to select a shooting scene, such as portrait, sports, and others, in simultaneous shooting mode, silver salt film shooting mode, video shooting mode, and still video shooting mode. COP04 represents a red-eye reduction button for reducing red-eye during flash shooting in silver salt film shooting mode and still video shooting mode.

COP05 represents a film cartridge exchange button for loading and unloading a film cartridge. COP06 represents a program button. This button is operated singly to set a shooting mode into a program. This button is operated in combination with the later-mentioned mode selection dial VOP04 to select an exposure mode from among aperture priority mode, shutter speed priority mode and manual mode, in simultaneous shooting mode, silver salt film shooting mode, video shooting mode, still video shooting mode. COP07 represents an LCD display portion for displaying information on operation and others.

In FIG. 75, COP08 represents a lens exchange button for removing the lens barrel C15 from the camera body C. COP09 represents a switch for selecting a frame aspect ratio in silver salt film shooting mode. COP10 represents a switch for selecting a screen in video shooting mode. COP11 represents a button for forcibly firing the flash in silver salt film shooting mode and still video shooting mode. COP12 represents a self-timer lamp for indicating that self-time is active.

Next, the VCR portion V will be described. V04 represents a speaker. The VCR portion V is equipped with a monitor lock mechanism, though not shown, for locking the monitor portion M resting in the cavity V03 to prevent it from popping out. A detailed description on the monitor lock mechanism will be omitted.

The operation portion of the VCR portion V will be described. VOP01 represents a release button used in silver salt film shooting mode. VOP02 represents a zoom lever for controlling the focal length of the lens C03 just as the zoom ring C16. VOP03 represents a group of buttons for controlling the deck portion V01. VOP04 is a mode selection dial for varying the values of AV (aperture value) and TV (shutter speed) in silver salt film shooting mode and video shooting mode.

VOP05 represents a recording start/stop button for controlling starting and stopping of recording on a recording medium in simultaneous shooting mode and video shooting mode. In manual mode, by operating the above-mentioned selection dial VOP04 with this button VOP05 held down, it is possible to switch a controllable parameter between AV and TV.

VOP06 represents a hand shake correction ON/OFF button used in simultaneous shooting mode and video shooting mode. In silver salt film shooting mode and still video shooting mode, by operating the selection dial VOP04 with this button VOP06 held down, it is possible to compensate exposure. VOP07 represents a battery exchange button.

Next, the monitor portion M will be described. M01 represents a EVF (liquid crystal viewfinder) portion serving as an electric display device for displaying images outputted from the CCD image sensor C14 and other information. M02 represents a holder for holding the EVF portion M01. The monitor portion M is, as described earlier, guided to be rotatable approximately 90 degrees about the rotary joint 2 in a horizontal plane, so that the monitor portion M can take a position in which it rests in the cavity V03 of the VCR portion as shown in (b) and (c) of FIG. 79, and a position in which it is drawn out from the cavity V03 of the VCR portion as shown in (a) of FIG. 79.

Next, the operation portion of the monitor portion will be described below. MOP01 represents a button for turning ON/OFF messages indicated in the EVF portion M01. MOP02 represents a button for controlling sound volume in V mode, and for controlling qualities (brightness, hue) of a picture displayed in the EVF portion M01.

Next, the operation of the image taking apparatus will be described.

The state of the apparatus in ordinary use is shown in (a) of FIG. 79. In this state, the operator, holding the camera body C and the VCR portion V with both hands, performs shooting, looking at the EVF portion M01. When the monitor portion M is rotated forward to rest in the cavity V03 of the VCR portion V with the EVF portion M01 facing outward as shown in (b) of FIG. 79, it is possible to view images and other information displayed in the EVF portion M01.

When the monitor portion M is folded down into the cavity V03, the monitor portion M is locked by the monitor lock mechanism. Since the monitor portion M is loaded by a spring, not shown, with a resilient force in the direction in which it pops out, it pops out into the position shown in FIG. 79 when the monitor lock mechanism is released.

As described earlier, since the monitor portion M is rotatable about a horizontally extending axis, it can be oriented forward by reversing the EVF portion M01. When the monitor portion M is then rotated forward to rest in the cavity V03 with the EVF portion M01 facing inward, it is possible to protect the EVF portion M01 from scratching while the apparatus is transported as shown in (c) of FIG. 79.

Hereinafter, an eighth embodiment of the present invention will be described.

Figure 80:
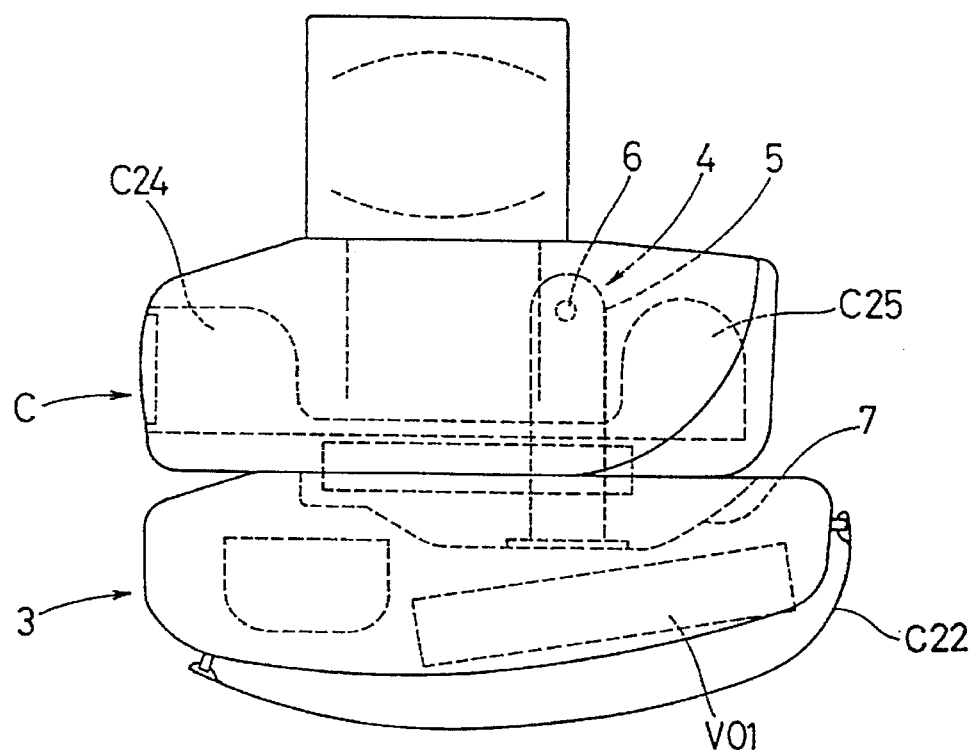
FIGS. 80 and 81 are top views of an image taking apparatus of the eighth embodiment of the present invention.
Figure 81:
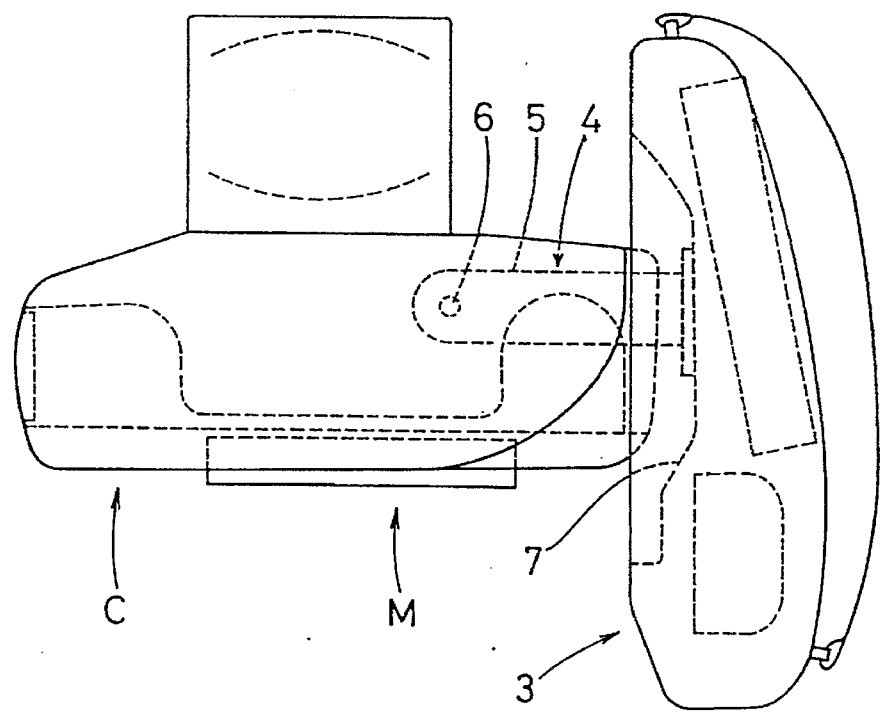
Figure 82:
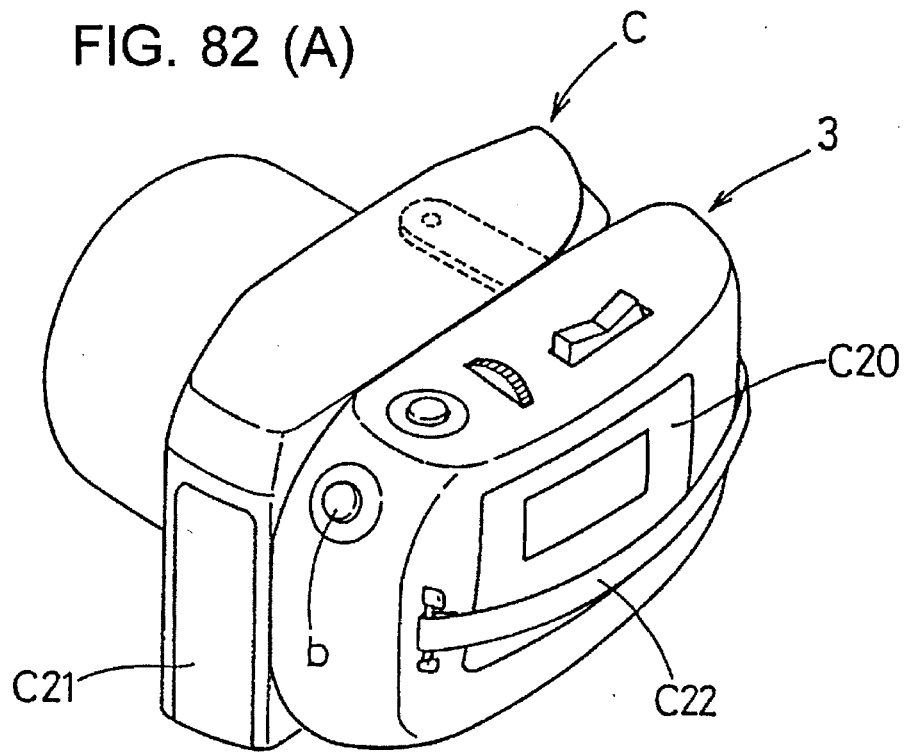
FIG. 82 is perspective views showing the state of an image taking apparatus of the eighth embodiment in use.
Figure 82:
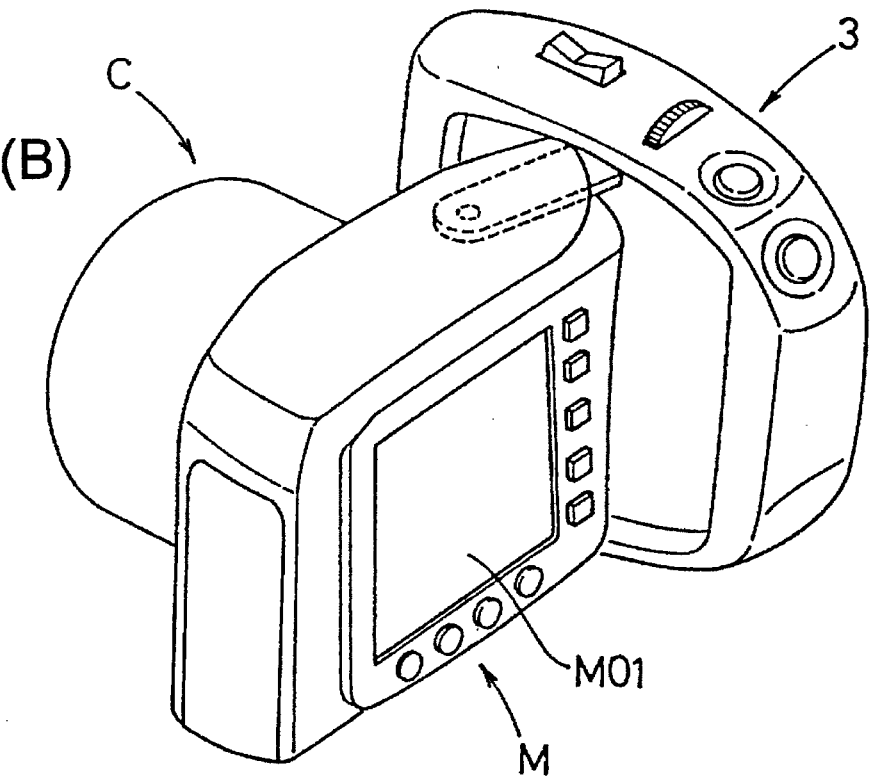

FIGS. 80 and 81 are top views of an image taking apparatus of the eighth embodiment. FIG. 82 is perspective views showing the state of the image taking apparatus in use. Descriptions of the components bearing the same reference symbols as in the seventh embodiment in the drawings will be omitted.

As shown in FIGS. 80 and 81, this image taking apparatus is equipped with a movable grip 3 including a built-in deck portion V01 on one side of the camera body C. The grip 3 is linked through a link mechanism 4 to the camera body C to be rotatable in a horizontal plane. On the rear of the camera body C is provided a monitor portion M. The monitor portion M is equipped with an EVF M01 as shown in (b) of FIG. 82. C20 represents a lid for taking out a cassette. C21 is a lid for taking out a film cartridge. C22 represents a holding strap. C24 represents a film cartridge compartment for accommodating a film cartridge. C25 represents a spool compartment for accommodating a spool for winding out a film.

The link mechanism 4 has an arm plate 5. One end of the arm plate 5 is fixed to the inner surface of the grip 3, and the other end of the arm plate 5 is rotatably supported by a vertical support axle 6 provided in the camera body C. The grip 3 is rotatable 90 degrees about the vertical support axle 6, so that it can take a position to the side of the camera body C as shown in FIG. 81, and a position to the rear of the camera body C as shown in FIG. 80.

The link mechanism offers appropriate friction when rotated, so that the grip 3 can be fixed at a desired position. Moreover, the grip 3 has a cavity 7 in its inner surface, so that the monitor portion M can rest in the cavity 7 when the grip 3 is rotated to the rear of the camera body C. The VCR portion V and the camera body C are electrically connected by wirings penetrating the inside of the link mechanism 4.

While the image taking apparatus is in use, the grip 3 is rotated to the side of the camera body C as shown in (b) of FIG. 82. In this state, since the EVF portion M01 faces outward, it is possible to view an image. While the image taking apparatus is not in use, the grip 3 is rotated to the rear of the camera body C as shown in (a) of FIG. 82. In this state, since the EVF portion M01 faces inward, it is possible to protect the EVF portion M01.

Hereinafter, a ninth embodiment of the present invention will be described.

Figure 83:
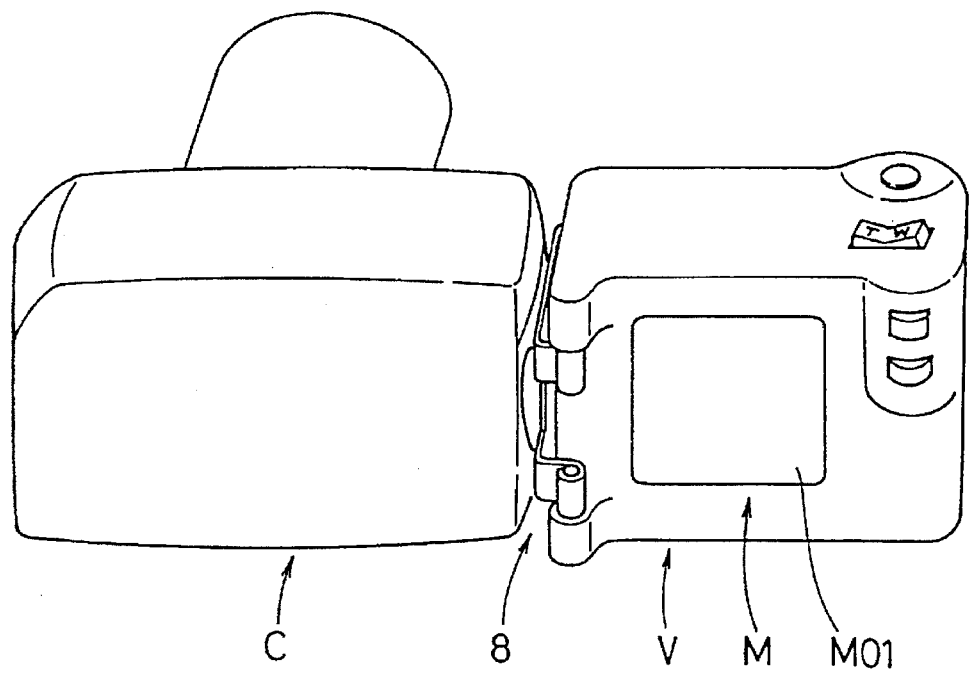
FIGS. 83 and 84 are perspective rear views of an image taking apparatus of the ninth embodiment of the present invention.
Figure 85:
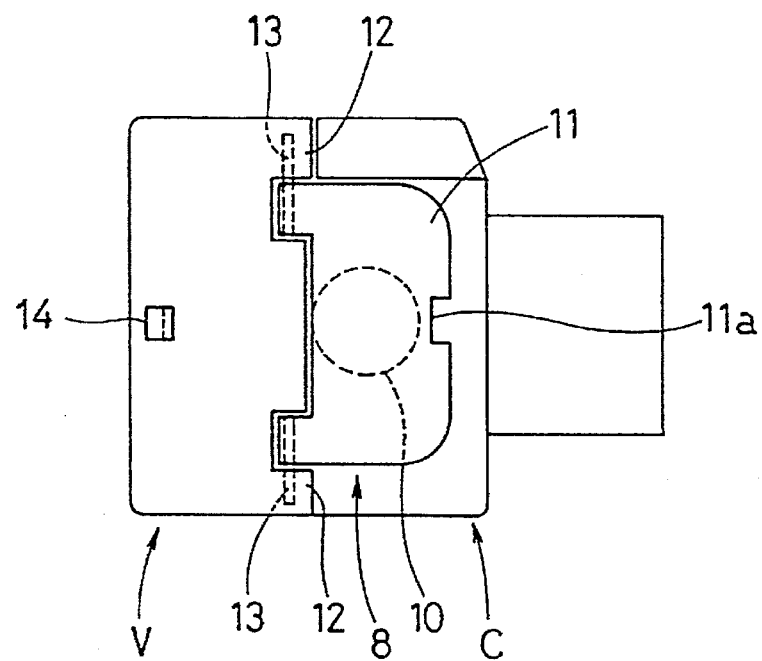
FIG. 85 is a right side view of FIG. 84.
Figure 86:
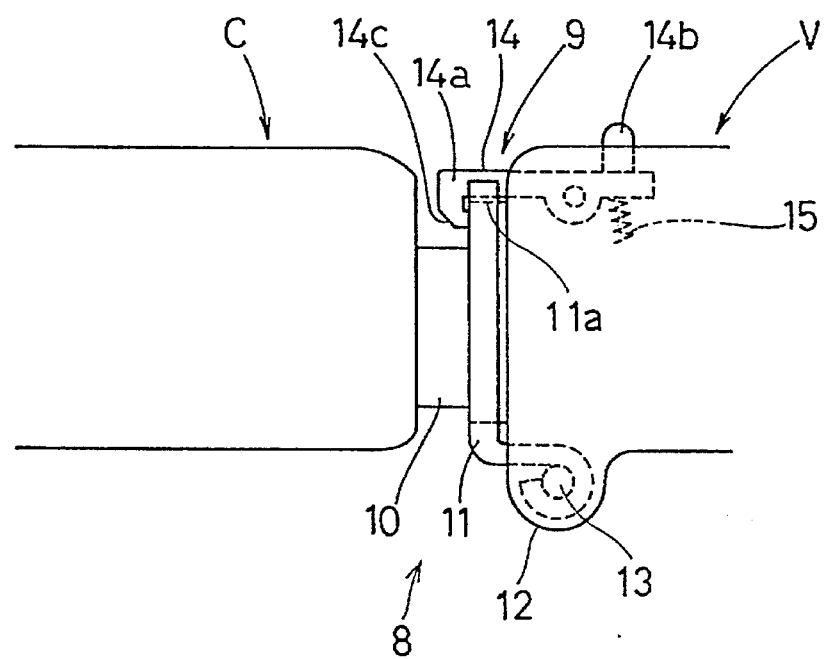
FIG. 86 is a detailed top view of a principal portion of FIG. 83.
Figure 89:
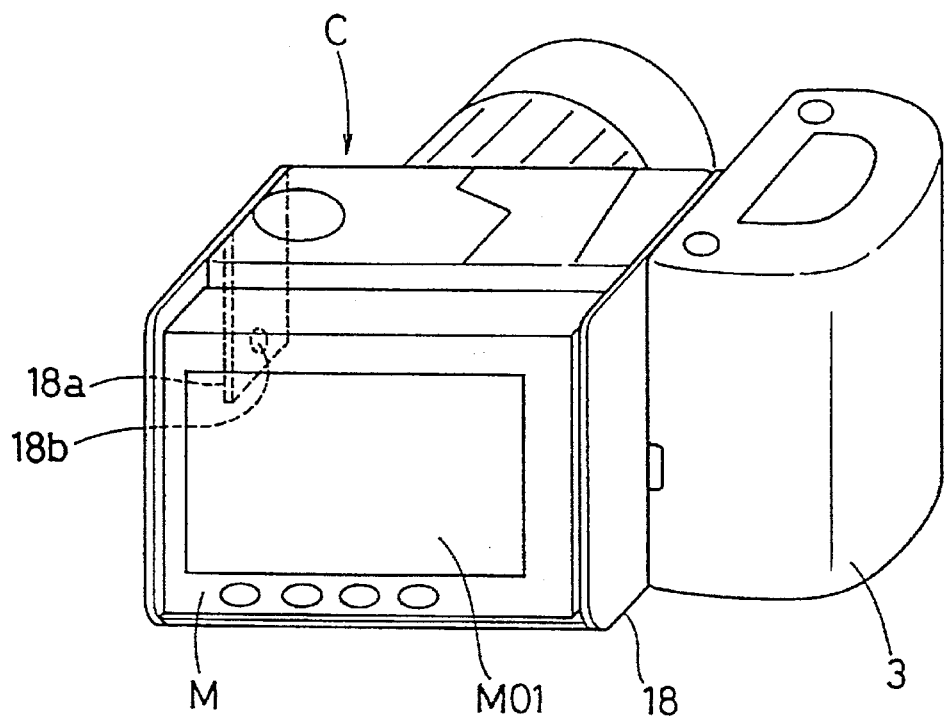
FIG. 89 is a perspective rear view of an image taking apparatus of the eleventh embodiment of the present invention.

FIGS. 83 and 89 are perspective rear view of an image taking apparatus of the ninth embodiment. FIG. 85 is a right side view of FIG. 84. FIG. 86 is a detailed top view of a principal portion of FIG. 83.

In this image taking apparatus, as shown in FIG. 83, a VCR portion V is movably linked through a link mechanism 8 to one side of the camera body C. A monitor portion M is provided to the rear of the VCR portion V. The monitor portion M is equipped with a viewfinder. As shown in FIG. 86, a lock mechanism 9 is provided between the VCR portion V and the camera body C to lock the VCR portion V onto the camera body C. The VCR portion V functions also as a grip.

The link mechanism 8 has a rotary joint 10 fitted on the side of the camera body C, and a hinge plate 11 fixed to the rotary joint 10. The hinge plate 11 is rotatably linked through a vertical support axle 13 to axle receptacles 12 provided in the upper and lower parts of the side of VCR portion V. The VCR portion V and the camera body C are electrically connected by wirings penetrating the inside of the link mechanism 8.

Figure 84:
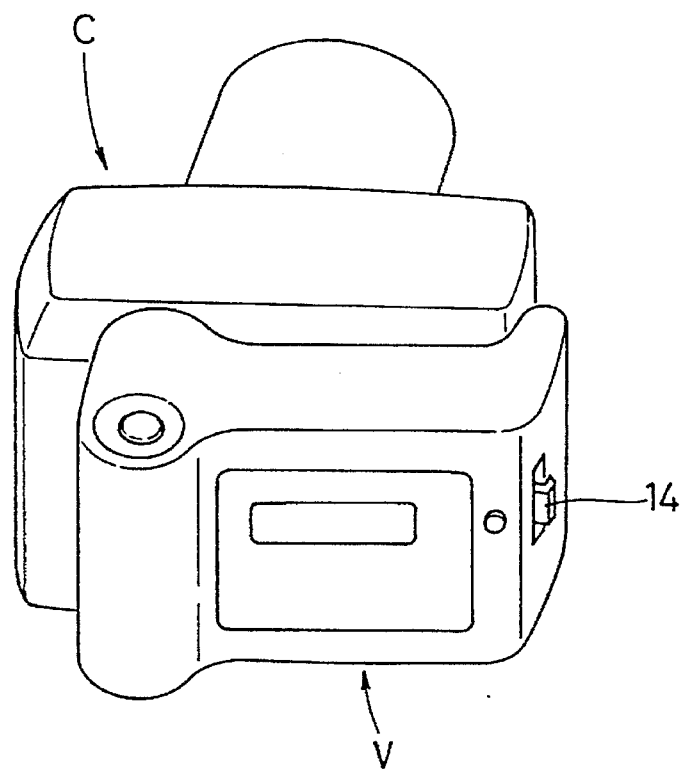

The VCR portion V is rotatable 180 degrees about the vertical support axle 13, so that it can take a position to the side of the camera body C as shown in FIG. 83, and a position to the rear of the camera body C as shown in FIG. 84. The VCR portion V is also rotatable about a horizontally extending axis, so that face-to-face shooting can be performed in which the operator is the very subject. The rotary joint 10 offers appropriate friction when rotated, so that the VCR portion can be fixed at a desired angle. Accordingly, it is possible to shoot even at a downward-directed or upward-directed angle.

As shown in FIG. 86, the lock mechanism 9 is provided with a lock lever 14 which is supported to be rotatable in a horizontal plane by the VCR portion V. The lock lever 14 protrudes from the VCR portion V at one end, and has at one end a claw 14a to be engaged with a notch 11a formed on the hinge plate 11, and has an unlock button 14b at the other end. The lock lever is loaded by a spring with an inward resilient force.

When the VCR portion V is rotated to a position as shown in FIG. 83, a skew surface 14c formed in the claw 14a of the lock lever 14 fits onto the side surface of the notch 11a in the hinge plate 11. The lock lever 14 then rotates clockwise against the resilient force of the spring 15, and, when the claw 14a passes over the hinge plate 11, the lock lever 14 is rotated counter-clockwise by the resilient force of the spring 15, so that the claw 14a is engaged with the hinge plate 11. As a result, the VCR portion V is locked onto the camera body C. To unlock, the unlock button 14b is pressed and the lock lever 14 is rotated, so that the claw 14a of the lock lever 14 is disengaged from the hinge plate 11.

While the image taking apparatus is in use, the VCR portion V is rotated to the side of the camera body C as shown in FIG. 83. In this state, since the EVF portion M01 faces outward, it is possible to view an image. While the image taking apparatus is not in use, the VCR portion V is rotated to the rear of the camera body C as shown in FIG. 84. In this state, since the EVF portion M01 faces inward, it is possible to protect the EVF portion M01.

Hereinafter, a tenth embodiment of the present invention will be described.

Figure 87:
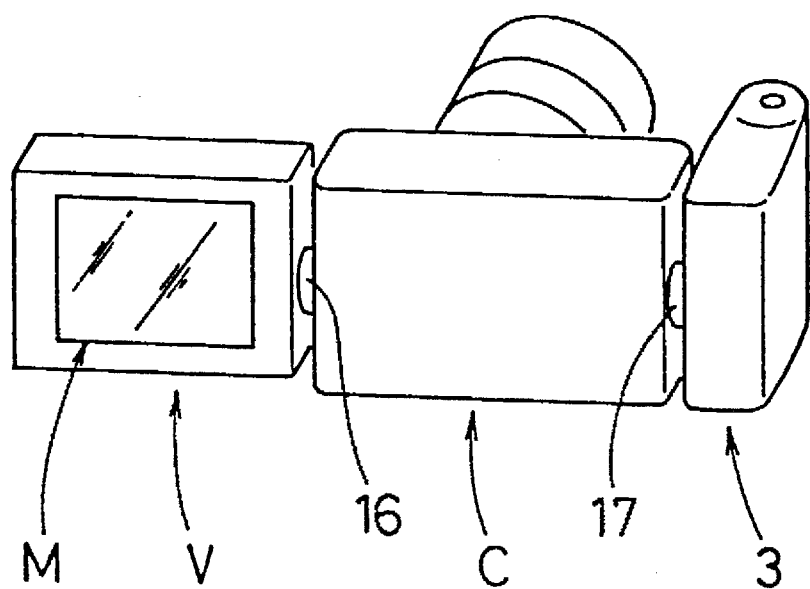
FIG. 87 is a perspective rear view of an image taking apparatus of the tenth embodiment of the present invention.
Figure 88:
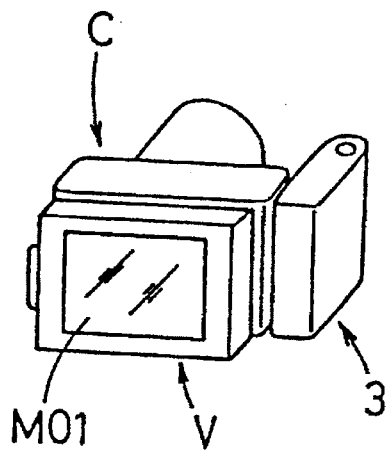
FIG. 88 is a perspective view showing the state of an image taking apparatus of the tenth embodiment in use.
Figure 88:
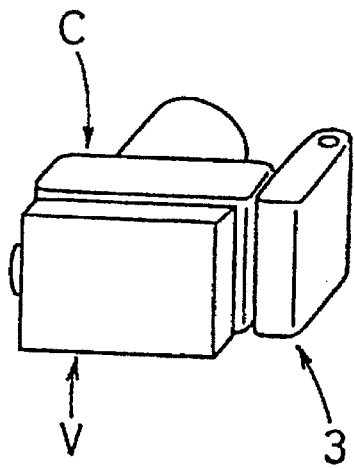
Figure 88:
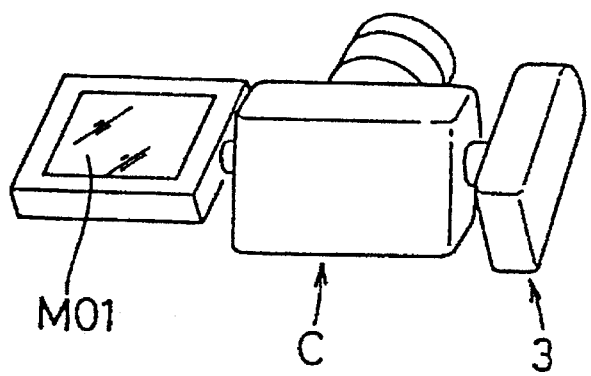
Figure 88:
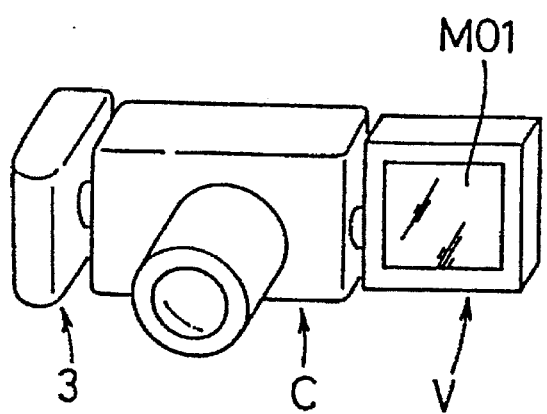

FIG. 87 is a perspective rear view of an image taking apparatus of this embodiment. FIG. 88 is a perspective view showing the image taking apparatus in use.

In this image taking apparatus, as shown in FIG. 87, a VCR portion V is movably linked to one side of the camera body C through a link mechanism 16, and a grip 3 is linked to the other side of the camera body C through a rotary joint 17. A monitor portion M is provided to the rear of the VCR portion V. The VCR portion V and the camera body C are electrically connected by wirings penetrating the inside of the link mechanism 16.

The VCR portion V is rotatable 180 degrees about the link mechanism 16, so that it can take a position to the side of the camera body C as shown in FIG. 87, and a position to the rear of the camera body C as shown in (b) of FIG. 88. The VCR portion V is also rotatable about a horizontally extending axis. The link mechanism 16 offers appropriate friction when rotated, so that the VCR portion V can be fixed at a desired position. The grip 3 is also rotatable about a horizontally extending axis. The link mechanism 16 and the rotary joint 17 are linked through gears inside the camera body C, and, when the grip 3 is rotated, the VCR portion V rotates accordingly in the same direction.

In ordinary shooting with this image taking apparatus, the VCR portion V is moved to the rear of the camera body C with the EVF portion M01 facing outward as shown in (a) of FIG. 88. When the VCR portion V is moved to the side of the camera body C as shown in FIG. 87, it is possible to shoot holding the image taking apparatus firmly with both hands. When the image taking apparatus is not in use, the VCR portion V is moved to the rear of the camera body C with the EVF portion M01 facing toward the camera body C as shown in (b) of FIG. 88. In this state, since the EVF portion M01 faces inward, it is possible to protect it.

It is also possible to shoot at a downward-directed or upward-directed angle with this image taking apparatus. For example, if the grip 3 is rotated forward as shown in (c) of FIG. 88, the EVF portion M01 can be viewed from above, that is, it is possible to shoot at an upward-directed angle. Moreover, if the grip 3 is rotated 180 degrees so that the EVF portion M01 will face the operator as shown in (d) of FIG. 88, it is possible to perform face-to-face shooting.

Though the VCR portion V is designed to interlock with the grip 3 in this embodiment, the VCR portion V and the grip 3 may be designed to move independently of each other.

Hereinafter, an eleventh embodiment of the present invention will be described.

Figure 90:
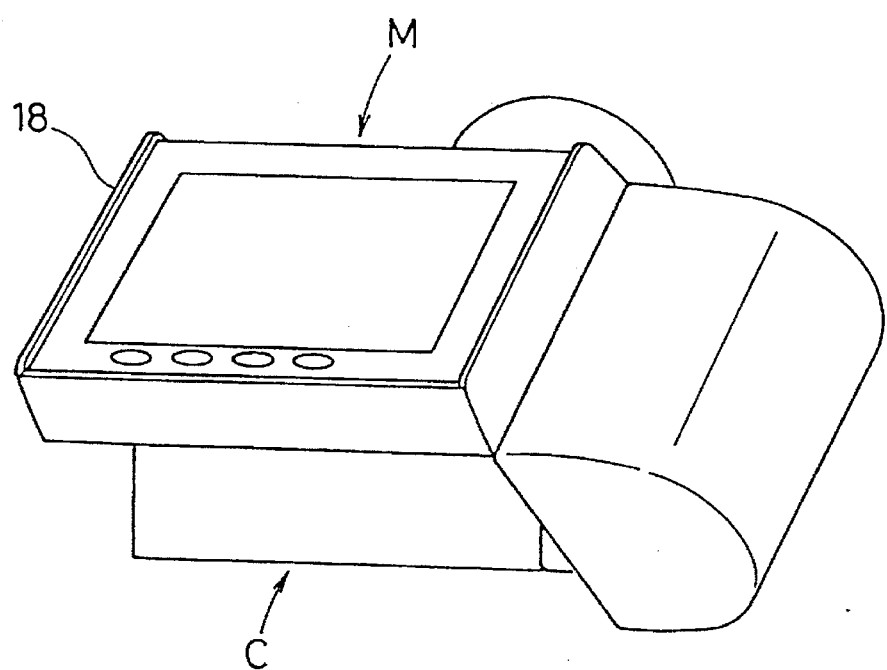
FIGS. 90 to 92 are perspective views showing the state of an image taking apparatus of the eleventh embodiment in use.
Figure 91:
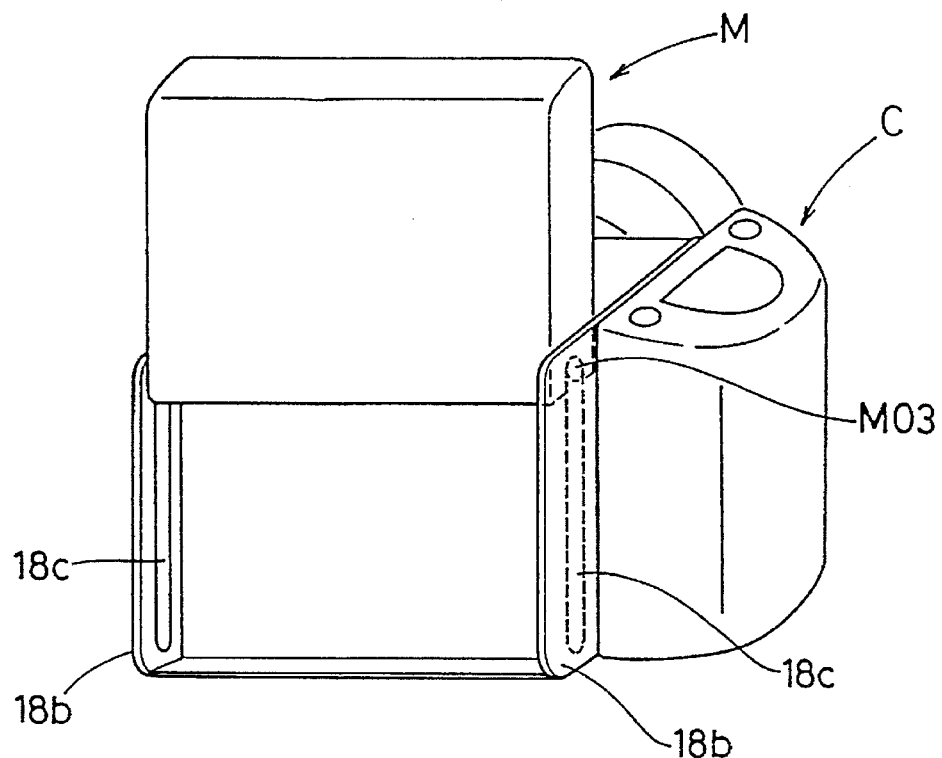
Figure 92:
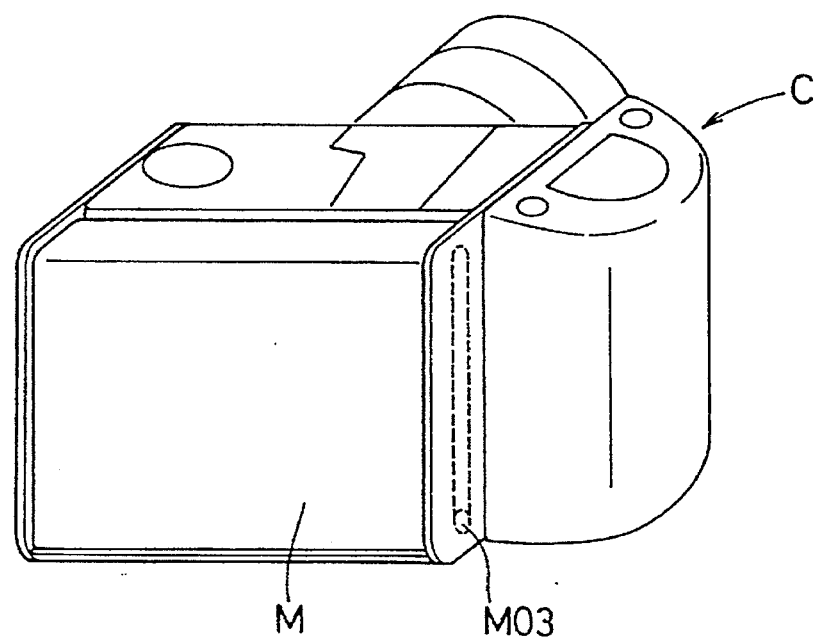

FIG. 89 is a perspective rear view of an image taking apparatus of the eleventh embodiment. FIGS. 90 to 92 are perspective views showing the state of the image taking apparatus in use.

As shown in FIG. 89, this image taking apparatus is equipped with a frame 18 rotatably mounted on the camera body C. The frame 18 is provided with a grip 3 located to the side of the camera body C, and a monitor portion M movably located to the rear of the camera body C. The frame 18 has a pair of arm plates 18a (only one of which is shown), whose ends are rotatably supported by the camera body C through a horizontal support axle 18b, so that the frame 18 can be rotated about the horizontal support axle 18b as shown in FIG. 90. The frame offers appropriate friction when rotated, so that the frame 18 can be fixed at a desired position. The monitor portion M and the camera body C are electrically connected by wirings penetrating the inside of the arm plates 18a.

The frame 18 is provided with a pair of axle support plates 18d protruding backward toward both sides of the monitor portion M as shown in FIG. 91. Each axle support plate 18d has a vertically extending groove 18c formed in its inner surface. The monitor portion M has horizontally protruding pins M03 at the top ends of both of its side surfaces. Each pin M03 is engaged with the respective groove 18c. As shown in FIG. 91, the monitor portion M can be reversed upside down by rotating it about the pins M03, and then be slid downward. In this state, where the EVF portion M01 faces inward, it is possible to protect the EVF portion M01.

Figure 93:
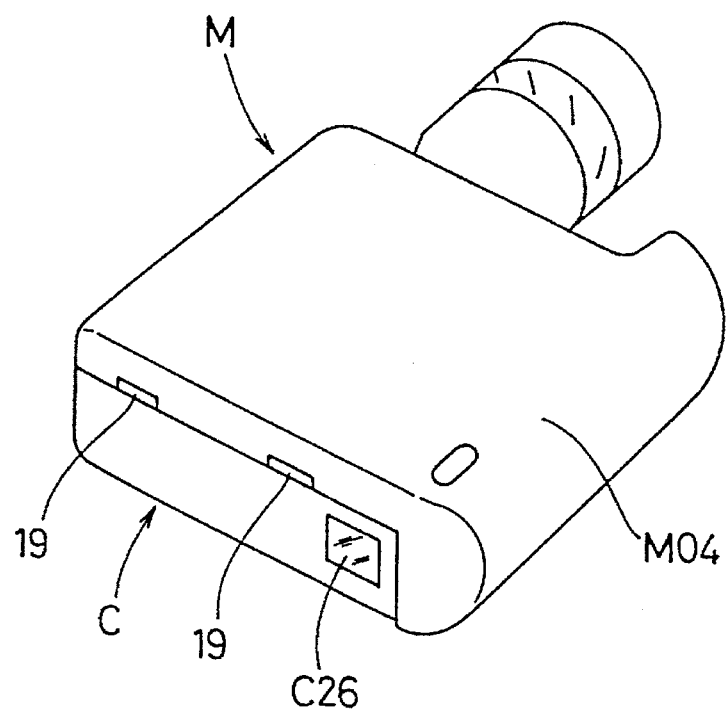
FIG. 93 is a perspective view of an image taking apparatus of the twelfth embodiment of the present invention.
Figure 94:
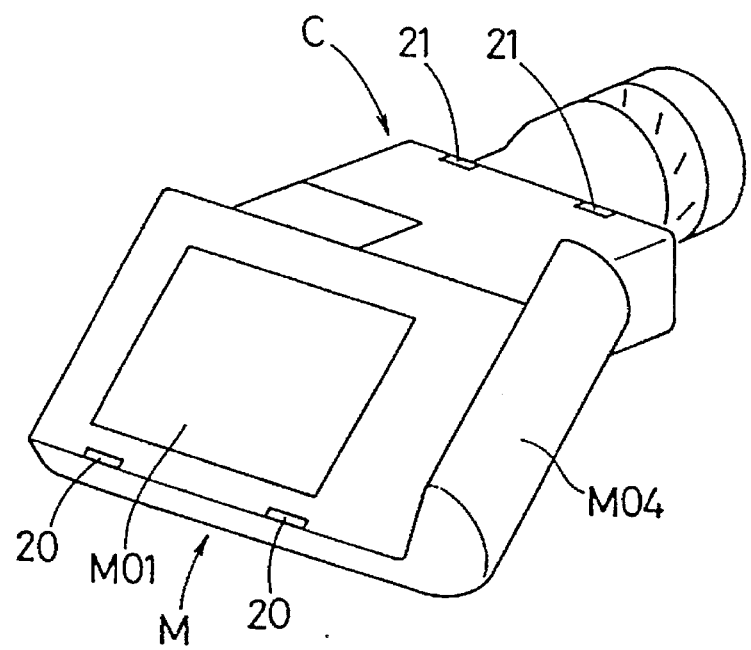
FIG. 94 is a perspective view showing the state of an image taking apparatus of the twelfth embodiment in use.
Figure 95:
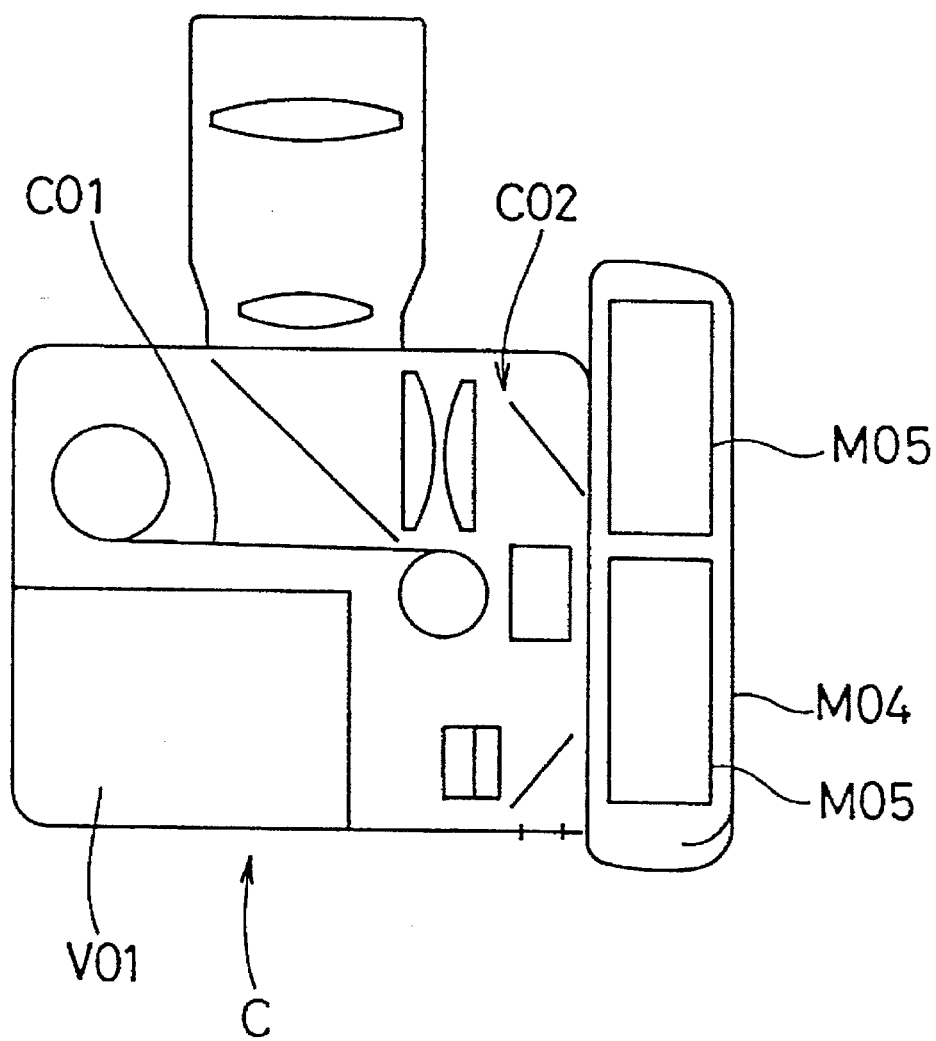
FIG. 95 is a perspective diagram showing the internal construction of image taking apparatus of the twelfth embodiment.

Hereinafter, an twelfth embodiment of the present invention will be described. FIG. 93 is a perspective view of an image taking apparatus of this embodiment. FIG. 94 is a perspective view showing the state of the image taking apparatus in use. FIG. 95 is a perspective diagram showing the internal construction of this image taking apparatus.

This image taking apparatus of the flat type has a camera body C and a monitor portion M movably piled up on the top of the camera body C. The monitor portion M is linked to the rear edge of the top surface of the camera body C through a pair of hinges 19 to be rotatable about an horizontally extending axis. An EVF portion M01 is provided on the inner surface of the monitor portion M. The monitor portion M and the camera body C are electrically connected by wirings penetrating the inside of the hinges 19. The hinges 19 offer appropriate friction when rotated, so that the monitor portion M can be fixed at a desired position. C26 represents a finder for silver salt film shooting.

As shown in FIG. 95, in the camera body C are incorporated a film C01 for silver salt film shooting, an optical system C02, a deck portion V01, and others. The film C01 for silver salt film shooting is loaded approximately in S-shape.

A grip M04 is formed on one side of the monitor portion M. A battery M05 is built into the monitor portion M. Toward the free edge of the inner surface of the monitor portion M are provided a pair of lock mechanisms 20 for locking the monitor portion M when it is piled up on the top of the camera body C, whereas a pair of engagement portions 21 to be engaged with the lock mechanisms 20 are provided on the top of the camera body C. A description of the lock mechanism 20 will be omitted, since it has the same construction as the lock mechanism 9 shown in FIG. 86.

While the image taking apparatus is in use, the monitor portion M is rotated to the rear of the camera body C as shown FIG. 94. While the image taking apparatus is not in use, the monitor portion M is rotated onto the top of the camera body C as shown in FIG. 93. In this state, since the EVF portion M01 faces inward, it is possible to protect the EVF portion M01. Moreover, with the EVF portion M01 thus folded down, the apparatus is compact.

Hereinafter, an thirteenth embodiment of the present invention will be described.

Figure 96:
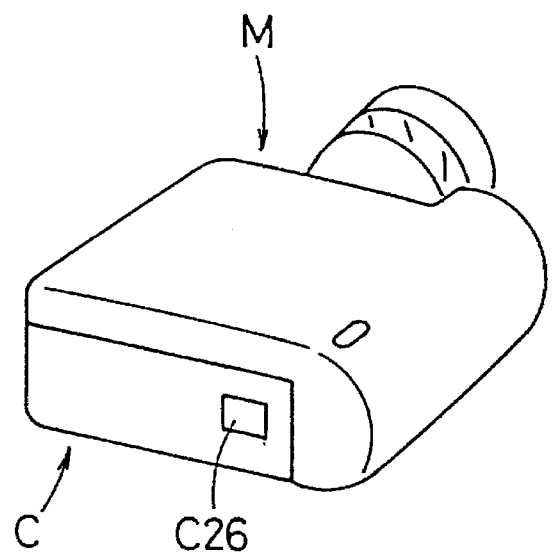
FIG. 96 is a perspective view of an image taking apparatus of the thirteenth embodiment of the present invention.
Figure 97:
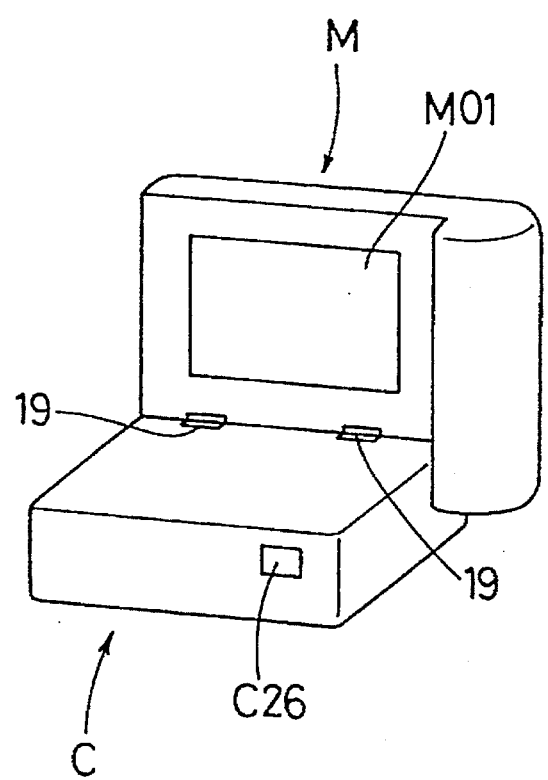
FIG. 97 is a perspective view showing the state of an image taking apparatus of the thirteenth embodiment in use.

FIG. 96 is a perspective view of an image taking apparatus of this embodiment. FIG. 97 is a perspective view showing the state of this image taking apparatus in use.

This image taking apparatus of the flat type has a camera body C and a monitor portion M movably piled up on the top of the camera body C. The monitor portion M is linked to the front edge of the top surface of the camera body C through a pair of hinges 19 to be rotatable about an horizontally extending axis. An EVF portion M01 is provided on the inner surface of the monitor portion M. The monitor portion M functions also as a grip. In other respects of its construction and usage, this embodiment is substantially the same as the twelfth embodiment. Specifically, when the apparatus is in use, the monitor portion M is raised up on the top surface of the camera body C as shown in FIG. 97. When the apparatus is not in use, the monitor portion M is laid down onto the top surface of the camera body C as shown in FIG. 96. Thus, it is possible to protect the EVF portion M01, and make the apparatus as a whole compact.

Figure 98:
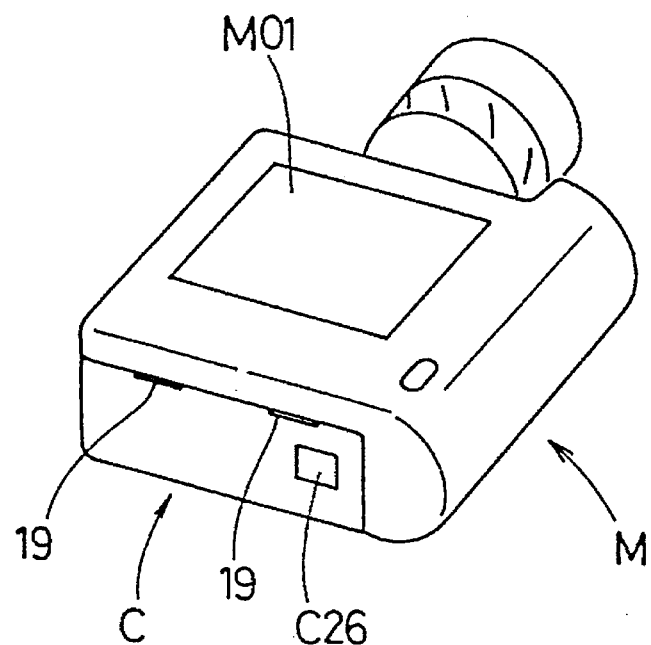
FIGS. 98 and 99 are perspective views of an image taking apparatus of the thirteenth embodiment which functions both as a still camera and as a video camera.
Figure 99:
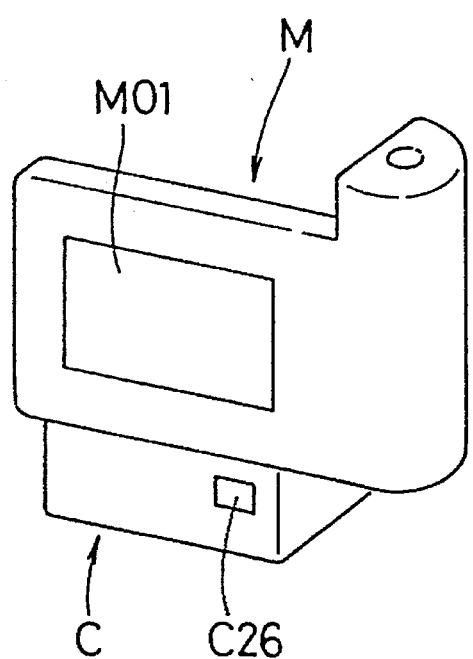

FIGS. 98 and 99 are perspective views of an image taking apparatus which functions both as a still camera and as a video camera.

In this image taking apparatus, the EVF portion M01 is provided on the outer surface of the monitor portion M. In other respects of construction, this image taking apparatus is substantially the same as that of the twelfth embodiment. Specifically, the monitor portion M is linked to the camera through a pair of hinges 19 to be rotatable about a horizontally extending axis. When the apparatus is in use, the monitor portion M is raised up on the top surface of the camera body C as shown in FIG. 99. When the apparatus is not in use, the monitor portion M is laid down onto the top surface of the camera body C as shown in FIG. 98. With this image taking apparatus, it is possible to shoot at eye level as shown in FIG. 99, as well as at waist level as shown in FIG. 98.

Hereinafter, a fourteenth embodiment of the present invention will be described.

Figure 100:
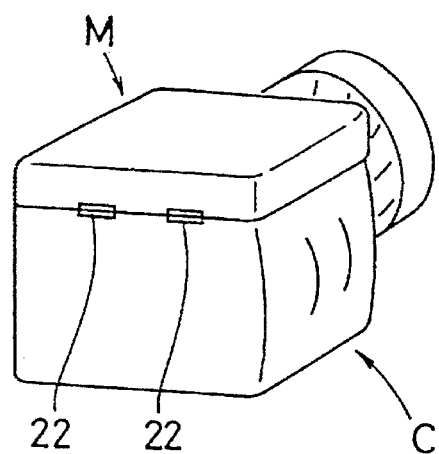
FIG. 100 is a perspective view of an image taking apparatus of the fourteenth embodiment of the present invention.
Figure 101:
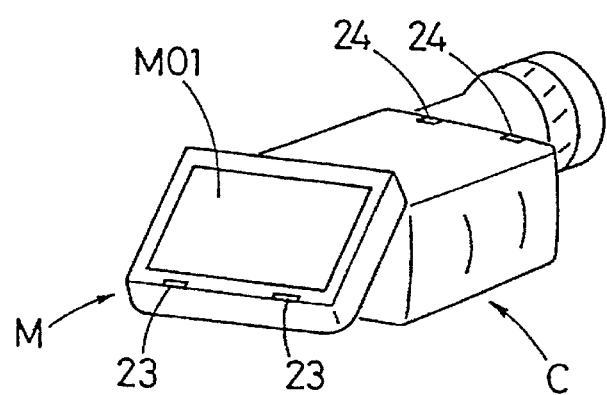
FIGS. 101 and 102 are perspective views showing the state of an image taking apparatus of the fourteenth embodiment in use.
Figure 102:
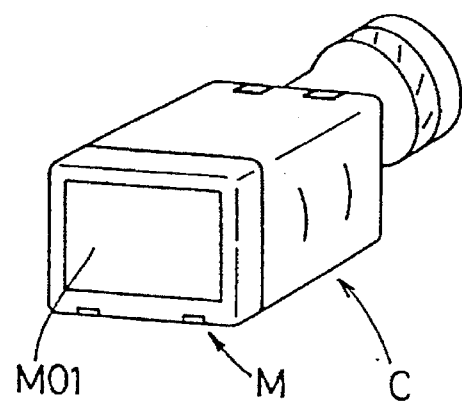

FIG. 100 is a perspective view of an image taking apparatus of this embodiment. FIGS. 101 and 102 are perspective views showing the state of the image taking apparatus in use.

This image taking apparatus of the flat type has a camera body C and a monitor portion M movably piled up on the top of the camera body C. The monitor portion M is linked to the top edge of the rear surface of the camera body C through a pair of hinges 22 to be rotatable about an horizontally extending axis. The monitor portion M and the camera body C are electrically connected by wirings penetrating the inside of the hinges 22. The hinges 22 offer appropriate friction when rotated, so that the monitor portion M can be fixed at a desired position. Toward the free edge of the inner surface of the monitor portion M are provided a pair of lock mechanisms 23 for locking the monitor portion M when it is piled up on the top of the camera body C, whereas a pair of engagement portions 24 to be engaged with the lock mechanisms 23 are provided on the top of the camera body C. A description of the lock mechanism 23 will be omitted, since it has the same construction as the lock mechanism 9 shown in FIG. 86.

While the image taking apparatus is in use, the monitor portion M is rotated to the rear of the camera body C as shown FIG. 102. While the image taking apparatus is not in use, the monitor portion M is rotated onto the top of the camera body C as shown in FIG. 100. In this state, since the EVF portion M01 faces inward, it is possible to protect the EVF portion M01. It is also possible to shoot at an upward-directed angle slanting the monitor portion M as shown in FIG. 101.

Figure 103:
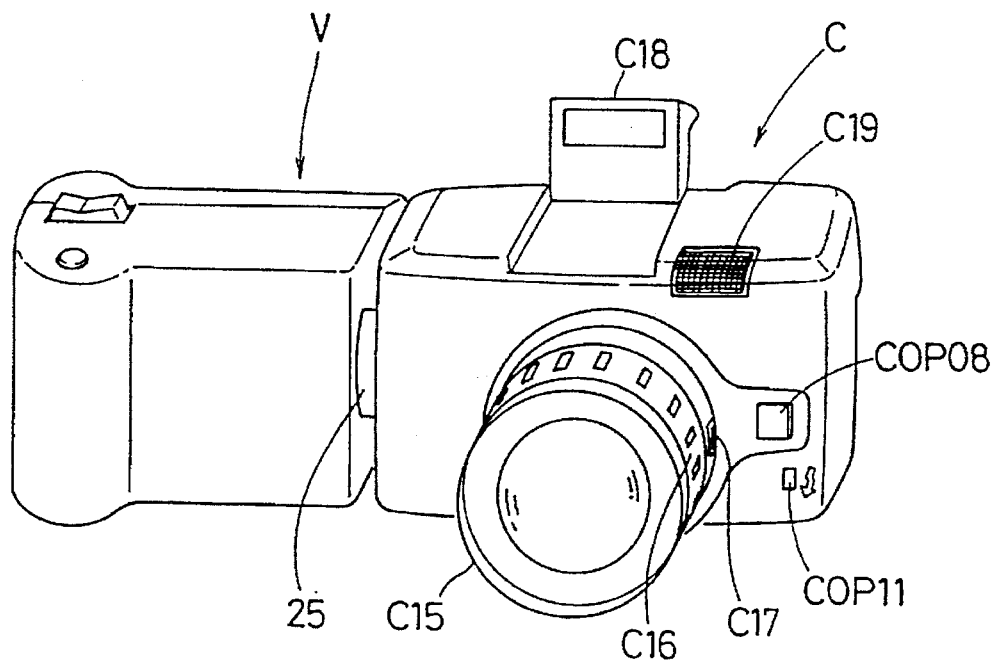
FIG. 103 is a perspective front view of an image taking apparatus of the fourteenth embodiment functioning both as a still camera and as a video camera.
Figure 104:
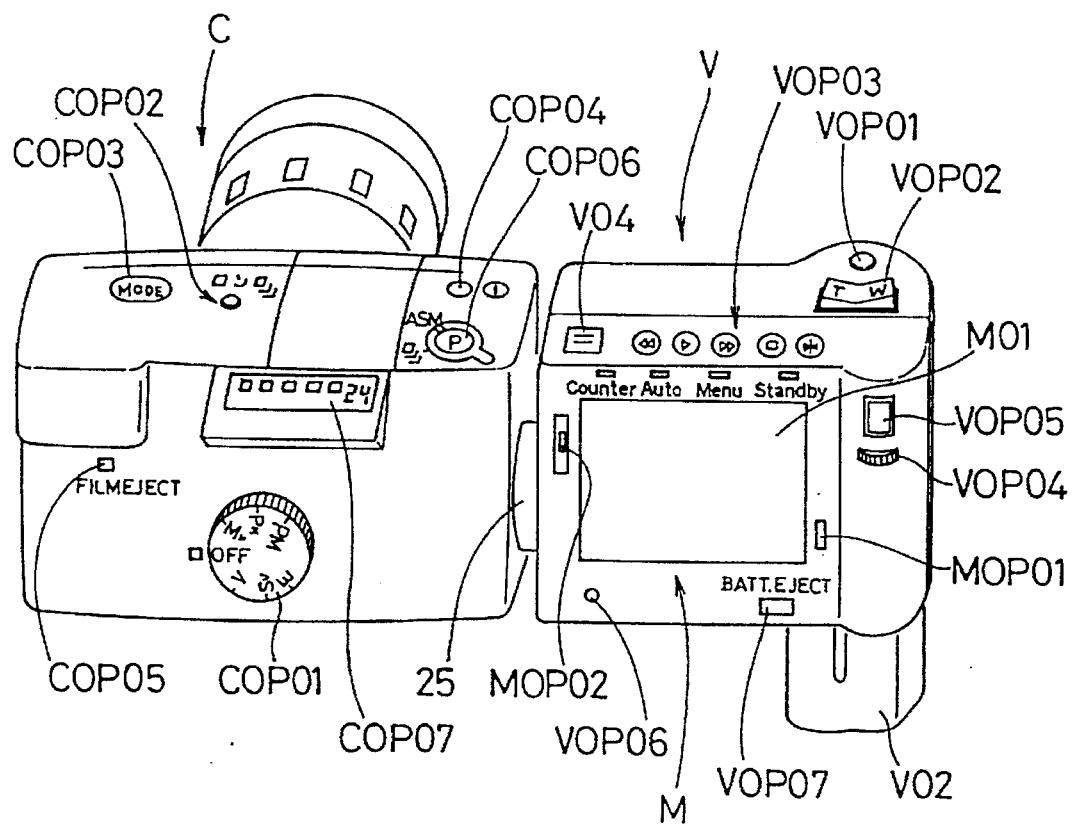
FIG. 104 is perspective rear view of an image taking apparatus of the fourteenth embodiment functioning both as a still camera and as a video camera.
Figure 105:
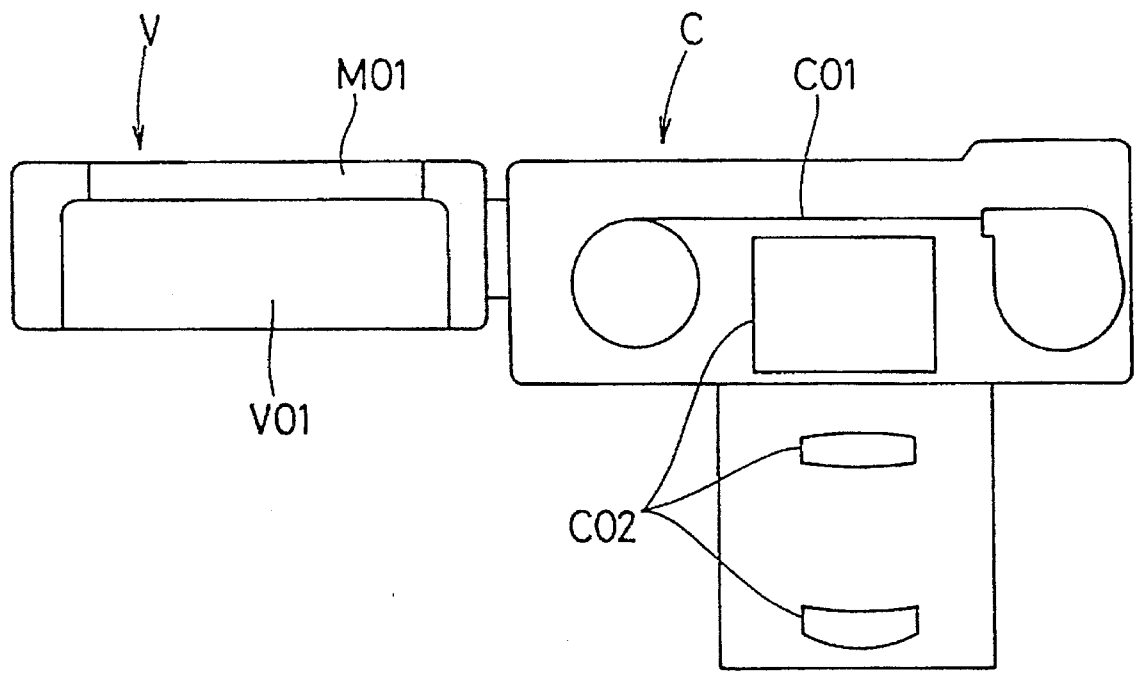
FIG. 105 is a perspective diagram showing the internal construction of an image taking apparatus of the fourteenth embodiment functioning both as a still camera and as a video camera.
Figure 106:
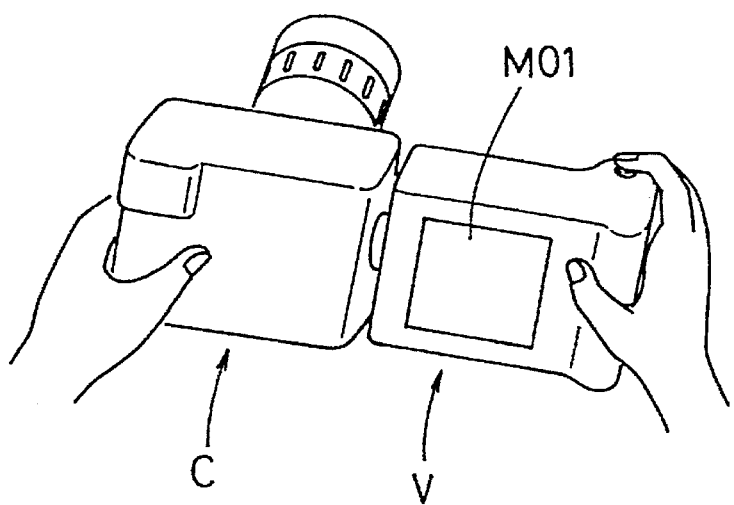
FIGS. 106 and 107 are perspective views showing the state of an image taking apparatus of the fourteenth embodiment functioning both as a still camera and as a video camera in use.
Figure 107:
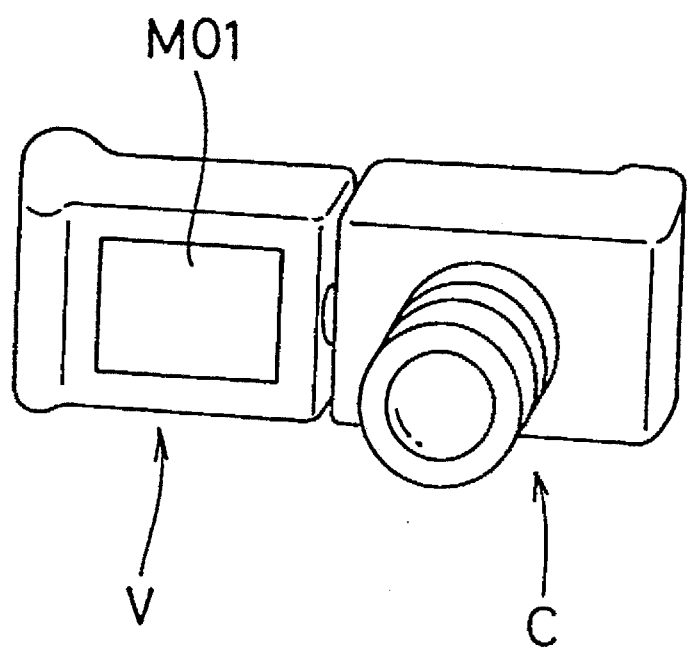

FIG. 103 is a perspective front view of the image taking apparatus functioning both as a still camera and as a video camera. FIG. 104 is perspective rear view of the image taking apparatus. FIG. 105 is a perspective diagram showing the internal construction of the image taking apparatus. FIGS. 106 and 107 are perspective views showing the image taking apparatus in use.

In this image taking apparatus, as shown in FIG. 103, a VCR portion V is linked to one side of the camera body C through a rotary joint 25. The VCR portion V and the monitor portion M are electrically connected by wirings penetrating the inside of the rotary joint 25. The rotary joint 25 offers appropriate friction when rotated, so that the VCR portion can be fixed at a desired position. As shown in FIG. 105, a film C01 for silver salt film shooting and an optical system C02 are built into the camera body C. A deck portion V01 is built into the VCR portion V. A monitor portion M is provided on the other side of the VCR portion V.

In ordinary shooting with this image taking apparatus, shooting is performed with the EVF portion M01 directed backward and with the camera body C and the VCR portion V held with both hands as shown in FIG. 106. In face-to-face shooting, the VCR portion V is rotated 180 degrees, and the operator shoots looking at the EVF portion M01.

Figure 108:
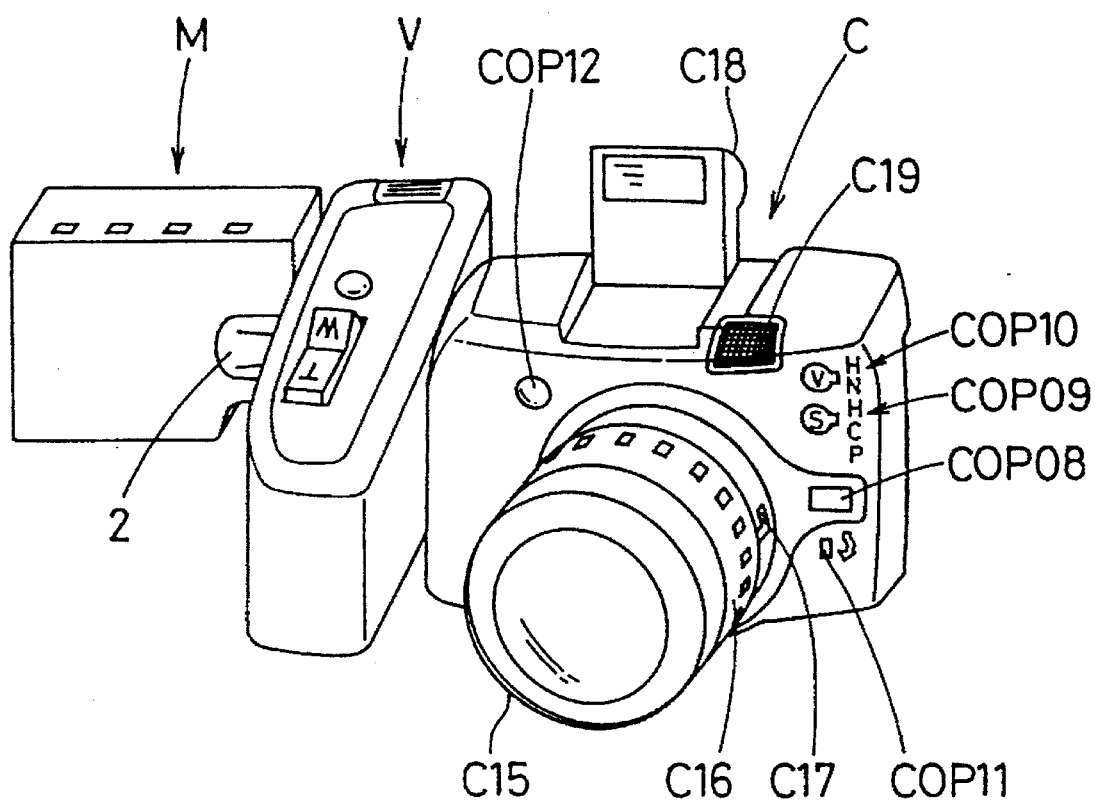
FIG. 108 is a perspective front view of an image taking apparatus of the fifteenth embodiment of the present invention.
Figure 109:
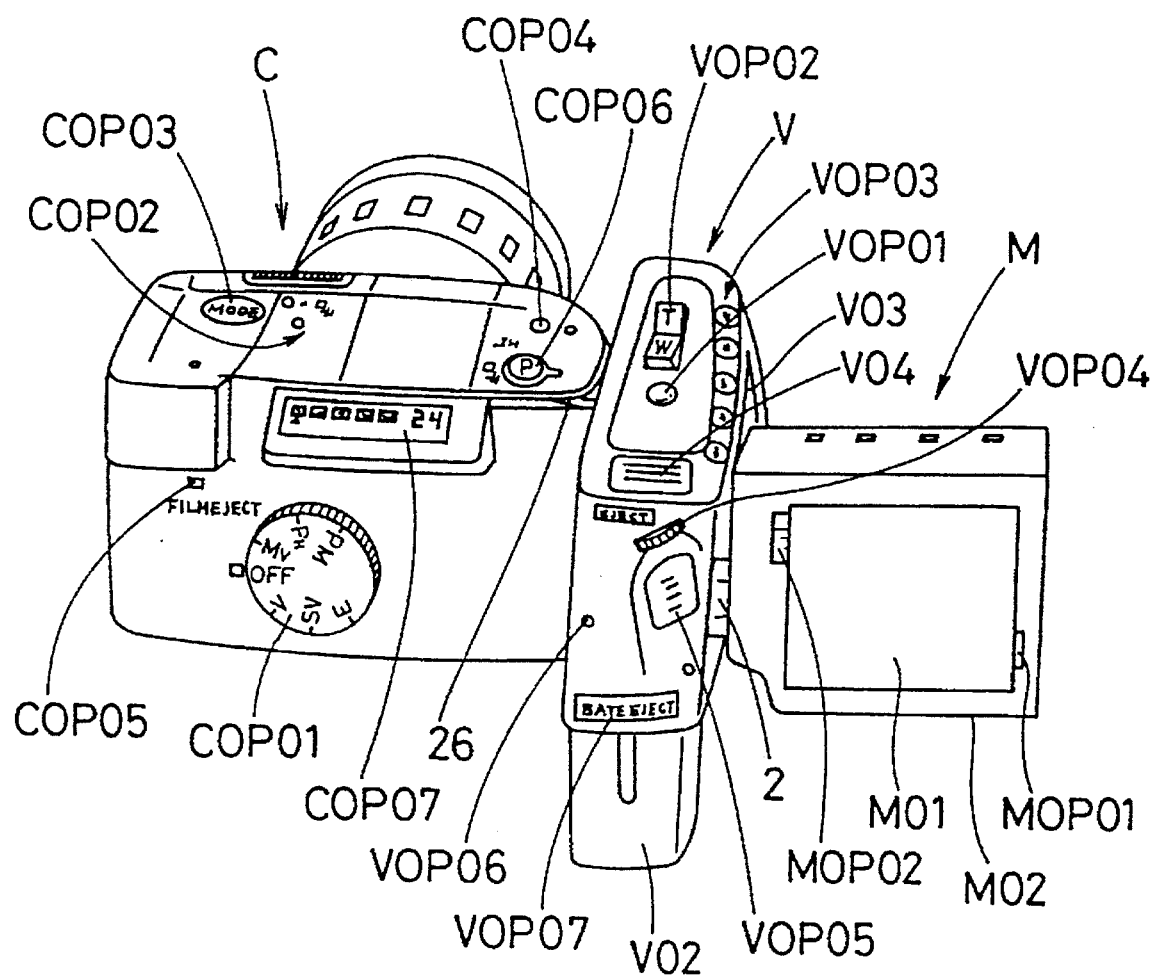
FIG. 109 is a perspective rear view of an image taking apparatus of the fifteenth embodiment.
Figure 110:
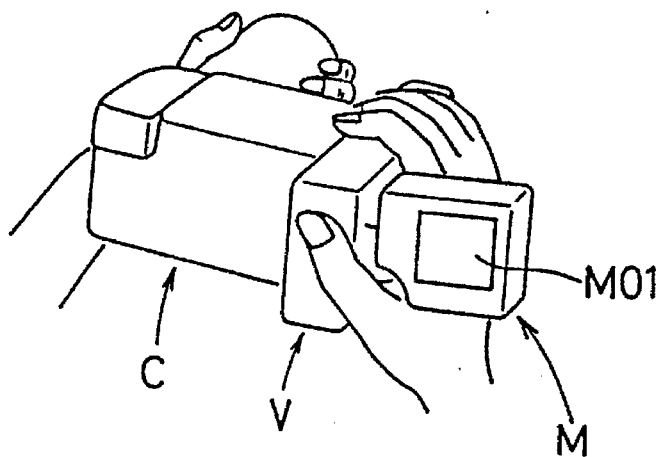
FIG. 110 is a perspective view showing the state of an image taking apparatus of the fifteenth embodiment in use.
Figure 110:
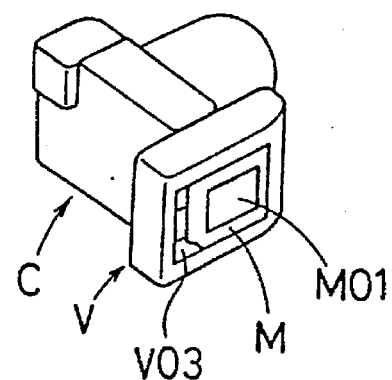
Figure 110:
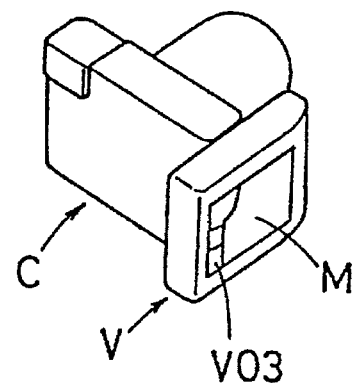
Figure 110:
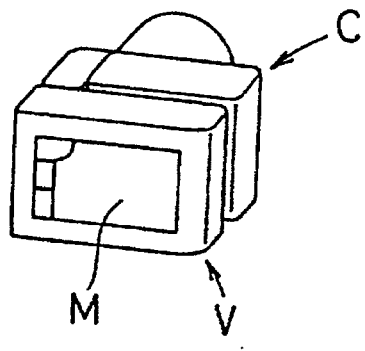

FIG. 108 is a perspective front view of an image taking apparatus of a fifteenth embodiment of the present invention. FIG. 109 is a perspective rear view of this image taking apparatus. FIG. 110 is a perspective view showing the state of this image taking apparatus in use.

As shown in FIGS. 108 and 109, this image taking apparatus is provided with a camera body C, a VCR portion V linked to one side of the camera body C through a link mechanism 26, and a monitor portion M movably linked to the side of the VCR portion V opposite to the camera body C through a rotary joint 2.

The link mechanism 26 serves to link the VCR portion V to be rotatable approximately 90 degrees in a horizontal place. The construction of the link mechanism 26 is the same as the link mechanism 5 of the eighth embodiment. The VCR portion V is rotatable along an arc path substantially tracing the outer surfaces of the camera body C in the range from a position to the side of the camera body as shown in (c) of FIG. 110 to a position to the rear of the camera body as shown in (d) of FIG. 110. In other respects of construction, this image taking apparatus is similar to the apparatus of the seventh embodiment.

Next, the operation of this image taking apparatus will be described.

The state of the apparatus in ordinary use is shown in (a) of FIG. 110. In this state, the operator performs shooting, holding the camera body C and the VCR portion V with both hands, and looking at the EVF portion M01. When the monitor portion M is rotated forward so that the VCR portion V rests in the cavity V03 with the EVF portion M01 facing outward, it is possible to view playback images and other information on the EVF portion M01.

When the monitor portion M is fold down into the cavity V03, the monitor portion M is locked by the monitor lock mechanism. Since the monitor portion M is loaded by a spring, not shown, with a resilient force in the direction in which it pops out, it pops out into the position shown in (a) of FIG. 110 when the monitor lock mechanism is released.

Since the monitor portion M is rotatable about a horizontally extending axis, it is possible to direct the EVF portion M01 forward by reversing the EVF portion M01 upside down. When the monitor portion M is rotated forward so that it rests in the cavity V03 with the EVF portion M01 facing inward as shown in (c) of FIG. 110, it is possible to protect the EVF portion M01 from scratching while, for example, the apparatus is carried around.

When the apparatus is not in use, the VCR portion V is rotated to the rear of the camera body C as shown in (d) of FIG. 110. Thus, folded down compactly, the apparatus is convenient for taking along.

In the above embodiments, the camera body C and the lens barrel C15 are constructed separately, whereas the camera body C and the flash C18 are formed into one unit. However, the present invention includes variations such as a construction in which the camera body C and the lens barrel C15 are formed into one unit, a construction in which the camera body C and the flash C18 are constructed separately, and a construction in which the camera body C, the lens barrel C15 and the flash C18 are formed into one unit.

Moreover, the electronic imaging optical system and the silver salt film imaging optical system may be constructed independently of each other. Although the image taking apparatus of these embodiments are of the SLR type, in which the silver salt imaging system and the electronic imaging system are integrated into one unit, the silver salt imaging system and the electronic imaging system may be constructed differently from each other. Moreover, the electric display device may be of a type other than a liquid crystal display. Further, the recording medium for electronic imaging means may be of a type other than a cassette tape, such as a disk.

Since an image taking apparatus of the seventh to fifteenth embodiments described above can protect the electric display device while the apparatus is not in use, it is possible to prevent the electric display device from being scratched when the apparatus is carried around.

Moreover, the apparatus is provided with a movable portion which is linked to the camera body directly or through an intermediate component, and the movable portion is fitted to the camera body or the intermediate components to be rotatable from a in-use position in which the electric display device faces toward the operator to a not-in-use position in which the electric display device faces inward with the help of the camera body or the intermediate component. Accordingly, the apparatus can be handled more conveniently because the operator does not need to care about a cover as in the case where the electric display device is supposed to be protected by means of the cover.

Further, when the apparatus is not in use, the movable portion is moved to the rear of the camera body, so that the width of the apparatus is reduced. The apparatus is therefore easy to handle when carried around.

Moreover, since the operator can hold the camera body and the movable portion with both hands during shooting, it is possible to perform stable shooting less affected by hand shakes. In addition, it is possible to reduce the size of the camera body, and to reduce limitations with regard to space in designing.

Further, since the movable portion can be moved to the side of the lens barrel by reversing and then rotating forward the movable portion, the apparatus is easy to handle when carried around.

Since shooting can be performed at an upward-directed angle, at a downward directed angle, and face-to-face, the apparatus offers a higher grade of operability.

Moreover, since the movable portion serves also as a grip, it is possible to reduce costs and manpower in production.

The following embodiments relate to systems for a handy-type camera which serves both as a still camera and as a video camera. The apparatus itself is constituted of a camera body and a main lens removably attached thereto, and is provided with a first imaging portion constructed as a silver salt film imaging system, and a second imaging portion constructed as an electronic imaging system for shooting a moving picture video, for example.

The apparatus is provided with the following shooting modes: silver salt film shooting mode for shooting a picture on a silver salt film. Video shooting mode for shooting a moving-picture video, simultaneous shooting mode for simultaneously shooting a moving-picture video and a sliver salt film picture, video playback mode for playing back images after shooting, a still video shooting mode for recording a still picture on a magnetic recording medium, edit mode for editing information recorded in shooting information recording portion on a silver salt film, and others. Selecting a mode as required, the operator performs shooting, playback, edit, and other operations. The apparatus is also equipped with a variety of grips which is detachably attached to the body in order to stably support the apparatus proper during shooting.

Figure 111:
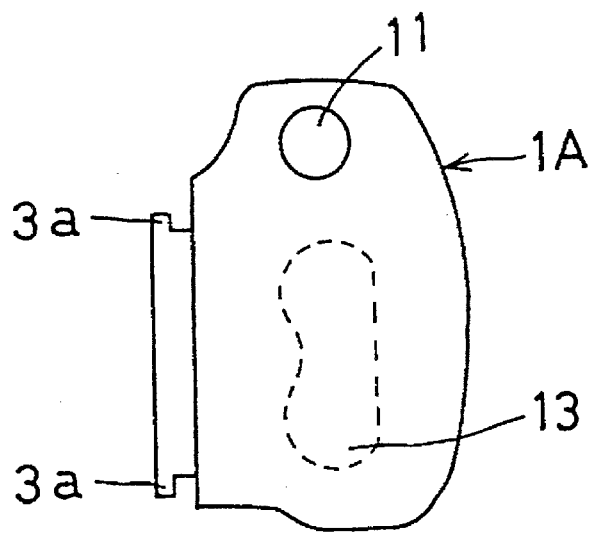
FIGS. 111 to 120 are external views of a variety of grips that form part of an image taking apparatus of the sixteenth embodiment of the present invention, specifically.

FIGS. 111 to 120 are external views of a variety of grips that form part of an image taking apparatus of an sixteenth embodiment. Grip 1A shown in FIG. 111 is a grip dedicated to silver salt film shooting and is provided only with functions related to the first imaging portion. The grip 1A is detachably mounted to one side of the body.

Figure 115:
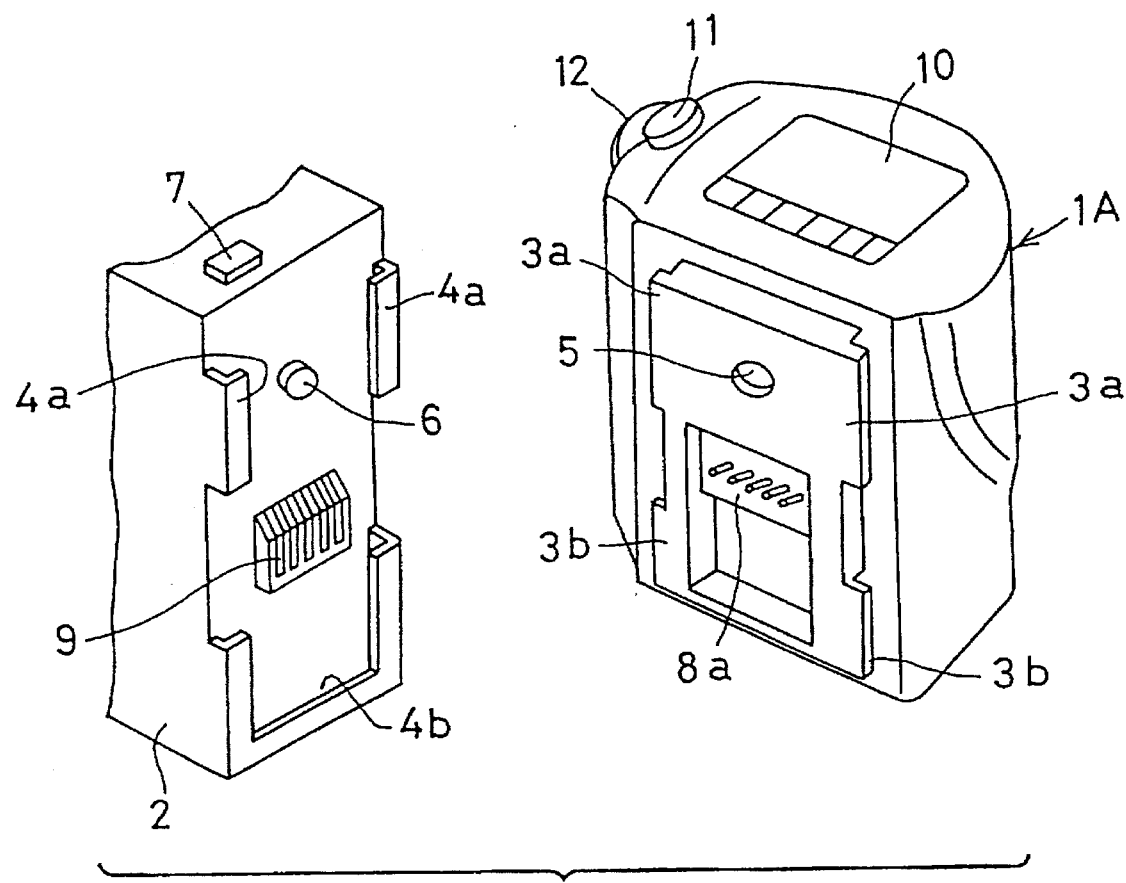

Specifically, as shown in FIG. 115, in the silver salt film shooting dedicated grip 1A, the end surface thereof for facing one side of the body 2 is formed as a vertical surface having in its four corners engagement claws 3a and 3b arranged at a predetermined distance from one another. On the other hand, in the opposite surface, that is, in one side of the body 2 are formed upper engagement claws 4a which engage with the upper engagement claws 3a of the grip, and an engagement groove 4b which engages with and stops the lower engagement claws 3b of the grip. Reference numeral 5 represents a lock hole formed in the grip. Reference numeral 6 represents a lock pin formed in the body. Reference numeral 7 represents a lock release button provided on the top of the body.

To attach the silver salt film shooting dedicated grip 1A to the body 2, the upper engagement claws 4a of the body 2 are inserted into the notches formed between the upper and lower engagement claws 3a and 3b. The surface of the grip 1A is then slid downward along the surface of the body 2, until the lower engagement claws 3b of the grip 1A engage with the engagement groove 4b of the body 2 and the upper engagement claws 3a of the grip 1A engages with the upper engagement claws 4a of the body 2. Then, the lock pin 6 is engaged with the lock hole 5 to effect locking. To detach the grip 1A from the body 2, the lock release button 7 is pressed to release engagement of the lock hole 5 and the lock pin 6, and the grip 1A is slid upward.

Reference numeral 8a represents signal terminals formed in the grip 1A. Reference numeral 9 represent signal terminals formed in the body 2. When the body-side signal terminals 9 is connected to the grip-side signal terminals 8, the apparatus determines which grip is attached, the silver salt film shooting dedicated grip 1A, or the dual-purpose grip 1B shown in FIG. 112 functioning for both the first imaging portion and the second imaging portion for video shooting. For example, the silver salt film shooting dedicated grip 1A can be so constructed that it does not adapt to modes related to video shooting by grounding unused terminals of the signal terminals 8a, and, in contrast, the dual purpose grip 1B can be so constructed that all of its signal terminals 8b adapt to video-related functions of the body 2.

The silver salt film shooting dedicated grip 1A is provided with a operation indication portion 10, a release button 11 for silver salt film shooting, an AV/TV control dial 12. The operation indication portion 10 indicates on a liquid crystal display various information on operations performed in the operation portion, such as, camera operation mode, date, shutter speed, exposure compensation, red-eye reduction, aperture and exposure compensation values, shooting mode, battery level, self-timer mark, film counter, film cartridge mark, wireless flash, winding mode, shooting scene, manual focus, and others.

The AV/TV control dial 12 varies AV/TV values in silver salt film and video shooting. When rotated with a mode button (not shown) held down, the selection dial 12 selects a shooting scene. When rotated with a program button (not shown) held down, the selection dial 12 selects an exposure mode from among A (aperture priority) mode, S (shutter speed priority) mode, and M (manual) mode. Reference numeral 13 represents a primary battery for silver salt film shooting exchangeably fitted into the grip 1A.

Figure 112:
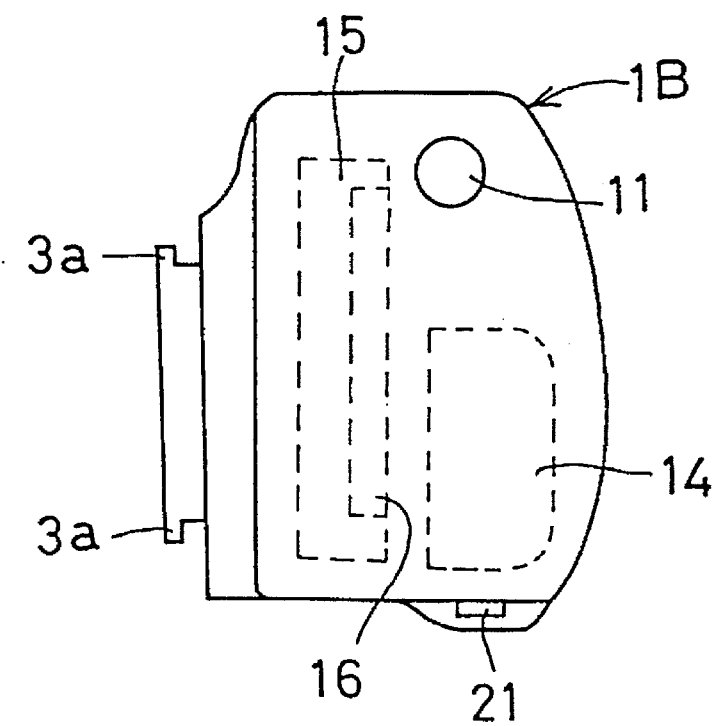

The dual-purpose grip 1B shown in FIG. 112 is provided with functions adapting to both the first imaging portion for silver salt film shooting and the second imaging portion for moving-picture video shooting as described earlier. In the dual-purpose grip 1B, a secondary battery 14 for the first and second imaging systems for supplying power to the body 2 and a main lens (not shown) is removably placed. The dual-purpose grip 1B is also provided with a video tape deck 15 serving as a recording media driving portion of the second imaging portion, and a videocassette 16 loaded therein.

In the dual-purpose grip 1B shown in FIG. 112, a magnetic tape is used as a recording medium, and the video tape deck 15 is used as a deck. However, the present invention includes embodiments in which another tape-type recording medium, a disk-type recording medium such as a magneto-optical disk, a semiconductor memory (RAM) or other is employed as a recording medium, and in which a deck corresponding to the recording medium used is employed.

Figure 113:
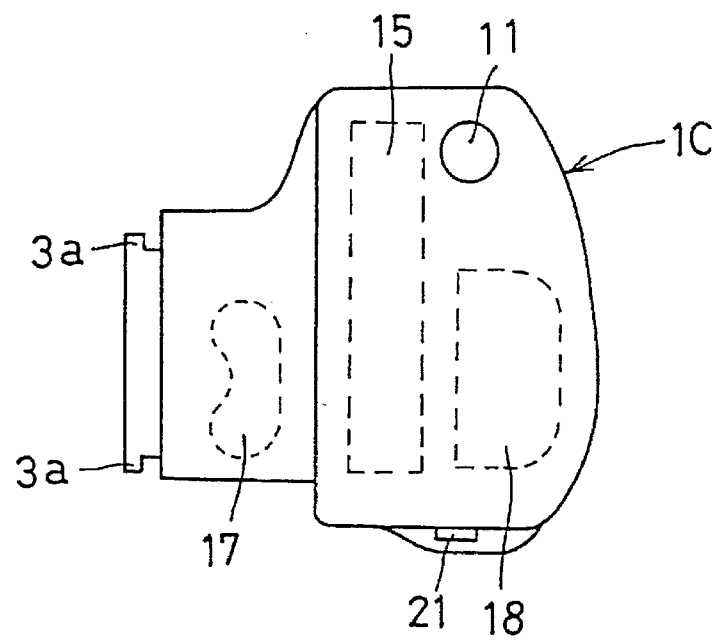

FIG. 113 shows another example of the dual-purpose grip. This dual-purpose grip 1C is provided with two separate power sources: a primary battery 17 for silver salt film shooting, and a secondary battery 18 for moving-picture video shooting. Here, power sources are separated with the intention that silver salt film shooting, which requires a comparatively small power capacity, be powered by the primary battery, and moving-picture video shooting, which requires a large power capacity, be powered by the secondary battery.

Figure 114:
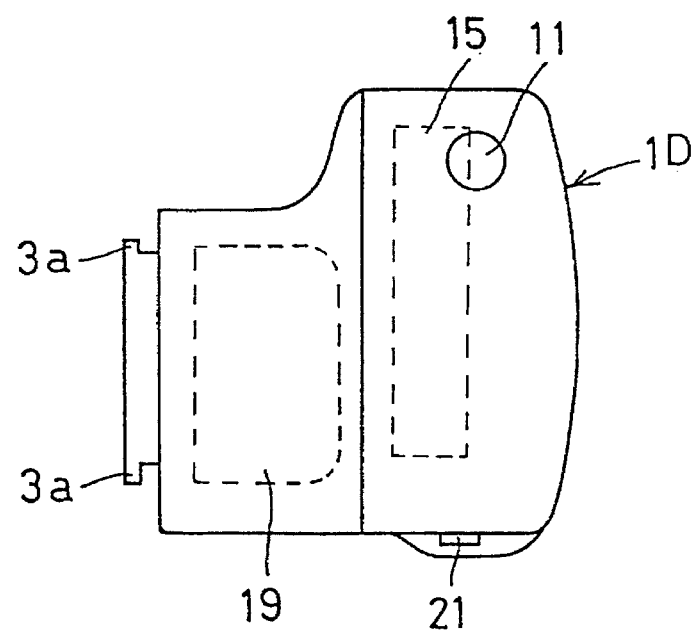
Figure 116:
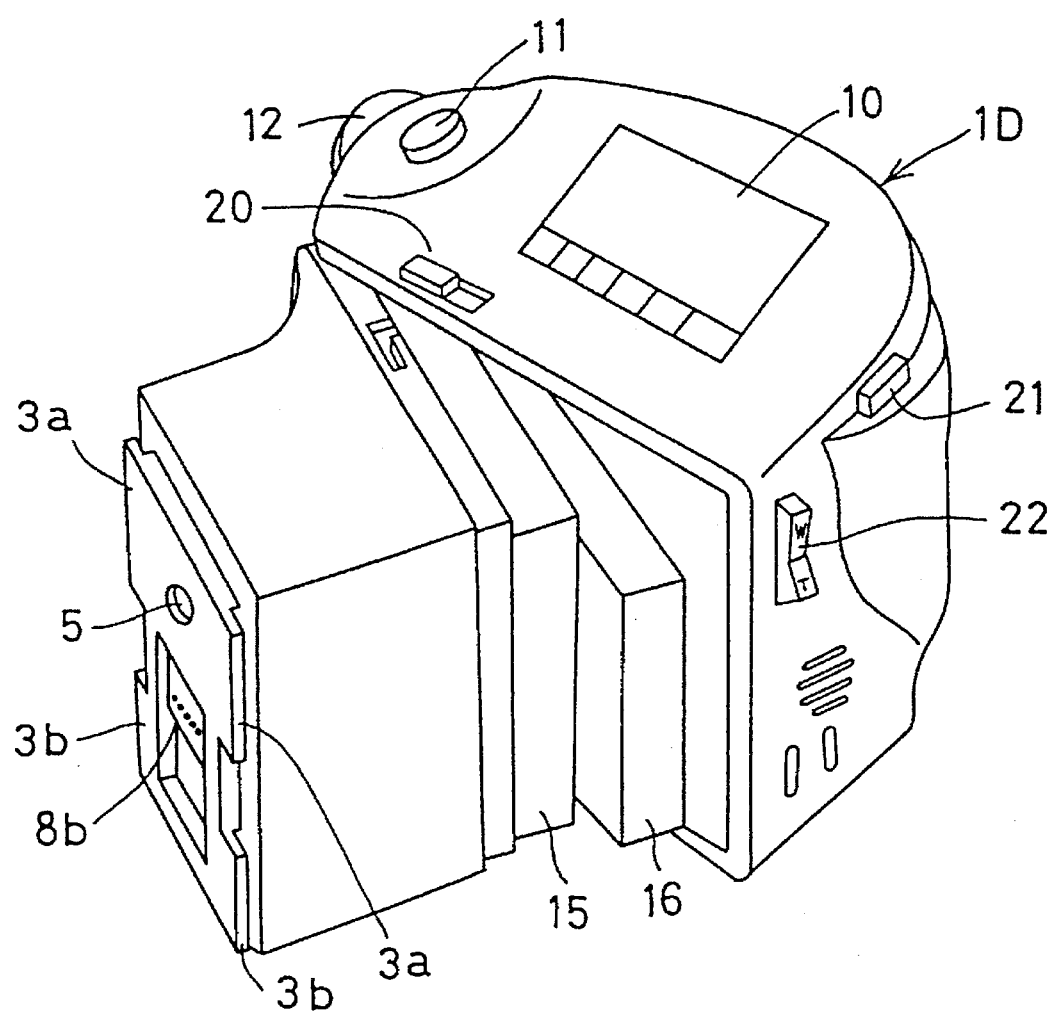

FIGS. 114 and 116 show still another example of the dual-purpose grip. This dual-purpose grip 1D is provided with a large-capacity secondary battery that is used both in moving-picture video shooting and in silver salt film shooting. A dual-purpose grip 1D of this type is designed especially to cope with a long-duration shooting of a moving-picture video.

As shown in FIG. 116, the dual purpose grip 1D is so constructed that the other side thereof, which is opposite to the body-facing side thereof, can be freely opened and closed to allow loading and unloading of a video cassette 16. When the deck open button 20 is operated, the dual-purpose grip 1D is opened so that a video cassette 2 can be loaded and unloaded.

In FIG. 116, reference numeral 21 represents a recording ON/OFF button for controlling starting and stopping of recording on the video cassette 2 in simultaneous shooting mode (PM) and video shooting mode (MV). In silver salt film shooting mode (PH) and still video shooting mode (SV), when an operation button (not shown) is pressed with this button 20 held down, an image captured with the aperture completely open is displayed in the EVF (electronic viewfinder) portion. In M (manual) mode, when the selection dial 12 is operated with this button 20 held down, it is possible to vary the values of AV and TV.

Reference numeral 22 represents a zoom lever for controlling the focal length of the main lens. It is to be noted that each portion shown in FIG. 116 is similarly provided in the other dual-purpose grips 1B and 1C shown in FIGS. 112 and 113. In these dual-purpose grips 1A to 1D, the construction for attaching them to the body 2 and the construction for electric connection are the same as those in the silver salt film shooting dedicated grip 1A.

Figure 117:
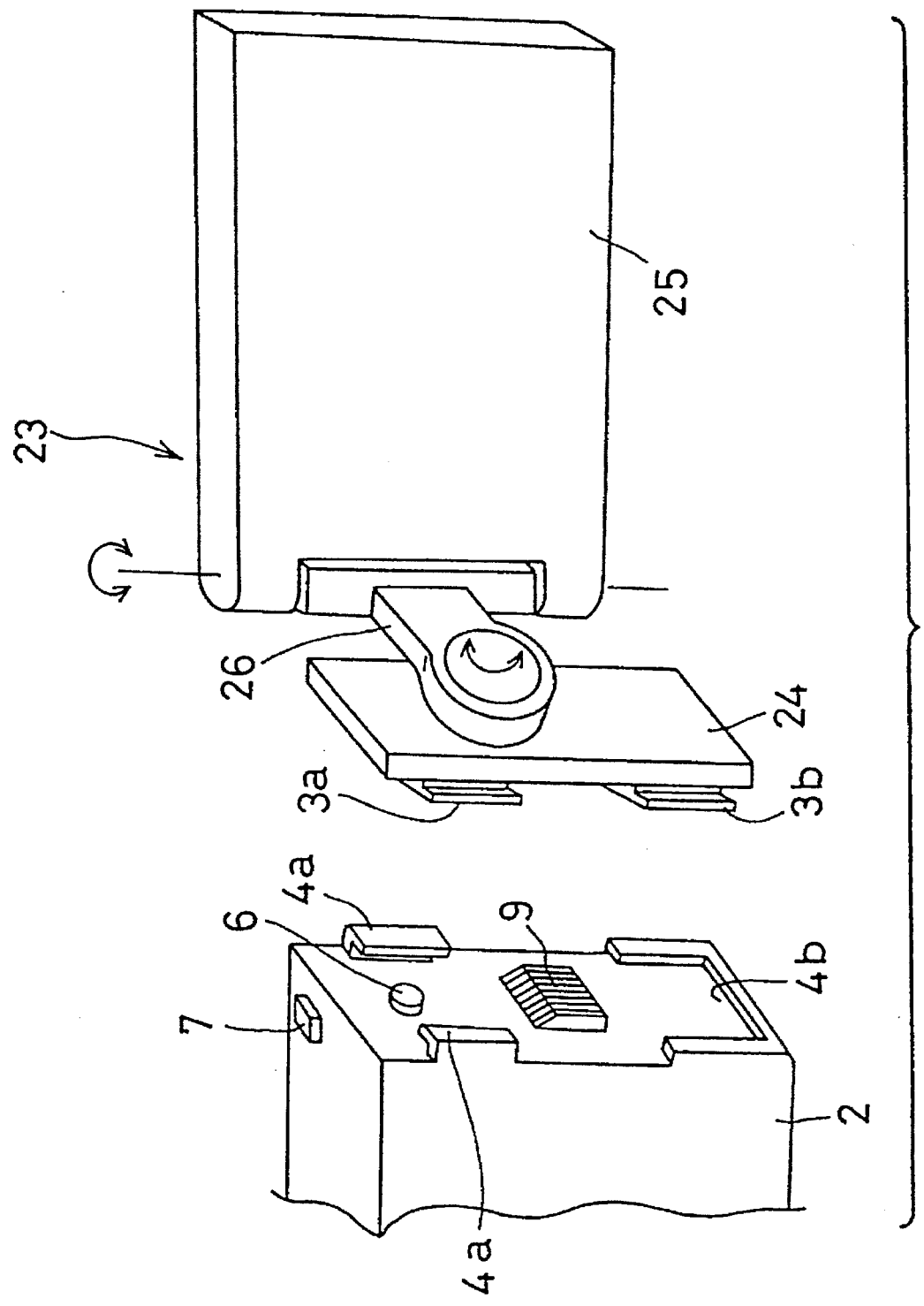

As shown in FIG. 117, it is also possible to provide an accessory attachment portion, similar to the grip attachment portion having engagement claws 4a and engagement groove 4b, on the other side of the body 2 in order to attach a detachable EVF accessory 23 onto the accessory attachment portion. The EVF accessory 23 comprises an attachment plate 24 having engagement claws 3a and 3b, an EVF portion 25, and a joint 26 that links the former two. The EVF portion 25 is constructed to be rotatable both vertically and horizontally by means of the joint 26.

Figure 118:
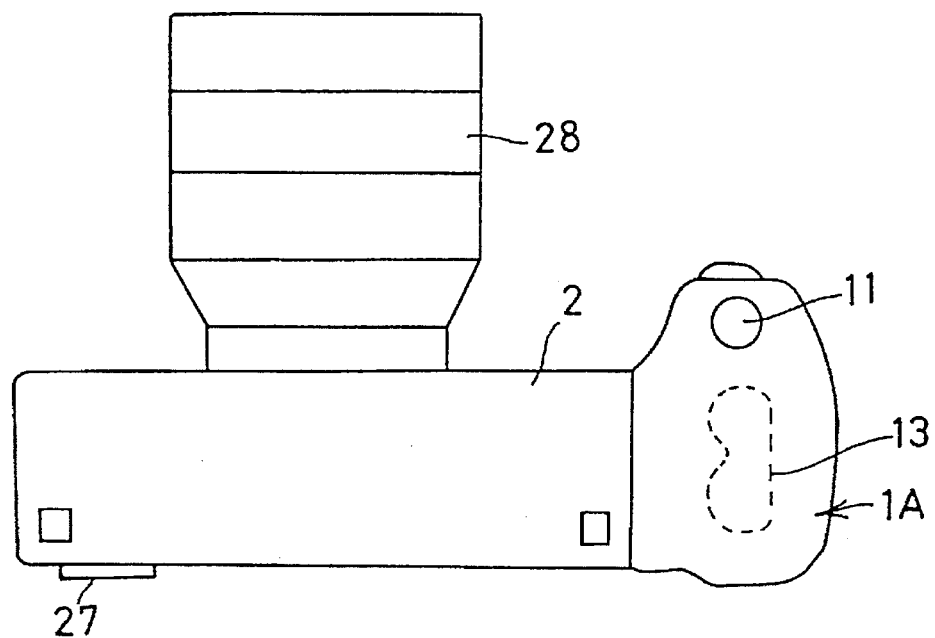

FIG. 118 shows the state of the image taking apparatus in use as a camera for silver salt film shooting. In this case, the silver salt film shooting grip 1A is attached to the apparatus, and shooting is performed by use of an optical viewfinder 27 provided in a corner of the rear surface of the body 2, just as with an ordinary SLR (single-lens reflex) camera. Reference numeral 28 represents the main lens. In this state, since the grip 1A is attached to the body 2, connection between the signal terminals 8a and 9 disables some functions of the body 2, more specifically, the functions related to moving-picture video shooting are disabled. Therefore, only silver salt film shooting mode is selectable.

Figure 119:
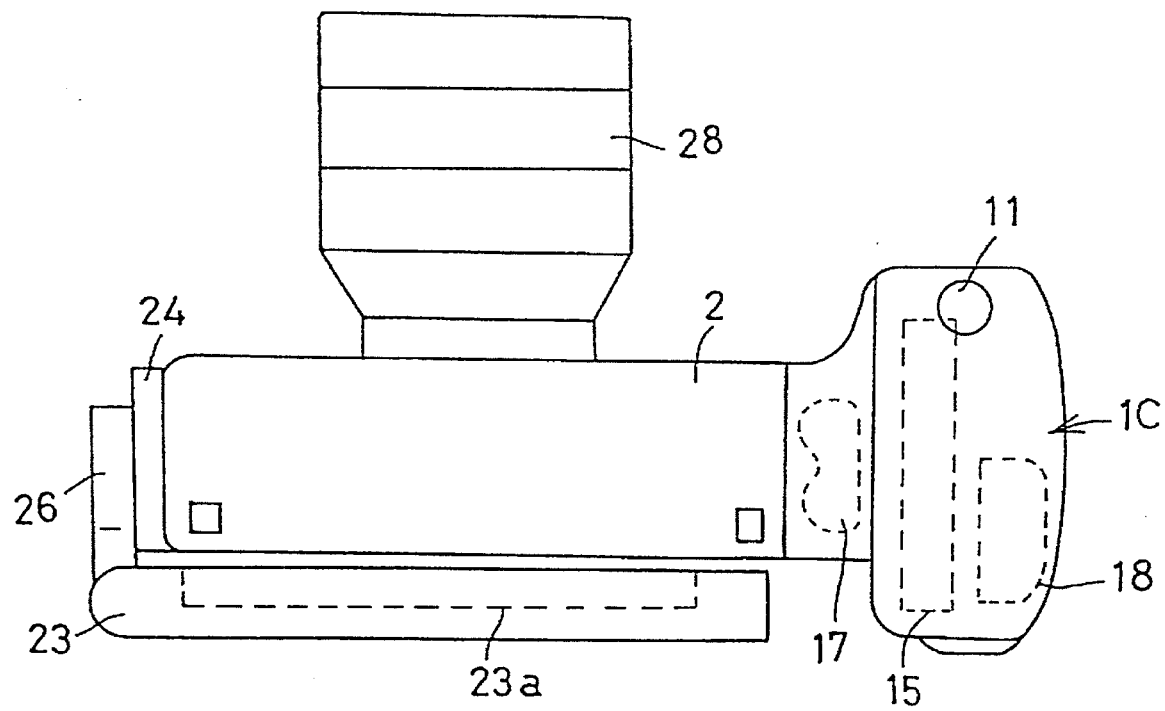
Figure 120:
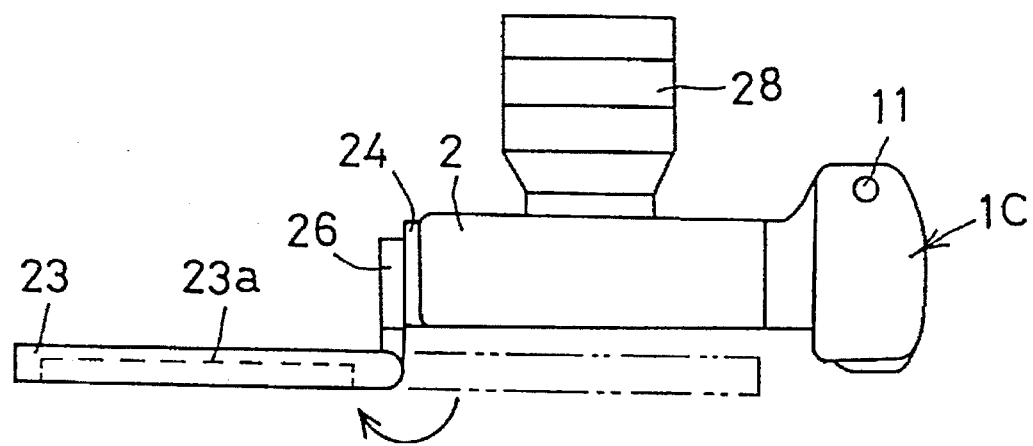

FIG. 119 shows the state of the image taking apparatus in use as a camera for moving-picture video shooting. In this case, the dual-purpose grip 1C and the EVF accessory 23 are attached to the apparatus, for example. When the apparatus is not in use, the EVF accessory 23 is folded down onto the back of the body 2, as shown in FIG. 119, so that the display screen of the EVF portion 23a on the front of the EVF accessory is protected by the body, and so that the apparatus can be carried around more conveniently. When the apparatus is in use, the EVF portion 23a can be fixed at a position convenient for shooting by rotating the EVF accessory 23 about the joint 26, as shown in FIG. 120.

In this state, since the grip 1C is attached to the body 2, connection between the signal terminals 8b and 9 enables all functions of the body 2 for both moving-picture shooting and silver salt film shooting. Therefore, any of video shooting mode, still video shooting mode, silver salt film shooting mode is selectable.

Figure 121:
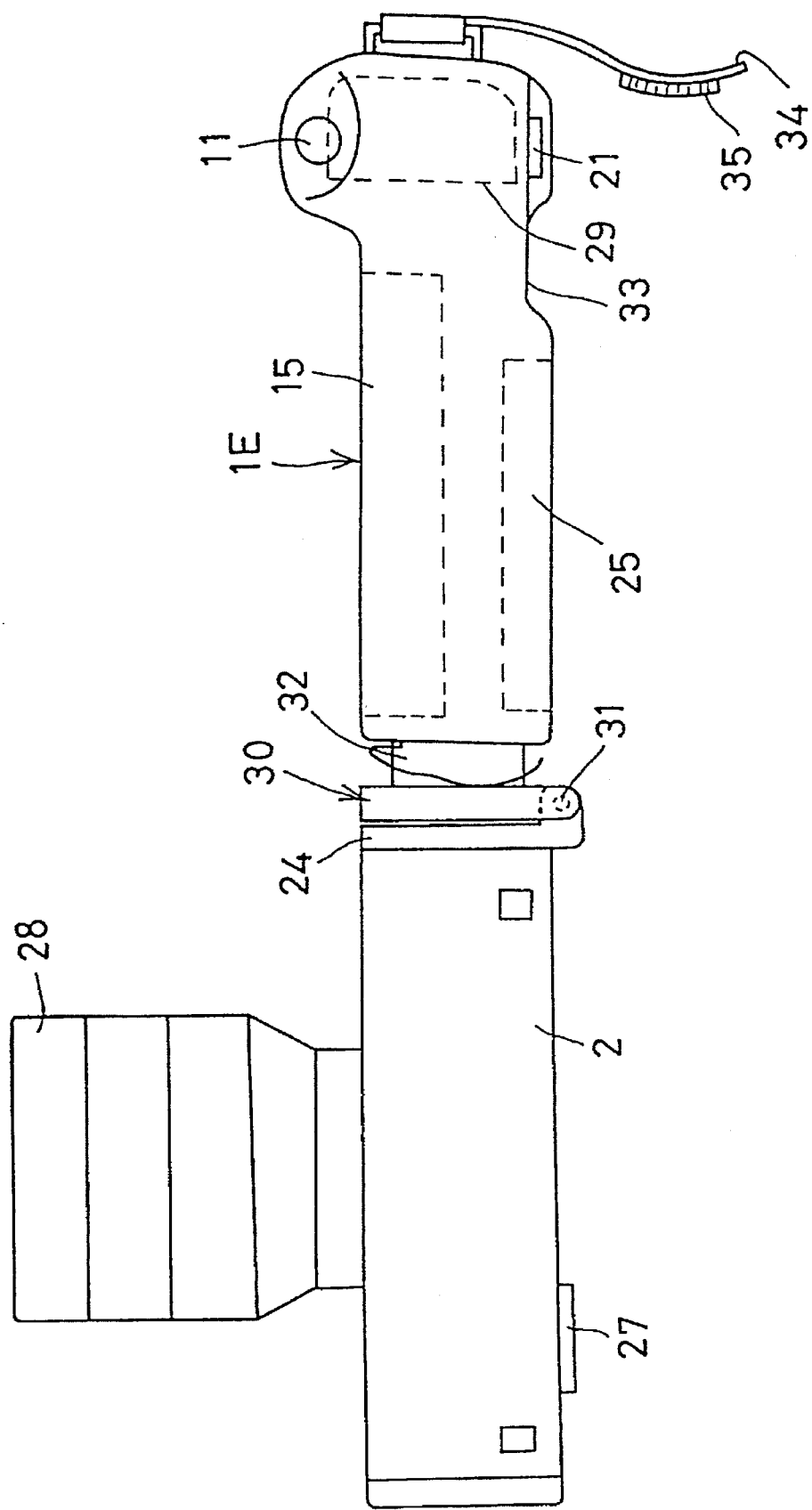
FIGS. 121 to 124 are external views of a grip accessory for moving-picture video shooting for an image taking apparatus of the sixteenth embodiment of the present invention.
Figure 122:
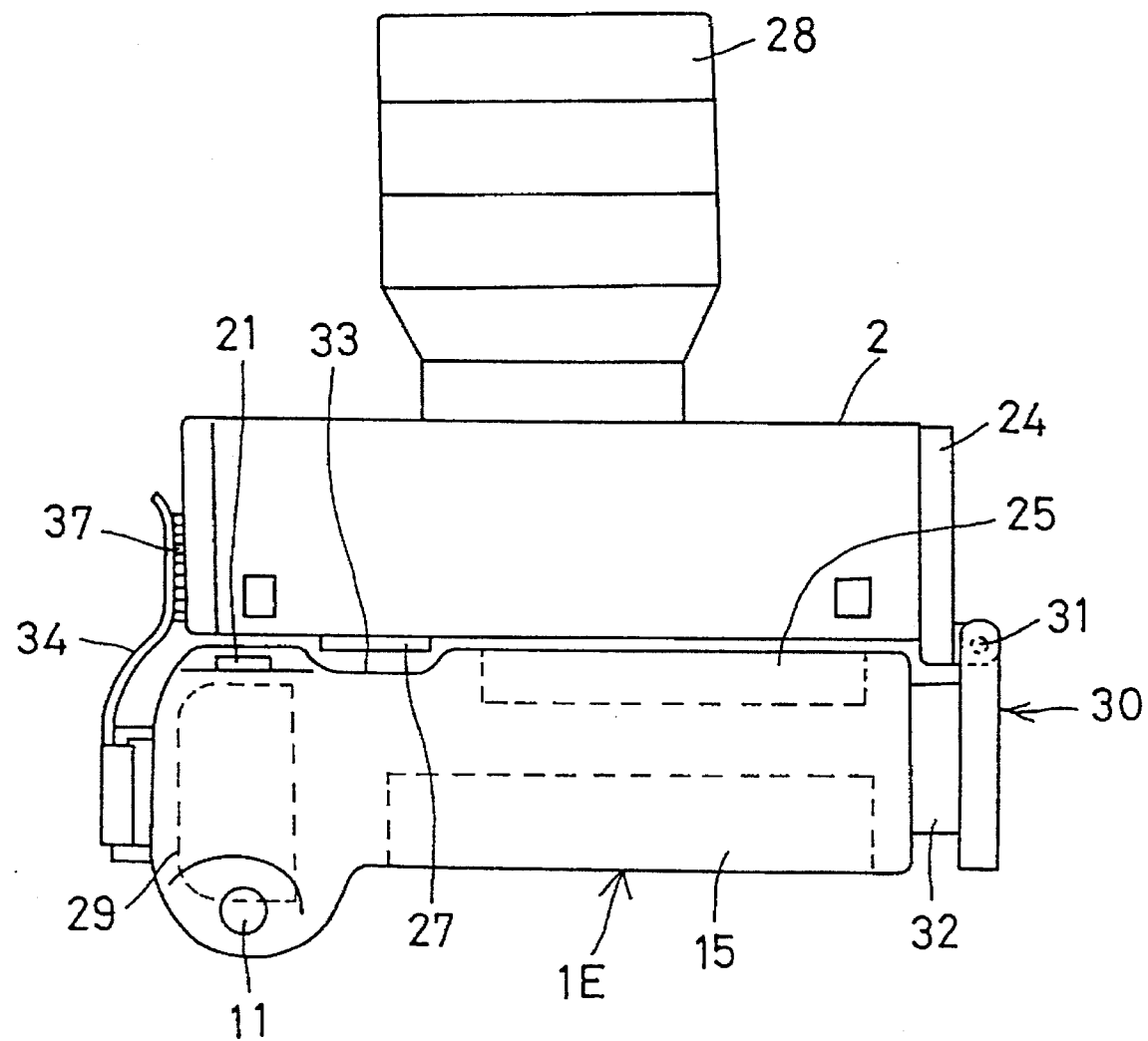

FIGS. 121 to 124 show a grip accessory for moving-picture video shooting. In this grip accessory, a detachable grip 1E is equipped with an EVF portion 25 serving as an electric display device for monitoring purposes, a secondary battery 29 serving as a driving power source, and a video tape deck 15. In this grip 1E, as shown in FIG. 122, since a joint 30 is linked to an attachment plate 24 with a hinge axle 31, the grip 1E can be rotated about the hinge axle 31 so that the grip 1E is folded down onto the rear of the body 2, and the whole grip 1E can be rotated about a rotary axle 32 so that the EVF portion 25 is fixed at a desired angle in shooting at an upward-directed or downward-directed angle.

Moreover, the width of the grip 1E is designed to be approximately the same as the width of the body 2. As shown in FIG. 121, where the grip 1E is unfolded, the display screen of the EVF portion 25 on the rear of the grip 1E is coplanar with the surface of the grip portion, and accordingly, there are no backward projections on the rear of the grip 1E. In order to prevent interference between the grip 1E and the optical viewfinder 27 projecting from the back of the body 2 when the grip 1E is folded down, a cavity 33 is formed in the area that is opposite to the optical viewfinder 27 when the grip 1E is folded down.

Figure 123:
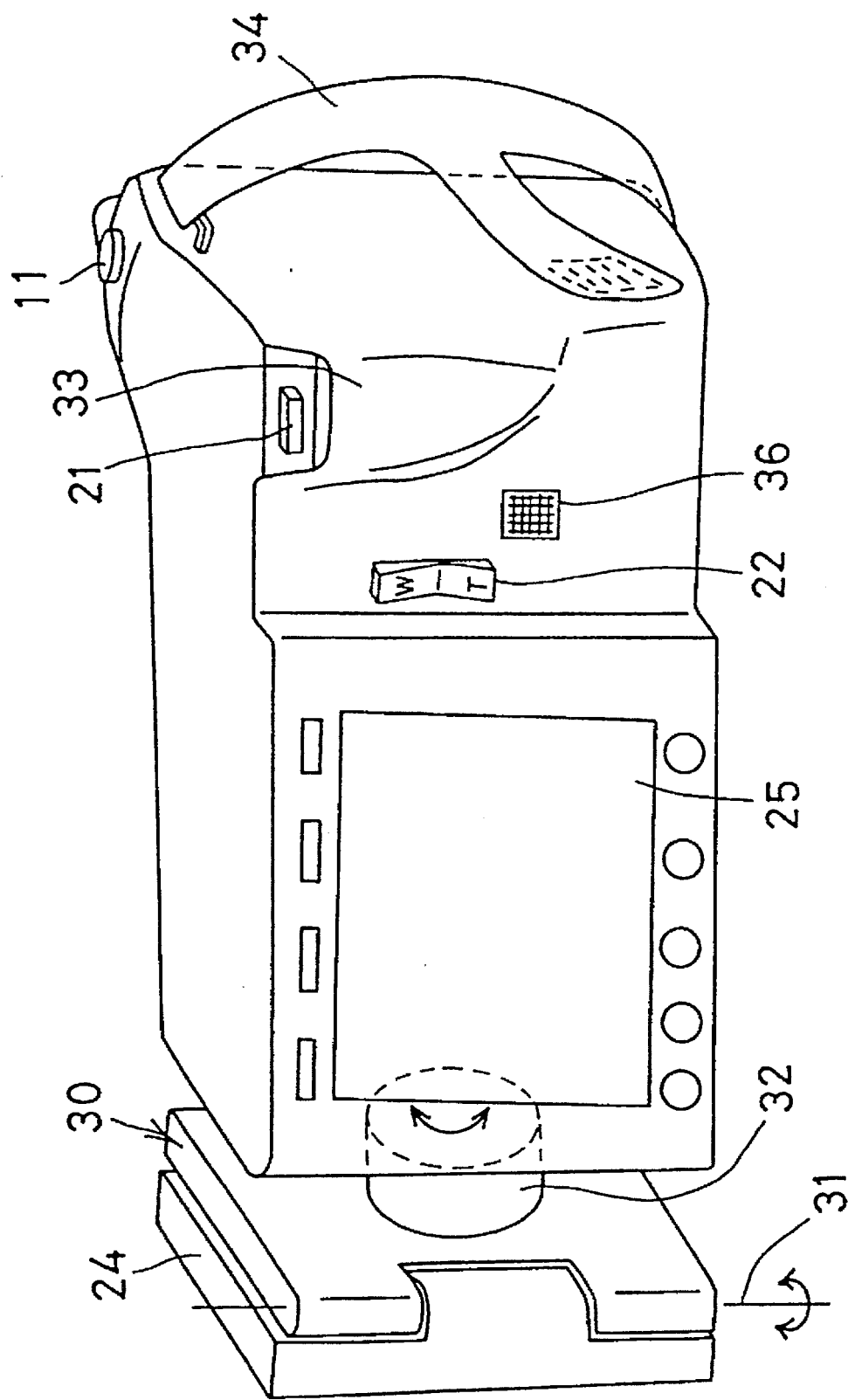
Figure 124:
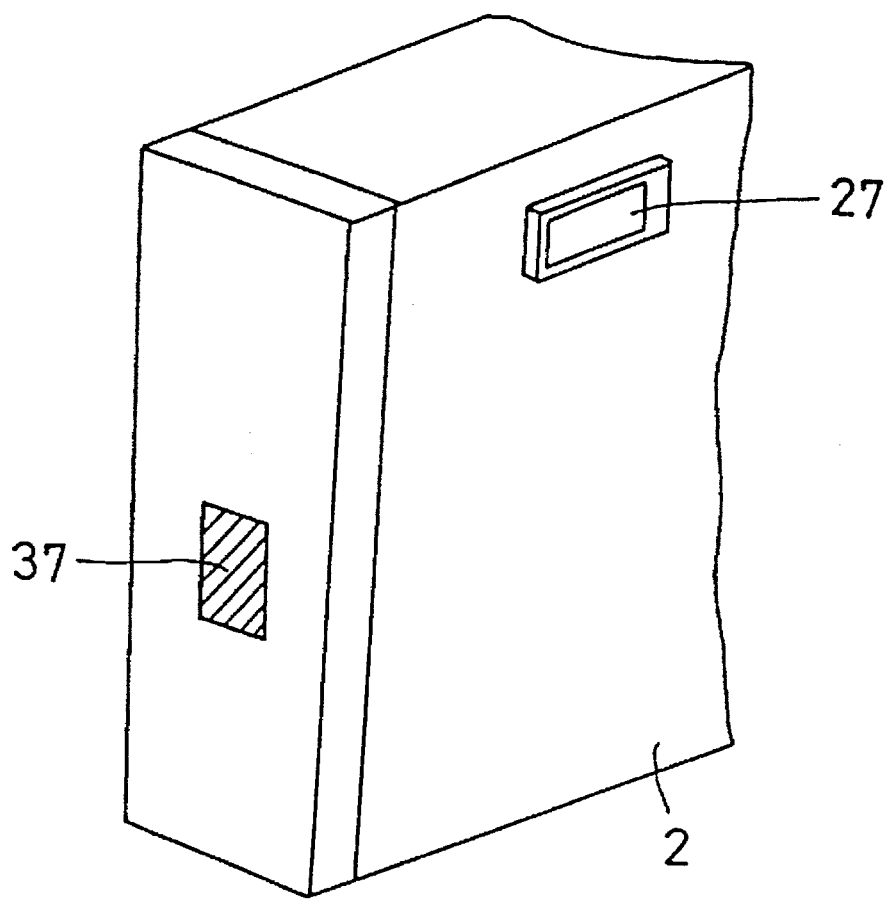

Further, as shown in FIG. 123, on the side of the grip portion of the grip 1E is provided a T-shaped holding strap 34. The holding strap 34 has a fastening cloth fastener of either L- or T-type at its T-shaped end. When the grip is unfolded, the holding strap 34 is fastened to a fastening cloth fastener 36 of the other type, L- or T-type, glued to the grip. When the grip is folded down, the holding strap 34 is fastened to a fastening cloth fastener of the other type, L- or T- type, glued on the side of the body 2 as shown in FIG. 124.

When in use, the grip accessory for moving-picture video shooting as described above is attached to the body 2 with an attachment plate 24 similar to that shown in FIG. 117, and is unfolded as shown in FIG. 121. When not in use, the grip accessory is folded down onto the back of the body 2 as shown in FIG. 122 for better portability when only silver salt film shooting is performed, the grip accessory for moving-picture video shooting is replaced with the silver salt film shooting dedicated grip shown in FIG. 111.

FIGS. 125 to 131 show a seventeenth embodiment of the present invention. In an image taking apparatus shown in these figures, a horizontal-position grip portion 1F is integrated into the body 2, and a vertical-position grip 1G is detachably attached to the apparatus by use of a tripod hole 48 provided on the bottom of the body. The vertical-position grip 1G serves also as an attachment base, and a video tape deck portion 15a is linked to the rear end of the vertical-position grip 1G through a rotary axle 38. In addition, an EVF portion 25 is linked to the end of the video tape deck portion 15a through a hinge axle 39. As a whole, the apparatus can be folded and unfolded in a zigzag.

Figure 125:
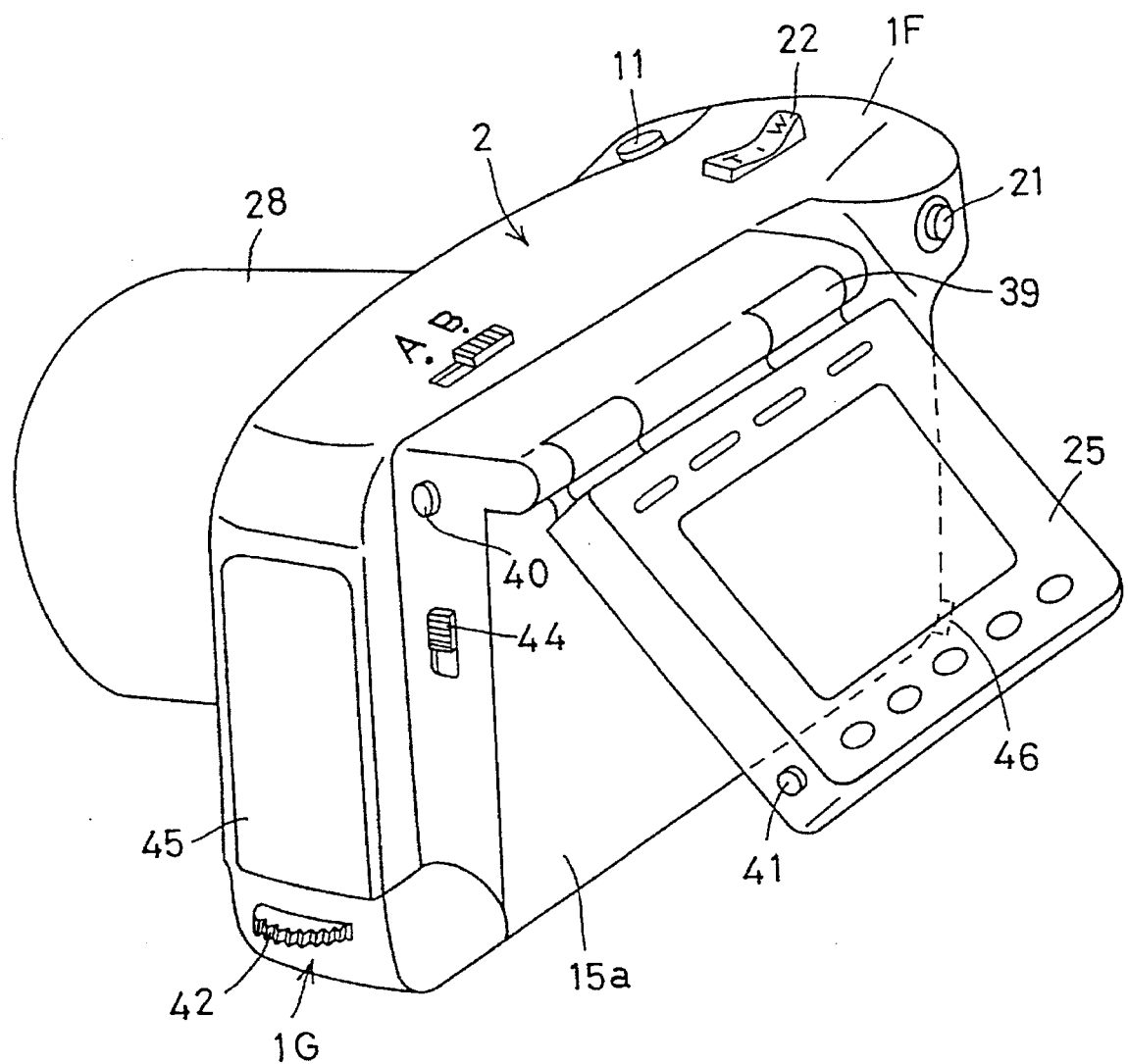
FIG. 125 is a perspective view of an image taking apparatus of the seventeenth embodiment of the present invention.

In FIG. 125, reference numeral 40 represents a deck unlock button. By pressing the deck unlock button 40, the video tape deck portion 15a which is locked in a folded state on the back of the body can be unlocked and unfolded into a desired unfolded position. Reference numeral 41 represents an unlock button for the EVF portion 25 for monitoring purposes. By pressing the unlock button 41, the EVF portion 25 which is locked in a folded state on the back of the video tape deck portion 15a can be unlocked and unfolded into a desired unfolded position. Reference numeral 42 represents a knob for rotating a screw 43, which is screwed into a tripod hole of the body. The knob 42 is engaged with a gear 43a of the screw 43, and the knob 42 is operated when the vertical-position grip 1G as a whole is attached into or detached out of the tripod hole 48.

Reference numeral 44 represents a button for taking out a videocassette. This button 44 is operated when a videocassette 16 is loaded into or unloaded from the video tape deck portion 15a. Reference numeral 45 represents a lid for taking out a film cartridge. This lid 45 is opened and closed when a silver salt film is loaded or unloaded. Moreover, a release button 46 is provided at the bottom of one side of the vertical-position grip 1G. This release button is used in silver salt film shooting in a vertical position.

Figure 127:
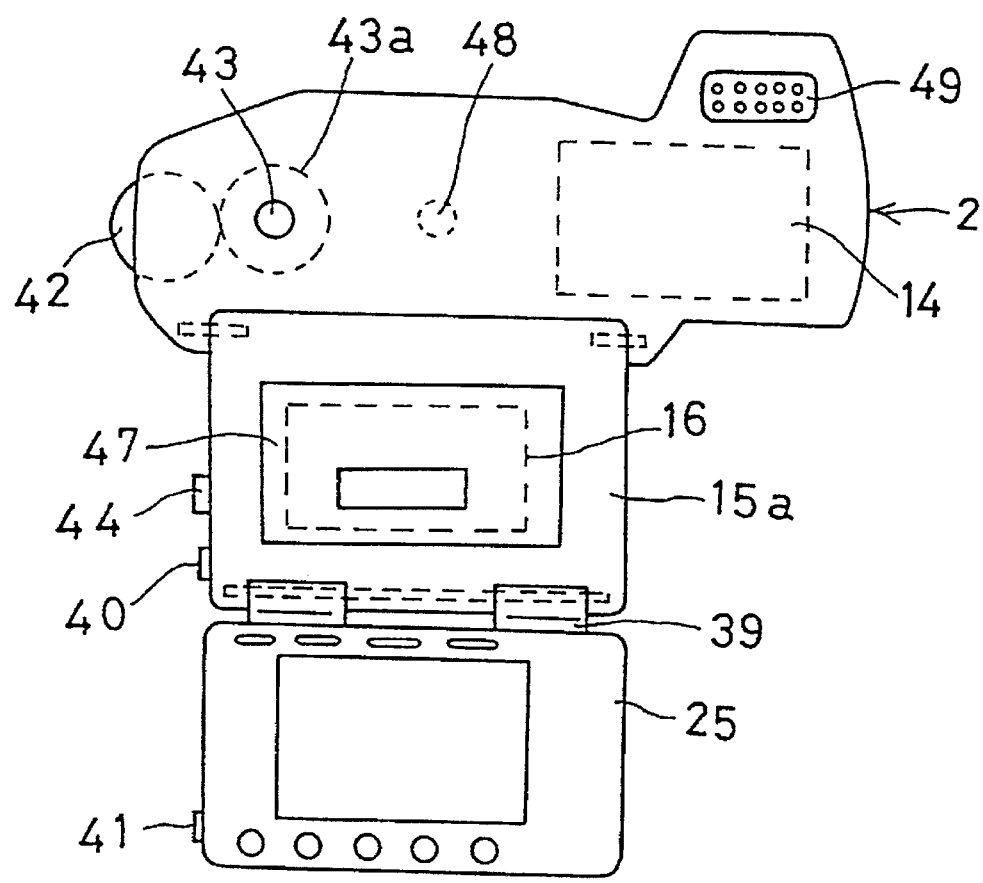
FIG. 127 is a bottom view of an image taking apparatus of the seventeenth embodiment.
Figure 128:
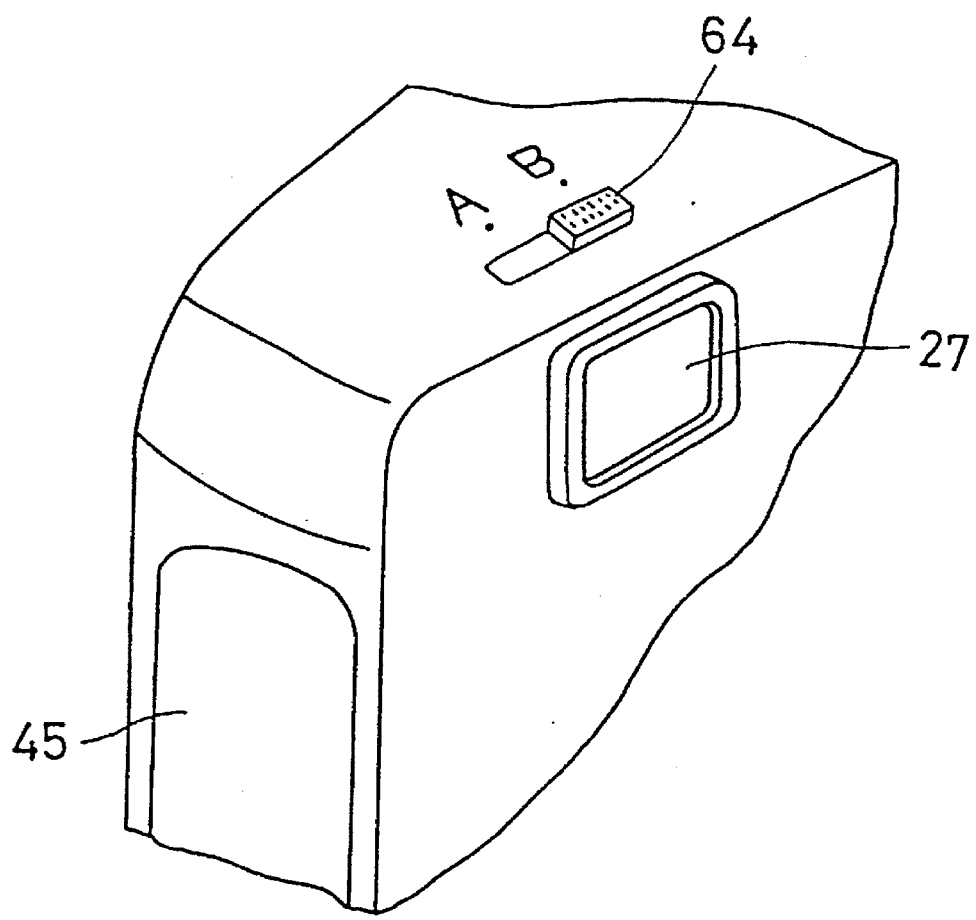
FIG. 128 is a detail view around the viewfinder switching lever of the seventeenth embodiment.

In FIG. 127, reference numeral 47 represents a videocassette lid, reference numeral 48 represents the tripod hole formed as a threaded hole, and reference numeral 49 represents a connector serving as an external output port provided in the vertical-position grip 1G.

Figure 126:
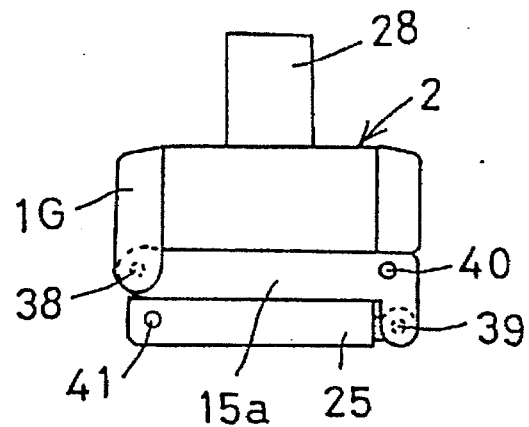
FIG. 126 is side views of an image taking apparatus of the seventeenth embodiment in various states.
Figure 126:
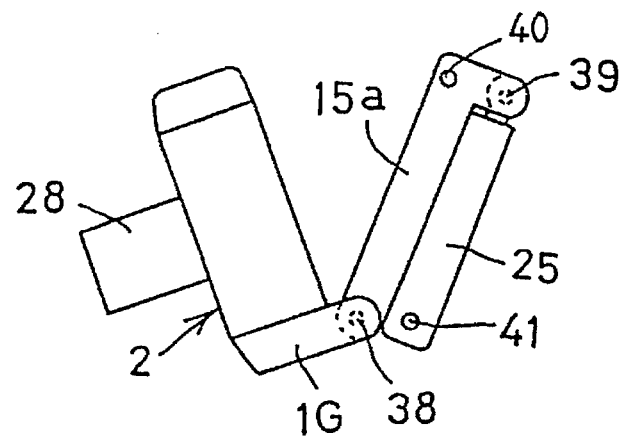
Figure 126:
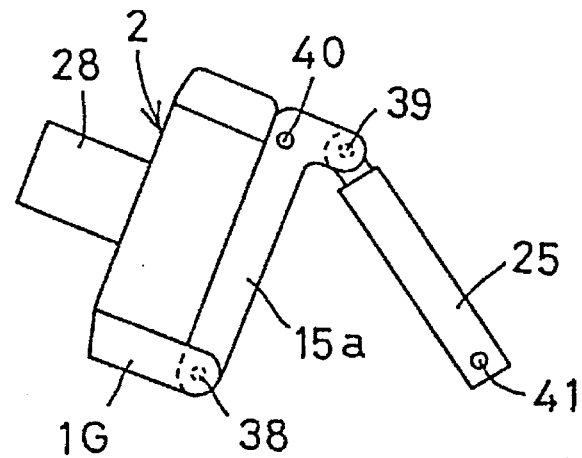

When the vertical-position grip 1G constructed as described above is attached, the image taking apparatus can cope with shooting at various angles from a high angle to a low angle by changing as desired the position of the video tape deck portion 15a and the EVF portion 25 as shown in FIG. 126. More specifically, (A) of FIG. 126 shows a state for shooting with a straight view in which the video tape deck portion 15a and the EVF portion 25 are folded down, (B) of FIG. 126 shows a state for high-angle shooting in which the video tape deck portion 15a is unfolded, and (C) of FIG. 125 shows a state for low-angle shooting in which the EVF portion 25 is unfolded.

Figure 129:
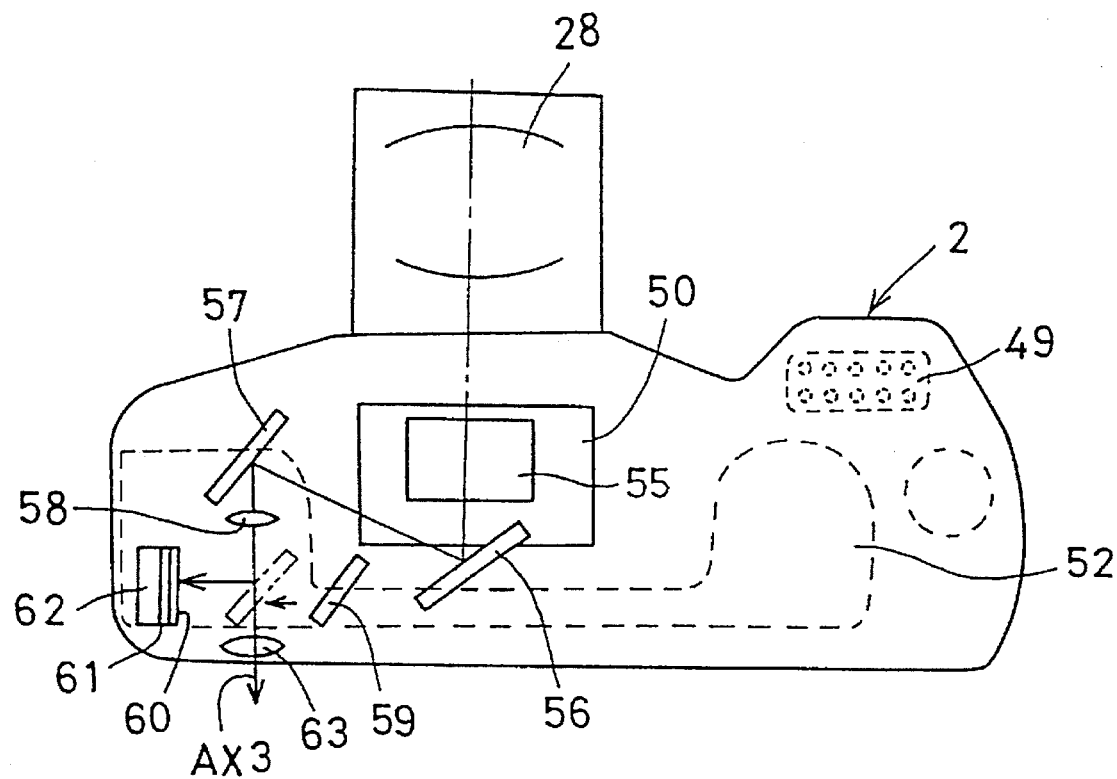
FIGS. 129 and 130 are schematic diagrams showing the construction of the optical system of the seventeenth embodiment.
Figure 130:
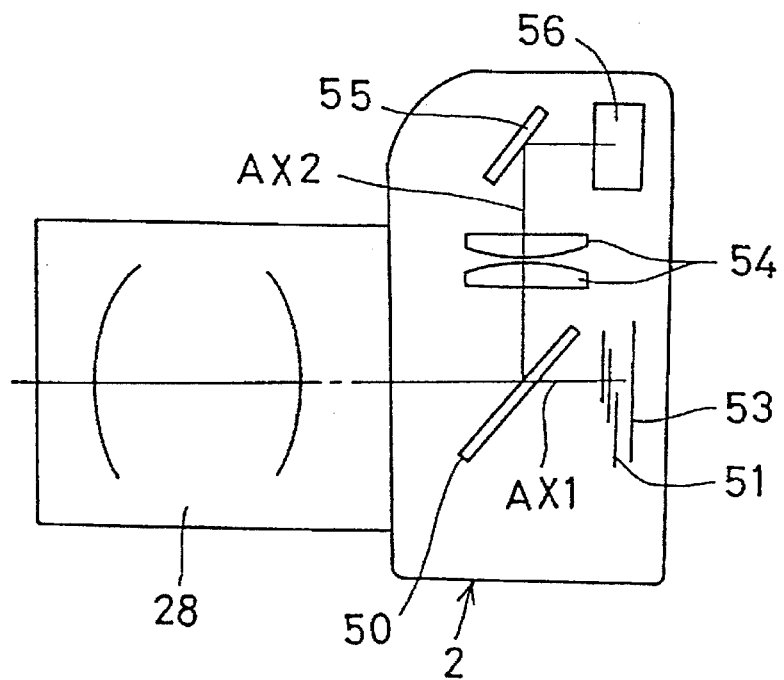

FIGS. 129 and 130 are schematic diagrams showing the construction of the optical system. As shown in these figures, the image taking apparatus comprises the body 2, and a main lens 28 which composes a main optical system. The main lens 28 is removably mounted on a mount on the front of the body 2. The light coming from the subject passes through the main lens 28, is subjected to light amount control by the main lens aperture diaphragm (not shown) arranged in the main lens 28, and is then divided by the pellicle mirror 50 serving as a light divider into a first light path AX1 and a second light path AX2.

The first light path AX1, which travels along the optical axis AX of the main lens 28 even after passing through the pellicle mirror 50, passes through the shutter 51, and then reaches a silver salt film 53 loaded in a film compartment 52. The second light path AX2, which separates from the first light path AX1 in the pellicle mirror 50, is refracted upward in a direction substantially perpendicular to the first light path AX1, travels from the pellicle mirror 50 to a condenser lens 54, is refracted on a horizontal plane by three reflection mirrors 55 to 57, passes through a relay optical system (relay lens) 58, is refracted by a mirror 59, passes through an infrared cut filter 60 and an optical low-pass filter 61, and then reaches a CCD image sensor 62 serving as an image pickup device.

The mirror 59 is constructed to be movable horizontally by operation of a viewfinder switching lever 64. More specifically, when the viewfinder switching lever 64 is in the position B shown in FIG. 128, the mirror 59 shown in FIG. 129 is in the position X, that is, the mirror 59 is retracted from a viewfinder light path AX3. Thus, by looking into an optical viewfinder 27, the operator can view a captured image through an eyepiece 63. When the viewfinder switching lever 64 is in the position A shown in FIG. 128, the mirror 59 is in the position Y, that is, the mirror 59 is placed in the viewfinder optical path AX3 to direct the light from the subject to the CCD image sensor 62.

Figure 131:
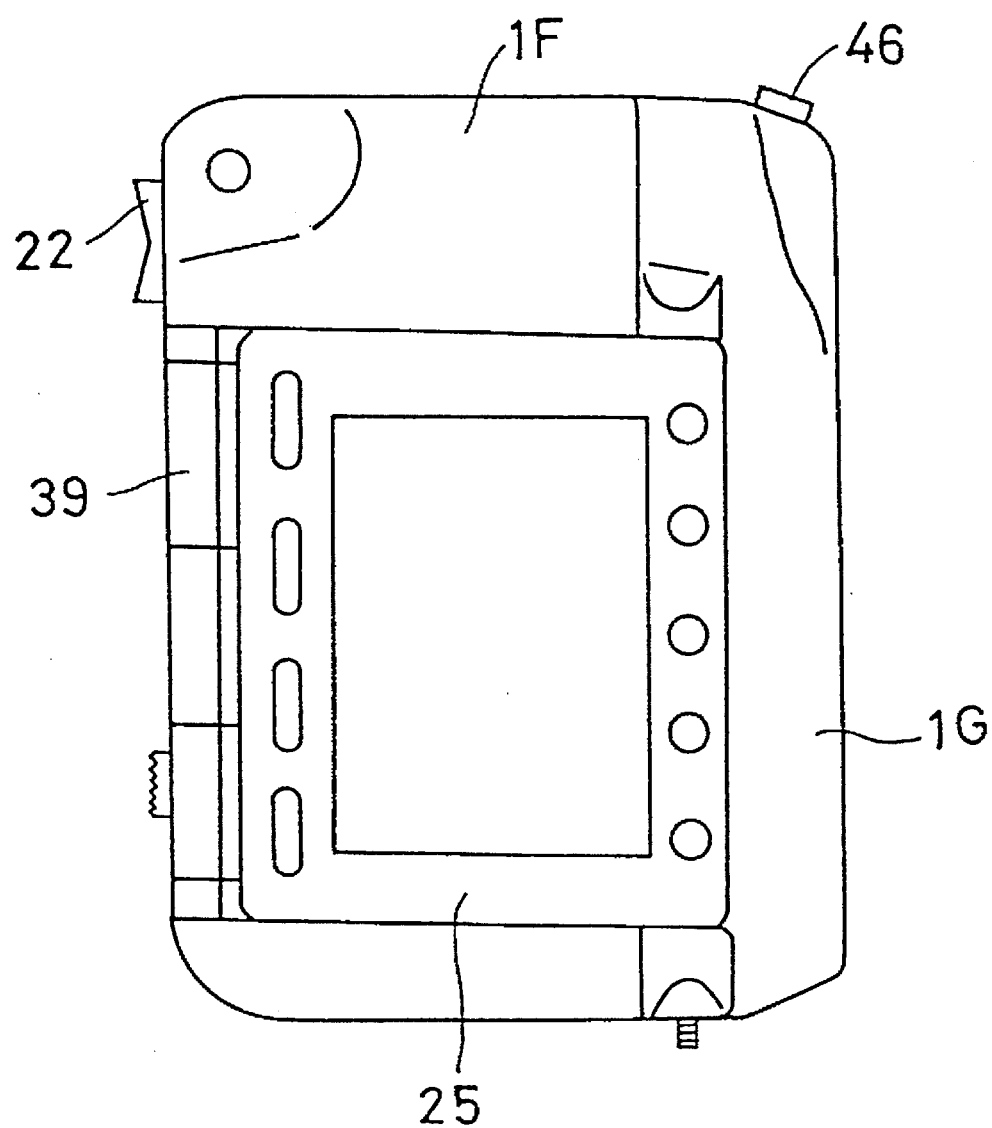
FIG. 131 is a rear view of an image taking apparatus of the seventeenth embodiment in the state for vertical-position shooting.

FIG. 131 shows the state of the apparatus in vertical-position shooting. In this case, it is possible to perform silver salt film shooting easily using the release button 46 for silver salt film shooting provided in the vertical-position grip 1G.

Figure 132:
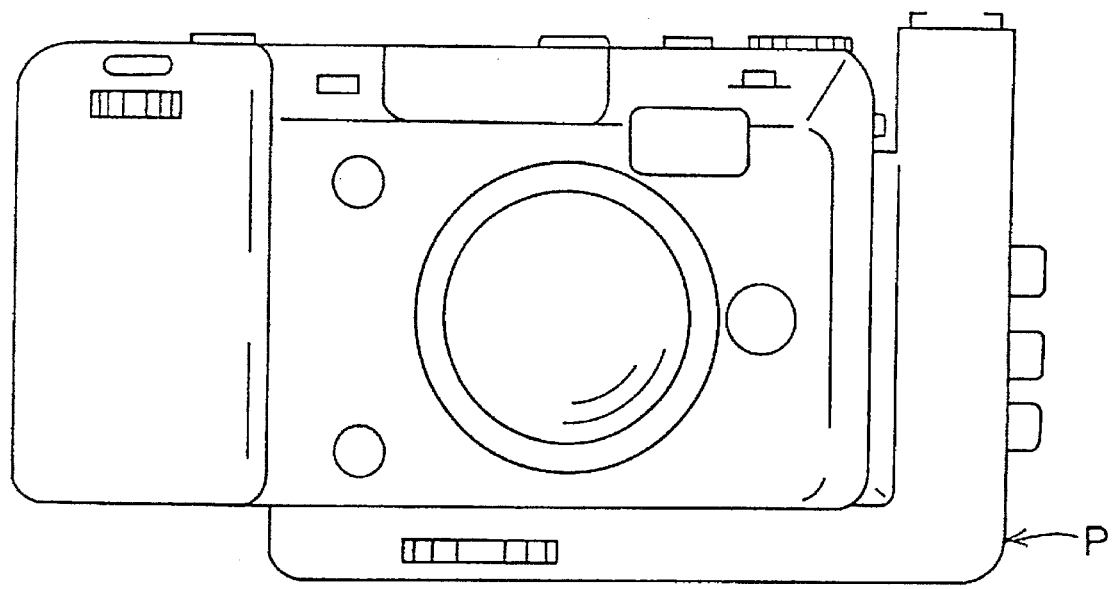
FIGS. 132 and 133 are front and side views of an image taking apparatus of the seventeenth embodiment with an expansion pack for moving-picture shooting mounted.
Figure 133:
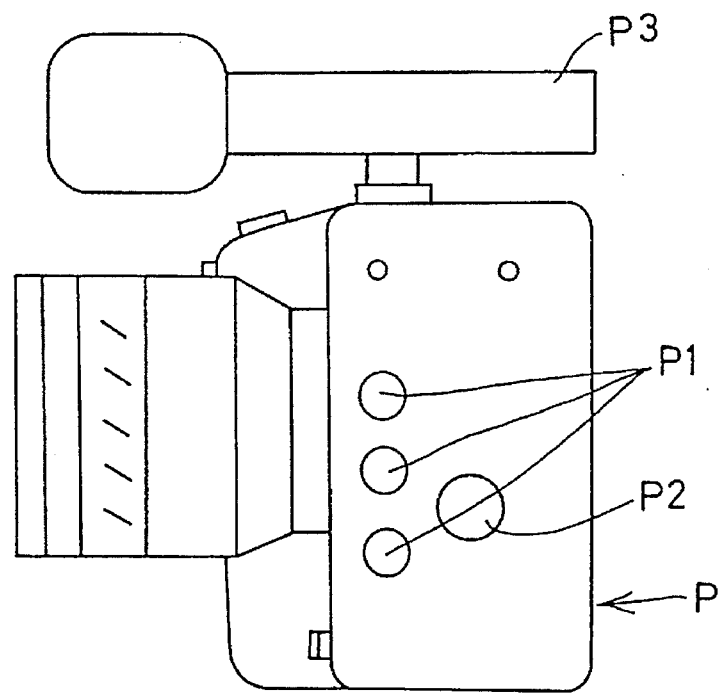

Moreover, as shown in FIGS. 132 and 133, an expansion pack P for moving-picture shooting, which is formed in an L shape to serve also as a vertical-position grip, can be attached to the apparatus. This expansion pack P is detachably attached to the bottom of the body 2 by use of the tripod hole 48, and, when attached, the expansion pack P offers extensions to moving-picture video shooting capabilities through contacts between the connector of the body and a connector of the expansion pack P. P1 represents audio/video input terminals, P2 represents an S (separate) terminal, and P3 is a microphone constructed as a separate part.

Figure 134:
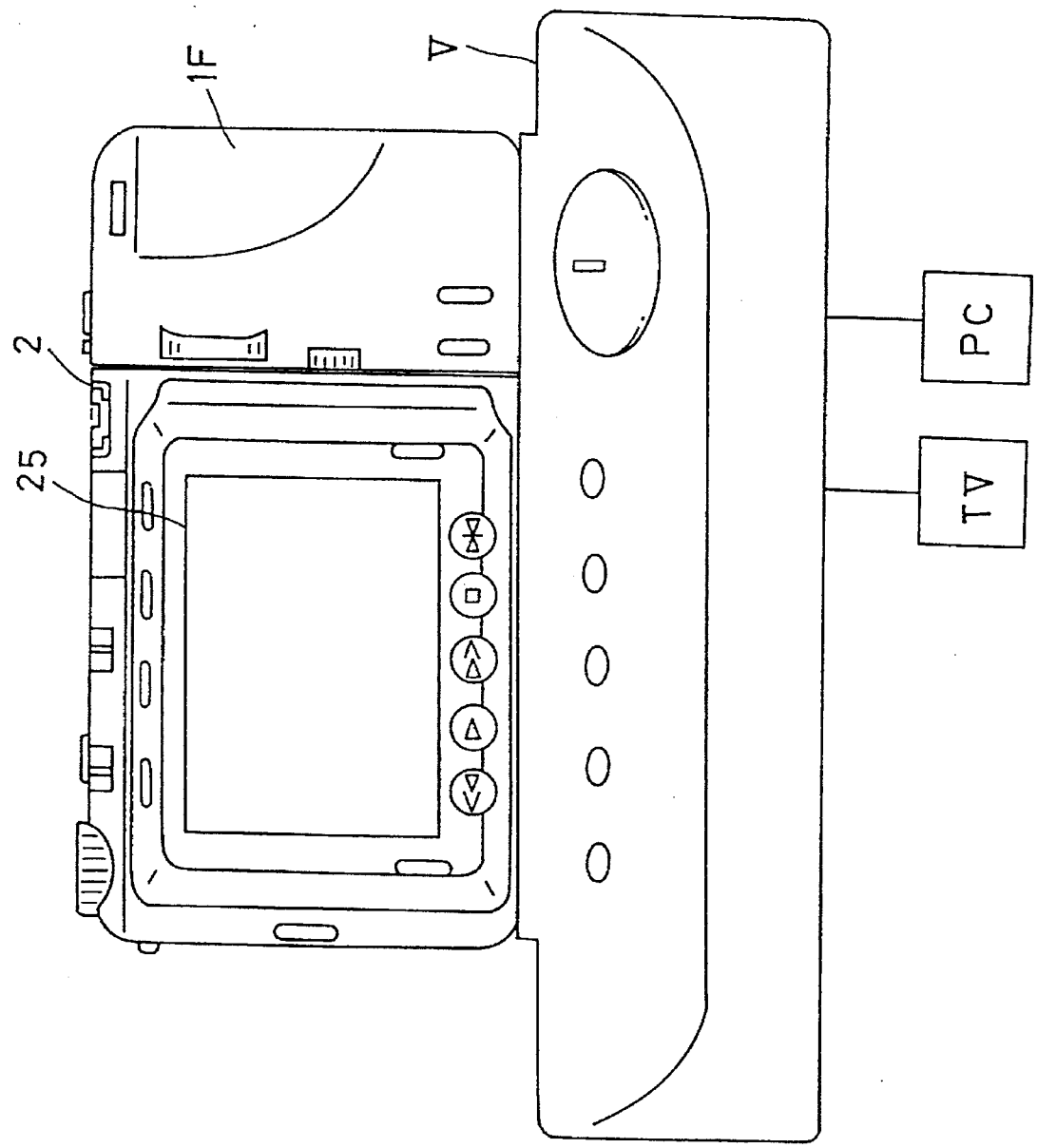
FIG. 134 is a front view of an image taking apparatus of the seventeenth embodiment mounted on a station instrument.

FIG. 134 shows the state of the apparatus mounted on a station instrument V. When mounted on the station instrument V, the apparatus can be connected therethrough with an external image output device such as a television set TV or a personal computer PC in order to view thereon moving-picture videos or electronic still pictures taken by the apparatus.

Figure 135:
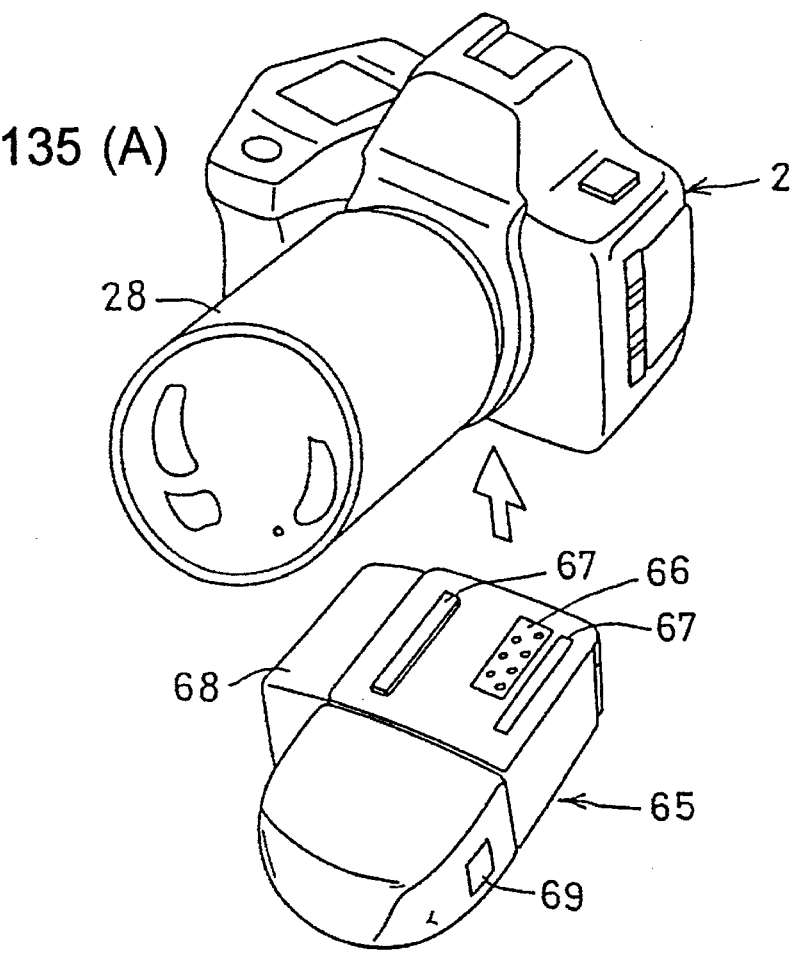
FIG. 135 is a perspective view of an image taking apparatus of the seventeenth embodiment with an underside grip.
Figure 135:
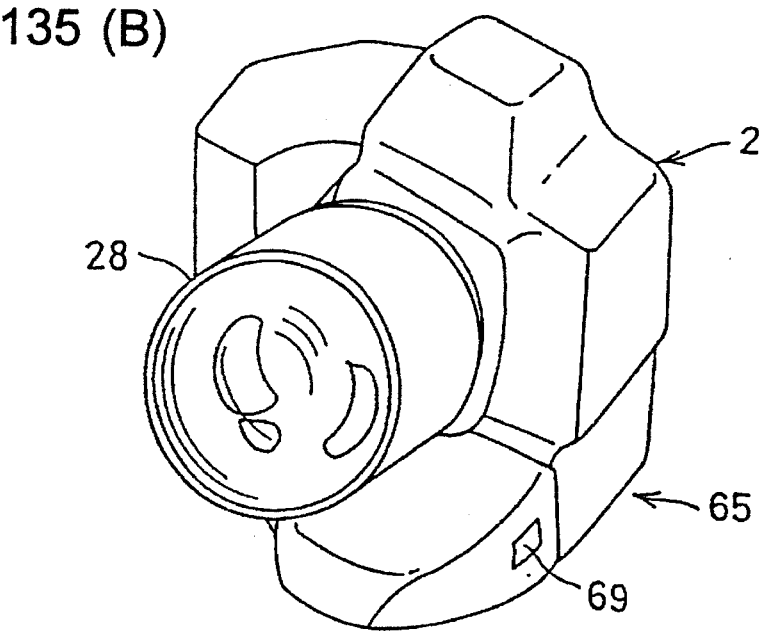

Another example of a separatable underside grip is shown in FIG. 135, in which (A) shows the separated state and (B) shows the attached state. This underside grip 65 has on its top electric contacts 66 and sliding guide rails 67 for attaching and detaching body. The underside grip 65 has on its side a secondary battery 68 for moving-picture video shooting. Reference numeral 69 represents a trigger switch. This grip is constructed as a underside grip in order to prevent degradation of operability due to mounting of a video tape deck.

Figure 136:
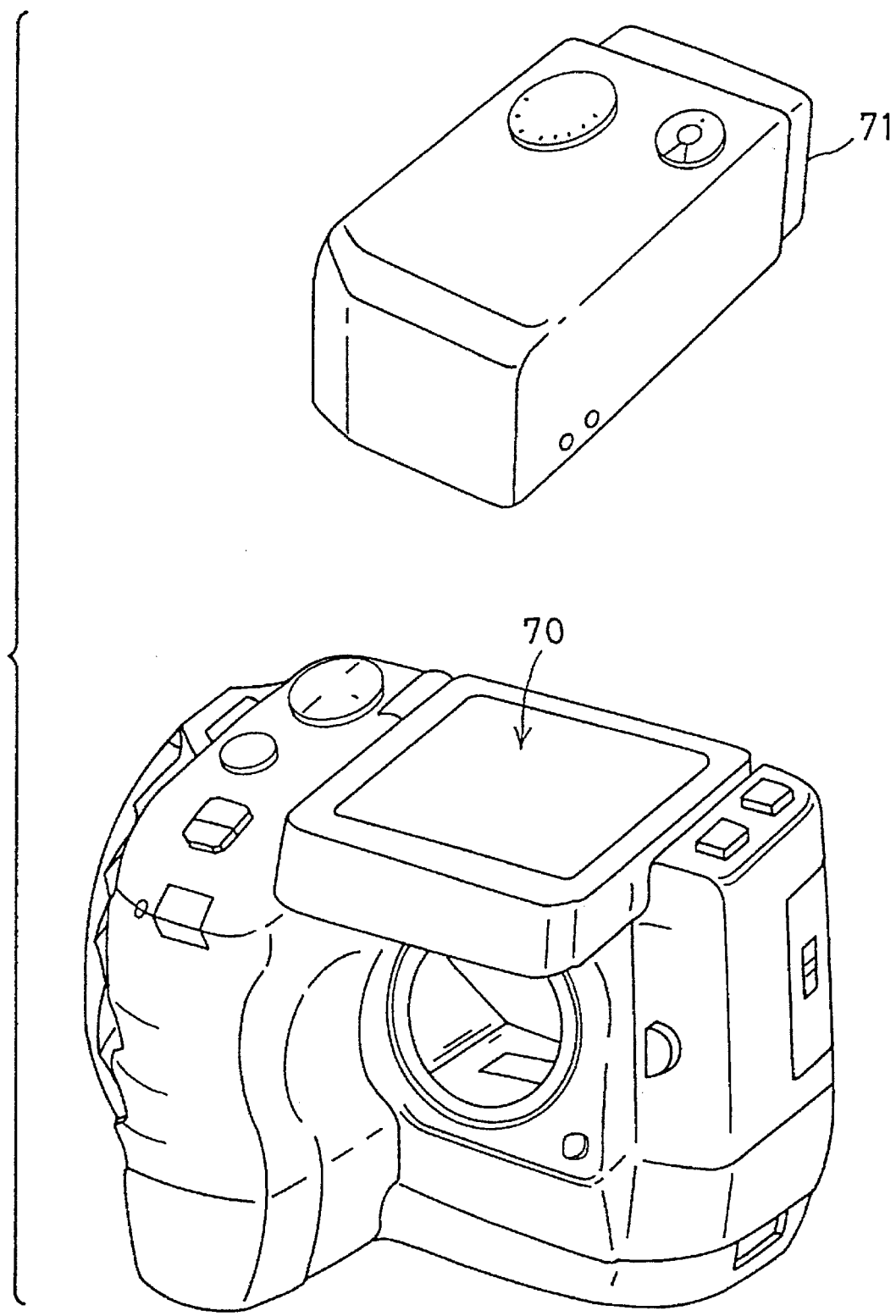
FIGS. 136 and 137 are a perspective view and perspective diagrams showing an example of an image taking apparatus of the seventeenth embodiment with an exchangeable EVF instead of an optical viewfinder.
Figure 137:
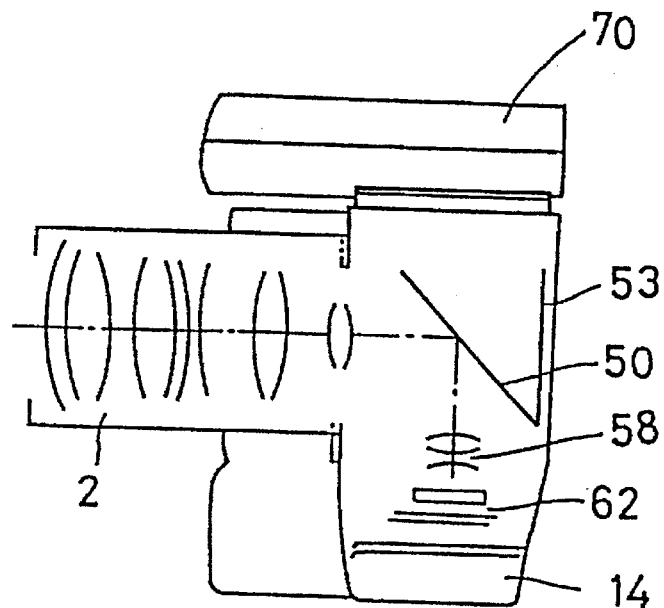
Figure 137:
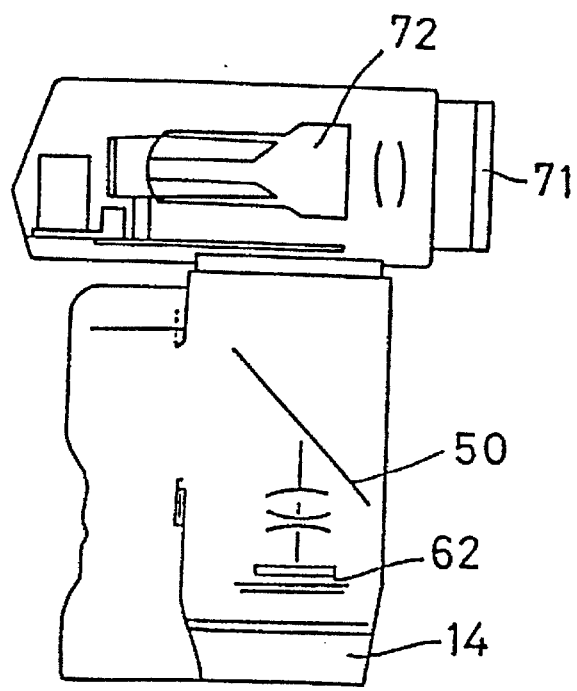

FIGS. 136 and 137 show an example of an image taking apparatus in which the optical viewfinder is non-existent whereas the EVF is exchangeable. In FIGS. 136 and (A) of FIG. 137, reference numeral 70 represents a liquid crystal display (LCD), whose screen is used as a viewfinder. In FIGS. 136 and (B) of FIG. 137, reference numeral 71 represents a CRT-type viewfinder including a cathode ray tube 72.

As described above, according to the sixteenth and seventeenth embodiments, in an image taking apparatus comprising a first imaging portion constructed as a silver salt film imaging system for shooting on a silver salt film and a second imaging portion constructed as an electronic imaging system, a grip for stably supporting the apparatus during shooting is detachably attached to the body of the apparatus, and, of a plurality of grips available, one group of grips have only functions adapted to the first imaging portion and another group of grips have functions adapted to both the first and the second imaging portions so that the grip can be exchanged as required between one for silver salt film shooting only and another for both silver salt shooting and electronic shooting.

As a result, it is possible to reduce functions with which the apparatus itself needs to be provided, and accordingly, if silver salt film shooting is the only purpose, the apparatus can be used with a dedicated small-size, light-weight grip attached thereto, resulting in far better operability and portability. If electronic shooting is to be performed, since silver salt film shooting is often performed in such occasions, it is possible to shoot videos without hindrance by attaching a dual-purpose grip to the apparatus.

Further, if the apparatus is so constructed that attachment of a grip to the apparatus disables a specific function of the apparatus and that detachment of the grip from the apparatus enables the specific function for the apparatus, it is possible to prevent undesirable operation, for example, operation of the electronic shooting system due to improper operation (maloperation) or other during silver salt film shooting.

Moreover, if the first imaging portion is so constructed that it captures one of the two light beams obtained by dividing with a light divider the light incident from the subject through the main optical system, the second imaging portion is so constructed that it captures the other light beam separated by the light divider and incident through a relay optical system, and the body of the apparatus, to which a grip is detachably attached, is equipped with the first imaging portion, the second imaging portion, the main optical system, the light divider, and the relay optical system, it is possible to perform both silver salt film shooting and video shooting with the same main optical system, without effects of parallax.

Moreover, since the components that are mounted to the apparatus are not equipped with optical constructions, it is possible to prevent the construction of those attached components from being excessively complicated, and, as a result, it is possible to reduce production costs and improve portability.

Moreover, since a grip having only functions adapted to the first imaging portion is equipped with a primary battery for supplying power to the first imaging portion, and a grip having functions adapted to both the first and second imaging portions is equipped with a common battery or separate batteries for supplying power to the first and second imaging portions, it is possible to perform at least silver salt film shooting, if a battery for silver salt film shooting is loaded into the silver salt film shooting dedicated grip, even when the battery for electronic shooting has run out.

Further, if the grip having functions for both the first and second imaging portions is equipped with a recording medium and a recording medium driving portion for the second imaging portion, it is possible to remove the recording medium for video shooting when only silver salt film shooting is performed. This improves portability.

Moreover, if the grip is equipped with an electric display device for indicating various operation statuses of the apparatus, it helps to locate a position on a recording medium or to view captured images in video shooting situations, in which an optical viewfinder for silver salt film shooting does not function sufficiently.

Moreover, if the grip is designed to be detachably attached to the bottom of the body, it is possible to use the grip as an underside grip in vertical-position shooting.

Figure 138:
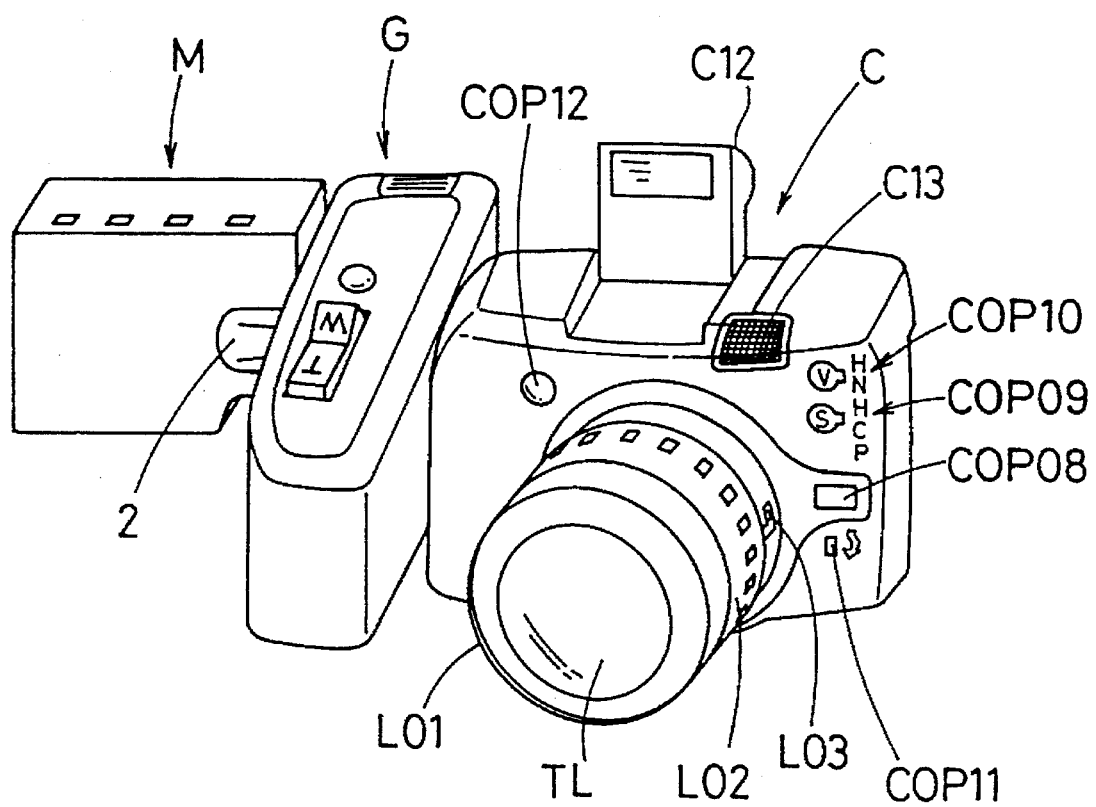
FIG. 138 is a perspective front view of an image taking apparatus of the eighteenth embodiment of the present invention.
Figure 139:
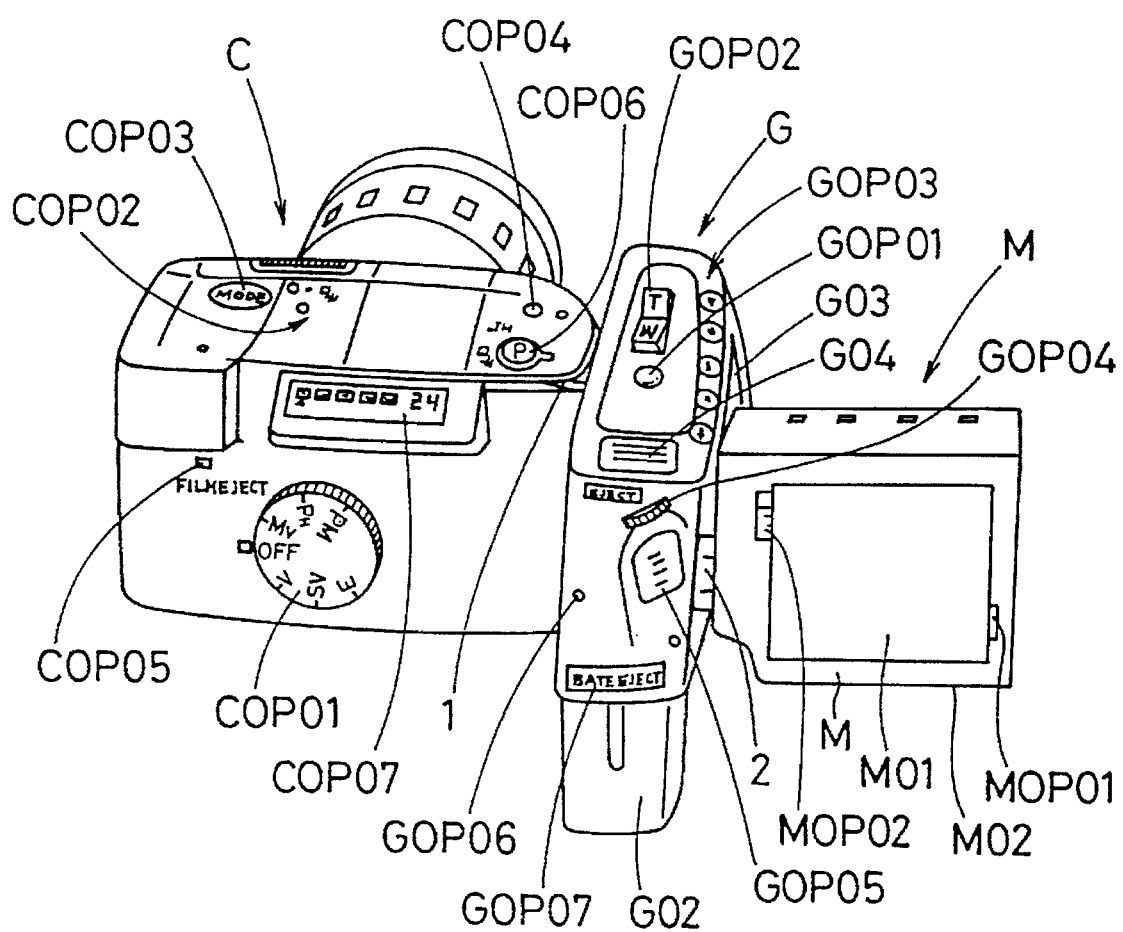
FIG. 139 is a perspective rear view of an image taking apparatus of the eighteenth embodiment.
Figure 140:
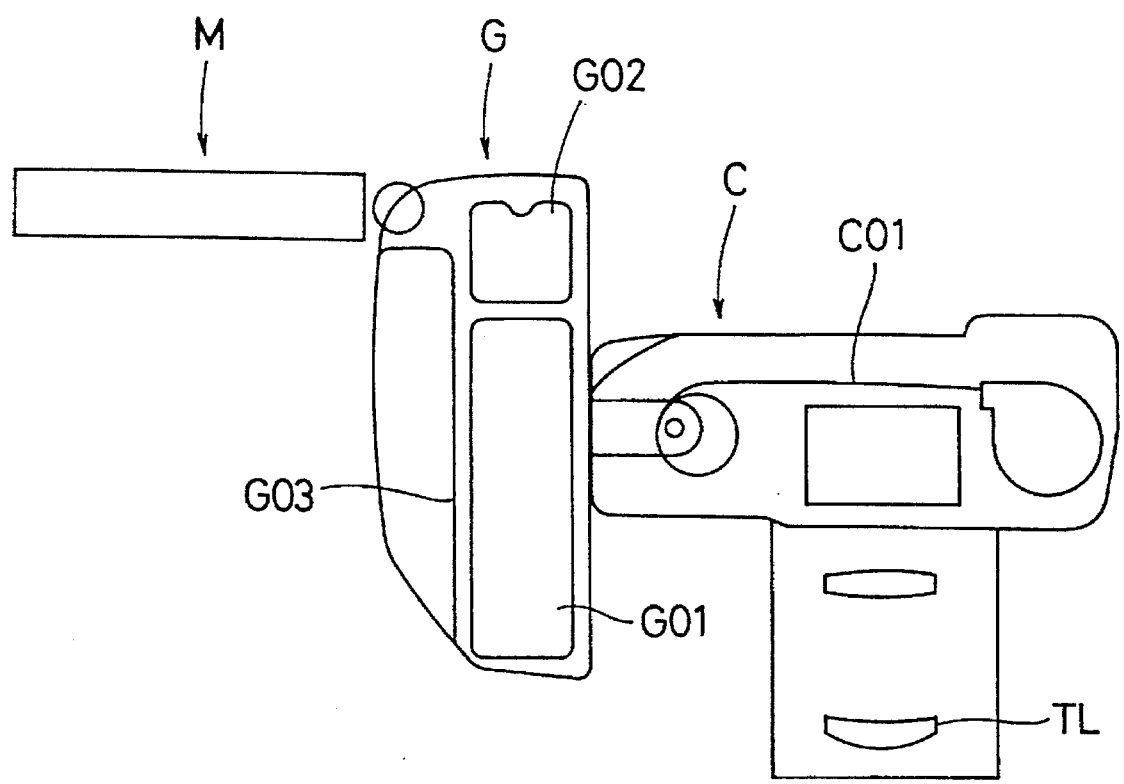
FIG. 140 is a perspective diagram showing an internal construction of the image taking apparatus of the eighteenth embodiment.
Figure 141:
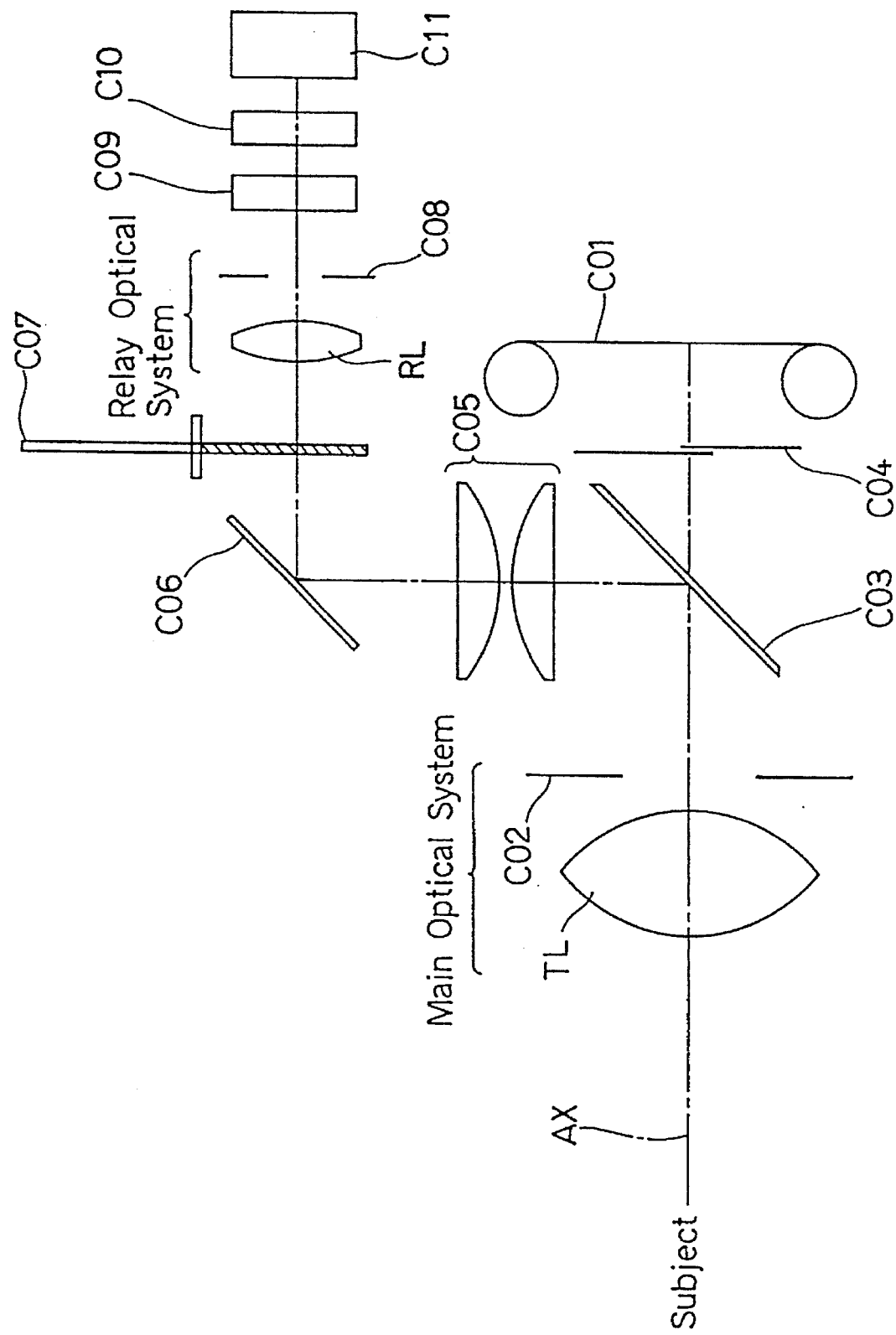
FIG. 141 is a diagram showing the outline of the optical system of an image taking apparatus of the eighteenth embodiment.
Figure 142:
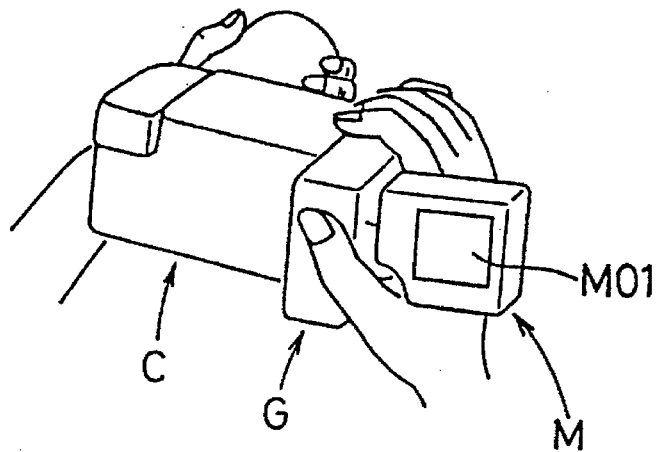
FIG. 142 is a perspective view showing the state of an image taking apparatus of the eighteenth embodiment in use.
Figure 142:
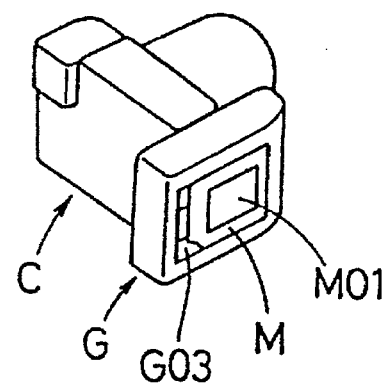
Figure 142:
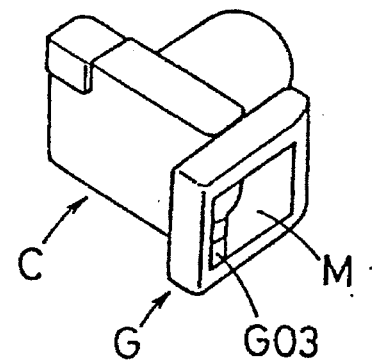
Figure 142:
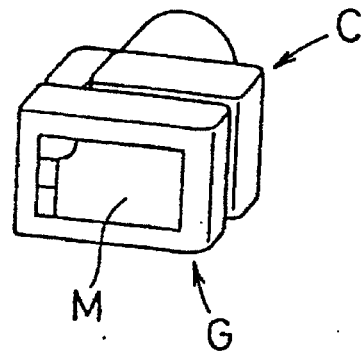

FIG. 138 is a perspective front view of an image taking apparatus of the eighteenth embodiment of the present invention. FIG. 139 is a perspective rear view of the image taking apparatus. FIG. 140 is a perspective diagram showing the internal construction of the image taking apparatus. FIG. 141 is a diagram showing the outline of the optical system of the image taking apparatus. FIG. 142 is a perspective view showing the state of the image taking apparatus in use. In this embodiment, the apparatus is equipped with a grip which is rotatable and can be folded down onto the back of the body as described in the seventh embodiment.

An image taking apparatus of this embodiment is a handy-type camera which functions both as a still camera and as a video camera. As shown in FIGS. 138 and 139, the apparatus itself is constituted of a main lens TL serving as a main optical system, and a body C which is arranged to the rear of the main optical system in the direction of the optical axis thereof, and to which the main lens TL is removably mounted. On one side of the body C, a grip G for stably supporting the apparatus during shooting is provided. The grip G is linked to the body C through a link mechanism 1. Further, a monitor M is linked through a rotary joint 2 to the other side of the grip G, that is, to the side not facing the body C.

In the image taking apparatus constructed as described above, the main lens TL, the body C and the grip G are mechanically and electrically linked together to form a silver salt film shooting system for shooting a picture on a silver salt film and an electronic shooting system for shooting a moving-picture and others. The image taking apparatus is provided with following modes: silver slat film shooting mode for shooting a picture on a silver salt film, video shooting mode for shooting a moving-picture video, simultaneous shooting mode for simultaneously shooting a moving-picture video and a silver salt film picture, video playback mode for playing back a video after shooting, a still video shooting mode for recording a still image on magnetic recording medium or a solid state memory, edit mode for editing information recorded in the shooting information recording portion on a silver salt film, and others. The mode is switched from one to another as required by the operator to perform shooting, playback, recording, and other operations.

The link mechanism 1 links the grip G to be rotatable approximately 90 degrees on a horizontal plane. The practical construction of the link mechanism 1 is the same as the link mechanism 4 of the eighth embodiment described earlier. The grip G is moved along an arc path tracing the outer surfaces of the body C from the in-use position along the side of the body C as shown in (c) of FIG. 142 to the resting position along the back of the body C as shown in (d) of FIG. 142.

The rotary joint 2 links the monitor M to be rotatable 90 degrees on a horizontal plane with respect to the grip G, and also to be rotatable about a horizontally extending axis. The link mechanism 1 and the rotary joint 2 offer appropriate friction when rotated, so that the grip G and the monitor M can be fixed at a desired position. The inside of the body C and the inside of the grip G are electrically connected with wirings penetrating the inside of the link mechanism 1, and the inside of the grip G and the inside of the monitor M are electrically connected with wirings penetrating the inside of the rotary joint 2.

Next, the internal construction of the image taking apparatus will be described. In FIG. 140, C01 represents a film for silver salt film shooting, G01 represents a deck portion which is provided with mechanisms and control circuitry for the electronic shooting system and into which a videocassette tape can be removable loaded, G02 represents a battery, and G03 represents a cavity for folding down monitor M.

Next, the optical system of the image taking apparatus will be described. As shown in FIG. 141, the light coming from the subject enters a main optical system, passes through a main lens TL, is subjected to light amount control by a main lens aperture diaphragm C02, passes through a pellicle mirror C03 serving as a light divider and a shutter C04, and reaches a film C01. This is the first light path. The light separated from the first light path in the pellicle mirror C03 passes through a condenser lens C05, a reflection mirror C06 and an ND filter C07, and reaches a relay optical system (a relay lens RL and a relay aperture diaphragm C08). This is the second light path. Ax represents an optical axis directed from the subject to the main lens TL.

The light having passed along the second light path and having reached the relay lens RL is subjected to light amount control by a relay aperture diaphragm C08, passes through an optical low-pass filter C09, an infrared cut filter C10, and reaches a CCD image sensor C11 serving as a light/ electricity converter, by which the light is converted into a video signal. Although the CCD image sensor C11 is shown as a single-plate type, a multiple-plate type can be used instead. The first light path is for shooting a still picture on a sliver salt film, whereas the second light path is for shooting a moving picture on a video recording medium.

Next, the external construction of the apparatus will be described. In FIG. 138, L01 represents a lens barrel, L02 represents a zoom ring for operating zoom, L03 represents an AF/MF switching button for switching between automatic and manual focus, C12 represents a flash, and C13 represents a stereophonic microphone.

Next, the operation portion of the body C will be described. In FIG. 139, COP01 is a operation mode selection switch serving also as a main switch, COP02 represents a button for selecting from among self-timer, continuous, and one-shot in silver salt film shooting and still video shooting modes.

COP03 represents a shooting mode selection button. This button COP03 is operated together with a later-mentioned mode selection dial GOP04 in order to select a shooting scene, such as portrait, sports, and others in simultaneous shooting mode, silver salt film shooting mode, video shooting mode, and still video shooting mode. COP04 represents a red-eye reduction button for reducing red-eye in flash shooting in silver salt film shooting mode and still video shooting mode.

COP05 represents a film cartridge exchange button for loading and unloading a film cartridge. COP06 represents a program button. The program button COP06 is operated singly in order to set a shooting mode to a program. The program button COP06 is operated together with a later-mentioned mode selection dial GOP04 in order to select from among aperture priority mode, shutter speed priority mode, and manual mode in simultaneous shooting mode, silver salt film shooting mode, video shooting mode, still video shooting mode. COP07 represents an LCD display portion for displaying information on operation statuses and others.

Next, in FIG. 138, COP08 represents a lens exchange button for demounting the lens barrel L01 from the body C, COP09 represents a switch for selecting a frame aspect ratio in silver salt film shooting mode, COP10 represents a switch for selecting a screen for moving-picture video, COP11 represents a button for forcibly firing the flash in silver salt film shooting mode and still video shooting mode, and COP12 represents a self-timer lamp indicating that the self-timer is active.

Next, the grip G will be described. G04 represents a speaker. The grip G is also equipped with a lock mechanism, not shown, for preventing the monitor M folded down onto the cavity G03 from popping out.

The operation portion of the grip will be described. GOP01 represents a release button. GOP02 represents a zoom lever for controlling the focal length of the lens L just as the zoom ring L02. GOP03 represents a group of operation buttons for controlling the deck portion G01. GOP04 represents a mode selection dial for altering the mode and varying the values of AV and TV in silver salt film or video shooting.

GOP05 represents a recording start/stop button for controlling starting and stopping of recording on a recording medium in simultaneous shooting mode and video shooting mode. In manual mode, by operating the above-mentioned selecting dial GOP04 with this button GOP05 held down, it is possible to vary the values of AV and TV.

GOP06 represents a button for turning ON/OFF hand shake correction in simultaneous shooting mode and video shooting mode. In silver salt shooting mode and still video shooting mode, by operating the mode selection dial GOP04 with this button GOP06 held down, it is possible to enable exposure compensation. GOP07 represents a battery exchange button. GOP represents a battery.

Next, the monitor M will be described. M01 represents an EVF (liquid crystal display view finder) serving as an electric display device for displaying images outputted from image se image sensor C11 and other information. Next, the operation portion of the monitor M will be described. MOP01 represents a button for turning ON/OFF messages displayed in the EVF portion M01. MOP02 represents a button for controlling sound volume in V mode, and for controlling qualities (brightness and hue) of a picture displayed in the EVF portion M01.

As described above, the monitor M is guided to be rotatable approximately 90 degrees on a horizontal plane about the rotary joint 2, so that the monitor M can take a position in which the monitor M rests in the cavity G03 of the grip G as shown in (b) and (c) of FIG. 142, and a position in which the monitor M is unfolded out of the cavity G03 of the grip G.

Next, the operation of the image taking apparatus will be described.

The state of the apparatus in ordinary use is shown in (a) of FIG. 142. In this state, the operator performs shooting holding the body C and grip G with both hands and looking at the EVF portion M01. When the monitor M is rotated forward until it rests in the cavity G03 of the grip G as shown in (b) of FIG. 142 with the EVF portion M01 facing outward, it is possible to view playback images and others displayed in the EVF portion M01.

When the monitor M is folded down into the cavity G03, the monitor is locked by the above-mentioned lock mechanism. Moreover, since the monitor M is loaded by a spring, which is not shown in the figure, with a resilient force in the direction in which the monitor M pops out, when the lock mechanism is released, the monitor M pops out into a position as shown in (a) of FIG. 142.

As described above, since the monitor is rotatable about a horizontally extending axis, it is possible to reverse the EVF portion M01 upside down to that it faces forward. When the monitor is rotated forward to rest in the cavity G03 with the EVF portion facing inward as shown in (c) of FIG. 142, it is possible to protect the EVF portion M01 from scratching while, for example, the apparatus is carried around.

When the apparatus is not in use, the grip G is rotated to the resting position on the rear of the body C. Thus, folded down compactly, the apparatus is convenient for taking along.

According to this embodiment, a grip can be rotated to a resting position on the rear of the body when the grip is not in use, thus making the apparatus compact and offering excellent portability. Thus, an excellent portability can be achieved without spoiling operability in shooting.

Further, by rotating the grip to a resting position on the rear of the body, it is possible to reduce the width of the apparatus for better portability. This construction is suitable especially for such an apparatus that is designed to be held with both hands at the body and at the grip during shooting.

Further, since the grip is equipped with an electric display device, it is possible to make the apparatus compact. Moreover, since the electronic display device can be put away in a resting position, the apparatus offers an excellent portability.

Figure 143:
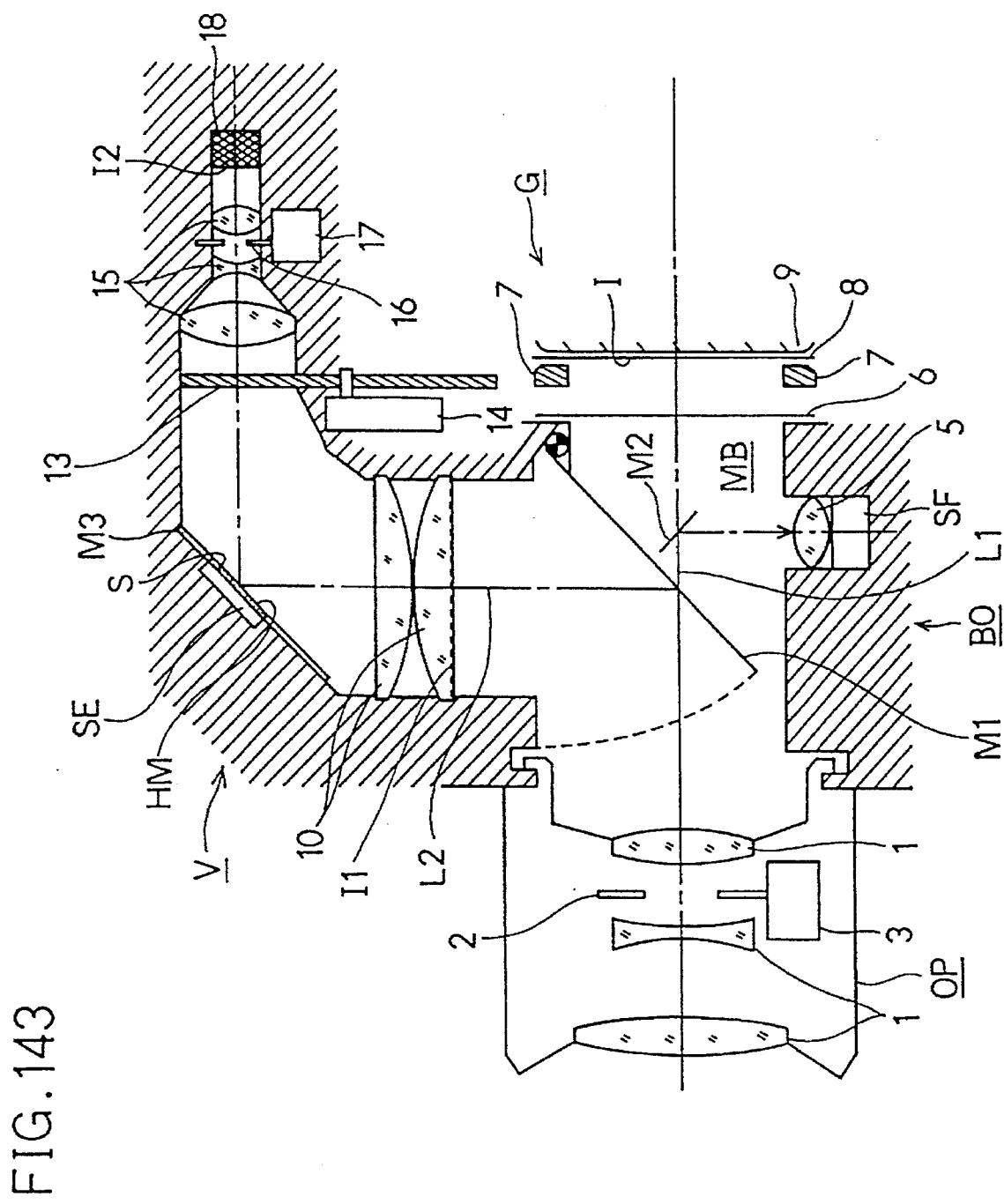
FIG. 143 is a vertical cross-sectional view showing the construction of a nineteenth embodiment of the present invention.

FIG. 143 is a vertical cross-sectional view showing the construction of a nineteenth embodiment. A camera of this embodiment has a lens barrel OP and a camera body BO. The lens barrel OP is provided with a taking lens 1 for imaging light coming from a subject, an aperture diaphragm 2 for controlling a light beam incident on the taking lens 1, and an aperture controller 3 for controlling the aperture diaphragm 2. On the other hand, the camera body BO is provided with a main mirror M1, a silver salt film shooting system G, a video shooting system V, a photometry device SE, a focus detection device SF, and others.

The main mirror M1 is a light path switching device which rotates, as shown with a broken line in the figure, to switch between a light path for a first light beam L1 and a light path for a second light beam L2 (in the figure, each light path is represented by an approximate optical axis). The main mirror M1 is a total reflection mirror having a semi-transparent portion at the center thereof here. However, as in the later-mentioned twentieth embodiment, it is possible to use a fixed half mirror (for example, a pellicle mirror) M4 (FIG. 144) for dividing a light beam having passed through the taking lens 1 into a first light beam L1 and a second light beam L2.

In the silver salt film shooting system G, a shutter 6 and film rails 7 are disposed in front of a film 8 so that the film 8 is positioned at the position where the first light beam L1 forms an image I, and a film pressing plate 9 is disposed behind the film 8. Therefore, just as in an ordinary single lens reflex camera, an image I formed on the surface of the film 8 is recorded according to the silver salt photographing method (that is, the film is exposed to light) with the main mirror M1 swung up. Instead of the film 8, it is possible to use another recording medium that can be used for recording according to the silver salt photographing method.

To the rear of the main mirror M1 is disposed an AF (autofocus) mirror M2. The AF mirror M2 reflects the light passing through the semi-transparent portion of the main mirror toward the bottom of a mirror box MB, and the thus reflected light beam forms an image on the focus detection device SF with the help of an imaging lens 5. The focus detection device SF comprises a linear CCD (charge coupled divide), and, based on defocus information obtained from this focus detection device SF, focus detection is performed according to the phase difference detection method.

In the video shooting system V, an image pickup device 18 comprising an area CCD is disposed at a position where the second light beam L2 forms a secondary image I2. The video shooting system V is also provided with a condenser lens 10, a mirror M3, an ND filter 13, an ND filter controller 14, a relay lens 15, a relay aperture diaphragm 16, and a relay aperture controller 17.

The second light beam L2, whose path has been bent by reflection of the main mirror M1, first enters the condenser lens 10. The condenser lens 10 serves as a light-gathering lens for leading the second light beam L2 to the later described relay lens 15. A primary image I1 is formed as an aerial image in the vicinity of the incident surface of the condenser lens 10. In the vicinity of the image plane of the primary image I1, there is no focusing screen (diffusive screen) as is used in an ordinary single lens reflex camera. This is because a focusing screen in the path of the second light beam L2 deteriorates the quality of pictures shot by video.

To the rear of the condenser lens 10, a mirror M3 is disposed, and behind the central portion of the mirror M3, a photometry device SE comprising an SPC (silicone photo cell) is disposed. Whereas the central portion of the mirror 3 is formed as a semi-transparent surface (half-mirror) HM, the remaining portion is formed as a total reflection mirror. Accordingly, part of the second light beam L2 incident from the condenser lens 10 passes through the mirror M3, and hits the photoreceptive surface S of the photometry device SE. A photometry value obtained from the photometry device SE is used to control the aperture controller 3 and a shutter-speed controller (not shown in the figure) in the silver salt film shooting system G, and to control the ND filter controller 14 and the relay aperture controller 17 in the video shooting system V.

As seen from above, the photometry device SE is disposed at a position where a primary image I1, which the second light beam L2 forms before reaching the image pickup device 18, is observed as an aerial image (at this time, the photo-receptive surface S is in a defocus state). This is because, as described above, since there is no focusing screen at the position of the image plane, it is not possible to perform photometry by observing an image on a focus screen. Therefore, according to this embodiment, although it is not possible to perform multiple-division photometry (evaluative photometry), it is possible to make the camera compact as a whole, since this embodiment allows a flexible arrangement of the photometry device SE. Incidentally, it is possible to perform averaging photometry and center-weighted photometry in this embodiment.

The second light beam L2 reflected by the mirror M3 enters a disk-shaped ND filter 13. The ND filter 13 is a light amount controlling device for controlling the light amount of the second light beam L2 directed toward the image pickup device 18. Since areas of different light transmittances are formed and arranged every predetermined rotation angle in the ND filter 13, it is possible to reduce light amount with a desired transmittance by rotating the ND filter 13 so that an area of a certain transmittance is positioned in the path of the second light beam L2. The rotation angle position of the ND filter 13 is controlled by the ND filter controller 14 based on the photometry results obtained from the photometry device SE.

The light beam having passed through the ND filter 13 enters the relay lens 15. The relay lens 15 leads the second light beam L2 to the image pickup device 18, so that a secondary image I2 is formed on the image pickup device 18. The relay lens 15 is provided with a relay aperture diaphragm 16 serving as a light amount controller for controlling the light amount of the second light beam L2 directed to the image pickup device 18. The aperture of the relay aperture diaphragm 16 is controlled by the relay aperture controller 17 based on the photometry values obtained from the photometry device SE. Instead of the ND filter 13 or the relay aperture diaphragm 16, another light amount controller that can control light amount in an electronic photographing system can be used.

The secondary image I2 formed on the image pickup device 18 is recorded on a recording medium (not shown in the figure) as a signal outputted from the image pickup device according to the electronic photographing method. With the above-described recording of an image onto the recording medium, video shooting is completed. However, the signal from the image pickup device is also used to display an image in a liquid crystal display viewfinder (not shown in the figure). Looking at the liquid crystal display viewfinder, the operator can take a silver salt film picture by turning ON the release button (not shown in the figure; a half-way press of the release button starts photometry, and a full press of the release button starts exposure of the film), or shoots a moving-picture or still-picture video by turning ON the recording button (not shown in the figure).

Whereas the exposure control in the silver salt film shooting system G is always realized based on photometry values obtained from the photometry device SE, the light amount control in the video shooting system V, during shooting of a moving picture, is realized at first based on the photometry values obtained from the photometry device SE in the beginning of a shooting session, and thereafter, through a feedback control in which the image pickup device 18 is used as a photometry device.

As described above, since the photometry device SE receives the second light beam L2 having passed through the mirror 3 on its photo-receptive surface S, photometry is performed using a light beam which has passed through the taking lens but which has not yet entered the ND filter 13 nor the relay aperture diaphragm 16, supposing the path of the light beam incoming through the taking lens 1 is switched to the path of the second light beam L2 by the main mirror M1. Consequently, since a photometry value is not affected by the ND filter 13 and the relay aperture diaphragm 16, it is possible to perform TTL photometry accurately.

Moreover, as long as this photometry device SE is used, it is not necessary to use the image pickup device 18 for photometry purposes. As a result, it is possible to activate the ND filter 13 and the relay aperture diaphragm 18 before activating video circuitry (not shown in the figure), and to activate them again after operation of the video circuitry, based on photometry values obtained from the photometry device SE. In other words, it is possible to control the relay aperture diaphragm 16 and set the ND filter 13 before the actuation of the video circuitry, and it is also possible to control the relay aperture diaphragm 16 and set the ND filter 13 again after the operation of the video circuitry. Consequently, it is possible to prevent overexposure, as will occur when the image pickup device is used for photometry purposes, of the image pickup device 18 in the initial stage of video shooting, and therefore, it is possible to correctly control not only the light amount in video shooting but also the exposure in silver salt film shooting.

Moreover, since the ND filter 13 is used together with the relay aperture diaphragm 16 as a light amount controlling means, it is possible to prevent fuzziness due to diffraction which arises under stopped-down aperture condition even if the absolute value of the relay aperture diaphragm 16 is unknown, and it is thus possible to prevent degradation of picture quality due to diffraction fuzziness.

Although a conventional camera which is provided with an ND filter as well as an aperture diaphragm is already known, such a camera is defective because control of light amount is difficult to perform properly and involves complicate operations, since the operator is expected to manually set the ND filter based on the brightness of a subject before activating video circuitry. In this embodiment, in contrast, since the ND filter 13 and the relay aperture diaphragm 16 are controlled by the ND filter controller 14 and the relay aperture controller 17 based on photometry results from the photometry device SE, it is possible to properly control the light amount without bothering the operator to operate ND filter 13.

Moreover, although a camera of this embodiment has functions for both silver salt film shooting and video shooting, the taking lens 1 is used by both the silver salt film shooting system G and the video shooting system V, and a light beam having passed through the taking lens 1 is used for TTL photometry. As a result, the camera does not cause parallax, and no problem occurs when the shooting angle of the taking lens is changed by using, e.g., a zoom lens.

Since the above-mentioned video shooting system V corresponds the view finder system in an ordinary single lens reflex camera, if a swing mirror is used as the main mirror M1 as in this embodiment, it is possible to conveniently use the total amount of the whole light beam for the silver salt film shooting system G.

In contrast, if a fixed half-mirror M4 (FIG. 144) is used as the main mirror M1 in this embodiment, it conveniently prevents a blackout or an interruption of photometry as will occur when a silver salt picture is taken in the middle of video shooting. Moreover, in flash shooting of a silver salt film, even if a photometry device for receiving light reflected by the film surface in order to control the flash lighting is not provided, the photometry device SE can be used both for ordinary open-aperture photometry, and for stop-down photometry for controlling the flash lighting during exposure.

Figure 144:
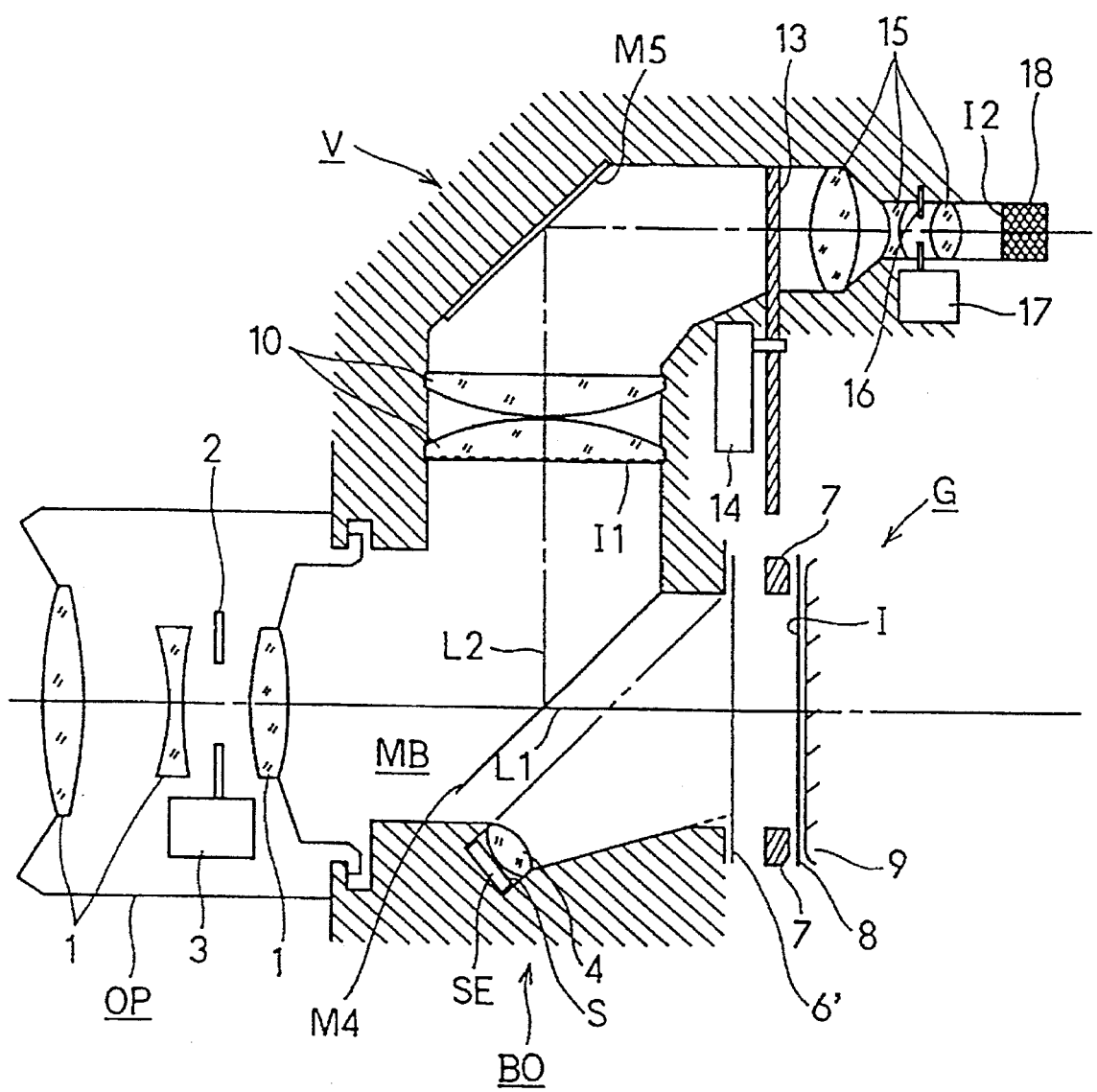
FIG. 144 a vertical cross-sectional view showing the construction of a twentieth embodiment of the present invention.

FIG. 144 is a vertical cross-sectional view showing the construction of a twentieth embodiment. Although a focus detection device SF and an imaging lens 5 are disposed at the bottom of the mirror box BM, they are not shown in the figure. The main mirror M4 is a fixed half-mirror serving as a light dividing device for dividing the light beam having passed through the taking lens 1 into a first light beams L1 and a second light beam L2. The video shooting system V, to which the second light beam L2 enters, is equipped with a total reflection mirror M5 instead of the mirror M3 (FIG. 143).

The light-interruption surface of the shutter 6' has a reflectance substantially equal to that of the film 6. At the bottom of the mirror box MB, an imaging lens 4 for imaging the light (shown with a phantom line in the figure) reflected on the surface of the shutter 6' is disposed, and the photometry device SE is so arranged that the imaging lens 4 forms an image on the photo-receptive surface S. Since the photometry device SE observes diffused light reflected by the shutter surface in the vicinity of the film surface, just as a conventional TTL (Through The Lens) photometry device does, photometry is performed with the first light beam L1, which is a portion of the light beam having passed through the taking lens 1 but which has not passed through the ND filter 13 and the relay aperture diaphragm 16. Accordingly, a photometry value is not affected by the ND filter 13 or the relay aperture diaphragm 16, and therefore, it is possible to perform TTL photometry accurately. In this regard, this embodiment achieves the same effect as the nineteenth embodiment.

Further, since an image is formed on the photo-receptive surface S of the image pickup device SE with the light reflected by the surface of the shutter 6', it is possible to correctly perform photometry of the subject, and even to perform multiple division photometry (evaluative photometry). The use of the main mirror M4 prevents a blackout or an interruption of photometry, as described above, and, at the time of film photography, it is possible to use the photometry device SE both for ordinary open-aperture photometry, and for stop-down photometry for controlling the flash lighting during exposure.

Figure 145:
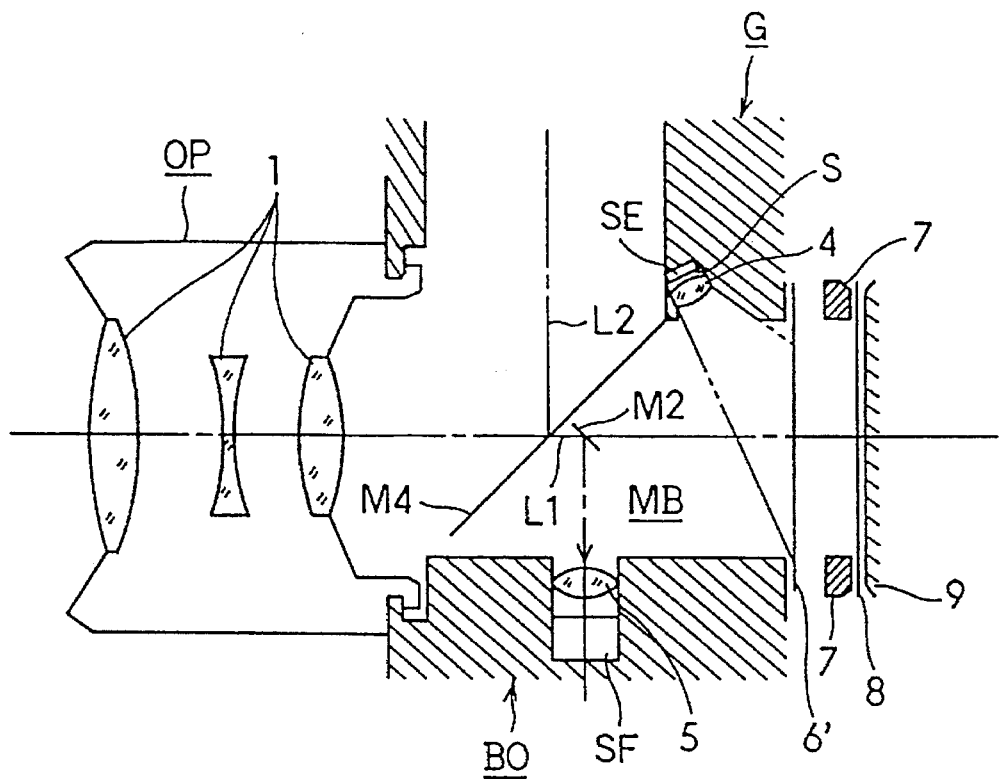
FIG. 145 is a vertical cross-sectional view showing the construction of the principal portion of an twenty-first embodiment of the present invention.

FIG. 145 is a vertical cross-sectional view showing the construction of the principal portion of an twenty-first embodiment. This embodiment has the same construction as the twentieth embodiment except that the photometry device SE and the imaging lens 4 are disposed on the shutter 6'-side of the top of the mirror box MB, and therefore, this embodiment achieves the same effects as the previous embodiment (the twentieth).

If the lens barrel OP having the taking lens 1 is designed to be exchangeable for a conventional interchangeable lens for conventional single lens reflex (SLR) cameras, it will have a flange back equal to that of the conventional lens. Accordingly, if a fixed half-mirror is used as the main mirror M4, the space which has conventionally been secured for swinging up of an total reflection mirror in the conventional SLR cameras is obtained as a free space existing to the front of the main mirror M4.

Therefore, if the main mirror M4 is arranged farther forward than the main mirror of the conventional SLR cameras, a free space is secured on the shutter 6'-side of the mirror box MB. By using this space for arranging components, the camera body BO can be made more compact. In this embodiment, this space is used to arrange the photometry device SE so that it looks down to the shutter 6' surface from above, as it were.

Figure 146:
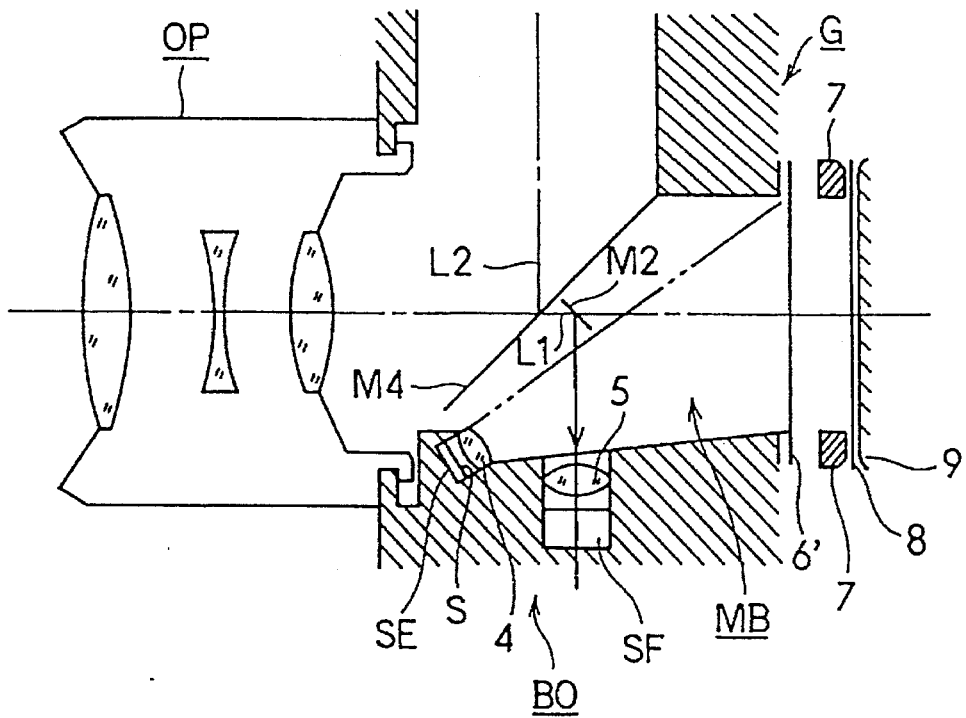
FIG. 146 is a vertical cross-sectional view showing the construction of the principal part of a twenty-second embodiment of the present invention.

FIG. 146 is a vertical cross-sectional view showing the construction of the principal part of a twenty-second embodiment. This embodiment has the same construction as the twenty-first embodiment except that the photometry device SE and the imaging lens 4 are disposed on the front side of the bottom of the mirror box MB, and therefore, this embodiment achieves the same effects as the previous embodiment.

For example, if the focus detection device SF and the photometry device SE are disposed on the shutter 6'-side of the bottom of the mirror box MB, part of the reflected light beam (first light beam L1) directed to the photometry device SE interrupted by the AF mirror M2, and accordingly, there is no image formed on some part of the photometry device SE. This leads to deterioration in photometry accuracy. As described above, if the main mirror M4 is arranged farther forward than conventional, the AF mirror M2 can be arranged accordingly farther forward. The farther the AF mirror M2 is arranged forward, the smaller it becomes relative to the first light beam L1. Therefore, even if the photometry device SE is arranged at the bottom of the mirror box MB, the effect of the interruption of the first light beam L1 by the AF mirror M2 is kept substantially small, and a better photometry accuracy can be secured. In view of the above, in this embodiment, the photometry device SE is arranged in the above-mentioned position so that it looks up to the shutter 6' surface from the front side of the bottom of the mirror box, as it were.

Figure 147:
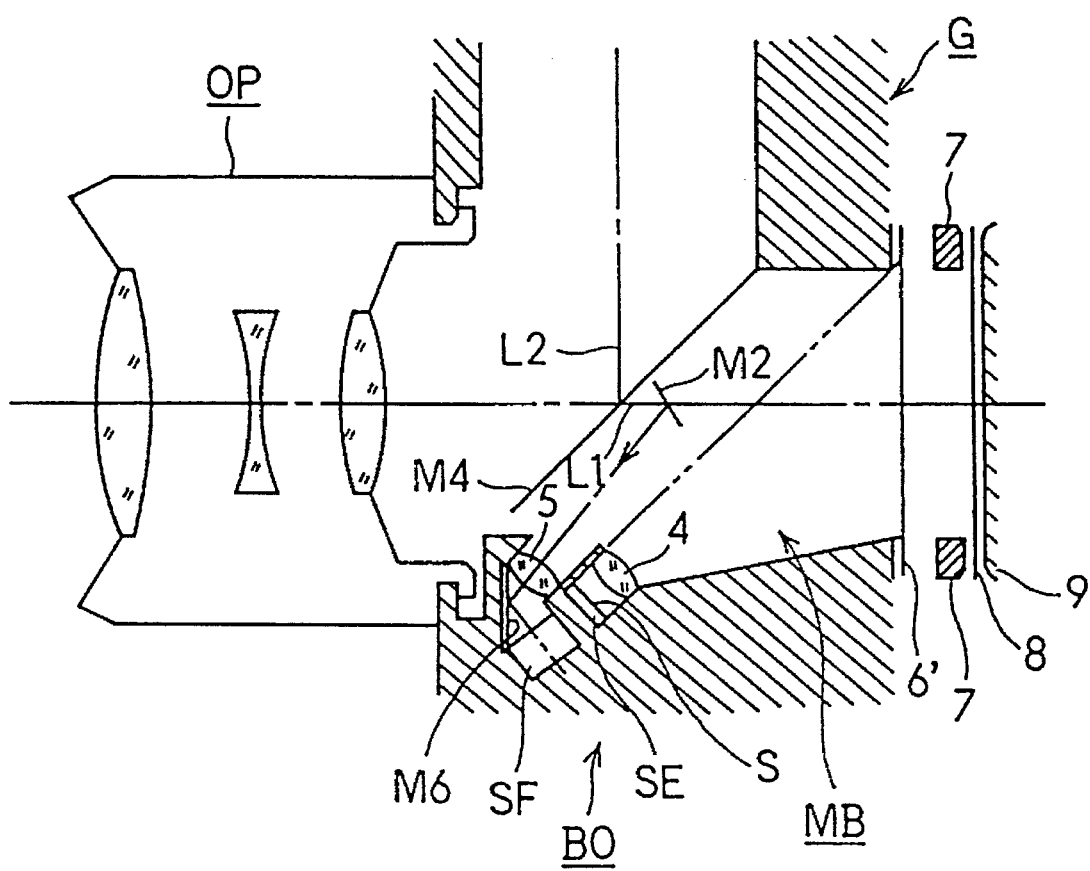
FIG. 147 is a vertical cross-sectional view of the construction of the principal portion of a twenty-third embodiment of the present invention.

FIG. 147 is a vertical cross-sectional view of the construction of the principal portion Of a twenty-third embodiment. This embodiment has the same construction as the twenty-second embodiment except that the positional relationship between the photometry device SE with the imaging lens 4 and the focus detection device with the imaging lens 5 are reversed, and therefore, this embodiment achieves the same effects as the previous embodiment. Additionally, in order to arrange the photometry device SE, the focus detecting device SF, and others more compactly, a mirror M6 for turning the light path directed to the focus detection device SF is arranged between the photometry device SF and the imaging lens 5.

Figure 148:
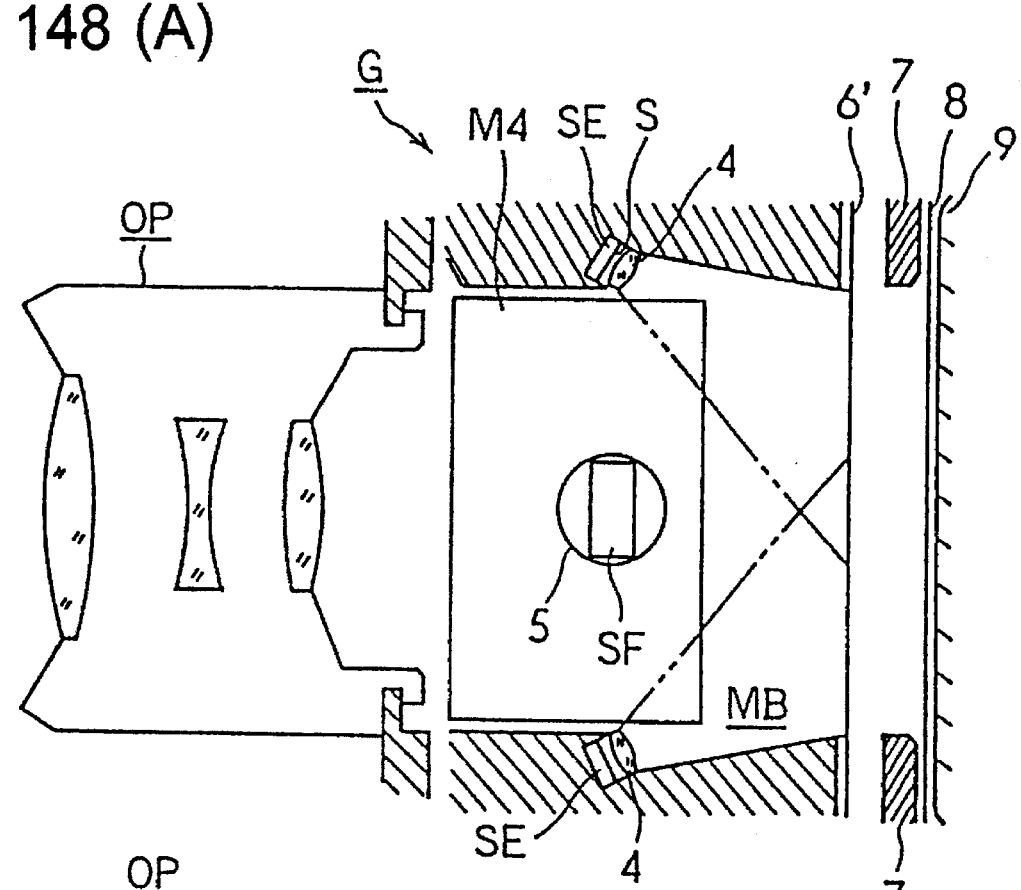
FIG. 148 is horizontal and vertical cross-sectional views showing the construction of the principal portion of a twenty-fourth embodiment of the present invention.
Figure 148:
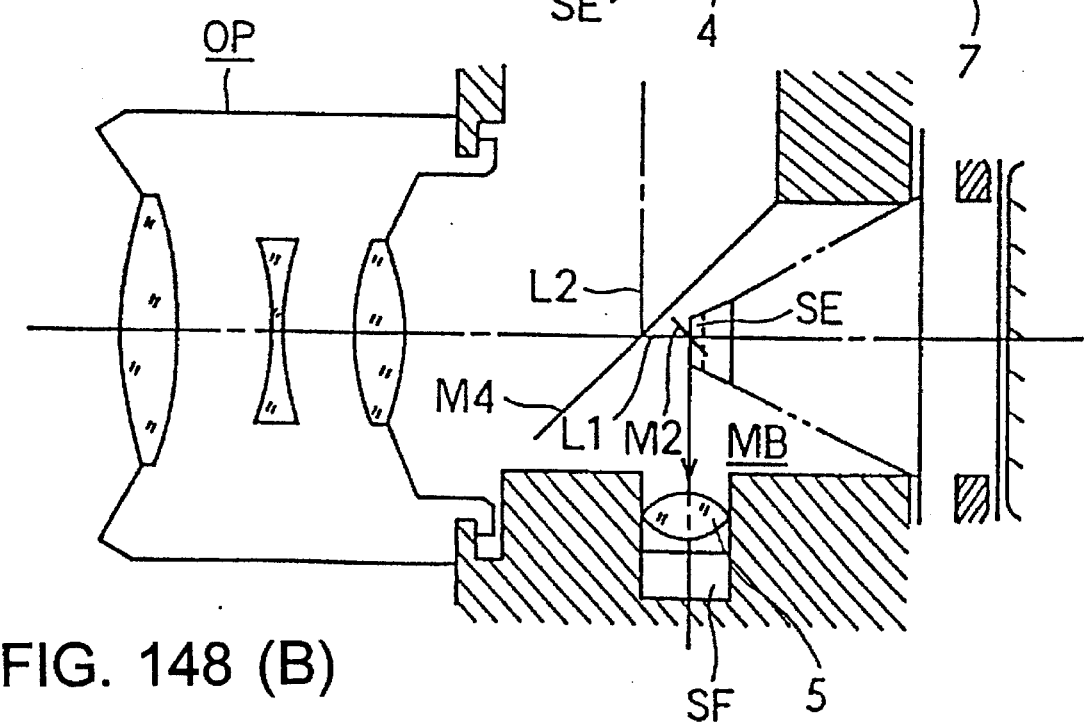

(A) of FIG. 148 is a horizontal cross-sectional view showing the construction of the principal portion of a twenty-fourth embodiment. (B) of FIG. 148 is a vertical cross-sectional view showing the construction of the principal portion of a twenty-fourth embodiment. This embodiment has the same construction as the twentieth embodiment except that a pair of the photometry device SE and the imaging lens 4 is arranged both to the left and to the right of the main mirror M4, and therefore, this embodiment achieves the same effects as the twentieth embodiment.

If the surface of the shutter 6' is observed obliquely, light beams of different diffusion angles enter the photoreceptive surface S depending on at which position of the shutter 6'-surface they have been diffused. This makes it difficult to obtain accurate photometry results. For this reason, in this embodiment, a pair of the photometry device SE and the imaging lens 4 are arranged both to the left and to the right of the main mirror M4, so that light beams diffused at similar diffusion angles on the shutter 6'-surface enter the two photo-receptive surfaces S, in order to improve photometry accuracy. Moreover, since it is relatively easy to secure spaces to the left and to the right of the main mirror M4 in connection with the mechanical construction, this construction conveniently allows flexible arrangement of components.

Figure 149:
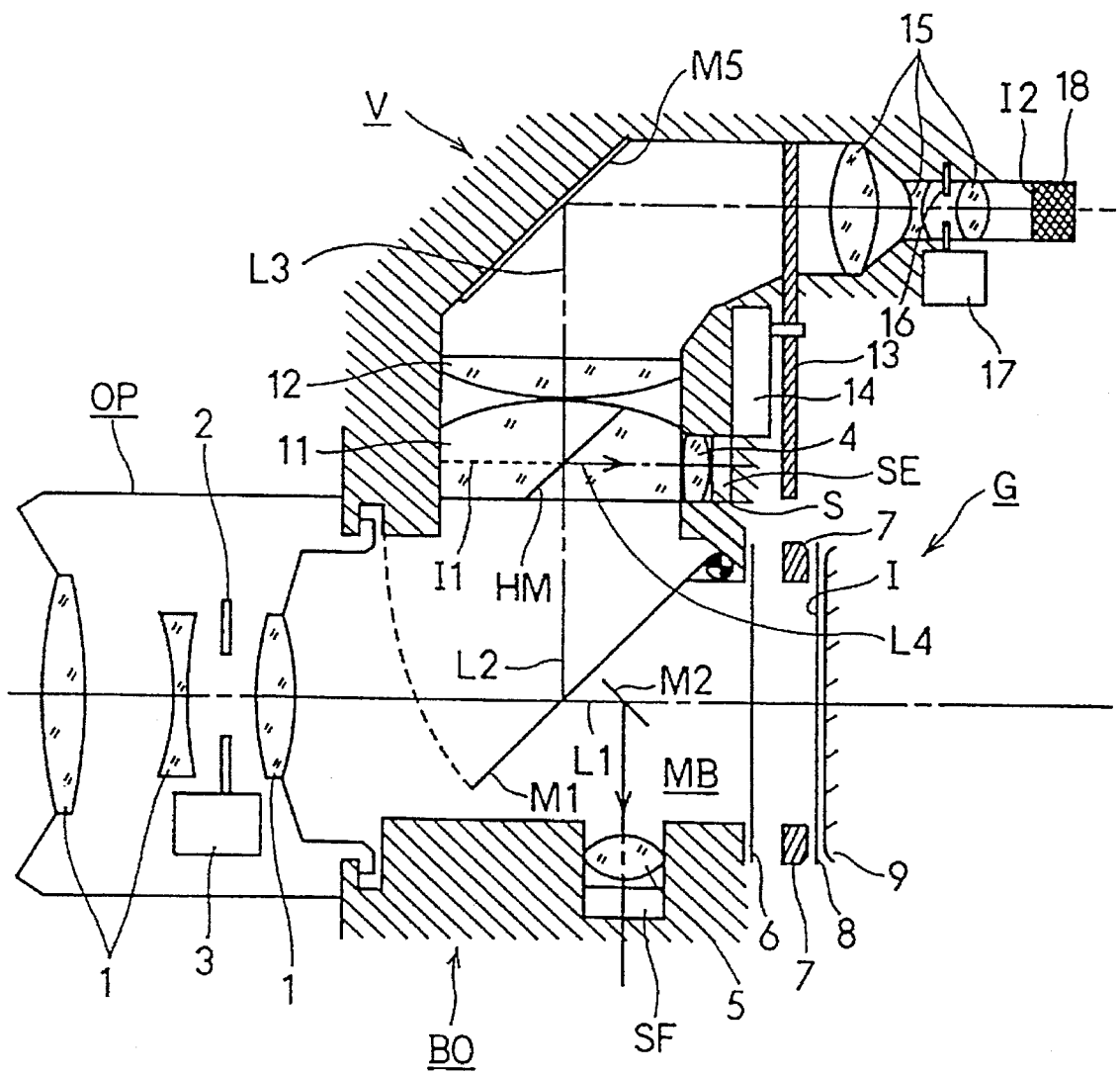
FIG. 149 is a vertical cross-sectional view showing the construction of an twenty-fifth embodiment of the present invention.
Figure 150:
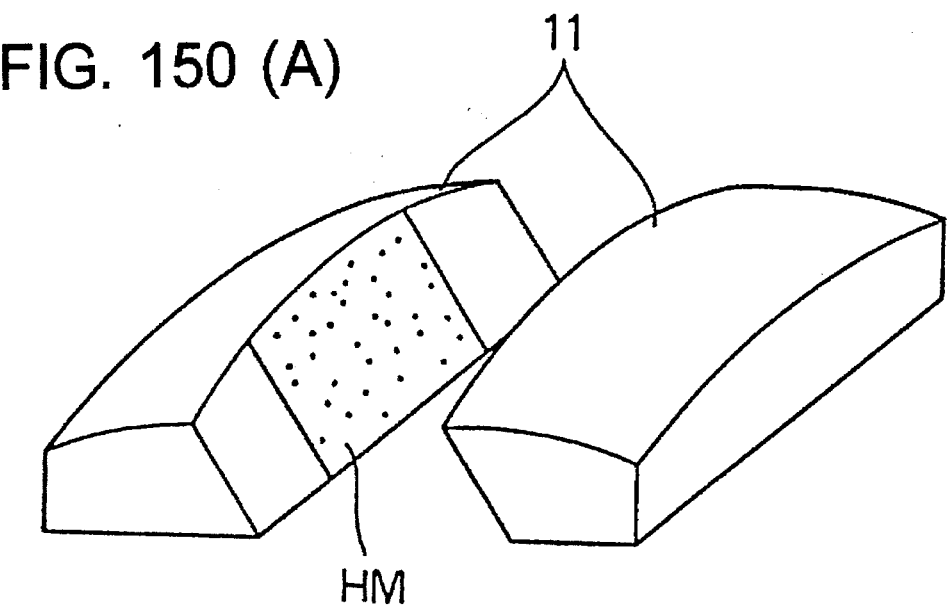
FIG. 150 is detail views of the condenser lens constituting the twenty-fifth embodiment of the present invention.
Figure 150:
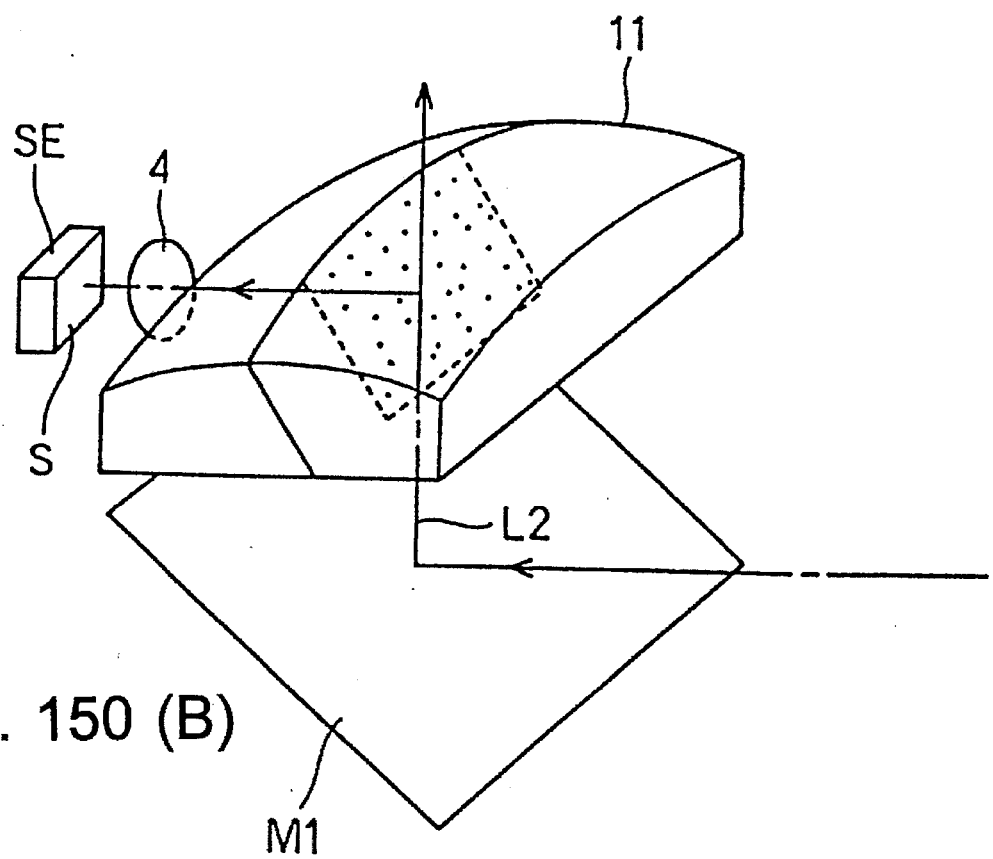

FIG. 149 is a vertical cross-sectional view showing the construction of an twenty-fifth embodiment. FIG. 150 shows a condenser lens 11 constituting the twenty-fifth embodiment. This embodiment has the same construction as the nineteenth embodiment except that a total reflection mirror M5 is provided instead of the mirror M3 (FIG. 143) for video shooting system V, and that the photometry device SE and the imaging lens 4 are arranged to the side of the condenser lens 11. Therefore, this embodiment achieves the same effects as the nineteenth embodiment.

The condenser lens 12 is the same as the upper lens of the condenser lens 10 (FIG. 143). The condenser lens 11 is, as shown in (A) of FIG. 150, a combination of a lens piece which has a semi-transparent membrane formed on its side, and another lens piece which is combined to the former so that the semi-transparent membrane is placed inside the resultant lens combination. As shown in FIG. 149 and (B) of FIG. 150, this condenser lens 11 is positioned so that a semi-transparent surface HM comprising the above-mentioned semi-transparent membrane is positioned in the vicinity of the primary image I1 which the second light beam L2 forms before reaching the image pickup device 18. Moreover, to the side of the condenser lens 11, an imaging lens 4 for imaging a light beam reflected by the semi-transparent surface HM and a photometry device SE are disposed.

Since the second light beam L2 is divided by the semi-transparent surface HM into a third light beam L3 and a fourth light beam L4, the third light beam L3 having passed through the semi-transparent surface HM travels toward the ND filter 13 to form a secondary image I2 on the image pickup device 18, whereas the fourth light beam reflected by the semi-transparent surface HM forms an image on the photo-receptive surface S through the imaging lens 4. Therefore, a secondary image is formed on the photo-receptive surface S of the photometry device SE by the light reflected by the semi-transparent surface HM. Since an image is formed on the photo-receptive surface S of the photometry device SE in such a way, it is possible to correctly perform photometry of the subject, and even to perform multiple division photometry (evaluative photometry). It is also possible to arrange a diffusive screen between the imaging lens 4 and the photometry device SE, so that the photometry device SE observes a secondary image formed on that diffusive screen.

As described above, since the fourth light beam L4 is not used for photometry by the photometry device SE, a photometry value is not affected by the ND filter 13 which controls the light amount of the third light beam L3, or by the relay aperture diaphragm 16. Accordingly, this embodiment achieves the same effects as the nineteenth embodiment in that it is possible to perform TTL photometry accurately. Provided that a fixed main mirror comprising a half-mirror is used instead of the main mirror M1, it is possible to prevent a blackout or an interruption of photometry, as described above, and it is also possible to use the photometry device SE both for ordinary open-aperture photometry, and for stop-down photometry for controlling the flash lighting during exposure.

Figure 151:
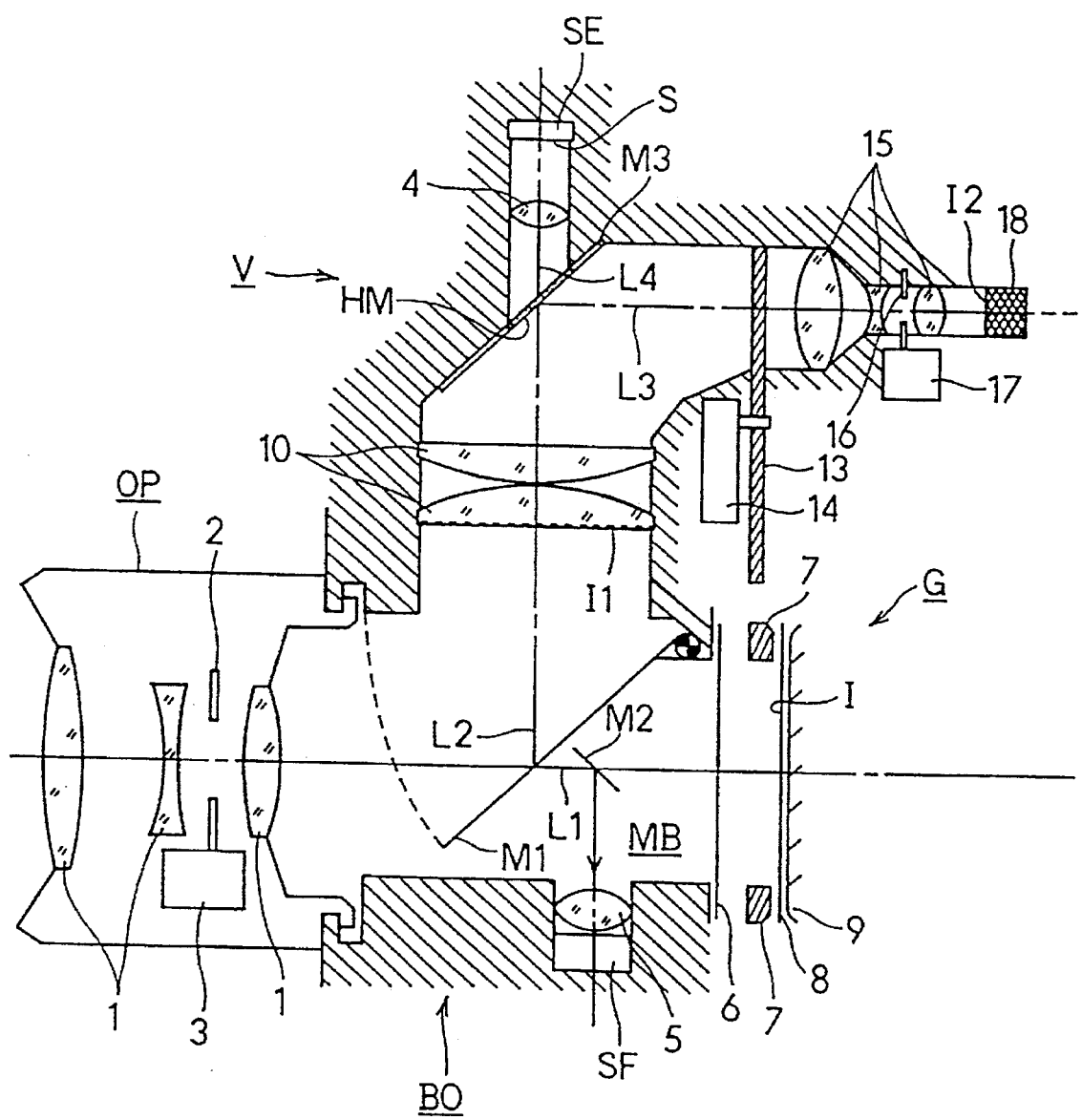
FIG. 151 is a vertical cross-sectional view of the construction of an twenty-sixth embodiment of the present invention.

FIG. 151 is a vertical cross-sectional view of the construction of an twenty-sixth embodiment. This embodiment has the same construction as the nineteenth embodiment except that the imaging lens 4 is provided between the semi-transparent surface HM Of the mirror M3 and the photometry device SE in the video shooting system V which the second light beam L2 enters. Therefore, this embodiment achieves the same effects as the nineteenth embodiment.

Since the second light beam L2 is divided by the semi-transparent surface HM into a third light beam L3 and a fourth light beam L4, the third light beam L3 reflected by the semi-transparent surface HM travels toward the ND filter 13 to form a secondary image I2 on the image pickup device 18, whereas the fourth light beam having passed through the semi-transparent surface HM forms an image on the photo-receptive surface S through the imaging lens 4. Therefore, a secondary image is formed on the photo-receptive surface S of the photometry device SE by the light having passed through the semi-transparent surface HM. Since an image is formed on the photo-receptive surface S of the photometry device SE in such a way, it is possible to correctly perform photometry of the subject, and even to perform multiple division photometry (evaluative photometry). It is also possible to arrange a diffusive screen between the imaging lens 4 and the photometry device SE, so that the photometry device SE observes a secondary image formed on that diffusive screen.

As described above, since the fourth light beam L4 is used for photometry by the photometry device SE, a photometry value is not affected by the ND filter 13 which controls the light amount of the third light beam L3, or by the relay aperture diaphragm 16. Accordingly, this embodiment achieves the same effects as the nineteenth embodiment in that it is possible to perform TTL photometry accurately. Provided that a fixed main mirror comprising a half-mirror is used instead of the main mirror M1, it is possible to prevent a blackout or an interruption of photometry, as described above, and it is also possible to use the photometry device SE both for ordinary open-aperture photometry, and for stop-down photometry for controlling the flash lighting during exposure.

Figure 152:
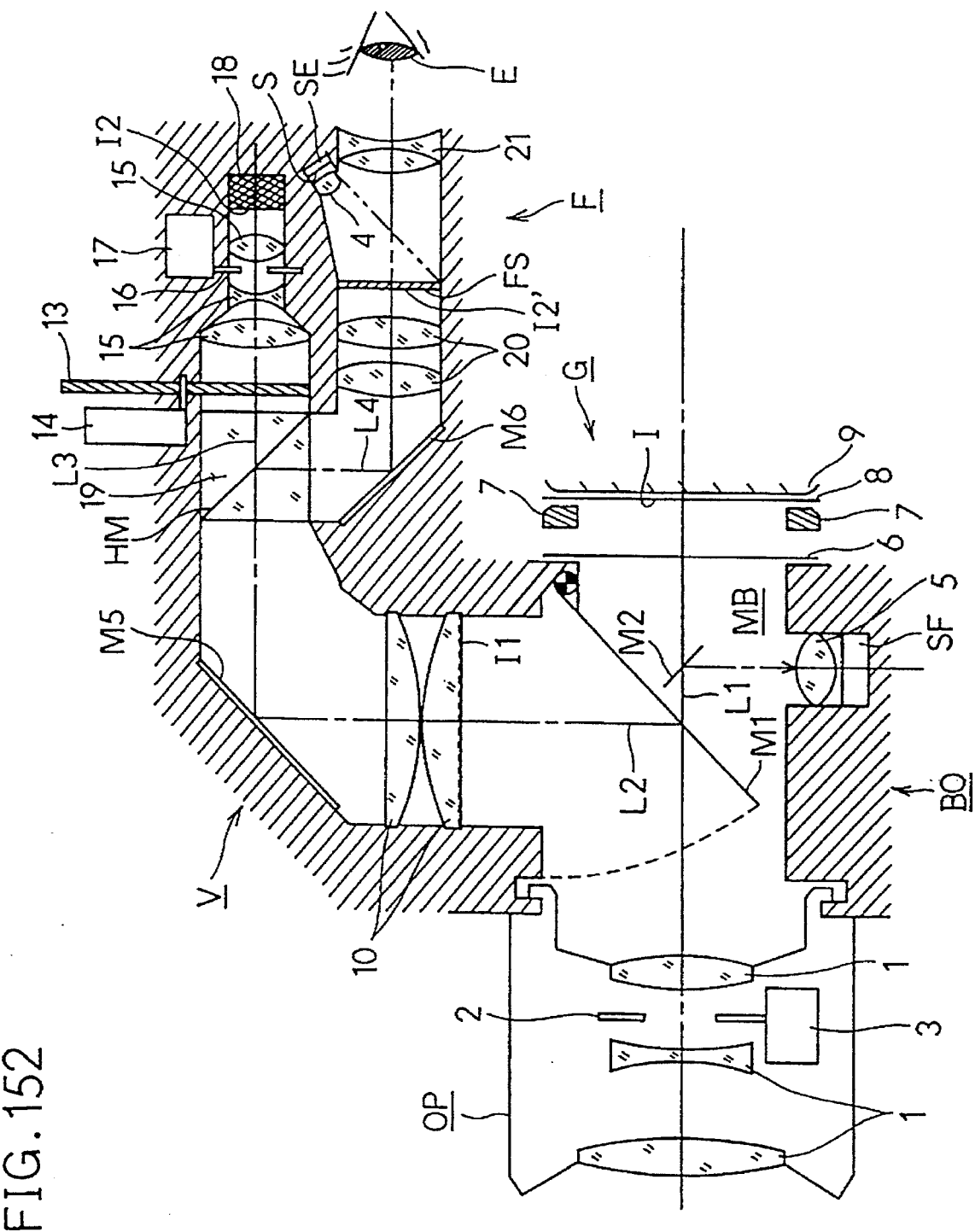
FIG. 152 is a vertical cross-sectional view showing the construction of an twenty-seventh embodiment of the present invention.

FIG. 152 is a vertical cross-sectional view showing the construction of an twenty-seventh embodiment. This embodiment has the same construction as the nineteenth embodiment except that a total reflection mirror M5 is used instead of the mirror M3 (FIG. 143) in the video shooting system V, and that a light division prism 19 and an optical viewfinder system F are additionally provided. Therefore, this embodiment achieves the same effects as the nineteenth embodiment. Instead of the light division prism 19, a half-mirror can be used.

Inside the light division prism 19, a semi-transparent surface HM is formed. This semi-transparent surface HM divides the second light beam L2 into a third light beam L3 and a fourth light beam L4. The third light beam L3 having passed through the semi-transparent surface HM travels to the ND filter 13 to form a secondary image I2 on the image pickup device 18, whereas the fourth light beam L4 reflected by the semi-transparent surface HM travels toward the optical viewfinder system F.

The optical viewfinder system F comprises a mirror M6, a relay lens 20, a focusing screen FS, an eyepiece 21, and others. The fourth light beam L4 is first reflected completely by the mirror M6, and forms an image on the focusing screen FS through the relay lens 20. The secondary image I2' formed on the focusing screen FS is observed by the eye E through the eyepiece 21, and is also used for photometry by the photometry device SE, which is so arranged that it looks down to the secondary image I2' from above, as it were.

Since an image is formed on the photo-receptive surface S of the photometry device SE by the light having passed through the focusing screen, it is possible to correctly perform photometry of the subject, and even to perform multiple division photometry (evaluative photometry).

As described above, since the fourth light beam L4 is used for photometry by the photometry device SE, a photometry value is not affected by the ND filter 13 for controlling the light amount of the third light beam L3, or by the relay aperture diaphragm 16. Therefore, this embodiment achieves the same effects as the nineteenth embodiment in that it is possible to perform TTL photometry accurately. Moreover, since an optical viewfinder system F is provided in addition to the video shooting system V, it is possible to observe a subject without activating the video shooting system V. Provided that a fixed main mirror comprising a half-mirror is used instead of the main mirror M1, it is possible to prevent a blackout or an interruption of photometry, as described above, and it is also possible to use the photometry device SE both for ordinary open-aperture photometry, and for stop-down photometry for controlling the flash lighting during exposure.

As described above, according to the nineteenth to twenty-seventh embodiments, since photometry is performed with a light beam which has passed through a taking lens but which has not entered a light amount controller, it is possible to perform TTL photometry highly accurately without using an image pickup device as a photometry device. Consequently, it is possible to prevent overexposure, as will occur in the initial stage of video shooting when an image pickup device is used for photometry, of the image pickup device, and it is possible to correctly control not only the light amount in video shooting but also the exposure in the silver salt film shooting system. Moreover, the above-mentioned overexposure occurs only in the initial stage of video shooting, it is possible to perform photometry in moving-picture video shooting at first using the photometry device in the beginning of a shooting session, and thereafter, using only the image pickup device. Further, since the second light beam is constantly formed by a light divider, and is constantly received by a photometry device, it is possible to perform photometry with a photometry device even in the middle of silver salt film shooting.

Moreover, although a camera according to these embodiments has functions for both silver salt film shooting and video shooting, since the same taking lens is used by both a silver salt film shooting system and a video shooting system, and since TTL photometry is performed with a light beam having passed through the taking lens, the camera does not cause parallax, and no problem occurs when the shooting angle of the taking lens is changed by using, e.g., a zoom lens.

Further, since it is possible to control an aperture diaphragm and to set an ND filter before activating video circuitry, and to control the aperture diaphragm and to set the ND filter again after operation of video circuitry, it is possible to prevent overexposure, as will occur in the initial stage of video shooting, of the image pickup device with the help of the aperture diaphragm and the ND filter, even if the absolute value of the aperture is unknown. Moreover, if an ND filter is used together with an aperture diaphragm as a light amount controller, it is possible to prevent degradation of picture quality due to diffraction by means of the ND filter.

Moreover, since a photometry device can be arranged with a high degree of flexibility, it is possible to make the whole camera compact. Further, if the photometry device is so arranged that an image is formed on the photo-receptive surface of the photometry device, it is possible to correctly meter the subject, and it is also possible to perform multiple division photometry or direct photometry in flash shooting.

Moreover, provided that the camera is so constructed that a light beam remaining after separation of a light beam for a photosensitive material is received by the photometry device, it is possible to perform photometry with the photometry device even in the middle of silver salt film shooting.

Figure 153:
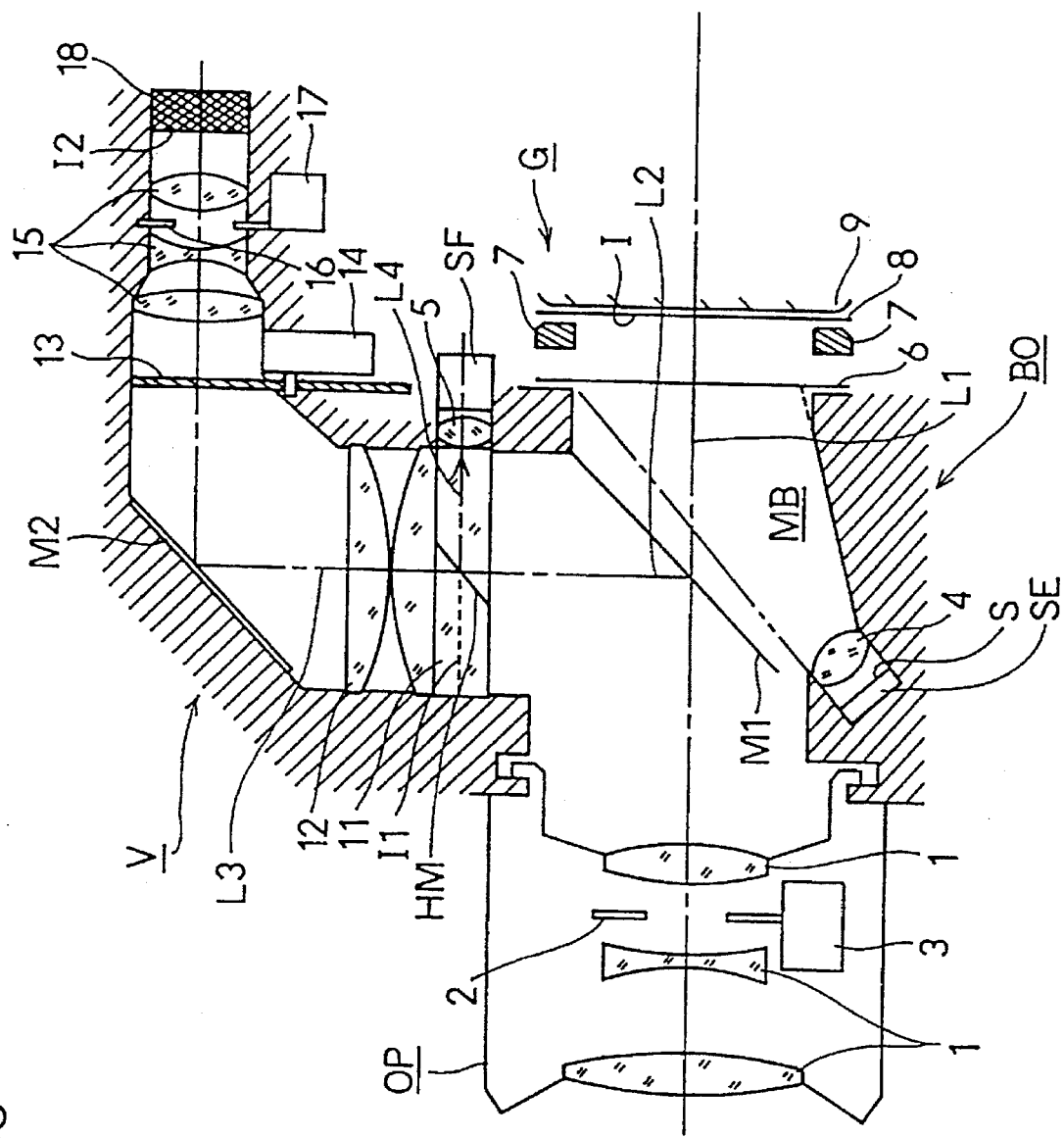
FIG. 153 is a vertical cross-sectional view showing the construction of a twenty-eighth embodiment of the present invention.
Figure 154:
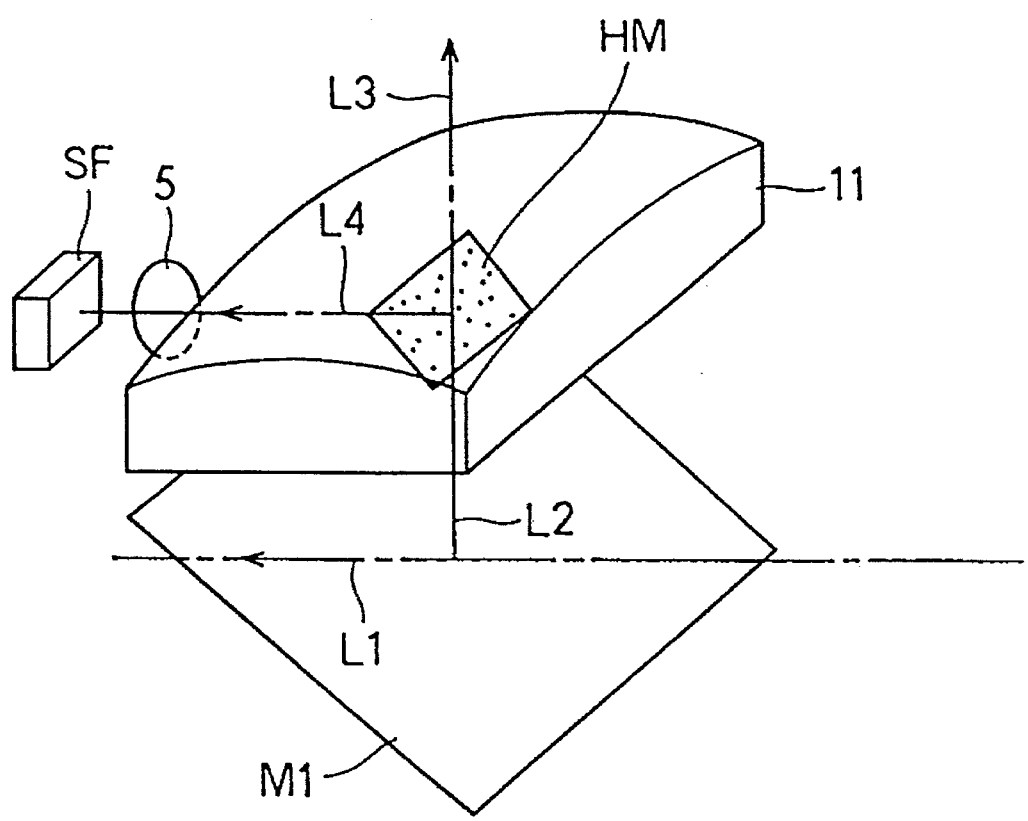
FIGS. 154 to 156 are detail views of the condenser lens constituting the twenty-eighth embodiment.
Figure 155:
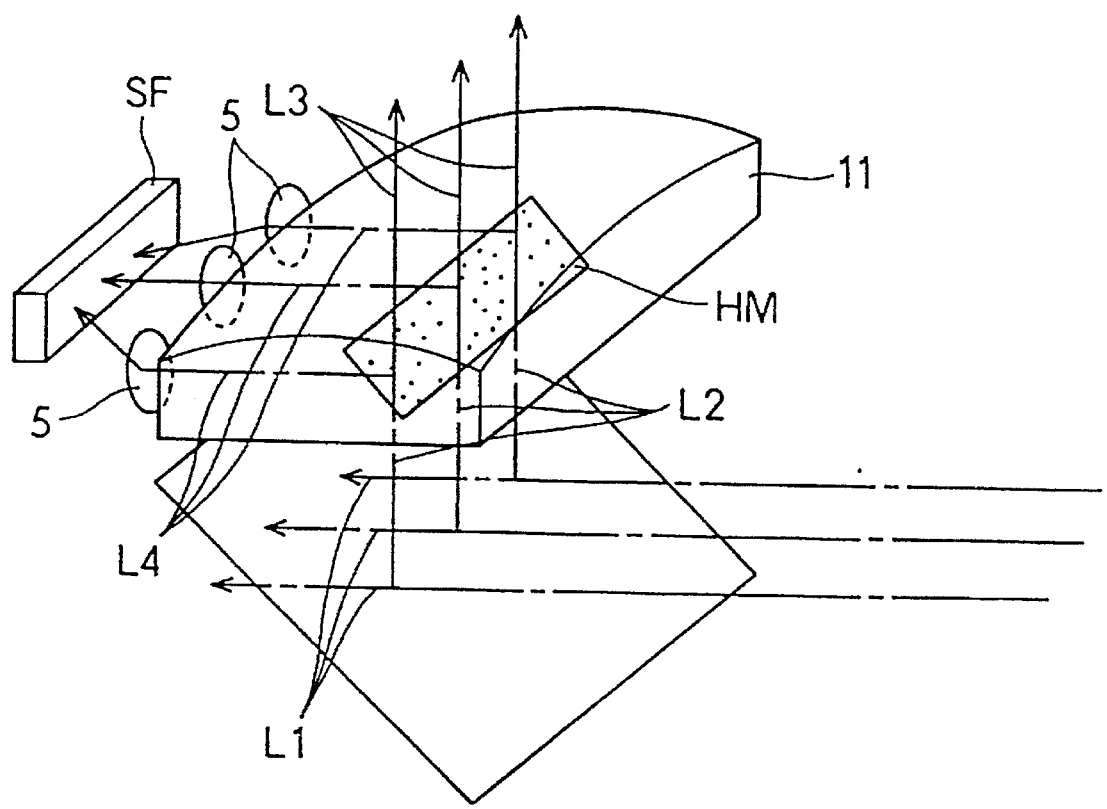
Figure 156:
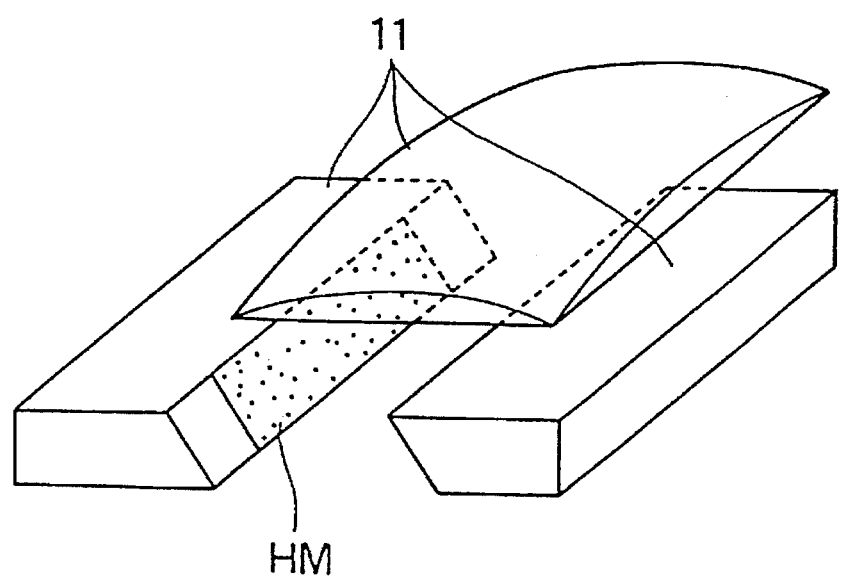

FIG. 153 is a vertical cross-sectional view showing the construction of the twenty-eighth embodiment. FIGS. 154 to 156 show a condenser lens 11 constituting this embodiment.

A camera of this embodiment comprises a lens barrel OP and a camera body BO. The lens barrel OP is provided with a taking lens 1, an aperture diaphragm 2 for controlling a light beam incident on the taking lens 1, and an aperture controller 3 for controlling the aperture diaphragm 2. The camera body BO is provided with a main mirror M1, a silver salt film shooting system G, a video shooting system V, a photometry device SE, a focus detection device SF, and others.

The main mirror M1 is a fixed half-mirror (a pellicle mirror, for example) for dividing a light beam having passed through the taking lens 1 into a first light beam L1 for silver salt film shooting and a second light beam L2 for both a viewfinder and video shooting. In the figure, each light path is represented by an approximate optical axis.

The video shooting system V is provided with an image pickup device comprising an area CCD (charge coupled divide) which is disposed at the position of the secondary image I2 formed by part of the second light beam L2 (a third light beam L3). The video shooting system V is provided also with condenser lenses 11 and 12, a total reflection mirror M2, an ND filter 13, an ND filter controller 14, a relay lens 15, a relay aperture diaphragm 16, and a relay aperture controller 17.

The second light beam L2 obtained by light beam division in the main mirror M1 first enters condenser lenses 11 and 12. The condenser lenses 11 and 12 are light-gathering lenses for leading part of the second light beam L2 (the third light beam L3) to the relay lens 15, and an primary image I1 is formed as an aerial image in the vicinity of the incident surface of the condenser lenses 11 and 12. In an ordinary single lens reflex camera, a focusing screen is disposed in the vicinity of the image plane of the primary image I1. However, in order to prevent degradation of video picture quality, there is no focusing screen in this embodiment.

As shown in FIG. 156, the condenser lens 11 comprises three lens pieces, one piece having a semi-transparent film formed on its side, and three pieces combined together so that the semi-transparent film is positioned inside the lens as a whole. As shown in FIG. 153, the condenser lens 1 is so positioned that the semi-transparent surface HM formed with the semi-transparent film is positioned in the vicinity of the image plane of the primary image I1 which the second light beam L2 forms before reaching the image pickup device.

Since the semi-transparent surface HM is positioned in the vicinity of the image plane of an image formed by the second light beam L2 in this way, the semi-transparent surface HM can be made smaller than in the case where the semi-transparent surface HM is positioned away from the vicinity of the image plane. Therefore, it is possible to make the semi-transparent surface HM compact. As a result, it is possible to prevent the construction of the condenser lens 11 including the semi-transparent surface from being compli-cated and bulky. Moreover, since light beam division is performed in the light path of the light beam having passed through the taking lens 1, an interchangeable lens for ordinary single lens reflex cameras can be used as the taking lens 1. In contrast, in a construction where a light beam for focus detection is extracted from the middle of the taking lens 1, the taking lens 1 needs to be equipped with a light division means, a focus detection means and others, and therefore, it is not possible to use a conventional interchangeable lens as the taking lens. Instead of the condenser lens 11 including the semi-transparent surface HM, it is also possible to use a combination of a half-mirror serving as the semi-transparent surface HM and a condenser lens.

FIGS. 154 and 155 show practical examples of the condenser lens 11. FIG. 154 shows a condenser lens 11 which is used for detecting focus only in the central portion of the imaging area. On the other hand, FIG. 155 shows a condenser lens which is used for detecting wide-area focus (multiple-point detection), and therefore, its semi-transparent surface HM is larger than that formed on the condenser lens shown in FIG. 154.

The second light beam L2 extracted from the main mirror M1 is divided by the semi-transparent surface HM into a third light beam L3 for video shooting and a fourth light beam L4 for focus detection. The third light beam L3 having passed through the semi-transparent surface HM travels to the ND filter 13 to form a secondary image I2 on the image pickup device. On the other hand, to the side of the condenser lens 11, an imaging lens 5 for imaging the fourth light beam reflected by the semi-transparent surface HM and a focus detection device SF comprising a line CCD are arranged, the fourth light beam forms an image on the focus detection device SF through the imaging lens 5. Thereafter, based on the defocus information obtained from the focus detection device SF, focus detection is performed according to the phase-difference detection method. Incidentally, since the phase-difference detection method and the contrast detection method each have their own advantages and disadvantages, it is desirable to construct the camera to be capable of switching between detection with the focus detection device SF according to the phase-difference detection method and detection with the image pickup device 18 according contrast detection method.

A total reflection mirror M2 is disposed to the rear of the condenser lens 12. The third light beam L3 reflected by the total reflection mirror M2 enters the disk-shaped ND filter 13. The ND filter 13 is a light amount controller for controlling (restricting) the light amount of the third light beam L2 directed to the image pickup device 18. Since areas of different light transmittances are formed and arranged every predetermined rotation angle in the ND filter 13, it is possible to reduce light amount with a desired transmittance by rotating the ND filter 13 so that an area of a certain transmittance is positioned in the path of the second light beam L2. The rotation angle position of the ND filter 13 is controlled by the ND filter controller 14 based on the photometry results obtained from the photometry device SE.

The third light beam L3 having passed through the ND filter 13 enters the relay lens 15. The relay lens 15 leads the third light beam L3 to the image pickup device 18, so that a secondary image I2 is formed on the image pickup device 18. The relay lens 15 is provided with a relay aperture diaphragm 16 serving as a light amount controller for controlling the light amount of the third light beam L3 directed to the image pickup device 18. The aperture of the relay aperture diaphragm 16 is controlled by the relay aperture controller 17 based on the photometry values obtained from the later described photometry device SE.

As described above, since the ND filter 13 is used together with the relay aperture diaphragm 16 to control the light amount incident on the image pickup device, it is possible to prevent fuzziness due to diffraction even if the absolute value of the relay aperture diaphragm 16 is unknown, and it is thus possible to prevent degradation of picture quality due to diffraction.

The secondary image I2 formed on the image pickup device 18 is recorded on a recording medium (not shown in the figure) as a signal outputted from the image pickup device according to the electronic photographing method. With the above-described recording of an image onto the recording medium, video shooting is completed. However, the signal from the image pickup device is also used to display an image in a liquid crystal display viewfinder (not shown in the figure). Looking at the liquid crystal display viewfinder, the operator can take a silver salt film picture by turning ON the release button (not shown in the figure; a half-way press of the release button starts photometry, and a full press of the release button starts exposure of the film), or shoots a moving-picture or still-picture video by turning ON the recording button (not shown in the figure).

Whereas the exposure control in the silver salt film shooting system G is always realized based on photometry values obtained from the photometry device SE, the light amount control in the video shooting system V, during shooting of a moving picture, is realized at first based on the photometry values obtained from the photometry device SE in the beginning of a shooting session, and thereafter, through a feedback control in which the image pickup device 18 is used as a photometry device.

In the silver salt film shooting system G, a shutter 6 and film rails 7 are disposed in front of a film 8 so that the film 8 is positioned at the position where the first light beam L1 forms an image, and a film pressing plate 9 is disposed behind the film 8. Therefore, just as in an ordinary single lens reflex camera, an image I formed on the surface of the film 8 is recorded according to the silver salt photographing method (that is, the film is exposed to light). Instead of the film 8, it is possible to use another recording medium that can be used for recording according to the silver salt photographing method.

The light-interruption surface of the shutter 6' has a reflectance substantially equal to that of the film 6. At the bottom of the mirror box MB, an imaging lens 4 for imaging the light (shown with a phantom line in the figure) reflected on the surface of the shutter 6' is disposed, and the photometry device SE comprising an SPC (silicone photo cell) is so arranged that the imaging lens 4 forms an image on the photo-receptive surface S. A photometry value obtained from the photometry device SE is used to control the aperture controller 3 and a shutter-speed controller (not shown in the figure) in the silver salt film shooting system G, and to control the ND filter controller 14 and the relay aperture controller 17 in the video shooting system V.

Since the photometry device SE observes diffused light reflected by the shutter surface in the vicinity of the film surface, just as a conventional TTL photometry device does, photometry is performed with the first light beam L1, which is a portion of the light beam having passed through the taking lens 1 but which has not entered the ND filter 13 and the relay aperture diaphragm 16. Accordingly, a photometry value is not affected by the ND filter 13 or the relay aperture diaphragm 16, and therefore, it is possible to perform TTL photometry accurately.

Since the focus detection device SF is disposed above the main mirror, it is not necessary to arrange an AF mirror at the rear of the main mirror. As a result, the reflected light beam directed to the photometry device SE is not interrupted. In other words, even if the photometry device SE is arranged in a position where it looks up to the shutter 6' surface from the bottom of the mirror box, as it were, since there in no interruption by an AF mirror, it is possible to arrange the main mirror M1 with a high degree of flexibility, and to perform photometry accurately.

Further, since an image is formed on the photo-receptive surface S of the photometry device SE with the light reflected on the surface of the shutter 6, it is possible to correctly perform photometry of the subject, and it is possible to perform not only averaging photometry or center-weighted photometry but also multiple division photometry (evaluative photometry). Moreover, it is also possible to use the photometry device SE both for ordinary open-aperture photometry, and for stop-down photometry for controlling the flash lighting (TTL direct photometry in flash shooting) during exposure.

Moreover, as long as this photometry device SE is used, it is not necessary to use the image pickup device 18 for photometry purposes. As a result, it is possible to activate the ND filter 13 and the relay aperture diaphragm 18 before activating video circuitry (not shown in the figure), and to activate them again after operation of the video circuitry, based on photometry values obtained from the photometry device SE. In other words, it is possible to control the relay aperture diaphragm 16 and set the ND filter 13 before the actuation of the video circuitry, and it is also possible to control the relay aperture diaphragm 16 and set the ND filter 13 again after the operation of the video circuity. Consequently, it is possible to prevent overexposure, as will occur when the image pickup device is used for photometry purposes, of the image pickup device 18 in the initial stage of video shooting, and therefore, it is possible to correctly control not only the light amount in video shooting but also the exposure in silver salt film shooting.

As described above, according to this embodiment, since the fourth light beam L4 for focus detection is obtained through division of the second light beam L2 by the semi-transparent surface HM, focus detection does not necessitates an AF mirror nor a retraction mechanism thereof. Accordingly, it is possible to perform focus detection without the provision of a retraction mechanism for an AF mirror. In other words, if an AF mirror is conventionally disposed to the rear of the main mirror, it is necessary to retract the AF mirror during silver salt film shooting, but, if there is no AF mirror as described above, it is not necessary to provide mechanisms such as an AF mirror retraction mechanism, and therefore, it is possible to simplify the construction.

Moreover, in this embodiment, since the second light beam L2 is always generated by the main mirror M1 serving as the first light division means and the fourth light beam L4 is always generated by the semi-transparent surface HM serving as the second light division means, the focus detection device SF always receives the fourth light beam L4. Accordingly, focus detection information is always obtained from the focus detection device SF. For example, it is possible to obtain focus detection information for video shooting even in silver salt film shooting, and it is possible to prevent a blackout or an interruption of not only focus detection but also photometry even if a silver salt picture is taken during video shooting.

Since focus detection is performed according to the phase-difference detection method, it is possible to perform focus detection accurately enough for silver salt film shooting which requires quickness in focus detection. Accordingly, it is possible to realize functions for both silver salt film shooting and video shooting with a capability of quick focus detection in either type of shooting. Moreover, since the taking lens 1 is used by both the silver salt film shooting system G and the video shooting system V, and since TTL focus detection and photometry are performed with a light beam having passed through the taking lens 1, it is possible to prevent parallax between shooting and focus detection/photometry, and no problem occurs when the shooting angle of the taking lens 1 is changed by using, e.g., a zoom lens.

If the lens barrel OP is designed to be exchangeable for a conventional interchangeable lens for ordinary single lens reflex (SLR) cameras, it will have a flange back equal to that of the conventional lens. As a result, the space which has conventionally been secured for swinging up of a total reflection mirror in the conventional SLR cameras is obtained as a free space existing to the front of the main mirror M4 which is a fixed half-mirror. Then, if the main mirror is arranged farther forward than the main mirror of the conventional SLR cameras, a free space is available on the shutter 6-side of the mirror box. By arranging components in this space, it is possible to make the camera body BO more compact accordingly.

Next, prior to descriptions on twenty-ninth to thirty-second embodiments of the present invention, a conventional camera will be described below.

Figure 167:
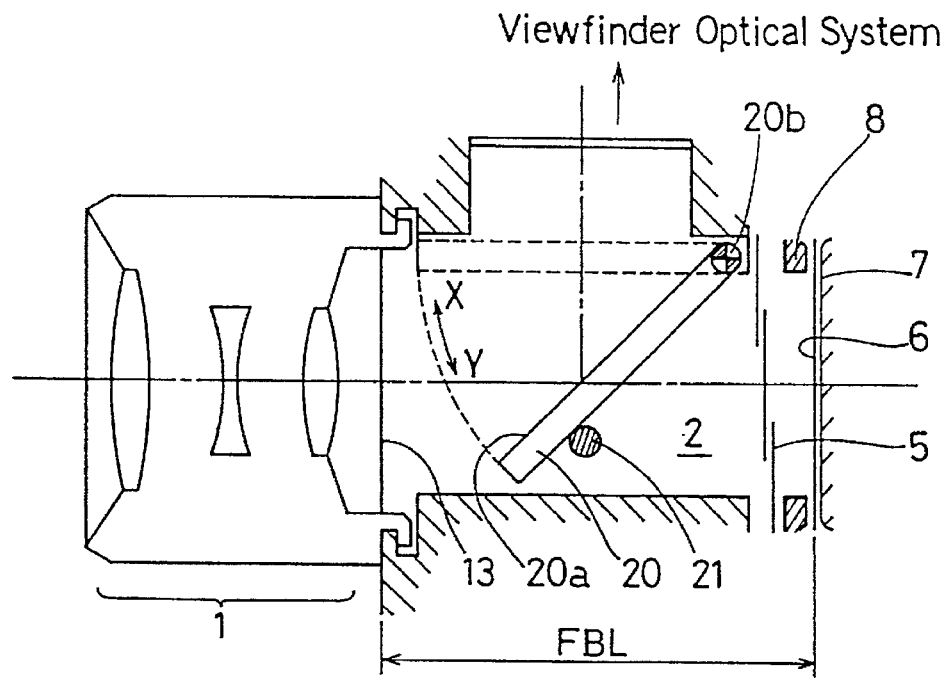

FIG. 167 is an outline construction diagram showing the optical system, with a mirror box 2 as its central portion, of a conventional single lens reflex camera. As shown in this figure, the optical system of a conventional single lens reflex camera comprises an interchangeable lens 1 serving as a main optical system, a mirror box 2 to which a light beam from the subject is directed through the interchangeable lens 1, a mirror supported in the mirror box to be rotatable about a pivot 20b, a film exposure surface 6 on which the light beam from the subject forms an image when the mirror 20 is adequately shifted in the direction X, and a viewfinder optical system to which the light beam coming from the subject and reflected by a mirror surface 20a is directed when the mirror 20 is adequately shifted in the direction Y.

Except when the shutter is released, the mirror 20 is shifted in the direction Y. There, the mirror 20 is normally supported to be at 45 degrees with respect to the optical axis of the main optical system, and, to obtain a correct angle, a positioning member 21 is provided. When the shutter is released, in contrast, the mirror 20 swings up in the direction X.

The film exposure surface 6 has shutter curtain 5 on its mirror 20-side, and, when the shutter is released, this shutter curtain 5 travels synchronously with the mirror 20 to lead the light beam incoming from the main optical system onto the film exposure surface 6. Moreover, in order to place the film exposure surface 6 in a predetermined position, a film is positioned by means of a pressing plate 7 and film rails 8. The silver salt film shooting system comprises the film exposure surface 6, the shutter curtain 5, and other components.

It is to be noted that the distance FBL from the flange surface 13 at the rear of the lens barrel for holding the interchangeable lens 1 to the film exposure surface 6 is called a flange back, and that the flange back is normally kept constant in a series of single lens reflex cameras so that the same interchangeable lens 1 can be used with any camera in the series.

In a conventional single lens reflex camera, since it is necessary to secure a space for the rotation of the mirror 20 in the mirror box 2 to the rear of the lens barrel of the interchangeable lens 1, the mirror 20 is arranged to be as distant as possible from the flange surface 13 at the rear of the lens barrel of the interchangeable lens 21. In such a case, if the flange back FBL is kept constant, the mirror 20 is arranged nearer to the shutter curtain.

There is another type of conventional single lens reflex cameras in which a fixed half-mirror is provided instead of a movable mirror 20. In this type of camera, the light beam incoming through the main optical system from the subject is divided by the half-mirror into two light beams, and one of the divided light beam reaches a silver salt film shooting system, whereas the other light beam enters a viewfinder optical system. In this case, since the half-mirror is not rotatable, it is theoretically possible to arrange the half-mirror nearer to the flange surface at the rear of the lens barrel of the interchangeable lens. However, in practice, the half-mirror is generally arranged nearer to the shutter curtain for the purpose of sharing components with cameras with a movable mirror but of the same series.

In many of such single lens reflex cameras, in order to perform available light photometry or flash light photometry, the photometry device is arranged in a position where the primary image plane (theoretically the film exposure surface, though the shutter curtain serves as an approximate primary image plane during available light photometry) can be directly observed within its photometry range, specifically, between the mirror or half-mirror and the shutter curtain. In this case, during flash shooting, flash lighting control is achieved by the photometry device's reception of the light reflected by the film exposure surface, independently of whether a mirror or a half-mirror is used.

However, in a single lens reflex camera as described above, since only a limited space is available between the mirror or half-mirror and the shutter curtain on the side surface of the mirror box to arrange the photometry device and the focus detecting device, the layout has been apt to be congested.

Figure 168:
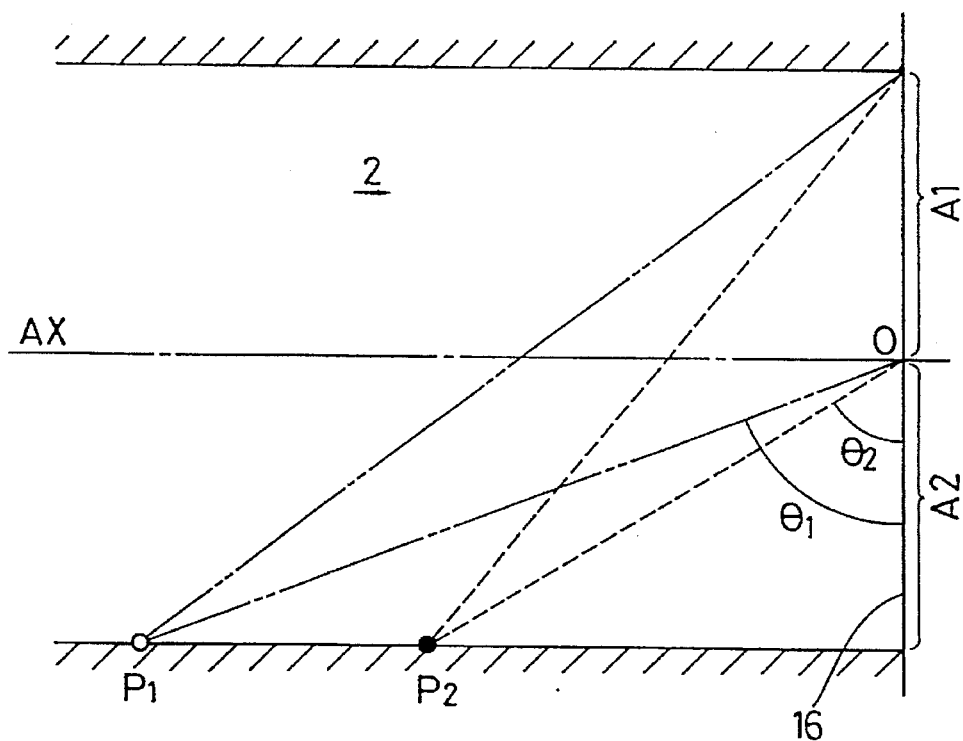

As a result, with respect to the area of the primary image plane (film exposure surface or shutter curtain) to be observed within the photometry range of the photometry device, the photometry device is arranged obliquely (that is, positioned nearer to the primary image plane). In this case, as shown in FIG. 168, if the photometry device is positioned in the position P2 which is nearer to the primary image plane 16 than the position P1 on the side of the mirror box 2, supposing that the intersection between the optical axis AX directed to the primary image plane 16 and the primary image plane 16 is referred to as O, the angle θ2 of the line OP2 with respect to the primary image plane 16 is smaller than the angle θ1 of the line OP1 with respect to the primary image plane 16. Therefore, the difference between the angles, with respect to the primary image plane, of the two lines, one from a point in the area A1 on the primary image plane to the photometry device and the other from a point in the area A2 on the primary image plane 16 to the imaging device, is greater than when the photometry device is arranged in the position P1.

The light incident on the primary image plane 16 (film exposure surface or shutter curtain) is reflected irregularly. The strength of light thus irregularly reflected is not distributed equally. More specifically, as the direction is closer to the normal to the primary image plane, the more light is reflected in that direction. Therefore, when the photometry device is arranged in the position P2, even if a light beam of the same strength is incident on a point in the area A1 and on a point in the area A2 both on the primary image plane 16, the amount of light reflected from the point in the area A2 toward the photometry device is greater than the amount of light reflected from the point in the area A1. In addition, when the photometry device is arranged in the position P2, the difference is greater than when the photometry device is arranged in the position P1.

Moreover, when the photometry device is arranged in the position P2, the distance from the point in the area A1 to the photometry device is longer than the distance from the point in the area A2 to the photometry device, and the difference is greater than when the photometry device is arranged in the position P1. Therefore, even if a negligibly small area in the area A1 and a negligibly small area in the area A2 reflects the same amount of light per unit area toward the photometry device arranged in the position P2, the amount of light the photometry device receives from the negligibly small area in the area A2 is greater than the amount of light the photometry device receives from the negligibly small area in the area A1. In addition, when the photometry device is arranged in the position P2, the difference is greater than when the photometry device is arranged in the position P1.

For these reasons, when the photometry device is arranged in the position P2, even if the same amount of light per unit area is incident on the area A1 and area A2 both on the primary image plane 16, the amount of light reflected by the area A2 is greater than the amount of light reflected by the area A1. In other words, if observed from the photometry device, the area A2 is brighter than the area A1. In addition, the difference is greater than when the photometry device is arranged in the position P1.

As a result, a conventional single lens reflex camera is defective because, if the mirror or half-mirror is arranged near to the shutter curtain within the mirror box, and if the photometry device is arranged between the mirror or half-mirror and the shutter curtain, it is impossible to perform correct photometry covering the whole primary image plane (film exposure surface or shutter curtain).

Moreover, when multiple division photometry is performed with respect to the primary image plane, photometry accuracy varies depending on which area on the primary image plane is targeted, for the same reasons as described above. To remove such variation, it is necessary to compensate the detection output obtained from each area of the photometry surface of the photometry device for the error due to the difference of photometry characteristic in the corresponding area on the primary image plane.

Figure 169:
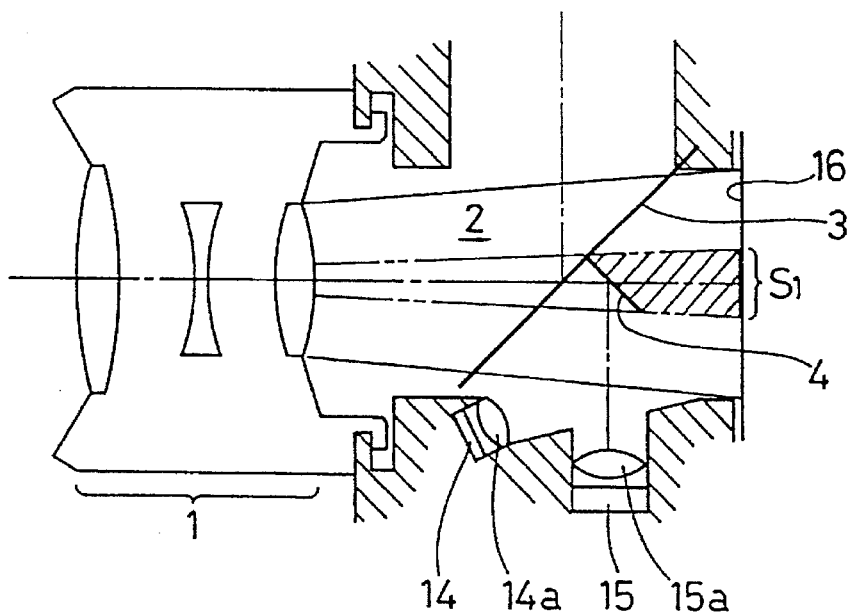

Further, as shown in FIG. 169, in a conventional single lens reflex camera provided with a half-mirror 3 for dividing a light beam incoming from an interchangeable lens 1 into two light beams, a mirror 4 (hereinafter referred to as AF mirror) for reflecting part of the light beam having passed through the half-mirror 3 and for leading the thus reflected light beam through a convex lens 15a for imaging to a focus detection device 15 is generally disposed on the primary image plane 16-side of the half mirror 3. Therefore, it is inevitable that a shadow S1 of this AF mirror 4 appears on the primary image plane 16.

Figure 170:
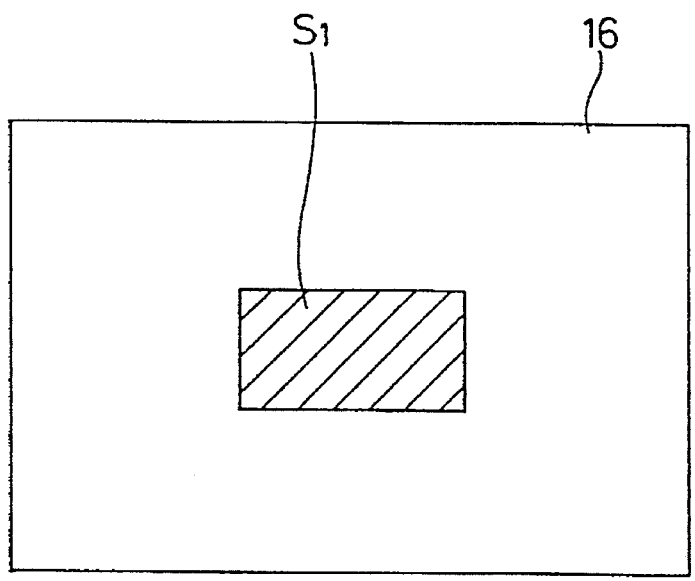
Figure 171:
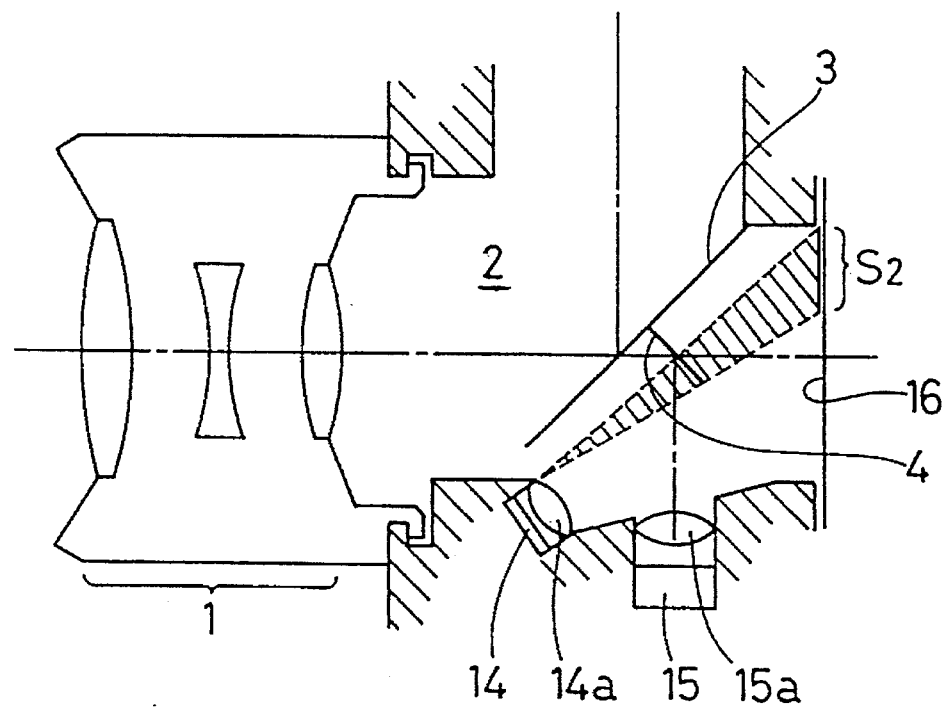
Figure 172:
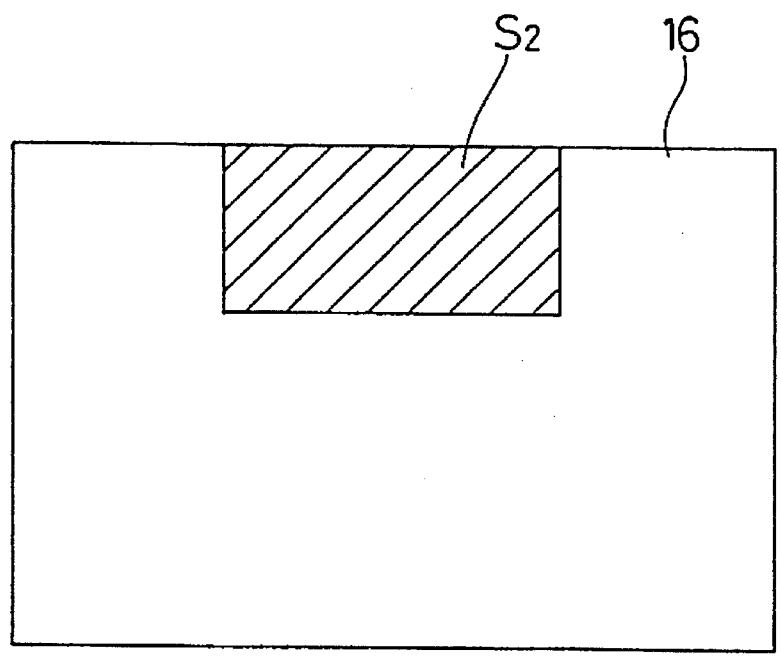

More specifically, as shown in FIG. 170, a shadow S1 of the AF mirror 4 appears on the primary image plane 16 which is within the photometry range of the photometry device 14. In addition, as shown in K 13, since the light beam from the half mirror 3 to the primary image plane 16 expands as it travels, as the half-mirror 3 is arranged nearer to the shutter curtain as in a conventional single lens reflex camera, the AF mirror 4 needs to be accordingly greater, and the effective photometry area on the primary image plane 16 formed on the photometry surface of the photometry device 14 through the convex lens 14a is accordingly smaller. Thus, photometry accuracy deteriorates. Moreover, as shown in FIG. 171, in a conventional image taking apparatus equipped with the half-mirror 3 and the AF mirror 4 in the mirror box 2 as described above, since the half-mirror 3 is arranged near to the shutter curtain, and since the photometry device 14 and the focus detection device 15 are arranged in a narrow space between the half-mirror 3 and the shutter curtain, part of the light reflected on the primary image plane 16 is interrupted by the AF mirror 4 before reaching the photometry device 14. As a result, if the primary image plane 16 is observed from the photometry device 14, a shadow S2 of the AF mirror 4 appears in the primary image plane 16 as shown in FIG. 172, and the effective photometry area on the primary image plane 16 becomes accordingly smaller. Thus, photometry accuracy deteriorates accordingly.

Figure 157:
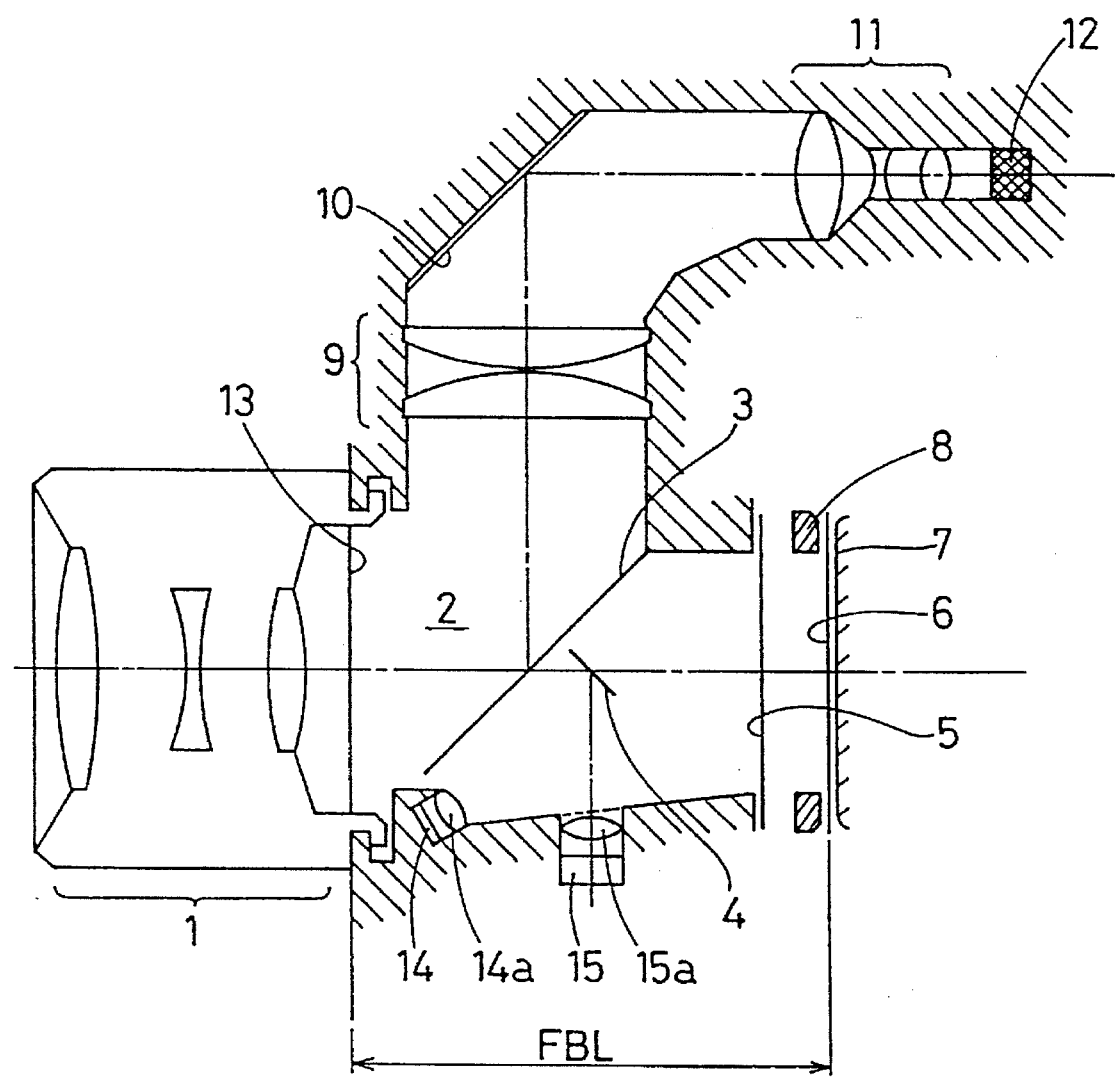
FIG. 157 is an outline construction diagram of the whole optical system of the twenty-ninth embodiment of the present invention.

FIGS. 157 to 160 show a twenty-ninth embodiment. FIG. 157 is an outline construction diagram of the whole optical system of this embodiment. A light beam from a subject which enters a mirror box 2 through an interchangeable lens 1 serving as a main optical system is divided, by a half-mirror 3 disposed in the mirror box 2, into a first light beam, which reaches a film exposure surface 6, and a second light beam, which passes through a condenser lens 9, a reflection mirror 10 and a relay lens 11 to reach a CCD image sensor 12.

The half mirror 3 is made of a glass which has on its surface a thin layer of metal oxide formed by an evaporation method, and, in this embodiment, the half mirror 3 is unmovably supported, in the mirror box 2, at 45 degrees with respect to the optical axis of the interchangeable lens 1.

The first light beam is used for still-picture shooting by use of a film for silver salt film shooting. The silver salt film shooting system for this purpose comprises a pair of shutter curtains 5 positioned in front of the film exposure surface 6, a controller for the shutter curtains, and others. Both the shutter curtains 5 and the film exposure surface 6 are arranged to be perpendicular to the optical axis of the first light beam. In order to arrange the film exposure surface 6 in a predetermined position, a film is positioned by means of a film pressing plate 7 and film rails 8.

In the twenty-ninth embodiment, unlike the conventional construction, the half-mirror 3 is arranged nearer to the flange surface 13 at the rear of the lens barrel including the interchangeable lens 1. The distance FBL from the flange surface 13 at the rear of the lens barrel to the film exposure surface 6, that is, the flange back FBL, is normally kept constant in a series of single lens reflex cameras so that the same interchangeable lens 1 can be used with any camera in the series, and accordingly, the half-mirror 3 is arranged to be distant from the shutter curtain 5 in this case.

The second light beam, which reaches the CCD image sensor, is used for video shooting according to the electronic imaging method. The second light beam, in the middle of its path, forms an aerial image in the vicinity of the condenser lens 9. In an ordinary single lens reflex camera (in which the optical system components including and downstream of the condenser lens 9 of this embodiment are replaced with an viewfinder optical system), a focusing screen is provided here to form an image thereupon. Therefore, if the photometry device is arranged to the rear of the focusing screen along the light path of the second light beam, and if the optical system is so designed that an image formed on the focusing screen is reflected to the photometry surface of the photometry device, it is possible to perform multiple division photometry.

However, since a focusing screen arranged in the path of the second light beam diffuses the second light beam, there is no focusing screen in this embodiment for clear imaging. Therefore, in order to perform multiple division photometry, the second light beam is not used, but a photometry device for multiple division photometry is arranged in a position from which the photometry device can observe within its photometry range the primary image plane (theoretically the film exposure surface, though the shutter curtain 5 serves as an approximate primary image plane during regular photometry) on which the first light beam forms an image.

Though not shown in the figure, an ND filter and a relay aperture diaphragm are disposed in the vicinity of the relay lens 11 in the light path of the second light beam in order to control the amount of light incident on the CCD image sensor 12.

Moreover, in the twenty-ninth embodiment, since a photometry device 14 is arranged between the half-mirror 3 and the shutter curtain 5 on the side of the mirror box 2, it is possible to perform multiple division photometry by observing the surface of the shutter curtain 5 in available light photometry, and by observing the film exposure surface 6 in flash photometry (it is also possible to perform averaging photometry and spot photometry). Moreover, an AF mirror 4 is provided behind the half-mirror 3 to reflect part of the first light beam and to direct the light beam to the focus detection device 15 for focus detection. Just upstream of the photometry device 14 and the focus detection device 15, a convex lenses 14a and 15a for leading an incoming light beam to form an image on the photometry surface and on the focus detection surface, respectively.

In this construction, if the AF mirror 4 is unmovably supported, in an actual image formation on the film exposure surface by the first light beam, part of the first light beam is interrupted by the AF mirror 4 to form a shadow of the AF mirror 4 in the image (the primary image formed by the first light beam) formed on the film exposure surface 6. Therefore, the twenty-ninth embodiment is so constructed that, when the shutter is released (that is, when the film exposure surface 6 is exposed as a result of retraction of the shutter curtain 5), the AF mirror 4 is retracted from the range through which the first light beam passes by a means that is not shown in the figure.

Figure 158:
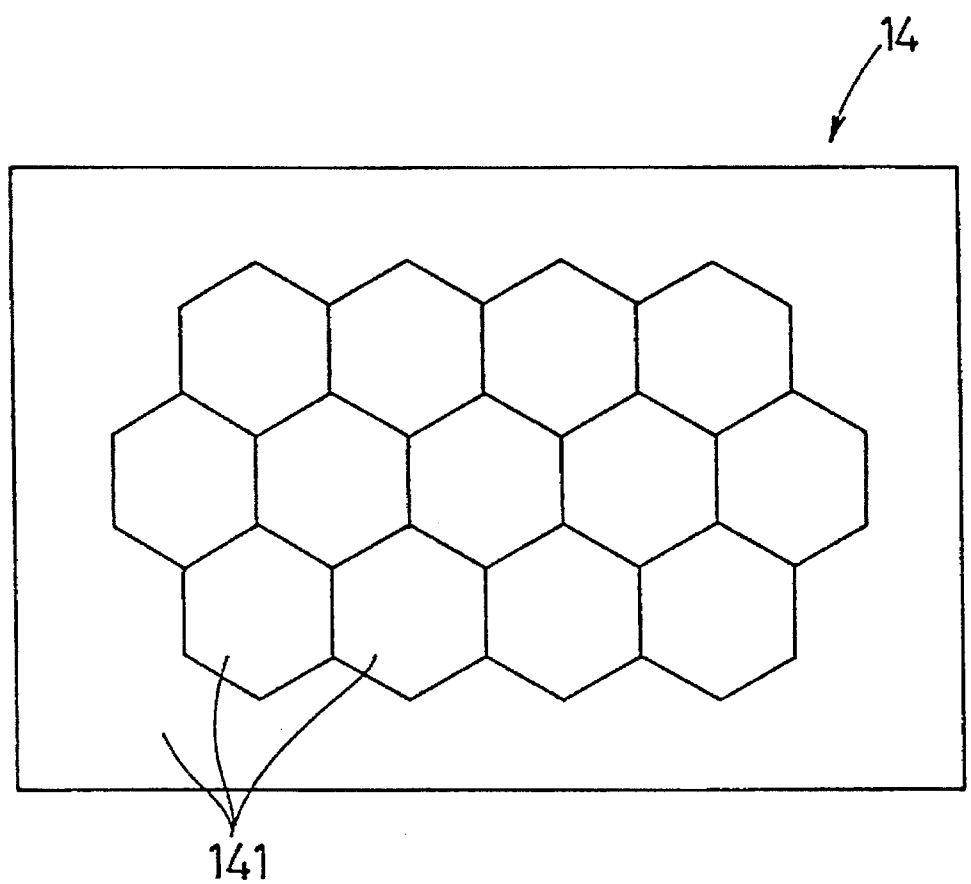
FIG. 158 is a detail view of an example of the photometry surface of the photometry device for multiple division photometry.

FIG. 158 shows an example of the photometry surface of the photometry device 14 for multiple division photometry. As shown in the figure, the photometry surface is divided into a lot of areas 141, and each area outputs a voltage corresponding to the amount of light it receives. Accordingly, if the primary image formed by the first light beam as described above (the image formed on the film exposure surface or the shutter curtain 5) is reflected onto the photometry surface, it is possible to perform photometry with an intentional change of characteristic for each area of the primary image (that is, for each area of the subject).

Figure 159:
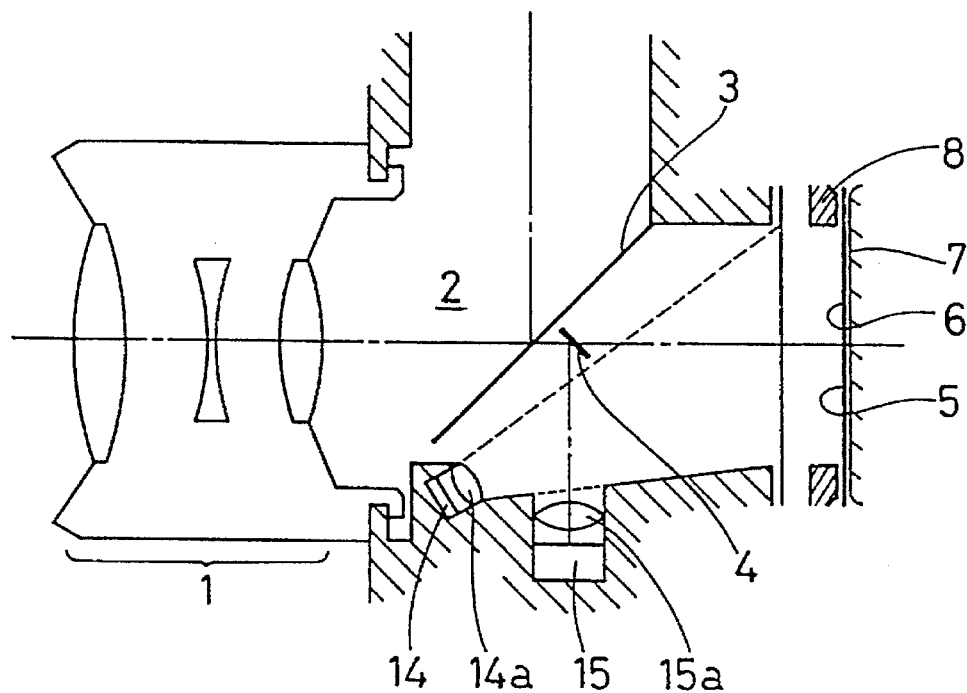

FIG. 159 shows the portion around the mirror box 2 extracted from the optical system of the twenty-ninth embodiment. In this embodiment, the photometry device 14 is arranged on the side of the mirror box 2, opposite to the direction to which the second light beam is directed. FIG. 159 shows the state in which the shutter curtain 5 is observed by the photometry device 14 within its photometry range.

In this state, since the film exposure surface 6 is concealed, the photometry device 14 receives the light reflected by the shutter curtain 5. However, in actual shooting, the film exposure surface 6 is exposed to the first light beam (more specifically, since the shutter curtain 5 travels in front of the film exposure surface 6, the film exposure surface 6 and the shutter curtain 5 each are partially exposed to the first light beam).

Therefore, in the twenty-ninth embodiment, the reflectance of the front surfaces of the shutter curtains 5 is made to be substantially equal to the reflectance of the film exposure surface 6. Thus, the amount of light reflected by the shutter curtains 5 is made to be substantially equal to the amount of light reflected by the film exposure surface 6. As a result, it is possible to know the exposure amount of the film exposure surface 6 in actual shooting from the amount of light reflected by the shutter curtain 5 and received by the photometry device 4 in available light photometry without any compensation. Thus, it is possible to perform accurate photometry with a simple construction.

In the twenty-ninth embodiment, since the half-mirror is arranged to be distant from the shutter curtain 5, it is possible to arrange the photometry device 14 and the focus detection device 15 in a wide space between the half-mirror 3 and the shutter curtain 5. Especially, the photometry device 14 can be arranged to be distant from the primary image plane (film exposure surface 6 or shutter curtain 5) on which the first light beam forms an image.

More specifically, in FIG. 168, whereas the photometry device 14 is arranged in the position P2 in a conventional Single lens reflex camera, the photometry device 14 is arranged in the position P1 (a position more distant from the primary image plane 16 than P2) in the twenty-ninth embodiment. Accordingly, the photometry device 14 can be so arranged that the angle θ1 of the line from the center O (the intersection between the optical axis AX of the first light beam and the primary image plane 16) of the range, which is observed as the photometry range of the photometry device 14, on the primary image plane 16 to the photometry device 14 with respect to the primary image plane 16 is closer to a right angle (as against a conventional construction).

Therefore, for the reasons described in the description of FIG. 168, if the same amount of light per unit area is incident on the area A1 and on the area A2 both on the primary image plane 16, the difference between the amounts of light reflected on the two areas and reaching the photometry device 14 is smaller, in comparison with a conventional construction. In other words, the brightness, as observed from the photometry device 14, of the area A1 is closer to the brightness of the area A2, and accordingly, it is possible to perform more correct photometry covering the whole primary image plane 16 with a simple construction.

If multiple division photometry is performed against the primary image plane, in a conventional construction, in order to eliminate the variance of photometry accuracy in different areas on the primary image plane, it is necessary to compensate the detection output from each area for the difference due to detection characteristic. In this embodiment, for the same reasons as described above, it is possible to keep the variance small enough, and such compensation can be easily performed, or even compensation is needless.

Figure 160:
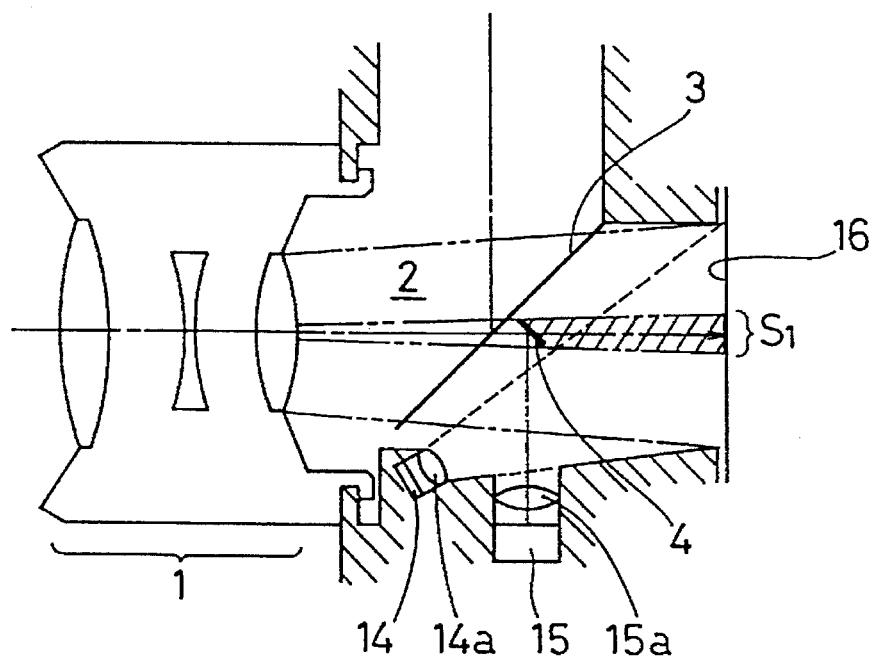

FIG. 160 shows how a shadow of the AF mirror 4 appears on the primary image plane formed by the first light beam in the twenty-ninth embodiment. In the twenty-ninth embodiment as in a conventional construction, since an AF mirror 4 for reflecting part of the light beam having passed through the half-mirror and for leading the reflected light beam to the photometry device 15 arranged behind the half-mirror 3, a shadow S1 appears on the primary image plane 16 as a result of the interruption by the AF mirror 4.

In this case, however, since the light beam from the half-mirror to the primary image plane 16 expands as it travels, and since the half-mirror 3 is arranged to be more distant from the primary image plane in this embodiment than in a conventional construction, the AF mirror 4 can be arranged to be distant from the primary image plane 16. Therefore, it is possible to make the AF mirror 4 accordingly smaller, and, since an accordingly small portion of the photometry area observed by the photometry device 14 is interrupted by the AF mirror, it is possible to improve photometry accuracy.

In the construction as described above, the twenty-ninth embodiment adopts the 135 film for use in the silver salt film shooting system. The exposure area of a 135 film is 36.0× 24.0 mm for normal format shooting, and 36/0×15.0 mm for panorama format shooting.

It is possible to use the film system with three formats, 16:9, 2:3 and 1:3, as suggested in Japanese Laid-Open Patent No. H7-84309. This system, in comparison with the 135 film, has a smaller exposure area, and a camera corresponding to this system is equipped with an accordingly smaller mirror box. In such a camera, if the half-mirror is arranged to be distant from the shutter curtain so that a wide space is available between the half-mirror and the shutter as in this embodiment, it is possible to advantageously arrange the photometry device and the focus detection device with sufficient allowances.

Figure 161:
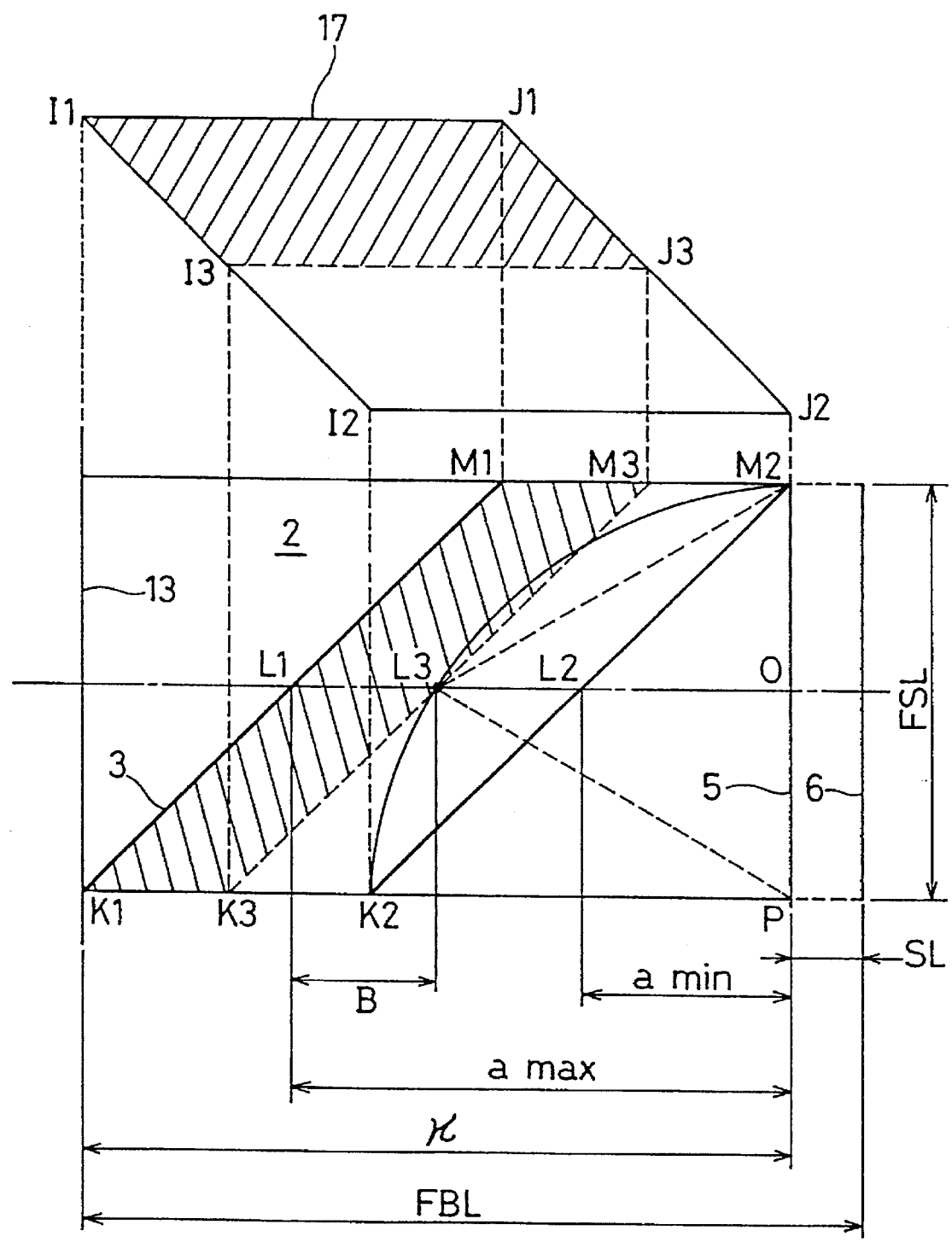

A description will be given below as to how far the half-mirror 3 can be arranged to be distant from the shutter curtain 5. FIG. 161 is an outline diagram showing the mirror box 2 viewed from the direction perpendicular both to the optical axis of the first light beam and to the optical axis of the second light beam, for the purpose of explaining how far the half-mirror 3 can be moved within the mirror box 2. In this case, the half-mirror 3 is supposed to be arranged at 45 degrees with respect to the first light beam.

In the figure, $F_{BL}$ represents a flange back (that is, distance between the flange surface 13 and the film exposure surface 6), κ represents a distance between the flange surface 13 and the subject-side surface of the shutter curtain 5, $F_{SL}$ represents a length of the film exposure surface in the plane parallel to the figure (generally, the length of the shorter edge of the film exposure surface), and $S_L$ represents a distance between the film exposure surface 6 and the subject-side surface of the shutter curtain 5. It is to be noted that, in the following description of FIG. 161, the upward, downward, leftward and rightward directions denote such directions in FIG. 161. Moreover, the center and the lower edge of the subject-side surface of the shutter curtain 5 is referred to as O and P, respectively.

If the half-mirror 3 is moved closer to the flange surface 13 so that its lower edge touches the flange surface 13, the lower edge, the center and the upper edge of the half-mirror are at $K_1$, $L_1$ and $M_1$, respectively. At this time, the left edge and the right edge of the primary image 17 formed by the second light beam are at $I_1$ and $J_2$, respectively. If the half-mirror 3 is moved closer to the shutter curtain 5 so that its upper edge touches the shutter curtain 5, the lower edge, the center and the upper edge of the half-mirror are at $K_2$, $L_2$ and $M_2$, respectively. At this time, the left edge and the right edge of the primary image 17 formed by the second light beam are at $I_2$ and $J_2$, respectively.

Accordingly, if the distance from the intersection between the light division surface of the half-mirror 3 and the optical axis of the first light beam to the subject-side surface of the shutter curtain 5 (that is, in FIG. 161, the distance from the center of the half-mirror 3 to the point O) is supposed to be a, the movable range of a equals to the distance $L_1L_2$, that is, $K_1K_2$. Since the distance $K_2P$ is equal to $F_{SL}$, (Movable Range of $a$)=κ–$F_{SL}$     (1)

Within this range, if the lower edge of the half-mirror 3 moves from $K_1$ to $K_2$, and simultaneously, the upper edge thereof moves from $M_1$ to $M_2$, then the left edge of the primary image 17 formed by the second light beam moves from $I_1$ to $I_2$, and the right edge thereof moves from $J_1$ to $J_2$.

As to the minimum value $a_{min}$ and the maximum value $a_{max}$ of a are expressed as follows:

$$a_{min} = (\text{Distance } OL_2) = F_{SL}/2, \quad (3)$$

$$a_{max} = a_{min} + (\text{Movable Range of } a)$$

$$= κ - F_{SL}/2.$$

If a is made excessively large, that is, too close to $a_{max}$, the lower edge of the half-mirror 3 excessively approaches the flange surface 13. In this state, if a lens or other is arranged to protrude toward the shutter curtain 5-side of the flange surface 13, a shadow of the lens or other appears in the primary image formed by the second light beam, and accordingly, no image is formed in a portion of the primary image 17 formed by the second light beam. In contrast, if a is made small, the position of the photometry device arranged between the half-mirror 3 and shutter 5 becomes closer to the shutter curtain 5, and photometry accuracy is impaired as described above.

In practice, the value of a is not large enough in any conventional construction, and as a result, the photometry accuracy of the photometry device is often impaired. To solve this problem, in this embodiment, the range of a is determined as follows:

$$3^{1/2} \cdot F_{SL}/2 < a < κ - F_{SL}/ 2 (=a_{max}) \quad (4).$$

If a is determined within the above range, it is possible to secure a wide space between the half-mirror 3 and the shutter curtain 5 with a higher degree of probability, and the photometry device can be arranged to be distant from the shutter curtain 5 so that the angle of the line from the photometry device to the point O with regard to the shutter curtain 5 is closer to a right angle. As a result, it is possible to perform correct photometry all over the shutter curtain 5.

Incidentally, when a takes the minimum value as shown by the expression (4), supposing the lower edge, the center and the upper edge are in the positions $K_3$, $L_3$ and $M_3$, (Distance $PL_3$)=(Distance $L_3M_2$)=(Distance $PM_2$)=$F_{SL}$     (5)

holds. Moreover, the range of position of the half-mirror 3 according to the expression (4) forms a parallelogram $K_1K_3M_3M_1$, hatched in the figure, whereas the range of position of the primary image 17 formed by the second light beam forms a parallelogram $I_1I_3J_3J_1$, hatched in the figure.

Figure 162:
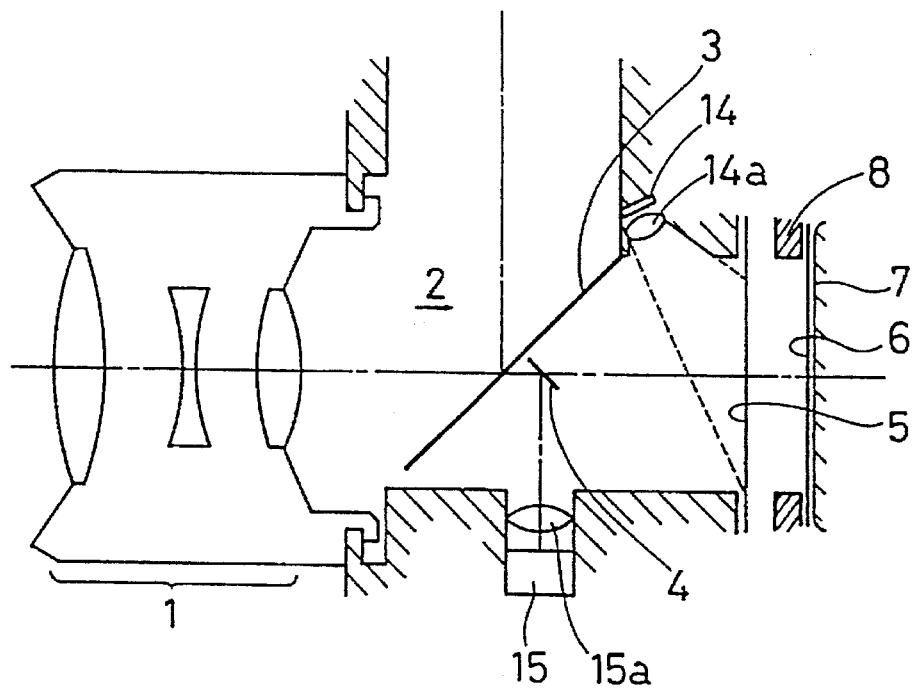

Next, with reference to FIG. 162, a thirtieth embodiment will be described below. FIG. 162 is a construction diagram of the portion around the mirror box 2 of the optical system of this embodiment. FIG. 162 shows the state in which the shutter curtain 5 is observed within the photometry range of the photometry device 14. Since the construction of the optical system as a whole of this embodiment is the same as that of the twenty-ninth embodiment shown in FIG. 157 except for the position of the photometry device, no description will be given in this regard. Moreover, since FIGS. 158 and 161 are common to the twenty-ninth embodiment and this embodiment, no description will be given in this regard also.

As shown in FIG. 162, in the thirtieth embodiment, the photometry device 14 and the convex lens 14a through which the first light beam forms the primary image on the photometry surface of the photometry device 14 are disposed at the side of the mirror box 2 in the direction in which the second light beam is directed. Moreover, the half-mirror 3 is arranged to be distant from the shutter curtain 5. However, in this case, since the interruption by the AF mirror of the light beam directed from the shutter curtain 5 to the photometry device can be prevented with more ease and sureness in comparison with the twenty-ninth embodiment, it is possible to improve photometry accuracy.

Figure 163:
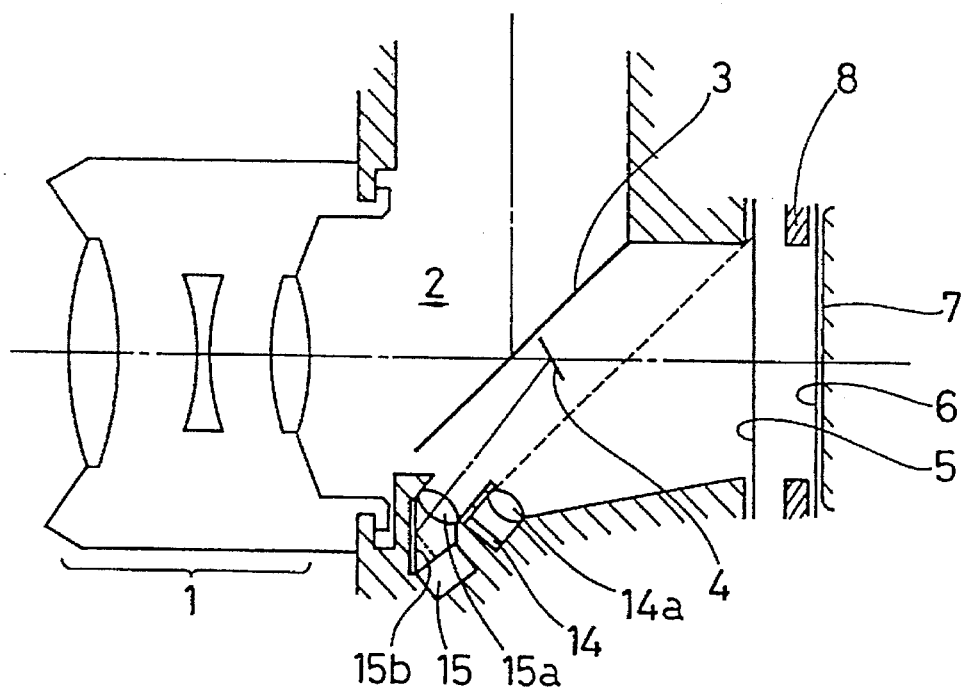
Figure 164:
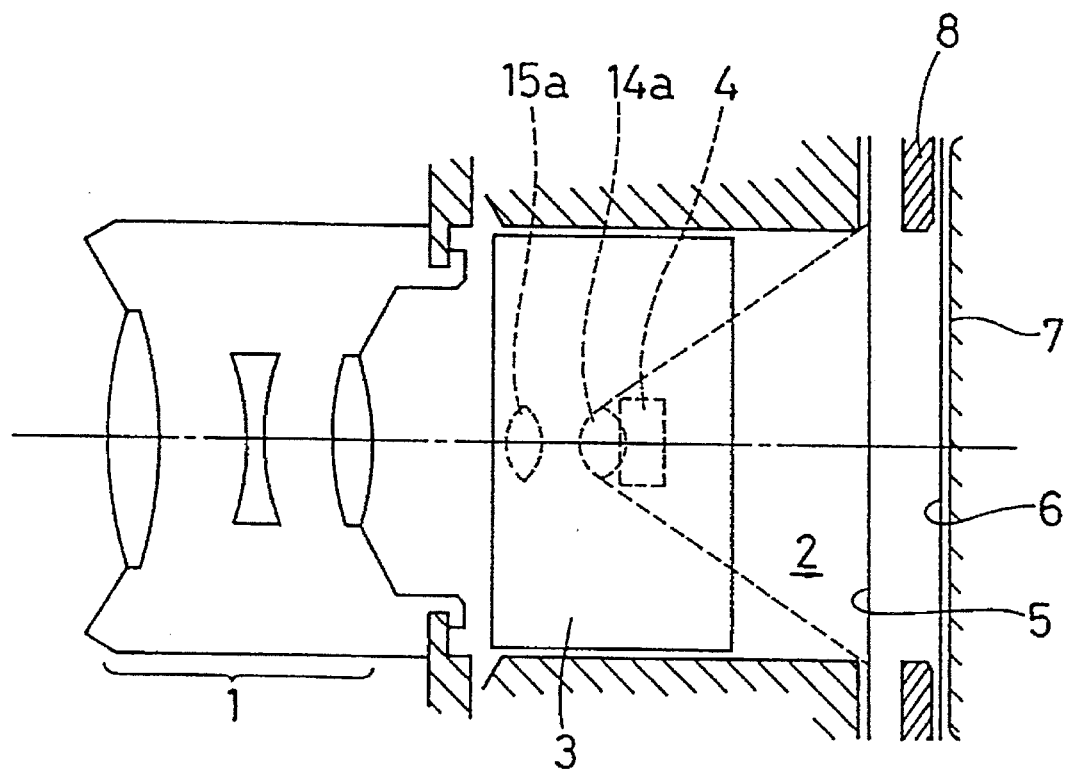

Next, with reference to FIGS. 163 and 164, a thirty-first embodiment will be described below. Since the construction of the optical system as a whole of this embodiment is the same as that of the twenty-ninth embodiment shown in FIG. 157 except for the positions of the photometry device and the focus detection device, no description will be given in this regard. Moreover, since FIGS. 158 and 161 are common to the twenty-ninth embodiment and this embodiment, no description will be given in this regard also. FIG. 163 is a construction diagram of the portion around the mirror box 2 of the optical system of this embodiment, viewed from the direction perpendicular both to the first light beam and to the second light beam. FIG. 164 is a construction diagram of the same portion viewed from the optical axis direction of the second light beam. Both FIGS. 163 and 164 show the state in which the shutter curtain 5 is observed within the photometry range of the photometry device 14.

As shown in FIG. 163, in the thirty-first embodiment as in the twenty-ninth embodiment, the photometry device 14 and the focus detection device 15 are arranged at the side of the mirror box 2 in the direction opposite to the direction in which the second light beam is directed. However, as against the twenty-ninth embodiment, the focus detection device 15 and the photometry device are arranged, if viewed from the direction of the optical axis of the second light beam, in this order along the line from the half-mirror 3 to the shutter curtain 5. As a result of this arrangement, since the interruption by the AF mirror of the light beam directed from the shutter curtain 5 to the photometry device can be prevented with more ease and sureness in comparison with the twenty-ninth embodiment, it is possible to improve photometry accuracy.

In this case, if the photometry device 14 is arranged to be distant from the shutter curtain 5, the position of the photometry device 15 as viewed from the optical axis direction of the second light beam is arranged closer to the interchangeable lens 1 than the AF mirror 4. Therefore, the AF mirror 4 is so constructed that it reflects the first light beam in a direction inclined closer to the interchangeable lens 1 than the second light beam. Simultaneously, since there is less space for the photometry device 15, the light beam reflected by the AF mirror 4 and having passed through the convex lens 15a is reflected by the reflection mirror 15b before reaching the photometry device 15.

Moreover, as shown in FIG. 164, the photometry device 14 and the focus detection device 15 (in the figure, they are represented by the convex lenses 14a and 15a placed just before the photometry device 14 and the focus detection device 15, respectively) are, if viewed from the optical axis direction of the second light beam, both arranged in the vicinity of the optical axis of the first light beam. As a result, if viewed from the optical axis direction of the second light beam, the photometry device 14 observes each area at both sides of the optical axis of the first light beam at the same angle. Therefore, for example, if the same amount of light per unit area is incident on each of those two areas, the amount of light reflected by each area and reaching the photometry device 14 is the same. Consequently, it is possible to perform correct photometry all over the shutter curtain 5.

Figure 165:
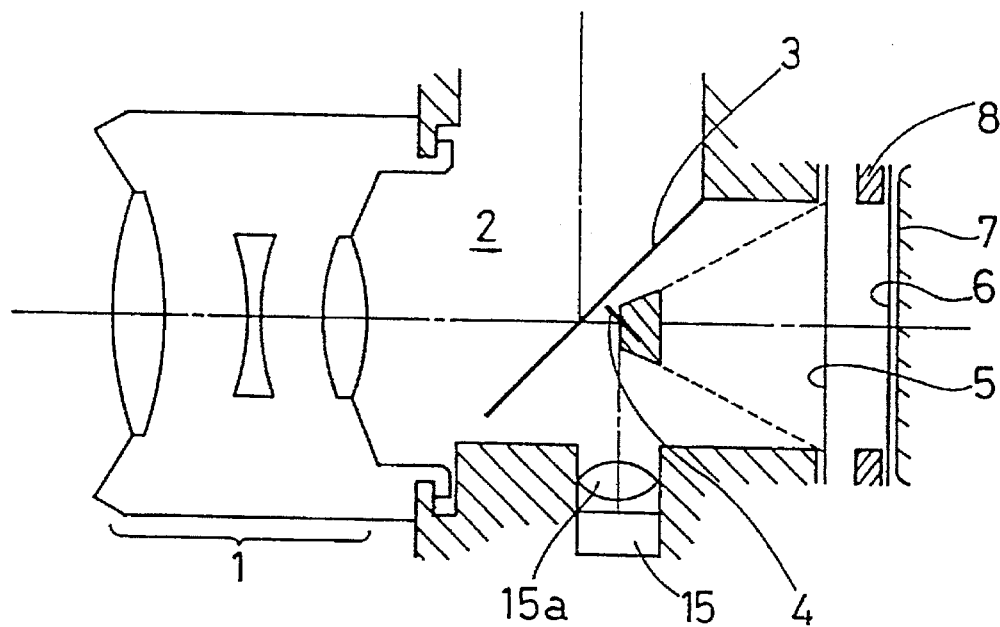
Figure 166:
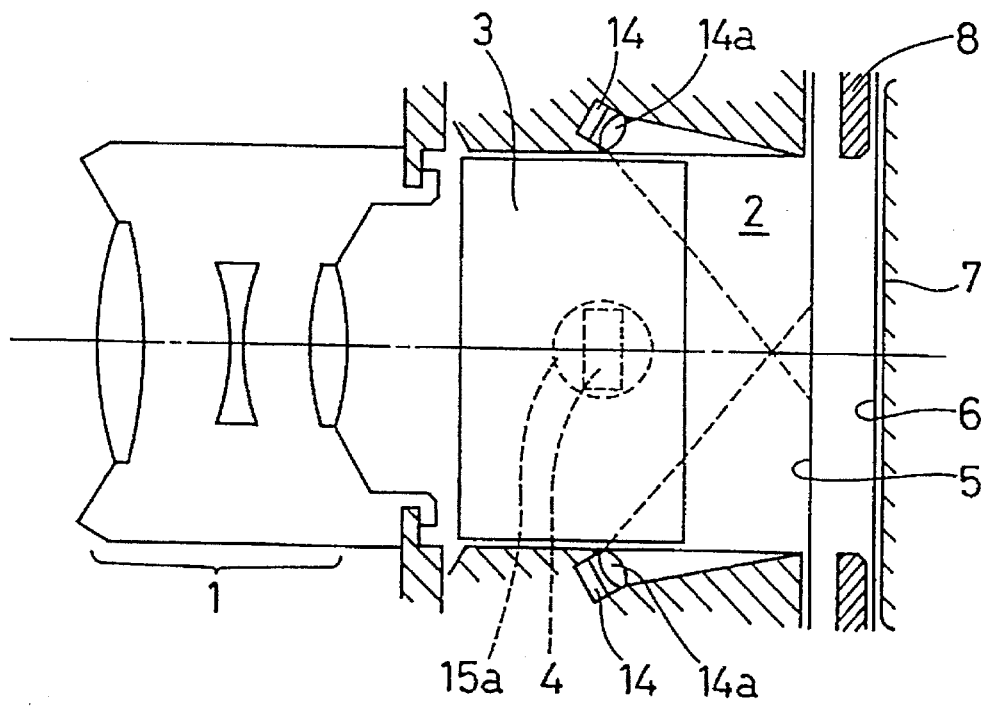

With reference to FIGS. 165 and 166, a thirty-second embodiment will be described. Since the construction of the optical system as a whole of this embodiment is the same as that of the twenty-ninth embodiment shown in FIG. 157 except for the positions of the photometry device and the focus detection device, no description will be given in this regard. Moreover, since FIGS. 158 and 161 are common to the twenty-ninth embodiment and this embodiment, no description will be given in this regard also. FIG. 165 is a construction diagram of the portion around the mirror box 2 of the optical system of this embodiment, viewed from the direction perpendicular both to the first light beam and to the second light beam. FIG. 166 is a construction diagram of the same portion viewed from the optical axis direction of the second light beam. Both FIGS. 165 and 166 show the state in which the shutter curtain 5 is observed within the photometry range of the photometry device 14.

As shown in FIGS. 165 and 166, in the thirty-second embodiment, the focus detection device 15 is disposed on the side surface of the mirror box 2 in the direction opposite to the direction in which the second light beam is directed, and two photometry devices 14 and 14 are disposed on two side surfaces which are parallel to the optical axis of the first light beam and parallel to the optical axis of the second light beam. Supposing that the shutter curtain 5 is divided into two areas by the optical axis of the first light beam as observed from the optical axis direction of the second light beam, the photometry range of each photometry device 14 includes the whole of the area closer to itself and part of the area farther from itself.

Since the photometry devices 14 and 14 are constructed and arranged as described above, the angle of the line from the center of the photometry range of each photometry device 14 to the photometry device 14 with respect to the shutter curtain 5 becomes closer to a right angle (in comparison with a conventional construction and the twenty-ninth to thirty-first embodiments). Therefore, if the same amount of light per unit area is incident on the whole photometry range of the photometry device, the brightness of each portion of the photometry range, as observed by the photometry device 14, is uniform. As a result, by use of two photometry devices 14 and 14 in combination, it is possible to perform correct photometry all over the shutter curtain 5.

In the thirty-second embodiment, totally two photometry devices are disposed on two side surfaces parallel to the optical axis of the first light beam and parallel to the optical axis of the second light beam. However, it is also possible to dispose only one photometry device on either of the above-mentioned side surfaces. In that case, the center of the photometry range coincides with the center of the shutter curtain and, as a result, the angle of the line from the center of the photometry range to the photometry device with respect to the shutter curtain is smaller than in the case where two photometry devices are provided. By arranging the half-mirror to be distant from the shutter curtain, however, that angle can be made to be closer to a right angle, in comparison with a conventional construction. Consequently, for the same reasons described above, it is possible to perform more correct photometry all over the shutter curtain in comparison with a conventional construction.

As described above, according to the twenty-ninth to thirty-second embodiments, when the same amount of light per unit area is incident on the whole shutter curtain, for example, since the brightness, as observed from the photometry device, of every portion of the shutter curtain is substantially uniform, it is possible to perform correct photometry all over the shutter curtain with a simple construction. Moreover, in multiple division photometry, it is highly easy, or it is even needless in some cases, to compensate the detection output from each area of the photometry area of the photometry device for the difference of photometry accuracy on the corresponding area of the shutter curtain.

Further, the distance between the light divider and the shutter curtain can be extended without fail and, as a result, the photometry device can be so arranged that the angle of the line from the center of the area on the shutter curtain observed as the photometry range of the photometry device to the photometry device with respect to the shutter curtain becomes close to a right angle. As a result, for example, when the same amount of light is incident as the first light beam on the whole shutter curtain, the brightness, as observed from the photometry device, of every portion of the shutter curtain becomes substantially uniform. Therefore, it is possible to perform photometry with more accuracy and sureness.

Moreover, by dividing a light beam incoming through a single main optical system so that each of the divided light beam is led by a separate imaging device to form a separate image, it is possible to construct a image taking apparatus provided both with an imaging device for silver salt film shooting and with an imaging device of another type within a single unit.

Moreover, it is possible to shoot videos, for example, by means of the second imaging device, and, if the second imaging device is used in combination with the first imaging device, it is possible to use the apparatus in various modes such as simultaneous shooting mode for simultaneously shooting a moving-picture video and a silver salt film picture, silver salt film shooting mode for shooting a silver salt film picture, video shooting mode for shooting a moving-picture video, still video shooting mode for shooting a still-picture video, and others.

Further, since the amount of light reflected by the shutter curtain in available light photometry and the amount of light reflected by the film exposure surface during the retraction of the shutter curtain are made to be substantially equal to each other, it is possible to determine, without any compensation, the correct exposure amount on the film exposure surface in actual shooting from the amount of light reflected by the shutter curtain and received by the photometry device in available light photometry. Therefore, it is possible to perform correct photometry with a simple construction.

Further, since the format of the film used in the first imaging device can be adapted to a format well used, it is possible to perform silver salt film shooting with a film widely available.

Moreover, since both photometry and focus detection are performed with the first light beam obtained from the light divider, it is not necessary to provide a separate optical system other than the main optical system. Moreover, since the light divider is arranged to be distant from the shutter curtain, it is possible to arrange the mirror to be more distant from the shutter curtain than in a conventional construction. In that case, since the mirror can be made accordingly smaller, and therefore, an accordingly smaller area of the photometry range of the photometry device is interrupted by the mirror, it is possible to improve photometry accuracy.

Further, since the light divider is arranged to be distant from the shutter curtain, it is easier, in comparison with a conventional construction, to arrange the photometry device so that the angle of the line from the center of the area of the shutter curtain observed as the photometry range of the photometry device to the photometry device with respect to the shutter curtain is closer to a right angle. Therefore, for example, if the same amount of light per unit area is incident on the whole shutter curtain as the first light beam, the brightness, as observed from the photometry device, of every area of the shutter curtain is substantially uniform and, as a result, it is possible to perform correct photometry all over the shutter curtain with a simple construction. In addition, since the photometry means is arranged in a position at which the light beam from the shutter curtain arrives without being interrupted, it is possible to achieve accordingly better accuracy.

Supposing that the surface of the shutter curtain is divided into two areas by the optical axis of the first light beam as observed from the optical axis direction of the second light beam, if two photometry devices are so arranged that the photometry range of each photometry device includes the whole of the divided area closer to itself and part of the divided area farther from itself, the angle of the line from the center of the photometry range of each photometry device to the photometry device with respect to the shutter curtain becomes closer to a right angle. Therefore, for example, if the same amount of light per unit area is incident on the whole shutter curtain as the first light beam, the brightness, as observed from the photometry device, of every area of the shutter curtain is substantially uniform and, as a result, it is possible to perform correct photometry all over the shutter curtain with a simple construction.

Moreover, if viewed from the optical axis direction of the second light beam, the photometry means is so positioned that it observes each area at both sides of the optical axis of the first light beam at the same angle. Therefore, for example, if the same amount of light per unit area is incident on each of those two areas, the amount of light reflected by each area and reaching the photometry device 14 is the same. Consequently, it is possible to perform correct photometry all over the shutter curtain 5.

FIG. 173 is a cross-sectional view, along the optical axis, of the principal portion of an image taking apparatus of a thirty-third embodiment of the present invention. FIG. 174 is a plan view of FIG. 173. FIG. 175 is an outline diagram of the optical system of this image taking apparatus.

This image taking apparatus functions both as a still camera and as a video camera, and comprises a half-mirror for dividing the light incoming from a subject through a main optical system into a first light beam and a second light beam, a silver salt film imaging device for shooting the subject image formed by the first light beam on a film, a relay optical system for relaying the second light beam, and an electronic imaging device for converting the subject image formed by the second light beam into a video signal and for recording the resultant signal on a recording medium.

First the optical system of this image taking apparatus will be described. As shown in FIG. 175, the light from a subject enters the main optical system 1, passes through a main lens 2, is subjected to light amount control by a main lens aperture diaphragm 3, and is divided by a half-mirror 4 serving as a light divider into a first light beam and a second light beam. The first light beam passes through a position of a shutter 5 and reaches a film 6. During focusing, the first light beam is directed to a focus detection device 18 by an autofocus mirror 19 which is disposed between the shutter 5 and the half-mirror. On the other hand, the second light beam passes through a condenser lens 7, a reflection mirror 8 and an ND filter 9, and enters the relay optical system 10. AX represents the optical axis of the light beam from the subject to the main lens 2.

The second light beam further passes through a relay lens 11, is subjected to light amount control by a relay aperture diaphragm 12, passes through an optical low-pass filter 13 and an infrared cut filter 14, and reaches a CCD image sensor 15 serving as a light/electricity converter. Although the CCD image sensor shown in FIG. 175 is of a single-plate type, it is possible to use a CCD of a multiple-plate type. The first light beam is used in silver salt film shooting by use of a film. The second light beam is used in moving-picture video shooting by use of a medium for recording video.

Next, an autofocus mechanism will be described below. As shown in FIG. 173, the autofocus mechanism is provided with a focus detection device 18 fitted into a hole 17 at the bottom of a mirror box 16 of the main body of the image taking apparatus, a condenser lens 18a to make the light reflected from an autofocus mirror form an image on the photo-receptive surface of the focus detection device 18, an autofocus mirror 19 disposed between the half-mirror 4 and the shutter 5 for leading the light from the subject to the focus detection device 18, a support frame 20 rotatably attached to the mirror box 16 for supporting the autofocus mirror 19, and a driving means 21 for positioning the support frame 20.

The support frame 20 is U-shaped, as shown in FIG. 174, and is provided with a pair of arms 20a facing to one another, and a link 20b for linking the two arms. The autofocus mirror 19 is attached approximately to the middle portion of the link 20b. The support frame 20 is formed in a U shape so as not to interrupt a photometry light beam directed to a later-mentioned photometry device 28.

The support frame 20 is attached to the bottom of the mirror box 16 through a support axle 22 to be rotatable obliquely downward toward an object disposed rearward in the optical axis direction, so that it can be in either of the following two states: a detection state as shown with solid lines in which the autofocus mirror 19 is held in the imaging light path to direct the subject light to the detection device 18, and a retracted state as shown with broken lines in which the auto-focus mirror 19 rests in a groove 23 created at the rear of the mirror box 16.

In short, in this embodiment, the autofocus mirror 19 is designed to retract obliquely downward toward an image side direction, and, as a result, the interval between the half-mirror 4 and the shutter 5 is longer than in a conventional image taking apparatus. In a construction where a fixed half-mirror is used as a main mirror, it is not necessary to secure space for the rotation of the main mirror, and accordingly, a construction described above is feasible. In view of this fact, this embodiment is devised. Moreover, since the light from the subject expands as it approaches the shutter, it is possible to make the area of the autofocus mirror 19 smaller in the above described construction.

The driver 21 has a gear box 24 dynamically linked to the support frame 20, a motor 25 for driving the gear box 24, and a spring 26 for loading the support frame 20 with a resilient force in the counter-clockwise direction in FIG. 173. The motor 25 is connected with a controller which is not shown in the figure.

Reference numeral 27 represents a stopper for stopping the counter-clockwise rotation of the support frame 20 when the support frame 20 strikes against the stopper 27. Reference numeral 28 represents photometry devices disposed on both sides of the support frame 20 as shown in FIG. 174 so that they can receive the reflected light (shown with center lines) of the subject image formed on the shutter 5. Reference numeral 28a represents condenser lenses for photometry for forming the image of the reflected light on the photo-receptive surface of the photometry device 28. As a result of arranging the photometry devices 28 to receive the reflected light of the subject image formed on the shutter 5, it is possible to correctly perform photometry of the subject image, and to perform multiple division photometry (evaluative photometry).

Next, the operation of the image taking apparatus will be described below, with reference to the flowchart of FIG. 176.

When the apparatus is not in use, the support frame 20 is in the position shown with solid lines in FIG. 173. In this state, the light from the subject passes through the main lens 2, is reflected by the autofocus mirror 19, passes through the condenser lens 18a, and reaches the focus detection device 18. When the operator presses a release button (not shown in the figure) halfway in, control circuitry drives a driver (not shown in the figure) of the main lens 2 based on information from the detection device 18 to displace the main lens 2 to the in-focus position. Meanwhile, the control circuitry drives a driver (not shown in the figure) of the main lens aperture diaphragm 3 based on information from the photometry device 28 to control the aperture of the main lens aperture diaphragm 3.

When the operator presses the release button all the way in, the control circuitry confirms completion of photometry and focusing (step #101), the motor 25 is driven (step #102), the gear box 24 is driven by the motor 25, and the support frame 20 rotates clockwise against the resilient force of the spring 26 until the support frame 20 stops strikes against the bottom of the groove 23 as shown with broken lines). As a result, the autofocus mirror 19 is retracted from the imaging light path into the retracted state (step #103).

Subsequently, the shutter 5 is actuated, so that the subject image is formed on the film 6 (#104). Then, the motor 25 is stopped (#105), and the support frame 20 is rotated counter-clockwise by the resilient force of the spring 26 until the support frame 20 strikes against the stopper 27 and stops rotating. As a result, the autofocus mirror 19 returns to the photometry state in which it directs the subject light to the photometry device 18 (#106).

Next, a thirty-fourth embodiment of the present invention will be described below.

FIG. 177 is a cross-sectional view, along the optical axis, of the principal portion of an image taking apparatus of the thirty-fourth embodiment. In the following descriptions, the same components as in the thirty-third embodiments will be referred to with the same reference numerals.

In the thirty-third embodiment, since the autofocus mirror 19 is designed to retract obliquely downward toward an image side direction, the distance between the half-mirror 4 and the shutter 5 needs to be longer than in a conventional image taking apparatus. In this embodiment, the autofocus mirror 19 is designed to retract obliquely downward toward an object disposed forward in the optical axis direction, so that the distance between the half-mirror 4 and the shutter 5 is kept similar to that in a conventional image taking apparatus. Accordingly, such a construction is convenient because, for example, part sharing with cameras of other types can be achieved.

More specifically, in this embodiment, the support frame 20 is rotatably attached, above the half-mirror 4, to the mirror box 16. In the detection state for a focus condition, the support frame 20 is in a position shown with solid lines. From the detection state, the support frame 20 can be rotated obliquely downward toward an object disposed forward in the optical axis to be in a position shown with center lines. When the support frame is in the position shown with broken lines, the autofocus mirror 19 is in the retracted state.

In this embodiment, the photometry device 28 and the condenser lens 28a for photometry are fitted into a hole 29 created between the groove 23 for accommodating the autofocus mirror 19 and the shutter 5, and the photometry device 28 is so arranged as to receive the reflected light of the subject image formed on the shutter 5. It is also possible to arrange the photometry device 28 and the condenser lens 28a for photometry on both sides of the support frame 20 as shown in FIG. 173.

Next, a thirty-fifth embodiment of the present invention will be described below.

FIG. 178 is a cross-sectional view, along the optical axis, of the principal portion of an image taking apparatus of the thirty-fifth embodiment of the present invention.

In this embodiment, the support frame 20 is rotatably attached, in the vicinity of the shutter 5, to the bottom of the mirror box 16, so that the support frame 20 can rotate from the position shown with solid lines obliquely downward toward an object disposed forward in the optical axis direction up to the position shown with broken lines. When the support frame 20 is in the position shown with solid lines, the autofocus mirror 19 is in the focus condition detecting state. When the support frame 20 is in the position shown with broken lines, the autofocus mirror 19 is in the retracted state.

In this embodiment, as in the thirty-third embodiment, the distance between the shutter 5 and the half-mirror 4 is longer than in a conventional image taking apparatus. As a result, it is easy to retract the autofocus mirror 19 obliquely forward.

Moreover, in this embodiment, the autofocus mirror 19, when retracted, covers the opening of the hole 17 in which the focus detection device 18 is fitted. As a result, internal reflection inside the mirror box 16 is reduced.

In the above descriptions, the second imaging device is supposed to be based on the electronic imaging method in which the subject light is converted into a video signal and then recorded on the recording medium. However, an imaging device of another type may be used.

In the above descriptions, the image taking apparatus is supposed to be a video camera with still camera functions in which the subject light is divided by a fixed half-mirror into a first light beam and a second light beam, the first light beam being supplied to a silver salt film, the second light beam being supplied to an electronic imaging device. However, the image taking apparatus may be a still camera in which the first light beam is supplied to the silver salt film and the second light beam is supplied to an viewfinder optical system.

FIG. 179 is an outline construction diagram of the optical system of such a still camera, in which the subject image of the second light beam having passed through the condenser lens 7 is reversed by a pentagonal roof 30 and enlarged by an eyepiece 31. In other respects, the construction of the optical system is the same as that shown in FIG. 175.

According to the embodiments described above, an image taking apparatus has a fixed half-mirror for dividing a subject light incoming through a main optical system into a first light beam and a second light beam, a silver salt film for shooting an image formed by the first light beam on the film, a movable autofocus mirror, which is arranged between a shutter of the silver salt film and the half-mirror, and which is brought into a focus condition detecting status in which the autofocus mirror is placed in an imaging light path to direct the subject light to a focus detection device while photometry is performed and brought into a retracted state in which the autofocus mirror is retracted out of the imaging light path while shooting is performed. In this image taking apparatus, the autofocus mirror is mounted on a support frame, the support frame is rotatably attached to the main body of the image taking apparatus so that the autofocus mirror can take a detection state and a retracted state, and a driver is provided for rotating the support frame so that the autofocus mirror is displaced between the detection state position and the retracted state position. Consequently, it is possible to simplify the mechanism for displacing the autofocus mirror, and accordingly, to reduce costs.

Moreover, the focus detection device is arranged in a hole created at the bottom of the mirror box of the main body of the image taking apparatus, and the autofocus mirror, when retracted, covers the opening of that hole. Consequently, internal reflection inside the mirror box is reduced.

Further, the autofocus mirror, when retracted, rests in a groove created at the rear of the mirror box of the main body of the image taking device. Consequently, internal reflection inside the mirror box is reduced.

Hereinafter, examples of optical system arrangement will be described.

FIGS. 180 and 181 are external views of the camera described below. In FIGS. 180 and 181, reference numerals 1A and 1B represent camera bodies, to which taking lenses 11 and 12 are mounted on the front surfaces. In the camera shown in FIG. 180, a first projection 13 and a second projection 15 are formed, both projections protruding from the front surface of the camera. The camera shown in FIG. 180 has a laterally extended form which is not extremely different from the form generally adopted in ordinary cameras using a photosensitive recording medium as a silver salt film. The camera shown in FIG. 181 has a longitudinally extended form which is not much different from the form generally adopted in video cameras.

Although the camera bodies 1A and 1B are equipped with other conventional components necessary for shooting, no description will be given in these respects.

FIGS. 182 and 183 show the outline of the embodiments described later. In FIG. 182, a light beam L incoming through the taking lens (not shown in the figure) is split into a light beam L1 which travels straight and a light beam L2 which is refracted upward at a right angle. The straight light beam L1 travels further rearward, and forms an image on a film F serving as a photosensitive recording medium loaded in the camera.

On the other hand, the refracted light beam L2 forms a primary image in a position equivalent to the film F, and further travels upward, until it is bent as desired on a plane TP (a space actually, since it has a certain height) along the top surface of the camera to form a secondary image, and a tertiary image if required, on the imaging surface of an image pickup device.

In the construction shown in FIG. 183, a light beam L incoming through the taking lens (not shown in the figure) is split into a light beam L1 which travels straight and a light beam L2 which is refracted downward at a right angle. The straight light beam L1 travels further rearward, and forms an image on a film F serving as a photosensitive recording medium loaded in the camera.

On the other hand, the bent light beam L2 forms a primary image in a position equivalent to the film F, and further travels downward, until it is bent as desired on a plane BT (a space actually, since it has a certain height) along the bottom surface of the camera, or directed to the side of the camera, to form a secondary image, and a tertiary image if required, on the imaging surface of an image pickup device. It is desirable that the light beam L2, after being led into the space BT, be led out of the space BT before entering the image pickup device.

In the above two examples, since the space TP or BT is a space extending along the top or bottom surface of the camera, such a space can be secured without considerably changing the size or form of the camera in comparison with conventional models. In addition, by arranging members for bending a light path such as reflection mirrors or prisms, it is possible to extend the light path. Therefore, it is possible to arrange a relay optical system or other with a high degree of flexibility. Moreover, in a camera shown in FIG. 180 which has a comparatively large width, by forming a light path laterally in the space TP or BT, it is possible to extend the light path. Here also, it is possible to arrange a relay optical system or other with a high degree of flexibility.

Further, by making the light beam form an image after being directed out of the space BT, it is possible to prevent the lower part of the camera from being excessively large, that is, to prevent the form of the camera from being materially different from that of a conventional camera.

FIGS. 184 and 185 show the outline of other constructions.

FIG. 184 schematically shows the outline of the optical system construction inside the camera body 1. The light beam incoming through the taking lens 11 is split by a semi-transparent mirror 21 disposed at the rear of the taking lens 11 at 45 degrees with respect to the optical axis. The light beam having passed through the semi-transparent mirror 21 travels farther rearward and forms an image on a film F, so that shooting is executed. On the other hand, the light beam reflected by the semi-transparent mirror 21 forms a primary image 23 in a position equivalent to the film F. The primary image may be an aerial image or, alternatively, an image formed on a focusing screen provided on the image plane. If the image is formed as an aerial image, the image can be used for visual observation or for image formation as a bright, clear image. If the image is formed on the focusing screen, the focus state and the depth in field can be visually confirmed clearly.

The light beam which forms the primary image 23 is then reflected by a reflection mirror 25, so that it forms a secondary image 29 through the relay optical system 27. The image pickup device such as a CCD is so arranged that the position of its imaging surface coincides with the position of the secondary image 29.

FIG. 185 shows a construction not for shooting an image but for observing an image through an optical viewfinder. This construction has the same components as the construction shown in FIG. 184 up to the formation of the primary image. In this construction, the primary image 23 is observed through an eyepiece 33 after being erected by an image erecting optical system 31 comprising a combination of reflection mirrors and others. In stead of observing the primary image 23, a secondary image formed by means of the relay optical system may be observed through the eyepiece.

Figure 186:
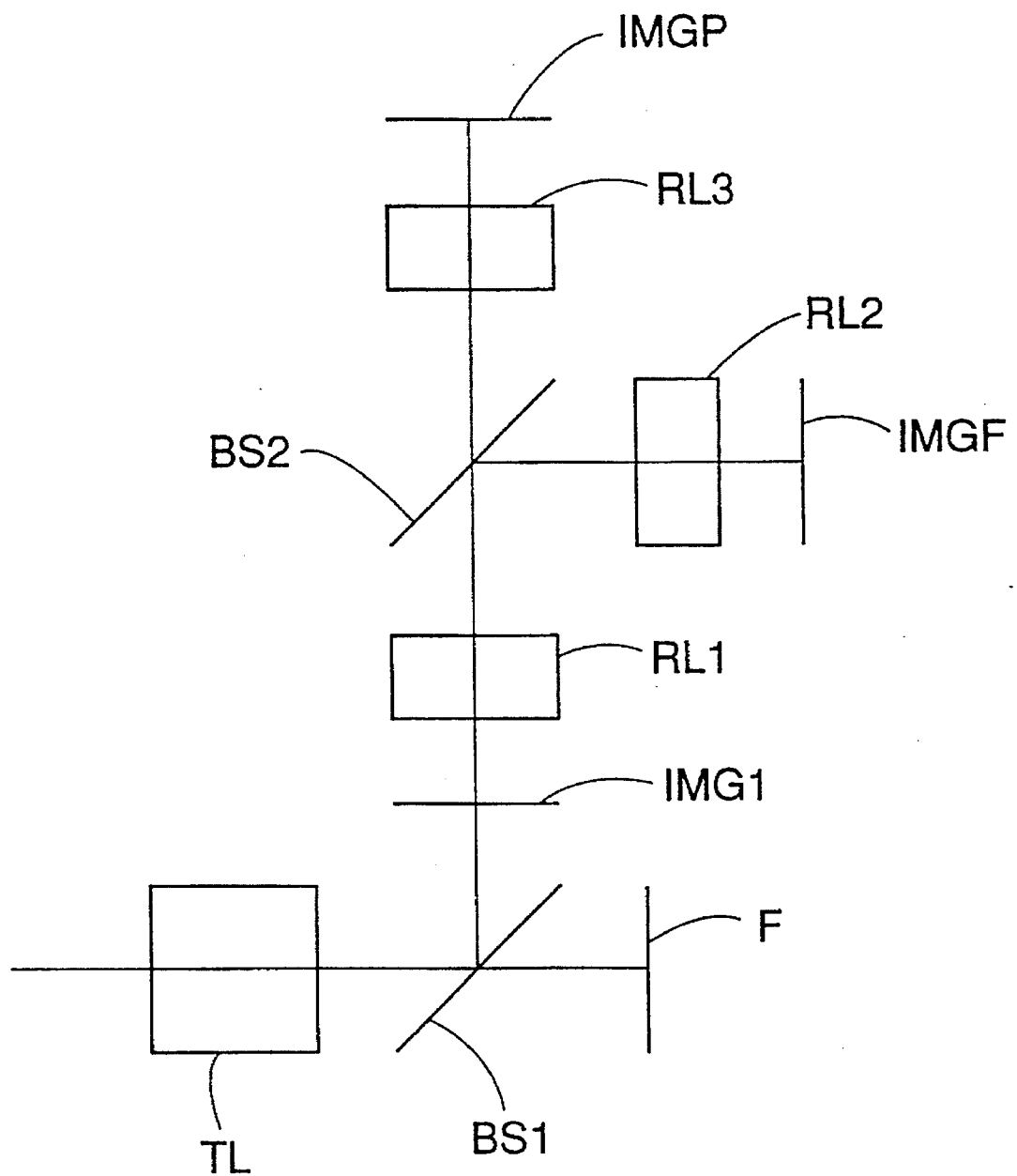

FIGS. 186, 187, 188, 189, 190, 191 and 192 show still other examples of construction. In FIG. 186, a light beam incoming through a main lens TL is split into two light beams by a first beam splitter BS1. Of the thus split light beams, one forms its path so that an image is formed on a film F loaded in the camera, whereas the other forms a primary image IMG 1 in a position different from the film surface. The light beam which has formed the primary image passes through a first relay optical system RL1, and is then split by a second beam splitter BS2, the thus split light beams entering second and third relay optical systems RL2 and RL3 respectively. The light beam emitted from the second relay optical system RL2 forms a secondary image IMGF for observation through the viewfinder. The light beam emitted from the third relay optical system RL3 forms a secondary image IMGP for image shooting.

In the above described construction, the relay optical system serves as a reduction optical system for forming an image for the viewfinder or the image pickup device which has a smaller imaging area than that of the film F, and part of its optical system is shared with the first relay optical system RL1. Accordingly, the reduction optical system together with its path as a whole can be constructed compactly, and, as a result, it is possible to arrange components with a higher degree of flexibility. Therefore, it is possible to downsize the camera, and to design a camera with a natural form.

Figure 187:
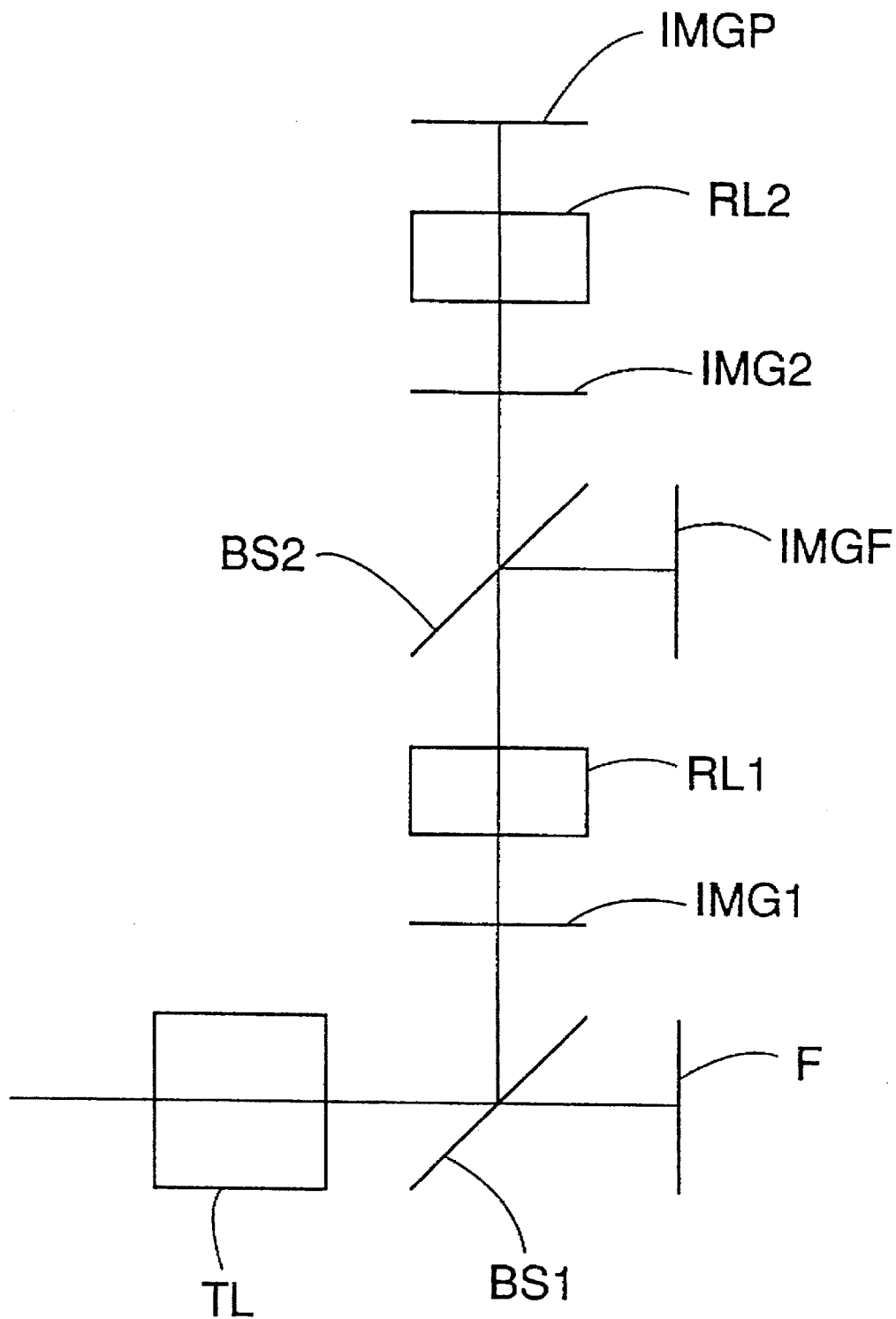

In FIG. 187, a light beam incoming through a main lens TL is split into two light beams by a first beam splitter BS1. Of the thus split light beams, one forms its path so that an image is formed on a film F loaded in the camera, whereas the other forms a primary image IMG 1 in a position different from the film surface. The light beam which has formed the primary image passes through a first relay optical system RL1, and is then split by a second beam splitter BS2. Of the thus split light beams, one directly forms a secondary image IMGF for observation through the viewfinder, and the other forms another secondary image IMG2. The light beam which has formed the secondary image IMG2 passes through a second relay optical system RL2 to form a tertiary image IMGP for image shooting.

This construction is effective when the image in the viewfinder is larger than the image pickup device. The image is first reduced by the first relay optical system RL1 into the size of the viewfinder image, then reduced again into the size of the image pickup device, that is, the image is reduced in two steps. Therefore, each relay optical system functions as an a separate optical system that can function individually. For this reason, although part of the relay optical systems (reduction optical systems) is shared with each other, complicated designing is not required.

Figure 188:
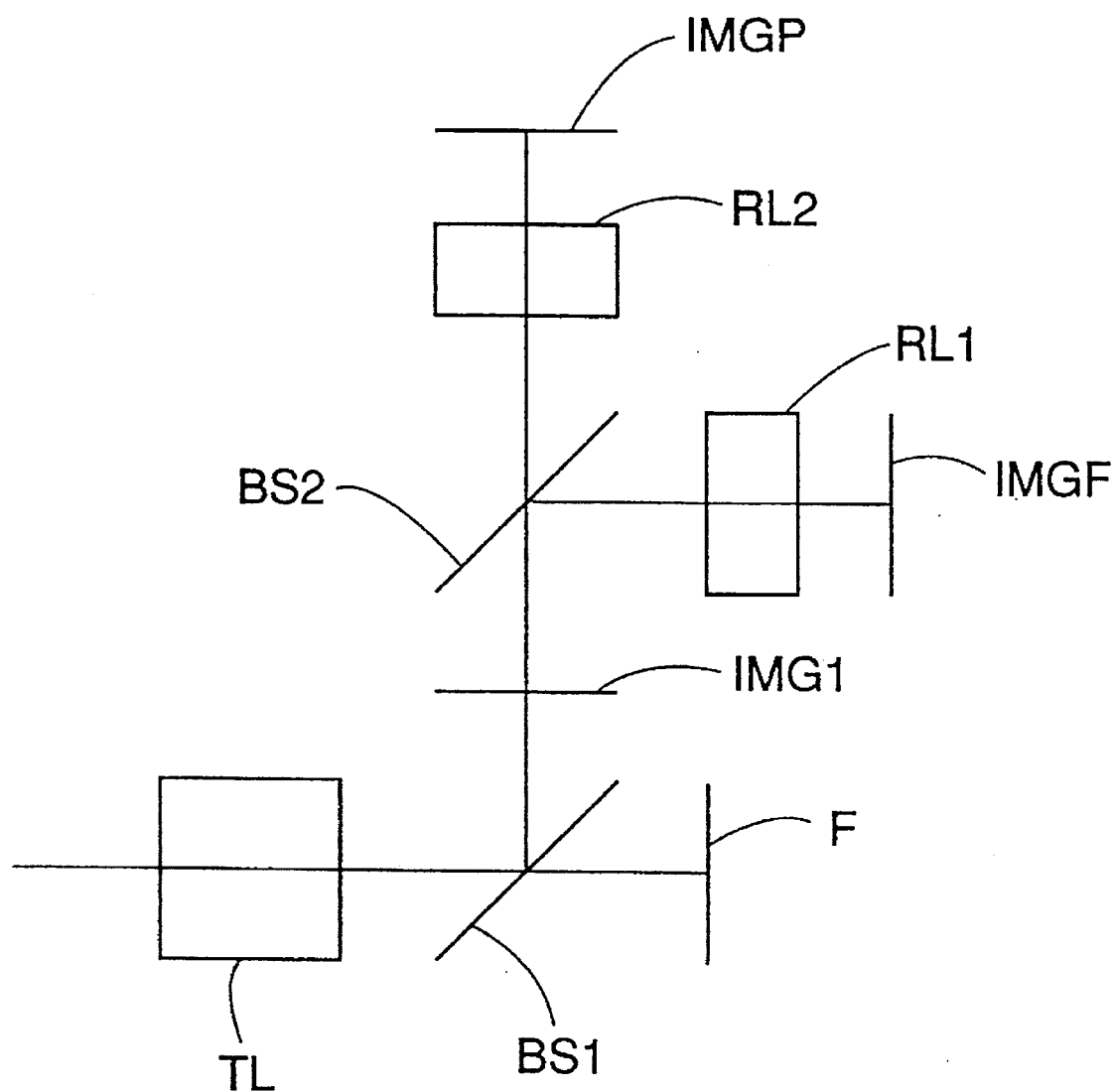

In FIG. 188, a light beam incoming through a main lens TL is split into two light beams by a first beam splitter BS1. Of the thus split light beams, one forms its path so that an image is formed on a film F loaded in the camera, whereas the other forms a primary image IMG 1 in a position different from the film surface. The light beam which has formed the primary image is then split by a second beam splitter BS2. Of the thus split light beams, one forms a secondary image IMGF through a first relay optical system RL1 for observation through the viewfinder, and the other forms a secondary image IMGP through the second relay optical system RL2 for image shooting.

In this construction, since the relay optical system for forming an image for the viewfinder and the relay optical system for forming an image for image shooting are separately constructed, it is highly easy to design the system.

Figure 189:
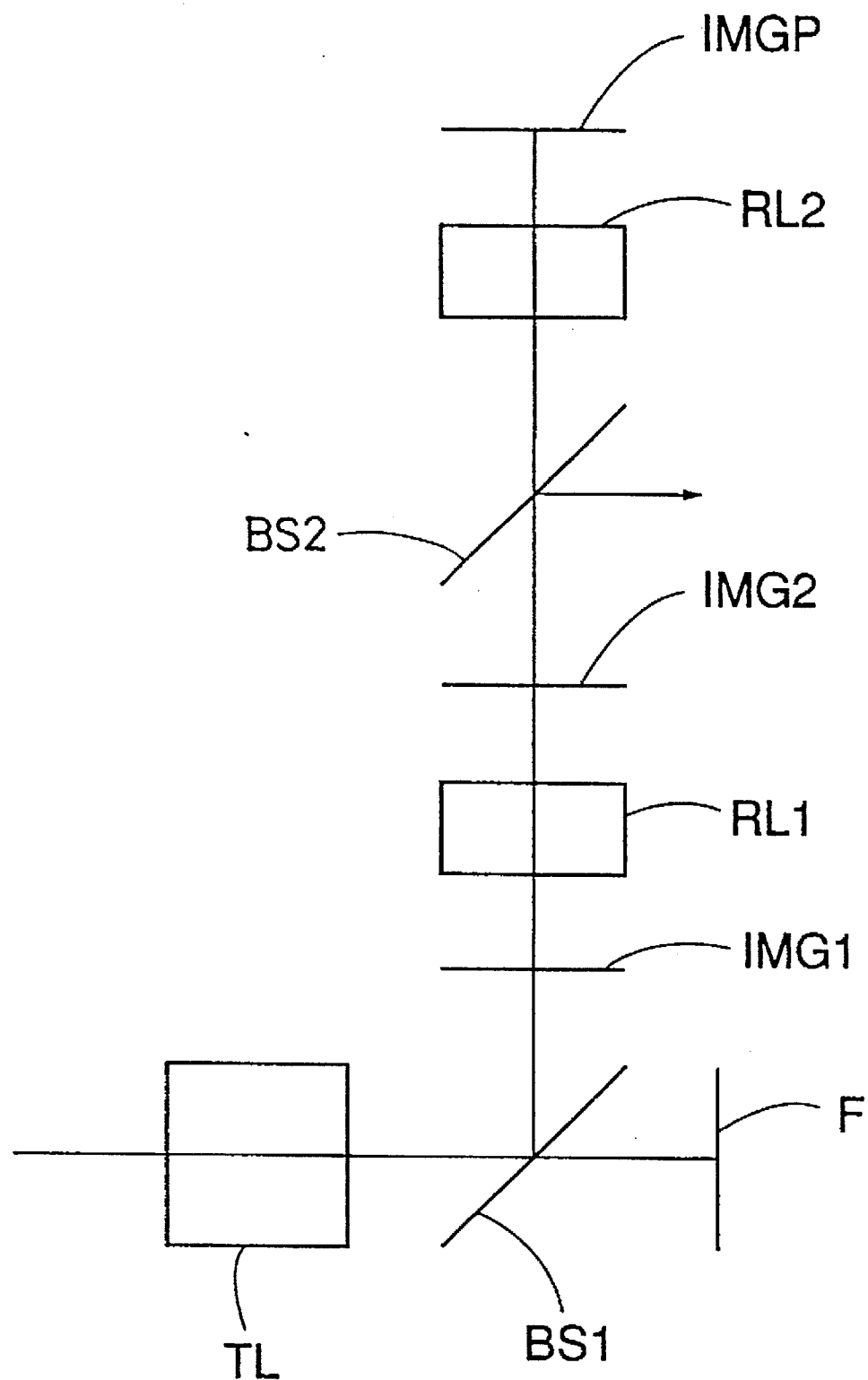

In FIG. 189, a light beam incoming through a main lens TL is split into two light beams by a first beam splitter BS1. Of the thus split light beams, one forms its path so that an image is formed on a film F loaded in the camera, whereas the other forms a primary image IMG 1 in a position different from the film surface. The light beam which has formed the primary image forms a secondary image IMG2 through a first relay optical system RL1. The secondary image is then split by a second beam splitter BS2 into a light beam observed through an eyepiece on the one hand, and a light beam which forms a tertiary image IMGP through a second relay optical system RL2 for image shooting on the other hand.

Also in this construction, since the image is reduced in two steps, it is highly easy to design the system, although part of the relay optical systems (reduction optical systems) is shared with each other. Moreover, the reduction factor of the second relay optical system can be made smaller.

Figure 190:
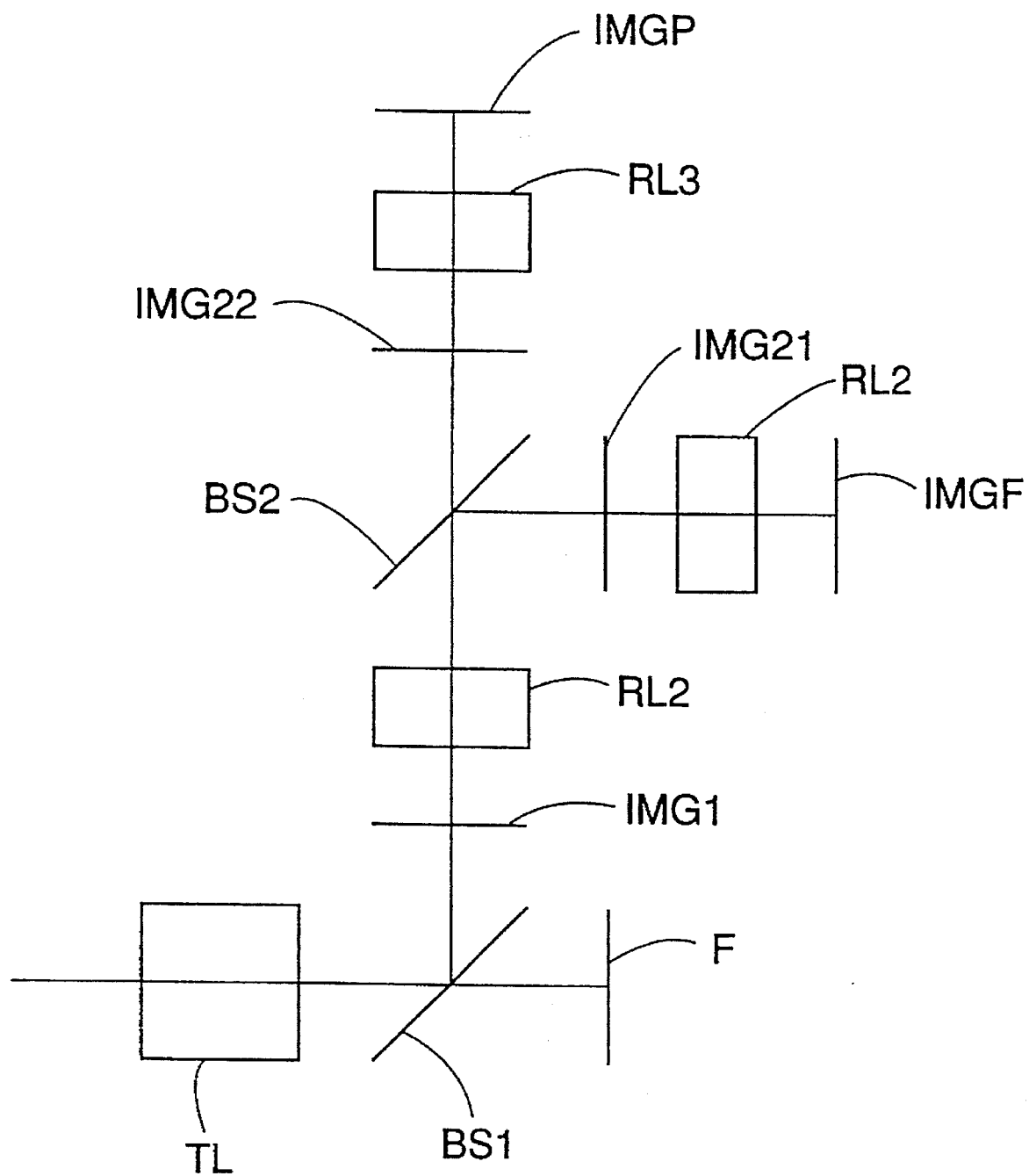

In FIG. 190, a light beam incoming through a main lens TL is split into two light beams by a first beam splitter BS1. Of the thus split light beams, one forms its path so that an image is formed on a film F loaded in the camera, whereas the other forms a primary image IMG 1 in a position different from the film surface. The light beam which has formed the primary image passes through a first relay optical system RL1, and is then split by a second beam splitter BS2 into two light beams, to form a first secondary image IMG21 and a second secondary image IMG22 respectively. The light beams which have formed both secondary images enters second and third relay optical systems respectively. The light beam emitted from the second relay optical system forms a tertiary image IMGF for observation through the viewfinder. The light beam emitted from the third relay optical system RL3 forms a tertiary image IMGP for image shooting.

In this construction, although part of the relay optical systems (reduction optical systems) is shared with each other, an image which is formed by reduction is once again reduced to the sizes of the viewfinder and the imaging surface. Consequently, it is easy to design the relay optical systems, and each relay optical system needs to have only a small reduction factor.

Next, a further example of construction will be described below. In all the examples P1 to P13 described so far, the light beam split by the first beam splitter forms the primary image in a position equivalent to the film surface, and the primary image is then reduced by the relay optical system to form images for observation through the viewfinder and for image shooting. In contrast, in the construction described below, the lens corresponding to the above-mentioned main lens is composed of a plurality of lens units to split a light beam therein, and other lenses are arranged which are suitable for forming the thus split light beams into images for image shooting and for viewfinder observation. In other words, in this example, not only the image formed on the film surface, but also the image used for image shooting and viewfinder observation is formed as a primary image.

Figure 191:
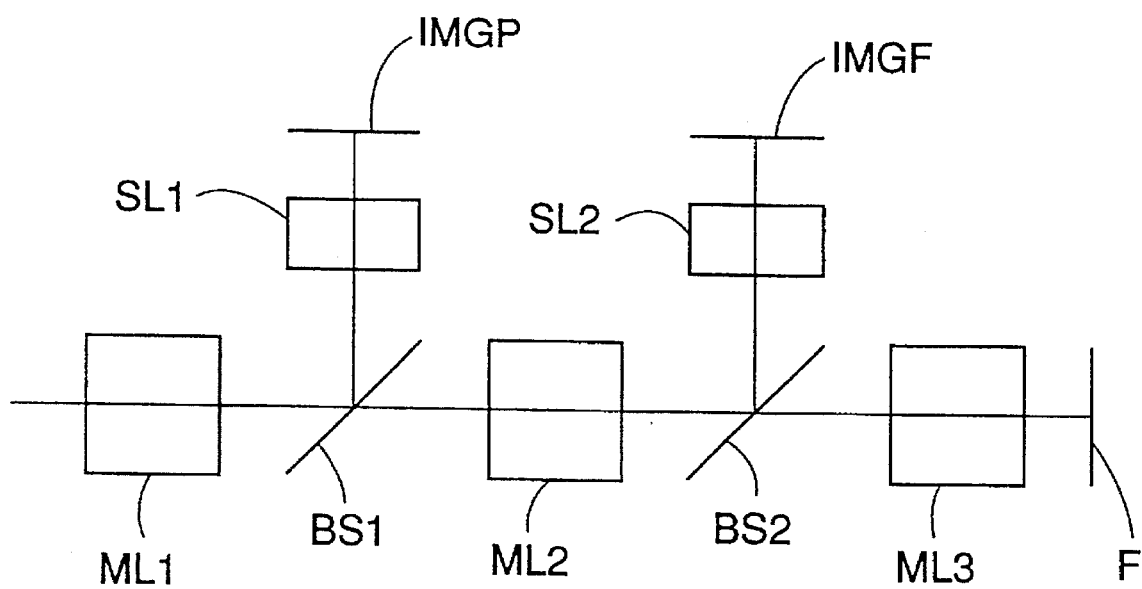

In FIG. 191, a light beam incoming through a first main lens ML1 is split by a first beam splitter BS1. One of the thus split light beams passes through a second main lens ML2 and enters a second beam splitter BS2, where the light beam is further split. One of the light beams split by the second beam splitter BS2 forms an image through a third main lens ML3 on the film surface F, so that shooting is executed.

On the other hand, the other of the light beams split by the first beam splitter BS1 forms an image IMGP for image shooting through a first subsidiary lens SL1. Moreover, the other of the light beams split by the second beam splitter BS2 forms an image IMGF for viewfinder observation through a second subsidiary lens SL2, and this image is observed through an eyepiece. Alternatively, a reversed construction is also possible in which the light beam split by the first beam splitter BS1 is used for viewfinder observation and the light beam split by the second beam splitter BS2 is used for image shooting.

As seen from the above descriptions, against the film surface, the first to third main lenses ML1, ML2 and ML3 serve in cooperation as an imaging optical system, and, against the imaging surface (or the viewfinder image plane), the first main lens ML1 and the first subsidiary lens SL1 serve in cooperation as an imaging optical system. Moreover, against the viewfinder image plane (or the imaging surface), the first and second main lenses ML1 and ML2 and the second subsidiary lens SL2 serve in cooperation as an imaging optical system.

According to this construction, since a secondary or tertiary image is not formed, it is possible to form images for viewfinder observation and for image shooting with a comparatively short light path, and accordingly, to downsize the camera.

Figure 192:
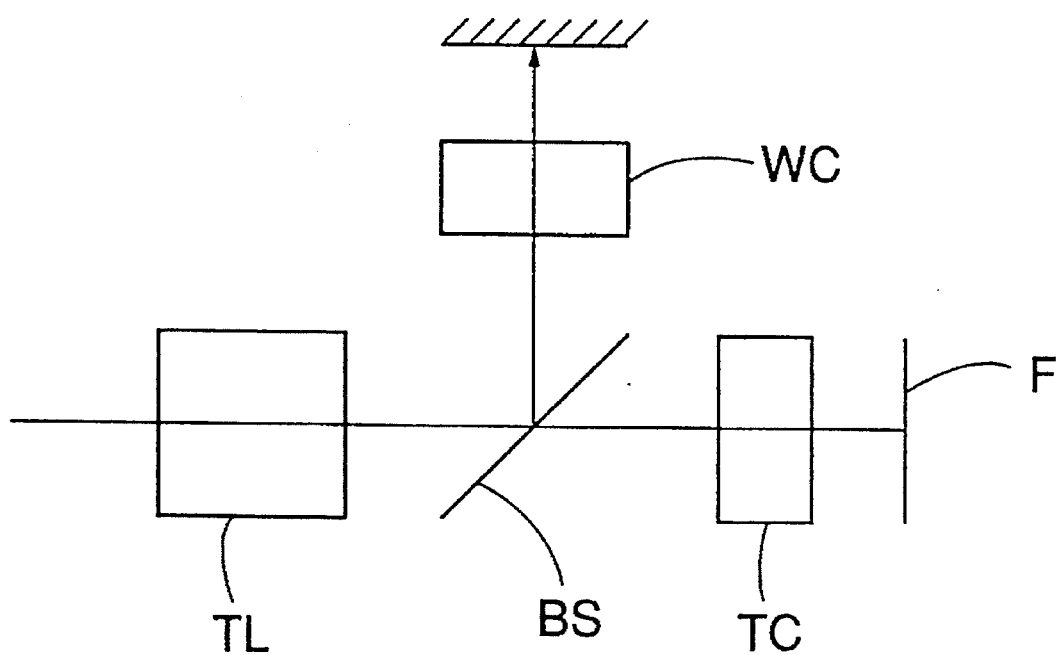

FIG. 192 shows still a further example of construction. In this construction, after the main lens that is shared, a tele-converter lens is provided for shooting on a film, and a wide-converter lens is provided for forming images for viewfinder observation and for image shooting. Although the viewfinder optical system and the imaging portion are not shown in the figure, these portions can be freely selected from the above examples or other constructions and combined together.

In this construction, an image formed at first is of a medium size between the size of the image for film shooting and the size of the image on the image pickup device or in the viewfinder, and the thus formed image is then enlarged or reduced. Consequently, it is possible to reasonably design the main lens and the converter lenses.

FIGS. 193 to 195 show a thirty-sixth embodiment of the present invention. In FIG. 193, only components forming the light paths inside the camera are shown, and other components are omitted. The above-mentioned taking lens is also omitted in the figure. FIGS. 194 and 195 schematically show the component arrangement inside the camera as viewed from above and from the front, respectively.

In these figures, reference numeral 41 represents a semi-transparent mirror arranged at 45 degrees with respect to the optical axis of the taking lens (not shown in the figure) for splitting the light beam incoming through the taking lens. The light beam having passed through the semi-transparent mirror 41 travels further rearward to from an image on the surface F of a film loaded in the camera.

On the other hand, the light beam reflected by the semi-transparent mirror 41 travels upward inside the camera to form a primary image 43 in a position equivalent to the film surface F. The light beam having formed the primary image 43 travels further upward until reflected to the rear of the camera by a reflection lens 45. The light beam is then reflected in a slanting direction toward the front edge of the side of the camera by another reflection mirror 47 disposed at the rear of the reflection mirror 45. Reference numeral 49 represents another reflection mirror disposed in the upper part inside the grip portion including the first protection 13 shown in FIG. 180 (see FIG. 194). The light beam reflected by the reflection mirror 47 is reflected downward by the reflection mirror 49, and then travels downward inside the first projection 13. In the first projection 13, a relay optical system 51 is arranged vertically, and the imaging surface 53 of an image pickup device is arranged further below. Therefore, the light beam reflected by the reflection mirror 49 is reduced by the relay optical system 51, and forms an image on the imaging surface 53, so that shooting is executed. The image thus captured is reproduced for observation through an electronic viewfinder disposed at the rear of the camera, and is also recorded as a still picture or a moving picture on a recording medium MED comprising a magnetic or magneto-optical disk, a magnetic tape, an IC card or other, which is loaded in a recording medium compartment MEDC formed in the grip portion (the grip portion located opposite to the grip portion in which the above-mentioned optical system is formed) including the second projection 15.

Moreover, in the grip portion including the second projection, a battery compartment BATC for accommodating two serially-connected battery cells BAT serving as a power source for the operation of the camera.

If a rolled silver salt film is used as a photosensitive recording medium, it is necessary to provide a film cartridge compartment CMB for accommodating a silver salt film cartridge FC and a spool room SPL for winding the silver salt film. In this embodiment, since the projections 13 and 15 are used for arranging the battery BAT and the relay optical system 51, the film cartridge compartment CMB is provided at the rear of the portion for accommodating the battery BAT, and the spool room SPL is provided at the rear of the portion for arranging the relay optical system 51 and others. Therefore, this embodiment has an ordinary film loading construction as is generally used in a conventional camera.

In this embodiment, since the components for forming optical paths such as the reflection mirror 49 and the relay optical system 51 are arranged in the first projection 13, it is not necessary to reserve space for certain components in the rear part of the camera, and accordingly, it is possible to arrange components conventionally used in a camera with flexibility. Therefore, it is possible to adopt the construction of the optical system of this embodiment without materially changing the conventional construction.

This embodiment has external appearances as shown in FIG. 180 and a construction as shown in FIGS. 184 and 182.

FIGS. 196 and 197 show a thirty-seventh embodiment of the present invention. This embodiment is different from the previous embodiment in that the light beam reflected toward the first projection 13, instead of being directly reflected downward, is first reflected to the rear of the camera and then reflected downward. In the following description, the components that are the same as those of the above-described embodiment are identified with the same reference designations, and are dealt with briefly.

The light beam reflected by the semi-transparent mirror 41 and having formed the primary image 43 is directed through the reflection mirrors 45 and 47 obliquely toward the front edge of the side of the camera. The light beam is then reflected toward the rear of the camera by the reflection mirror 55 disposed in the first projection 13, and then reflected downward by the reflection mirror 57 disposed in the rear part of the camera. Below the reflection mirror 57, a relay optical system 59 is arranged vertically, and the imaging surface 61 of the image pickup device is arranged further below. Therefore, the light beam reflected by the reflection mirror 57 is reduced by the relay optical system 59 to form an image on the imaging surface 61, so that shooting is executed. The image thus captured is reproduced for observation through the electronic viewfinder, and is also recorded as a still picture or a moving picture on a recording medium MED.

In this embodiment, the light beam directed to the first projection 13 is first reflected backward and then directed in the vertical direction. Therefore, the spool room SPL for winding a rolled silver salt film loaded in the camera is disposed in the first projection 13 so as not to interrupt the light beam. Specifically, as shown in FIG. 197, the spool room SPL is disposed below the reflection mirror 55, so that the already exposed portion of a film is advanced frontward along the side of the camera and wound below the reflection mirror 55. In FIG. 197, the spool room SPL is shown with a phantom line for simplicity's sake. As to the recording medium compartment MEDC, the battery compartment BATC and the film cartridge compartment CMB, this embodiment adopts the same arrangement as the thirty-sixth embodiment.

In the thirty-seventh embodiment, since the light beam is first reflected obliquely frontward and then reflected rearward before being directed to the relay optical system 59, the light path from the primary image 43 to the relay optical path 59 is longer than in the above-described embodiment, and therefore, it is possible to use an optical system having an accordingly larger reduction factor.

This embodiment has external appearances as shown in FIG. 180 and a construction as shown in FIGS. 184 and 182.

Next, with reference to FIGS. 198 to 200, a thirty-eighth embodiment of the present invention will be described below. In FIG. 198, as in FIGS. 193 and 196, only the components forming the light paths inside the camera are shown, and other components are omitted. FIGS. 199 and 200 schematically show the component arrangement inside the camera, as viewed from above and from the front, respectively.

In these figures, reference numeral 71 represents a semi-transparent mirror arranged at 45 degrees with respect to the optical axis of the taking lens (not shown in the figure) for splitting the light beam incoming through the taking lens. The light beam having passed through the semi-transparent mirror 71 travels further rearward to form an image on the film surface F, which is exposed through an exposure opening 73, of a film loaded in the camera.

On the other hand, the light beam reflected by the semi-transparent mirror 71 is then directed downward inside the camera, and forms a primary image 75 in a position equivalent to the film surface F. The light beam having formed the primary image 75 travels further downward until reflected by a reflection mirror 77 to the side of the camera (to the right side of the camera, as viewed from the front). The light beam is then reflected upward by another reflection mirror 79 disposed at the side of the reflection mirror 77. The light beam reflected by the reflection mirror 79 travels upward inside the grip portion in the rear part the first projection 13. In the grip portion 13, a relay optical system 81 is arranged vertically, and the imaging surface 83 of the image pickup device 81 is arranged further above. Therefore, the light beam reflected by the reflection mirror 79 is reduced by the relay optical system 81 to form an image on the imaging surface 83, so that shooting is executed. The image thus captured is reproduced and observed through the electronic viewfinder disposed in the rear part of the camera, and is also recorded as a still picture or a moving picture on a recording medium MED loaded in the recording medium compartment MEDC formed in the grip portion (the grip portion located opposite to the grip portion in which the above-mentioned optical system is formed) including the second projection 15.

In the battery compartment BATC formed in the grip portion including the second projection, two serially-connected battery cells are loaded. One battery cell is loaded vertically in the camera, and the other battery cell is loaded horizontally in the camera.

In this embodiment, the spool room SPL for winding a rolled silver salt film loaded in the camera is disposed in the first projection 13 so as not to interrupt the light beam. Specifically, as shown in FIG. 199, the spool room SPL is disposed farther frontward than the relay optical system 81, so that the already exposed portion of a film is advanced frontward along the side of the camera and wound. Moreover, as described above, the recording medium compartment MEDC and the battery compartment BATC are disposed in the second projection 15, the film cartridge compartment CMB is arranged as in a conventional camera.

In this embodiment, since the incoming light beam, after being split, is directed through the lower part of the camera to the image pickup device, the lower part of the camera is larger than the upper part of the camera. Therefore, since the gravity center of the camera lowers, the camera has an excellent weight balance.

This embodiment has external appearances as shown in FIG. 180 and a construction as shown in FIGS. 184 and 183.

Next, with reference to FIGS. 201 to 203, a thirty-ninth embodiment of the present invention will be described below. In FIG. 201, only the components forming the light paths inside the camera are shown, and other components are omitted. FIGS. 202 and N14 schematically show the component arrangement inside the camera, as viewed from above and from the front, respectively.

In these figures, reference numeral 91 represents a semi-transparent mirror disposed at 45 degrees with respect to the optical axis of the taking lens (not shown in the figure) for splitting the light beam incoming through the taking lens. The light beam having passed through the semi-transparent mirror 91 travels further rearward to form an image on the film surface F, which is exposed through an exposure opening 93, on a film loaded in the camera.

On the other hand, the light beam reflected by the semi-transparent mirror 91 is then directed to the side of the camera, and forms a primary image 95 in a position equivalent to the film surface F. The light beam having formed the primary image 95 travels further laterally until reflected by a reflection mirror 97 toward the top of the camera. The light beam reflected by the reflection mirror 97 travels upward inside the grip portion in the rear part of the first projection 13. In the grip portion 13, a relay optical system 99 is arranged vertically, and the imaging surface 101 of the image pickup device is arranged further above. Therefore, the light beam reflected by the reflection mirror 97 is reduced by the relay optical system 99 to form an image on the imaging surface 101, so that shooting is executed. The image thus captured is reproduced and observed through the electronic viewfinder disposed in the rear part of the camera, and is also recorded as a still picture or a moving picture on a recording medium MED loaded in the recording medium compartment MEDC formed in the grip portion (the grip portion located opposite to the grip portion in which the above-mentioned optical system is formed) including the second projection 15.

Moreover, in the battery compartment BATC in the grip portion including the second projection, two serially-connected battery cells BAT are loaded.

In this embodiment, the spool room SPL for winding a rolled silver salt film loaded in the camera is disposed in the first projection 13 so as not to interrupt the light beam. Specifically, as shown in FIG. 202, the spool room SPL is disposed farther frontward than the relay optical system 99, so that the already exposed portion of a film is advanced frontward along the side of the camera and wound. Moreover, as described above, the arrangement of the recording medium compartment MEDC and the battery compartment BATC is the same as in the thirty-sixth embodiment, the arrangement of the film cartridge compartment CMB is the same as in the thirty-sixth embodiment.

In this embodiment, since the light beam is reflected not in vertical direction inside the camera, but directly to the side of the camera, it is possible to keep the height of the camera from becoming larger than necessary.

This embodiment has external appearances as shown in FIG. 180 and a construction as shown in FIG. 184.

Next with reference to FIGS. 204 to 206, a fortieth embodiment of the present invention will be described below. In FIG. 204, only the components forming the light paths inside the camera are shown, and other components are omitted. FIGS. 205 and N17 schematically show the component arrangement inside the camera, as viewed from above and from the front, respectively.

In these figures, reference numeral 103 represents a semi-transparent mirror disposed at 45 degrees with respect to the optical axis of the taking lens (not shown in the figure) for splitting the light beam incoming through the taking lens. The light beam having passed through the semi-transparent mirror 103 travels further rearward to form an image on the film surface F, which is exposed through an exposure opening 105, on a film loaded in the camera.

On the other hand, the light beam reflected by the semi-transparent mirror 103 is directed toward the side of the camera (toward the right side of the camera, as viewed from the front), and forms a primary image 107 in a position equivalent to the film surface F. The light beam having formed the primary image 107 further travels toward the side of the camera, and is reflected upward inside the camera by the reflection mirror 109. The light beam reflected by the reflection mirror 109 travels upward inside the grip portion in the rear part of the first projection 13. The light beam is then reflected toward the side of the camera (toward the left side of the camera as viewed from the front) by another reflection mirror 111 disposed in the upper part of the grip portion. At the side of the reflection mirror 111, a relay optical system 113 is arranged horizontally, and, at the side thereof, an imaging surface 115 of the image pickup device is arranged. Therefore, the light beam reflected by the reflection mirror 111 is reduced by the relay optical system 113 to form an image on the imaging surface, so that shooting is executed. The image thus captured is reproduced for observation through an electronic viewfinder disposed at the rear of the camera, and is also recorded as a still picture or a moving picture on a recording medium MED comprising a magnetic or magneto-optical disk, a magnetic tape, an IC card or other, which is loaded in a recording medium compartment formed in the grip portion (the grip portion located opposite to the grip portion in which the above-mentioned optical system is formed) including the second projection 15.

In this embodiment, the spool room SPL for winding a rolled silver salt film loaded in the camera is disposed in the first projection 13 so as not to interrupt the light beam.

Moreover, in the grip portion including the second projection, a recording medium compartment MEDC for loading a recording medius and a battery compartment BATC are formed. In the battery compartment BATC, two serially-connected battery cells BAT are loaded, arranged in parallel. Moreover, a capacitor CAP for accumulating energy for firing a flash (not shown in the figure) is disposed above the battery compartment BATC. The arrangement of the battery BAT and the capacitor CAP may be reversed.

In this embodiment, since the light path from the primary image 107 to the relay optical system 113 is longer than in the other embodiments, it is possible to use an optical system having a larger reduction factor.

This embodiment has external appearances as shown in FIG. 180 and a construction as shown in FIGS. 184 and 182.

FIG. 207 shows a forty-first embodiment of the present invention. The optical system of this embodiment has a component arrangement reversed upside-down as against the fortieth embodiment. In other respects, this embodiment is the same as the fortieth embodiment. More specifically, the light reflected toward the side the semi-transparent mirror 117 forms a primary image 119, is then reflected downward by the reflection mirror 121, and is reflected toward the side by the reflection mirror 123. The light beam reflected by the reflection mirror 123 is reduced by the horizontally arranged relay optical system 125, and then forms an image on the imaging surface of the image pickup device 127, so that shooting is effected.

In this embodiment, two serially-connected battery cells BAT are loaded in the battery compartment BATC in the grip including the second projection 15, and, further below, a capacitor CAP is horizontally arranged. In other respects, the construction is the same as the fifth embodiment.

In this embodiment, since the light path from the primary image 119 to the relay optical system 125 is long, it is possible to use an optical system having a larger reduction factor.

This embodiment has external appearances as shown in FIG. 180 and a construction as shown in FIGS. 184 and 182.

The above embodiments have a construction corresponding to FIG. 184, in which a secondary image is formed by a relay optical system and an image is captured by an image pickup device disposed on the secondary image plane. However, it is also possible to construct the embodiment according to FIG. 185 (with an optical viewfinder) by directing the light beam toward the rear of the camera into an eyepiece so that the primary image is observed through the eyepiece. When an image is captured by means of an image pickup device, it is possible to erect the image by electrically processing it even if the image is inverted, but, when the image is observed directly through a viewfinder, it is necessary to erect the image by some means. Therefore, it is necessary to provide an erecting optical system such as a Porro prism (or an equivalent optical system) instead of each relay optical system. In this case, the reflection mirrors for directing the light beam into the grip portion are used also as part of the erecting optical system.

Moreover, it is also possible to provide a focusing screen instead of each image pickup device in the above embodiments, so that a secondary image formed on the focusing screen is observed through an eyepiece. Also in this case, it is necessary to provide an erecting optical system, and, as in the case described above, it is possible to use the reflection mirrors for directing the light beam into the grip portion as part of the erecting optical system.

FIG. 208 shows a forty-second embodiment as an example of the above described construction. This embodiment is a modified version of the construction shown in FIG. 198, in which an optical viewfinder is additionally provided.

In FIG. 208, reference numeral 131 is a semi-transparent mirror disposed at 45 degrees with respect to the optical axis of the taking lens (not shown in the figure) for splitting the light beam incoming through the taking lens. The light beams having passed through the semi-transparent mirror 131 travels further rearward to form an image on the film surface F, which is exposed through an exposure opening 133, of a film loaded in the camera.

On the other hand, the light beam reflected by the semi-transparent mirror 131 is directed downward inside the camera to form a primary image 135 in a position equivalent to the film surface F. The light beam having formed the primary image 135 travels further downward, and is then reflected toward the side of the camera (toward the right side of the camera, as viewed from the front) by the reflection mirror 137. Thereafter, the light beam is reflected upward inside the camera by another reflection mirror 139 disposed at the side of the reflection mirror 137. The light beam reflected by the reflection mirror 139 upward inside the grip portion in the rear portion of the first projection. The upward traveling light beam is then reflected toward the rear of the camera by a reflection mirror 141 arranged in the upper part of the grip portion. The light beam is then observed as a primary image 135 through an eyepiece 143 disposed at the rear of the reflection mirror 141. In this embodiment, the reflecting mirrors used for directing the light beam into the eyepiece are shared as part of the erecting optical system.

This embodiment has external appearances as shown in FIG. 180 and a construction as shown in FIG. 185.

In the above described embodiments, the light beam having entered the camera is directed toward the right side of the camera, as viewed from the front. However, it is also possible to direct the incoming light beam first toward the left side of the camera and then vertically on the projection 15-side of the camera. In this case, it is better to form the battery compartment and the recording medium compartment on the projection 15-side of the camera.

According to the thirty-sixth to forty-second embodiments, the split light beam is directed toward the side of the camera, and then directed vertically inside the grip portion at the side of the camera to form an image for being shot or observed through the viewfinder. Therefore, it is possible to obtain a sufficient light path length without securing an unduly large space in the upper part of the camera, and accordingly, it is possible to design reasonable light paths for image capturing and viewfinder observation.

Moreover, the frontward projections on the front surface of the grip portions contributes to stable holding of the camera. Further, by directing the light beam obliquely toward the front edge of the side surface of the camera, it is possible to secure a still longer light path.

Next, with reference to FIG. 209, a forty-third embodiment will be described below. In the figure, the main lens is omitted for the simplicity's sake.

In FIG. 209, reference numeral 11 represents a semi-transparent mirror arranged at 45 degrees with respect to the optical axis of the main lens at the rear of the main lens. The semi-transparent mirror constitutes a first beam splitter. The light beam having passed through the semi-transparent mirror 11 is projected onto a film F through an image frame 13 formed at the rear of the semi-transparent mirror 11 to form an image thereupon. The film F actually is a rolled film which is to be extracted from a cartridge and advanced to the image frame 13. However, since the construction of the film does not have a direct relation to that of the present invention, the film is omitted in the drawing (the same applies to the following embodiments). On the other hand, the light beam reflected by the semi-transparent mirror 11 travels upward inside the camera to form a primary image 15. The primary image may be an aerial image or, alternatively, an image formed on a focusing screen provided on the image plane (this also applies to the following embodiments).

The light beam having formed the primary image travels further upward, is reflected rearward by a total reflection mirror 17, and is then reflected obliquely frontward by a total reflection mirror 19. The thus obliquely frontward reflected light beam passes through a obliquely arranged relay optical system 21, and is then split by a semi-transparent mirror 23 constituting a second beam splitter.

The light beam reflected by the semi-transparent mirror 23 travels toward the rear of the camera and enters another relay optical system 25. This light beam forms an image on the imaging surface 27 of an image pickup device such as a CCD through the action of the two relay optical systems 21 and 25. The image thus captured by the image pickup device is recorded as a moving-picture or a still picture on a magnetic disk, magnetic tape, IC card or other recording medium (not shown in the figure).

On the other hand, the light beam having passed through the semi-transparent mirror 23 travels further obliquely frontward, is reflected rearward by a total reflection mirror 29, and then enters another relay optical system 31. The light beam forms a viewfinder image 33 through the action of the relay optical systems 21 and 31, and this image is observed by the operator through an eyepiece 35 from the rear of the camera.

In the above described construction, the light beam is refracted in a Z shape on a horizontal plane in the vicinity of the top surface of the camera. Therefore, as shown in FIG. 180, the camera has a form similar to that of a conventional camera, that is, an ordinary camera using a silver salt film. Accordingly, this type of camera does not raise a sense of inadaptability in the consumer, that is, it is acceptable to the consumer.

Moreover, since the viewfinder image or the image pickup device has a smaller area in comparison with the image frame 13 on the film F, each relay optical system needs to reduce the image, as described above. In the construction shown in FIG. 209, where a sufficient distance can be secured between the image plane of the primary image 15 to the relay optical system 21, it is possible to use a relay optical system having a large reduction factor.

This embodiment has a construction corresponding to the construction shown in FIGS. 186 and 182.

Next, with reference to the FIGS. 210 to 212, modified versions of the construction shown in FIG. 209 will be described below.

The construction shown in FIG. 210 is the same as that shown in FIG. 209 except that a relay optical system 37 is provided between the two total reflection mirrors 17 and 19, and that the image for viewfinder observation or for image capture is formed through a combination of three relay optical systems 37, 21 and 31, or 37, 21 and 25, respectively. Since the relay optical system is separated into a plurality of sections, this construction allows more flexible and easy designing of the system.

This modified embodiment has external appearances as shown in FIG. 180 and a construction corresponding to the construction shown in FIGS. 182 and 186.

The construction shown in FIG. 211 is the same as that shown in FIG. 209 except that a relay optical system 39 is provided between two total reflection mirrors 17 and 19 instead of a relay optical system provided between the total reflection mirror 19 and the semi-transparent mirror 23. Since the distance between the two total reflection mirrors 17 and 19 is longer than the distance between the total reflection mirror 19 and the semi-transparent mirror 23, the relay optical system 39 can be designed with more flexibility, and the relay optical system can be constructed with fewer lenses.

This modified embodiment has external appearances as shown in FIG. 180 and a construction corresponding to the construction shown in FIGS. 182 and 186.

The construction shown in FIG. 212 has a similarly constructed optical system, but it is quite different from the above described constructions in arrangement of the optical system components. First, the light beam having formed a primary image is reflected rearward by a total reflection mirror 17, as in the above described constructions. The light beam reflected rearward enters a relay optical system 41, and travels further rearward until split by a semi-transparent mirror 43. The light beam reflected upward by the semi-transparent mirror 43 is then reflected rearward by a total reflection mirror 51, and enters a relay optical system 53. This light beam forms an image on the imaging surface 55 on the image pickup device through the action of the relay optical systems 41 and 53.

On the other hand, the light beam having passed through the semi-transparent mirror 43 travels further rearward, enters a relay optical system 45, and formed into a viewfinder image 47 through the action of the relay optical systems 41 and 45. This image can be observed through an eyepiece 49.

In the above construction, the light beam is used for image capture in the lower part of the camera, and is used for forming a light path for the viewfinder in the upper part of the camera. Although the optical system components are illustrated in a uniform size in the figure for ease of reference, the area of the imaging surface is actually much smaller than the image frame of the film, and accordingly, it can be disposed in the vicinity of the light beam for the viewfinder. Therefore, the external appearances of the camera are similar to those of a conventional camera, that is an ordinary moving-picture video camera as shown in FIG. 181. Accordingly, this type of camera does not raise a sense of inadaptability in the consumer, that is, it is acceptable to the consumer.

This embodiment has a construction corresponding to the construction shown in FIG. 186.

Next, with reference to FIG. 213, a forty-fourth embodiment will be described below. Also in this figure, the main lens is omitted.

In FIG. 213, reference numeral 61 represents a semi-transparent mirror arranged at 45 degrees with respect to the optical axis of the main lens at the rear of the main lens. The semi-transparent mirror 61 constitutes a first beam splitter. The light beam having passed through the semi-transparent mirror 61 is projected onto the film F through the image frame 63 formed at the rear of the semi-transparent mirror 61 to form an image. On the other hand, the light beam reflected by the semi-transparent mirror 61 travels further upward inside the camera to form a primary image 65.

The light beam having formed the primary image travels further upward, is reflected rearward by a total reflection mirror 67, and enters a relay optical system 69. The light beam emitted from the relay optical system 69 is split by a semi-transparent mirror 71. Of the thus split light beams, the light beam having passed through the semi-transparent mirror 71 forms a viewfinder image 73 through the action of the relay optical system 69. This image is observed through an eyepiece 75 by the observer. On the other hand, the light beam reflected upward by the semi-transparent mirror 71 forms a secondary image through the action of the relay optical system 69. The light beam having formed the secondary image travels further upward inside the camera, is reflected rearward by the total reflection mirror 79, and then forms an image through another relay optical system 81 on the imaging surface 83 of the image pickup device.

This embodiment has external appearances as shown in FIG. 181 and a construction corresponding to the construction shown in FIG. 187.

Next, with reference to FIG. 214, a forty-fifth embodiment will be described below. Also in this figure, the main lens is omitted.

In FIG. 214, reference numeral 91 represents a semi-transparent mirror arranged at 45 degrees with respect to the optical axis of the main lens at the rear of the main lens. The semi-transparent mirror 91 constitutes a first beam splitter. The light beam having passed through the semi-transparent mirror 91 is projected onto the film F exposed through the image frame 93 formed at the rear of the semi-transparent mirror 91 to form an image. On the other hand, the light beam reflected by the semi-transparent mirror 91 travels further upward inside the camera to form a primary image 95.

The light beam having formed the primary image travels further upward, is reflected rearward by a total reflection mirror 97, and the reflected light beam is further reflected obliquely frontward by a total reflection mirror 99. The thus obliquely frontward reflected light beam is split by a semi-transparent mirror 101. The light reflected by the semi-transparent mirror 101 travels rearward inside the camera and enters a relay optical system 103. This light beam forms an image on the imaging surface 105 of the image pickup device through the action of the relay optical system 103.

On the other hand, the light beam having passed through the semi-transparent mirror 101 travels further obliquely frontward, is reflected rearward by a total reflection mirror 107, and then enters another relay optical system 109. This light beam forms a viewfinder image 111 through the action of the relay optical system 111. This image is observed through an eyepiece 113 by the operator.

This embodiment has external appearances as shown in FIG. 180 and a construction corresponding to the construction shown in FIGS. 182 and 188.

Next, with reference to FIG. 215, a modified version of the forty-fifth embodiment will be described below.

In FIG. 215, the light beam having formed the primary image is split, not by a total reflection mirror, but by a semi-transparent mirror 115. The light beam reflected rearward by the semi-transparent mirror 115 forms a viewfinder image 119 through a relay optical system 117. This image is observed through an eyepiece 121. On the other hand, the light beam having passed through the semi-transparent mirror 115 travels further upward until reflected rearward by a total reflection mirror 123, and forms an image on the imaging surface 127 of the image pickup device through a relay optical system 125.

This modified embodiment has external appearances as shown in FIG. 181 and a construction corresponding to the construction shown in FIG. 188.

Next, with reference to FIG. 216, a forty-sixth embodiment will be described below. Also in this figure, the main lens is omitted.

In FIG. 216, reference numeral 131 represents a semi-transparent mirror arranged at 45 degrees with respect to the optical axis of the main lens at the rear of the main lens. The semi-transparent mirror 131 constitutes a first beam splitter. The light beam having passed through the semi-transparent mirror 131 is projected onto the film F exposed through the image frame 133 formed at the rear of the semi-transparent mirror 131 to form an image. On the other hand, the light beam reflected by the semi-transparent mirror 131 travels further upward inside the camera to form a primary image 135.

The light beam having formed the primary image travels further upward, reflected rearward by a total reflection mirror 137, and is further reflected obliquely toward the front edge of the side of the camera by a total reflection mirror 139. The thus horizontally but obliquely reflected light beam passes through a relay optical system 141, and is then reflected to the rear of the camera by a total reflection mirror 143. The reflected light beam forms a secondary image 145 through the action of the relay optical system 141. The image is observed by the operator through a semi-transparent mirror 147 and an eyepiece 149 which are disposed at the rear of the secondary image 145.

On the other hand, the light beam reflected by the semi-transparent mirror 147 travels toward the side of the camera (in the direction approaching the total reflection mirror 139), and forms an image on the imaging surface 153 of an image pickup device through a relay optical system 151 which is horizontally arranged.

In this construction, the light path from the total reflection mirror 139 to the total reflection mirror 143 and the light path from the semi-transparent mirror 47 to the image pickup device are formed approximately in the horizontal directions. Accordingly, this modified embodiment has external appearances as shown in FIG. 180 and a construction corresponding to the construction shown in FIGS. 182 and 189.

Next, with reference to FIG. 217, a forty-seventh embodiment will be described below. In the figure, the main lens is omitted to simplify the figure.

In FIG. 217, reference numeral 161 represents a semi-transparent mirror arranged at 45 degrees with respect to the optical axis of the main lens at the rear of the main lens. The semi-transparent mirror 161 constitutes a first beam splitter. The light beam having passed through the semi-transparent mirror 161 is projected onto the film F exposed through the image frame 163 formed at the rear of the semi-transparent mirror 161 to form an image. On the other hand, the light beam reflected by the semi-transparent mirror 161 travels further upward inside the camera to form a primary image 165.

The light beam having formed the primary image travels further upward, and is reflected rearward by a total reflection mirror 167. The reflected light beam passes through a relay optical system 169, and is split by the semi-transparent mirror 171. The light beam having passed through the semi-transparent mirror 171 is directed toward the rear of the camera, forms a secondary image 173, and then enters another relay optical system 175. This light beam forms a viewfinder image 177 through the action of the relay optical system 175. This image is observed by the operator through an eyepiece 179 disposed at the rear of the viewfinder image 177.

On the other hand, the light beam reflected upward by the semi-transparent mirror 171 first forms a secondary image 181, is then reflected rearward by a total reflection mirror 183, and enters another relay optical system 185. This light beam forms an image on the imaging surface 187 of the image pickup device through the action of the relay optical system 185.

This modified embodiment has external appearances as shown in FIG. 181 and a construction corresponding to the construction shown in FIG. 190.

FIG. 218 shows a forty-eighth embodiment. In FIG. 218, at the rear of a first main lens 201 are arranged a first semi-transparent mirror 203 forming an angle of 45 degrees with respect to the optical axis, a second main lens 205, a second semi-transparent mirror 207 forming an angle of 45 degrees with respect to the optical axis, and a third main lens 209. Farther rearward, a film F is exposed through an image frame 211. As a result, the light beam having passed through these optical system components forms an image on the surface of the film through the first, second and third main lenses 201, 205 and 209.

The light beam reflected by the first semi-transparent mirror 203 travels upward in the camera, reflected rearward by a total reflection mirror 213, and enters a first subsidiary lens 215. The light beam exiting from the first subsidiary lens 215 is reflected upward by a total reflection mirror 217 which is disposed farther rearward, and forms a viewfinder image 219. The light beam forming this image is reflected rearward by a total reflection mirror 221 disposed above, and is then observed through an eyepiece 223 disposed at the rear of the total reflection mirror 221.

On the other hand, the light beam reflected by the second semi-transparent mirror 207 also travels upward until reflected rearward by a total reflection mirror 225. The reflected light beam forms an image on the imaging surface 229 of the image pickup device through a second subsidiary lens 227, to effect shooting.

This embodiment has external appearances as shown in FIG. 181 and a construction corresponding to the construction shown in FIG. 191.

It is to be noted that, although the total reflection mirrors 217 and 225 are shown as being distant from each other in the figure, it is practically possible to arrange them back-to-back so that they can fit into a smaller space.

FIG. 219 shows a modified version of the arrangement shown in FIG. 218. In this arrangement, the image formation on the film surface is achieved in the same way as in the above described example of FIG. 218. Therefore, no description will be given in this respect.

In FIG. 219, the light beam reflected upward by the first semi-transparent mirror is reflected toward the rear of the camera by a total reflection mirror 231, and enters a first subsidiary lens 233. The light beam exiting from the first subsidiary lens 233 forms an image on the imaging surface 235 of the image pickup device.

On the other hand, the light beam reflected upward by the second semi-transparent mirror is reflected rearward by a total reflection mirror 237, and enters a second subsidiary lens 239. The light beam exiting from the second subsidiary lens 239 forms an image on the image plane 241 for viewfinder observation, and is observed through an eyepiece 243 from the rear of the camera.

FIG. 220 shows a forty-ninth embodiment. In FIG. 220, at the rear of the main lens 301 are arranged a semi-transparent mirror 303 forming an angle of 45 degrees with respect to the optical axis, and a tele-converter lens 305. Farther rearward, a film F is exposed through an image frame 307. As a result, the light beam having passed through these optical system components forms an image on the film surface though the main lens 301 and the tele-converter lens 305.

The light beam reflected by the semi-transparent mirror 303 travels upward inside the camera, is reflected rearward by a total reflection mirror 309, and enters a wide-converter lens 311. Therefore, an image is formed through the main lens 301 and the wide-converter lens 311, and the thus formed image is used for viewfinder observation and image capturing.

This embodiment has external appearances as shown in FIG. 181 and a construction corresponding to the construction shown in FIG. 192.

In the forty-third to forty-ninth embodiments, it is to be noted that, although a main lens, subsidiary lens, relay optical system or converter lens is illustrated as a single unit in the figure, it normally comprises a plurality of lenses in practice. Moreover, explanation of the high-density construction, which is essential in a camera, is omitted in the above description. Further, since the construction of the aperture diaphragm, shutter or other component involves nothing special in the above embodiments, descriptions are omitted also in these regards.

Further, the main lens may be either of a type which is removably mounted on the camera, or of a type which is fixed to the camera, except the one shown in FIG. 191 (which is divided into a plurality of lenses).

In an embodiment adopting a construction as shown in FIGS. 186, 187 and 190, a light beam of an image formed by the main lens forms an image on a photo-sensitive recording medium such as a silver salt film, and is simultaneously split by a first beam splitter to form another primary image. This primary image is reduced through a relay optical system and simultaneously split by a second beam splitter to form a viewfinder image and an image for image capturing. Meanwhile, the relay optical system for forming the viewfinder image and the relay optical system for image capturing share at least part of their components. As a result, although the relay optical systems are needed for forming two types of images each having a different size from the image formed on the photo-sensitive recording medium, the relay optical systems need to have only a minimum construction.

In an embodiment adopting a construction as shown in FIG. 188, a light beam of an image formed by a main lens forms an image on a photo-sensitive recording medium such as a silver salt film, and is simultaneously split by a first beam splitter to form another primary image. This primary image is reduced through a relay optical system and simultaneously split by a second beam splitter to form a viewfinder image and an image for image capturing. Meanwhile, the relay optical system for forming the viewfinder image and the relay optical system for image capturing function completely independent of each other. As a result, it is possible to design the relay optical systems with ease.

In an embodiment adopting a construction as shown in FIG. 191, a viewfinder image or an image for image capturing is formed through a first main lens and a first subsidiary lens, an image for image capturing or a viewfinder image is formed through the first main lens, a second main lens and a second subsidiary lens, and an image for shooting on a photo-sensitive recording medium such as a silver salt film is formed through the first, second and third main lenses. Therefore, since a secondary or tertiary image is not formed, it is possible to reduce the size of the optical system for forming an image for image capturing or a viewfinder image.

In an embodiment adopting a construction as shown in FIGS. 182 and 183, a split light beam is first directed upward or downward inside the camera, and is then refracted on a plane along the top or bottom surface of the camera or directed in a lateral direction, before entering an image pickup device. Alternatively, the split light beam is first directed toward the bottom of the camera, and is then directed on a plane along the bottom of the camera before entering the image pickup device outside the plane. Therefore, it is possible to obtain a sufficient light path length without securing an unduly large space in the upper or lower part of the camera, and accordingly, it is possible to design reasonable light paths for image capturing. Moreover, it is possible to prevent the camera from having a form extremely different from a conventional camera because of an unduly large lower part.

What is claimed is:

1. A camera for performing a first image formation and a second image formation by splitting a light beam incident through a taking optical system including a first aperture diaphragm, said first image formation being performed with a silver salt medium, said second image formation being performed electronically with an image pickup device, comprising:

an image forming optical system disposed in a light path of one of said split light beams for directing the light beam toward the image pickup device;

a second aperture diaphragm disposed in a light path within said image forming optical system; and a controller for controlling said first and second aperture diaphragms correlatively.

2. A camera as claimed in claim 1, wherein said controller controls said second aperture diaphragm to be controlled separately from said first aperture diaphragm when said first aperture diaphragm is controlled within a range between a predetermined aperture value and an open aperture value.

3. A camera as claimed in claim 2, wherein said predetermined aperture value is $a/\beta$ when said image forming optical system is a reduction optical system having an open aperture value of a and a reduction factor of $\beta$.

4. A camera as claimed in claim 2, wherein said controller controls an aperture value of said first aperture diaphragm to be within a range between a first predetermined aperture value and an open aperture value when said second aperture diaphragm is controlled based on a predetermined second control aperture value.

5. A camera as claimed in claim 4, wherein said first predetermined aperture value is $b/\beta$ when said image forming optical system is a reduction optical system having a reduction factor of $\beta$ and said predetermined second control aperture value is b.

6. A camera as claimed in claim 1, wherein said controller controls an aperture value of said first aperture diaphragm to be within a range between a first predetermined aperture value and an open aperture value when an aperture of said second aperture diaphragm is controlled based on a predetermined second aperture value.

7. A camera as claimed in claim 6, wherein said first predetermined aperture value of said second aperture diaphragm is $b/\beta$ when said image forming optical system is a reduction optical system having a reduction factor of $\beta$ and said predetermined second aperture value is b.

8. A camera as claimed in claim 1, wherein said Second aperture diaphragm is capable of stopping a light path of the image forming optical system to interrupt a light beam incident on an image pickup device.

9. A camera for obtaining a first light beam and a second light beam by splitting a light beam incident through a taking optical system including a first aperture diaphragm, said first light beam being used for image formation, said second light beam being used for observing a subject image, comprising:

a relay optical system disposed in a light path of said second light beam;

a second aperture diaphragm disposed in a light path inside said relay optical system; and a controller for controlling said first and second aperture diaphragms correlatively.

10. A camera as claimed in claim 9, wherein said controller controls said second aperture diaphragm to be controlled separately from said first aperture diaphragm when said first aperture diaphragm is controlled within a range between a predetermined aperture value and an open aperture value.

11. A camera as claimed in claim 10, wherein said predetermined aperture value is $a/\beta$ when said taking optical system is a reduction optical system having an open aperture value of a and a reduction factor of $\beta$.

12. A camera as claimed in claim 10, wherein said controller controls an aperture value of said first aperture diaphragm to be within a range between a first predetermined aperture value and an open aperture value when said second aperture diaphragm is controlled based on a predetermined second control aperture value.

13. A camera as claimed in claim 12, wherein said first predetermined aperture value is $b/\beta$ when said relay optical system is a reduction optical system having a reduction factor of $\beta$ and said predetermined second control aperture value is b.

14. A camera as claimed in claim 9, wherein said controller controls an aperture value of said first aperture diaphragm to be within a range between a first predetermined aperture value and an open aperture value when an aperture of said second aperture diaphragm is controlled based on a predetermined second aperture value.

15. A camera as claimed in claim 14, wherein said first predetermined aperture value is $b/\beta$ when said relay optical system is a reduction optical system having a reduction factor of and said predetermined second aperture value is b.

16. A camera as claimed in claim 11, wherein said second aperture diaphragm is capable of stopping the light path to interrupt a light beam.

17. A camera which splits a light beam incident through a taking optical system including a first aperture diaphragm, one of split light beams being used for image formation on a photosensitive recording medium, another of the split light beams being used for image formation on an image pickup device for observation through an electronic viewfinder, comprising:

a setting device for setting an aperture value of said first aperture diaphragm;

a second aperture diaphragm disposed in a light path of said another light beam; and a controller for driving said first aperture diaphragm based on a setting by said setting device during image formation on said photosensitive recording medium, and for driving said second aperture diaphragm based on a setting by said setting device except during image formation on said photosensitive recording medium to perform image formation with said image pickup device so that a formed image is displayed in the electronic viewfinder.

18. A camera as claimed in claim 17, wherein said controller controls an electric charge accumulation time for the image pickup device in synchronization with operation of said second aperture diaphragm.

19. A camera as claimed in claim 17, further comprising:

a variable-density filter disposed in a light path for image formation on said image pickup device.

20. A camera which splits a light beam incident through a taking optical system, one of split light beams being used for image formation on a photosensitive recording medium through a shutter, other of split light beams being used for image formation with an image pickup device so that a formed image is observed through an electronic viewfinder, comprising:

- a setting device for setting a control shutter speed of said shutter; and
- a controller for driving said shutter based on a setting by said setting device during image formation on said photosensitive recording medium, and for controlling an electric charge accumulation time of said image pickup device except during image formation on said photosensitive recording medium to perform image formation so that a formed image is displayed in the electronic viewfinder.

21. A camera as claimed in claim 20, further comprising:
- an aperture diaphragm disposed in a light path of said other light beam and operated in synchronization with control of the electric charge accumulation time of said image pickup device.

22. A camera as claimed in claim 20, further comprising:
- a variable-density filter is disposed in a light path for image formation on said image pickup device.

* * * * *